US012757915B2

(12) United States Patent
Creamer et al.

(10) Patent No.: US 12,757,915 B2
(45) Date of Patent: Oct. 13, 2026

(54) ENZYME BLENDS AND PROCESSES FOR PRODUCING A HIGH PROTEIN FEED INGREDIENT FROM A WHOLE STILLAGE BYPRODUCT

(71) Applicant: Novozymes A/S, Bagsvaerd (DK)

(72) Inventors: Kurt Creamer, Apex, NC (US); Kalpesh Parekh, Raleigh, NC (US); James Lavigne, Wake Forest, NC (US)

(73) Assignee: Novozymes A/S, Bagsvaerd (DK)

( * ) Notice: Subject to any disclaimer, the term of this patent is extended or adjusted under 35 U.S.C. 154(b) by 777 days.

(21) Appl. No.: 17/633,011

(22) PCT Filed: Aug. 5, 2020

(86) PCT No.: PCT/US2020/044955
§ 371 (c)(1),
(2) Date: Feb. 4, 2022

(87) PCT Pub. No.: WO2021/026201
PCT Pub. Date: Feb. 11, 2021

(65) Prior Publication Data

US 2022/0279818 A1 Sep. 8, 2022

Related U.S. Application Data

(60) Provisional application No. 62/882,698, filed on Aug. 5, 2019.

(51) Int. Cl.
*A23K 10/14* (2016.01)
*A23K 10/38* (2016.01)
*A23K 20/147* (2016.01)

(52) U.S. Cl.
CPC .............. *A23K 10/14* (2016.05); *A23K 10/38* (2016.05); *A23K 20/147* (2016.05)

(58) Field of Classification Search
None
See application file for complete search history.

(56) References Cited

U.S. PATENT DOCUMENTS

| | | | | |
|---|---|---|---|---|
| 10,875,889 | B2 | 12/2020 | Jakel | |
| 2008/0026101 | A1 | 1/2008 | Nickel et al. | |
| 2012/0064213 | A1 * | 3/2012 | Lee | A23K 50/00 422/255 |
| 2013/0330791 | A1 | 12/2013 | Milos et al. | |
| 2014/0141472 | A1 | 5/2014 | Berka et al. | |
| 2017/0166834 | A1 | 6/2017 | Jakel | |
| 2017/0298394 | A1 * | 10/2017 | Diao | C12N 1/185 |
| 2017/0335302 | A1 * | 11/2017 | Peng | A23K 10/14 |
| 2021/0062122 | A1 | 3/2021 | Franko et al. | |
| 2022/0112450 | A1 | 4/2022 | Jakel | |
| 2022/0287332 | A1 | 9/2022 | Jakel et al. | |

FOREIGN PATENT DOCUMENTS

| | | | | |
|---|---|---|---|---|
| CN | 104448011 | | 3/2015 | |
| WO | 2010096510 | A2 | 8/2010 | |
| WO | 2010109203 | A1 | 9/2010 | |
| WO | 2010138110 | A1 | 12/2010 | |
| WO | 2012084225 | A1 | 6/2012 | |
| WO | 2017088820 | A1 | 6/2017 | |
| WO | WO-2018167669 | A1 * | 9/2018 | A21D 8/042 |

OTHER PUBLICATIONS

Pedrolli et al, 2009, The open biotechnology journal 3, 9-18.
Zyl et al, 2007, Adv Biochem Eng Biotechnol 205-235.

* cited by examiner

*Primary Examiner* — Bethany P Barham
*Assistant Examiner* — Afua Bamfoaa Boateng
(74) *Attorney, Agent, or Firm* — David A. Fazzolare

(57) ABSTRACT

The present invention relates to a process for producing a high protein feed ingredient from a whole stillage byproduct produced in a starch-containing grain dry milling process for producing a fermentation product, as well as enzyme blends used in the processes for partitioning a greater amount of protein from the whole stillage byproduct into the high protein fraction, rather than being retained in the wet cake, to produce a high protein feed ingredient.

38 Claims, 18 Drawing Sheets

Specification includes a Sequence Listing.

High Protein Feed Ingredient Protein Content (%) vs Treatment for Beta-glucanase Experiment High Protein Feed Ingredient Protein Content (%) vs Treatment for Xylanase Experiment High Protein Feed Ingredient Protein Content (%) vs Treatment for Arabinofuranosidase Whole Stillage Experiment.

High Protein Feed Ingredient Mass Fraction (%) vs Treatment for WA Cellulase

High Protein Feed Ingredient Protein Content (%) vs Treatment for WA Cellulase

High Protein Feed Ingredient Mass Fraction (%) vs Treatment for GH5 Xylanases

High Protein Feed Ingredient Protein Content (%) vs Treatment for GH5 Xylanases

High Protein Feed Ingredient Mass Fraction (%) vs Treatment for Arabinofuranosidase Fermentation Experiment.

High Protein Feed Ingredient Protein Content (%) vs Treatment for Arabinofuranosidase Fermentation Experiment.

ENZYME BLENDS AND PROCESSES FOR PRODUCING A HIGH PROTEIN FEED INGREDIENT FROM A WHOLE STILLAGE BYPRODUCT

CROSS-REFERENCE TO RELATED APPLICATIONS

This application is a 35 U.S.C. 371 national application of international application no. PCT/US2020/044955 filed Aug. 5, 2020, which claims priority or the benefit under 35 U.S.C. 119 of U.S. provisional application No. 62/882,698 filed Aug. 5, 2019, the contents of which are fully incorporated herein by reference.

REFERENCE TO SEQUENCE LISTING

This application contains a Sequence Listing that was submitted as an ASCII text file named SQListing.txt (created on Aug. 5, 2020, containing 234 kb), which is incorporated herein by reference.

FIELD OF THE INVENTION

The present invention relates to a process for producing a high protein feed ingredient from a whole stillage byproduct produced in a process for producing a fermentation product from a starch-containing or cellulosic-containing material, as well as enzyme blends used in the processes for partitioning a greater amount of protein from the whole stillage byproduct into the high protein fraction, rather than being retained in the wet cake, to produce a high protein feed ingredient.

BACKGROUND OF THE INVENTION

Processes for producing fermentation products, such as ethanol, from a starch or lignocellulose containing material are well known in the art. The preparation of the starch containing material such as corn for utilization in such fermentation processes typically begins with grinding the corn in a dry-grind or wet-milling process. Wet-milling processes involve fractionating the corn into different components where only the starch fraction enters the fermentation process. Dry-grind processes involve grinding the corn kernels into meal and mixing the meal with water and enzymes. Generally, two different kinds of dry-grind processes are used. The most commonly used process, often referred to as a "conventional process," includes grinding the starch-containing grain and then liquefying gelatinized starch at a high temperature using typically a bacterial alpha-amylase, followed by simultaneous saccharification and fermentation (SSF) carried out in the presence of a glucoamylase and a fermentation organism. Another well-known process, often referred to as a "raw starch hydrolysis" process (RSH process), includes grinding the starch-containing grain and then simultaneously saccharifying and fermenting granular starch below the initial gelatinization temperature typically in the presence of an acid fungal alpha-amylase and a glucoamylase.

In a process for producing ethanol from corn, following SSF or the RSH process, the liquid fermentation products are recovered from the fermented mash (often referred to as "beer mash"), e.g., by distillation, which separates the desired fermentation product, e.g. ethanol, from other liquids and/or solids. The remaining fraction is referred to as "whole stillage". Whole stillage typically contains about 10 to 20% solids. The whole stillage is separated into a solid and a liquid fraction, e.g., by centrifugation. The separated solid fraction is referred to as "wet cake" (or "wet grains") and the separated liquid fraction is referred to as "thin stillage". Wet cake and thin stillage contain about 35 and 7% solids, respectively. Wet cake, with optional additional dewatering, is used as a component in animal feed or is dried to provide "Distillers Dried Grains" (DDG) used as a component in animal feed. Thin stillage is typically evaporated to provide evaporator condensate and syrup or may alternatively be recycled to the slurry tank as "backset". Evaporator condensate may either be forwarded to a methanator before being discharged and/or may be recycled to the slurry tank as "cook water". The syrup may be blended into DDG or added to the wet cake before or during the drying process, which can comprise one or more dryers in sequence, to produce DDGS (Distillers Dried Grain with Solubles). Syrup typically contains about 25% to 35% solids. Oil can also be extracted from the thin stillage and/or syrup as a by-product for use in biodiesel production, as a feed or food additive or product, or other biorenewable products.

WO 2010/138110 A1 (incorporated herein by reference in its entirety) is directed to a method for producing a high protein corn meal from a whole stillage byproduct produced in a corn dry-milling process for making ethanol and a system therefore. The method therein includes separating the whole stillage byproduct into an insoluble solids portion and a thin stillage portion. The thin stillage portion is separated into a protein portion and a water soluble solids portion. Then, the protein portion is dewatered and dried to define a high protein corn meal that includes at least 40 wt percent protein on a dry basis. However, the method and system therein suffer from the shortcoming that a significant amount of protein in the initial whole stillage byproduct is retained in the wet cake rather being partitioned to the protein portion that is dewatered and dried to define the high protein corn meal, resulting in a high protein corn meal with less protein than is theoretically possible based on the amount of protein in the initial whole stillage by product.

Therefore, there is a need for an improved method of producing a high protein feed ingredient from a whole stillage byproduct wherein greater amounts of protein from the whole stillage byproduct are partitioned into the high protein fraction, rather than being retained in the wet cake.

SUMMARY OF THE INVENTION

The present invention provides a solution to the above problem by using a hemicellulase, beta-glucanase or an enzyme blend comprising a hemicellulase and/or beta-glucanase to improve the partitioning of protein into the high protein fraction, for example by adding the hemicellulase and/or beta-glucanase, or an enzyme blend comprising the hemicellulase and/or beta-glucanase upstream during the process for producing a fermentation product from a starch-containing and/or cellulosic-containing material, for example during the saccharification, fermentation, or simultaneous saccharification and fermentation step.

The present invention more particularly relates to the addition of a hemicellulase, beta-glucanase or hemicellulase and/or beta-glucanase containing enzyme blends during the SSF process to produce a high protein feed ingredient.

The present invention contemplates using hemicellulases or beta-glucanases alone, as well as in enzyme blends comprising hemicellulase(s) and/or beta-glucanase(s) and preferably at least one additional enzyme, such as a cellulolytic composition, in saccharification, fermentation, or simultaneous saccharification and fermentation, to produce a high protein feed ingredient downstream in conventional, raw-starch hydrolysis (RSH), and cellulosic ethanol production processes.

The present invention contemplates treating whole stillage (e.g., a whole stillage byproduct of an ethanol production process) with hemicellulases or beta-glucanases alone, as well as in enzyme blends comprising hemicellulase(s) and/or beta-glucanase(s) and preferably at least one additional enzyme, such as a cellulolytic composition, to produce a high protein feed ingredient.

In an aspect, the present invention provides a method for producing a high protein feed ingredient from a whole stillage byproduct produced in a starch-containing grain dry milling process for producing a fermentation product, the method comprising:

a) optionally performing a starch-containing grain dry milling process for producing a fermentation product to produce a fermentation product and a whole stillage byproduct;
b) separating the whole stillage byproduct into an insoluble solids portion and a thin stillage portion;
c) separating the thin stillage portion into at least a first separated water-soluble solids portion, and at least a first separated protein portion;
d) optionally separating at least the first separated protein portion into at least a second separated water-soluble solids portion, and at least a second separated protein portion;
e) drying at least the first separated protein portion, and/or optionally at least the second separated protein portion, to define a protein product, wherein the protein product is a high protein feed ingredient;

wherein a hemicellulase, beta-glucanase, or an enzyme blend comprising a hemicellulase and/or beta-glucanase is added prior to or during production of the whole stillage byproduct, and/or separating the whole stillage byproduct.

In an embodiment, separating step b) is performed by subjecting the whole stillage byproduct to a filtration centrifuge, a decanter centrifuge, a pressure screen, or a paddle screen. In an embodiment, separating step c) is performed by subjecting the thin stillage portion to a centrifuge or a cyclone apparatus. In an embodiment, optional separating step d) is performed by subjecting the first separated protein portion to a centrifuge or a cyclone apparatus. In an embodiment, drying step e) is performed by subjecting at least the first separated protein portion and/or optionally the at least the second separated protein portion to a decanter centrifuge to dewater the first and/or optionally the second separated protein portions to define the high protein feed ingredient. In an embodiment, the high protein feed ingredient includes at least 40 wt percent protein on a dry basis. In an embodiment, the starch-containing grain comprises maize, corn, wheat, rye, barley, triticale, sorghum, switchgrass, millet, pearl millet, foxtail millet. In an embodiment, the high protein feed ingredient is a high protein corn-based animal feed. In an embodiment, the method further includes, after separating the whole stillage byproduct into an insoluble solids portion and a thin stillage portion and before separating the thin stillage portion into a first separated protein portion and a first separated water-soluble solids portion, separating fine fiber from the thin stillage portion. In an embodiment, separating fine fiber from the thin stillage portion comprises separating the fine fiber via a pressure screen, paddle screen, decanter, or filtration centrifuge. In an embodiment, the method further includes separating soluble solids from the first separated water-soluble solids portion to provide a first soluble solids portion, and optionally separating soluble solids from the second separated water-soluble solids portion to provide a second soluble solids portion. In an embodiment, the method further includes separating free oil from the first separated water-soluble solids portion to provide a first oil portion, and optionally separating free oil from the second separated water-soluble solids portion to provide a second oil portion.

In an embodiment, the hemicellulase and/or beta-glucanase, or the enzyme blend comprising at least one hemicellulase and/or beta-glucanase is added prior to separation of the whole stillage into insoluble solids and thin stillage. In an embodiment, the hemicellulase, beta-glucanase, or the enzyme blend comprising at least one hemicellulase and/or at least one beta-glucanase is added during the separation of the whole stillage byproduct into the insoluble solids portion and the thin stillage portion. In an embodiment, the hemicellulase and/or beta-glucanase, or the enzyme blend comprising at least one hemicellulase and/or beta-glucanase is added to the whole stillage prior to separation into insoluble solids and thin stillage.

In an embodiment, step a) is performed and performing step a) comprises:

(ii) saccharifying a starch-containing grain at a temperature below the initial gelatinization temperature with an alpha-amylase and a glucoamylase; and
(iii) fermenting using a fermentation organism to produce the fermentation product.

In an embodiment, step a) is performed and performing step a) comprises:

(i) liquefying a starch-containing grain with an alpha-amylase;
(ii) saccharifying the liquefied material obtained in step (i) with a glucoamylase; and
(iii) fermenting the saccharified material obtained in step (ii) using a fermenting organism.

In an embodiment, the hemicellulase and/or beta-glucanase, or enzyme blend comprising at least one hemicellulase and/or beta-glucanase is added during saccharifying step (ii) and/or fermenting step (iii). In an embodiment, saccharification and fermentation is performed simultaneously. In an embodiment, the fermentation product is alcohol, particularly ethanol, more particularly fuel ethanol. In an embodiment, the fermenting organism is yeast, particularly *Saccharomyces* sp., more particularly *Saccharomyces cerevisiae*. In an embodiment, the yeast is a recombinant cell comprising a heterologous polynucleotide expressing the hemicellulase and/or beta-glucanase and the enzymes are expressed in situ by the fermenting organism during fermentation or simultaneous saccharification and fermentation. In an embodiment, the hemicellulase and/or beta-glucanase are added exogenously during saccharification, fermentation, or simultaneous saccharification and fermentation. In some instances, at least some of the hemicellulase(s) and/or beta-glucanase(s) are exogenously added during saccharification, fermentation, or simultaneous saccharification and fermentation, and at least some of the hemicellulase(s) and/or beta-glucanase(s) are expressed in situ during fermentation or simultaneous saccharification and fermentation by the fermenting organism. In an embodiment, the hemicellulase is selected from the group consisting of an acetylxylan esterase, a α-glucuronidases, a α-L-arabinofuranosidases, a α-L-galactosidase, a beta-xylosidase, a feruloyl esterase, a α-D-galactosidase, a pectin-degrading enzyme, a xylanase, and any combination thereof. In an embodiment, the xylanase is from a glycoside hydrolase family selected from the group consisting of a GH3 family xylanase, GH5 family xylanase, a GH8 family xylanase, a GH10 family xylanase, a GH11 family xylanase, a GH30 family xylanase, a GH43 family xylanase, and a GH98 family xylanase. In an embodiment, the GH5 family xylanase is from a GH family selected from the group consisting of GH5_21, GH5_34 and GH5_35. In an embodiment, the GH5_21 xylanase is from the genus *Chryseobacterium*, for example *Chryseobacterium* sp-10696, such as the xylanase shown in amino acids 25 to 551 of SEQ ID NO: 5 or amino acids 25 to 551 of SEQ ID NO: 6, or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5 or amino acids 25 to 551 of SEQ ID NO: 6. In an embodiment, the G5_34 xylanase is from the genus *Acetivibrio*, for example *Acetivibrio cellulyticus*, such as the xylanase shown in SEQ ID NO: 7, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 7. In an embodiment, the G5_34 xylanase is from the genus *Clostridium*, for example *Clostridium thermocellum*, such as the xylanase shown in SEQ ID NO: 8, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 8. In an embodiment, the GH5_35 xylanase is from the genus *Paenibacillus*, for example *Paenibacillus illinoisensis*, such as the xylanase shown in amino acids 37 to 573 of SEQ ID NO: 9, or for example *Paenibacillus* sp., such as the xylanase shown in amino acids 36 to 582 of SEQ ID NO: 10, or for example *Paenibacillus favisporus*, such as the xylanase shown in amino acids 1 to 536 of SEQ ID NO: 54, or one having at least 60%, at least 65%, at least 70%, at least 75%, at least 80%, at least 85%, at least 90%, at least 95%, at least 96%, at least 97%, at least 98%, or at least 99% sequence identity to amino acids 37 to 573 of SEQ ID NO: 9, amino acids 36 to 582 of SEQ ID NO: 10, or amino acids 1 to 536 of SEQ ID NO: 54.

In an embodiment, the GH30 family xylanase is a GH30_8 xylanase. In an embodiment, the GH30_8 family xylanase is from the genus *Bacillus*, for example *Bacillus subtilis*, such as the xylanase shown in amino acids 28 to 417 of SEQ ID NO: 3 or amino acids 28 to 417 of SEQ ID NO: 4, or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4.

In an embodiment, the GH10 xylanase is from the genus *Aspergillus*, for example *Aspergillus fumigatus*, such as the xylanase shown in amino acids 20 to 397 of SEQ ID NO: 1, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1. In an embodiment, the GH10 family xylanase is from the genus *Talaromyces*, for example *Talaromyces leycettanus*, such as the xylanase shown in amino acids 21 to 404 of SEQ ID NO: 2, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2. In an embodiment, the GH10 family xylanase is from the genus *Penicillium*, for example, *Penicillium funiculosum*, such as the xylanase shown in amino acids 20 to 407 of SEQ ID NO: 45 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 407 of SEQ ID NO: 45. In an embodiment, the xylanase is from the genus *Aspergillus*, for example *Aspergillus fumigatus*, such as the xylanase shown in SEQ ID NO: 1, or one having at least 60%, at least 65%, at least 70%, at least 75%, at least 80%, at least 85%, at least 90%, at least 95%, at least 96%, at least 97%, at least 98%, or at least 99% sequence identity to amino acids 1 to 373 of SEQ ID NO: 1. In an embodiment, the beta-xylosidase is from the genus *Aspergillus*, for example *Aspergillus fumigatus*, such as the beta-xylosidase shown in amino acids 21 to 792 of SEQ ID NO: 12, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 792 of SEQ ID NO: 12. In an embodiment, the hemicellulase comprises: (i) a xylanase from the genus *Aspergillus*, for example *Aspergillus fumigatus*, such as the xylanase shown in SEQ ID NO: 1, or one having at least 60%, at least 65%, at least 70%, at least 75%, at least 80%, at least 85%, at least 90%, at least 95%, at least 96%, at least 97%, at least 98%, or at least 99% sequence identity to amino acids 1 to 373 of SEQ ID NO: 1; and (ii) a beta-xylosidase from the genus *Aspergillus*, for example *Aspergillus fumigatus*, such as the beta-xylosidase shown in amino acids 21 to 792 of SEQ ID NO: 12, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 792 of SEQ ID NO: 12. In an embodiment, the α-glucuronidase is selected from the group consisting of a GH115 α-glucuronidase having xylan α-1,2-glucuronidase activity, a GH4 α-glucuronidase having α-glucuronidase activity, and a GH67 α-glucuronidase having xylan α-1,2-glucuronidase activity. In an embodiment, the acetylxylan esterase is from a family selected from the group consisting of CE1, CE2, CE3, CE4, CE5, CE6, CE7, CE12, CE15 and PF05448. In an embodiment, the α-L-arabinofuranosidase (also referred to herein as arabinofuranosidase) is from a glycoside hydrolase family selected from the group consisting of GH43, GH51 and GH62. In an embodiment, the GH43 α-L-arabinofuranosidase is from a subfamily selected from the group consisting of 1, 10, 11, 12, 19 21, 26, 27, 29, 35 and 36. In an embodiment, the GH43 arainofuranosidase is from the genus *Humicola*, for example *Humicola insolens*, such as the arabinofuranosidase shown in amino acids 19 to 558 of SEQ ID NO: 56 or the arabinofuranosidase shown in amino acids 24 to 575 of SEQ ID NO: 57, or one having at least 60%, at least 65%, at least 70%, at least 75%, at least 80%, at least 85%, at least 90%, at least 95%, at least 96%, at least 97%, at least 98%, or at least 99% sequence identity to amino acids 19 to 558 of SEQ ID NO: 56 or amino acids 24 to 575 of SEQ ID NO: 57. In an embodiment, the GH51 arainofuranosidase is from the genus *Golletotrichum*, for example *Colletotrichum graminicola*, such as the arabinofuranosidase shown in amino acids 20 to 663 of SEQ ID NO: 58 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 663 of SEQ ID NO: 58. In an embodiment, the GH51 arainofuranosidase is from the genus *Trametes*, for example *Trametes hirsuta*, such as the arabinofuranosidase shown in amino acids 17 to 643 of SEQ ID NO: 59 or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 643 of SEQ ID NO: 59. In an embodiment, the GH62_1 α-L-arabinofuranosidase is from the genus *Talaromyces*, for example *Talaromyces pinophilus*, such as the α-L-arabinofuranosidase (arabinofuranosidase) shown in amino acids 17 to 325 of SEQ ID NO: 11, or shown in amino acids 18 to 335 of SEQ ID NO: 55, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 325 of SEQ ID NO: 11, or amino acids 18 to 335 of SEQ ID NO: 55.

In an embodiment, the α-D-galactosidase and/or α-L-galactosidase are from a glycoside hydrolase family selected from the group consisting of GH27, GH36, GH4 and GH57_A. In an embodiment, the pectin-degrading enzyme is selected from the group consisting of an arabinase (e.g., GH43 family), a galactanase (e.g., GH53 family), a pectin acetylesterase/rhamnogalacturonan acetylesterase (e.g., CE12 family), a pectate lyase (e.g., PL1 family), a pectin lyase (e.g., PL1 family), a pectin metylesterase (e.g., CE12 family), a polygalacturonase (e.g., GH28 family), a rhamnogalacturonan hydrolase (e.g., GH28 family), a rhamnogalacturonan lyase (e.g., PL4 family), a xylogalacturonan hydrolase (e.g., GH28 family), and any combination thereof thereof.

In an embodiment, the beta-glucanase is a GH5_15 family beta-glucanase. In an embodiment, the GH5_15 family beta-glucanase is from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14. In an embodiment, the GH5_15 family beta-glucanase is from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17.

In an embodiment, the beta-glucanase is a GH16 family beta-glucanase. In an embodiment, the GH16 family beta-glucanase is from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19.

In an embodiment, the beta-glucanase is a GH64 family beta-glucanase. In an embodiment, the GH64 beta-glucanase is from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20. The beta-glucanase(s) increases the percent protein on a dry basis of the high protein feed ingredient.

In an embodiment, the enzyme blend further comprises a cellulolytic composition. In an embodiment, the cellulolytic composition is present in the blend in a ratio of hemicellulase and cellulolytic composition from about 5:95 to about 95:5, such as from 5:95, 10:90, 20:80, 25:75, 50:50, 80:20, 75:25, 90:10, and 95:5. In an embodiment, the cellulolytic composition comprises at least one, at least two, at least three, or at least four enzymes selected from the group consisting of:

(i) a cellobiohydrolase I;
(ii) a cellobiohydrolase II;
(iii) a beta-glucosidase; and
(iv) a GH61 polypeptide having cellulolytic enhancing activity. In an embodiment, the cellulolytic composition comprises at least one, at least two, at least three, or at least four enzymes selected from the group consisting of:
(i) an *Aspergillus fumigatus* cellobiohydrolase I;
(ii) an *Aspergillus fumigatus* cellobiohydrolase II;
(iii) an *Aspergillus fumigatus* beta-glucosidase; and
(iv) a *Penicillium emersonii* GH61A polypeptide having cellulolytic enhancing activity. In an embodiment, the cellulolytic composition comprises:
(i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a cellobiohydrolase II comprising amino acids 20 to 454 of SEQ ID NO: 22 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;
(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and/or
(iv) a GH61A polypeptide having cellulolytic enhancing activity comprising amino acids 26 to 253 of SEQ ID NO: 24 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24. In an embodiment, the cellulolytic composition further comprises an endoglucanase. In an embodiment, the cellulolytic composition comprises a cellobiohydrolase, a beta-glucosidase, and an endoglucanase. In an embodiment, the cellulolytic composition comprises: a cellobiohydrolase I; a beta-glucosidase; and an endoglucanase I. In an embodiment, the cellulolytic composition comprises: an *Aspergillus* cellobiohydrolase I; an *Aspergillus* beta-glucosidase; and a *Trichoderma* endoglucanase I. In an embodiment, the cellulolytic composition comprises: an *Aspergillus fumigatus* cellobiohydrolase I; an *Aspergillus fumigatus* beta-glucosidase; and a *Trichoderma reesei* endoglucanase I. In an embodiment, the cellulolytic composition comprises: (i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and/or (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids to 23 to 459 of SEQ ID NO: 44.

In an embodiment, the cellulolytic composition is derived from a strain selected from the group consisting of *Aspergillus, Penicilium, Talaromyces*, and *Trichoderma*, optionally wherein: (i) the *Aspergillus* strain is selected from the group consisting of *Aspergillus aurantiacus, Aspergillus niger* and *Aspergillus oryzae*; (ii) the *Penicilium* strain is selected from the group consisting of *Penicilium emersonii* and *Penicilium oxalicum*; (iii) the *Talaromyces* strain is selected from the group consisting of *Talaromyces aurantiacus* and *Talaromyces emersonii*; and (iv) the *Trichoderma* strain is *Trichoderma reesei*. In an embodiment, the cellulolytic composition comprises a *Trichoderma reesei* cellulolytic composition.

In an aspect, the present invention provides an enzyme blend comprising a hemicellulase for producing a high protein feed ingredient from a whole stillage byproduct produced in a process for producing a fermentation product (e.g., from a starch-containing or a cellulosic-containing material).

In an aspect, the present invention relates to the use of the enzyme blend comprising a hemicellulase for producing a high protein feed ingredient from a whole stillage byproduct produced in a process for producing a fermentation product (e.g., from a starch-containing or a cellulosic-containing material).

In an aspect, the present invention provides an enzyme blend comprising a beta-glucanase for producing a high protein feed ingredient from a whole stillage byproduct produced in a process for producing a fermentation product (e.g., from a starch-containing or a cellulosic-containing material).

In an aspect, the present invention relates to the use of the enzyme blend comprising a beta-glucanase for producing a high protein feed ingredient from a whole stillage byproduct produced in a process for producing a fermentation product (e.g., from a starch-containing or a cellulosic-containing material).

In an aspect, the present invention provides an enzyme blend comprising at least one hemicellulase and/or at least one beta-glucanase for producing a high protein feed ingredient from a whole stillage byproduct produced in a process for producing a fermentation product (e.g., from a starch-containing or a cellulosic-containing material).

In an aspect, the present invention relates to the use of the enzyme blend comprising at least one hemicellulase and/or at least one beta-glucanase for producing a high protein feed ingredient from a whole stillage byproduct produced in a process for producing a fermentation product (e.g., from a starch-containing or a cellulosic-containing material).

In an aspect, the present invention provides an enzyme blend comprising at least one hemicellulase and/or at least one beta-glucanase, and a cellulolytic composition for producing a high protein feed ingredient from a whole stillage byproduct produced in a process for producing a fermentation product (e.g., from a starch-containing or a cellulosic-containing material).

In any of the aspects described above, the at least one hemicellulase may be selected from the group consisting of the mature polypeptide of SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 53, SEQ ID NO: 54, SEQ ID NO: 55, SEQ ID NO: 56, SEQ ID NO: 57, SEQ ID NO: 58, SEQ ID NO: 59 and polypeptides having at least 60%, at least 65%, at least 70%, at least 75%, at least 80%, at least 85%, at least 90%, at least 95%, at least 96%, at least 97%, at least 98%, or at least 99% amino acid sequence identity to SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 53, SEQ ID NO: 54, SEQ ID NO: 55, SEQ ID NO: 56, SEQ ID NO: 57, SEQ ID NO: 58, or SEQ ID NO: 59; and the at least one beta-glucanase may be selected from the group consisting of the mature polypeptide of SEQ ID NO: 14, SEQ ID NO: 15, SEQ ID NO: 16, SEQ ID NO: 17, SEQ ID NO: 18, SEQ ID NO: 19, SEQ ID NO: 20, and polypeptides having at least 60%, at least 65%, at least 70%, at least 75%, at least 80%, at least 85%, at least 90%, at least 95%, at least 96%, at least 97%, at least 98%, or at least 99% amino acid sequence identity to SEQ ID NO: 14, SEQ ID NO: 15, SEQ ID NO: 16, SEQ ID NO: 17, SEQ ID NO: 18, SEQ ID NO: 19, or SEQ ID NO: 20.

In an aspect, the present invention relates to the use of the enzyme blend comprising at least one hemicellulase and/or at least one beta-glucanase, and a cellulolytic composition for producing a high protein feed ingredient from a whole stillage byproduct produced in a process for producing a fermentation product (e.g., from a starch-containing or a cellulosic-containing material).

In an aspect, the present invention relates to a composition comprising;

(a) a recombinant yeast host cell comprising a heterologous polynucleotide encoding a glucoamylase, an alpha-amylase, protease, and/or cellulase; and
(b) at least one hemicellulase and/or at least one beta-glucanase.

In one embodiment, the composition is a fermenting or fermented mash composition comprising the recombinant yeast host cell and the at least one hemicellulase and/or at least one beta-glucanase. In another embodiment, the composition is a whole stillage composition comprising the recombinant yeast host cell and the at least one hemicellulase and/or at least one beta-glucanase.

In an embodiment, the fermenting or fermented mash composition or whole stillage composition comprises:

(a) a recombinant yeast host cell comprising a heterologous polynucleotide encoding a glucoamylase, an alpha-amylase, protease, and/or cellulase; and (b) at least one hemicellulase and/or at least one beta-glucanase, wherein the at least one hemicellulase is selected from the group consisting of the mature polypeptide of SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 53, SEQ ID NO: 54, SEQ ID NO: 55, SEQ ID NO: 56, SEQ ID NO: 57, SEQ ID NO: 58, SEQ ID NO: 59 and polypeptides having at least 60%, at least 65%, at least 70%, at least 75%, at least 80%, at least 85%, at least 90%, at least 95%, at least 96%, at least 97%, at least 98%, or at least 99% amino acid sequence identity to SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 53, SEQ ID NO: 54, SEQ ID NO: 55, SEQ ID NO: 56, SEQ ID NO: 57, SEQ ID NO: 58, or SEQ ID NO: 59; and wherein the at least one beta-glucanase is selected from the group consisting of the mature polypeptide of SEQ ID NO: 14, SEQ ID NO: 15, SEQ ID NO: 16, SEQ ID NO: 17, SEQ ID NO: 18, SEQ ID NO: 19, SEQ ID NO: 20, and polypeptides having at least 60%, at least 65%, at least 70%, at least 75%, at least 80%, at least 85%, at least 90%, at least 95%, at least 96%, at least 97%, at least 98%, or at least 99% amino acid sequence identity to SEQ ID NO: 14, SEQ ID NO: 15, SEQ ID NO: 16, SEQ ID NO: 17, SEQ ID NO: 18, SEQ ID NO: 19, or SEQ ID NO: 20.

OVERVIEW OF SEQUENCE LISTING

Figure 1:
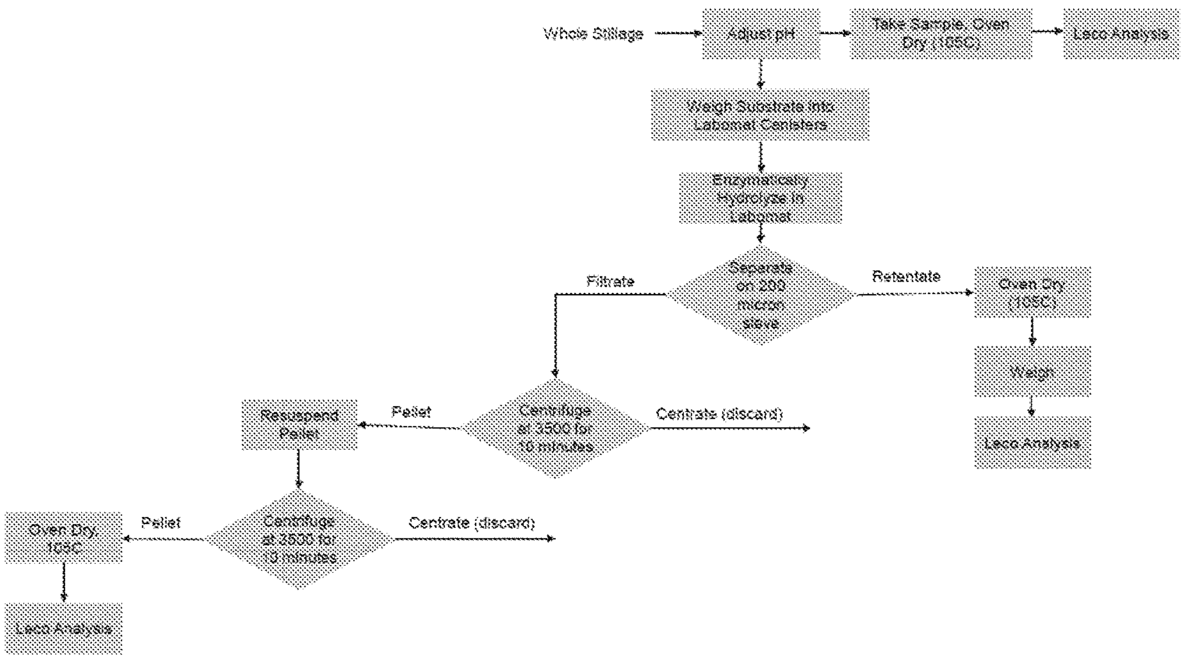
FIG. 1 is a flow diagram of an exemplary laboratory procedure used to obtain the results of the experiment described in Example 1, the results of which are shown in FIG. 2, FIG. 3 and FIG. 4.

SEQ ID NO: 1 is the amino acid sequence of a mature GH10 xylanase from *Aspergillus fumigatus.*

SEQ ID NO: 2 is the amino acid sequence of a full-length GH10 xylanase from *Talaromyces leycettanus.*

SEQ ID NO: 3 is the amino acid sequence of a full-length GH30_8 xylanase from *Bacillus subtilis.*

SEQ ID NO: 4 is the amino acid sequence of a full-length GH30_8 xylanase from *Bacillus subtilis.*

SEQ ID NO: 5 is the amino acid sequence of a full-length GH5_21 xylanase from *Chryseobacterium* sp-10696.

SEQ ID NO: 6 is the amino acid sequence of a full-length GH5_21 xylanase from *Chryseobacterium* sp-10696.

SEQ ID NO: 7 is the amino acid sequence of a full-length GH5_34 xylanase from *Acetivibrio cellulyticus.*

SEQ ID NO: 8 is the amino acid sequence of a full-length GH5_34 xylanase from *Clostridium thermocellum.*

SEQ ID NO: 9 is the amino acid sequence of a full-length GH5_35 xylanase from *Paenibacillus illinoisensis.*

SEQ ID NO: 10 is the amino acid sequence of a full-length GH5_35 xylanase from *Paenibacillus* sp.

SEQ ID NO: 11 is the amino acid sequence of a full-length GH62 arabinofuranosidase from *Talaromyces pinophilus.*

SEQ ID NO: 12 is the amino acid sequence of a full-length *Aspergillus fumigatus* beta-xylosidase.

SEQ ID NO: 13 is the amino acid sequence of a full-length *Trichoderma reesei* beta-xylosidase.

SEQ ID NO: 14 is the amino acid sequence of a full-length *Rasamsonia byssochlamydoides* beta-glucanase.

SEQ ID NO: 15 is the amino acid sequence of a full-length *Trichoderma atroviride* beta-glucanase.

SEQ ID NO: 16 is the amino acid sequence of a full-length *Trichoderma atroviride* beta-glucanase.

SEQ ID NO: 17 is the amino acid sequence of a full-length *Trichoderma harzianum* beta-glucanase.

SEQ ID NO: 18 is the amino acid sequence of a full-length *Albifimbria verrucaria* beta-glucanase.

SEQ ID NO: 19 is the amino acid sequence of a full-length *Lecanicillium* sp. VMM742 beta-glucanase.

SEQ ID NO: 20 is the amino acid sequence of a full-length *Trichoderma harzianum* beta-glucanase.

SEQ ID NO: 21 is the amino acid sequence of a full-length cellobiohydrolase I from *Aspergillus fumigatus.*

SEQ ID NO: 22 is the amino acid sequence of a full-length cellobiohydrolase II from *Aspergillus fumigatus.*

SEQ ID NO: 23 is the amino acid sequence of a full-length beta-glucosidase from *Aspergillus fumigatus.*

SEQ ID NO: 24 is the amino acid sequence of a full-length GH61 polypeptide from *Penicillium emersonii.*

SEQ ID NO: 25 is the amino acid sequence of a full-length alpha-amylase from *Bacillus stearothermophilus.*

SEQ ID NO: 26 is the amino acid sequence of a full-length GH10 xylanase from *Dictyogllomus thermophilum.*

SEQ ID NO: 27 is the amino acid sequence of a full-length GH11 xylanase from *Dictyogllomus thermophilum.*

SEQ ID NO: 28 is the amino acid sequence of a full-length GH10 xylanase from *Rasomsonia byssochlamydoides.*

SEQ ID NO: 29 is the amino acid sequence of a full-length GH10 xylanase from *Talaromyces leycettanus.*

SEQ ID NO: 30 is the amino acid sequence of a full-length GH10 xylanase from *Aspergillus fumigatus.*

SEQ ID NO: 31 is the amino acid sequence of a full-length endoglucanase from *Talaromyces leycettanus.*

SEQ ID NO: 32 is the amino acid sequence of a full-length endoglucanase from *Penicillium capsulatum.*

SEQ ID NO: 33 is the amino acid sequence of a full-length endoglucanase from *Trichophaea saccata.*

SEQ ID NO: 34 is the amino acid sequence of a full-length GH45 endoglucanase from *Sordaria fimicola.*

SEQ ID NO: 35 is the amino acid sequence of a full-length GH45 endoglucanase from *Thielavia terrestris.*

SEQ ID NO: 36 is the amino acid sequence of a full-length glucoamylase from *Penicillium oxalicum.*

SEQ ID NO: 37 is the amino acid sequence of a full-length protease from *Pyrococcus furiosus.*

SEQ ID NO: 38 is the amino acid sequence of a full-length protease from *Thermoascus aurantiacus.*

SEQ ID NO: 39 is the amino acid sequence of the *Rhizomucor pusillus* alpha-amylase with *Aspergillus niger* glucoamylase linker and starch binding domain (SBD) having the following substitutions G128D+D143N.

SEQ ID NO: 40 is the amino acid sequence of a full-length protease from *Thermobifida cellulosilytica.*

SEQ ID NO: 41 is the amino acid sequence of a full-length protease from *Thermobifida fusca.*

SEQ ID NO: 42 is the amino acid sequence of a full-length protease from *Thermobifida halotolerans.*

SEQ ID NO: 43 is the amino acid sequence of a full-length protease from *Thermococcus* nautili.

SEQ ID NO: 44 is the amino acid sequence of a full-length endoglucanase from *Trichoderma reesei.*

SEQ ID NO: 45 is the amino acid sequence of a full-length xylanase from *Penicillium funiculosum.*

SEQ ID NO: 46 is the amino acid sequence of a trehalase from *Myceliophthora sepedonium.*

SEQ ID NO: 47 is the amino acid sequence of a trehalase from *Talaromyces funiculosus.*

SEQ ID NO: 48 is the amino acid sequence of a glucoamylase from *Trametes* cingulate.

SEQ ID NO: 49 is the amino acid sequence of a glucoamylase from *Talaromyces* emersonii.

SEQ ID NO: 50 is the amino acid sequence of a glucoamylase from *Pycnoporus sanguineus.*

SEQ ID NO: 51 is the amino acid sequence of a glucoamylase from *Gloeophyllum sepiarium.*

SEQ ID NO: 52 is the amino acid sequence of a glucoamylase from *Gloeophyllum trabeum.*

SEQ ID NO: 53 is the amino acid sequence of a GH5_34 family xylanase from *Gonapodya prolifera.*

SEQ ID NO: 54 is the amino acid sequence of a mature GH5_35 xylanase from *Paenibacillus favisporus.*

SEQ ID NO: 55 is the amino acid sequence of a full-length GH62 arabinofuranosidase from *Talaromyces pinophilus.*

SEQ ID NO: 56 is the amino acid sequence of a full-length GH43 arabinofuranosidase from *Humicola insolens.*

SEQ ID NO: 57 is the amino acid sequence of a full-length GH43 arabinofuranosidase from *Humicola insolens.*

SEQ ID NO: 58 is the amino acid sequence of a full-length GH51 arabinofuranosidase from *Colletotrichum graminicola*

SEQ ID NO: 59 is the amino acid sequence of a full-length GH51 arabinofuranosidase from *Trametes* hirsute

Definitions

Allelic variant: The term "allelic variant" means any of two or more alternative forms of a gene occupying the same chromosomal locus. Allelic variation arises naturally through mutation, and may result in polymorphism within populations. Gene mutations can be silent (no change in the encoded polypeptide) or may encode polypeptides having altered amino acid sequences. An allelic variant of a polypeptide is a polypeptide encoded by an allelic variant of a gene.

Acetylxylan esterase: The term "acetylxylan esterase" means a carboxylesterase (EC 3.1.1.72) that catalyzes the hydrolysis of acetyl groups from polymeric xylan, acetylated xylose, acetylated glucose, alpha-napthyl acetate, and p-nitrophenyl acetate. For purposes of the present invention, acetylxylan esterase activity is determined using 0.5 mM p-nitrophenylacetate as substrate in 50 mM sodium acetate pH 5.0 containing 0.01 percent TWEEN™ 20 (polyoxyethylene sorbitan monolaurate). One unit of acetylxylan esterase is defined as the amount of enzyme capable of releasing 1 pmole of p-nitrophenolate anion per minute at pH 5, 25 degrees centigrade.

Alpha-L-arabinofuranosidase: The term "alpha-L-arabinofuranosidase" means an alpha-L-arabinofuranoside arabinofuranohydrolase (EC 3.2.1.55) that catalyzes the hydrolysis of terminal non-reducing alpha-L-arabinofuranoside residues in alpha-L-arabinosides. The enzyme acts on alpha-L-arabinofuranosides, alpha-L-arabinans containing (1,3)- and/or (1,5)-linkages, arabinoxylans, and arabinogalactans. Alpha-L-arabinofuranosidase is also known as arabinofuranosidase, alpha-arabinofuranosidase, alpha-L-arabinofuranosidase, alpha-arabinofuranosidase, polysaccharide alpha-L-arabinofuranosidase, alpha-L-arabinofuranoside hydrolase, L-arabinofuranosidase, or alpha-L-arabinanase. For purposes of the present invention, alpha-L-arabinofuranosidase activity is determined using 5 mg of medium viscosity wheat arabinoxylan (Megazyme International Ireland, Ltd., Bray, Co. Wicklow, Ireland) per ml of 100 mM sodium acetate pH 5 in a total volume of 200 micro ? for 30 minutes at 40 degrees centigrade followed by arabinose analysis by AMINEX® HPX-87H column chromatography (Bio-Rad Laboratories, Inc., Hercules, CA, USA).

Alpha-galactosidase: The term "alpha-galactosidase", also called α-D-galactoside galactohydrolase (E.C. 3.2.1.22), means an enzyme that catalyses the hydrolysis of terminal, non-reducing α-D-galactose residues in α-D-galactosides, such as galactose oligosaccharides, galactomannans and galactolipids. Alpha-galactosidase activity can be determined using 4-nitrophenyl oD-galactopyranoside (available from Megazyme International, Bray, Co. Wicklow, Ireland) as substrate in 100 mM MES (Sigma) buffer pH 7.0 plus or minus 0.05 at room temperature. The enzyme is diluted in 2-fold dilutions and then the 4-nitrophenyl oD-galactopyranoside substrate is dissolved in the solution containing the enzyme. The alpha-galactosidase activity is followed directly in the buffer by measuring the absorbance of released pNP at 405 nm as function of time. A detailed assay can be found in the alpha-galactosidase assay as described in WO17202966A1 (incorporated herein by reference in its entirety).

Alpha-glucuronidase: The term "alpha-glucuronidase" means an alpha-D-glucosiduronate glucuronohydrolase (EC 3.2.1.139) that catalyzes the hydrolysis of an alpha-D-glucuronoside to D-glucuronate and an alcohol. For purposes of the present invention, alpha-glucuronidase activity is determined according to de Vries, 1998, J. Bacteriol. 180: 243-249. One unit of alpha-glucuronidase equals the amount of enzyme capable of releasing 1 pmole of glucuronic or 4-0-methylglucuronic acid per minute at pH 5, 40 degrees centigrade Beta-glucosidase:

Alpha-Amylases (alpha-1,4-glucan-4-glucanohydrolases, EC 3.2.1.1) are a group of enzymes, which catalyze the hydrolysis of starch and other linear and branched 1,4-glucosidic oligo- and polysaccharides.

Animal: The term "animal" refers to all animals except humans. Examples of animals are non-ruminants, and ruminants. Ruminant animals include, for example, animals such as sheep, goats, cattle, e.g., beef cattle, cows, and young calves, deer, yank, camel, llama and kangaroo. Non-ruminant animals include mono-gastric animals, e.g., pigs or swine (including, but not limited to, piglets, growing pigs, and sows); poultry such as turkeys, ducks and chicken (including but not limited to broiler chicks, layers); horses (including but not limited to hotbloods, coldbloods and warm bloods), young calves; fish (including but not limited to amberjack, arapaima, barb, bass, bluefish, bocachico, bream, bullhead, cachama, carp, catfish, catla, chanos, char, cichlid, cobia, cod, crappie, dorada, drum, eel, goby, goldfish, gourami, grouper, guapote, halibut, java, labeo, lai, loach, mackerel, milkfish, mojarra, mudfish, mullet, paco, pearlspot, pejerrey, perch, pike, pompano, roach, salmon, sampa, sauger, sea bass, seabream, shiner, sleeper, snakehead, snapper, snook, sole, spinefoot, sturgeon, sunfish, sweetfish, tench, terror, tilapia, trout, tuna, turbot, vendace, walleye and whitefish); and crustaceans (including but not limited to shrimps and prawns).

Animal feed: The term "animal feed" refers to any compound, preparation, or mixture suitable for, or intended for intake by an animal. Animal feed for a mono-gastric animal typically comprises concentrates as well as vitamins, minerals, enzymes, direct fed microbial, amino acids and/or other feed ingredients (such as in a premix) whereas animal feed for ruminants generally comprises forage (including roughage and silage) and may further comprise concentrates as well as vitamins, minerals, enzymes direct fed microbial, amino acid and/or other feed ingredients (such as in a premix).

Beta-glucanase: The term "beta-glucanase" encompasses polypeptides having beta-1,6-glucanase activity and/or exo- and/or -endo beta-1,3-glucanase activity. As used herein, "polypeptide having beta-1,6-glucanase activity and/or exo- and/or -endo beta-1,3-glucanase activity" means that the polypeptide exhibits at least one of these activities, but may also possess any combination of these activities, including all the activities. The term "exo- and/or -endo beta-1,3-glucanase" encompasses polypeptides that have either exo- and/or -endo beta-1,3-glucanase activity, both exo- and/or -endo beta-1,3-glucanase activities, as well as polypeptides having mixed beta-1,3(4) and/or beta 1,4(3)-glucanase activities. Preferably, the polypeptides having beta-1,6-glucanase activity and/or exo- and/or -endo beta-1,3-glucanase activity are members of a glycoside hydrolase family selected from GH5, for instance GH5_15, GH16, and GH64.

In one aspect, "beta-glucanase" means polypeptides having beta-1,6-glucanase activity referred to as 6-β-D-glucan glucanohydrolase (EC 3.2.1.75) that catalyze the random hydrolysis of (1→6)-linkages in (1→6)-β-D-glucans. In addition to acting on 1,6-oligo-beta-D-glucosides, members of this family of enzymes also act on lutean and pustulan. These beta-glucanases include members of the GH5_15 family. For purposes of the present invention, beta-1,6-glucanase activity is determined according to the procedure described in the Examples. In another aspect, "beta-glucanase" means polypeptides having beta-1,3-glucanase referred to as 3-β-D-glucan glucanohydrolases (EC 3.2.1.39), endo-1,3(4)-beta-glucanases (EC 3.2.1.6), or 3-β-D-glucan glucohydrolases (EC 3.2.1.58). 3-β-D-glucan glucanohydrolases (EC 3.2.1.39) catalyze the hydrolysis of (1→3)-β-D-glucosidic linkages in (1→3)-β-D-glucans. In addition to having some activity on mixed-link (1→3,1→4)-β-D-glucans, members of this family of enzymes also act on laminarin, paramylon and pachyman. Endo-1,3(4)-beta-glucanases (EC 3.2.1.6) catalyze the endohydrolysis of (1→3)- or (1→4)-linkages in β-D-glucans when the glucose residue whose reducing group is involved in the linkage to be hydrolysed is itself substituted at C-3. Members of this class may act laminarin, lichenin and cereal D-glucans. 3-β-D-glucan glucohydrolases (EC 3.2.1.58) catalyze the successive hydrolysis of beta-D-glucose units from the non-reducing ends of (1→3)-β-D-glucans, releasing alpha-glucose. Members of this class act on oligosaccharides, and on laminaribiose. These beta-glucanases include members of the GH16 and GH64 families. For purposes of the present invention, beta-1,3-glucanase activity is determined according to the procedure described in the Materials & Methods section.

Beta-glucosidase: The term "beta-glucosidase" means a beta-D-glucoside glucohydrolase (E.C. 3.2.1.21) that catalyzes the hydrolysis of terminal non-reducing beta-D-glucose residues with the release of beta-D-glucose. For purposes of the present invention, beta-glucosidase activity is determined using p-nitrophenyl-beta-D-glucopyranoside as substrate according to the procedure of Venturi et al., 2002, Extracellular beta-D-glucosidase from *Chaetomium thermophilum* var. *coprophilum*: production, purification and some biochemical properties, *J. Basic Microbiol.* 42: 55-66. One unit of beta-glucosidase is defined as 1.0 μmole of p-nitrophenolate anion produced per minute at 25° C., pH 4.8 from 1 mM p-nitrophenyl-beta-D-glucopyranoside as substrate in 50 mM sodium citrate containing 0.01% TWEEN® 20 (polyoxyethylene sorbitan monolaurate).

Beta-xylosidase: The term "beta-xylosidase" means a beta-D-xyloside xylohydrolase (E.C. 3.2.1.37) that catalyzes the exo-hydrolysis of short beta (1-4)-xylooligosaccharides to remove successive D-xylose residues from non-reducing termini. For purposes of the present invention, one unit of beta-xylosidase is defined as 1.0 μmole of p-nitrophenolate anion produced per minute at 40 degrees centigrade, pH 5 from 1 mM p-nitrophenyl-beta-D-xyloside as substrate in 100 mM sodium citrate containing 0.01 percent TWEEN® 20.

cDNA: The term "cDNA" means a DNA molecule that can be prepared by reverse transcription from a mature, spliced, mRNA molecule obtained from a eukaryotic or prokaryotic cell. cDNA lacks intron sequences that may be present in the corresponding genomic DNA. The initial, primary RNA transcript is a precursor to mRNA that is processed through a series of steps, including splicing, before appearing as mature spliced mRNA.

Cellobiohydrolase: The term "cellobiohydrolase" means a 1,4-beta-D-glucan cellobiohydrolase (E.C. 3.2.1.91) that catalyzes the hydrolysis of 1,4-beta-D-glucosidic linkages in cellulose, cellooligosaccharides, or any beta-1,4-linked glucose containing polymer, releasing cellobiose from the reducing or non-reducing ends of the chain (Teeri, 1997, Crystalline cellulose degradation: New insight into the function of cellobiohydrolases, Trends in Biotechnology 15: 160-167; Teeri et al., 1998, *Trichoderma reesei* cellobiohydrolases: why so efficient on crystalline cellulose?, *Biochem. Soc. Trans.* 26: 173-178).

Cellobiohydrolase activity is determined according to the procedures described by Lever et al., 1972, *Anal. Biochem.* 47: 273-279; van Tilbeurgh et al., 1982, *FEBS Letters,* 149: 152-156; van Tilbeurgh and Claeyssens, 1985, *FEBS Letters,* 187: 283-288; and Tomme et al., 1988, *Eur. J. Biochem.* 170: 575-581. In the present invention, the Tomme et al. method can be used to determine cellobiohydrolase activity.

Cellulolytic enzyme, cellulolytic composition, or cellulase: The term "cellulolytic enzyme", "cellulolytic composition", or "cellulase" means one or more (e.g., several) enzymes that hydrolyze a cellulosic material. Such enzymes include endoglucanase(s), cellobiohydrolase(s), beta-glucosidase(s), or combinations thereof. The two basic approaches for measuring cellulolytic activity include: (1) measuring the total cellulolytic activity, and (2) measuring the individual cellulolytic activities (endoglucanases, cellobiohydrolases, and beta-glucosidases) as reviewed in Zhang et al., Outlook for cellulase improvement: Screening and selection strategies, 2006, *Biotechnology Advances* 24: 452-481. Total cellulolytic activity is usually measured using insoluble substrates, including Whatman No1 filter paper, microcrystalline cellulose, bacterial cellulose, algal cellulose, cotton, pretreated lignocellulose, etc. The most common total cellulolytic activity assay is the filter paper assay using Whatman No1 filter paper as the substrate. The assay was established by the International Union of Pure and Applied Chemistry (IUPAC) (Ghose, 1987, Measurement of cellulase activities, *Pure Appl. Chem.* 59: 257-68).

Cellulolytic enzyme activity is determined by measuring the increase in hydrolysis of a cellulosic material by cellulolytic enzyme(s) under the following conditions: 1-50 mg of cellulolytic enzyme protein/g of cellulose in Pretreated Corn Stover ("PCS") (or other pretreated cellulosic material) for 3-7 days at a suitable temperature, e.g., 50° C., 55° C., or 60° C., compared to a control hydrolysis without addition of cellulolytic enzyme protein. Typical conditions are 1 ml reactions, washed or unwashed PCS, 5% insoluble solids, 50 mM sodium acetate pH 5, 1 mM $MnSO_4$, 50° C., 55° C., or 60° C., 72 hours, sugar analysis by AMINEX® HPX-87H column (Bio-Rad Laboratories, Inc., Hercules, CA, USA).

Coding sequence: The term "coding sequence" means a polynucleotide, which directly specifies the amino acid sequence of a variant. The boundaries of the coding sequence are generally determined by an open reading frame, which begins with a start codon such as ATG, GTG or TTG and ends with a stop codon such as TAA, TAG, or TGA. The coding sequence may be a genomic DNA, cDNA, synthetic DNA, or a combination thereof.

Control sequences: The term "control sequences" means nucleic acid sequences necessary for expression of a polynucleotide encoding a variant of the present invention. Each control sequence may be native (i.e., from the same gene) or foreign (i.e., from a different gene) to the polynucleotide encoding the variant or native or foreign to each other. Such control sequences include, but are not limited to, a leader, polyadenylation sequence, propeptide sequence, promoter, signal peptide sequence, and transcription terminator. At a minimum, the control sequences include a promoter, and transcriptional and translational stop signals. The control sequences may be provided with linkers for the purpose of introducing specific restriction sites facilitating ligation of the control sequences with the coding region of the polynucleotide encoding a variant.

Endoglucanase: The term "endoglucanase" means an endo-1,4-(1,3;1,4)-beta-D-glucan 4-glucanohydrolase (E.C. 3.2.1.4) that catalyzes endohydrolysis of 1,4-beta-D-glycosidic linkages in cellulose, cellulose derivatives (such as carboxymethyl cellulose and hydroxyethyl cellulose), lichenin, beta-1,4 bonds in mixed beta-1,3 glucans such as cereal beta-D-glucans or xyloglucans, and other plant material containing cellulosic components. Endoglucanase activity can be determined by measuring reduction in substrate viscosity or increase in reducing ends determined by a reducing sugar assay (Zhang et al., 2006, *Biotechnology Advances* 24: 452-481). For purposes of the present invention, endoglucanase activity is determined using carboxymethyl cellulose (CMC) as substrate according to the procedure of Ghose, 1987, *Pure and Appl. Chem.* 59: 257-268, at pH 5, 40° C.

Expression: The term "expression" includes any step involved in the production of a variant including, but not limited to, transcription, post-transcriptional modification, translation, post-translational modification, and secretion.

Expression vector: The term "expression vector" means a linear or circular DNA molecule that comprises a polynucleotide encoding a variant and is operably linked to control sequences that provide for its expression.

Family 61 glycoside hydrolase: The term "Family 61 glycoside hydrolase" or "Family GH61" or "GH61" means a polypeptide falling into the glycoside hydrolase Family 61 according to Henrissat B., 1991, A classification of glycosyl hydrolases based on amino-acid sequence similarities, *Biochem. J.* 280: 309-316, and Henrissat B., and Bairoch A., 1996, Updating the sequence-based classification of glycosyl hydrolases, *Biochem. J.* 316: 695-696. The enzymes in this family were originally classified as a glycoside hydrolase family based on measurement of very weak endo-1,4-beta-D-glucanase activity in one family member. The structure and mode of action of these enzymes are non-canonical and they cannot be considered as bona fide glycosidases. However, they are kept in the CAZy classification on the basis of their capacity to enhance the breakdown of lignocellulose when used in conjunction with a cellulase or a mixture of cellulases.

Fragment: The term "fragment" means a polypeptide having one or more (e.g., several) amino acids absent from the amino and/or carboxyl terminus of a mature polypeptide main; wherein the fragment has enzyme activity. In one aspect, a fragment contains at least 85%, e.g., at least 90% or at least 95% of the amino acid residues of the mature polypeptide of an enzyme.

Glucoamylases (glucan 1,4-alpha-glucosidase, EC 3.2.1.3) are a group of enzymes, which catalyze the hydrolysis of terminal (1→4)-linked α-D-glucose residues successively from non-reducing ends of the chains with release of beta-D-glucose.

Hemicellulolytic enzyme or hemicellulase: The term "hemicellulolytic enzyme" or "hemicellulase" means one or more (e.g., several) enzymes that hydrolyze a hemicellulosic material. See, for example, Shallom and Shoham, 2003, Microbial hemicellulases, *Current Opinion In Microbiology* 6(3): 219-228. Hemicellulases are key components in the degradation of plant biomass. Examples of hemicellulases include, but are not limited to, an acetylmannan esterase, an acetyxylan esterase, an arabinanase, an arabinofuranosidase, a coumaric acid esterase, a feruloyl esterase, a galactosidase, a glucuronidase, a glucuronoyl esterase, a mannanase, a mannosidase, a xylanase, and a xylosidase. The substrates of these enzymes, the hemicelluloses, are a heterogeneous group of branched and linear polysaccharides that are bound via hydrogen bonds to the cellulose microfibrils in the plant cell wall, crosslinking them into a robust network. Hemicelluloses are also covalently attached to lignin, forming together with cellulose a highly complex structure. The variable structure and organization of hemicelluloses require the concerted action of many enzymes for its complete degradation. The catalytic modules of hemicellulases are either glycoside hydrolases (GHs) that hydrolyze glycosidic bonds, or carbohydrate esterases (CEs), which hydrolyze ester linkages of acetate or ferulic acid side groups. These catalytic modules, based on homology of their primary sequence, can be assigned into GH and CE families marked by numbers. Some families, with overall similar fold, can be further grouped into clans, marked alphabetically (e.g., GH-A). An informative and updated classification of these and other carbohydrate active enzymes is available on the Carbohydrate-Active Enzymes (CAZy) database. Hemicellulolytic enzyme activities can be measured according to Ghose and Bisaria, 1987, *Pure & Appl. Chern.* 59: 1739-1752, at a suitable temperature, e.g., 50° C., 55° C., or 60° C.

In one embodiment, the hemicellulase comprises a commercial hemicellulolytic enzyme preparation. Examples of commercial hemicellulolytic enzyme preparations suitable for use in the present invention include, for example, SHEARZYME® (Novozymes A/S), CELLIC® HTec (Novozymes A/S), CELLIC® HTec2 (Novozymes A/S), VISCOZYME® (Novozymes A S), ULTRAFLO® (Novozymes A/S), PULPZYME® HC (Novozymes A/S), MULTIFECT® Xylanase (Genencor), ACCELLERASE® XY (Genencor), ACCELLERASE® XC (Genencor), ECOPULP® TX-200A (AB Enzymes), HSP 6000 Xylanase (DSM), DEPOL™ 333P (Biocatalysts Limit, Wales, UK), DEPOL™ 740L. (Biocatalysts Limit, Wales, UK), and DEPOL™ 762P (Biocatalysts Limit, Wales, UK).

Host cell: The term "host cell" means any cell type that is susceptible to transformation, transfection, transduction, or the like with a nucleic acid construct or expression vector comprising a polynucleotide of the present invention. The term "host cell" encompasses any progeny of a parent cell that is not identical to the parent cell due to mutations that occur during replication.

Isolated: The term "isolated" means a substance in a form or environment which does not occur in nature. Non-limiting examples of isolated substances include (1) any non-naturally occurring substance, (2) any substance including, but not limited to, any enzyme, variant, nucleic acid, protein, peptide or cofactor, that is at least partially removed from one or more or all of the naturally occurring constituents with which it is associated in nature; (3) any substance modified by the hand of man relative to that substance found in nature; or (4) any substance modified by increasing the amount of the substance relative to other components with which it is naturally associated (e.g., multiple copies of a gene encoding the substance; use of a stronger promoter than the promoter naturally associated with the gene encoding the substance). An isolated substance may be present in a fermentation broth sample.

Mature polypeptide: The term "mature polypeptide" means a polypeptide in its final form following translation and any post-translational modifications, such as N-terminal processing, C-terminal truncation, glycosylation, phosphorylation, etc. In one aspect, the mature polypeptide of an *Aspergillus fumigatus* xylanase is amino acids 20 to 397 of SEQ ID NO: 1. Amino acids 1 to 19 of SEQ ID NO: 1 are a signal peptide. In one aspect, the mature polypeptide of a *Talaromyces leycettanus* xylanase is amino acids 21 to 405 of SEQ ID NO: 2. Amino acids 1 to 20 of SEQ ID NO: 2 are a signal peptide. In one aspect, the mature polypeptide of a *Bacillus subtilis* xylanase is amino acids 28 to 417 of SEQ ID NO: 3. Amino acids 1 to 27 of SEQ ID NO: 3 are a signal peptide. In one aspect, the mature polypeptide of a *Bacillus subtilis* xylanase is amino acids 28 to 417 of SEQ ID NO: 4. Amino acids 1 to 27 of SEQ ID NO: 4 are a signal peptide. In one aspect, the mature polypeptide of a *Chryseobacterium* sp-10696 xylanase is amino acids 25 to 551 of SEQ ID NO: 5. Amino acids 1 to 19 of SEQ ID NO: 5 are a signal peptide. In one aspect, the mature polypeptide of a *Chryseobacterium* sp-10696 xylanase is amino acids 25 to 551 of SEQ ID NO: 6. Amino acids 1 to 24 of SEQ ID NO: 6 are a signal peptide. In one aspect, the mature polypeptide of an *Acetivibrio cellulyticus* xylanase is SEQ ID NO: 7. In one aspect, the mature polypeptide of a *Clostridium thermocellum* xylanase is SEQ ID NO: 8. In one aspect, the mature polypeptide of a *Paenibacillus illinoisensis* xylanase is amino acids 37 to 573 of SEQ ID NO: 9. Amino acids 1 to 36 of SEQ ID NO: 9 are a signal peptide. In one aspect, the mature polypeptide of a *Paenibacillus* sp. xylanase is amino acids 36 to 582 of SEQ ID NO: 10. Amino acids 1 to 35 of SEQ ID NO: 10 are a signal peptide. In one aspect, the mature polypeptide of a *Talaromyces pinophilus* arabinofuranosidase is amino acids 17 to 325 of SEQ ID NO: 11. Amino acids 1 to 16 of SEQ ID NO: 11 are a signal peptide. In one aspect, the mature polypeptide of an *Aspergillus fumigatus* beta-xylosidase is amino acids 21 to 792 of SEQ ID NO: 12. Amino acids 1 to 20 of SEQ ID NO: 12 are a signal peptide. In one aspect, the mature polypeptide of a *Trichoderma reesei* beta-xylosidase is amino acids 20 to 780 of SEQ ID NO: 13. Amino acids 1 to 19 of SEQ ID NO: 13 are a signal peptide. In one aspect, the mature polypeptide of a *Rasamsonia byssochlamydoides* beta-glucanase is amino acids 20 to 413 of SEQ ID NO: 14. Amino acids 1 to 19 of SEQ ID NO: 14 are a signal peptide. In one aspect, the mature polypeptide of a *Trichoderma atroviride* beta-glucanase is amino acids 17 to 408 of SEQ ID NO: 15. Amino acids 1 to 16 of SEQ ID NO: 15 are a signal peptide. In one aspect, the mature polypeptide of a *Trichoderma atroviride* beta-glucanase is amino acids 18 to 429 of SEQ ID NO: 16. Amino acids 1 to 17 of SEQ ID NO: 16 are a signal peptide. In one aspect, the mature polypeptide of a *Trichoderma harzianum* beta-glucanase is amino acids 18 to 429 of SEQ ID NO: 17. Amino acids 1 to 17 of SEQ ID NO: 17 are a signal peptide. In one aspect, the mature polypeptide of an *Albifimbria verrucaria* beta-glucanase is amino acids 20 to 286 of SEQ ID NO: 18. Amino acids 1 to 19 of SEQ ID NO: 18 are a signal peptide. In one aspect, the mature polypeptide of a *Lecanicillium* sp. WMM742 beta-glucanase is amino acids 20 to 284 of SEQ ID NO: 19. Amino acids 1 to 19 of SEQ ID NO: 19 are a signal peptide. In one aspect, the mature polypeptide of a *Trichoderma harzianum* beta-glucanase is amino acids 64 to 447 of SEQ ID NO: 20. Amino acids 1 to 16 of SEQ ID NO: 20 are a signal peptide. In one aspect, the mature polypeptide of an *A. fumigatus* cellobiohydrolase I is amino acids 27 to 532 of SEQ ID NO: 21. Amino acids 1 to 26 of SEQ ID NO: 21 are a signal peptide. In another aspect, the mature polypeptide of an *A. fumigates* cellobiohydrolase II is amino acids 20 to 454 of SEQ ID NO: 22. Amino acids 1 to 19 of SEQ ID NO: 22 are a signal peptide. In another aspect, the mature polypeptide of an *A. fumigatus* beta-glucosidase is amino acids 20 to 863 of SEQ ID NO: 23. Amino acids 1 to 19 of SEQ ID NO: 23 are a signal peptide. In another aspect, the mature polypeptide of a *Penicillium* sp. GH61 polypeptide is amino acids 26 to 253 of SEQ ID NO: 24. Amino acids 1 to 25 of SEQ ID NO: 24 are a signal peptide. In another aspect, the mature polypeptide of a *Gonapodya porlifera* polypeptide is amino acids 24 to 337 of SEQ ID NO: 53. Amino acids 1 to 23 of SEQ ID NO: 53 are a signal peptide. In another aspect, the mature polypeptide of a *Paenibacillus favisporus* polypeptide is amino acids 1 to 536 of SEQ ID NO: 54. In another aspect, the mature polypeptide of a *Talaromyces pinophilus* polypeptide is amino acids 18 to 335 of SEQ ID NO: 55. Amino acids 1 to 17 of SEQ ID NO: 55 are a signal peptide. In another aspect, the mature polypeptide of a *Humicola insolens* arabinofuranosidase is amino acids 19 to 558 of SEQ ID NO: 56. Amino acids 1 to 18 of SEQ ID NO: 56 are a signal peptide. In another aspect, the mature polypeptide of a *Humicola insolens* arabinofuranosidase is amino acids 24 to 575 of SEQ ID NO: 57. Amino acids 1 to 23 of SEQ ID NO: 57 are a signal peptide. In another aspect, the mature polypeptide of a *Colletotrichum graminicola* arabinofuranosidase is amino acids 20 to 663 of SEQ ID NO: 58. Amino acids 1 to 19 of SEQ ID NO: 58 are a signal peptide. In another aspect, the mature polypeptide of a *Trametes hirsuta* arabinofuranosidase is amino acids 17 to 643 of SEQ ID NO: 59. Amino acids 1 to 16 of SEQ ID NO: 59 are a signal peptide.

It is known in the art that a host cell may produce a mixture of two of more different mature polypeptides (i.e., with a different C-terminal and/or N-terminal amino acid) expressed by the same polynucleotide. It is also known in the art that different host cells process polypeptides differently, and thus, one host cell expressing a polynucleotide may produce a different mature polypeptide (e.g., having a different C-terminal and/or N-terminal amino acid) as compared to another host cell expressing the same polynucleotide.

Mature polypeptide coding sequence: The term "mature polypeptide coding sequence" means a polynucleotide that encodes a mature polypeptide.

Mutant: The term "mutant" means a polynucleotide encoding a variant.

Nucleic acid construct: The term "nucleic acid construct" means a nucleic acid molecule, either single- or double-stranded, which is isolated from a naturally occurring gene or is modified to contain segments of nucleic acids in a manner that would not otherwise exist in nature or which is synthetic, which comprises one or more control sequences.

Operably linked: The term "operably linked" means a configuration in which a control sequence is placed at an appropriate position relative to the coding sequence of a polynucleotide such that the control sequence directs expression of the coding sequence.

Polypeptide having cellulolytic enhancing activity: The term "polypeptide having cellulolytic enhancing activity" means a GH61 polypeptide that catalyzes the enhancement of the hydrolysis of a cellulosic material by enzyme having cellulolytic activity. For purposes of the present invention, cellulolytic enhancing activity is determined by measuring the increase in reducing sugars or the increase of the total of cellobiose and glucose from the hydrolysis of a cellulosic material by cellulolytic enzyme under the following conditions: 1-50 mg of total protein/g of cellulose in PCS, wherein total protein is comprised of 50-99.5% w/w cellulolytic enzyme protein and 0.5-50% w/w protein of a GH61 polypeptide having cellulolytic enhancing activity for 1-7 days at a suitable temperature, e.g., 50° C., 55° C., or 60° C., and pH, e.g., 5.0 or 5.5, compared to a control hydrolysis with equal total protein loading without cellulolytic enhancing activity (1-50 mg of cellulolytic protein/g of cellulose in PCS). In an aspect, a mixture of CELLUCLAST® 1.5L (Novozymes A/S, Bagsværd, Denmark) in the presence of 2-3% of total protein weight *Aspergillus oryzae* beta-glucosidase (recombinantly produced in *Aspergillus oryzae* according to WO 02/095014) or 2-3% of total protein weight *Aspergillus fumigatus* beta-glucosidase (recombinantly produced in *Aspergillus oryzae* as described in WO 2002/095014) of cellulase protein loading is used as the source of the cellulolytic activity.

The GH61 polypeptide having cellulolytic enhancing activity enhance the hydrolysis of a cellulosic material catalyzed by enzyme having cellulolytic activity by reducing the amount of cellulolytic enzyme required to reach the same degree of hydrolysis preferably at least 1.01-fold, e.g., at least 1.05-fold, at least 1.10-fold, at least 1.25-fold, at least 1.5-fold, at least 2-fold, at least 3-fold, at least 4-fold, at least 5-fold, at least 10-fold, or at least 20-fold.

Pretreated corn stover: The term "Pretreated Corn Stover" or "PCS" means a cellulosic-containing material derived from corn stover by treatment with heat and dilute sulfuric acid, alkaline pretreatment, neutral pretreatment, or any pretreatment known in the art.

Sequence identity: The relatedness between two amino acid sequences or between two nucleotide sequences is described by the parameter "sequence identity". For purposes of the present invention, the sequence identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), e.g., version 5.0.0 or later. The parameters used are gap open penalty of 10, gap extension penalty of 0.5, and the EBLOSUM62 (EMBOSS version of BLOSUM62) substitution matrix. The output of Needle labeled "longest identity" (obtained using the –nobrief option) is used as the percent identity and is calculated as follows: (Identical Residues×100)/(Length of Alignment–Total Number of Gaps in Alignment) For purposes of the present invention, the sequence identity between two deoxyribonucleotide sequences is determined using the Needleman-Wunsch algorithm (Needleman and Wunsch, 1970, supra) as implemented in the Needle program of the EMBOSS package (EMBOSS: The European Molecular Biology Open Software Suite, Rice et al., 2000, supra), e.g., version 5.0.0 or later. The parameters used are gap open penalty of 10, gap extension penalty of 0.5, and the EDNAFULL (EMBOSS version of NCBI NUC4.4) substitution matrix. The output of Needle labeled "longest identity" (obtained using the –nobrief option) is used as the percent identity and is calculated as follows: (Identical Deoxyribonucleotides×100)/(Length of Alignment–Total Number of Gaps in Alignment)

Trehalase: The term "trehalase" means an enzyme which degrades trehalose into its unit monosaccharides (i.e., glucose). Trehalases are classified in EC 3.2.1.28 (alpha,alpha-trehalase) and EC. 3.2.1.93 (alpha,alpha-phosphotrehalase). The EC classes are based on recommendations of the Nomenclature Committee of the International Union of Biochemistry and Molecular Biology (IUBMB). Description of EC classes can be found on the internet, e.g., on "www.expasy.orq/enzyme/". Trehalases are enzymes that catalyze the following reactions:

EC 3.2.1.28:

Alpha,alpha-trehalose+$H_2O$⇔2 D-glucose;

EC 3.2.1.93:

Alpha,alpha-trehalose 6-phosphate+$H_2O$⇔-glucose+D-glucose 6-phosphate.

For purposes of the present invention, trehalase activity may be determined according to the trehalase assay procedure described below.

Principle:

Trehalose+$H_2O \xrightarrow{Trehalase}$2 Glucose

T=37° C., pH=5.7, A340 nm, Light path=1 cm

Spectrophotometric Stop Rate Determination

Unit Definition:

One unit will convert 1.0 mmole of trehalose to 2.0 mmoles of glucose per minute at pH 5.7 at 37° C. (liberated glucose determined at pH 7.5). (See Dahlqvist, A. (1968) Analytical Biochemistry 22, 99-107)

Variant: The term "variant" means a polypeptide having enzyme or enzyme enhancing activity comprising an alteration, i.e., a substitution, insertion, and/or deletion, at one or more (e.g., several) positions. A substitution means replacement of the amino acid occupying a position with a different amino acid; a deletion means removal of the amino acid occupying a position; and an insertion means adding an amino acid adjacent to and immediately following the amino acid occupying a position. As used herein, a "variant thereof," when used in reference to a presently disclosed enzyme, refers to a variant enzyme having an amino acid sequence that is at least 60%, at least 65%, at least 70%, at least 75%, at least 80%, at least 85%, at least 90%, at least 95%, at least 96%, at least 97%, at least 98%, or at least 99% identical to the amino acid sequence of that enzyme.

Wild-type xylanase: The term "wild-type" xylanase means a xylanase expressed by a naturally occurring microorganism, such as a bacterium, yeast, or filamentous fungus found in nature.

Xylanase: The term "xylanase" means a glucuronoarabinoxylan endo-1,4-beta-xylanase (E.C. 3.2.1.136) that catalyses the endohydrolysis of 1,4-beta-D-xylosyl links in some glucuronoarabinoxylans. Xylanase activity can be determined with 0.2% AZCL-glucuronoxylan as substrate in 0.01% TRITON® X-100 and 200 mM sodium phosphate pH 6 at 37° C. One unit of xylanase activity is defined as 1.0 μmole of azurine produced per minute at 37° C., pH 6 from 0.2% AZCL-glucuronoxylan as substrate in 200 mM sodium phosphate pH 6. Xylanase activity can also be measured using the xylose solubility assay described in the Materials & Methods section.

Conventions for Designation of Variants

For purposes of the present invention, any starting enzyme sequence can be used to determine the corresponding amino acid residue in another sequence (e.g., variant thereof). The amino acid sequence of a second sequence is aligned with the sequence of the first sequence, and based on the alignment, the amino acid position number corresponding to any amino acid residue in the first sequence is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), e.g., version 5.0.0 or later. The parameters used are gap open penalty of 10, gap extension penalty of 0.5, and the EBLOSUM62 (EMBOSS version of BLOSUM62) substitution matrix. Identification of the corresponding amino acid residue in another xylanase can be determined by an alignment of multiple polypeptide sequences using several computer programs including, but not limited to, MUSCLE (multiple sequence comparison by log-expectation; version 3.5 or later; Edgar, 2004, *Nucleic Acids Research* 32: 1792-1794), MAFFT (version 6.857 or later; Katoh and Kuma, 2002, *Nucleic Acids Research* 30: 3059-3066; Katoh et al., 2005, *Nucleic Acids Research* 33: 511-518; Katoh and Toh, 2007, *Bioinformatics* 23: 372-374; Katoh et al., 2009, *Methods in Molecular Biology* 537: 39-64; Katoh and Toh, 2010, *Bioinformatics* 26: 1899-1900), and EMBOSS EMMA employing ClustalW (1.83 or later; Thompson et al., 1994, *Nucleic Acids Research* 22: 4673-4680), using their respective default parameters.

When the other enzyme has diverged from the polypeptide of the first sequence such that traditional sequence-based comparison fails to detect their relationship (Lindahl and Elofsson, 2000, *J. Mol. Biol.* 295: 613-615), other pairwise sequence comparison algorithms can be used. Greater sensitivity in sequence-based searching can be attained using search programs that utilize probabilistic representations of polypeptide families (profiles) to search databases. For example, the PSI-BLAST program generates profiles through an iterative database search process and is capable of detecting remote homologs (Atschul et al., 1997, *Nucleic Acids Res.* 25: 3389-3402). Even greater sensitivity can be achieved if the family or superfamily for the polypeptide has one or more representatives in the protein structure databases. Programs such as GenTHREADER (Jones, 1999, *J. Mol. Biol.* 287: 797-815; McGuffin and Jones, 2003, *Bioinformatics* 19: 874-881) utilize information from a variety of sources (PSI-BLAST, secondary structure prediction, structural alignment profiles, and solvation potentials) as input to a neural network that predicts the structural fold for a query sequence. Similarly, the method of Gough et al., 2000, *J. Mol. Biol.* 313: 903-919, can be used to align a sequence of unknown structure with the superfamily models present in the SCOP database. These alignments can in turn be used to generate homology models for the polypeptide, and such models can be assessed for accuracy using a variety of tools developed for that purpose.

For proteins of known structure, several tools and resources are available for retrieving and generating structural alignments. For example the SCOP superfamilies of proteins have been structurally aligned, and those alignments are accessible and downloadable. Two or more protein structures can be aligned using a variety of algorithms such as the distance alignment matrix (Holm and Sander, 1998, *Proteins* 33: 88-96) or combinatorial extension (Shindyalov and Bourne, 1998, *Protein Engineering* 11: 739-747), and implementation of these algorithms can additionally be utilized to query structure databases with a structure of interest in order to discover possible structural homologs (e.g., Holm and Park, 2000, *Bioinformatics* 16: 566-567).

In describing the variants of the present invention, the nomenclature described below is adapted for ease of reference. The accepted IUPAC single letter or three letter amino acid abbreviation is employed.

Substitutions. For an amino acid substitution, the following nomenclature is used: Original amino acid, position, substituted amino acid. Accordingly, the substitution of threonine at position 226 with alanine is designated as "Thr226Ala" or "T226A". Multiple mutations are separated by addition marks ("+"), e.g., "Gly205Arg+Ser411Phe" or "G205R+S411F", representing substitutions at positions 205 and 411 of glycine (G) with arginine (R) and serine (S) with phenylalanine (F), respectively.

Deletions. For an amino acid deletion, the following nomenclature is used: Original amino acid, position, *. Accordingly, the deletion of glycine at position 195 is designated as "Gly195*" or "G195*". Multiple deletions are separated by addition marks ("+"), e.g., "Gly195*+Ser411*" or "G195*+S411*".

Insertions. For an amino acid insertion, the following nomenclature is used: Original amino acid, position, original amino acid, inserted amino acid. Accordingly the insertion of lysine after glycine at position 195 is designated "Gly195GlyLys" or "G195GK". An insertion of multiple amino acids is designated [Original amino acid, position, original amino acid, inserted amino acid #1, inserted amino acid #2; etc.]. For example, the insertion of lysine and alanine after glycine at position 195 is indicated as "Gly195GlyLysAla" or "G195GKA". In such cases the inserted amino acid residue(s) are numbered by the addition of lower case letters to the position number of the amino acid residue preceding the inserted amino acid residue(s). In the above example, the sequence would thus be:

| Parent: | Variant: |
|---|---|
| 195<br>G | 195 195a 195b<br>G-K-A |

Multiple alterations. Variants comprising multiple alterations are separated by a plus sign ("+"), e.g., "Arg170Tyr+Gly195Glu" or "R170Y+G195E" representing a substitution of arginine and glycine at positions 170 and 195 with tyrosine and glutamic acid, respectively.

Different alterations. Where different alterations can be introduced at a position, the different alterations are separated by a comma, e.g., "Arg170Tyr,Glu" represents a substitution of arginine at position 170 with tyrosine or glutamic acid. Thus, "Tyr167Gly,Ala+Arg170Gly,Ala" designates the following variants: "Tyr167Gly+Arg170Gly", "Tyr167Gly+Arg170Ala", "Tyr167Ala+Arg170Gly", and "Tyr167Ala+Arg170Ala".

DESCRIPTION OF THE INVENTION

The present invention relates to a process for producing a high protein feed ingredient from a whole stillage byproduct produced in a starch-containing grain dry milling process for producing a fermentation product, as well as enzyme blends used in the processes for partitioning a greater amount of protein from the whole stillage byproduct into the high protein fraction, rather than being retained in the wet cake, to produce a high protein feed ingredient.

Existing techniques for producing high protein corn meal from a whole stillage byproduct suffer from the shortcoming that a significant amount of protein in the initial whole stillage byproduct is retained in the wet cake rather being partitioned to the protein portion that is dewatered and dried to define the high protein corn meal, resulting in a high protein corn meal with less protein than is theoretically possible based on the amount of protein in the initial whole stillage by product. Therefore, there is a need for an improved method of producing a high protein feed ingredient from a whole stillage byproduct wherein greater amounts of protein from the whole stillage byproduct are partitioned into the high protein fraction, rather than being retained in the wet cake.

The work described herein unexpectedly demonstrates that the addition of a presently disclosed hemicellulase, beta-glucanase, or enzyme blend comprising hemicellulase and/or beta-glucanase upstream during the fermentation product production process (e.g., during saccharification, fermentation, or simultaneous saccharification and fermentation) significantly improves the partitioning of protein from the initial whole stillage byproduct into the high protein fraction instead of into wet cake. Thus, the present invention more particularly relates to the addition of a hemicellulase, beta-glucanase or hemicellulase and/or beta-glucanase containing enzyme blends during the SSF process to produce a high protein feed ingredient.

The work described herein further unexpectedly demonstrates that the addition of a presently disclosed hemicellulase, beta-glucanase, or enzyme blend comprising hemicellulase and/or beta-glucanase directly to the whole stillage byproduct significantly improves the partitioning of protein from the initial whole stillage byproduct into the high protein fraction instead of into wet cake. Thus, the present invention more particularly relates to the addition of a hemicellulase, beta-glucanase or hemicellulase and/or beta-glucanase containing enzyme blends to whole stillage to produce a high protein feed ingredient.

The present invention contemplates using hemicellulases or beta-glucanases alone, as well as in enzyme blends comprising hemicellulase(s) and/or beta-glucanase(s) and at least one addition enzyme, such as a cellulolytic composition, in saccharification, fermentation, or simultaneous saccharification and fermentation, or in whole stillage, to produce a high protein feed ingredient downstream in both conventional and raw-starch hydrolysis (RSH) ethanol production processes.

I. Enzyme Blends

The present invention contemplates using hemicellulases or beta-glucanases alone, as well as in enzyme blends comprising a hemicellulase and/or beta-glucanase and at least one additional enzyme, such as a cellulolytic composition, in saccharification, fermentation, or simultaneous saccharification and fermentation, to improve the partitioning of protein downstream in both conventional and raw-starch hydrolysis (RSH) ethanol production processes. The present invention also contemplates using hemicellulases or beta-glucanases alone, as well as in enzyme blends comprising a hemicellulase and/or beta-glucanase and at least one additional enzyme, such as a cellulolytic composition, in whole stillage, to improve the partitioning of protein downstream in both conventional and raw-starch hydrolysis (RSH) ethanol production processes.

Thus, the enzyme blends of the present invention are useful for increasing the percentage of protein in the high protein feed ingredient resulting from the separation of the whole stillage into protein-rich and fiber-rich (wet cake) fractions. When the cellulolytic composition is included in the blend, the ratio of the hemicellulase and/or beta-glucanase and the cellulolytic composition can be optimized to further increase the amount of protein that is partitioned into the high protein fraction rather than the wet cake, as well as further increase the mass of the high protein fraction that ends up in the high protein feed ingredient.

In one aspect the present invention relates to hemicellulase, beta-glucanase, or an enzyme blend comprising a hemicellulase and/or beta-glucanase. The hemicellulase, for example xylanase, increases the mass fraction of the high protein feed ingredient. The beta-glucanase increases the protein content on a dry wt % basis of the high protein feed ingredient. The enzyme blend is useful for producing a high protein feed ingredient from a whole stillage byproduct produced in a starch-containing grain dry milling process for producing a fermentation product.

In an aspect, the enzyme blend comprises at least two hemicellulases. In one embodiment, the enzyme blend comprises at least two hemicellulases, wherein the ratio of the at least two hemicellulases in the blend is from about 5:95 to about 95:5. In an embodiment, the at least two hemicellulases comprises at least one xylanase and at least one α-L-arabinofuranosidase. In an embodiment, the at least two hemicellulases comprises at least one xylanase from a family selected from the group consisting of a GH3 family xylanase, GH5 family xylanase, a GH8 family xylanase, a GH10 family xylanase, a GH11 family xylanase, a GH30 family xylanase, a GH43 family xylanase, and a GH98 family xylanase, and at least one α-L-arabinofuranosidase from a GH family selected from the group consisting of GH43, GH51 and GH62. In an embodiment, the least two hemicellulases comprises a GH5_21 xylanase and an α-L-arabinofuranosidase selected from a GH family selected the group consisting of GH43, GH51 and GH62.

In an embodiment, the at least two hemicellulases comprises a GH5_21 xylanase and a GH43 arabinofuranosidase. In an embodiment, the GH5_21 xylanase is selected from the group consisting of the one shown in amino acids 25 to 551 of SEQ ID NO: 5 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5 and the one shown in amino acids 25 to 551 of SEQ ID NO: 6 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6, and wherein the GH43 arabinofuranosidase is selected from the group consisting of the one shown in amino acids 19 to 558 of SEQ ID NO: 56 or the one shown in amino acids 24 to 575 of SEQ ID NO: 57, or one having at least 60%, at least 65%, at least 70%, at least 75%, at least 80%, at least 85%, at least 90%, at least 95%, at least 96%, at least 97%, at least 98%, or at least 99% sequence identity to amino acids 19 to 558 of SEQ ID NO: 56 or amino acids 24 to 575 of SEQ ID NO: 57.

In an embodiment, the at least two hemicellulases comprises a GH5_21 xylanase and a Gh51 arabinofuranosidase. In an embodiment, the GH5_21 xylanase is selected from the group consisting of the one shown in amino acids 25 to 551 of SEQ ID NO: 5 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5 and the one shown in amino acids 25 to 551 of SEQ ID NO: 6 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6, and wherein the GH51 arabinofuranosidase is selected from the group consisting of the one shown in amino acids 20 to 663 of SEQ ID NO: 58 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 663 of SEQ ID NO: 58, and the one shown in amino acids 17 to 643 of SEQ ID NO: 59 or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 643 of SEQ ID NO: 59.

In an embodiment, the at least two hemicellulases comprises a GH5_21 xylanase and a GH62 α-L-arabinofuranosidase. In an embodiment, the GH5_21 xylanase is selected from the group consisting of the one shown in amino acids 25 to 551 of SEQ ID NO: 5 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5 and the one shown in amino acids 25 to 551 of SEQ ID NO: 6 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6, and wherein the GH62 α-L-arabinofuranosidase is the one shown in amino acids 17 to 325 of SEQ ID NO: 11, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 325 of SEQ ID NO: 11, or the one shown in amino acids 18 to 335 of SEQ ID NO: 55, or one having at least 60%, at least 65%, at least 70%, at least 75%, at least 80%, at least 85%, at least 90%, at least 95%, at least 96%, at least 97%, at least 98%, or at least 99% sequence identity to amino acids 18 to 335 of SEQ ID NO: 55.

In an embodiment, the at least two hemicellulases comprise a GH30_8 xylanase and a GH43 arabinofuranosidase. In an embodiment, the GH30_8 xylanase is selected from the group consisting of the one shown in amino acids 28 to 417 of SEQ ID NO: 3 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 and the one shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4, and wherein the GH43 arabinofuranosidase is selected from the group consisting of the one shown in shown in amino acids 19 to 558 of SEQ ID NO: 56 or the one shown in amino acids 24 to 575 of SEQ ID NO: 57, or one having at least 60%, at least 65%, at least 70%, at least 75%, at least 80%, at least 85%, at least 90%, at least 95%, at least 96%, at least 97%, at least 98%, or at least 99% sequence identity to amino acids 19 to 558 of SEQ ID NO: 56 or amino acids 24 to 575 of SEQ ID NO: 57.

In an embodiment, the at least two hemicellulases comprise a GH30_8 xylanase and a GH51 arabinofuranosidase. In an embodiment, the GH30_8 xylanase is selected from the group consisting of the one shown in amino acids 28 to 417 of SEQ ID NO: 3 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 and the one shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4, and wherein the GH51 arabinofuranosidase is selected from the group consisting of the one shown in amino acids 20 to 663 of SEQ ID NO: 58 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 663 of SEQ ID NO: 58, and the one shown in amino acids 17 to 643 of SEQ ID NO: 59 or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 643 of SEQ ID NO: 59.

In an embodiment, the at least two hemicellulases comprises a GH30_8 xylanase and an α-L-arabinofuranosidase selected from a GH family selected the group consisting of GH43, GH51 and GH62. In an embodiment, the at least two hemicellulases comprises a GH30_8 xylanase and a GH62 α-L-arabinofuranosidase. In an embodiment, the GH30_8 xylanase is selected from the group consisting of the one shown in amino acids 28 to 417 of SEQ ID NO: 3 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 and the one shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4, and wherein the GH62 α-L-arabinofuranosidase is the one shown in amino acids 17 to 325 of SEQ ID NO: 11, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 325 of SEQ ID NO: 11, or the one shown in amino acids 18 to 335 of SEQ ID NO: 55, or one having at least 60%, at least 65%, at least 70%, at least 75%, at least 80%, at least 85%, at least 90%, at least 95%, at least 96%, at least 97%, at least 98%, or at least 99% sequence identity to amino acids 18 to 335 of SEQ ID NO: 55.

In an embodiment, the at least two hemicellulases comprises a GH10 xylanase and an α-L-arabinofuranosidase selected from a GH family selected the group consisting of GH43, GH51 and GH62. In an embodiment, the at least two hemicellulases comprise a GH10 xylanase and a GH43 arabinofuranosidase. In an embodiment, the GH10 xylanase is selected from the group consisting of the one shown in amino acids 20 to 397 of SEQ ID NO: 1 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1, and the one shown in amino acids 21 to 405 of SEQ ID NO: 2 or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2, and wherein the GH43 arabinofuranosidase is selected from the group consisting of the one shown in shown in amino acids 19 to 558 of SEQ ID NO: 56 or the one shown in amino acids 24 to 575 of SEQ ID NO: 57, or one having at least 60%, at least 65%, at least 70%, at least 75%, at least 80%, at least 85%, at least 90%, at least 95%, at least 96%, at least 97%, at least 98%, or at least 99% sequence identity to amino acids 19 to 558 of SEQ ID NO: 56 or amino acids 24 to 575 of SEQ ID NO: 57.

In an embodiment, the at least two hemicellulases comprise a GH10 xylanase and a GH51 arabinofuranosidase. In an embodiment, the GH10 xylanase is selected from the group consisting of the one shown in amino acids 20 to 397 of SEQ ID NO: 1 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1, and the one shown in amino acids 21 to 405 of SEQ ID NO: 2 or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2, and wherein the GH51 arabinofuranosidase is selected from the group consisting of the one shown in amino acids 20 to 663 of SEQ ID NO: 58 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 663 of SEQ ID NO: 58, and the one shown in amino acids 17 to 643 of SEQ ID NO: 59 or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 643 of SEQ ID NO: 59.

In an embodiment, the at least two hemicellulases comprises a GH10 xylanase and GH62 α-L-arabinofuranosidase. In an embodiment, the GH10 xylanase is selected from the group consisting of the one shown in amino acids 20 to 397 of SEQ ID NO: 1 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1 and amino acids 21 to 405 of SEQ ID NO: 2 or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2, and wherein the GH62 α-L-arabinofuranosidase is the one shown in amino acids 17 to 325 of SEQ ID NO: 11, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 325 of SEQ ID NO: 11, or shown in amino acids 18 to 335 of SEQ ID NO: 55, or one having at least 60%, at least 65%, at least 70%, at least 75%, at least 80%, at least 85%, at least 90%, at least 95%, at least 96%, at least 97%, at least 98%, or at least 99% sequence identity to amino acids 18 to 335 of SEQ ID NO: 55.

In an embodiment, the GH10 xylanase is the one shown in amino acids 21 to 405 of SEQ ID NO: 2 or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2, and wherein the GH62 α-L-arabinofuranosidase is the one shown in amino acids 17 to 325 of SEQ ID NO: 11, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 325 of SEQ ID NO: 11.

The at least one xylanase and the at least one α-L-arabinofuranosidase increases the mass fraction of the high protein feed ingredient.

In an embodiment, at least two hemicellulases comprises a xylanase and a beta-xylosidase. In an embodiment, at least two hemicellulases comprise: (i) a xylanase from the genus *Aspergillus*, for example *Aspergillus fumigatus*, such as the xylanase shown in amino acids 20 to 397 of SEQ ID NO: 1, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1; and (ii) a beta-xylosidase from the genus *Aspergillus*, for example *Aspergillus fumigatus*, such as the beta-xylosidase shown in amino acids 21 to 792 of SEQ ID NO: 12, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 792 of SEQ ID NO: 12. The at least one xylanase and at least one beta-xylosidase increases the mass fraction of the high protein feed ingredient.

In an embodiment, the ratio of the at least two hemicellulases is 10:90. In an embodiment, the ratio of the at least two hemicellulases is 15:85. In an embodiment, the ratio of the at least two hemicellulases is 25:75. In an embodiment, the ratio of the hemicellulases is 30:70. In an embodiment, the ratio of the at least two hemicellulases is 35:65. In an embodiment, the ratio of the at least two hemicellulases is 40:60. In an embodiment, the ratio of the at least two hemicellulases is 45:55. In an embodiment, the ratio of the at least two hemicellulases is 50:50. In an embodiment, the ratio of the at least two hemicellulases is 55:45. In an embodiment, the ratio of the at least two hemicellulases is 60:40. In an embodiment, the ratio of the at least two hemicellulases is 65:35. In an embodiment, the ratio of the at least two hemicellulases is 70:30. In an embodiment, the ratio of the at least two hemicellulases is 75:25. In an embodiment, the ratio of the at least two hemicellulases is 80:20. In an embodiment, the ratio of the at least two hemicellulases is 85:15. In an embodiment, the ratio of the at least two hemicellulases is 90:10.

Aspects of the present invention relate to hemicellulase or an enzyme blend comprising at least one hemicellulase and a cellulolytic composition. In an embodiment, the enzyme blend comprises at least one hemicellulase and a cellulolytic composition, wherein: (i) the at least one hemicellulase is selected from the group consisting of an acetylxylan esterase, a α-glucuronidases, a α-L-arabinofuranosidases, a α-L-galactosidase, a beta-xylosidase, a feruloyl esterase, a α-D-galactosidase, a pectin-degrading enzyme, a xylanase, and any combination thereof; and (ii) the cellulolytic composition comprises at least three enzymes selected from the group consisting of a cellobiohydrolase I, a cellobiohydrolase II, a beta-glucosidase, a GH61 polypeptide having cellulolytic enhancing activity, and an endoglucanase I. In an embodiment, the enzyme blend comprises at least one hemicellulase and a cellulolytic composition, wherein: (i) the at least one hemicellulase is at least one xylanase selected from the group consisting of a GH3 xylanase, a GH5 xylanase, a GH8 xylanase, GH10 xylanase, a GH11 xylanase, a GH30 xylanase, a GH43 xylanase, and a GH 98 xylanase; and (ii) the cellulolytic composition comprises at least three enzymes selected from the group consisting of a cellobiohydrolase I, a cellobiohydrolase II, a beta-glucosidase, a GH61 polypeptide having cellulolytic enhancing activity, and an endoglucanase I. In an embodiment, the enzyme blend comprises at least one xylanase and a cellulolytic composition, wherein: (i) the at least one xylanase is selected from the group consisting of an *Aspergillus* GH10 xylanase, a *Talaromyces* GH10 xylanase, a *Bacillus* GH30_8 xylanase, a *Chryseobacterium* GH5_21 xylanase, an *Acetivibrio* GH5_34 xylanase, a *Clostridium* GH5_34 xylanase, a *Gonapodya prolifera* GH5_34 xylanase, a *Paenibacillus GH*5_35 xylanase, and any combination of at least two, at least three, at least four, at least five or at least six thereof; and (ii) the cellulolytic composition comprises at least three enzymes selected from the group consisting of an *Aspergillus* cellobiohydrolase I, an *Aspergillus* cellobiohydrolase II, an *Aspergillus* beta-glucosidase, a *Penicillium* GH61 polypeptide having cellulolytic enhancing activity, and a *Trichoderma* endoglucanase I. In an embodiment, the enzyme blend comprises at least one xylanase and a cellulolytic composition, wherein: (i) the at least one xylanase is selected from the group consisting of an *Aspergillus fumigatus* GH10 xylanase, a *Talaromyces leycettanus* GH10 xylanase, a *Bacillus subtilis* GH30_8 xylanase, a *Chryseobacterium* sp-10696 GH5_21 xylanase, an *Acetivibrio cellulyticus* GH5_34 xylanase, a *Clostridium thermocellum* GH5_34 xylanase, a *Gonapodya prolifera* GH5_34 xylanase, a *Paenibacillus* genus GH5_35 xylanase (e.g., *Paenibacillus illinoisensis, Paenibacillus favisporus*, or *Penicillium* sp. GH5_35 xylanase, and any combination of at least two, at least three, at least four, at least five or at least six thereof; and (ii) the cellulolytic composition comprises at least three enzymes selected from the group consisting of an *Aspergillus fumigatus* cellobiohydrolase I, an *Aspergillus fumigatus* cellobiohydrolase II, an *Aspergillus fumigatus* beta-glucosidase, a *Penicillium emersonii* GH61 polypeptide having cellulolytic enhancing activity, and a *Trichoderma reesei* endoglucanase I. In an embodiment, the enzyme blend comprises at least one xylanase and a cellulolytic composition, wherein the at least one xylanase is selected from the group consisting of:

(i) the xylanase shown in amino acids 20 to 397 of SEQ ID NO: 1, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1; (ii) the xylanase shown in amino acids 21 to 404 of SEQ ID NO: 2, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2; (iii) the xylanase shown in amino acids 28 to 417 of SEQ ID NO: 3, or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4; (iv) the xylanase shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4; (v) the xylanase shown in amino acids 25 to 551 of SEQ ID NO: 5, or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5; (vi) the xylanase shown in amino acids 25 to 551 of SEQ ID NO: 6, or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6; (vii) the xylanase shown in SEQ ID NO: 7, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 7; (viii) the xylanase shown in SEQ ID NO: 8, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 8; (ix) the xylanase shown in amino acids 37 to 573 of SEQ ID NO: 9, or one having at least 60%, at least 65%, at least 70%, at least 75%, at least 80%, at least 85%, at least 90%, at least 95%, at least 96%, at least 97%, at least 98%, or at least 99% sequence identity to amino acids 37 to 573 of SEQ ID NO: 9; (x) the xylanase shown in amino acids 36 to 582 of SEQ ID NO: 10 or one having at least 60%, at least 65%, at least 70%, at least 75%, at least 80%, at least 85%, at least 90%, at least 95%, at least 96%, at least 97%, at least 98%, or at least 99% sequence identity to amino acids 36 to 582 of SEQ ID NO: 10; (xi) the xylanase shown in amino acids 24 to 337 of SEQ ID NO: 53 or one having at least 60%, at least 65%, at least 70%, at least 75%, at least 80%, at least 85%, at least 90%, at least 95%, at least 96%, at least 97%, at least 98%, or at least 99% sequence identity to amino acids 24 to 337 of SEQ ID NO: 53; (xii) the xylanase shown in amino acids 1 to 536 of SEQ ID NO: 54 or one having at least 60%, at least 65%, at least 70%, at least 75%, at least 80%, at least 85%, at least 90%, at least 95%, at least 96%, at least 97%, at least 98%, or at least 99% sequence identity to amino acids 1 to 536 of SEQ ID NO: 54; and wherein the cellulolytic composition comprises at least three enzymes selected from the group consisting of: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22; (iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and/or (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24; and (v) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 to of SEQ ID NO: 44.

In an embodiment, the enzyme blend comprises: (a) a GH5_34 xylanase selected from the group consisting of the one shown in SEQ ID NO: 7, the one shown in SEQ ID NO: 8, the one shown in amino acids 24 to 337 of SEQ ID NO: 53, and one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 7, SEQ ID NO: 8, or amino acids 24 to 337 of SEQ ID NO: 53; and (b) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 2; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44.

In an embodiment, the enzyme blend comprises: (a) a GH5_35 xylanase selected from the group consisting of the one shown in amino acids 37 to 573 of SEQ ID NO: 9, the one shown in amino acids 36 to 582 of SEQ ID NO: 10, the one shown in amino acids 1 to 536 of SEQ ID NO: 54, and one having at least 60%, at least 65%, at least 70%, at least 75%, at least 80%, at least 85%, at least 90%, at least 95%, at least 96%, at least 97%, at least 98%, or at least 99% sequence identity to amino acids 37 to 573 of SEQ ID NO: 9, the amino acids 36 to 582 of SEQ ID NO: 10, or amino acids 1 to 536 of SEQ ID NO: 54; and (b) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 2; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44.

In an embodiment, the enzyme blend comprises: (a) a GH5_21 xylanase selected from the group consisting of comprising, consisting essentially of, or consisting of the one shown in amino acids 25 to 551 of SEQ ID NO: 5 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5 and the one shown in amino acids 25 to 551 of SEQ ID NO: 6 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6; and (b) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22; (iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

In an embodiment, the enzyme blend comprises: (a) a GH30_8 xylanase selected from the group consisting of the one shown in amino acids 28 to 417 of SEQ ID NO: 3 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 and the one shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4; (b) a GH5_21 xylanase selected from the group consisting of comprising, consisting essentially of, or consisting of the one shown in amino acids 25 to 551 of SEQ ID NO: 5 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5 and the one shown in amino acids 25 to 551 of SEQ ID NO: 6 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6; and (c) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22; (iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

In an embodiment, the enzyme blend comprises: (a) a GH5_21 xylanase selected from the group consisting of comprising, consisting essentially of, or consisting of the one shown in amino acids 25 to 551 of SEQ ID NO: 5 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5 and the one shown in amino acids 25 to 551 of SEQ ID NO: 6 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6; and (b) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 2; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44.

In an embodiment, the enzyme blend comprises: (a) a GH30_8 xylanase selected from the group consisting of the one shown in amino acids 28 to 417 of SEQ ID NO: 3 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 and the one shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4; (b) a GH5_21 xylanase selected from the group consisting of comprising, consisting essentially of, or consisting of the one shown in amino acids 25 to 551 of SEQ ID NO: 5 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5 and the one shown in amino acids 25 to 551 of SEQ ID NO: 6 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6; and (c) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 2; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44.

Preferably, the GH30_8 xylanase and the GH5_21 xylanase are present in the blend in a ratio of 1:1, 1.1:1, 1.2:1, 1.3:1, 1.4:1, 1.5:1, 1:1.5, 1:1.4, 1:1.3, 1:1.2, or 1:1.1 of GH30_8 xylanase to GH5_21 xylanase.

In an embodiment, the enzyme blend comprises at least two hemicellulases and a cellulolytic composition. In an embodiment, the at least two hemicellulases comprise at least one xylanase and at least one arabinofuranosidase. In an embodiment, the enzyme blend comprises: (a) at least one xylanase from a family selected from the group consisting of a GH3 family xylanase, GH5 family xylanase, a GH8 family xylanase, a GH10 family xylanase, a GH11 family xylanase, a GH30 family xylanase, a GH43 family xylanase, and a GH98 family xylanase; (b) at least one α-L-arabinofuranosidase from a GH family selected from the group consisting of GH43, GH51 and GH62; and; (c) a cellulolytic composition comprising at least three enzymes selected from the group consisting of a cellobiohydrolase I, cellobiohydrolase II, a beta-glucosidase, a GH61A polypeptide having cellulolytic enhancing activity, and an endoglucanase I.

In an embodiment, the enzyme blend comprises: (a) at least one GH10 xylanase selected from the group consisting of the one shown in amino acids 20 to 397 of SEQ ID NO: 1 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1 and amino acids 21 to 405 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2; (b) the GH62 α-L-arabinofuranosidase shown in amino acids 17 to 325 of SEQ ID NO: 11, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 325 of SEQ ID NO: 11, or shown in amino acids 18 to 335 of SEQ ID NO: 55, or one having at least 60%, at least 65%, at least 70%, at least 75%, at least 80%, at least 85%, at least 90%, at least 95%, at least 96%, at least 97%, at least 98%, or at least 99% sequence identity to amino acids 18 to 335 of SEQ ID NO: 55; and (c) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 2; (ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22; (iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24. In an embodiment, the enzyme blend comprises: (a) at least one GH10 xylanase selected from the group consisting of the one shown in amino acids 20 to 397 of SEQ ID NO: 1 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1 and amino acids 21 to 405 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2; (b) the GH62 α-L-arabinofuranosidase shown in amino acids 17 to 325 of SEQ ID NO: 11, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 325 of SEQ ID NO: 11, or shown in amino acids 18 to 335 of SEQ ID NO: 55, or one having at least 60%, at least 65%, at least 70%, at least 75%, at least 80%, at least 85%, at least 90%, at least 95%, at least 96%, at least 97%, at least 98%, or at least 99% sequence identity to amino acids 18 to 335 of SEQ ID NO: 55; and (c) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 2; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44.

In an embodiment, the at least two hemicellulases in the blend with the cellulolytic composition comprise at least one xylanase and at least one beta-xylosidase. In an embodiment, the enzyme blend comprises: (a) a xylanase selected from the group consisting of: (i) a xylanase from the genus *Aspergillus*, for example *Aspergillus fumigatus*, such as the xylanase shown in amino acids 20 to 397 of SEQ ID NO: 1, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1; and (ii) a xylanase from the genus *Talaromyces*, for example *Talaromyces leycettanus*, such as the xylanase shown in amino acids 21 to 404 of SEQ ID NO: 2, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2; (b) a beta-xylosidase from the genus *Aspergillus*, for example *Aspergillus fumigatus*, such as the beta-xylosidase shown in amino acids 21 to 792 of SEQ ID NO: 12, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 792 of SEQ ID NO: 12; and (c) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22; (iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

In an embodiment, the enzyme blend comprises: (a) a xylanase selected from the group consisting of: (i) a xylanase from the genus *Aspergillus*, for example *Aspergillus fumigatus*, such as the xylanase shown in amino acids 20 to 397 of SEQ ID NO: 1, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1; and (ii) a xylanase from the genus *Talaromyces*, for example *Talaromyces leycettanus*, such as the xylanase shown in amino acids 21 to 404 of SEQ ID NO: 2, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2; (b) a beta-xylosidase from the genus *Aspergillus*, for example *Aspergillus fumigatus*, such as the beta-xylosidase shown in amino acids 21 to 792 of SEQ ID NO: 12, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 792 of SEQ ID NO: 12; and (c) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44.

In one embodiment, the ratio of the hemicellulase(s) and cellulolytic composition in the blend is from about 5:95 to about 95:5. In an embodiment, the ratio of the hemicellulase (s) and cellulolytic composition is 10:90. In an embodiment, the ratio of the hemicellulase(s) and cellulolytic composition is 15:85. In an embodiment, the ratio of the hemicellulase(s) and cellulolytic composition is 20:80. In an embodiment, the ratio of the hemicellulase(s) and cellulolytic composition is 25:75. In an embodiment, the ratio of the hemicellulase(s) and cellulolytic composition is 30:70. In an embodiment, the ratio of the hemicellulase(s) and cellulolytic composition is 35:65. In an embodiment, the ratio of the hemicellulase(s) and cellulolytic composition is 40:60. In an embodiment, the ratio of the hemicellulase(s) and cellulolytic composition is 45:55. In an embodiment, the ratio of the hemicellulase(s) and cellulolytic composition is 50:50. In an embodiment, the ratio of the hemicellulase(s) and cellulolytic composition is 55:45. In an embodiment, the ratio of the hemicellulase(s) and cellulolytic composition is 60:40. In an embodiment, the ratio of the hemicellulase(s) and cellulolytic composition is 65:35. In an embodiment, the ratio of the hemicellulase(s) and cellulolytic composition is 70:30. In an embodiment, the ratio of the hemicellulase(s) and cellulolytic composition is 75:25. In an embodiment, the ratio of the hemicellulase(s) and cellulolytic composition is 80:20. In an embodiment, the ratio of the hemicellulase(s) and cellulolytic composition is 85:15. In an embodiment, the ratio of the hemicellulase(s) and cellulolytic composition is 90:10.

In an aspect, the at least two hemicellulases comprises at least two xylanases. In one embodiment, the enzyme blend comprises at least two xylanases, wherein the ratio of the at least two xylanases in the blend is from about 5:95 to about 95:5. In an embodiment, the at least two xylanases comprise a GH5 family xylanase and a GH10 family xylanase. In an embodiment, the at least two xylanases comprise a GH10 family xylanase and a GH30 family xylanase. In an embodiment, the at least two xylanases comprise a GH30 family xylanase and a GH5 family xylanase.

In an embodiment, the at least two xylanases comprise a GH30_8 xylanase and a GH5_21 family xylanase. In an embodiment, the GH30_8 xylanase is selected from the group consisting of the one shown in amino acids 28 to 417 of SEQ ID NO: 3 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 and the one shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4, and wherein the GH5_21 xylanase is selected from the group consisting of the one shown in amino acids 25 to 551 of SEQ ID NO: 5 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5 and the one shown in amino acids 25 to 551 of SEQ ID NO: 6 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6.

In an embodiment, the at least two xylanases comprise a GH30_8 xylanase and a GH5_34 family xylanase. In an embodiment, the GH30_8 xylanase is selected from the group consisting of the one shown in amino acids 28 to 417 of SEQ ID NO: 3 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 and the one shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4, and wherein the GH5_34 xylanase is selected from the group consisting of the one shown in SEQ ID NO: 7, the one shown in SEQ ID NO: 8, the one shown in amino acids 24 to 337 of SEQ ID NO: 53, and one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 7, SEQ ID NO: 8, or amino acids 24 to 337 of SEQ ID NO: 53.

In an embodiment, the at least two xylanases comprise a GH30_8 xylanase and a GH5_35 family xylanase. In an embodiment, the GH30_8 xylanase is selected from the group consisting of the one shown in amino acids 28 to 417 of SEQ ID NO: 3 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 and the one shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4, and wherein the GH5_35 xylanase is selected from the group consisting of the one shown in amino acids 37 to 573 of SEQ ID NO: 9, the one shown in amino acids 36 to 582 of SEQ ID NO: 10, the one shown in amino acids 1 to 536 of SEQ ID NO: 54, and one having at least 60%, at least 65%, at least 70%, at least 75%, at least 80%, at least 85%, at least 90%, at least 95%, at least 96%, at least 97%, at least 98%, or at least 99% sequence identity to amino acids 37 to 573 of SEQ ID NO: 9, the amino acids 36 to 582 of SEQ ID NO: 10, or amino acids 1 to 536 of SEQ ID NO: 54.

In an embodiment, the at least two xylanases are present in the blend in a ratio of 1:1, 1.1:1, 1.2:1, 1.3:1, 1.4:1, 1.5:1, 1:1.5, 1:1.4, 1:1.3, 1:1.2, or 1:1.1 of GH30_8 xylanase to GH5_21 xylanase. The xylanase(s) increase the mass fraction of the high protein feed ingredient compared to the mass of the high protein feed ingredient in the absence of the xylanase(s). In an embodiment, the ratio of the at least two xylanases is 10:90. In an embodiment, the ratio of the at least two xylanases is 15:85. In an embodiment, the ratio of the at least two xylanases is 25:75. In an embodiment, the ratio of the xylanases is 30:70. In an embodiment, the ratio of the at least two xylanases is 35:65. In an embodiment, the ratio of the at least two xylanases is 40:60. In an embodiment, the ratio of the at least two xylanases is 45:55. In an embodiment, the ratio of the at least two xylanases is 50:50. In an embodiment, the ratio of the at least two xylanases is 55:45. In an embodiment, the ratio of the at least two xylanases is 60:40. In an embodiment, the ratio of the at least two xylanases is 65:35. In an embodiment, the ratio of the at least two xylanases is 70:30. In an embodiment, the ratio of the at least two xylanases is 75:25. In an embodiment, the ratio of the at least two xylanases is 80:20. In an embodiment, the ratio of the at least two xylanases is 85:15. In an embodiment, the ratio of the at least two xylanases is 90:10.

In one aspect the present invention relates to xylanases or an enzyme blend comprising at least one xylanase and a cellulolytic composition, wherein the ratio of the xylanases and cellulolytic composition in the blend is from about 5:95 to about 95:5. In an embodiment, the ratio of the xylanases and cellulolytic composition is 10:90. In an embodiment, the ratio of the xylanases and cellulolytic composition is 15:85. In an embodiment, the ratio of the xylanases and cellulolytic composition is 20:80. In an embodiment, the ratio of the xylanases and cellulolytic composition is 25:75. In an embodiment, the ratio of the xylanases and cellulolytic composition is 30:70. In an embodiment, the ratio of the xylanases and cellulolytic composition is 35:65. In an embodiment, the ratio of the xylanases and cellulolytic composition is 40:60. In an embodiment, the ratio of the xylanases and cellulolytic composition is 45:55. In an embodiment, the ratio of the xylanases and cellulolytic composition is 50:50. In an embodiment, the ratio of the xylanases and cellulolytic composition is 55:45. In an embodiment, the ratio of the xylanases and cellulolytic composition is 60:40. In an embodiment, the ratio of the xylanases and cellulolytic composition is 65:35. In an embodiment, the ratio of the xylanases and cellulolytic composition is 70:30. In an embodiment, the ratio of the xylanases and cellulolytic composition is 75:25. In an embodiment, the ratio of the xylanases and cellulolytic composition is 80:20. In an embodiment, the ratio of the xylanases and cellulolytic composition is 85:15. In an embodiment, the ratio of the xylanases and cellulolytic composition is 90:10.

In one aspect the present invention relates to beta-glucanase or an enzyme blend comprising a beta-glucanase. The beta-glucanase increases the protein content on a dry wt % basis of the high protein feed ingredient. The enzyme blend is useful for producing a high protein feed ingredient from a whole stillage byproduct produced in a starch-containing grain dry milling process for producing a fermentation product.

In one aspect the present invention relates to an enzyme blend comprising at least two beta-glucanases, wherein the ratio of the at least two beta-glucanases in the blend is from about 5:95 to about 95:5. In an embodiment, the ratio of the at least two beta-glucanases is 10:90. In an embodiment, the ratio of the at least two beta-glucanases is 15:85. In an embodiment, the ratio of the at least two beta-glucanases is 25:75. In an embodiment, the ratio of the at least two beta-glucanases is 30:70. In an embodiment, the ratio of the at least two beta-glucanases is 35:65. In an embodiment, the ratio of the at least two beta-glucanases is 40:60. In an embodiment, the ratio of the at least two beta-glucanases is 45:55. In an embodiment, the ratio of the at least two beta-glucanases is 50:50. In an embodiment, the ratio of the at least two beta-glucanases is 55:45. In an embodiment, the ratio of the at least two beta-glucanases is 60:40. In an embodiment, the ratio of the at least two beta-glucanases is 65:35. In an embodiment, the ratio of the at least two beta-glucanases is 70:30. In an embodiment, the ratio of the at least two beta-glucanases is 75:25. In an embodiment, the ratio of the at least two beta-glucanases is 80:20. In an embodiment, the ratio of the at least two beta-glucanases is 85:15. In an embodiment, the ratio of the at least two beta-glucanases is 90:10.

In one aspect the present invention relates to an enzyme blend comprising a beta-glucanase and a cellulolytic composition. The enzyme blend increases the protein content on a dry wt % basis of the high protein feed ingredient.

In an embodiment, the enzyme blend comprises at least one beta-glucanase and a cellulolytic composition, wherein: (i) the at least one beta-glucanase is from a glycoside hydrolase family selected from the group consisting of a GH5_15 family beta-glucanase, a GH16 family beta-glucanase, and a GH64 family beta-glucanase, and (ii the cellulolytic composition comprises at least three enzymes selected from the group consisting of a cellobiohydrolase I, a cellobiohydrolase II, a beta-glucosidase, a GH61 polypeptide having cellulolytic enhancing activity, and an endoglucanase I. In an embodiment, the enzyme blend comprises: (a) at least one beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14; and (b) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22; (iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24. In an embodiment, the enzyme blend comprises: (a) at least one beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14; and (b) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44. In an embodiment, the enzyme blend comprises: (a) at least one beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17; and (b) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22; (iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24. In an embodiment, the enzyme blend comprises: (a) at least one beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17; and (b) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44. In an embodiment, the enzyme blend comprises: (a) at least one beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 19, or amino acids 20 to 284 of SEQ ID NO: 18; and (b) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22; (iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24. In an embodiment, the enzyme blend comprises: (a) at least one beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (b) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44 to 459 of 44. In an embodiment, the enzyme blend comprises: (a) at least one beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (b) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22; (iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24. In an embodiment, the enzyme blend comprises: (a) at least one beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (b) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44.

The ratio of the beta-glucanase or beta-glucanases and the cellulolytic composition in the enzyme blend can be adjusted to optimize the protein content on a dry wt % basis of the high protein feed ingredient. In an embodiment, the ratio of the beta-glucanase and cellulolytic composition in the blend is from about 5:95 to about 95:5. In an embodiment, the cellulolytic composition is present in the blend in a ratio of beta-glucanase and cellulolytic composition from about 5:95 to about 95:5, such as from 5:95, 10:90, 20:80, 25:75, 50:50, 80:20, 75:25, 90:10, and 95:5. In an embodiment, the ratio of the beta-glucanase and cellulolytic composition is 10:90. In an embodiment, the ratio of the beta-glucanase and cellulolytic composition is 15:85. In an embodiment, the ratio of the beta-glucanase and cellulolytic composition is 20:80. In an embodiment, the ratio of the beta-glucanase and cellulolytic composition is 25:75. In an embodiment, the ratio of the beta-glucanase and cellulolytic composition is 30:70. In an embodiment, the ratio of the beta-glucanase and cellulolytic composition is 35:65. In an embodiment, the ratio of the beta-glucanase and cellulolytic composition is 40:60. In an embodiment, the ratio of the beta-glucanase and cellulolytic composition is 45:55. In an embodiment, the ratio of the beta-glucanase and cellulolytic composition is 50:50. In an embodiment, the ratio of the beta-glucanase and cellulolytic composition is 55:45. In an embodiment, the ratio of the beta-glucanase and cellulolytic composition is 60:40. In an embodiment, the ratio of the beta-glucanase and cellulolytic composition is 65:35. In an embodiment, the ratio of the beta-glucanase and cellulolytic composition is 70:30. In an embodiment, the ratio of the beta-glucanase and cellulolytic composition is 75:25. In an embodiment, the ratio of the beta-glucanase and cellulolytic composition is 80:20. In an embodiment, the ratio of the beta-glucanase and cellulolytic composition is 85:15. In an embodiment, the ratio of the beta-glucanase and cellulolytic composition is 90:10.

In one aspect the present invention relates to an enzyme blend comprising a hemicellulase, beta-glucanase, and a cellulolytic composition. The enzyme blend is useful for producing a high protein feed ingredient from a whole stillage byproduct produced in a starch-containing grain dry milling process for producing a fermentation product. The enzyme blend optimizes the mass fraction and the protein content on a dry wt % basis of the high protein feed ingredient.

In one aspect the present invention relates to an enzyme blend comprising a hemicellulase, a beta-glucanase, and a cellulolytic composition. In an embodiment, the enzyme blend comprises at least one hemicellulase, at least one beta-glucanase, and a cellulolytic composition, wherein: (i) the at least one hemicellulase is selected from the group consisting of an acetylxylan esterase, a α-glucuronidases, a α-L-arabinofuranosidases, a α-L-galactosidase, a beta-xylosidase, a feruloyl esterase, a α-D-galactosidase, a pectin-degrading enzyme, a xylanase, and any combination thereof; (ii) the at least one beta-glucanase is from a glycoside hydrolase family selected from the group consisting of a GH5_15 family beta-glucanase, a GH16 family beta-glucanase, and a GH64 family beta-glucanase; and (iii) the cellulolytic composition comprises at least three enzymes selected from the group consisting of a cellobiohydrolase I, a cellobiohydrolase II, a beta-glucosidase, a GH61 polypeptide having cellulolytic enhancing activity, and an endoglucanase I. The ratio of the hemicellulase, beta-glucanase, and cellulolytic composition in the blend can be adjusted to optimize the mass fraction and the protein content on a dry wt % basis of the high protein feed ingredient. In an embodiment, the ratio of the hemicellulase, beta-glucanase, and cellulolytic composition in the blend is from about 5:5:90 to about 35:35:30. In an embodiment, the ratio of the hemicellulase, beta-glucanase and cellulolytic composition is 5:5:90. In an embodiment, the ratio of the hemicellulase, beta-glucanase and cellulolytic composition is between 5:5:90 and 10:10:80. In an embodiment, the ratio of the hemicellulase, beta-glucanase, and cellulolytic composition is 10:10:80. In an embodiment, the ratio of the hemicellulase, beta-glucanase and cellulolytic composition is 15:15:70. In an embodiment, the ratio of the hemicellulase, beta-glucanase, and cellulolytic composition is 20:20:60. In an embodiment, the ratio of the hemicellulase, beta-glucanase, and cellulolytic composition is 19:21:60. In an embodiment, the ratio of the hemicellulase, beta-glucanase, and cellulolytic composition is 18:22:60. In an embodiment, the ratio of the hemicellulase, beta-glucanase, and cellulolytic composition is 17:23:60. In an embodiment, the ratio of the hemicellulase, beta-glucanase, and cellulolytic composition is 16:24:60. In an embodiment, the ratio of the hemicellulase, beta-glucanase, and cellulolytic composition is 15:25:60. In an embodiment, the ratio of the hemicellulase, beta-glucanase and cellulolytic composition is 21:19:60. In an embodiment, the ratio of the hemicellulase, beta-glucanase, and cellulolytic composition is 22:18:60. In an embodiment, the ratio of the hemicellulase, beta-glucanase, and cellulolytic composition is 23:17:60. In an embodiment, the ratio of the hemicellulase, beta-glucanase, and cellulolytic composition is 24:16:60. In an embodiment, the ratio of the hemicellulase, beta-glucanase, and cellulolytic composition is 25:15:60. In an embodiment, the ratio of the hemicellulase, beta-glucanase, and cellulolytic composition is 20:21:59. In an embodiment, the ratio of the hemicellulase, beta-glucanase, and cellulolytic composition is 20:22:58. In an embodiment, the ratio of the hemicellulase, beta-glucanase, and cellulolytic composition is 20:23:57. In an embodiment, the ratio of the hemicellulase, beta-glucanase, and cellulolytic composition is 20:24:56. In an embodiment, the ratio of the hemicellulase, beta-glucanase, and cellulolytic composition is 20:25:55. In an embodiment, the ratio of the hemicellulase, beta-glucanase, and cellulolytic composition is 21:20:59. In an embodiment, the ratio of the hemicellulase, beta-glucanase, and cellulolytic composition is 22:20:58. In an embodiment, the ratio of the hemicellulase, beta-glucanase, and cellulolytic composition is 23:20:57. In an embodiment, the ratio of the hemicellulase, beta-glucanase, and cellulolytic composition is 24:20:56. In an embodiment, the ratio of the hemicellulase, beta-glucanase, and cellulolytic composition is 25:20:55. In an embodiment, the ratio of the hemicellulase, beta-glucanase, and cellulolytic composition is 21:21:58. In an embodiment, the ratio of the hemicellulase, beta-glucanase, and cellulolytic composition is 22:22:56. In an embodiment, the ratio of the hemicellulase, beta-glucanase, and cellulolytic composition is 23:23:54. In an embodiment, the ratio of the hemicellulase, beta-glucanase, and cellulolytic composition is 24:24:52. In an embodiment, the ratio of the hemicellulase, beta-glucanase, and cellulolytic composition is 25:25:50. In an embodiment, the ratio of the hemicellulase, beta-glucanase, and cellulolytic composition is 20-25:20:25:40-50. In an embodiment, the ratio of the hemicellulase, beta-glucanase, and cellulolytic composition is 15-20:15-20:60-70. In an embodiment, the ratio of the hemicellulase, beta-glucanase, and cellulolytic composition is 10-15:10-15:70-80. In an embodiment, the ratio of the hemicellulase, beta-glucanase, and cellulolytic composition is 5-10:5-10:80-90.

In one aspect the present invention relates to an enzyme blend comprising a xylanase, beta-glucanase, and a cellulolytic composition. The enzyme blend is useful for producing a high protein feed ingredient from a whole stillage byproduct produced in a starch-containing grain dry milling process for producing a fermentation product. The enzyme blend optimizes the mass fraction and the protein content on a dry wt % basis of the high protein feed ingredient.

In one aspect the present invention relates to an enzyme blend comprising a xylanase, a beta-glucanase, and a cellulolytic composition. In an embodiment, the enzyme blend comprises at least one hemicellulase, at least one beta-glucanase, and a cellulolytic composition, wherein: (i) the at least one hemicellulase is at least one xylanase selected from the group consisting of a GH3 xylanase, a GH5 xylanase, a GH8 xylanase, GH10 xylanase, a GH11 xylanase, a GH30 xylanase, a GH43 xylanase, and a GH 98 xylanase;

(ii) the at least one beta-glucanase is from a glycoside hydrolase family selected from the group consisting of a GH5_15 family beta-glucanase, a GH16 family beta-glucanase, and a GH64 family beta-glucanase; and (iii) the cellulolytic composition comprises at least three enzymes selected from the group consisting of a cellobiohydrolase I, a cellobiohydrolase II, a beta-glucosidase, a GH61 polypeptide having cellulolytic enhancing activity, and an endoglucanase I. In an embodiment, the enzyme blend comprises at least one xylanase, at least one beta-glucanase, and a cellulolytic composition, wherein: (i) the at least one xylanase is selected from the group consisting of an *Aspergillus* GH10 xylanase, a *Talaromyces* GH10 xylanase, a *Bacillus* GH30_8 xylanase, a *Chryseobacterium* GH5_21 xylanase, an *Acetivibrio* GH5_34 xylanase, a *Clostridium* GH5_34 xylanase, a *Gonapodya prolifera* GH5_34 xylanase, a *Paenibacillus* GH5_35 xylanase, and any combination of at least two, at least three, at least four, at least five or at least six thereof; (ii) the at least one beta-glucanase is selected from the group consisting of a *Rasamsonia* GH5_15 beta-glucanase, a

*Trichoderma* GH5_15 beta-glucanase, an *Albifimbria* GH16 beta-glucanase, a *Lecanicillium* GH16 beta-glucanase, and a *Trichoderma* GH64 family beta-glucanase; and (iii) the cellulolytic composition comprises at least three enzymes selected from the group consisting of an *Aspergillus* cellobiohydrolase I, an *Aspergillus* cellobiohydrolase II, an *Aspergillus* beta-glucosidase, a *Penicillium* GH61 polypeptide having cellulolytic enhancing activity, and a *Trichoderma* endoglucanase I. In an embodiment, the enzyme blend comprises at least one xylanase, at least one beta-glucanase, and a cellulolytic composition, wherein: (i) the at least one xylanase is selected from the group consisting of an *Aspergillus fumigatus* GH10 xylanase, a *Talaromyces leycettanus* GH10 xylanase, a *Bacillus subtilis* GH30_8 xylanase, a *Chryseobacterium* sp-10696 GH5_21 xylanase, an *Acetivibrio cellulyticus* GH5_34 xylanase, a *Clostridium thermocellum* GH5_34 xylanase, a *Gonapodya prolifera* GH5_34 xylanase, a *Paenibacillus favisporus, Paenibacillus illinoisensis* or *Penicillium* sp. GH5_35 xylanase, and any combination of at least two, at least three, at least four, at least five or at least six thereof; and (ii) the at least one beta-glucanase is selected from the group consisting of a *Rasamsonia byssochlamydoides* GH5_15 beta-glucanase, a *Trichoderma atroviride* GH5_15 beta-glucanase, a *Trichoderma harzianum* GH5_15 beta-glucanase, an *Albifimbria verrucaria* GH16 beta-glucanase, a *Lecanicillium* sp. WMM742 GH16 beta-glucanase, and a *Trichoderma harzianum* GH64 family beta-glucanase; (iii) the cellulolytic composition comprises at least three enzymes selected from the group consisting of an *Aspergillus fumigatus* cellobiohydrolase I, an *Aspergillus fumigatus* cellobiohydrolase II, an *Aspergillus fumigatus* beta-glucosidase, a *Penicillium emersonii* GH61 polypeptide having cellulolytic enhancing activity, and a *Trichoderma reesei* endoglucanase I. In an embodiment, the enzyme blend comprises: (a) at least one xylanase selected from the group consisting of: (i) the xylanase shown in amino acids 20 to 397 of SEQ ID NO: 1, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1; (ii) the xylanase shown in amino acids 21 to 404 of SEQ ID NO: 2, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2; (iii) the xylanase shown in amino acids 28 to 417 of SEQ ID NO: 3, or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4; (iv) the xylanase shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4; (v) the xylanase shown in amino acids 25 to 551 of SEQ ID NO: 5, or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5; (vi) the xylanase shown in amino acids 25 to 551 of SEQ ID NO: 6, or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6; (vii) the xylanase shown in SEQ ID NO: 7, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 7; (viii) the xylanase shown in SEQ ID NO: 8, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 8; (ix) the xylanase shown in amino acids 37 to 573 of SEQ ID NO: 9, or one having at least 60%, at least 65%, at least 70%, at least 75%, at least 80%, at least 85%, at least 90%, at least 95%, at least 96%, at least 97%, at least 98%, or at least 99% sequence identity to amino acids 37 to 573 of SEQ ID NO: 9; (x) the xylanase shown in amino acids 36 to 582 of SEQ ID NO: 10 or one having at least 60%, at least 65%, at least 70%, at least 75%, at least 80%, at least 85%, at least 90%, at least 95%, at least 96%, at least 97%, at least 98%, or at least 99% sequence identity to amino acids 36 to 582 of SEQ ID NO: 10; (xi) the xylanase shown in amino acids 24 to 337 of SEQ ID NO: 53 or one having at least 60%, at least 65%, at least 70%, at least 75%, at least 80%, at least 85%, at least 90%, at least 95%, at least 96%, at least 97%, at least 98%, or at least 99% sequence identity to amino acids 24 to 337 of SEQ ID NO: 53; (xii) the xylanase shown in amino acids 1 to 536 of SEQ ID NO: 54, or one having at least 60%, at least 65%, at least 70%, at least 75%, at least 80%, at least 85%, at least 90%, at least 95%, at least 96%, at least 97%, at least 98%, or at least 99% sequence identity to amino acids 1 to 536 of SEQ ID NO: 54;

(b) at least one beta-glucanase selected from the group consisting of: (i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14; (ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17; (iii) at least one GH16 family beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (c) and a cellulolytic composition comprising at least three enzymes selected from the group consisting of: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22; (iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and/or (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24; and (v) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44. In an embodiment, the enzyme blend comprises: (a) at least one xylanase selected from the group consisting of: (i) the xylanase shown in amino acids 20 to 397 of SEQ ID NO: 1, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1; (ii) the xylanase shown in amino acids 21 to 404 of SEQ ID NO: 2, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2; (iii) the xylanase shown in amino acids 28 to 417 of SEQ ID NO: 3, or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4; (iv) the xylanase shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4; (v) the xylanase shown in amino acids 25 to 551 of SEQ ID NO: 5, or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5; (vi) the xylanase shown in amino acids 25 to 551 of SEQ ID NO: 6, or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6; (vii) the xylanase shown in SEQ ID NO: 7, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 7; (viii) the xylanase shown in SEQ ID NO: 8, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 8; (ix) the xylanase shown in amino acids 37 to 573 of SEQ ID NO: 9, or one having at least 60%, at least 65%, at least 70%, at least 75%, at least 80%, at least 85%, at least 90%, at least 95%, at least 96%, at least 97%, at least 98%, or at least 99% sequence identity to amino acids 37 to 573 of SEQ ID NO: 9; (x) the xylanase shown in amino acids 36 to 582 of SEQ ID NO: 10 or one having at least 60%, at least 65%, at least 70%, at least 75%, at least 80%, at least 85%, at least 90%, at least 95%, at least 96%, at least 97%, at least 98%, or at least 99% sequence identity to amino acids 36 to 582 of SEQ ID NO: 10; (xi) the xylanase shown in amino acids 24 to 337 of SEQ ID NO: 53 or one having at least 60%, at least 65%, at least 70%, at least 75%, at least 80%, at least 85%, at least 90%, at least 95%, at least 96%, at least 97%, at least 98%, or at least 99% sequence identity to amino acids 24 to 337 of SEQ ID NO: 53; (xii) the xylanase shown in amino acids 1 to 536 of SEQ ID NO: 54, or one having at least 60%, at least 65%, at least 70%, at least 75%, at least 80%, at least 85%, at least 90%, at least 95%, at least 96%, at least 97%, at least 98%, or at least 99% sequence identity to amino acids 1 to 536 of SEQ ID NO: 54;

(b) at least one beta-glucanase selected from the group consisting of: (i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14; (ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17; (iii) at least one GH16 family beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (c) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 2; (ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22; (iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24. In an embodiment, the enzyme blend comprises: (a) at least one xylanase selected from the group consisting of: (i) the xylanase shown in amino acids 20 to 397 of SEQ ID NO: 1, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1; (ii) the xylanase shown in amino acids 21 to 404 of SEQ ID NO: 2, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2; (iii) the xylanase shown in amino acids 28 to 417 of SEQ ID NO: 3, or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4; (iv) the xylanase shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4; (v) the xylanase shown in amino acids 25 to 551 of SEQ ID NO: 5, or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5; (vi) the xylanase shown in amino acids 25 to 551 of SEQ ID NO: 6, or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6; (vii) the xylanase shown in SEQ ID NO: 7, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 7; (viii) the xylanase shown in SEQ ID NO: 8, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 8; (ix) the xylanase shown in amino acids 37 to 573 of SEQ ID NO: 9, or one having at least 60%, at least 65%, at least 70%, at least 75%, at least 80%, at least 85%, at least 90%, at least 95%, at least 96%, at least 97%, at least 98%, or at least 99% sequence identity to amino acids 37 to 573 of SEQ ID NO: 9; (x) the xylanase shown in amino acids 36 to 582 of SEQ ID NO: 10 or one having at least 60%, at least 65%, at least 70%, at least 75%, at least 80%, at least 85%, at least 90%, at least 95%, at least 96%, at least 97%, at least 98%, or at least 99% sequence identity to amino acids 36 to 582 of SEQ ID NO: 10; (xi) the xylanase shown in amino acids 24 to 337 of SEQ ID NO: 53 or one having at least 60%, at least 65%, at least 70%, at least 75%, at least 80%, at least 85%, at least 90%, at least 95%, at least 96%, at least 97%, at least 98%, or at least 99% sequence identity to amino acids 24 to 337 of SEQ ID NO: 53; (xii) the xylanase shown in amino acids 1 to 536 of SEQ ID NO: 54, or one having at least 60%, at least 65%, at least 70%, at least 75%, at least 80%, at least 85%, at least 90%, at least 95%, at least 96%, at least 97%, at least 98%, or at least 99% sequence identity to amino acids 1 to 536 of SEQ ID NO: 54; (b) at least one beta-glucanase selected from the group consisting of: (i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14; (ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17; (iii) at least one GH16 family beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (c) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44. In an embodiment, the enzyme blend comprises:

(a) a GH30_8 xylanase selected from the group consisting of the one shown in amino acids 28 to 417 of SEQ ID NO: 3 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 and the one shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4; and/or (b) a GH5_21 xylanase selected from the group consisting of comprising, consisting essentially of, or consisting of the one shown in amino acids 25 to 551 of SEQ ID NO: 5 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5 and the one shown in amino acids 25 to 551 of SEQ ID NO: 6 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6; and (c) at least one beta-glucanase selected from the group consisting of: (i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14; (ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17; (iii) at least one GH16 family beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (d) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22; (iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24. In an embodiment, the enzyme blend comprises: (a) a GH30_8 xylanase selected from the group consisting of the one shown in amino acids 28 to 417 of SEQ ID NO: 3 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 and the one shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4; and/or (b) a GH5_21 xylanase selected from the group consisting of comprising, consisting essentially of, or consisting of the one shown in amino acids 25 to 551 of SEQ ID NO: 5 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5 and the one shown in amino acids 25 to 551 of SEQ ID NO: 6 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6; and (c) at least one beta-glucanase selected from the group consisting of: (i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14; (ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17; (iii) at least one GH16 family beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (d) a cellulolytic composition comprising: (i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44.

The ratio of the xylanase, beta-glucanase, and cellulolytic composition in the blend can be adjusted to optimize the mass fraction and the protein content on a dry wt % basis of the high protein feed ingredient. In an embodiment, the ratio of the xylanase, beta-glucanase, and cellulolytic composition in the blend is from about 5:5:90 to about 35:35:30. In an embodiment, the ratio of the xylanase, beta-glucanase and cellulolytic composition is 5:5:90. In an embodiment, the ratio of the xylanase, beta-glucanase and cellulolytic composition is between 5:5:90 and 10:10:80. In an embodiment, the ratio of the xylanase, beta-glucanase, and cellulolytic composition is 10:10:80. In an embodiment, the ratio of the xylanase, beta-glucanase and cellulolytic composition is 15:15:70. In an embodiment, the ratio of the xylanase, beta-glucanase, and cellulolytic composition is 20:20:60.

In an embodiment, the ratio of the xylanase, beta-glucanase, and cellulolytic composition is 19:21:60. In an embodiment, the ratio of the xylanase, beta-glucanase, and cellulolytic composition is 18:22:60. In an embodiment, the ratio of the xylanase, beta-glucanase, and cellulolytic composition is 17:23:60. In an embodiment, the ratio of the xylanase, beta-glucanase, and cellulolytic composition is 16:24:60. In an embodiment, the ratio of the xylanase, beta-glucanase, and cellulolytic composition is 15:25:60.

In an embodiment, the ratio of the xylanase, beta-glucanase and cellulolytic composition is 21:19:60. In an embodiment, the ratio of the xylanase, beta-glucanase, and cellulolytic composition is 22:18:60. In an embodiment, the ratio of the xylanase, beta-glucanase, and cellulolytic composition is 23:17:60. In an embodiment, the ratio of the xylanase, beta-glucanase, and cellulolytic composition is 24:16:60. In an embodiment, the ratio of the xylanase, beta-glucanase, and cellulolytic composition is 25:15:60. In an embodiment, the ratio of the xylanase, beta-glucanase, and cellulolytic composition is 20:21:59. In an embodiment, the ratio of the xylanase, beta-glucanase, and cellulolytic composition is 20:22:58. In an embodiment, the ratio of the xylanase, beta-glucanase, and cellulolytic composition is 20:23:57. In an embodiment, the ratio of the xylanase, beta-glucanase, and cellulolytic composition is 20:24:56. In an embodiment, the ratio of the xylanase, beta-glucanase, and cellulolytic composition is 20:25:55. In an embodiment, the ratio of the xylanase, beta-glucanase, and cellulolytic composition is 21:20:59. In an embodiment, the ratio of the xylanase, beta-glucanase, and cellulolytic composition is 22:20:58. In an embodiment, the ratio of the xylanase, beta-glucanase, and cellulolytic composition is 23:20:57. In an embodiment, the ratio of the xylanase, beta-glucanase, and cellulolytic composition is 24:20:56. In an embodiment, the ratio of the xylanase, beta-glucanase, and cellulolytic composition is 25:20:55. In an embodiment, the ratio of the xylanase, beta-glucanase, and cellulolytic composition is 21:21:58.

In an embodiment, the ratio of the xylanase, beta-glucanase, and cellulolytic composition is 22:22:56. In an embodiment, the ratio of the xylanase, beta-glucanase, and cellulolytic composition is 23:23:54. In an embodiment, the ratio of the xylanase, beta-glucanase, and cellulolytic composition is 24:24:52. In an embodiment, the ratio of the xylanase, beta-glucanase, and cellulolytic composition is 25:25:50. In an embodiment, the ratio of the xylanase, beta-glucanase, and cellulolytic composition is 20-25:20:25:40-50. In an embodiment, the ratio of the xylanase, beta-glucanase, and cellulolytic composition is 15-20:15-20:60-70. In an embodiment, the ratio of the xylanase, beta-glucanase, and cellulolytic composition is 10-15:10-15:70-80. In an embodiment, the ratio of the xylanase, beta-glucanase, and cellulolytic composition is 5-10:5-10:80-90.

In an embodiment, the cellulolytic composition is present in the blend in a ratio of cellulolytic composition, beta-glucanase, and hemicellulase from about 80:10:10 to about 40:30:30, such as from 80:10:10, 75:20:5, 75:15:10, 75:13:12, 75:12:13, 75:10:15, 75:5:20, 70:25:5, 70:20:10, 70:15:15, 70:10:20, 70:5:25, 65:30:5, 65:25:10, 65:20:15, 65:18:17, 65:17:18, 65:15:20, 65:10:25, 65:5:35, 60:35:5, 60:30:10, 60:25:15, 60:20:20, 60:15:25, 60:10:30, 60:5:35, 55:40:5, 55:35:10, 55:30:15, 55:25:20, 55:23:22, 55:22:23, 55:20:25, 55:15:30, 55:10:35, 55:5:40; 50:45:5, 50:40:10, 50:35:15, 50:30:20, 50:25:25, 50:20:30, 50:15:35, 50:10:40, 50:5:45, 45:50:5, 45:45:10, 45:40:15, 45:35:20, 45:30:25, 45:28:27, 45:27:28, 45:25:30, 45:20:35, 45:15:40, 45:10:45, 45:5:40, 40:55:5, 40:50:10, 40:45:15, 40:40:20, 40:35:25, 40:30:30, 40:25:35, 40:20:40, 40:15:45, 40:10:50, and 40:5:55, preferably from about 50-70:15-25:15-25, or most preferably about 55-60:18-23:18-23.

In an embodiment, the cellulolytic composition is present in the blend in a ratio of cellulolytic composition, beta-glucanase, and xylanase from about 80:10:10 to about 40:30:30, such as from 80:10:10, 75:20:5, 75:15:10, 75:13:12, 75:12:13, 75:10:15, 75:5:20, 70:25:5, 70:20:10, 70:15:15, 70:10:20, 70:5:25, 65:30:5, 65:25:10, 65:20:15, 65:18:17, 65:17:18, 65:15:20, 65:10:25, 65:5:35, 60:35:5, 60:30:10, 60:25:15, 60:20:20, 60:15:25, 60:10:30, 60:5:35, 55:40:5, 55:35:10, 55:30:15, 55:25:20, 55:23:22, 55:22:23, 55:20:25, 55:15:30, 55:10:35, 55:5:40; 50:45:5, 50:40:10, 50:35:15, 50:30:20, 50:25:25, 50:20:30, 50:15:35, 50:10:40, 50:5:45, 45:50:5, 45:45:10, 45:40:15, 45:35:20, 45:30:25, 45:28:27, 45:27:28, 45:25:30, 45:20:35, 45:15:40, 45:10:45, 45:5:40, 40:55:5, 40:50:10, 40:45:15, 40:40:20, 40:35:25, 40:30:30, 40:25:35, 40:20:40, 40:15:45, 40:10:50, and 40:5:55, preferably from about 50-70:15-25:15-25, or most preferably about 55-60:18-23:18-23.

Hemicellulase

The present invention contemplates using any hemicellulase that, when optionally blended together with a beta-glucanase and/or cellulolytic composition various ratios, partitions a greater amount of protein from the whole stillage byproduct into the high protein fraction, rather than being retained in the wet cake, to produce a high protein feed ingredient. Exemplary hemicellulases include, without limitation, acetylxylan esterases, α-glucuronidases, α-L-arabinofuranosidases, feruloyl esterases, galactosidases (α-L-galactosidases or α-D-galactosidases), pectin-degrading enzymes, xylanases, and any combination thereof. In one embodiment, the hemicellulase is selected from the group consisting of an acetylxylan esterase, a α-glucuronidase, a α-L-arabinofuranosidase, a α-L-galactosidase, a feruloyl esterase, a α-D-galactosidase, a pectin-degrading enzyme, a xylanase, and any combination thereof.

Acetylxylan Esterase

The present invention contemplates using any acetylxylan esterase that, when optionally blended together with a xylanase, beta-glucanase, and/or cellulolytic composition in various ratios, is capable of partitioning a greater amount of protein from the whole stillage byproduct into the high protein fraction, rather than being retained in the wet cake, to produce a high protein feed ingredient.

An acetyl xylan esterase may be a member of Carbohydrate Esterase Family 1, 2, 3, 4, 5, 6, 7, 12 or 15 and PF05448. In an embodiment, the hemicellulase is an acetylxylan esterase from a Carbohydrate Esterase Family selected from the group consisting of CE1, CE2, CE3, CE4, CE5, CE6, CE7, CE12, CE15, and PF05448.

Examples of acetylxylan esterases useful in the processes and enzyme blends of the present invention include, but are not limited to, acetylxylan esterases from *Aspergillus aculeatus* (WO 2010/108918), *Chaetomium globosum* (UniProt:Q2GWX4), *Chaetomium gracile* (GeneSeqP: AAB82124), *Humicola insolens* DSM 1800 (WO 2009/073709), *Hypocrea jecorina* (WO 2005/001036), *Myceliophtera thermophila* (WO 2010/014880), *Neurospora crassa* (UniProt:q7s259), *Phaeosphaeria nodorum* (UniProt:Q0UHJ1), and *Thielavia terrestris* NRRL 8126 (WO 2009/042846). In an embodiment, the acetylxylan esterase is from *Aspergillus aculeatus* (WO 2010/108918) or a variant thereof. In an embodiment, the acetylxylan esterase is from *Chaetomium globosum* (UniProt:Q2GWX4) or a variant thereof. In an embodiment, the acetylxylan esterase is from *Chaetomium gracile* (GeneSeqP:AAB82124) or a variant thereof. In an embodiment, the acetylxylan esterase is from *Humicola insolens* DSM 1800 (WO 2009/073709) or a variant thereof. *Hypocrea jecorina* (WO 2005/001036) or a variant thereof. In an embodiment, the acetylxylan esterase is from *Myceliophtera thermophila* (WO 2010/014880) or a variant thereof. In an embodiment, the acetylxylan esterase is from *Neurospora crassa* (UniProt: q7s259) or a variant thereof. In an embodiment, the acetylxylan esterase is from *Phaeosphaeria nodorum* (UniProt:Q0UHJ1) or a variant thereof. In an embodiment, the acetylxylan esterase is from *Thielavia terrestris* NRRL 8126 (WO 2009/042846) or a variant thereof.

α-glucuronidase

The present invention contemplates using any α-glucuronidase that, when optionally blended together with a xylanase, beta-glucanase, and/or cellulolytic composition in various ratios, partitions a greater amount of protein from the whole stillage byproduct into the high protein fraction, rather than being retained in the wet cake, to produce a high protein feed ingredient.

An alpha-glucuronidase may comprise a catalytic domain of GH Family 4, 67, or 115. In an embodiment, the α-glucuronidase is selected from the group consisting of a GH115 α-glucuronidase having xylan α-1,2-glucuronidase activity, a GH4 α-glucuronidase having α-glucuronidase activity, and a GH67 α-glucuronidase having xylan α-1,2-glucuronidase activity.

Examples of alpha-glucuronidases useful in the processes and enzyme blends of the present invention include, but are not limited to, alpha-glucuronidases from *Aspergillus clavatus* (UniProt:alcc12), *Aspergillus fumigatus* (SwissProt: Q4VWV45), *Aspergillus niger* (UniProt:Q96WX9), *Aspergillus terreus* (SwissProt:Q0CJP9), *Humicola insolens* (WO 2010/014706), *Penicillium aurantiogriseum* (WO 2009/068565), *Talaromyces emersonii* (UniProt:Q8X21 1), and *Trichoderma reesei* (UniProt:Q99024).

In an embodiment, the hemicellulase is an alpha-glucuronidase is an *Aspergillus clavatus* alpha-glucuronidase (UniProt:alcc12) or a variant thereof. In an embodiment, the hemicellulase is an alpha-glucuronidase is an *Aspergillus fumigatus* alpha-glucuronidase (SwissProt:Q4VWV45) or a variant thereof. In an embodiment, the hemicellulase is an alpha-glucuronidase is an *Aspergillus niger* alpha-glucuronidase (UniProt:Q96WX9) or a variant thereof. In an embodiment, the hemicellulase is an alpha-glucuronidase is an *Aspergillus terreus* alpha-glucuronidase (SwissProt: Q0CJP9) or a variant thereof. In an embodiment, the hemicellulase is an alpha-glucuronidase is an *Humicola insolens* alpha-glucuronidase (WO 2010/014706) or a variant thereof. In an embodiment, the hemicellulase is an alpha-glucuronidase is an *Penicillium aurantiogriseum* alpha-glucuronidase (WO 2009/068565) or a variant thereof. In an embodiment, the hemicellulase is an alpha-glucuronidase is an *Talaromyces emersonii* alpha-glucuronidase (UniProt: Q8X21 1) or a variant thereof. In an embodiment, the hemicellulase is an alpha-glucuronidase is an *Trichoderma reesei* alpha-glucuronidase (UniProt:Q99024) or a variant thereof.

α-L-Arabinofuranosidase

The present invention contemplates using any alpha-L-arabinofuranosidase that, when optionally blended together with a xylanase, beta-glucanase, and/or cellulolytic composition in various ratios, partitions a greater amount of protein from the whole stillage byproduct into the high protein fraction, rather than being retained in the wet cake, to produce a high protein feed ingredient.

An alpha-L-arabinofuranosidase may comprise a catalytic domain of GH Family 3, 10, 43, 51, 54, or 62. In an embodiment, the α-L-arabinofuranosidase is from a Glycoside Hydrolase Family selected from the group consisting of GH3, GH10, GH43, GH51 and GH62. In an embodiment, the GH43 α-L-arabinofuranosidase is from a subfamily selected from the group consisting of 1, 10, 11, 12, 19 21, 26, 27, 29, 35 and 36.

In an embodiment, the GH43 arainofuranosidase is from the genus *Humicola*, for example *Humicola insolens*, such as the arabinofuranosidase shown in amino acids 19 to 558 of SEQ ID NO: 56 or the arabinofuranosidase shown in amino acids 24 to 575 of SEQ ID NO: 57, or one having at least 60%, at least 65%, at least 70%, at least 75%, at least 80%, at least 85%, at least 90%, at least 95%, at least 96%, at least 97%, at least 98%, or at least 99% sequence identity to amino acids 19 to 558 of SEQ ID NO: 56 or amino acids 24 to 575 of SEQ ID NO: 57.

Examples of arabinofuranosidases useful in the processes of the present invention include, but are not limited to, arabinofuranosidases from *Aspergillus niger* (GeneSeqP: AAR94170), *Humicola insolens* DSM 1800 (WO 2006/114094 and WO 2009/073383), and *M. giganteus* (WO 2006/114094).

In an embodiment, the hemicellulase is a *Aspergillus niger* arabinofuranosidase (GeneSeqP:AAR94170) or a variant thereof. In an embodiment, the hemicellulase is a *Humicola insolens* DSM 1800 arabinofuranosidase (WO 2006/114094 and WO 2009/073383) or a variant thereof. In an embodiment, the hemicellulase is a *M. giganteus* arabinofuranosidase (WO 2006/114094) or a variant thereof.

In an embodiment, the GH51 arainofuranosidase is from the genus *Golletotrichum*, for example *Colletotrichum graminicola*, such as the arabinofuranosidase shown in amino acids 20 to 663 of SEQ ID NO: 58 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 663 of SEQ ID NO: 58.

In an embodiment, the GH51 arainofuranosidase is from the genus *Trametes*, for example *Trametes hirsuta*, such as the arabinofuranosidase shown in amino acids 17 to 643 of SEQ ID NO: 59 or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 643 of SEQ ID NO: 59.

In an embodiment, the GH62 family α-L-arabinofuranosidase is a GH62_1 α-L-arabinofuranosidase.

In an embodiment, the GH62_1 α-L-arabinofuranosidase is from the genus *Talaromyces*, for example *Talaromyces pinophilus*, such as the α-L-arabinofuranosidase (arabinofuranosidase) shown in amino acids 17 to 325 of SEQ ID NO: 11, or shown in amino acids 18 to 335 of SEQ ID NO: 55, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 325 of SEQ ID NO: 11, or amino acids 18 to 335 of SEQ ID NO: 55.

Galactosidase

The present invention contemplates using any galactosidase that, when optionally blended together with a xylanase, beta-glucanase, and/or cellulolytic composition in various ratios, partitions a greater amount of protein from the whole stillage byproduct into the high protein fraction, rather than being retained in the wet cake, to produce a high protein feed ingredient.

Alpha-galactosidase (EC 3.2.1.22) is a glycoside hydrolase enzyme that hydrolyses the terminal alpha-galactosyl moieties from glycolipids and glycoproteins that is present in, e.g. legumes, vegetables, grains, cereals and the like. Alpha-galactosidase are produced by various microorganisms, plants and animals.

Alpha-galactosidases (α-D-galactosidase and/or α-L-galactosidase) of use in the processes and enzyme blends of the present invention may be from a Glycoside Hydrolase family selected from the group consisting of GH27, GH36, GH4 and GH57_A.

Examples of suitable GH36 Family alpha-galactosidases include, without limitation, GH36 alpha-galactosidase as isolated from *Bacillus deramificans*. *Bacillus acidopullulyticus, Anoxybacillus bogrovensis, Aspergillus sydowii, Aspergillus sydowii*, Sac///tvs sp-19140, *Aspergillus puniceus, Parageobacillus thermoglucosidans* (each of which is described in detail in WO17202966A1 (which is incorporated herein by reference in its entirety). In an embodiment, the hemicellulase is a *Bacillus deramificans* alpha-galactosidase or a variant thereof. In an embodiment, the hemicellulase is a *Bacillus acidopullulyticus* alpha-galactosidase or a variant thereof. In an embodiment, the hemicellulase is a *Anoxybacillus* bogrovensis alpha-galactosidase or a variant thereof. In an embodiment, the hemicellulase is an *Aspergillus sydowii* alpha-galactosidase or a variant thereof. In an embodiment, the hemicellulase is a *Aspergillus sydowii* alpha-galactosidase or a variant thereof. In an embodiment, the hemicellulase is a Sac///tvs sp-19140 alpha-galactosidase or a variant thereof. In an embodiment, the hemicellulase is a *Aspergillus puniceus* alpha-galactosidase or a variant thereof. In an embodiment, the alpha-galactosidase is a *Parageobacillus thermoglucosidans* alpha-galactosidase or a variant thereof. In an embodiment, the hemicellulase is the alpha-galactosidase disclosed in WO1994/23022 (incorporated herein by reference in its entirety) or a variant thereof.

Ferulic Acid (Feruloyl) Esterase

The present invention contemplates using any ferulic acid esterase that, when optionally blended together with a xylanase, beta-glucanase and/or cellulolytic composition in various ratios, partitions a greater amount of protein from the whole stillage byproduct into the high protein fraction, rather than being retained in the wet cake, to produce a high protein feed ingredient.

Examples of ferulic acid esterases useful in the processes and blends of the present invention include, but are not limited to *Humicola insolens* DSM 1800 (WO 2009/076122), *Neosartorya fischeri* (UniProt:A1 D9T4), *Neurospora crassa* (UniProt:Q9HGR3), *Penicillium aurantiogriseum* (WO 2009/127729), and *Thielavia terrestris* (WO 2010/053838 and WO 2010/065448).

In an embodiment, the hemicellulase is a *Humicola insolens* DSM 1800 ferulic acid esterase (WO 2009/076122) or variant thereof. In an embodiment, the hemicellulase is a *Neosartorya fischeri* ferulic acid esterase (UniProt:A1 D9T4) or variant thereof. In an embodiment, the hemicellulase is a *Neurospora crassa* ferulic acid esterase (UniProt: Q9HGR3) or a variant thereof. In an embodiment, the hemicellulase is a *Penicillium aurantiogriseum* ferulic acid esterase (WO 2009/127729) or a variant thereof. In an embodiment, the hemicellulase is a *Thielavia terrestris* ferulic acid esterase (WO 2010/053838 and WO 2010/065448) or a variant thereof.

Pectin-Degrading Enzymes

The present invention contemplates using any pectin-degrading enzyme that, when optionally blended together with a xylanase, beta-glucanase and/or a cellulolytic composition in various ratios, partitions a greater amount of protein from the whole stillage byproduct into the high protein fraction, rather than being retained in the wet cake, to produce a high protein feed ingredient.

Exemplary pectin-degrading enzymes of use in the processes and enzyme blends of the present invention include, without limitation an arabinase (e.g., GH43 family), a galactanase (e.g., GH53 family), a pectin acetylesterase/rhamnogalacturonan acetylesterase (e.g., CE12 family), a pectate lyase (e.g., PL1 family), a pectin lyase (e.g., PL1 family), a pectin metylesterase (e.g., CE12 family), a pectine transeliminase, a polygalacturonase (e.g., GH28 family), a rhamnogalacturonan hydrolase (e.g., GH28 family), a rhamnogalacturonan lyase (e.g., PL4 family), a xylogalacturonan hydrolase (e.g., GH28 family), and any combination thereof.

Any pectinolytic enzyme with the ability to degrade pectin may be used in practicing the present invention. Suitable pectinases include, without limitation, those of fungal or bacteria lorigin. Chemically or genetically modified pectinases are also encompassed. Pectinases can be classified according to their preferential substrate, highly methyl-esterified pectin or low methyl-esterified pectin and polygalacturonic acid(pectate), and their reaction mechanism, beta-elimination or hydrolysis. Pectinases can be mainly endo-acting, cutting the polymer at random sites within the chain to give a mixture of oligomers, or they may be exo-acting, attacking from one end of the polymer and producing monomers or dimers. Several pectinase activities acting on the smooth regions of pectin are included in the classification of enzymes provided by Enzyme Nomenclature (1992), e.g., pectate lyase (EC 4.2.2.2), pectin lyase (EC 4.2.2.10), polygalacturonase (EC 3.2.1.15), exo-polygalacturonase (EC 3.2.1.67), exo-polygalacturonate lyase (EC 4.2.2.9) and exo-poly-alpha-galacturonosidase (EC 3.2.1.82). In preferred embodiments, the methods of the invention utilize pectate lyases.

Pectate lyase enzymatic activity as used herein refers to catalysis of the random cleavage of-1,4-glycosidic linkages in pectic acid (also called polygalcturonic acid) by transelimination. Pectate lyases are also termed polygalacturonate lyases and poly (1,4-D-galacturonide) lyases. For purposes of the present invention, pectatelyase enzymatic activity is the activity determined by measuring the increase inabsorbance at 235 nm of a 0.1% w/v solution of sodium polygalacturonate in 0.1M glycine buffer at pH 10. Enzyme activity is typically expressed as x mol/min, i. e., the amount of enzyme that catalyzes the formation of x mole product/min. An alternative assay measures the decrease in viscosity of a 5% w/v solution of sodium polygalacturonate in 0.1M glycine buffer at pH 10, as measured by vibrationviscometry (APSU units).

It will be understood that any pectate lyase may be used in practicing the present invention. Non-limiting examples of pectate lyases whose use is encompassed by the present invention include pectate lyases that have been cloned from different bacterial genera such as *Erwinia, Pseudomonas, Klebsiella* and *Xanthomonas*, as well as from *Bacillus subtilis* (Nasser et al. (1993) FEBS Letts. 335: 319-326) and *Bacillus* sp. YA-14 (Kim et al. (1994) Biosci. Biotech. Biochem. 58: 947-949). In some embodiments, the pectate lyase comprises the amino acid sequence of a pectate lyase disclosed in Heffron et al., (1995) Mol. Plant-Microbe Interact. 8:331-334 and Henrissat et al., (1995) Plant Physiol. 107: 963-976.

Commercially available enzymes useful in the methods of the present invention include, but are not limited to, PECTINEX™ (an *Aspergillus niger* pectinase preparation containing mainly pectinase, hemicellulase, and cellulase, available from Novo Nordisk A/S, Bagsvaerd, Denmark); CITROZYM™ (an *Aspergillus niger* enzyme preparation containing pectinase, hemicellulase and arabinase, available from Novo Nordisk A/S, Bagsvaerd, Denmark); OLIVEX™ (an *Aspergillus aculeatus* enzyme preparation containing pectinase, hemicellulase, and cellulase, available from Novo Nordisk A/S, Bagsvaerd, Denmark); PEELZYME™ (a mixture of *Aspergillus niger* and *Trichoderma reesei* pectinase, hemicellulase, cellulase, and arabinase, available from Novo Nordisk A/S, Bagsvaerd, Denmark); ULTRAZYM™ (an *Aspergillus niger* enzyme preparation containing polygalacturonase, pectin transeliminase, pectin esterase, and hemicellulase, available from Novo Nordisk A/S, Bagsvaerd, Denmark).

Xylanase

In preferred embodiments of the present invention, the hemicellulase is a xylanase. The present invention contemplates using any xylanase that, when optionally blended together with a beta-glucanase, and/or a cellulolytic composition in various ratios, partitions a greater amount of protein from the whole stillage byproduct into the high protein fraction, rather than being retained in the wet cake, to produce a high protein feed ingredient.

Exemplary xylanases of use in the processes and enzyme blends of the present invention include, without limitation, xylanases from a Glycoside Hydrolase Family selected from the group consisting of a GH3 family xylanase, GH5 family xylanase, a GH7 family xylanase, a GH8 family xylanase, a GH10 family xylanase, a GH11 family xylanase, a GH30 family xylanase, a GH43 family xylanase, and a GH98 family xylanase. GH families 5, 7, 8, 10, 11 and 43 have been reviewed by Collins et al. (FEMS Microbiology Reviews 29 (2005) 3-23, which is incorporated herein in its entirety for its teachings related to the classification, structure, and mechanism of action of the GH family 5, 8, 10, 11 and 43 xylanases described therein). The production, purification, and application of microbial xylanases has been reviewed by Malhotra and Chapadgaonkar 2018 (Biotechnologia 99(1) (2018) 59-72, which is incorporated herein in its entirety).

GH3 family xylanases consist primarily of xylan 1,4-β-xylosidases (EC 3.2.1.37), which catalyze the hydrolysis of (1→4)-β-D-xylans, to remove successive D-xylose residues from the non-reducing termini. In an embodiment, the xylanase is a GH3 family xylanase. In an embodiment, the xylanase is a GH3 family xylanase belonging to EC 3.2.1.37. In an embodiment, the xylanase is a GH3 family xylanase that catalyzes the hydrolysis of (1→4)-β-D-xylans, to remove successive D-xylose residues from the non-reducing termini.

GH5 family xylanases consist primarily of endo-1,4-β-xylanases (EC 3.2.1.8), which catalyze the endohydrolysis of (1→4)-β-D-xylosidic linkages in xylans. In an embodiment, the xylanase is a GH5 family xylanase. In an embodiment, the xylanase is a GH5 family xylanase belonging to EC 3.2.1.8. In an embodiment, the xylanase is a GH5 family xylanase that catalyzes the endohydrolysis of (1→4)-β-D-xylosidic linkages in xylans. In an embodiment, the GH5 family xylanase is from a GH family selected from the group consisting of GH5_21, GH5_34 and GH5_35.

In an embodiment, the GH5_21 xylanase is from the genus *Chryseobacterium*, for example *Chryseobacterium* sp-10696, such as the xylanase shown in amino acids 25 to 551 of SEQ ID NO: 5 or amino acids 25 to 551 of SEQ ID NO: 6, or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5 or amino acids 25 to 551 of SEQ ID NO: 6.

In an embodiment, the G5_34 xylanase is from the genus *Acetivibrio*, for example *Acetivibrio cellulyticus*, such as the xylanase shown in SEQ ID NO: 7, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 7.

In an embodiment, the G5_34 xylanase is from the genus *Clostridium*, for example *Clostridium thermocellum*, such as the xylanase shown in SEQ ID NO: 8, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 8.

In an embodiment, the G5_34 xylanase is from the genus *Gonapodya*, for example *Gonapodya prolifera*, such as the xylanase shown in SEQ ID NO: 53, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 53.

In an embodiment, the GH5_35 xylanase is from the genus *Paenibacillus*, for example *Paenibacillus illinoisensis*, such as the xylanase shown in amino acids 37 to 573 of SEQ ID NO: 9, or for example *Paenibacillus* sp., such as the xylanase shown in amino acids 36 to 582 of SEQ ID NO: 10, or for example *Paenibacillus favisporus*, such as the xylanase shown in amino acids 1 to 536 of SEQ ID NO: 54, or one having at least 60%, at least 65%, at least 70%, at least 75%, at least 80%, at least 85%, at least 90%, at least 95%, at least 96%, at least 97%, at least 98%, or at least 99% sequence identity to amino acids 37 to 573 of SEQ ID NO: 9, amino acids 36 to 582 of SEQ ID NO: 10, or amino acids 1 to 536 of SEQ ID NO: 54.

GH10 family xylanases consists of a several endo-1,3-β-xylanases (EC 3.2.1.32), though the majority are endo-1, 4-β-xylanases (EC 3.2.1.8). Endo-1,3-β-xylanases catalyze the random endohydrolysis of (1→3)-β-D-glycosidic linkages in (1→3)-β-D-xylans. The reaction of endo-1, 4-β-xylanases (EC 3.2.1.8) is noted above. In an embodiment, the xylanase is a GH10 family xylanase. In an embodiment, the xylanase is a GH10 family xylanase belonging to EC 3.2.1.32. In an embodiment, the xylanase is a GH10 family xylanase belonging to EC 3.2.1.8. In an embodiment, the xylanase is a GH10 family xylanase that catalyzes the random endohydrolysis of (1→3)-β-D-glycosidic linkages in (1→3)-β-D-xylans. In an embodiment, the GH10 family xylanase is a xylanase that catalyzes the endohydrolysis of (1→4)-β-D-xylosidic linkages in xylans.

In an embodiment, the GH10 xylanase is from the genus *Aspergillus*, for example *Aspergillus fumigatus*, such as the xylanase shown in amino acids 20 to 397 of SEQ ID NO: 1, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1.

In an embodiment, the GH10 family xylanase is from the genus *Talaromyces*, for example *Talaromyces leycettanus*, such as the xylanase shown in amino acids 21 to 404 of SEQ ID NO: 2, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2.

In an embodiment, the GH10 family xylanase is from the genus *Penicillium*, for example, *Penicillium funiculosum*, such as the xylanase shown in amino acids 20 to 407 of SEQ ID NO: 45 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 407 of SEQ ID NO: 45.

GH11 family xylanases include endo-β-1,4-xylanases (EC 3.2.1.8) and endo-β-1,3-xylanase (EC 3.2.1.32). In an embodiment, the xylanase is a GH11 family xylanase. In an embodiment, the xylanase is a GH11 family xylanase belonging to EC 3.2.1.32. In an embodiment, the xylanase is a GH11 family xylanase belonging to EC 3.2.1.8. In an embodiment, the xylanase is a GH11 family xylanase that catalyzes the random endohydrolysis of (1→3)-β-D-glycosidic linkages in (1→3)-β-D-xylans. In an embodiment, the GH11 family xylanase is a xylanase that catalyzes the endohydrolysis of (1→4)-β-D-xylosidic linkages in xylans.

GH30 family xylanases include endo-β-1,4-xylanase (EC 3.2.1.8), β-xylosidases (EC 3.2.1.37); and glucuronoarabinoxylan endo-β-1,4-xylanases (EC 3.2.1.136). The reactions of the former two xylanases are noted above. Glucuronoarabinoxylan endo-β-1,4-xylanases catalyse the endohydrolysis of (1→4)-β-D-xylosyl links in some glucuronoarabinoxylans. In an embodiment, the xylanase is a GH30 family xylanase. In an embodiment, the xylanase is a GH30 family xylanase belonging to EC 3.2.1.8. In an embodiment, the xylanase is a GH30 family xylanase belonging to EC 3.2.1.37. In an embodiment, the xylanase is a GH30 family xylanase belonging to EC 3.2.1.136. In an embodiment, the xylanase is a GH30 family xylanase that catalyzes the endohydrolysis of (1→4)-β-D-xylosidic linkages in xylans. In an embodiment, the xylanase is a GH30 family xylanase that catalyzes the hydrolysis of (1→4)-β-D-xylans, to remove successive D-xylose residues from the non-reducing termini. In an embodiment, the xylanase is a GH30 family xylanase that catalyzes the endohydrolysis of (1→4)-β-D-xylosyl links in some glucuronoarabinoxylans.

In an embodiment, the GH30 family xylanase is a GH30_8 family xylanase.

In an embodiment, the GH30_8 family xylanase is from the genus *Bacillus*, for example *Bacillus subtilis*, such as the xylanase shown in amino acids 28 to 417 of SEQ ID NO: 3 or amino acids 28 to 417 of SEQ ID NO: 4, or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4.

Additional GH30_8 xylanases suitable for use in the processes, methods and enzyme blends of the present invention are described in International Patent Application Publication No. WO 20-9/055455 (incorporated herein by reference in its entirety).

Examples of xylanases useful in the processes and enzyme blends of the present invention include, but are not limited to, *Aspergillus aculeatus* xylanase (GeneSeqP: AAR63790; WO 94/21785); *Aspergillus fumigatus* xylanases (WO 2006/078256); *Penicillium pinophilum* (WO 201 1/041405); *Penicillium* sp. (WO 2010/126772); *Thielavia terrestris* NRRL 8126 (WO 2009/079210); and *Trichophaea saccata* GH 10 (WO 2011/057083).

In one embodiment, the xylanase is from the taxonomic order Bacillales, or preferably the taxonomic family Bacillaceae or Paenibacillaceae, or more preferably from the taxonomic genus *Bacillus* or *Paenibacillus*, or even more preferably from the taxonomic species *Bacillus subtilis, Bacillus amyloliquefaciens, Bacillus licheniformis* or *Paenibacillus pabuli.*

Other examples of suitable xylanases are the following GENESEQP accession numbers: BCM03690, BBY25441, BBD43833, AZG87760, BBW75090, BCM03682, BBW96675, BCM03671, ADJ35022, BBW83525, BCM03685, BBW88031, BCM03707, AZH70238, AZG87766, BBX36748, BCM03686, AZQ23477, BCM03677, BCM03691, BCM03681, BCM03676, BCM03688, AZG68558, ADJ35028, BCM03687, BBG80964, AZX66647, AZH70244, BCM03689, AZM95903, BBW79314, BBX47049, BCM03683, BCM03679, BBW95840, BBX52401, BBW92246, BBX42063 and AZG68552.

Other examples of suitable xylanases are following Uniprot accession numbers: A0A016QIT0, A0A024BEN2, A0A059N8P2, A0A060J1Q4, A0A060J3N3, A0A060MDP8, A0A063XEB2, A0A063Z3F5, A0A066ZQH2, A0A068QG80, A0A069DJA1, A0A074QA16, A0A076GH62, A0A076X095, A0A080UGI0, A0A081DRH7, A0A081L9P3, A0A085CCQ4, A0A086DRT4, A0A086SGC4, A0A086VWVT9, A0A089J0T9, A0A089L7Q4, A0A089LS30, A0A089MA96, A0A089MMY5, A0A090ZY18, A0A093UG96, A0A097RET6, A0A097RT57, A0A0A0TJX0, A0A0A0TS05, A0A0A1STB1, A0A0A7GLZ8, A0A0A8C3V5, A0A0B0QGI0, A0A0B4S841, A0A0C2TMZ1, A0A0C5CYD2, A0A0D7XHL0, A0A0D7XPV8, A0A0D8JJW7, A0A0E1LNG3, A0A0E1P2T5, A0A0F5MCQ0, A0A0F5YUV2, A0A0G2M1V3, A0A0G2Z099, A0A0G3VDP8, A0A0H1RW51, A0A0H3DZC9, A0A0J1HNE5, A0A0J118S6, A0A0J5XBB3, A0A0J6E3H1, A0A0J6ENY2, A0A0J6MZ81, A0A0J6PTT5, A0A0K0HYL4, A0A0K6JZ62, A0A0K6L1E5, A0A0K6L5CO, A0A0K6LRC5, A0A0K6MBZ9, A0A0K9E179, A0A0K9G2M8, A0A0L6C9N3, A0A0L7MT05, A0A0L7SGL4, A0A0M0HBT0, A0A0M2E136, A0A0M2S6E2, A0A0M9X369, A0A0P0TKN9, A0A0P7GC51, A0A0Q3W7T1, A0A0Q4R817, A0A0Q7SDS0, A0A0R3K873, A0A0T6LD54, A0A0U3M226, A0A0U5Q000, A0A0V8QN06, A0A0V8QPQ0, A0A0V8RCKO, A0A0W1Q0Y8, A0A0W7X148, A0A0W8K830, A0A0X1TCR2, A0A0X8C7K8, A0A0X8DHN5, A0A0X8KDH2, A0A101YC92, A0A101YL97, A0A117SZP6, A0A124JQM2, A0A125UIF6, A0A127DQZ4, A0A132BP80, A0A132TGU4, A0A132TSQ5, A0A136AEB9, A0A142F586, A0A150L2Y6, A0A160EHDO, A0A164XMN2, A0A172HNW1, A0A172XIR5, A0A199N163, A0A199WHT5, A0A1A0CC44, A0A1AOG7Q3, A0A1A5W23, A0A1A5YLD9, A0A1A7LKF3, A0A1B2AW76, A0A1C3SIT4, A0A1C4AHG6, A0A1D9PK78, A0A1E4Y0F1, A0A1G9MAD1, A0A1J0BBP6, A0A1J0C7I7, A0A1J5WRC5, A0A1J6F1D5, A0A1K1TBA7, A0A1L3PT45, A0A1L3QY16, A0A1L3SH52, A0A1L4DM20, A0A1L5LNU4, A0A1L6CEM3, A0A1L6ZLN8, A0A1L6ZTD9, A0A1M7SMM4, A0A1N6S500, A0A1N7B930, A0A1N7E7E0, A0A1R1E8G3, A0A1R1ESJ7, A0A1R1FQ77, A0A1R1GBK8, A0A1R1GT02, A0A1R1HH77, A0A1S2F2R2, A0A1U3ULV5, A7Z5A1, A8FDV2, B3KF38, D1MEP8, D3EH02, D4FXC2, E0RDU2, E1ACF9, E1UV03, E3E322, E8VJ45, F4E4B0, F4EKU6, G0IKW9, G4EVQ6, G4HGL4, G4P7F1, G7W2J1, H0FNN1, H1ACZ7, H2AJ54, H3K352, H6CPJ0, H6WCZ0, H8XMR3, I4XB64, J0X3V6, J7JVZ4, K2HJT3, K2P3H7, L0BLZ3, L0CY72, L8AKB2, M1KJT1, M1U2J5, M1XAU4, M2U9N8, N0DFI8, Q45070, Q6YK37, Q70K02, R9TYN3, S6FS40, S6FXS9, U1T362, U1ZC44, U2TM90, U4PL99, U5X5B8, V5MRU9, V7Q6M1, V9REY3, W4AZH7, W4BXI4, W4C6X9, W4D801, W4DEL3, W8ILG7 and W9TFT6.

In an embodiment, the xylanase comprises a variant xylanase having one or more substitutions described in EP Application No. 17177304.7 (incorporated herein by reference in its entirety).

In an embodiment, the xylanase comprises a variant xylanase having one or more substitutions described in International Patent Application No. PCT/EP2017/065336 (incorporated herein by reference in its entirety).

The xylanase may be obtained from microorganisms of any genus. For purposes of the present invention, the term "obtained from" as used herein in connection with a given source shall mean that the parent encoded by a polynucleotide is produced by the source or by a strain in which the polynucleotide from the source has been inserted. In one aspect, the parent is secreted extracellularly.

The polypeptide may be a bacterial polypeptide. For example, the polypeptide may be a Gram-positive bacterial polypeptide such as a *Bacillus, Clostridium, Enterococcus, Geobacillus, Lactobacillus, Lactococcus, Oceanobacillus, Staphylococcus, Streptococcus*, or *Streptomyces* polypeptide having xylanase activity. In one embodiment, the polypeptide is from a bacterium of the class Bacilli, such as from the order Bacillales, or preferably the taxonomic family Bacillaceae or Paenibacillaceae, or more preferably from the taxonomic genus *Bacillus* or *Paenibacillus*, or even more preferably from the taxonomic species *Bacillus subtilis, Bacillus amyloliquefaciens, Bacillus licheniformis* or *Paenibacillus pabuli.*

In one aspect, the xylanase is a *Bacillus alkalophilus, Bacillus amyloliquefaciens, Bacillus brevis, Bacillus circulans, Bacillus clausii, Bacillus coagulans, Bacillus firmus, Bacillus lautus, Bacillus lentus, Bacillus licheniformis, Bacillus megaterium, Bacillus pumilus, Bacillus stearothermophilus, Bacillus subtilis*, or *Bacillus thuringiensis* xylanase.

It will be understood that for the aforementioned species, the invention encompasses both the perfect and imperfect states, and other taxonomic equivalents, e.g., anamorphs, regardless of the species name by which they are known. Those skilled in the art will readily recognize the identity of appropriate equivalents.

Strains of these species are readily accessible to the public in a number of culture collections, such as the American Type Culture Collection (ATCC), Deutsche Sammlung von Mikroorganismen and Zellkulturen GmbH (DSMZ), Centraalbureau Voor Schimmelcultures (CBS), and Agricultural Research Service Patent Culture Collection, Northern Regional Research Center (NRRL).

The xylanase may be identified and obtained from other sources including microorganisms isolated from nature (e.g., soil, composts, water, etc.) or DNA samples obtained directly from natural materials (e.g., soil, composts, water, etc.) using the above-mentioned probes. Techniques for isolating microorganisms and DNA directly from natural habitats are well known in the art. A polynucleotide encoding a parent may then be obtained by similarly screening a genomic DNA or cDNA library of another microorganism or mixed DNA sample. Once a polynucleotide encoding a parent has been detected with the probe(s), the polynucleotide can be isolated or cloned by utilizing techniques that are known to those of ordinary skill in the art (see, e.g., Sambrook et al., 1989, supra).

In an embodiment, the xylanase is a *Bacillus* GH30_8 xylanase. Exemplary GH30_8 xylanases of use in the enzyme blends and processes of the present invention include those from the taxonomic genera of *Bacteroides, Cellvibrio, Clostridium, Cystobacter, Bacillus, Dickeya, Fibrobacter, Geobacillus, Meloidogyne, Micromonospora, Mucilaginibacter, Paenibacillus, Paludibacter, Radopholus, Ruminococcus, Serratia, Streptomyces, Verrucosispora*, and *Xanthomonas.*

GH98 xylanases suitable for use in the enzyme blends, methods and processes of the present invention are described in PCT International Application No. PCT/US2020/015648 (incorporated herein by reference in its entirety).

In an embodiment, the xylanase is not a GH10 xylanase. In an embodiment, the xylanase is not a GH11 xylanase. In an embodiment, the hemicellulase is not a GH30 family xylanase. In an embodiment, the hemicellulase is not a GH30 subfamily 8 (GH30_8) xylanase. In an embodiment, the xylanase is not a GH5 family xylanase. In an embodiment, the xylanase is not a GH3 family xylanase. In an embodiment, the xylanase is not a GH43 family xylanase. In an embodiment, the xylanase is not a GH5_21 family xylanase. In an embodiment, the xylanase is not a GH5_34 family xylanase. In an embodiment, the xylanase is not a GH5_34 family xylanase from the genus *Acetivibrio*, such as *Acetivibrio cellulyticus*, for instance the *Acetivibrio cellulyticus* GH5_34 xylanase of SEQ ID NO: 7. In an embodiment, the xylanase is not a GH5_34 family xylanase from the genus *Clostridium*, such as *Clostridium thermocellum*, for instance the *Clostridium thermocellum* GH5_34 xylanase of SEQ ID NO: 8. In an embodiment, the xylanase is not a GH5_34 family xylanase from the genus *Gonapodya*, such as *Gonapodya prolifera*, for instance the *Gonapodya prolifera* GH5_34 xylanase of SEQ ID NO: 53.

In an embodiment the xylanase is dosed in pre-saccharification, saccharification, and/or simultaneous saccharification and fermentation in a concentration of between 0.0001-1 mg EP (Enzyme Protein)/g DS, e.g., 0.0005-0.5 mg EP/g DS, such as 0.001-0.1 mg EP/g DS.

Beta-Xylosidase

In preferred embodiments of the present invention, the hemicellulase includes a beta-xylosidase. The present invention contemplates using any beta-xylosidase that, when optionally blended together with a xylanase, beta-glucanase, and/or cellulolytic composition in various ratios, partitions a greater amount of protein from the whole stillage byproduct into the high protein fraction, rather than being retained in the wet cake, to produce a high protein feed ingredient.

In an embodiment, the beta-xylosidase is from glycosyl hydrolase (GH) family 3. In an embodiment, the beta-xylosidase is from the genus *Aspergillus*, for example an *Aspergillus fumigatus* beta-xylosidase, or a homolog thereof. In another aspect, the *Aspergillus fumigatus* beta-xylosidase or a homolog thereof is selected from the group consisting of: (i) a beta-xylosidase comprising or consisting of the mature polypeptide of SEQ ID NO: 12 and (ii) a beta-xylosidase comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 12.

In an embodiment, the beta-xylosidase is from the genus *Trichoderma*, for example a *Trichoderma reesei* beta-xylosidase, or a homolog thereof. In another aspect, the *Trichoderma* beta-xylosidase or a homolog thereof is selected from the group consisting of: (i) a beta-xylosidase comprising or consisting of the mature polypeptide of SEQ ID NO: 13; and (ii) a beta-xylosidase comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 13.

Beta-Glucanases

The present invention contemplates using any beta-glucanase alone, or combination with a hemicellulase, for example xylanase, that, when optionally blended together with a cellulolytic composition various ratios, partitions a greater amount of protein from the whole stillage byproduct into the high protein fraction, rather than being retained in the wet cake, to produce a high protein feed ingredient. Unexpectedly, the present inventors found that beta-glucanases can be used alone in the processes of the invention (e.g., in saccharification, fermentation, or simultaneous saccharification and fermentation or in whole stillage) to increase the weight percentage of protein on a dry basis in the high protein feed ingredient, and can be used in combination with hemicellulases (e.g., xylanase) and/or a cellulolytic composition to optimize both the mass fraction and the weight percent protein on a dry basis of the high protein feed ingredient.

Exemplary beta-glucanases suitable for use in the processes and enzyme blends of the present invention include, without limitation, beta-glucanases from glycoside hydrolase families GH5_15, GH16 and GH64. In an embodiment, the beta-glucanase is a GH5_15 family beta-glucanase. In an embodiment, the GH5_15 family beta-glucanase is from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14. In an embodiment, the GH5_15 family beta-glucanase is from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17.

In an embodiment, the beta-glucanase is a GH16 family beta-glucanase. In an embodiment, the GH16 family beta-glucanase is from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19.

In an embodiment, the beta-glucanase is a GH64 family beta-glucanase. In an embodiment, the GH64 beta-glucanase is from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20. The beta-glucanase(s) increases the percent protein on a dry basis of the high protein feed ingredient.

Cellulolytic Composition

The present invention contemplates using any cellulolytic composition that, when blended with at least one hemicellulase and/or at least one beta-glucanase in various ratios, partitions a greater amount of protein from the whole stillage byproduct into the high protein fraction, rather than being retained in the wet cake, to produce a high protein feed ingredient.

In an embodiment, the cellulolytic composition comprises a cellobiohydrolase, a beta-glucosidase, and an endoglucanase. In an embodiment, the cellulolytic composition comprises: a cellobiohydrolase I; a beta-glucosidase; and an endoglucanase I. In an embodiment, the cellulolytic composition comprises: an *Aspergillus* cellobiohydrolase I; an *Aspergillus* beta-glucosidase; and a *Trichoderma* endoglucanase I. In an embodiment, the cellulolytic composition comprises: an *Aspergillus fumigatus* cellobiohydrolase I; an *Aspergillus fumigatus* beta-glucosidase; and a *Trichoderma reesei* endoglucanase I. In an embodiment, the cellulolytic composition comprises: (i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and/or (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids to 23 to 459 of SEQ ID NO: 44.

The cellulolytic composition used in an enzyme blend or process of the invention may be derived from any microorganism. As used herein, "derived from any microorganism" means that the cellulolytic composition comprises one or more enzymes that were expressed in the microorganism. For instance, a cellulolytic composition derived from a strain of *Trichoderma reesei* means that the cellulolytic composition comprises one or more enzymes that were expressed in *Trichoderma reesei*.

In an embodiment, the cellulolytic composition is derived from a strain of *Aspergillus*, such as a strain of *Aspergillus aurantiacus, Aspergillus niger* or *Aspergillus oryzae*.

In an embodiment, the cellulolytic composition is derived from a strain of *Chrysosporium*, such as a strain of *Chrysosporium lucknowense*.

In an embodiment, the cellulolytic composition is derived from a strain of *Humicola*, such as a strain of *Humicola insolens*.

In an embodiment, the cellulolytic composition is derived from a strain of *Penicilium*, such as a strain of *Penicilium emersonii* or *Penicilium oxalicum*.

In an embodiment, the cellulolytic composition is derived from a strain of *Talaromyces*, such as a strain of *Talaromyces aurantiacus* or *Talaromyces* emersonii.

In an embodiment, the cellulolytic composition is derived from a strain of *Trichoderma*, such as a strain of *Trichoderma reesei*.

In a preferred embodiment, the cellulolytic composition is derived from a strain of *Trichoderma reesei*. In a preferred embodiment, the *Trichoderma reesei* cellulolytic composition comprises at least one, at least two, at least three, or at least four enzymes selected from the group consisting of: (i) a cellobiohydrolase I; (ii) a cellobiohydrolase II; (iii) a beta-glucosidase; and (iv) a GH61 polypeptide having cellulolytic enhancing activity. In another preferred embodiment, the *Trichoderma reesei* cellulolytic composition comprises at least one, at least two, at least three, or at least four enzymes selected from the group consisting of: (i) an *Aspergillus fumigatus* cellobiohydrolase I; (ii) an *Aspergillus fumigatus* cellobiohydrolase II; (iii) an *Aspergillus fumigatus* beta-glucosidase; and (iv) a *Penicillium emersonii* GH61A polypeptide having cellulolytic enhancing activity.

In another preferred embodiment, the *Trichoderma reesei* cellulolytic composition comprises at least one, at least two, or at least three enzymes selected from the group consisting of: (i) a cellobiohydrolase I; (ii) a beta-glucosidase; and (iii) an endoglucanase. In another preferred embodiment, the *Trichoderma reesei* cellulolytic composition comprises at least one, at least two, or at least three enzymes selected from the group consisting of: (i) an *Aspergillus fumigatus* cellobiohydrolase I; (ii) an *Aspergillus fumigatus* beta-glucosidase; and (iii) a *Trichoderma reesei* endoglucanase.

In yet another preferred embodiment, the *Trichoderma reesei* cellulolytic composition comprises at least one, at least two, at least three, or at least four enzymes selected from the group consisting of: (i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a cellobiohydrolase II comprising amino acids 20 to 454 of SEQ ID NO: 22 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22; (iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

In an embodiment, the *Trichoderma reesei* cellulolytic composition further comprises an endoglucanase.

In an embodiment, the *Trichoderma reesei* cellulolytic composition comprises: (i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids to 23 to 459 of SEQ ID NO: 44.

In a preferred embodiment, the cellulolytic composition is derived from a strain of *Aspergillus aurantiacus*. In a preferred embodiment, the *Aspergillus aurantiacus* cellulolytic composition comprises at least one, at least two, at least three, or at least four enzymes selected from the group consisting of: (i) a cellobiohydrolase I; (ii) a cellobiohydrolase II; (iii) a beta-glucosidase; and (iv) a GH61 polypeptide having cellulolytic enhancing activity. In another preferred embodiment, the *Aspergillus aurantiacus* cellulolytic composition comprises at least one, at least two, at least three, or at least four enzymes selected from the group consisting of: (i) an *Aspergillus fumigatus* cellobiohydrolase I; (ii) an *Aspergillus fumigatus* cellobiohydrolase II; (iii) an *Aspergillus fumigatus* beta-glucosidase; and (iv) a *Penicillium emersonii* GH61A polypeptide having cellulolytic enhancing activity.

In yet another preferred embodiment, the *Aspergillus aurantiacus* cellulolytic composition comprises at least one, at least two, at least three, or at least four enzymes selected from the group consisting of: (i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a cellobiohydrolase II comprising amino acids 20 to 454 of SEQ ID NO: 22 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22; (iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

In an embodiment, the *Aspergillus aurantiacus* cellulolytic composition further comprises an endoglucanase.

In an embodiment, the *Aspergillus aurantiacus* cellulolytic composition comprises: (i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids to 23 to 459 of SEQ ID NO: 44.

In a preferred embodiment, the cellulolytic composition is derived from a strain of *Aspergillus niger*. In a preferred embodiment, the *Aspergillus niger* cellulolytic composition comprises at least one, at least two, at least three, or at least four enzymes selected from the group consisting of: (i) a cellobiohydrolase I; (ii) a cellobiohydrolase II; (iii) a beta-glucosidase; and (iv) a GH61 polypeptide having cellulolytic enhancing activity. In another preferred embodiment, the *Aspergillus niger* cellulolytic composition comprises at least one, at least two, at least three, or at least four enzymes selected from the group consisting of: (i) an *Aspergillus fumigatus* cellobiohydrolase I; (ii) an *Aspergillus fumigatus* cellobiohydrolase II; (iii) an *Aspergillus fumigatus* beta-glucosidase; and (iv) a *Penicillium emersonii* GH61A polypeptide having cellulolytic enhancing activity.

In yet another preferred embodiment, the *Aspergillus niger* cellulolytic composition comprises at least one, at least two, at least three, or at least four enzymes selected from the group consisting of: (i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 2; (ii) a cellobiohydrolase II comprising amino acids 20 to 454 of SEQ ID NO: 22 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22; (iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

In an embodiment, the *Aspergillus niger* cellulolytic composition further comprises an endoglucanase. In an embodiment, the *Aspergillus niger* cellulolytic composition comprises: (i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids to 23 to 459 of SEQ ID NO: 44.

In a preferred embodiment, the cellulolytic composition is derived from a strain of *Aspergillus oryzae*. In a preferred embodiment, the *Aspergillus oryzae* cellulolytic composition comprises at least one, at least two, at least three, or at least four enzymes selected from the group consisting of: (i) a cellobiohydrolase I; (ii) a cellobiohydrolase II; (iii) a beta-glucosidase; and (iv) a GH61 polypeptide having cellulolytic enhancing activity. In another preferred embodiment, the *Aspergillus oryzae* cellulolytic composition comprises at least one, at least two, at least three, or at least four enzymes selected from the group consisting of: (i) an *Aspergillus fumigatus* cellobiohydrolase I; (ii) an *Aspergillus fumigatus* cellobiohydrolase II; (iii) an *Aspergillus fumigatus* beta-glucosidase; and (iv) a *Penicillium emersonii* GH61A polypeptide having cellulolytic enhancing activity.

In yet another preferred embodiment, the *Aspergillus oryzae* cellulolytic composition comprises at least one, at least two, at least three, or at least four enzymes selected from the group consisting of: (i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a cellobiohydrolase II comprising amino acids 20 to 454 of SEQ ID NO: 22 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22; (iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

In an embodiment, the *Aspergillus oryzae* cellulolytic composition further comprises an endoglucanase. In an embodiment, the *Aspergillus oryzae* cellulolytic composition comprises: (i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids to 23 to 459 of SEQ ID NO: 44.

In a preferred embodiment, the cellulolytic composition is derived from a strain of *Penicilium emersonii*. In a preferred embodiment, the *Penicilium emersonii* cellulolytic composition comprises at least one, at least two, at least three, or at least four enzymes selected from the group consisting of: (i) a cellobiohydrolase I; (ii) a cellobiohydrolase II; (iii) a beta-glucosidase; and (iv) a GH61 polypeptide having cellulolytic enhancing activity. In another preferred embodiment, the *Penicilium emersonii* cellulolytic composition comprises at least one, at least two, at least three, or at least four enzymes selected from the group consisting of: (i) an *Aspergillus fumigatus* cellobiohydrolase I; (ii) an *Aspergillus fumigatus* cellobiohydrolase II; (iii) an *Aspergillus fumigatus* beta-glucosidase; and (iv) a *Penicillium emersonii* GH61A polypeptide having cellulolytic enhancing activity.

In yet another preferred embodiment, the *Penicilium emersonii* cellulolytic composition comprises at least one, at least two, at least three, or at least four enzymes selected from the group consisting of: (i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a cellobiohydrolase II comprising amino acids 20 to 454 of SEQ ID NO: 22 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22; (iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

In an embodiment, the *Penicilium emersonii* cellulolytic composition further comprises an endoglucanase. In an embodiment, the *Penicilium emersonii* cellulolytic composition comprises: (i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids to 23 to 459 of SEQ ID NO: 44.

In a preferred embodiment, the cellulolytic composition is derived from a strain of *Penicilium oxalicum*. In a preferred embodiment, the *Penicilium oxalicum* cellulolytic composition comprises at least one, at least two, at least three, or at least four enzymes selected from the group consisting of: (i) a cellobiohydrolase I; (ii) a cellobiohydrolase II; (iii) a beta-glucosidase; and (iv) a GH61 polypeptide having cellulolytic enhancing activity. In another preferred embodiment, the *Penicilium oxalicum* cellulolytic composition comprises at least one, at least two, at least three, or at least four enzymes selected from the group consisting of: (i) an *Aspergillus fumigatus* cellobiohydrolase I; (ii) an *Aspergillus fumigatus* cellobiohydrolase II; (iii) an *Aspergillus fumigatus* beta-glucosidase; and (iv) a *Penicillium emersonii* GH61A polypeptide having cellulolytic enhancing activity.

In yet another preferred embodiment, the *Penicilium oxalicum* cellulolytic composition comprises at least one, at least two, at least three, or at least four enzymes selected from the group consisting of: (i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a cellobiohydrolase II comprising amino acids 20 to 454 of SEQ ID NO: 22 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22; (iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

In an embodiment, the *Penicilium oxalicum* cellulolytic composition further comprises an endoglucanase. In an embodiment, the *Penicilium oxalicum* cellulolytic composition comprises: (i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids to 23 to 459 of SEQ ID NO: 44.

In a preferred embodiment, the cellulolytic composition is derived from a strain of *Talaromyces aurantiacus*. In a preferred embodiment, the *Talaromyces aurantiacus* cellulolytic composition comprises at least one, at least two, at least three, or at least four enzymes selected from the group consisting of: (i) a cellobiohydrolase I; (ii) a cellobiohydrolase II; (iii) a beta-glucosidase; and (iv) a GH61 polypeptide having cellulolytic enhancing activity. In another preferred embodiment, the *Talaromyces aurantiacus* cellulolytic composition comprises at least one, at least two, at least three, or at least four enzymes selected from the group consisting of: (i) an *Aspergillus fumigatus* cellobiohydrolase I; (ii) an *Aspergillus fumigatus* cellobiohydrolase II; (iii) an *Aspergillus fumigatus* beta-glucosidase; and (iv) a *Penicillium emersonii* GH61A polypeptide having cellulolytic enhancing activity.

In yet another preferred embodiment, the *Talaromyces aurantiacus* cellulolytic composition comprises at least one, at least two, at least three, or at least four enzymes selected from the group consisting of: (i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a cellobiohydrolase II comprising amino acids 20 to 454 of SEQ ID NO: 22 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22; (iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

In an embodiment, the *Talaromyces aurantiacus* cellulolytic composition further comprises an endoglucanase. In an embodiment, the *Talaromyces aurantiacus* cellulolytic composition comprises: (i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids to 23 to 459 of SEQ ID NO: 44.

In a preferred embodiment, the cellulolytic composition is derived from a strain of *Talaromyces emersonii*. In a preferred embodiment, the *Talaromyces emersonii* cellulolytic composition comprises at least one, at least two, at least three, or at least four enzymes selected from the group consisting of: (i) a cellobiohydrolase I; (ii) a cellobiohydrolase II; (iii) a beta-glucosidase; and (iv) a GH61 polypeptide having cellulolytic enhancing activity. In another preferred embodiment, the *Talaromyces emersonii* cellulolytic composition comprises at least one, at least two, at least three, or at least four enzymes selected from the group consisting of: (i) an *Aspergillus fumigatus* cellobiohydrolase I; (ii) an *Aspergillus fumigatus* cellobiohydrolase II; (iii) an *Aspergillus fumigatus* beta-glucosidase; and (iv) a *Penicillium emersonii* GH61A polypeptide having cellulolytic enhancing activity.

In yet another preferred embodiment, the *Talaromyces emersonii* cellulolytic composition comprises at least one, at least two, at least three, or at least four enzymes selected from the group consisting of: (i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a cellobiohydrolase II comprising amino acids 20 to 454 of SEQ ID NO: 22 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22; (iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

In an embodiment, the *Talaromyces emersonii* cellulolytic composition further comprises an endoglucanase. In an embodiment, the *Talaromyces emersonii* cellulolytic composition comprises: (i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids to 23 to 459 of SEQ ID NO: 44.

The cellulolytic composition may further comprise multiple enzymatic activities, such as one or more (e.g., several) enzymes selected from the group consisting of acetylxylan esterase, acylglycerol lipase, amylase, alpha-amylase, beta-amylase, arabinofuranosidase, cellobiohydrolases, cellulase, feruloyl esterase, galactanase, alpha-galactosidase, beta-galactosidase, beta-glucanase, beta-glucosidase, glucan 1,4-a-glucosidase, glucan 1,4-alpha-maltohydrolase, glucan 1,4-a-glucosidase, glucan 1,4-alpha-maltohydrolase, lysophospholipase, lysozyme, alpha-mannosidase, beta-mannosidase (mannanase), phytase, phospholipase A1, phospholipase A2, phospholipase D, protease, pullulanase, pectinesterase, triacylglycerol lipase, xylanase, beta-xylosidase or any combination thereof.

In an embodiment, the cellulolytic composition comprises one or more formulating agents as disclosed herein, preferably one or more of the compounds selected from the list consisting of glycerol, ethylene glycol, 1,2-propylene glycol or 1,3-propylene glycol, sodium chloride, sodium benzoate, potassium sorbate, sodium sulfate, potassium sulfate, magnesium sulfate, sodium thiosulfate, calcium carbonate, sodium citrate, dextrin, glucose, sucrose, sorbitol, lactose, starch, kaolin and cellulose.

In an embodiment the cellulolytic composition, e.g., derived from a strain of *Aspergillus, Penicilium, Talaromyces*, or *Trichoderma*, such as a *Trichoderma reesei* cellulolytic composition, is dosed in pre-saccharification, saccharification, and/or simultaneous saccharification and fermentation in a concentration of 0.0001-3 mg EP/g DS, preferably 0.0005-2 mg EP/g DS, preferably 0.001-1 mg/g DS, more preferred from 0.005-0.5 mg EP/g DS, even more preferred 0.01-0.1 mg EP/g DS.

II. Processes for Producing Fermentation Products

The invention also relates to processes for producing a fermentation product from starch-containing grain using a fermenting organism, wherein a hemicellulase, beta-glucanase, or an enzyme blend comprising a hemicellulase and/or beta-glucanase and optionally a cellulolytic composition (e.g., derived from *Trichoderma reesei*) is added before and/or during fermentation and/or to whole stillage. Those skilled in the art will appreciate that any of the hemicellulase, beta-glucanase, or enzyme blends described in Section I above, or otherwise described herein, can be used in the processes of the invention, including the processes of Section II.

Processes for Producing Fermentation Products from Un-Gelatinized Starch-Containing Grain In an aspect, the invention relates to processes for producing fermentation products from starch-containing grain without gelatinization (i.e., without cooking) of the starch-containing grain (often referred to as a "raw starch hydrolysis" process), wherein a presently disclosed hemicellulase, beta-glucanase, or enzyme blend comprising a hemicellulase and/or a beta-glucanase, and optionally a cellulolytic composition (e.g., derived from *Trichoderma reesei*) is added. The fermentation product, such as ethanol, can be produced without liquefying the aqueous slurry containing the starch-containing grain and water. In one embodiment a process of the invention includes saccharifying (e.g., milled, e.g., dry-milling) starch-containing grain, e.g., granular starch, below the initial gelatinization temperature, preferably in the presence of alpha-amylase and/or carbohydrate-source generating enzyme(s) to produce sugars that can be fermented into the fermentation product by a suitable fermenting organism. In this embodiment, the desired fermentation product, e.g., ethanol, is produced from un-gelatinized (i.e., uncooked), preferably milled, cereal grains, such as corn.

Accordingly, in one aspect the invention relates to processes for producing a fermentation product from starch-containing grain comprising simultaneously saccharifying and fermenting starch-containing grain using a carbohydrate-source generating enzymes and a fermenting organism at a temperature below the initial gelatinization temperature of said starch-containing grain in the presence of a hemicellulase and/or a beta-glucanase, or an enzyme blend of the invention. Exemplary hemicellulases, beta-glucanases, and enzyme blends of use in the processes are described in Section I above entitled "Enzyme Blends". Saccharification and fermentation may also be separate. Thus in another aspect the invention relates to processes of producing fermentation products, comprising the following steps:

(i) saccharifying a starch-containing grain at a temperature below the initial gelatinization temperature using a carbohydrate-source generating enzyme, e.g., a glucoamylase; and
(ii) fermenting using a fermentation organism;
wherein step (i) and/or (ii) is carried out using at least a glucoamylase and at least one hemicellulase and/or at least one beta-glucanase, or enzyme blend of the invention comprising at least one hemicellulase and/or at least one beta-glucanase.

In an embodiment, the hemicellulase, beta-glucanase, or at least one enzyme blend of the present invention is added during saccharifying step (i). In an embodiment, the hemicellulase, beta-glucanase, or at least one enzyme blend of the present invention is added during fermenting step (ii).

In one embodiment, an alpha amylase, in particular a fungal alpha-amylase, is also added in step (i). Steps (i) and (ii) may be performed simultaneously. In an embodiment, the hemicellulase, beta-glucanase, or at least one enzyme blend of the present invention is added during simultaneous saccharification and fermentation (SSF). In an embodiment, the fermenting organism is yeast and the hemicellulase, beta-glucanase, or at least one enzyme blend is added during yeast propagation (exogenously or via in situ expression from a recombinant yeast host cell).

Processes for Producing Fermentation Products from Gelatinized Starch-Containing Grain In an aspect, the invention relates to processes for producing fermentation products, especially ethanol, from starch-containing grain, which process includes a liquefaction step and sequentially or simultaneously performed saccharification and fermentation steps. Consequently, the invention relates to a process for producing a fermentation product from starch-containing grain comprising the steps of:

(i) liquefying starch-containing grain in the presence of an alpha-amylase to form a liquefied mash;
(ii) saccharifying the liquefied mash using a carbohydrate-source generating enzyme to produce a fermentable sugar; and (iii) fermenting the sugar using a fermenting organism under conditions suitable to produce the fermentation product;

wherein a hemicellulase and/or a beta-glucanase, or at least one enzyme blend of the present invention is added before or during step (iii).

Processes for Producing Fermentation Products from Cellulosic-Containing Material In this aspect, the invention relates to processes for producing fermentation products, especially ethanol, from cellulosic-containing material, which process may include a pretreatment step and sequentially or simultaneously performed saccharification and fermentation steps.

Consequently, the invention relates to processes for producing fermentation products from cellulosic-containing material comprising the steps of:

i) optionally pretreating a cellulosic-containing material;

ii) saccharifying a cellulosic-containing material and/or pretreated cellulosic-containing material using a carbohydrate-source generating enzyme; and iii) fermenting using a fermenting organism;

wherein at least one hemicellulase and/or at least one beta-glucanase, or at least one enzyme blend comprising at least one hemicellulase and/or at least one beta-glucanase is present or added during saccharifying step ii) or fermenting step iii).

In some embodiments, at least two, at least three, at least four, or at least five hemicellulases and/or beta-glucanases are present and/or added during saccharifying step ii) or fermenting step iii).

The at least one hemicellulase and/or at least one beta-glucanase present or added in the above described processes for producing fermentation products from cellulosic-containing material may be added exogenously during saccharification, fermentation or simultaneous saccharification and fermentation as mono-components, as enzyme blends or compositions comprising the hemicellulases and/or beta-glucanases, and/or via in-situ expression and secretion of the hemicellulases and/or beta-glucanases by the fermenting organism, e.g., a recombinant host cell or fermenting organism described herein (e.g., yeast, such as from the genus *Saccharomyces*, preferably *Saccharomyces cerevisiae*).

Whether the process of the invention includes or does not include a liquefaction step or pretreatment step, the essential feature of the invention is that at least one hemicellulase and/or at least one beta-glucanase are present or added during fermentation or simultaneous saccharification and fermentation. The at least one hemicellulase and/or at least one beta-glucanase, and cellulolytic composition present or added in the above described processes for producing fermentation products from starch-containing material may be added exogenously during saccharification, fermentation or simultaneous saccharification and fermentation as mono-components, as enzyme blends or compositions comprising the hemicellulases and/or beta-glucanases, and/or via in-situ expression and secretion of the hemicellulases and/or beta-glucanases by the fermenting organism, e.g., a recombinant host cell or fermenting organism described herein (e.g., yeast, such as from the genus *Saccharomyces*, preferably *Saccharomyces cerevisiae*).

The present inventors have found that at least one hemicellulase and/or at least one beta-glucanase, and enzyme blends comprising at least one hemicellulase and/or at least one beta-glucanase of the present invention are useful for increasing the percentage of protein in the high protein feed ingredient resulting from the separation of the whole stillage into protein-rich and fiber-rich (wet cake) fractions, for example, by increasing the amount of protein that is partitioned into the high protein fraction rather than the wet cake, as well as increasing the mass of the high protein fraction that ends up in the high protein feed ingredient. Unexpectedly, the present inventors observed these effects when the hemicellulases and/or beta-glucanases, or the enzyme blends comprising the same were added upstream during fermentation or SSF, in addition to when they were added to whole stillage. Thus, the enzyme blends of the present invention are useful for increasing the percentage of protein in the high protein feed ingredient resulting from the separation of the whole stillage into protein-rich and fiber-rich (wet cake) fractions. When the cellulolytic composition is included in the blend, the ratio of the hemicellulase and/or beta-glucanase and the cellulolytic composition can be optimized to further increase the amount of protein that is partitioned into the high protein fraction rather than the wet cake, as well as further increase the mass of the high protein fraction that ends up in the high protein feed ingredient.

The present inventors further unexpectedly observed that the hemicellulase, for example xylanase, increases the mass fraction of the high protein feed ingredient, whereas the beta-glucanase increases the protein content on a dry wt % basis of the high protein feed ingredient.

The present invention contemplates: (i) embodiments in which all of the at least one hemicellulase and/or at least one beta-glucanase are added exogenously during fermentation or SSF; (ii) embodiments in which all of the at least one hemicellulase and/or at least one beta-glucanase are added via in-situ expression and secretion of the hemicellulases and/or beta-glucanases from a recombinant host cell or fermenting organism described herein (e.g., yeast); (iii) embodiments in which at least a portion of the least one hemicellulase and/or at least one beta-glucanase are added exogenously during fermentation or SSF and at least a portion of the at least one hemicellulase and/or at least one beta-glucanase are added via in-situ expression and secretion of the hemicellulases and/or beta-glucanases from a recombinant host cell or fermenting organism described herein (e.g., yeast).

An enzyme blend or composition of the invention may suitably be used in a process or method of the invention. A recombinant host cell or fermenting organism of the invention may suitably be used in a process or method of the invention. However, the enzymes may also be added separately.

The present invention further contemplates compositions comprising at least one hemicellulase and/or at least one beta-glucanase, and/or a cellulolytic composition, and a recombinant host cell or fermenting organism comprising at least one heterologous polynucleotide (e.g., a recombinant yeast host cell or fermenting organism engineered to optimize production of the fermentation product or a byproduct or co-product of the process for producing the fermentation product). The at least one heterologous polynucleotide may encode polypeptides that are expressed intracellularly to enhance performance of the yeast or fermenting organism itself, polypeptides that are secreted into the fermenting mash to exert their effects on the mash or components of the mash to improve fermentation results, or both.

In some embodiments, the recombinant yeast host cell or fermenting organism comprises nucleotide sequences encoding the hemicellulases and/or beta-glucanases of the present invention, in addition to at least one other heterologous polynucleotide that optimizes production of the fermentation product or a byproduct or co-product of the process for producing the fermentation product. In other embodiments, the recombinant yeast host cell or fermenting organism comprises nucleotides sequences encoding such at least one heterologous polynucleotide other than the hemicellulases and/or beta-glucanases, such as a fermentation alpha-amylase (e.g., fungal alpha-amylase, carbohydrate-source generating organism (e.g., glucoamylase), and/or protease).

In an embodiment, the process of the invention further comprises, prior to the step i), the steps of:

a) reducing the particle size of the starch-containing material, preferably by dry milling;
b) forming a slurry comprising the starch-containing material and water.

The starch-containing starting material, such as whole grains, may be reduced in particle size, e.g., by milling, in order to open up the structure, to increase surface area, and allowing for further processing. Generally, there are two types of processes: wet and dry milling. In dry milling whole kernels are milled and used. Wet milling gives a good separation of germ and meal (starch granules and protein). Wet milling is often applied at locations where the starch hydrolysate is used in production of, e.g., syrups. Both dry and wet milling are well known in the art of starch processing. According to the present invention dry milling is preferred. In an embodiment the particle size is reduced to between 0.05 to 3.0 mm, preferably 0.1-0.5 mm, or so that at least 30%, preferably at least 50%, more preferably at least 70%, even more preferably at least 90% of the starch-containing material fit through a sieve with a 0.05 to 3.0 mm screen, preferably 0.1-0.5 mm screen. In another embodiment at least 50%, preferably at least 70%, more preferably at least 80%, especially at least 90% of the starch-containing material fit through a sieve with #6 screen.

The aqueous slurry may contain from 10-55 w/w-% dry solids (DS), preferably 25-45 w/w-% dry solids (DS), more preferably 30-40 w/w-% dry solids (DS) of starch-containing material.

The slurry is heated to above the gelatinization temperature and an alpha-amylase variant may be added to initiate liquefaction (thinning). The slurry may be heated to above the initial gelatinization temperature, preferably to between 80-95° C., between pH 4-7, preferably between 4.5-5.0 or 5.0 and 6.0, for 30 minutes to 5 hours, such as around 2 hours. The slurry may in an embodiment be jet-cooked to further gelatinize the slurry before being subjected to alpha-amylase in step (a). Liquefaction may in an embodiment be carried out as a three-step hot slurry process. The slurry may be heated to between 60-105° C., preferably between 70-100° C., such as preferably between 80-95° C., more preferably between 88-92C at a pH of 4-6, in particular at a pH of 4.5-5.5, and alpha-amylase variant, optionally together with a protease, a carbohydrate-source generating enzyme, such as a glucoamylase, a phospholipase, a phytase, and/or pullulanase, are added to initiate liquefaction (thinning). In an embodiment the temperature during liquefaction step i) is in the range from 70-100° C., such as between 75-95° C., such as between 75-90° C., preferably between 80-90° C., such as between 82-88° C., such as around 85° C. In an embodiment the temperature during liquefaction step i) is in the range from 70–100° C., such as between 75-100° C., preferably between 80-100° C., such as between 85-95° C., such as around between 88 and 92° C. In an embodiment, the temperature during liquefaction step i) is at least 80° C. In an embodiment, the temperature during liquefaction step i) is at least 81° C. In an embodiment, the temperature during liquefaction step i) is at least 82° C. In an embodiment, the temperature during liquefaction step i) is at least 83° C. In an embodiment, the temperature during liquefaction step i) is at least 84° C. In an embodiment, the temperature during liquefaction step i) is at least 85° C. In an embodiment, the temperature during liquefaction step i) is at least 86° C. In an embodiment, the temperature during liquefaction step i) is at least 87° C. In an embodiment, the temperature during liquefaction step i) is at least 88° C. In an embodiment, the temperature during liquefaction step i) is at least 89° C. In an embodiment, the temperature during liquefaction step i) is at least 90° C. In an embodiment, the temperature during liquefaction step i) is at least 91° C. In an embodiment, the temperature during liquefaction step i) is at least 92° C. In an embodiment, the temperature during liquefaction step i) is at least 93° C. In an embodiment, the temperature during liquefaction step i) is at least 94° C. In an embodiment, the temperature during liquefaction step i) is at least 95° C. In an embodiment, the temperature during liquefaction step i) is at least 96° C. In an embodiment, the temperature during liquefaction step i) is at least 97° C. In an embodiment, the temperature during liquefaction step i) is at least 97° C. In an embodiment, the temperature during liquefaction step i) is at least 98° C. In an embodiment, the temperature during liquefaction step i) is at least 99° C. In an embodiment, the temperature during liquefaction step i) is at least 100° C.

The liquefaction process is usually carried out at a pH of 4-6, in particular at a pH from 4.5 to 5.5. Saccharification step (b) may be carried out using conditions well known in the art. For instance, a full saccharification process may last up to from about 24 to about 72 hours, however, it is common only to do a pre-saccharification of typically 40-90 minutes at a temperature between 30-65° C., typically about 60° C., followed by complete saccharification during fermentation in a simultaneous saccharification and fermentation process (SSF process). Saccharification is typically carried out at a temperature from 20-75° C., in particular 40-70° C., typically around 60° C., and at a pH between 4 and 5, normally at about pH 4.5. The most widely used process to produce a fermentation product, especially ethanol, is a simultaneous saccharification and fermentation (SSF) process, in which there is no holding stage for the saccharification, meaning that a fermenting organism, such as yeast, and enzyme(s), may be added together. SSF may typically be carried out at a temperature from 25° C. to 40° C., such as from 28° C. to 35° C., such as from 30° C. to 34° C., preferably around about 32° C. In an embodiment fermentation is ongoing for 6 to 120 hours, in particular 24 to 96 hours.

Starch-Containing Grains

Any suitable starch-containing starting grain may be used in a process of the present invention. The starting material is generally selected based on the desired fermentation product. Examples of starch-containing starting grains, suitable for use in the processes of the present invention, include barley, beans, cassava, cereals, corn, milo, peas, potatoes, rice, rye, sago, sorghum, sweet potatoes, tapioca, wheat, and whole grains, or any mixture thereof. The starch-containing grain may also be a waxy or non-waxy type of corn and barley. In a preferred embodiment the starch-containing grain is corn. In a preferred embodiment the starch-containing grain is wheat.

Fermentation Products

The term "fermentation product" means a product produced by a method or process including fermenting using a fermenting organism. Fermentation products include alcohols (e.g., ethanol, methanol, butanol); organic acids (e.g., citric acid, acetic acid, itaconic acid, lactic acid, succinic acid, gluconic acid); ketones (e.g., acetone); amino acids (e.g., glutamic acid); gases (e.g., $H_2$ and $CO_2$); antibiotics (e.g., penicillin and tetracycline); enzymes; vitamins (e.g., riboflavin, $B_{12}$, beta-carotene); and hormones. In a preferred embodiment the fermentation product is ethanol, e.g., fuel ethanol; drinking ethanol, i.e., potable neutral spirits; or industrial ethanol or products used in the consumable alcohol industry (e.g., beer and wine), dairy industry (e.g., fermented dairy products), leather industry and tobacco industry. Preferred beer types comprise ales, stouts, porters, lagers, bitters, malt liquors, happoushu, high-alcohol beer, low-alcohol beer, low-calorie beer or light beer. In an embodiment the fermentation product is ethanol.

Fermenting Organisms

The term "Fermenting organism" refers to any organism, including bacterial and fungal organisms, especially yeast, suitable for use in a fermentation process and capable of producing the desired fermentation product. Especially suitable fermenting organisms are able to ferment, i.e., convert, sugars, such as glucose or maltose, directly or indirectly into the desired fermentation product, such as ethanol. Examples of fermenting organisms include fungal organisms, such as yeast. Preferred yeast includes strains of *Saccharomyces* spp., in particular, *Saccharomyces cerevisiae.*

Suitable concentrations of the viable fermenting organism during fermentation, such as SSF, are well known in the art or can easily be determined by the skilled person in the art. In one embodiment the fermenting organism, such as ethanol fermenting yeast, (e.g., *Saccharomyces cerevisiae*) is added to the fermentation medium so that the viable fermenting organism, such as yeast, count per mL of fermentation medium is in the range from $10^5$ to $10^{12}$, preferably from $10^7$ to $10^{10}$, especially about $5\times10^7$.

Examples of commercially available yeast includes, e.g., RED START™ and ETHANOL RED™ yeast (available from Fermentis/Lesaffre, USA), FALI (available from Fleischmann's Yeast, USA), SUPERSTART and THERMOSACC™ fresh yeast (available from Ethanol Technology, WI, USA), BIOFERM AFT and XR (available from NABC—North American Bioproducts Corporation, GA, USA), GERT STRAND (available from Gert Strand AB, Sweden), and FERMIOL (available from DSM Specialties). Other useful yeast strains are available from biological depositories such as the American Type Culture Collection (ATCC) or the Deutsche Sammlung von Mikroorganismen and Zellkulturen GmbH (DSMZ), such as, e.g., BY4741 (e.g., ATCC 201388); Y108-1 (ATCC PTA.10567) and NRRL YB-1952 (ARS Culture Collection). Still other *S. cerevisiae* strains suitable as host cells DBY746, [Alpha][Eta]22, 5150-2B, GPY55-15Ba, CEN. PK, USM21, TMB3500, TM B3400, VTT-A-63015, VTT-A-85068, VTT-c-79093 and their derivatives as well as *Saccharomyces* sp. 1400, 424A (LNH-ST), 259A (LNH-ST) and derivatives thereof.

As used herein, a "derivative" of strain is derived from a referenced strain, such as through mutagenesis, recombinant DNA technology, mating, cell fusion, or cytoduction between yeast strains. Those skilled in the art will understand that the genetic alterations, including metabolic modifications exemplified herein, may be described with reference to a suitable host organism and their corresponding metabolic reactions or a suitable source organism for desired genetic material such as genes for a desired metabolic pathway. However, given the complete genome sequencing of a wide variety of organisms and the high level of skill in the area of genomics, those skilled in the art can apply the teachings and guidance provided herein to other organisms. For example, the metabolic alterations exemplified herein can readily be applied to other species by incorporating the same or analogous encoding nucleic acid from species other than the referenced species.

The host cell or fermenting organism may be *Saccharomyces* strain, e.g., *Saccharomyces cerevisiae* strain produced using the method described and concerned in U.S. Pat. No. 8,257,959-BB. In one embodiment, the recombinant cell is a derivative of a strain *Saccharomyces cerevisiae* CIBTS1260 (deposited under Accession No. NRRL Y-50973 at the Agricultural Research Service Culture Collection (NRRL), Illinois 61604 U.S.A.).

The strain may also be a derivative of *Saccharomyces cerevisiae* strain NMI V14/004037 (See, WO2015/143324 and WO2015/143317 each incorporated herein by reference), strain nos. V15/004035, V15/004036, and V15/004037 (See, WO 2016/153924 incorporated herein by reference), strain nos. V15/001459, V15/001460, V15/001461 (See, WO2016/138437 incorporated herein by reference), strain no. NRRL Y67342 (See, WO2018/098381 incorporated herein by reference), strain nos. NRRL Y67549 and NRRL Y67700 (See, PCT/US2019/018249 incorporated herein by reference), or any strain described in WO2017/087330 (incorporated herein by reference).

The fermenting organisms may be a host cell that expresses a heterologous hemicellulase (e.g., xylanase) and/or a heterologous beta-glucanase (e.g., any hemicellulase and/or beta-glucanase described herein). Any hemicellulase and/or beta-glucanase contemplated for a process, method, enzyme blend, or composition described herein is also contemplated for expression by a fermenting organism or host cell.

In one embodiment is a recombinant host cell comprising a heterologous polynucleotide encoding a polypeptide having beta-glucanase activity (e.g., beta-glucanase) (e.g., any beta-glucanase described herein).

In one embodiment is a recombinant host cell comprising a heterologous polynucleotide encoding a polypeptide having hemicellulase activity (e.g., xylanase) (e.g., any hemicellulase described herein).

The fermenting organisms may be a host cell that expresses heterologous polynucleotides encoding enzymes other than the hemicellulases and/or beta-glucanases of the present invention, or that expresses such enzymes in addition to the hemicellulases and/or beta-glucanases of the present invention.

In some embodiments, the host cells and/or fermenting organisms comprise one or more heterologous polynucleotides encoding an alpha-amylase, glucoamylase, protease and/or cellulase. Examples of alpha-amylase, glucoamylase, protease and cellulases suitable for expression in the host cells and/or fermenting organisms are described in more detail herein. Thus, the present invention contemplates compositions (e.g., fermenting mash) which comprise a recombinant host cell and/or fermenting organism comprising: (i) one or more heterologous polynucleotides encoding an alpha-amylase, glucoamylase, protease, and/or cellulase, and (ii) at least one hemicellulase and/or at least one beta-glucanase of the present invention.

The host cells and fermenting organisms described herein may utilize expression vectors comprising the coding sequence of one or more (e.g., two, several) heterologous genes linked to one or more control sequences that direct expression in a suitable cell under conditions compatible with the control sequence(s). Such expression vectors may be used in any of the cells and methods described herein. The polynucleotides described herein may be manipulated in a variety of ways to provide for expression of a desired polypeptide. Manipulation of the polynucleotide prior to its insertion into a vector may be desirable or necessary depending on the expression vector. The techniques for modifying polynucleotides utilizing recombinant DNA methods are well known in the art.

A construct or vector (or multiple constructs or vectors) comprising the one or more (e.g., two, several) heterologous genes may be introduced into a cell so that the construct or vector is maintained as a chromosomal integrant or as a self-replicating extra-chromosomal vector as described earlier.

The various nucleotide and control sequences may be joined together to produce a recombinant expression vector that may include one or more (e.g., two, several) convenient restriction sites to allow for insertion or substitution of the polynucleotide at such sites. Alternatively, the polynucleotide(s) may be expressed by inserting the polynucleotide(s) or a nucleic acid construct comprising the sequence into an appropriate vector for expression. In creating the expression vector, the coding sequence is located in the vector so that the coding sequence is operably linked with the appropriate control sequences for expression.

The recombinant expression vector may be any vector (e.g., a plasmid or virus) that can be conveniently subjected to recombinant DNA procedures and can bring about expression of the polynucleotide. The choice of the vector will typically depend on the compatibility of the vector with the host cell into which the vector is to be introduced. The vector may be a linear or closed circular plasmid.

The vector may be an autonomously replicating vector, i.e., a vector that exists as an extrachromosomal entity, the replication of which is independent of chromosomal replication, e.g., a plasmid, an extrachromosomal element, a minichromosome, or an artificial chromosome. The vector may contain any means for assuring self-replication. Alternatively, the vector may be one that, when introduced into the host cell, is integrated into the genome and replicated together with the chromosome(s) into which it has been integrated. Furthermore, a single vector or plasmid or two or more vectors or plasmids that together contain the total DNA to be introduced into the genome of the cell, or a transposon, may be used.

The expression vector may contain any suitable promoter sequence that is recognized by a cell for expression of a gene described herein. The promoter sequence contains transcriptional control sequences that mediate the expression of the polypeptide. The promoter may be any polynucleotide that shows transcriptional activity in the cell of choice including mutant, truncated, and hybrid promoters, and may be obtained from genes encoding extracellular or intracellular polypeptides either homologous or heterologous to the cell.

Each heterologous polynucleotide described herein may be operably linked to a promoter that is foreign to the polynucleotide. For example, in one embodiment, the nucleic acid construct encoding the fusion protein is operably linked to a promoter foreign to the polynucleotide. The promoters may be identical to or share a high degree of sequence identity (e.g., at least about 80%, at least about 85%, at least about 90%, at least about 95%, at least about 96%, at least about 97%, at least about 98%, or at least about 99%) with a selected native promoter.

Examples of suitable promoters for directing the transcription of the nucleic acid constructs in a yeast cells, include, but are not limited to, the promoters obtained from the genes for enolase, (e.g., *S. cerevisiae* enolase or *I. orientalis* enolase (ENO1)), galactokinase (e.g., *S. cerevisiae* galactokinase or *I. orientalis* galactokinase (GAL1)), alcohol dehydrogenase/glyceraldehyde-3-phosphate dehydrogenase (e.g., *S. cerevisiae* alcohol dehydrogenase/glyceraldehyde-3-phosphate dehydrogenase or *I. orientalis* alcohol dehydrogenase/glyceraldehyde-3-phosphate dehydrogenase (ADH1, ADH2/GAP)), triose phosphate isomerase (e.g., *S. cerevisiae* triose phosphate isomerase or *I. orientalis* triose phosphate isomerase (TPI)), metallothionein (e.g., *S. cerevisiae* metallothionein or *I. orientalis* metallothionein (CUP1)), 3-phosphoglycerate kinase (e.g., *S. cerevisiae* 3-phosphoglycerate kinase or *I. orientalis* 3-phosphoglycerate kinase (PGK)), PDC1, xylose reductase (XR), xylitol dehydrogenase (XDH), L-(+)-lactate-cytochrome c oxidoreductase (CYB2), translation elongation factor-1 (TEF1), translation elongation factor-2 (TEF2), glyceraldehyde-3-phosphate dehydrogenase (GAPDH), and orotidine 5'-phosphate decarboxylase (URA3) genes. Other suitable promoters may be obtained from *S. cerevisiae* TDH3, HXT7, PGK1, RPL18B and CCW12 genes. Additional useful promoters for yeast host cells are described by Romanos et al., 1992, Yeast 8: 423-488.

The control sequence may also be a suitable transcription terminator sequence, which is recognized by a host cell to terminate transcription. The terminator sequence is operably linked to the 3'-terminus of the polynucleotide encoding the polypeptide. Any terminator that is functional in the yeast cell of choice may be used. The terminator may be identical to or share a high degree of sequence identity (e.g., at least about 80%, at least about 85%, at least about 90%, at least about 95%, at least about 96%, at least about 97%, at least about 98%, or at least about 99%) with the selected native terminator.

Suitable terminators for yeast host cells may be obtained from the genes for enolase (e.g., *S. cerevisiae* or *I. orientalis* enolase cytochrome C (e.g., *S. cerevisiae* or *I. orientalis* cytochrome (CYC1)), glyceraldehyde-3-phosphate dehydrogenase (e.g., *S. cerevisiae* or *I. orientalis* glyceraldehyde-3-phosphate dehydrogenase (gpd)), PDC1, XR, XDH, transaldolase (TAL), transketolase (TKL), ribose 5-phosphate ketol-isomerase (RKI), CYB2, and the galactose family of genes (especially the GAL10 terminator). Other suitable terminators may be obtained from *S. cerevisiae* ENO2 or TEF1 genes. Additional useful terminators for yeast host cells are described by Romanos et al., 1992, supra.

The control sequence may also be an mRNA stabilizer region downstream of a promoter and upstream of the coding sequence of a gene which increases expression of the gene.

Examples of suitable mRNA stabilizer regions are obtained from a *Bacillus thuringiensis* cryIIIA gene (WO 94/25612) and a *Bacillus subtilis* SP82 gene (Hue et al., 1995, *Journal of Bacteriology* 177: 3465-3471).

The control sequence may also be a suitable leader sequence, when transcribed is a non-translated region of an mRNA that is important for translation by the host cell. The leader sequence is operably linked to the 5'-terminus of the polynucleotide encoding the polypeptide. Any leader sequence that is functional in the yeast cell of choice may be used. Suitable leaders for yeast host cells are obtained from the genes for enolase (e.g.,

*S. cerevisiae* or *I. orientalis* enolase (ENO-1)), 3-phosphoglycerate kinase (e.g., *S. cerevisiae* or *I. orientalis* 3-phosphoglycerate kinase), alpha-factor (e.g., *S. cerevisiae* or *I. orientalis* alpha-factor), and alcohol dehydrogenase/glyceraldehyde-3-phosphate dehydrogenase (e.g., *S. cerevisiae* or *I. orientalis* alcohol dehydrogenase/glyceraldehyde-3-phosphate dehydrogenase (ADH2/GAP)).

The control sequence may also be a polyadenylation sequence; a sequence operably linked to the 3'-terminus of the polynucleotide and, when transcribed, is recognized by the host cell as a signal to add polyadenosine residues to transcribed mRNA. Any polyadenylation sequence that is functional in the host cell of choice may be used. Useful polyadenylation sequences for yeast cells are described by Guo and Sherman, 1995, *Mol. Cellular Biol.* 15: 5983-5990.

The control sequence may also be a signal peptide coding region that encodes a signal peptide linked to the N-terminus of a polypeptide and directs the polypeptide into the cell's secretory pathway. The 5'-end of the coding sequence of the polynucleotide may inherently contain a signal peptide coding sequence naturally linked in translation reading frame with the segment of the coding sequence that encodes the polypeptide. Alternatively, the 5'-end of the coding sequence may contain a signal peptide coding sequence that is foreign to the coding sequence. A foreign signal peptide coding sequence may be required where the coding sequence does not naturally contain a signal peptide coding sequence. Alternatively, a foreign signal peptide coding sequence may simply replace the natural signal peptide coding sequence in order to enhance secretion of the polypeptide. However, any signal peptide coding sequence that directs the expressed polypeptide into the secretory pathway of a host cell may be used. Useful signal peptides for yeast host cells are obtained from the genes for *Saccharomyces cerevisiae* alpha-factor and *Saccharomyces cerevisiae* invertase. Other useful signal peptide coding sequences are described by Romanos et al., 1992, supra.

The control sequence may also be a propeptide coding sequence that encodes a propeptide positioned at the N-terminus of a polypeptide. The resultant polypeptide is known as a proenzyme or propolypeptide (or a zymogen in some cases). A propolypeptide is generally inactive and can be converted to an active polypeptide by catalytic or autocatalytic cleavage of the propeptide from the propolypeptide. The propeptide coding sequence may be obtained from the genes for *Bacillus subtilis* alkaline protease (aprE), *Bacillus subtilis* neutral protease (nprT), *Myceliophthora thermophila* laccase (WO 95/33836), *Rhizomucor miehei* aspartic proteinase, and *Saccharomyces cerevisiae* alpha-factor.

Where both signal peptide and propeptide sequences are present, the propeptide sequence is positioned next to the N-terminus of a polypeptide and the signal peptide sequence is positioned next to the N-terminus of the propeptide sequence.

It may also be desirable to add regulatory sequences that allow the regulation of the expression of the polypeptide relative to the growth of the host cell. Examples of regulatory systems are those that cause the expression of the gene to be turned on or off in response to a chemical or physical stimulus, including the presence of a regulatory compound. Regulatory systems in prokaryotic systems include the lac, tac, and trp operator systems. In yeast, the ADH2 system or GAL1 system may be used.

The vectors may contain one or more (e.g., two, several) selectable markers that permit easy selection of transformed, transfected, transduced, or the like cells. A selectable marker is a gene the product of which provides for biocide or viral resistance, resistance to heavy metals, prototrophy to auxotrophs, and the like. Suitable markers for yeast host cells include, but are not limited to, ADE2, HIS3, LEU2, LYS2, MET3, TRP1, and URA3.

The vectors may contain one or more (e.g., two, several) elements that permit integration of the vector into the host cell's genome or autonomous replication of the vector in the cell independent of the genome.

For integration into the host cell genome, the vector may rely on the polynucleotide's sequence encoding the polypeptide or any other element of the vector for integration into the genome by homologous or non-homologous recombination. Alternatively, the vector may contain additional polynucleotides for directing integration by homologous recombination into the genome of the host cell at a precise location(s) in the chromosome(s). To increase the likelihood of integration at a precise location, the integrational elements should contain a sufficient number of nucleic acids, such as 100 to 10,000 base pairs, 400 to 10,000 base pairs, and 800 to 10,000 base pairs, which have a high degree of sequence identity to the corresponding target sequence to enhance the probability of homologous recombination. The integrational elements may be any sequence that is homologous with the target sequence in the genome of the host cell. Furthermore, the integrational elements may be non-encoding or encoding polynucleotides. On the other hand, the vector may be integrated into the genome of the host cell by non-homologous recombination. Potential integration loci include those described in the art (e.g., See US2012/0135481).

For autonomous replication, the vector may further comprise an origin of replication enabling the vector to replicate autonomously in the yeast cell. The origin of replication may be any plasmid replicator mediating autonomous replication that functions in a cell. The term "origin of replication" or "plasmid replicator" means a polynucleotide that enables a plasmid or vector to replicate in vivo. Examples of origins of replication for use in a yeast host cell are the 2 micron origin of replication, ARS1, ARS4, the combination of ARS1 and CEN3, and the combination of ARS4 and CEN6.

More than one copy of a polynucleotide described herein may be inserted into a host cell to increase production of a polypeptide. An increase in the copy number of the polynucleotide can be obtained by integrating at least one additional copy of the sequence into the yeast cell genome or by including an amplifiable selectable marker gene with the polynucleotide where cells containing amplified copies of the selectable marker gene, and thereby additional copies of the polynucleotide, can be selected for by cultivating the cells in the presence of the appropriate selectable agent.

The procedures used to ligate the elements described above to construct the recombinant expression vectors described herein are well known to one skilled in the art (see, e.g., Sambrook et al., 1989, *Molecular Cloning, A Laboratory Manual,* 2d edition, Cold Spring Harbor, New York).

Additional procedures and techniques known in the art for the preparation of recombinant cells for ethanol fermentation, are described in, e.g., WO 2016/045569, the content of which is hereby incorporated by reference.

The host cell or fermenting organism may be in the form of a composition comprising a host cell or fermenting organism (e.g., a yeast strain described herein) and a naturally occurring and/or a non-naturally occurring component.

The host cell or fermenting organism described herein may be in any viable form, including crumbled, dry, including active dry and instant, compressed, cream (liquid) form etc. In one embodiment, the host cell or fermenting organism (e.g., a *Saccharomyces cerevisiae* yeast strain) is dry yeast, such as active dry yeast or instant yeast. In one embodiment, the host cell or fermenting organism (e.g., a *Saccharomyces cerevisiae* yeast strain) is crumbled yeast. In one embodiment, the host cell or fermenting organism (e.g., a *Saccharomyces cerevisiae* yeast strain) is compressed yeast. In one embodiment, the host cell or fermenting organism (e.g., a *Saccharomyces cerevisiae* yeast strain) is cream yeast.

In one embodiment is a composition comprising a host cell or fermenting organism described herein (e.g., a *Saccharomyces cerevisiae* yeast strain), and one or more of the component selected from the group consisting of: surfactants, emulsifiers, gums, swelling agent, and antioxidants and other processing aids.

The compositions described herein may comprise a host cell or fermenting organism described herein (e.g., a *Saccharomyces cerevisiae* yeast strain) and any suitable surfactants. In one embodiment, the surfactant(s) is/are an anionic surfactant, cationic surfactant, and/or nonionic surfactant.

The compositions described herein may comprise a host cell or fermenting organism described herein (e.g., a *Saccharomyces cerevisiae* yeast strain) and any suitable emulsifier. In one embodiment, the emulsifier is a fatty-acid ester of sorbitan. In one embodiment, the emulsifier is selected from the group of sorbitan monostearate (SMS), citric acid esters of monodiglycerides, polyglycerolester, fatty acid esters of propylene glycol.

In one embodiment, the composition comprises a host cell or fermenting organism described herein (e.g., a *Saccharomyces cerevisiae* yeast strain), and Olindronal SMS, Olindronal SK, or Olindronal SPL including composition concerned in European Patent No. 1,724,336 (hereby incorporated by reference). These products are commercially available from Bussetti, Austria, for active dry yeast.

The compositions described herein may comprise a host cell or fermenting organism described herein (e.g., a *Saccharomyces cerevisiae* yeast strain) and any suitable gum. In one embodiment, the gum is selected from the group of carob, guar, tragacanth, arabic, xanthan and acacia gum, in particular for cream, compressed and dry yeast.

The compositions described herein may comprise a host cell or fermenting organism described herein (e.g., a *Saccharomyces cerevisiae* yeast strain) and any suitable swelling agent. In one embodiment, the swelling agent is methyl cellulose or carboxymethyl cellulose.

The compositions described herein may comprise a host cell or fermenting organism described herein (e.g., a *Saccharomyces cerevisiae* yeast strain) and any suitable antioxidant. In one embodiment, the antioxidant is butylated hydroxyanisol (BHA) and/or butylated hydroxytoluene (BHT), or ascorbic acid (vitamin C), particular for active dry yeast.

The compositions described herein may comprise a host cell or fermenting organism described herein (e.g., a *Saccharomyces* yeast strain) and any suitable fermentation enzyme (e.g., alpha-amylase (e.g., a fungal alpha-amyalse), glucoamylase, protease, and/or cellulase.

The compositions described herein may comprise a host cell or fermenting organism described herein (e.g., a *Saccharomyces* yeast strain) and at least one hemicellulase and/or at least one beta-glucanase of the present invention.

The compositions described herein may comprise a host cell or fermenting organism described herein (e.g., a *Saccharomyces* yeast strain), at least one hemicellulase and/or at least one beta-glucanase of the present invention, and any suitable fermentation enzyme (e.g., alpha-amylase (e.g., a fungal alpha-amyalse), glucoamylase, protease, and/or cellulase.

The host cells and fermenting organisms described herein may also comprise one or more (e.g., two, several) gene disruptions, e.g., to divert sugar metabolism from undesired products to ethanol. In some embodiments, the recombinant host cells produce a greater amount of ethanol compared to the cell without the one or more disruptions when cultivated under identical conditions. In some embodiments, one or more of the disrupted endogenous genes is inactivated.

In certain embodiments, the host cell or fermenting organism provided herein comprises a disruption of one or more endogenous genes encoding enzymes involved in producing alternate fermentative products such as glycerol or other byproducts such as acetate or diols. For example, the cells provided herein may comprise a disruption of one or more of glycerol 3-phosphate dehydrogenase (GPD, catalyzes reaction of dihydroxyacetone phosphate to glycerol 3-phosphate), glycerol 3-phosphatase (GPP, catalyzes conversion of glycerol-3 phosphate to glycerol), glycerol kinase (catalyzes conversion of glycerol 3-phosphate to glycerol), dihydroxyacetone kinase (catalyzes conversion of dihydroxyacetone phosphate to dihydroxyacetone), glycerol dehydrogenase (catalyzes conversion of dihydroxyacetone to glycerol), and aldehyde dehydrogenase (ALD, e.g., converts acetaldehyde to acetate).

Modeling analysis can be used to design gene disruptions that additionally optimize utilization of the pathway. One exemplary computational method for identifying and designing metabolic alterations favoring biosynthesis of a desired product is the OptKnock computational framework, Burgard et al., 2003, *Biotechnol. Bioeng.* 84: 647-657.

The host cells and fermenting organisms comprising a gene disruption may be constructed using methods well known in the art, including those methods described herein. A portion of the gene can be disrupted such as the coding region or a control sequence required for expression of the coding region. Such a control sequence of the gene may be a promoter sequence or a functional part thereof, i.e., a part that is sufficient for affecting expression of the gene. For example, a promoter sequence may be inactivated resulting in no expression or a weaker promoter may be substituted for the native promoter sequence to reduce expression of the coding sequence. Other control sequences for possible modification include, but are not limited to, a leader, propeptide sequence, signal sequence, transcription terminator, and transcriptional activator.

The host cells and fermenting organisms comprising a gene disruption may be constructed by gene deletion techniques to eliminate or reduce expression of the gene. Gene deletion techniques enable the partial or complete removal of the gene thereby eliminating their expression. In such methods, deletion of the gene is accomplished by homologous recombination using a plasmid that has been constructed to contiguously contain the 5' and 3' regions flanking the gene.

The host cells and fermenting organisms comprising a gene disruption may also be constructed by introducing, substituting, and/or removing one or more (e.g., two, several) nucleotides in the gene or a control sequence thereof required for the transcription or translation thereof. For example, nucleotides may be inserted or removed for the introduction of a stop codon, the removal of the start codon, or a frame-shift of the open reading frame. Such a modification may be accomplished by site-directed mutagenesis or PCR generated mutagenesis in accordance with methods known in the art. See, for example, Botstein and Shortle, 1985, *Science* 229: 4719; Lo et al., 1985, *Proc. Natl. Acad. Sci. U.S.A.* 81: 2285; Higuchi et al., 1988, *Nucleic Acids Res* 16: 7351; Shimada, 1996, *Meth. Mol. Biol.* 57: 157; Ho et al., 1989, *Gene* 77: 61; Horton et al., 1989, *Gene* 77: 61; and Sarkar and Sommer, 1990, *BioTechniques* 8: 404.

The host cells and fermenting organisms comprising a gene disruption may also be constructed by inserting into the gene a disruptive nucleic acid construct comprising a nucleic acid fragment homologous to the gene that will create a duplication of the region of homology and incorporate construct DNA between the duplicated regions. Such a gene disruption can eliminate gene expression if the inserted construct separates the promoter of the gene from the coding region or interrupts the coding sequence such that a non-functional gene product results. A disrupting construct may be simply a selectable marker gene accompanied by 5' and 3' regions homologous to the gene. The selectable marker enables identification of transformants containing the disrupted gene.

The host cells and fermenting organisms comprising a gene disruption may also be constructed by the process of gene conversion (see, for example, Iglesias and Trautner, 1983, *Molecular General Genetics* 189: 73-76). For example, in the gene conversion method, a nucleotide sequence corresponding to the gene is mutagenized in vitro to produce a defective nucleotide sequence, which is then transformed into the recombinant strain to produce a defective gene. By homologous recombination, the defective nucleotide sequence replaces the endogenous gene. It may be desirable that the defective nucleotide sequence also comprises a marker for selection of transformants containing the defective gene.

The host cells and fermenting organisms comprising a gene disruption may be further constructed by random or specific mutagenesis using methods well known in the art, including, but not limited to, chemical mutagenesis (see, for example, Hopwood, *The Isolation of Mutants in Methods in Microbiology* (J. R. Norris and D. W. Ribbons, eds.) pp. 363-433, Academic Press, New York, 1970). Modification of the gene may be performed by subjecting the parent strain to mutagenesis and screening for mutant strains in which expression of the gene has been reduced or inactivated. The mutagenesis, which may be specific or random, may be performed, for example, by use of a suitable physical or chemical mutagenizing agent, use of a suitable oligonucleotide, or subjecting the DNA sequence to PCR generated mutagenesis. Furthermore, the mutagenesis may be performed by use of any combination of these mutagenizing methods.

Examples of a physical or chemical mutagenizing agent suitable for the present purpose include ultraviolet (UV) irradiation, hydroxylamine, N-methyl-N'-nitro-N-nitrosoguanidine (MNNG), N-methyl-N'-nitrosogaunidine (NTG) O-methyl hydroxylamine, nitrous acid, ethyl methane sulphonate (EMS), sodium bisulphite, formic acid, and nucleotide analogues. When such agents are used, the mutagenesis is typically performed by incubating the parent strain to be mutagenized in the presence of the mutagenizing agent of choice under suitable conditions, and selecting for mutants exhibiting reduced or no expression of the gene.

A nucleotide sequence homologous or complementary to a gene described herein may be used from other microbial sources to disrupt the corresponding gene in a recombinant strain of choice.

In one embodiment, the modification of a gene in the recombinant cell is unmarked with a selectable marker. Removal of the selectable marker gene may be accomplished by culturing the mutants on a counter-selection medium. Where the selectable marker gene contains repeats flanking its 5' and 3' ends, the repeats will facilitate the looping out of the selectable marker gene by homologous recombination when the mutant strain is submitted to counter-selection. The selectable marker gene may also be removed by homologous recombination by introducing into the mutant strain a nucleic acid fragment comprising 5' and 3' regions of the defective gene, but lacking the selectable marker gene, followed by selecting on the counter-selection medium. By homologous recombination, the defective gene containing the selectable marker gene is replaced with the nucleic acid fragment lacking the selectable marker gene. Other methods known in the art may also be used.

Fermentation

The fermentation conditions are determined based on, e.g., the kind of plant material, the available fermentable sugars, the fermenting organism(s) and/or the desired fermentation product. One skilled in the art can easily determine suitable fermentation conditions. The fermentation may be carried out at conventionally used conditions. Preferred fermentation processes are anaerobic processes.

For example, fermentations may be carried out at temperatures as high as 75° C., e.g., between 40-70° C., such as between 50-60° C. However, bacteria with a significantly lower temperature optimum down to around room temperature (around 20° C.) are also known. Examples of suitable fermenting organisms can be found in the "Fermenting Organisms" section above.

For ethanol production using yeast, the fermentation may go on for 24 to 96 hours, in particular for 35 to 60 hours. In an embodiment the fermentation is carried out at a temperature between 20 to 40° C., preferably 26 to 34° C., in particular around 32° C. In an embodiment the pH is from pH 3 to 6, preferably around pH 4 to 5.

Saccharification and Fermentation

One or more carbohydrate-source generating enzymes, in particular glucoamylase, may be present and/or added during saccharification step ii) and/or fermentation step iii). The carbohydrate-source generating enzyme may preferably be a glucoamylase, but may also be an enzyme selected from the group consisting of: beta-amylase, maltogenic amylase and alpha-glucosidase. The carbohydrate-source generating enzyme added during saccharification step ii) and/or fermentation step iii) is typically different from the optional carbohydrate-source generating enzyme, in particular thermostable glucoamylase, optionally added during liquefaction step i). In a preferred embodiment the carbohydrate-source generating enzymes, in particular glucoamylase, is added together with a fungal alpha-amylase.

Examples of carbohydrate-source generating enzymes, including glucoamylases, can be found in the "Carbohydrate-Source Generating Enzyme Present and/or Added During Saccharification and/or Fermentation"-section below.

One or more alpha-amylases may be present and/or added during saccharification step ii) and/or fermentation step iii). In an embodiment, the alpha-amylase is the *Rhizomucor pusillus* alpha-amylase with *Aspergillus niger* glucoamylase linker and SBD disclosed as SEQ ID NO: 39 with the following substitutions: G128D+D143N (activity ratio AGU:AGU:FAU(F): approx. 30:7:1).

In an embodiment, the alpha-amylase is part of a blend comprising: (i) a glucoamylase from *Trametes* cingulate disclosed herein as SEQ ID NO: 48, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 48, which has glucoamylase activity; and (ii) a hybrid of the *Rhizomucor pusillus* alpha-amylase and *Aspergillus niger* glucoamylase linker and starch binding domain, which is disclosed in WO 2006/069290 or as SEQ ID NO: 39 herein, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 39, which has alpha-amylase activity.

One or more trehalases may be present and/or added during saccharification step ii) and/or fermentation step iii). In an embodiment, the trehalase is the *Myceliophthora sepedonium* trehalase disclosed herein as SEQ ID NO: 46 or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 46, which has trehalase activity. In an embodiment, the trehalase is the *Talaromyces funiculosus* trehalase disclosed herein as SEQ ID NO: 47, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 47, which has trehalase activity.

In an embodiment, the trehalase is part of a blend comprising: (i) the *Gloeophyllum sepiarium* glucoamylase disclosed in SEQ ID NO: 51, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 51, which has glucoamylase activity; (ii) the *Talaromyces funiculosus* trehalase disclosed herein as SEQ ID NO: 47, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 47, which has trehalase activity; and (iii) *Rhizomucor pusillus* alpha-amylase with *Aspergillus niger* glucoamylase linker and SBD disclosed as SEQ ID NO: 39 with the following substitutions: G128D+D143N (activity ratio AGU:AGU:FAU(F): approx. 30:7:1), or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 39, which has alpha-amylase activity.

When doing sequential saccharification and fermentation, saccharification step ii) may be carried out at conditions well-known in the art. For instance, the saccharification step ii) may last up to from about 24 to about 72 hours. In an embodiment pre-saccharification is done. Pre-saccharification is typically done for 40-90 minutes at a temperature between 30-65° C., typically at 60° C. In an embodiment, pre-saccharification is done for 4 hours to 60 hours, at a temperature from 40-70° C., and a pH between 4 and 5. In an embodiment, pre-saccharification is done for 8 hours to 48 hours at a temperature from 40-70° C., and a pH between 4 and 5. Pre-saccharification is in an embodiment followed by saccharification during fermentation in simultaneous saccharification and fermentation ("SSF). Saccharification is typically carried out at temperatures from 20-75° C., preferably from 40-70° C., typically around 60° C., and at a pH between 4 and 5, normally at about pH 4.5.

Simultaneous saccharification and fermentation ("SSF") is widely used in industrial scale fermentation product production processes, especially ethanol production processes. When doing SSF the saccharification step ii) and the fermentation step iii) are carried out simultaneously. There is no holding stage for the saccharification, meaning that a fermenting organism, such as yeast, and enzyme(s), may be added together. However, it is also contemplated to add the fermenting organism and enzyme(s) separately. SSF is according to the invention typically carried out at a temperature from 25° C. to 40° C., such as from 28° C. to 35° C., such as from 30° C. to 34° C., preferably around about 32° C. In an embodiment fermentation is ongoing for 6 to 120 hours, in particular 24 to 96 hours. In an embodiment the pH is between 3.5-5, in particular between 3.8 and 4.3.

Methods Using a Cellulosic-Containing Material

In some aspects, the methods described herein produce a fermentation product from a cellulosic-containing material.

The predominant polysaccharide in the primary cell wall of biomass is cellulose, the second most abundant is hemicellulose, and the third is pectin. The secondary cell wall, produced after the cell has stopped growing, also contains polysaccharides and is strengthened by polymeric lignin covalently cross-linked to hemicellulose. Cellulose is a homopolymer of anhydrocellobiose and thus a linear beta-(1-4)-D-glucan, while hemicelluloses include a variety of compounds, such as xylans, xyloglucans, arabinoxylans, and mannans in complex branched structures with a spectrum of substituents. Although generally polymorphous, cellulose is found in plant tissue primarily as an insoluble crystalline matrix of parallel glucan chains. Hemicelluloses usually hydrogen bond to cellulose, as well as to other hemicelluloses, which help stabilize the cell wall matrix.

Cellulose is generally found, for example, in the stems, leaves, hulls, husks, and cobs of plants or leaves, branches, and wood of trees. The cellulosic-containing material can be, but is not limited to, agricultural residue, herbaceous material (including energy crops), municipal solid waste, pulp and paper mill residue, waste paper, and wood (including forestry residue) (see, for example, Wiselogel et al., 1995, in Handbook on Bioethanol (Charles E. Wyman, editor), pp. 105-118, Taylor & Francis, Washington D.C.; Wyman, 1994, *Bioresource Technology* 50: 3-16; Lynd, 1990, *Applied Biochemistry and Biotechnology* 24/25: 695-719; Mosier et al., 1999, Recent Progress in Bioconversion of Lignocellulosics, in *Advances in Biochemical Engineering/Biotechnology*, T. Scheper, managing editor, Volume 65, pp. 23-40, Springer-Verlag, New York). It is understood herein that the cellulose may be in the form of lignocellulose, a plant cell wall material containing lignin, cellulose, and hemicellulose in a mixed matrix. In one embodiment, the cellulosic-containing material is any biomass material. In another embodiment, the cellulosic-containing material is lignocellulose, which comprises cellulose, hemicelluloses, and lignin.

In one embodiment, the cellulosic-containing material is agricultural residue, herbaceous material (including energy crops), municipal solid waste, pulp and paper mill residue, waste paper, or wood (including forestry residue).

In another embodiment, the cellulosic-containing material is *arundo*, bagasse, bamboo, corn cob, corn fiber, corn stover, *miscanthus*, rice straw, switchgrass, or wheat straw.

In another embodiment, the cellulosic-containing material is aspen, *eucalyptus*, fir, pine, poplar, spruce, or willow.

In another embodiment, the cellulosic-containing material is algal cellulose, bacterial cellulose, cotton linter, filter paper, microcrystalline cellulose (e.g., AVICEL®), or phosphoric-acid treated cellulose.

In another embodiment, the cellulosic-containing material is an aquatic biomass. As used herein the term "aquatic biomass" means biomass produced in an aquatic environment by a photosynthesis process. The aquatic biomass can be algae, emergent plants, floating-leaf plants, or submerged plants.

In another embodiment, the cellulosic-containing material is a whole stillage byproduct from a process for producing a fermentation from a starch-containing material.

The cellulosic-containing material may be used as is or may be subjected to pretreatment, using conventional methods known in the art, as described herein. In a preferred embodiment, the cellulosic-containing material is pretreated.

The methods of using cellulosic-containing material can be accomplished using methods conventional in the art. Moreover, the methods of can be implemented using any conventional biomass processing apparatus configured to carry out the processes.

Cellulosic Pretreatment

In one embodiment the cellulosic-containing material is pretreated before saccharification in step (ii).

In practicing the processes described herein, any pretreatment process known in the art can be used to disrupt plant cell wall components of the cellulosic-containing material (Chandra et al., 2007, *Adv. Biochem. Engin./Biotechnol.* 108: 67-93; Galbe and Zacchi, 2007, *Adv. Biochem. Engin./Biotechnol.* 108: 41-65; Hendriks and Zeeman, 2009, *Bioresource Technology* 100: 10-18; Mosier et al., 2005, *Bioresource Technology* 96: 673-686; Taherzadeh and Karimi, 2008, *Int. J. Mol. Sci.* 9: 1621-1651; Yang and Wyman, 2008, *Biofuels Bioproducts and Biorefining-Biofpr.* 2: 26-40).

The cellulosic-containing material can also be subjected to particle size reduction, sieving, pre-soaking, wetting, washing, and/or conditioning prior to pretreatment using methods known in the art.

Conventional pretreatments include, but are not limited to, steam pretreatment (with or without explosion), dilute acid pretreatment, hot water pretreatment, alkaline pretreatment, lime pretreatment, wet oxidation, wet explosion, ammonia fiber explosion, organosolv pretreatment, and biological pretreatment. Additional pretreatments include ammonia percolation, ultrasound, electroporation, microwave, supercritical $CO_2$, supercritical $H_2O$, ozone, ionic liquid, and gamma irradiation pretreatments.

In a one embodiment, the cellulosic-containing material is pretreated before saccharification (i.e., hydrolysis) and/or fermentation. Pretreatment is preferably performed prior to the hydrolysis. Alternatively, the pretreatment can be carried out simultaneously with enzyme hydrolysis to release fermentable sugars, such as glucose, xylose, and/or cellobiose. In most cases the pretreatment step itself results in some conversion of biomass to fermentable sugars (even in absence of enzymes).

In one embodiment, the cellulosic-containing material is pretreated with steam. In steam pretreatment, the cellulosic-containing material is heated to disrupt the plant cell wall components, including lignin, hemicellulose, and cellulose to make the cellulose and other fractions, e.g., hemicellulose, accessible to enzymes. The cellulosic-containing material is passed to or through a reaction vessel where steam is injected to increase the temperature to the required temperature and pressure and is retained therein for the desired reaction time. Steam pretreatment is preferably performed at 140-250° C., e.g., 160-200° C. or 170-190° C., where the optimal temperature range depends on optional addition of a chemical catalyst. Residence time for the steam pretreatment is preferably 1-60 minutes, e.g., 1-30 minutes, 1-20 minutes, 3-12 minutes, or 4-10 minutes, where the optimal residence time depends on the temperature and optional addition of a chemical catalyst. Steam pretreatment allows for relatively high solids loadings, so that the cellulosic-containing material is generally only moist during the pretreatment. The steam pretreatment is often combined with an explosive discharge of the material after the pretreatment, which is known as steam explosion, that is, rapid flashing to atmospheric pressure and turbulent flow of the material to increase the accessible surface area by fragmentation (Duff and Murray, 1996, *Bioresource Technology* 855: 1-33; Galbe and Zacchi, 2002, *Appl. Microbiol. Biotechnol.* 59: 618-628; U.S. Patent Application No. 2002/0164730). During steam pretreatment, hemicellulose acetyl groups are cleaved and the resulting acid autocatalyzes partial hydrolysis of the hemicellulose to monosaccharides and oligosaccharides. Lignin is removed to only a limited extent.

In one embodiment, the cellulosic-containing material is subjected to a chemical pretreatment. The term "chemical treatment" refers to any chemical pretreatment that promotes the separation and/or release of cellulose, hemicellulose, and/or lignin. Such a pretreatment can convert crystalline cellulose to amorphous cellulose. Examples of suitable chemical pretreatment processes include, for example, dilute acid pretreatment, lime pretreatment, wet oxidation, ammonia fiber/freeze expansion (AFEX), ammonia percolation (APR), ionic liquid, and organosolv pretreatments.

A chemical catalyst such as $H_2SO_4$ or $SO_2$ (typically 0.3 to 5% w/w) is sometimes added prior to steam pretreatment, which decreases the time and temperature, increases the recovery, and improves enzymatic hydrolysis (Ballesteros et al., 2006, *Appl. Biochem. Biotechnol.* 129-132: 496-508; Varga et al., 2004, *Appl. Biochem. Biotechnol.* 113-116: 509-523; Sassner et al., 2006, *Enzyme Microb. Technol.* 39: 756-762). In dilute acid pretreatment, the cellulosic-containing material is mixed with dilute acid, typically $H_2SO_4$, and water to form a slurry, heated by steam to the desired temperature, and after a residence time flashed to atmospheric pressure. The dilute acid pretreatment can be performed with a number of reactor designs, e.g., plug-flow reactors, counter-current reactors, or continuous counter-current shrinking bed reactors (Duff and Murray, 1996, *Bioresource Technology* 855: 1-33; Schell et al., 2004, *Bioresource Technology* 91: 179-188; Lee et al., 1999, *Adv. Biochem. Eng. Biotechnol.* 65: 93-115). In a specific embodiment the dilute acid pretreatment of cellulosic-containing material is carried out using 4% w/w sulfuric acid at 180° C. for 5 minutes.

Several methods of pretreatment under alkaline conditions can also be used. These alkaline pretreatments include, but are not limited to, sodium hydroxide, lime, wet oxidation, ammonia percolation (APR), and ammonia fiber/freeze expansion (AFEX) pretreatment. Lime pretreatment is performed with calcium oxide or calcium hydroxide at temperatures of 85-150° C. and residence times from one hour to several days (Wyman et al., 2005, *Bioresource Technology* 96: 1959-1966; Mosier et al., 2005, *Bioresource Technology* 96: 673-686). WO 2006/110891, WO 2006/110899, WO 2006/110900, and WO 2006/110901 disclose pretreatment methods using ammonia.

Wet oxidation is a thermal pretreatment performed typically at 180-200° C. for 5-15 minutes with addition of an oxidative agent such as hydrogen peroxide or over-pressure of oxygen (Schmidt and Thomsen, 1998, *Bioresource Technology* 64: 139-151; Palonen et al., 2004, *Appl. Biochem. Biotechnol.* 117: 1-17; Varga et al., 2004, *Biotechnol. Bioeng.* 88: 567-574; Martin et al., 2006, *J. Chem. Technol. Biotechnol.* 81: 1669-1677). The pretreatment is performed preferably at 1-40% dry matter, e.g., 2-30% dry matter or 5-20% dry matter, and often the initial pH is increased by the addition of alkali such as sodium carbonate.

A modification of the wet oxidation pretreatment method, known as wet explosion (combination of wet oxidation and steam explosion) can handle dry matter up to 30%. In wet explosion, the oxidizing agent is introduced during pretreatment after a certain residence time. The pretreatment is then ended by flashing to atmospheric pressure (WO2006/032282).

Ammonia fiber expansion (AFEX) involves treating the cellulosic-containing material with liquid or gaseous ammonia at moderate temperatures such as 90-150° C. and high pressure such as 17-20 bar for 5-10 minutes, where the dry matter content can be as high as 60% (Gollapalli et al., 2002, *Appl. Biochem. Biotechnol.* 98: 23-35; Chundawat et al., 2007, *Biotechnol. Bioeng.* 96: 219-231; Alizadeh et al., 2005, *Appl. Biochem. Biotechnol.* 121: 1133-1141; Teymouri et al., 2005, *Bioresource Technology* 96: 2014-2018). During AFEX pretreatment cellulose and hemicelluloses remain relatively intact. Lignin-carbohydrate complexes are cleaved.

Organosolv pretreatment delignifies the cellulosic-containing material by extraction using aqueous ethanol (40-60% ethanol) at 160-200° C. for 30-60 minutes (Pan et al., 2005, *Biotechnol. Bioeng.* 90: 473-481; Pan et al., 2006, *Biotechnol. Bioeng.* 94: 851-861; Kurabi et al., 2005, *Appl. Biochem. Biotechnol.* 121: 219-230). Sulphuric acid is usually added as a catalyst. In organosolv pretreatment, the majority of hemicellulose and lignin is removed.

Other examples of suitable pretreatment methods are described by Schell et al., 2003, *Appl. Biochem. Biotechnol.* 105-108: 69-85, and Mosier et al., 2005, *Bioresource Technology* 96: 673-686, and U.S. Published Application 2002/0164730.

In one embodiment, the chemical pretreatment is carried out as a dilute acid treatment, and more preferably as a continuous dilute acid treatment. The acid is typically sulfuric acid, but other acids can also be used, such as acetic acid, citric acid, nitric acid, phosphoric acid, tartaric acid, succinic acid, hydrogen chloride, or mixtures thereof. Mild acid treatment is conducted in the pH range of preferably 1-5, e.g., 1-4 or 1-2.5. In one aspect, the acid concentration is in the range from preferably 0.01 to 10 wt. % acid, e.g., 0.05 to 5 wt. % acid or 0.1 to 2 wt. % acid. The acid is contacted with the cellulosic-containing material and held at a temperature in the range of preferably 140-200° C., e.g., 165-190° C., for periods ranging from 1 to 60 minutes.

In another embodiment, pretreatment takes place in an aqueous slurry. In preferred aspects, the cellulosic-containing material is present during pretreatment in amounts preferably between 10-80 wt. %, e.g., 20-70 wt. % or 30-60 wt. %, such as around 40 wt. %. The pretreated cellulosic-containing material can be unwashed or washed using any method known in the art, e.g., washed with water.

In one embodiment, the cellulosic-containing material is subjected to mechanical or physical pretreatment. The term "mechanical pretreatment" or "physical pretreatment" refers to any pretreatment that promotes size reduction of particles. For example, such pretreatment can involve various types of grinding or milling (e.g., dry milling, wet milling, or vibratory ball milling).

The cellulosic-containing material can be pretreated both physically (mechanically) and chemically. Mechanical or physical pretreatment can be coupled with steaming/steam explosion, hydrothermolysis, dilute or mild acid treatment, high temperature, high pressure treatment, irradiation (e.g., microwave irradiation), or combinations thereof. In one aspect, high pressure means pressure in the range of preferably about 100 to about 400 psi, e.g., about 150 to about 250 psi. In another aspect, high temperature means temperature in the range of about 100 to about 300° C., e.g., about 140 to about 200° C. In a preferred aspect, mechanical or physical pretreatment is performed in a batch-process using a steam gun hydrolyzer system that uses high pressure and high temperature as defined above, e.g., a Sunds Hydrolyzer available from Sunds Defibrator AB, Sweden. The physical and chemical pretreatments can be carried out sequentially or simultaneously, as desired.

Accordingly, in one embodiment, the cellulosic-containing material is subjected to physical (mechanical) or chemical pretreatment, or any combination thereof, to promote the separation and/or release of cellulose, hemicellulose, and/or lignin.

In one embodiment, the cellulosic-containing material is subjected to a biological pretreatment. The term "biological pretreatment" refers to any biological pretreatment that promotes the separation and/or release of cellulose, hemicellulose, and/or lignin from the cellulosic-containing material. Biological pretreatment techniques can involve applying lignin-solubilizing microorganisms and/or enzymes (see, for example, Hsu, T.-A., 1996, Pretreatment of biomass, in *Handbook on Bioethanol: Production and Utilization*, Wyman, C. E., ed., Taylor & Francis, Washington, DC, 179-212; Ghosh and Singh, 1993, *Adv. Appl. Microbiol.* 39: 295-333; McMillan, J. D., 1994, Pretreating lignocellulosic biomass: a review, in *Enzymatic Conversion of Biomass for Fuels Production*, Himmel, M. E., Baker, J. O., and Overend, R. P., eds., ACS Symposium Series 566, American Chemical Society, Washington, DC, chapter 15; Gong, C. S., Cao, N. J., Du, J., and Tsao, G. T., 1999, Ethanol production from renewable resources, in *Advances in Biochemical Engineering/Biotechnology*, Scheper, T., ed., Springer-Verlag Berlin Heidelberg, Germany, 65: 207-241; Olsson and Hahn-Hagerdal, 1996, *Enz. Microb. Tech.* 18: 312-331; and Vallander and Eriksson, 1990, *Adv. Biochem. Eng./Biotechnol.* 42: 63-95).

Saccharification and Fermentation of Cellulosic-Containing Material

Saccharification (i.e., hydrolysis) and fermentation, separate or simultaneous, include, but are not limited to, separate hydrolysis and fermentation (SHF); simultaneous saccharification and fermentation (SSF); simultaneous saccharification and co-fermentation (SSCF); hybrid hydrolysis and fermentation (HHF); separate hydrolysis and co-fermentation (SHCF); hybrid hydrolysis and co-fermentation (HHCF).

SHF uses separate process steps to first enzymatically hydrolyze the cellulosic-containing material to fermentable sugars, e.g., glucose, cellobiose, and pentose monomers, and then ferment the fermentable sugars to ethanol. In SSF, the enzymatic hydrolysis of the cellulosic-containing material and the fermentation of sugars to ethanol are combined in one step (Philippidis, G. P., 1996, Cellulose bioconversion technology, in *Handbook on Bioethanol: Production and Utilization*, Wyman, C. E., ed., Taylor & Francis, Washington, DC, 179-212). SSCF involves the co-fermentation of multiple sugars (Sheehan and Himmel, 1999, *Biotechnol. Prog.* 15: 817-827). HHF involves a separate hydrolysis step, and in addition a simultaneous saccharification and hydrolysis step, which can be carried out in the same reactor. The steps in an HHF process can be carried out at different temperatures, i.e., high temperature enzymatic saccharification followed by SSF at a lower temperature that the fermentation organism can tolerate. It is understood herein that any method known in the art comprising pretreatment, enzymatic hydrolysis (saccharification), fermentation, or a combination thereof, can be used in the practicing the processes described herein.

A conventional apparatus can include a fed-batch stirred reactor, a batch stirred reactor, a continuous flow stirred reactor with ultrafiltration, and/or a continuous plug-flow column reactor (de Castilhos Corazza et al., 2003, *Acta Scientiarum. Technology* 25: 33-38; Gusakov and Sinitsyn, 1985, *Enz. Microb. Technol.* 7: 346-352), an attrition reactor (Ryu and Lee, 1983, *Biotechnol. Bioeng.* 25: 53-65). Additional reactor types include fluidized bed, upflow blanket, immobilized, and extruder type reactors for hydrolysis and/or fermentation.

In the saccharification step (i.e., hydrolysis step), the cellulosic and/or starch-containing material, e.g., pretreated or liquified, is hydrolyzed to break down cellulose, hemicellulose, and/or starch to fermentable sugars, such as glucose, cellobiose, xylose, xylulose, arabinose, mannose, galactose, and/or soluble oligosaccharides. The hydrolysis is performed enzymatically e.g., by a cellulolytic enzyme composition. The enzymes of the compositions can be added simultaneously or sequentially.

Enzymatic hydrolysis may be carried out in a suitable aqueous environment under conditions that can be readily determined by one skilled in the art. In one aspect, hydrolysis is performed under conditions suitable for the activity of the enzymes(s), i.e., optimal for the enzyme(s). The hydrolysis can be carried out as a fed batch or continuous process where the cellulosic and/or starch-containing material is fed gradually to, for example, an enzyme containing hydrolysis solution.

The saccharification is generally performed in stirred-tank reactors or fermentors under controlled pH, temperature, and mixing conditions. Suitable process time, temperature and pH conditions can readily be determined by one skilled in the art. For example, the saccharification can last up to 200 hours, but is typically performed for preferably about 12 to about 120 hours, e.g., about 16 to about 72 hours or about 24 to about 48 hours. The temperature is in the range of preferably about 25° C. to about 70° C., e.g., about 30° C. to about 65° C., about 40° C. to about 60° C., or about 50° C. to about 55° C. The pH is in the range of preferably about 3 to about 8, e.g., about 3.5 to about 7, about 4 to about 6, or about 4.5 to about 5.5. The dry solids content is in the range of preferably about 5 to about 50 wt. %, e.g., about 10 to about 40 wt. % or about 20 to about 30 wt. %.

Saccharification in step (ii) may be carried out using a cellulolytic enzyme composition. Such enzyme compositions are described below in the "Cellulolytic Enzyme Composition'-section below. The cellulolytic enzyme compositions can comprise any protein useful in degrading the cellulosic-containing material. In one aspect, the cellulolytic enzyme composition comprises or further comprises one or more (e.g., two, several) proteins selected from the group consisting of a cellulase, an AA9 (GH61) polypeptide, a hemicellulase, an esterase, an expansin, a ligninolytic enzyme, an oxidoreductase, a pectinase, a protease, and a swollenin.

In another embodiment, the cellulase is preferably one or more (e.g., two, several) enzymes selected from the group consisting of an endoglucanase, a cellobiohydrolase, and a beta-glucosidase.

In another embodiment, the hemicellulase is preferably one or more (e.g., two, several) enzymes selected from the group consisting of an acetylmannan esterase, an acetylxylan esterase, an arabinanase, an arabinofuranosidase, a coumaric acid esterase, a feruloyl esterase, a galactosidase, a glucuronidase, a glucuronoyl esterase, a mannanase, a mannosidase, a xylanase, and a xylosidase. In another embodiment, the oxidoreductase is one or more (e.g., two, several) enzymes selected from the group consisting of a catalase, a laccase, and a peroxidase.

The enzymes or enzyme compositions used in a processes of the present invention may be in any form suitable for use, such as, for example, a fermentation broth formulation or a cell composition, a cell lysate with or without cellular debris, a semi-purified or purified enzyme preparation, or a host cell as a source of the enzymes. The enzyme composition may be a dry powder or granulate, a non-dusting granulate, a liquid, a stabilized liquid, or a stabilized protected enzyme. Liquid enzyme preparations may, for instance, be stabilized by adding stabilizers such as a sugar, a sugar alcohol or another polyol, and/or lactic acid or another organic acid according to established processes.

In one embodiment, an effective amount of cellulolytic or hemicellulolytic enzyme composition to the cellulosic-containing material is about 0.5 to about 50 mg, e.g., about 0.5 to about 40 mg, about 0.5 to about 25 mg, about 0.75 to about 20 mg, about 0.75 to about 15 mg, about 0.5 to about 10 mg, or about 2.5 to about 10 mg per g of the cellulosic-containing material.

In one embodiment, such a compound is added at a molar ratio of the compound to glucosyl units of cellulose of about $10^{-6}$ to about 10, e.g., about $10^{-6}$ to about 7.5, about $10^{-6}$ to about 5, about $10^{-6}$ to about 2.5, about $10^{-6}$ to about 1, about $10^{-5}$ to about 1, about $10^{-5}$ to about $10^{-1}$, about $10^{-4}$ to about $10^{-1}$, about $10^{-3}$ to about $10^{-1}$, or about $10^{-3}$ to about $10^{-2}$. In another aspect, an effective amount of such a compound is about 0.1 μM to about 1 M, e.g., about 0.5 μM to about 0.75 M, about 0.75 μM to about 0.5 M, about 1 μM to about 0.25 M, about 1 μM to about 0.1 M, about 5 μM to about 50 mM, about 10 μM to about 25 mM, about 50 μM to about 25 mM, about 10 μM to about 10 mM, about 5 μM to about 5 mM, or about 0.1 mM to about 1 mM.

The term "liquor" means the solution phase, either aqueous, organic, or a combination thereof, arising from treatment of a lignocellulose and/or hemicellulose material in a slurry, or monosaccharides thereof, e.g., xylose, arabinose, mannose, etc., under conditions as described in WO 2012/021401, and the soluble contents thereof. A liquor for cellulolytic enhancement of an AA9 polypeptide (GH61 polypeptide) can be produced by treating a lignocellulose or hemicellulose material (or feedstock) by applying heat and/or pressure, optionally in the presence of a catalyst, e.g., acid, optionally in the presence of an organic solvent, and optionally in combination with physical disruption of the material, and then separating the solution from the residual solids. Such conditions determine the degree of cellulolytic enhancement obtainable through the combination of liquor and an AA9 polypeptide during hydrolysis of a cellulosic substrate by a cellulolytic enzyme preparation. The liquor can be separated from the treated material using a method standard in the art, such as filtration, sedimentation, or centrifugation.

In one embodiment, an effective amount of the liquor to cellulose is about $10^{-6}$ to about 10 g per g of cellulose, e.g., about $10^{-6}$ to about 7.5 g, about $10^{-6}$ to about 5 g, about $10^{-6}$ to about 2.5 g, about $10^{-6}$ to about 1 g, about $10^{-5}$ to about 1 g, about $10^{-5}$ to about $10^{-1}$ g, about $10^{-4}$ to about $10^{-1}$ g, about $10^{-3}$ to about $10^{-1}$ g, or about $10^{-3}$ to about $10^{-2}$ g per g of cellulose.

In the fermentation step, sugars, released from the cellulosic-containing material, e.g., as a result of the pretreatment and enzymatic hydrolysis steps, are fermented to ethanol, by a fermenting organism, such as yeast described herein. Hydrolysis (saccharification) and fermentation can be separate or simultaneous.

Any suitable hydrolyzed cellulosic-containing material can be used in the fermentation step in practicing the processes described herein. Such feedstocks include, but are not limited to carbohydrates (e.g., lignocellulose, xylans, cellulose, starch, etc.). The material is generally selected based on economics, i.e., costs per equivalent sugar potential, and recalcitrance to enzymatic conversion.

Production of ethanol by a fermenting organism using cellulosic-containing material results from the metabolism of sugars (monosaccharides). The sugar composition of the hydrolyzed cellulosic-containing material and the ability of the fermenting organism to utilize the different sugars has a direct impact in process yields.

Compositions of the fermentation media and fermentation conditions depend on the fermenting organism and can easily be determined by one skilled in the art. Typically, the fermentation takes place under conditions known to be suitable for generating the fermentation product. In some embodiments, the fermentation process is carried out under aerobic or microaerophilic (i.e., where the concentration of oxygen is less than that in air), or anaerobic conditions. In some embodiments, fermentation is conducted under anaerobic conditions (i.e., no detectable oxygen), or less than about 5, about 2.5, or about 1 mmol/L/h oxygen. In the absence of oxygen, the NADH produced in glycolysis cannot be oxidized by oxidative phosphorylation. Under anaerobic conditions, pyruvate or a derivative thereof may be utilized by the host cell as an electron and hydrogen acceptor in order to generate NAD+.

The fermentation process is typically run at a temperature that is optimal for the recombinant fungal cell. For example, in some embodiments, the fermentation process is performed at a temperature in the range of from about 25° C. to about 42° C. Typically the process is carried out a temperature that is less than about 38° C., less than about 35° C., less than about 33° C., or less than about 38° C., but at least about 20° C., 22° C., or 25° C.

A fermentation stimulator can be used in a process described herein to further improve the fermentation, and in particular, the performance of the fermenting organism, such as, rate enhancement and product yield (e.g., ethanol yield). A "fermentation stimulator" refers to stimulators for growth of the fermenting organisms, in particular, yeast. Preferred fermentation stimulators for growth include vitamins and minerals. Examples of vitamins include multivitamins, biotin, pantothenate, nicotinic acid, meso-inositol, thiamine, pyridoxine, para-aminobenzoic acid, folic acid, riboflavin, and Vitamins A, B, C, D, and E. See, for example, Alfenore et al., Improving ethanol production and viability of *Saccharomyces cerevisiae* by a vitamin feeding strategy during fed-batch process, Springer-Verlag (2002), which is hereby incorporated by reference. Examples of minerals include minerals and mineral salts that can supply nutrients comprising P, K, Mg, S, Ca, Fe, Zn, Mn, and Cu.

Recovery

Subsequent to fermentation or SSF, the fermentation product may be separated from the fermentation medium. The fermentation product, e.g., ethanol, can optionally be recovered from the fermentation medium using any method known in the art including, but not limited to, chromatography, electrophoretic procedures, differential solubility, distillation, or extraction. For example, alcohol is separated from the fermented cellulosic material or fermented starch-containing material and purified by conventional methods of distillation.

Thus, in one embodiment, the method of the invention further comprises distillation to obtain the fermentation product, e.g., ethanol. The fermentation and the distillation may be carried out simultaneously and/or separately/sequentially; optionally followed by one or more process steps for further refinement of the fermentation product.

Following the completion of the distillation process, the material remaining is considered the whole stillage. As used herein, the term "whole stillage" includes the material that remains at the end of the distillation process after recovery of the fermentation product, e.g., ethanol.

As another example, the desired fermentation product may be extracted from the fermentation medium by micro or membrane filtration techniques. Ethanol with a purity of up to about 96 vol. % can be obtained, which can be used as, for example, fuel ethanol, drinking ethanol, i.e., potable neutral spirits, or industrial ethanol.

In some embodiments of the methods, the fermentation product after being recovered is substantially pure. With respect to the methods herein, "substantially pure" intends a recovered preparation that contains no more than 15% impurity, wherein impurity intends compounds other than the fermentation product (e.g., ethanol). In one variation, a substantially pure preparation is provided wherein the preparation contains no more than 25% impurity, or no more than 20% impurity, or no more than 10% impurity, or no more than 5% impurity, or no more than 3% impurity, or no more than 1% impurity, or no more than 0.5% impurity.

Suitable assays to test for the production of ethanol and contaminants, and sugar consumption can be performed using methods known in the art. For example, ethanol product, as well as other organic compounds, can be analyzed by methods such as HPLC (High Performance Liquid Chromatography), GC-MS (Gas Chromatography Mass Spectroscopy) and LC-MS (Liquid Chromatography-Mass Spectroscopy) or other suitable analytical methods using routine procedures well known in the art. The release of ethanol in the fermentation broth can also be tested with the culture supernatant. Byproducts and residual sugar in the fermentation medium (e.g., glucose or xylose) can be quantified by HPLC using, for example, a refractive index detector for glucose and alcohols, and a UV detector for organic acids (Lin et al., *Biotechnol. Bioeng.* 90:775-779 (2005)), or using other suitable assay and detection methods well known in the art.

Separating (Dewatering) Whole Stillage into Thin Stillage and Wet Cake

In one embodiment, the whole stillage is separated or partitioned into a solid and liquid phase by one or more methods for separating the thin stillage from the wet cake. Separating whole stillage into thin stillage and wet cake in order to remove a significant portion of the liquid/water, may be done using any suitable separation technique, including centrifugation, pressing and filtration. In a preferred embodiment, the separation/dewatering is carried out by centrifugation. Preferred centrifuges in industry are decanter type centrifuges, preferably high speed decanter type centrifuges. An example of a suitable centrifuge is the NX 400 steep cone series from Alfa Laval which is a high-performance decanter. In another preferred embodiment, the separation is carried out using other conventional separation equipment such as a plate/frame filter presses, belt filter presses, screw presses, gravity thickeners and deckers, or similar equipment.

Processing of Thin Stillage

Thin stillage is the term used for the supernatant of the centrifugation of the whole stillage. Typically, the thin stillage contains 4-6 percent dry solids (DS) (mainly proteins, soluble fiber, fine fibers, and cell wall components) and has a temperature of about 60-90 degrees centigrade. The thin stillage stream may be condensed by evaporation to provide two process streams including: (i) an evaporator condensate stream comprising condensed water removed from the thin stillage during evaporation, and (ii) a syrup stream, comprising a more concentrated stream of the non-volatile dissolved and non-dissolved solids, such as non-fermentable sugars and oil, remaining present from the thin stillage as the result of removing the evaporated water. Optionally, oil can be removed from the thin stillage or can be removed as an intermediate step to the evaporation process, which is typically carried out using a series of several evaporation stages. Syrup and/or de-oiled syrup may be introduced into a dryer together with the wet grains (from the whole stillage separation step) to provide a product referred to as distillers dried grain with solubles, which also can be used as animal feed.

In an embodiment, syrup and/or de-oiled syrup is sprayed into one or more dryers to combine the syrup and/or de-oiled syrup with the whole stillage to produce distillers dried grain with solubles.

Between 5-90 vol-%, such as between 10-80%, such as between 15-70%, such as between 20-60% of thin stillage (e.g., optionally hydrolyzed) may be recycled (as backset) to step (a). The recycled thin stillage (i.e., backset) may constitute from about 1-70 vol.-%, preferably 15-60% vol.-%, especially from about 30 to 50 vol.-% of the slurry formed in step (a).

In an embodiment, the process further comprises recycling at least a portion of the thin stillage stream to the slurry, optionally after oil has been extracted from the thin stillage stream.

Drying of Wet Cake and Producing Distillers Dried Grains and Distillers Dried Grains with Solubles After the wet cake, containing about 25-40 wt-%, preferably 30-38 wt-% dry solids, has been separated from the thin stillage (e.g., dewatered) it may be dried in a drum dryer, spray dryer, ring drier, fluid bed drier or the like in order to produce "Distillers Dried Grains" (DDG). DDG is a valuable feed ingredient for animals, such as livestock, poultry and fish. It is preferred to provide DDG with a content of less than about 10-12 wt.-% moisture to avoid mold and microbial breakdown and increase the shelf life. Further, high moisture content also makes it more expensive to transport DDG. The wet cake is preferably dried under conditions that do not denature proteins in the wet cake. The wet cake may be blended with syrup separated from the thin stillage and dried into DDG with Solubles (DDGS). Partially dried intermediate products, such as are sometimes referred to as modified wet distillers grains, may be produced by partially drying wet cake, optionally with the addition of syrup before, during or after the drying process.

III. Processes for Producing a High Protein Feed Ingredient from a Whole Stillage Byproduct An aspect of the present invention relates to a process for producing a high protein feed ingredient from a whole stillage byproduct produced in a starch-containing grain dry milling process for producing a fermentation product, wherein at least one hemicellulase, at least one beta-glucanase, or an enzyme blend comprising at least one hemicellulase and/or at least one beta-glucanase is for partitioning a greater amount of protein from the whole stillage byproduct into the high protein fraction, rather than being retained in the wet cake, to produce a high protein feed ingredient.

In an embodiment, the present invention provides a method for producing a high protein feed ingredient from a whole stillage byproduct produced in a starch-containing grain dry milling process for producing a fermentation product, the method comprising:

a) performing a starch-containing grain dry milling process for producing a fermentation product to produce a fermentation product and a whole stillage byproduct;

b) separating the whole stillage byproduct into an insoluble solids portion and a thin stillage portion;
c) separating the thin stillage portion into at least a first separated water-soluble solids portion, and at least a first separated protein portion;
d) optionally separating at least the first separated protein portion into at least a second separated water-soluble solids portion, and at least a second separated protein portion;
e) drying at least the first separated protein portion, and/or optionally at least the second separated protein portion, to define a protein product, wherein the protein product is a high protein feed ingredient;

wherein at least one hemicellulase and/or at least one beta-glucanase, or an enzyme blend comprising at least one hemicellulase and/or at least one beta-glucanase added prior to or during production of the whole stillage byproduct and/or separating the whole stillage byproduct.

The at least one hemicellulase and/or at least one beta-glucanase, and cellulolytic composition present or added in the above method for producing a high protein feed ingredient from a whole stillage byproduct produced in a starch-containing grain dry milling process for producing a fermentation product may be added exogenously during saccharification, fermentation or simultaneous saccharification and fermentation as mono-components, as enzyme blends or compositions comprising the hemicellulases and/or beta-glucanases, and/or via in-situ expression and secretion of the hemicellulases and/or beta-glucanases by the fermenting organism, e.g., a recombinant host cell or fermenting organism described herein (e.g., yeast, such as from the genus *Saccharomyces*, preferably *Saccharomyces cerevisiae*).

An enzyme blend of the invention may suitably be used in a process or method of the invention. A recombinant host cell or fermenting organism of the invention may suitably be used in a process or method of the invention. However, the enzymes may also be added separately.

Those skilled in the art will appreciate that the "water-soluble" solids portion may include very fine particulates that are difficult to remove via separation (e.g., centrifugation).

As used herein, "protein portion" includes components other than protein. For example, the "protein portion" may include at least 40%, at least 45%, at least 50%, at least 55%, at least 60%, at least 65%, or at least 70% or more protein.

Separating step b) may be performed using a variety of techniques which are available to the ordinarily skilled artisan. In embodiment, separating step b) is performed by subjecting the whole stillage byproduct to a centrifuge. In an embodiment. The centrifuge is a filtration centrifuge. In an embodiment, the centrifuge is a decanter centrifuge. In an embodiment, separating step b) is performed using a screen. In an embodiment, the screen is a pressure screen. In an embodiment the screen is a paddle screen. In an embodiment, separating step b) is performed by subjecting the whole stillage byproduct to a filtration centrifuge, a decanter centrifuge, a pressure screen, or a paddle screen.

Separating step c) may be performed using a variety of techniques which are available to the ordinary skilled artisan. In an embodiment, separating step c) is performed by subjecting the thin stillage portion to a centrifuge or a cyclone apparatus. Optional separating step d) may be performed using a variety of techniques which are available to the ordinarily skilled artisan. In an embodiment, optional separating step d) is performed by subjecting the first separated protein portion to a centrifuge or a cyclone apparatus. Those skilled in the art will appreciate the first separated protein portion may be re-slurried prior to performing optional separating step d).

Drying step d) may be performed using a variety of techniques which are available to the ordinarily skilled artisan. In an embodiment, drying is performed by subjecting at least the first separated protein portion and/or optionally the at least the second separated protein portion to a temperature change that results in removal of water from the first and/or second separated protein portions. For example, drying may include freeze drying, or using a dryer (e.g., gas-fired) or an oven. In an embodiment, drying step e) is performed by subjecting at least the first separated protein portion and/or optionally the at least the second separated protein portion to a decanter centrifuge to dewater the first and/or optionally the second separated protein portions to define the high protein feed ingredient.

As used herein, "during production of the whole stillage byproduct" encompasses addition of the enzymes to the whole stillage byproduct itself, as well as addition of the enzymes during processing steps leading up to the production of the byproduct.

Those skilled in the art will appreciate that the whole stillage byproduct contains a slurry of soluble and insoluble solids, i.e., the spent grains from the distillation and dehydration step, which includes protein, fiber, oil, and sugars that are processed in accordance with embodiments of this invention to produce a high protein feed ingredient that can be sold, e.g., as an animal feed, at a higher cost per ton than typical DDGS or DWGS. In one embodiment, the resulting high protein feed ingredient includes at least 40% wt percent protein on a dry basis as compared to a protein content of about 29 percent typically found in DDGS. In an embodiment, the resulting high protein feed ingredient includes at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%, at least 71%, at least 72%, at least 73%, at least 74%, at least 75%, at least 76%, at least 77%, at least 78%, at least 79%, or at least 80% wt percent protein on a dry basis as compared to a protein content of about 29 percent typically found in DDGS.

The work described herein demonstrates that the hemicellulase, when used alone or in combination with a cellulolytic composition, significantly increases the amount of protein in the high protein feed ingredient compared to high protein feed ingredient produced using the same process but without using hemicellulase and/or cellulolytic composition. In an embodiment, the hemicellulase, enzyme blend comprising hemicellulase, and processes of use thereof increase the amount of protein in the resulting high protein feed ingredient by least 1%, at least 2%, at least 3%, at least 4%, at least 5%, at least 6%, at least 7%, at least 8%, at least 9%, at least 10%, at 11%, at least 12%, at least 13%, at least 14%, at least 15%, at least 16%, at least 17%, at least 18%, at least 19%, at least 20%, at least 21%, at least 22%, at least 23%, at least 24%, or up to at least 25%, at least 27%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70%,more protein compared to a high protein feed ingredient produced using the same process without the hemicellulase or enzyme blend comprising hemicellulase.

The work describe herein further demonstrates that the beta-glucanases, when used alone or in combination with a cellulolytic composition, significantly increases the weight percent protein on a dry basis of the high protein feed ingredient compared to a high protein feed ingredient produced using the same process but without using beta-glucanase(s) and/or the cellulolytic composition. In an embodiment, the beta-glucanase, enzyme blend comprising beta-glucanase, and processes of use thereof increase the weight percent protein on a dry basis in the resulting high protein feed ingredient by least 1%, at least 2%, at least 3%, at least 4%, at least 5%, at least 6%, at least 7%, at least 8%, at least 9%, at least 10%, at 11%, at least 12%, at least 13%, at least 14%, at least 15%, at least 16%, at least 17%, at least 18%, at least 19%, at least 20%, at least 21%, at least 22%, at least 23%, at least 24%, or up to at least 25%, at least 27%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, at least 50%, at least 51%, at least 52%, at least 53%, at least 54%, at least 55%, at least 56%, at least 57%, at least 58%, at least 59%, at least 60%, at least 61%, at least 62%, at least 63%, at least 64%, at least 65%, at least 66%, at least 67%, at least 68%, at least 69%, at least 70% or more protein compared to a high protein feed ingredient produced using the same process without the beta-glucanase, or enzyme blend comprising beta-glucanase.

Any starch-containing grain can be used as the starting material for producing a high protein feed ingredient in accordance with the processes described herein. In an embodiment, the starch-containing grain comprises maize, corn, wheat, rye, barley, triticale, sorghum, switchgrass, millet, pearl millet, foxtail millet.

The high protein feed ingredient can be incorporated into a feed and sold to feed any animal. In an embodiment, the high protein feed ingredient is a high protein corn-based animal feed. In an embodiment, the high protein feed ingredient is a high protein wheat-based animal feed. In an embodiment, the high protein feed ingredient is a high protein rye-based animal feed. In an embodiment, the high protein feed ingredient is a high protein barley-based animal feed. In an embodiment, the high protein feed ingredient is a high protein triticale-based animal feed. In an embodiment, the high protein feed ingredient is a high protein sorghum-based animal feed. In an embodiment, the high protein feed ingredient is a high protein millet-based animal feed. In an embodiment, the high protein millet-based animal feed comprises pearl millet. In an embodiment, the high protein millet-based animal feed ingredient comprises foxtail millet. In an embodiment, the high protein feed ingredient is a high protein switchgrass-based animal feed. In an embodiment, the high protein feed ingredient is a blended high protein animal feed comprising any two, three, four, or five high protein animal feed ingredients selected from the group consisting of a high protein maize feed ingredient, a high protein corn feed ingredient, a high protein wheat ingredient, a high protein rye ingredient, a high protein barley ingredient, a high protein triticale ingredient, a high protein sorghum ingredient, a high protein switchgrass ingredient, a high protein millet ingredient, a high protein pearl millet ingredient, and a high protein foxtail millet ingredient.

In an embodiment, the process further includes, after separating the whole stillage byproduct into an insoluble solids portion and a thin stillage portion and before separating the thin stillage portion into a first separated protein portion and a first separated water-soluble solids portion, separating fine fiber from the thin stillage portion. In an embodiment, separating fine fiber from the thin stillage portion comprises separating the fine fiber via a pressure screen, paddle screen, decanter, or filtration centrifuge.

In an embodiment, the process further includes separating soluble solids from the first separated water-soluble solids portion to provide a first soluble solids portion, and optionally separating soluble solids from the second separated water-soluble solids portion to provide a second soluble solids portion.

In an embodiment, the process further includes the step of separating free oil from the first separated water-soluble solids portion to provide a first oil portion, and optionally separating free oil from the second separated water-soluble solids portion to provide a second oil portion.

In an embodiment, the hemicellulase, beta-glucanase, or enzyme blend comprising hemicellulase and/or beta-glucanase is added during the production of the whole stillage byproduct.

In an embodiment, the hemicellulase, beta-glucanase, or enzyme blend comprising hemicellulase and/or beta-glucanase is added during the separation of the whole stillage byproduct into the insoluble solids portion and the thin stillage portion.

In an embodiment, the hemicellulase and/or beta-glucanase, or the enzyme blend comprising at least one hemicellulase and/or beta-glucanase is added to the whole stillage prior to separation into insoluble solids and thin stillage.

The hemicellulase and/or beta-glucanase, or enzyme blend comprising at least one hemicellulase and/or beta-glucanase added to the whole stillage as described in any of these embodiments may be incubated with the whole stillage for a period of time sufficient to increase and/or optimize the amount of protein that is portioned into the high protein fraction rather than the wet cake and/or increase the mass of the high protein fraction that ends up in the high protein feed ingredient (e.g., increase the weight percent protein on a dry basis of the high protein feed ingredient). The incubation period of the hemicellulase and/or beta-glucanase, or enzyme blend comprising the hemicellulase and/or beta-glucanase is at least 30 minutes, at least 45 minutes, at least 1 hour, at least 2 hours, at least 3 hours, at least 4 hours, at least 5 hours, at least 6 hours, at least 8 hours, at least 10 hours, at least 12 hours, at least 14 hours, at least 15 hours, at least 16 hours, at least 18 hours, at least 20 hours, at least 24 hours, at least 30 hours, at least 36 hours, at least 40 hours, at least 41 hours, at least 42 hours, at least 43 hours, at least 44 hours, at least 45 hours, at least 46 hours, at least 47 hours, at least 48 hours, at least 50 hours, at least 55 hours, at least 60 hours, at least 62 hours, at least 64 hours, at least 68 hours, at least 70 hours, or at least 72 hours. In an embodiment, the incubation period is 48 hours. In an embodiment, the incubation period is 64 hours, in an embodiment, the incubation period is 72 hours. Those skilled in the art will appreciate that to achieve longer incubation periods between the enzymes and the whole stillage, the whole stillage may be retained in a container (e.g., holding tank) for the desired time period (e.g., until the optimal amount amount of protein and/or optimal weight percent protein on a dry basis of the high protein feed ingredient is achieved).

Those skilled in the art will further appreciate that the conditions (e.g., temperature, pH, enzyme dosing, etc.) during incubation of the enzymes and whole stillage may be adjusted to further optimize the amount of protein and/or weight percent protein on a dry basis of the high protein feed feed ingredient. For example, the temperature may be adjusted in the holding tank to a set point or within a range that is optimal for the enzymes. The temperature range of the whole stillage treatment with the enzymes or enzyme blends of the present invention may be from 20° C. to 90° C., preferably from 30° C. to 85° C., inclusive. In an embodiment, the temperature of the whole stillage treatment is 32° C. In an embodiment, the temperature of the whole stillage treatment is 34° C. In an embodiment, the temperature of the whole stillage treatment is 36° C. In an embodiment, the temperature of the whole stillage treatment is 38° C. In an embodiment, the temperature of the whole stillage treatment is 40° C. In an embodiment, the temperature of the whole stillage treatment is 42° C. In an embodiment, the temperature of the whole stillage treatment is 44° C. In an embodiment, the temperature of the whole stillage treatment is 46° C. In an embodiment, the temperature of the whole stillage treatment is 48° C. In an embodiment, the temperature of the whole stillage treatment is 50° C. In an embodiment, the temperature of the whole stillage treatment is 52° C. In an embodiment, the temperature of the whole stillage treatment is 54° C. In an embodiment, the temperature of the whole stillage treatment is 56° C. In an embodiment, the temperature of the whole stillage treatment is 58° C. In an embodiment, the temperature of the whole stillage treatment is 60° C. In an embodiment, the temperature of the whole stillage treatment is 65° C. In an embodiment, the temperature of the whole stillage treatment is 70° C. In an embodiment, the temperature of the whole stillage treatment is 75° C. In an embodiment, the temperature of the whole stillage treatment is 80° C. In an embodiment, the temperature of the whole stillage treatment is 85° C.

The total solids of the whole stillage during the enzyme treatment may vary, for example, the total solids of the whole stillage may range from 5% to 40%. In an embodiment, the total solids is about 8%. In an embodiment, the total solids is about 9%. In an embodiment, the total solids is about 10%. In an embodiment, the total solids is about 11%. In an embodiment, the total solids is about 12%. In an embodiment, the total solids is about 13%. In an embodiment, the total solids is about 15%. In an embodiment, the total solids is about 18%. In an embodiment, the total solids is about 20%. In an embodiment, the total solids is about 24%. In an embodiment, the total solids is about 26%. In an embodiment, the total solids is about 28%. In an embodiment, the total solids is about 29%. In an embodiment, the total solids is about 30%. In an embodiment, the total solids is about 31%. In an embodiment, the total solids is about 32%. In an embodiment, the total solids is about 33%. In an embodiment, the total solids is about 34%. In an embodiment, the total solids is about 35%. In an embodiment, the total solids is about 36%. In an embodiment, the total solids is about 37%. In an embodiment, the total solids is about 38%. In an embodiment, the total solids is about 39%. In an embodiment, the total solids is about 40%.

The pH of the whole stillage during the enzyme treatment may range from about 3.5 to about 7. In an embodiment, the pH is about 3.5. In an embodiment, the pH is about 3.6. In an embodiment, the pH is about 3.7. In an embodiment, the pH is about 3.8. In an embodiment, the pH is about 3.9. In an embodiment, the pH is about 4.0. In an embodiment, the pH is about 4.1. In an embodiment, the pH is about 4.2. In an embodiment, the pH is about 4.3. In an embodiment, the pH is about 4.4. In an embodiment, the pH is about 4.5. In an embodiment, the pH is about 4.6. In an embodiment, the pH is about 4.7. In an embodiment, the pH is about 4.8. In an embodiment, the pH is about 4.9. In an embodiment, the pH is about 5.0. In an embodiment, the pH is about 5.1. In an embodiment, the pH is about 5.2. In an embodiment, the pH is about 5.3. In an embodiment, the pH is about 5.4. In an embodiment, the pH is about 5.5. In an embodiment, the pH is about 5.6. In an embodiment, the pH is about 5.7. In an embodiment, the pH is about 5.8. In an embodiment, the pH is about 5.9. In an embodiment, the pH is about 6.0. In an embodiment, the pH is about 6.1. In an embodiment, the pH is about 6.2. In an embodiment, the pH is about 6.3. In an embodiment, the pH is about 6.4. In an embodiment, the pH is about 6.5. In an embodiment, the pH is about 6.6. In an embodiment, the pH is about 6.7. In an embodiment, the pH is about 6.8. In an embodiment, the pH is about 6.9. In an embodiment, the pH is about 7.0.

As used herein, "improving the partitioning of protein from the whole stillage byproduct" and "partitioning a greater amount of protein from the whole stillage byproduct" are used interchangeably herein to refer to at least a 5% increase in the amount of initial protein from the whole stillage byproduct that is partitioned to the high protein fraction using a presently disclosed hemicellulase, beta-glucanase, or enzyme blend comprising a hemicellulase and/or beta-glucanase as compared to the amount of initial protein from the whole stillage byproduct that is partitioned to the high protein fraction when not using a presently disclosed hemicellulase, beta-glucanase or enzyme blend. In some contexts, "improving the partitioning of protein from the whole stillage byproduct" and "partitioning a greater amount of protein from the whole stillage byproduct" are used interchangeably herein to refer to at least 5%, at least 6%, at least 7%, at least 8%, at least 9%, at least 9%, at least 10%, at least 11%, at least 12%, at least 13%, at least 14%, at least 15%, at least 16%, at least 17%, at least 18%, at least 19%, at least 20%, at least 25%, at least 26%, at least 27%, at least 28%, at least 29%, at least 30%, at least 33%, at least 34%, at least 35%, at least 36% at least 37%, at least 38%, at least 39%, or at least 40% decrease in the amount of initial protein from the whole stillage byproduct that is retained in the wet cake fraction. Such increase/decrease may result whether the hemicellulase, beta-glucanase or enzyme blend comprising hemicellulase and/or beta-glucanase is added during the production of the whole stillage byproduct, during the separation of the whole stillage byproduct into the insoluble solids portion and the thin stillage portion, or during pre-saccharification, saccharification, fermentation, and/or simultaneous saccharification and fermentation.

In an embodiment, the enzyme blends and processes of the present invention increase the amount of initial protein from the whole stillage byproduct that is partitioned to the high protein fraction by at least 5%, at least 6%, at least 7%, at least 8%, at least 9%, at least 9%, at least 10%, at least 11%, at least 12%, at least 13%, at least 14%, at least 15%, at least 16%, at least 17%, at least 18%, at least 19%, at least 20%, at least 25%, at least 26%, at least 27%, at least 28%, at least 29%, at least 30%, at least 33%, at least 34%, at least 35%, at least 36% at least 37%, at least 38%, at least 39%, or at least 40% as compared to the amount of initial protein from the whole stillage byproduct that is partitioned to the high protein fraction when not using a presently disclosed hemicellulase, beta-glucanase, or enzyme blend.

In an embodiment, the enzyme blends and processes of the present invention decrease the amount of initial protein from the whole stillage byproduct that is retained in the wet cake fraction by at least 5%, at least 6%, at least 7%, at least 8%, at least 9%, at least 9%, at least 10%, at least 11%, at least 12%, at least 13%, at least 14%, at least 15%, at least 16%, at least 17%, at least 18%, at least 19%, at least 20%, at least 25%, at least 26%, at least 27%, at least 28%, at least 29%, at least 30%, at least 33%, at least 34%, at least 35%, at least 36% at least 37%, at least 38%, at least 39%, or at least 40% as compared to the amount of initial protein from the whole stillage byproduct that is retained in the wet cake fraction not using a presently disclosed hemicellulase, beta-glucanase, or enzyme blend.

IV. Enzymes

The enzyme(s) and polypeptides described below are to be used in an "effective amount" in blends or processes of the present invention. Below should be read in context of the enzyme disclosure in the "Definitions"-section above.

Cellulolytic Compositions Used in an Enzyme Blend or Process and Method of the Invention The cellulolytic composition used in a process of the invention may be derived from any microorganism. As used herein, "derived from any microorganism" means that the cellulolytic composition comprises one or more enzymes that were expressed in the microorganism. For instance, a cellulolytic composition derived from a strain of *Trichoderma reesei* means that the cellulolytic composition comprises one or more enzymes that were expressed in *Trichoderma reesei.*

In an embodiment, the cellulolytic composition is derived from a strain of *Aspergillus*, such as a strain of *Aspergillus aurantiacus, Aspergillus niger* or *Aspergillus oryzae.*

In an embodiment, the cellulolytic composition is derived from a strain of *Chrysosporium*, such as a strain of *Chrysosporium lucknowense.*

In an embodiment, the cellulolytic composition is derived from a strain of *Humicola*, such as a strain of *Humicola insolens.*

In an embodiment, the cellulolytic composition is derived from a strain of *Penicilium*, such as a strain of *Penicilium emersonii* or *Penicilium oxalicum.*

In an embodiment, the cellulolytic composition is derived from a strain of *Talaromyces*, such as a strain of *Talaromyces aurantiacus* or *Talaromyces* emersonii.

In an embodiment, the cellulolytic composition is derived from a strain of *Trichoderma*, such as a strain of *Trichoderma reesei.*

In a preferred embodiment, the cellulolytic composition is derived from a strain of *Trichoderma reesei.*

The cellulolytic composition may comprise one or more of the following polypeptides, including enzymes: GH61 polypeptide having cellulolytic enhancing activity, beta-glucosidase, CBHI and CBHII, or a mixture of two, three, or four thereof.

In a preferred embodiment, the cellulolytic composition comprising a beta-glucosidase having a Relative ED50 loading value of less than 1.00, preferably less than 0.80, such as preferably less than 0.60, such as between 0.1-0.9, such as between 0.2-0.8, such as 0.30-0.70.

The cellulolytic composition may comprise some hemicellulase, such as, e.g., xylanase and/or beta-xylosidase. The hemicellulase may come from the cellulolytic composition producing organism or from other sources, e.g., the hemicellulase may be foreign to the cellulolytic composition producing organism, such as, e.g., *Trichoderma reesei.*

In a preferred embodiment the hemicellulase content in the cellulolytic composition constitutes less than 10 wt. % such as less than 5 wt. % of the cellulolytic composition.

In an embodiment the cellulolytic composition comprises a beta-glucosidase.

In an embodiment the cellulolytic composition comprises a GH61 polypeptide having cellulolytic enhancing activity and a beta-glucosidase.

In another embodiment the cellulolytic composition comprises a beta-glucosidase and a CBH.

In another embodiment the cellulolytic composition comprises a GH61 polypeptide having cellulolytic enhancing activity, a beta-glucosidase, and a CBHI.

In another embodiment the cellulolytic composition comprises a beta-glucosidase and a CBHI.

In another embodiment the cellulolytic composition comprises a GH61 polypeptide having cellulolytic enhancing activity, a beta-glucosidase, a CBHI, and a CBHII.

In another embodiment the cellulolytic composition comprises a beta-glucosidase, a CBHI, and a CBHII.

The cellulolytic composition may further comprise one or more enzymes selected from the group consisting of a cellulase, a GH61 polypeptide having cellulolytic enhancing activity, an esterase, an expansin, a laccase, a ligninolytic enzyme, a pectinase, a peroxidase, a protease, and a swollenin.

In an embodiment the cellulase is one or more enzymes selected from the group consisting of an endoglucanase, a cellobiohydrolase, and a beta-glucosidase.

In an embodiment the endoglucanase is an endoglucanase I.

In an embodiment the endoglucanase is an endoglucanase II.

In an embodiment, the cellulolytic composition comprises a cellobiohydrolase, a beta-glucosidase, and an endoglucanase. In an embodiment, the cellulolytic composition comprises: a cellobiohydrolase I; a beta-glucosidase; and an endoglucanase I. In an embodiment, the cellulolytic composition comprises: an *Aspergillus* cellobiohydrolase I; an *Aspergillus* beta-glucosidase; and a *Trichoderma* endoglucanase I. In an embodiment, the cellulolytic composition comprises: an *Aspergillus fumigatus* cellobiohydrolase I; an *Aspergillus fumigatus* beta-glucosidase; and a *Trichoderma reesei* endoglucanase I. In an embodiment, the cellulolytic composition comprises: (i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21; (ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and/or (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids to 23 to 459 of SEQ ID NO: 44.

Beta-Glucosidase

The cellulolytic composition used according to the invention may in one embodiment comprise one or more beta-glucosidase. The beta-glucosidase may in one embodiment be one derived from a strain of the genus *Aspergillus*, such as *Aspergillus oryzae*, such as the one disclosed in WO 2002/095014 or the fusion protein having beta-glucosidase activity disclosed in WO 2008/057637, or *Aspergillus fumigatus*, such as such as one disclosed in WO 2005/047499 or SEQ ID NO: 23 herein or an *Aspergillus fumigatus* beta-glucosidase variant, such as one disclosed in WO 2012/044915 or co-pending PCT application PCT/US11/054185 (or U.S. provisional application No. 61/388,997), such as one with the following substitutions: F100D, S283G, N456E, F512Y.

In another embodiment the beta-glucosidase is derived from a strain of the genus *Penicillium*, such as a strain of the *Penicillium brasilianum* disclosed in WO 2007/019442, or a strain of the genus *Trichoderma*, such as a strain of *Trichoderma reesei.*

In an embodiment betaglucosidase is an *Aspergillus fumigatus* beta-glucosidase or homolog thereof selected from the group consisting of:

(i) a beta-glucosidase comprising the mature polypeptide of SEQ ID NO: 23;

(ii) a beta-glucosidase comprising an amino acid sequence having at least 70%, e.g., 75%, 80%, 85%, 90%, 91%, 92%, 93%, 94%, 95%, 96%, 97%, 98%, or 99% identity to the mature polypeptide of SEQ ID NO: 23 herein;

(iii) a beta-glucosidase encoded by a polynucleotide comprising a nucleotide sequence having at least 70%, e.g., 75%, 80%, 85%, 90%, 91%, 92%, 93%, 94%, 95%, 96%, 97%, 98%, or 99% identity to the mature polypeptide coding sequence of SEQ ID NO: 5 in WO 2013/148993; and (iv) a beta-glucosidase encoded by a polynucleotide that hybridizes under at least high stringency conditions, e.g., very high stringency conditions, with the mature polypeptide coding sequence of SEQ ID NO: 5 in WO 2013/148993 or the full-length complement thereof.

In an embodiment the beta-glucosidase is a variant comprises a substitution at one or more (several) positions corresponding to positions 100, 283, 456, and 512 of the mature polypeptide of SEQ ID NO: 23 herein, wherein the variant has beta-glucosidase activity.

In an embodiment the parent beta-glucosidase of the variant is (a) a polypeptide comprising the mature polypeptide of SEQ ID NO: 23 herein; (b) a polypeptide having at least 80% sequence identity to the mature polypeptide of SEQ ID NO: 23 herein; (c) a polypeptide encoded by a polynucleotide that hybridizes under high or very high stringency conditions with (i) the mature polypeptide coding sequence of SEQ ID NO: 5 in WO 2013/148993, (ii) the cDNA sequence contained in the mature polypeptide coding sequence of SEQ ID NO: 5 in WO 2013/148993, or (iii) the full-length complementary strand of (i) or (ii); (d) a polypeptide encoded by a polynucleotide having at least 80% identity to the mature polypeptide coding sequence of SEQ ID NO: 5 in WO 2013/148993 or the cDNA sequence thereof; or (e) a fragment of the mature polypeptide of SEQ ID NO: 23 herein, which has beta-glucosidase activity.

In an embodiment the beta-glucosidase variant has at least 80%, e.g., at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, but less than 100%, sequence identity to the amino acid sequence of the parent beta-glucosidase.

In an embodiment the variant has at least 80%, e.g., at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, but less than 100% sequence identity to the mature polypeptide of SEQ ID NO: 23 herein.

In an embodiment the beta-glucosidase is from a strain of *Aspergillus*, such as a strain of *Aspergillus fumigatus*, such as *Aspergillus fumigatus* beta-glucosidase (SEQ ID NO: 23 herein), which comprises one or more substitutions selected from the group consisting of L89M, G91L, F100D, I140V, I186V, S283G, N456E, and F512Y; such as a variant thereof with the following substitutions:

F100D+S283G+N456E+F512Y;

L89M+G91L+I186V+I140V;

I186V+L89M+G91L+I140V+F100D+S283G+N456E+F512Y.

In an embodiment the number of substitutions is between 1 and 4, such as 1, 2, 3, or 4 substitutions.

In an embodiment the variant comprises a substitution at a position corresponding to position 100, a substitution at a position corresponding to position 283, a substitution at a position corresponding to position 456, and/or a substitution at a position corresponding to position 512.

In a preferred embodiment the beta-glucosidase variant comprises the following substitutions: Phe100Asp, Ser283Gly, Asn456Glu, Phe512Tyr in SEQ ID NO: 23 herein.

In a preferred embodiment the beta-glucosidase has a Relative ED50 loading value of less than 1.00, preferably less than 0.80, such as preferably less than 0.60, such as between 0.1-0.9, such as between 0.2-0.8, such as 0.30-0.70.

GH61 Polypeptide Having Cellulolytic Enhancing Activity

The cellulolytic composition used according to the invention may in one embodiment comprise one or more GH61 polypeptide having cellulolytic enhancing activity. In one embodiment the enzyme composition comprises a GH61 polypeptide having cellulolytic enhancing activity, such as one derived from the genus *Thermoascus*, such as a strain of *Thermoascus aurantiacus*, such as the one described in WO 2005/074656 as SEQ ID NO: 2; or one derived from the genus *Thielavia*, such as a strain of *Thielavia terrestris*, such as the one described in WO 2005/074647 as SEQ ID NO: 7 and SEQ ID NO: 8; or one derived from a strain of *Aspergillus*, such as a strain of *Aspergillus fumigatus*, such as the one described in WO 2010/138754 as SEQ ID NO: 2; or one derived from a strain derived from *Penicillium*, such as a strain of *Penicillium emersonii*, such as the one disclosed in WO 2011/041397 or SEQ ID NO: 24 herein.

In an embodiment the *Penicillium* sp. GH61 polypeptide having cellulolytic enhancing activity or homolog thereof is selected from the group consisting of:

(i) a GH61 polypeptide having cellulolytic enhancing activity comprising the mature polypeptide of SEQ ID NO: 24 herein;

(ii) a GH61 polypeptide having cellulolytic enhancing activity comprising an amino acid sequence having at least 70%, e.g., 75%, 80%, 85%, 90%, 91%, 92%, 93%, 94%, 95%, 96%, 97%, 98%, or 99% identity to the mature polypeptide of SEQ ID NO: 24 herein;

(iii) a GH61 polypeptide having cellulolytic enhancing activity encoded by a polynucleotide comprising a nucleotide sequence having at least 70%, e.g., 75%, 80%, 85%, 90%, 91%, 92%, 93%, 94%, 95%, 96%, 97%, 98%, or 99% identity to the mature polypeptide coding sequence of SEQ ID NO: 7 in WO 2013/148993; and (iv) a GH61 polypeptide having cellulolytic enhancing activity encoded by a polynucleotide that hybridizes under at least high stringency conditions, e.g., very high stringency conditions, with the mature polypeptide coding sequence of SEQ ID NO: 7 in WO 2013/148993 or the full-length complement thereof.

Cellobiohydrolase I

The cellulolytic composition used according to the invention may in one embodiment may comprise one or more CBH I (cellobiohydrolase I). In one embodiment the cellulolytic composition comprises a cellobiohydrolase I (CBHI), such as one derived from a strain of the genus *Aspergillus*, such as a strain of *Aspergillus fumigatus*, such as the Cel7A CBHI disclosed in SEQ ID NO: 6 in WO 2011/057140 or SEQ ID NO: 21 herein, or a strain of the genus *Trichoderma*, such as a strain of *Trichoderma reesei.*

In an embodiment the *Aspergillus fumigatus* cellobiohydrolase I or homolog thereof is selected from the group consisting of:

(i) a cellobiohydrolase I comprising the mature polypeptide of SEQ ID NO: 21 herein;

(ii) a cellobiohydrolase I comprising an amino acid sequence having at least 70%, e.g., 75%, 80%, 85%, 90%, 91%, 92%, 93%, 94%, 95%, 96%, 97%, 98%, or 99% identity to the mature polypeptide of SEQ ID NO: 21 herein;

(iii) a cellobiohydrolase I encoded by a polynucleotide comprising a nucleotide sequence having at least 70%, e.g., 75%, 80%, 85%, 90%, 91%, 92%, 93%, 94%, 95%, 96%, 97%, 98%, or 99% identity to the mature polypeptide coding sequence of SEQ ID NO: 1 in WO 2013/148993; and (iv) a cellobiohydrolase I encoded by a polynucleotide that hybridizes under at least high stringency conditions, e.g., very high stringency conditions, with the mature polypeptide coding sequence of SEQ ID NO: 1 in WO 2013/148993 or the full-length complement thereof.

Cellobiohydrolase II

The cellulolytic composition used according to the invention may in one embodiment comprise one or more CBH II (cellobiohydrolase II). In one embodiment the cellobiohydrolase II (CBHII), such as one derived from a strain of the genus *Aspergillus*, such as a strain of *Aspergillus fumigatus*, such as the one in SEQ ID NO: 22 herein or a strain of the genus *Trichoderma*, such as *Trichoderma reesei*, or a strain of the genus *Thielavia*, such as a strain of *Thielavia terrestris*, such as cellobiohydrolase II CEL6A from *Thielavia terrestris.*

In an embodiment the *Aspergillus fumigatus* cellobiohydrolase II or homolog thereof is selected from the group consisting of:

(i) a cellobiohydrolase II comprising the mature polypeptide of SEQ ID NO: 22 herein;

(ii) a cellobiohydrolase II comprising an amino acid sequence having at least 70%, e.g., 75%, 80%, 85%, 90%, 91%, 92%, 93%, 94%, 95%, 96%, 97%, 98%, or 99% identity to the mature polypeptide of SEQ ID NO: 22 herein;

(iii) a cellobiohydrolase II encoded by a polynucleotide comprising a nucleotide sequence having at least 70%, e.g., 75%, 80%, 85%, 90%, 91%, 92%, 93%, 94%, 95%, 96%, 97%, 98%, or 99% identity to the mature polypeptide coding sequence of SEQ ID NO: 3 in WO 2013/148993; and (iv) a cellobiohydrolase II encoded by a polynucleotide that hybridizes under at least high stringency conditions, e.g., very high stringency conditions, with the mature polypeptide coding sequence of SEQ ID NO: 3 in WO 2013/148993 or the full-length complement thereof.

Cellulolytic Compositions

As mentioned above the cellulolytic composition may comprise a number of difference polypeptides, such as enzymes.

In an embodiment the cellulolytic composition comprises a *Trichoderma reesei* cellulolytic composition, further comprising *Thermoascus aurantiacus* GH61A polypeptide having cellulolytic enhancing activity (WO 2005/074656) and *Aspergillus oryzae* beta-glucosidase fusion protein (WO 2008/057637).

In another embodiment the cellulolytic composition comprises a *Trichoderma reesei* cellulolytic composition, further comprising *Thermoascus aurantiacus* GH61A polypeptide having cellulolytic enhancing activity (SEQ ID NO: 2 in WO 2005/074656) and *Aspergillus fumigatus* beta-glucosidase (SEQ ID NO: 2 of WO 2005/047499).

In another embodiment the cellulolytic composition comprises a *Trichoderma reesei* cellulolytic composition, further comprising *Penicillium emersonii* GH61A polypeptide having cellulolytic enhancing activity disclosed in WO 2011/041397, *Aspergillus fumigatus* beta-glucosidase (SEQ ID NO: 2 of WO 2005/047499) or a variant thereof with the following substitutions: F100D, S283G, N456E, F512Y.

The enzyme composition of the present invention may be in any form suitable for use, such as, for example, a crude fermentation broth with or without cells removed, a cell lysate with or without cellular debris, a semi-purified or purified enzyme composition, or a host cell, e.g., *Trichoderma* host cell, as a source of the enzymes.

The enzyme composition may be a dry powder or granulate, a non-dusting granulate, a liquid, a stabilized liquid, or a stabilized protected enzyme. Liquid enzyme compositions may, for instance, be stabilized by adding stabilizers such as a sugar, a sugar alcohol or another polyol, and/or lactic acid or another organic acid according to established processes.

In an preferred embodiment the cellulolytic composition comprising a beta-glucosidase having a Relative ED50 loading value of less than 1.00, preferably less than 0.80, such as preferably less than 0.60, such as between 0.1-0.9, such as between 0.2-0.8, such as 0.30-0.70.

In an embodiment, the cellulolytic enzyme composition is dosed (i.e. during saccharification in step ii) and/or fermentation in step iii) or SSF) from 0.0001-3 mg EP/g DS, preferably 0.0005-2 mg EP/g DS, preferably 0.001-1 mg/g DS, more preferred from 0.005-0.5 mg EP/g DS, even more preferred 0.01-0.1 mg EP/g DS.

Alpha-Amylase Present and/or Added During Liquefaction

According to the invention an alpha-amylase is present and/or added in liquefaction optionally together with a hemicellulase, an endoglucanase, a protease, a carbohydrate-source generating enzyme, such as a glucoamylase, a phospholipase, a phytase, and/or pullulanase.

The alpha-amylase added during liquefaction step i) may be any alpha-amylase. Preferred are bacterial alpha-amylases, such as especially *Bacillus* alpha-amylases, such as *Bacillus stearothermophilus* alpha-amylases, which are stable at temperature used during liquefaction.

Bacterial Alpha-Amylase

The term "bacterial alpha-amylase" means any bacterial alpha-amylase classified under EC 3.2.1.1. A bacterial alpha-amylase used according to the invention may, e.g., be derived from a strain of the genus *Bacillus*, which is sometimes also referred to as the genus *Geobacillus*. In an embodiment the *Bacillus* alpha-amylase is derived from a strain of *Bacillus amyloliquefaciens, Bacillus licheniformis, Bacillus stearothermophilus, Bacillus* sp. TS-23, or *Bacillus subtilis*, but may also be derived from other *Bacillus* sp.

Specific examples of bacterial alpha-amylases include the *Bacillus stearothermophilus* alpha-amylase of SEQ ID NO: 3 in WO 99/19467 or SEQ ID NO: 25 herein, the *Bacillus amyloliquefaciens* alpha-amylase of SEQ ID NO: 5 in WO 99/19467, and the *Bacillus licheniformis* alpha-amylase of SEQ ID NO: 4 in WO 99/19467 and the *Bacillus* sp. TS-23 alpha-amylase disclosed as SEQ ID NO: 1 in WO 2009/061380 (all sequences are hereby incorporated by reference).

In an embodiment the bacterial alpha-amylase may be an enzyme having a degree of identity of at least 60%, e.g., at least 70%, at least 80%, at least 90%, at least 95%, at least 96%, at least 97%, at least 98% or at least 99% to any of the sequences shown in SEQ ID NOS: 3, 4 or 5, respectively, in WO 99/19467 and SEQ ID NO: 1 in WO 2009/061380.

In an embodiment the alpha-amylase may be an enzyme having a degree of identity of at least 60%, e.g., at least 70%, at least 80%, at least 90%, at least 91%, at least 92%, at least 93%, at least 94%, at least 95%, at least 96%, at least 97%, at least 98% or at least 99% to any of the sequences shown in SEQ ID NO: 3 in WO 99/19467 or SEQ ID NO: 25 herein.

In a preferred embodiment the alpha-amylase is derived from *Bacillus stearothermophilus*. The *Bacillus stearothermophilus* alpha-amylase may be a mature wild-type or a mature variant thereof. The mature *Bacillus stearothermophilus* alpha-amylases, or variant thereof, may be naturally truncated during recombinant production. For instance, the mature *Bacillus stearothermophilus* alpha-amylase may be truncated at the C-terminal so it is around 491 amino acids long (compared to SEQ ID NO: 3 in WO 99/19467 or SEQ ID NO: 25 herein), such as from 480-495 amino acids long.

The *Bacillus* alpha-amylase may also be a variant and/or hybrid. Examples of such a variant can be found in any of WO 96/23873, WO 96/23874, WO 97/41213, WO 99/19467, WO 00/60059, WO 02/10355 and WO2009/061380 (all documents are hereby incorporated by reference). Specific alpha-amylase variants are disclosed in U.S. Pat. Nos. 6,093,562, 6,187,576, 6,297,038, and 7,713,723 (hereby incorporated by reference) and include *Bacillus stearothermophilus* alpha-amylase (often referred to as BSG alpha-amylase) variants having a deletion of one or two amino acids at any of positions R179, G180, I181 and/or G182, preferably the double deletion disclosed in WO 96/23873—see, e.g., page 20, lines 1-10 (hereby incorporated by reference), preferably corresponding to deletion of positions I181 and G182 compared to the amino acid sequence of *Bacillus stearothermophilus* alpha-amylase set forth in SEQ ID NO: 3 disclosed in WO 99/19467 or SEQ ID NO:25 herein or the deletion of amino acids R179 and G180 using SEQ ID NO: 3 in WO 99/19467 or SEQ ID NO: 25 herein. Even more preferred are *Bacillus* alpha-amylases, especially *Bacillus stearothermophilus* (BSG) alpha-amylases, which have at one or two amino acid deletions corresponding to positions R179, G180, I181 and G182, preferably which have a double deletion corresponding to R179 and G180, or preferably a deletion of positions 181 and 182 (denoted I181*+G182*), and optionally further comprises a N193F substitution (denoted I181*+G182*+N193F) compared to the wild-type BSG alpha-amylase amino acid sequence set forth in SEQ ID NO: 3 disclosed in WO 99/19467 or SEQ ID NO: 25 herein. The bacterial alpha-amylase may also have a substitution in a position corresponding to S239 in the *Bacillus licheniformis* alpha-amylase shown in SEQ ID NO: 4 in WO 99/19467, or a S242 variant in the *Bacillus stearothermophilus* alpha-amylase of SEQ ID NO: 3 in WO 99/19467 or SEQ ID NO: 25 herein.

In an embodiment the variant is a S242A, E or Q variant, preferably a S242Q or A variant, of the *Bacillus stearothermophilus* alpha-amylase (using SEQ ID NO: 25 herein for numbering).

In an embodiment the variant is a position E188 variant, preferably E188P variant of the *Bacillus stearothermophilus* alpha-amylase (using SEQ ID NO: 25 herein for numbering).

Other contemplated variant are *Bacillus* sp. TS-23 variant disclosed in WO2009/061380, especially variants defined in claim 1 of WO2009/061380 (hereby incorporated by reference).

Bacterial Hybrid Alpha-Amylases

The bacterial alpha-amylase may also be a hybrid bacterial alpha-amylase, e.g., an alpha-amylase comprising 445 C-terminal amino acid residues of the *Bacillus licheniformis* alpha-amylase (shown in SEQ ID NO: 4 of WO 99/19467) and the 37 N-terminal amino acid residues of the alpha-amylase derived from *Bacillus amyloliquefaciens* (shown in SEQ ID NO: 5 of WO 99/19467). In a preferred embodiment this hybrid has one or more, especially all, of the following substitutions: G48A+T49I+G107A+H156Y+A181T+N190F+I201F+A209V+Q264S (using the *Bacillus licheniformis* numbering in SEQ ID NO: 4 of WO 99/19467). Also preferred are variants having one or more of the following mutations (or corresponding mutations in other *Bacillus* alpha-amylases): H154Y, A181T, N190F, A209V and Q264S and/or the deletion of two residues between positions 176 and 179, preferably the deletion of E178 and G179 (using SEQ ID NO: 5 of WO 99/19467 for position numbering).

In an embodiment the bacterial alpha-amylase is the mature part of the chimeric alpha-amylase disclosed in Richardson et al., 2002, The Journal of Biological Chemistry 277(29): 267501-26507, referred to as BD5088 or a variant thereof. This alpha-amylase is the same as the one shown in SEQ ID NO: 2 in WO 2007134207. The mature enzyme sequence starts after the initial "Met" amino acid in position 1.

Thermostable Alpha-Amylase

According to the invention the alpha-amylase is optionally used in combination with a hemicellulase, preferably xylanase, having a Melting Point (DSC) above 80° C. Optionally an endoglucanase having a Melting Point (DSC) above 70° C., such as above 75° C., in particular above 80° C. may be included. The thermostable alpha-amylase, such as a bacterial an alpha-amylase, is preferably derived from *Bacillus stearothermophilus* or *Bacillus* sp. TS-23. In an embodiment the alpha-amylase has a T½ (min) at pH 4.5, 85° C., 0.12 mM $CaCl_2$ of at least 10. In an embodiment the alpha-amylase has a T½ (min) at pH 4.5, 85° C., 0.12 mM $CaCl_2$, of at least 15. In an embodiment the alpha-amylase has a T½ (min) at pH 4.5, 85° C., 0.12 mM $CaCl_2$, of at least 20. In an embodiment the alpha-amylase has a T½ (min) at pH 4.5, 85° C., 0.12 mM $CaCl_2$, of at least 25. In an embodiment the alpha-amylase has a T½ (min) at pH 4.5, 85° C., 0.12 mM $CaCl_2$, of at least 30. In an embodiment the alpha-amylase has a T½ (min) at pH 4.5, 85° C., 0.12 mM $CaCl_2$, of at least 40. In an embodiment the alpha-amylase has a T½ (min) at pH 4.5, 85° C., 0.12 mM $CaCl_2$, of at least 50. In an embodiment the alpha-amylase has a T½ (min) at pH 4.5, 85° C., 0.12 mM $CaCl_2$, of at least 60. In an embodiment the alpha-amylase has a T½ (min) at pH 4.5, 85° C., 0.12 mM $CaCl_2$, between 10-70. In an embodiment the alpha-amylase has a T½ (min) at pH 4.5, 85° C., 0.12 mM $CaCl_2$, between 15-70. In an embodiment the alpha-amylase has a T½ (min) at pH 4.5, 85° C., 0.12 mM $CaCl_2$, between 20-70. In an embodiment the alpha-amylase has a T½ (min) at pH 4.5, 85° C., 0.12 mM $CaCl_2$, between 25-70. In an embodiment the alpha-amylase has a T½ (min) at pH 4.5, 85° C., 0.12 mM $CaCl_2$, between 30-70. In an embodiment the alpha-amylase has a T½ (min) at pH 4.5, 85° C., 0.12 mM $CaCl_2$, between 40-70. In an embodiment the alpha-amylase has a T½ (min) at pH 4.5, 85° C., 0.12 mM $CaCl_2$, between 50-70. In an embodiment the alpha-amylase has a T½ (min) at pH 4.5, 85° C., 0.12 mM $CaCl_2$, between 60-70.

In an embodiment the alpha-amylase is a bacterial alpha-amylase, preferably derived from the genus *Bacillus*, especially a strain of *Bacillus stearothermophilus*, in particular the *Bacillus stearothermophilus* as disclosed in WO 99/19467 as SEQ ID NO: 3 or SEQ ID NO: 25 herein with one or two amino acids deleted at positions R179, G180, I181 and/or G182, in particular with R179 and G180 deleted, or with I181 and G182 deleted, with mutations in below list of mutations. In preferred embodiments the *Bacillus stearothermophilus* alpha-amylases have double deletion I181+G182, and optional substitution N193F, optionally further comprising mutations selected from below list:

| |
|---|
| V59A + Q89R + G112D + E129V + K177L + R179E + K220P + N224L + Q254S; |
| V59A + Q89R + E129V + K177L + R179E + H208Y + K220P + N224L + Q254S; |
| V59A + Q89R + E129V + K177L + R179E + K220P + N224L + Q254S + D269E + D281N; |
| V59A + Q89R + E129V + K177L + R179E + K220P + N224L + Q254S + I270L; |
| V59A + Q89R + E129V + K177L + R179E + K220P + N224L + Q254S + H274K; |
| V59A + Q89R + E129V + K177L + R179E + K220P + N224L + Q254S + Y276F; |
| V59A + E129V + R157Y + K177L + R179E + K220P + N224L + S242Q + Q254S; |
| V59A + E129V + K177L + R179E + H208Y + K220P + N224L + S242Q + Q254S; |
| V59A + E129V + K177L + R179E + K220P + N224L + S242Q + Q254S; |
| V59A + E129V + K177L + R179E + K220P + N224L + S242Q + Q254S + H274K; |
| V59A + E129V + K177L + R179E + K220P + N224L + S242Q + Q254S + Y276F; |
| V59A + E129V + K177L + R179E + K220P + N224L + S242Q + Q254S + D281N; |
| V59A + E129V + K177L + R179E + K220P + N224L + S242Q + Q254S + M284T; |
| V59A + E129V + K177L + R179E + K220P + N224L + S242Q + Q254S + G416V; |
| V59A + E129V + K177L + R179E + K220P + N224L + Q254S; |
| V59A + E129V + K177L + R179E + K220P + N224L + Q254S + M284T; |
| A91L + M96I + E129V + K177L + R179E + K220P + N224L + S242Q + Q254S; |
| E129V + K177L + R179E; |
| E129V + K177L + R179E + K220P + N224L + S242Q + Q254S; |
| E129V + K177L + R179E + K220P + N224L + S242Q + Q254S + Y276F + L427M; |
| E129V + K177L + R179E + K220P + N224L + S242Q + Q254S + M284T; |
| E129V + K177L + R179E + K220P + N224L + S242Q + Q254S + N376* + I377*; |
| E129V + K177L + R179E + K220P + N224L + Q254S; |
| E129V + K177L + R179E + K220P + N224L + Q254S + M284T; |
| E129V + K177L + R179E + S242Q; |
| E129V + K177L + R179V + K220P + N224L + S242Q + Q254S; |
| K220P + N224L + S242Q + Q254S; |
| M284V; |
| V59A + Q89R + E129V + K177L + R179E + Q254S + M284V. |

-continued

In an embodiment the alpha-amylase is selected from the group of *Bacillus stearothermphilus* alpha-amylase variants:

I181*+G182*;

I181*+G182*+N193F;

preferably

I181*+G182*+E129V+K177L+R179E;

I181*+G182*+E129V+K177L+R179S;

I181*+G182*+N193F+E129V+K177L+R179E;

I181*+G182*+N193F+E129V+K177L+R179S;

181*+G182*+N193F+V59A+Q89R+E129V+K177L+R179E+H208Y+K220P+N224L+Q254S;

181*+G182*+N193F+V59A+Q89R+E129V+K177L+R179S+H208Y+K220P+N224L+Q254S;

I181*+G182*+N193F+V59A+Q89R+E129V+K177L+R179E+Q254S+M284V;

I181*+G182*+N193F+V59A+Q89R+E129V+K177L+R179S+Q254S+M284V; and

I181*+G182*+N193F+E129V+K177L+R179E+K220P+N224L+S242Q+Q254S (using SEQ ID NO: 25 herein for numbering).

In an embodiment the bacterial alpha-amylase, such as *Bacillus* alpha-amylase, such as *Bacillus stearothermophilus* alpha-amylase has at least 60%, such as at least 70%, such as at least 75% identity, preferably at least 80%, more preferably at least 85%, more preferably at least 90%, more preferably at least 91%, more preferably at least 92%, even more preferably at least 93%, most preferably at least 94%, and even most preferably at least 95%, such as even at least 96%, at least 97%, at least 98%, at least 99%, such as 100% identity to the mature part of the polypeptide of SEQ ID NO:25 herein.

In an embodiment the bacterial alpha-amylase variant, such as *Bacillus* alpha-amylase variant, such as *Bacillus stearothermophilus* alpha-amylase variant has at least 60%, such as at least 70%, such as at least 75% identity, preferably at least 80%, more preferably at least 85%, more preferably at least 90%, more preferably at least 91%, more preferably at least 92%, even more preferably at least 93%, most preferably at least 94%, and even most preferably at least 95%, such as even at least 96%, at least 97%, at least 98%, at least 99%, but less than 100% identity to the mature part of the polypeptide of SEQ ID NO: 25 herein.

It should be understood that when referring to *Bacillus stearothermophilus* alpha-amylase and variants thereof they are normally produced naturally in truncated form. In particular, the truncation may be so that the *Bacillus stearothermophilus* alpha-amylase shown in SEQ ID NO: 3 in WO 99/19467 or SEQ ID NO: 25 herein, or variants thereof, are truncated in the C-terminal and are typically around 491 amino acids long, such as from 480-495 amino acids long.

Thermostable Hemicellulase Present and/or Added During Liquefaction

According to the invention an optional hemicellulase, preferably xylanase, having a Melting Point (DSC) above 80° C. is present and/or added to liquefaction step i) in combination with an alpha-amylase, such as a bacterial alpha-amylase (described above).

The thermostability of a hemicellulase, preferably xylanase may be determined as described in the "Materials & Methods"—section of WO2017/112540 (which is incorporated herein by reference in its entirety for the teachings pertaining to thermostable hemicellulases and endoglucanases) under the headings "Determination of $T_d$ by Differential Scanning calorimetry for Endoglucanases and Hemicellulases".

In an embodiment the hemicellulase, in particular xylanase, especially GH10 or GH11 xylanase has a Melting Point (DSC) above 82° C., such as above 84° C., such as above 86° C., such as above 88° C., such as above 88° C., such as above 90° C., such as above 92° C., such as above 94° C., such as above 96° C., such as above 98° C., such as above 100° C., such as between 80° C. and 110° C., such as between 82° C. and 110° C., such as between 84° C. and 110° C.

In a preferred embodiment the hemicellulase, in particular xylanase, especially GH10 xylanase has at least 60%, such as at least 70%, such as at least 75%, preferably at least 80%, more preferably at least 85%, more preferably at least 90%, more preferably at least 91%, more preferably at least 92%, even more preferably at least 93%, most preferably at least 94%, and even most preferably at least 95%, such as even at least 96%, at least 97%, at least 98%, at least 99%, such as 100% identity to the mature part of the polypeptide of SEQ ID NO: 26 herein, preferably derived from a strain of the genus *Dictyoglomus*, such as a strain of *Dictyogllomus thermophilum.*

In a preferred embodiment the hemicellulase, in particular xylanase, especially GH11 xylanase has at least 60%, such as at least 70%, such as at least 75%, preferably at least 80%, more preferably at least 85%, more preferably at least 90%, more preferably at least 91%, more preferably at least 92%, even more preferably at least 93%, most preferably at least 94%, and even most preferably at least 95%, such as even at least 96%, at least 97%, at least 98%, at least 99%, such as 100% identity to the mature part of the polypeptide of SEQ ID NO: 27 herein, preferably derived from a strain of the genus *Dictyoglomus*, such as a strain of *Dictyogllomus thermophilum.*

In a preferred embodiment the hemicellulase, in particular xylanase, especially GH10 xylanase has at least 60%, such as at least 70%, such as at least 75% identity, preferably at least 80%, more preferably at least 85%, more preferably at least 90%, more preferably at least 91%, more preferably at least 92%, even more preferably at least 93%, most preferably at least 94%, and even most preferably at least 95%, such as even at least 96%, at least 97%, at least 98%, at least 99%, such as 100% identity to the mature part of the polypeptide of SEQ ID NO: 28 herein, preferably derived from a strain of the genus *Rasamsonia*, such as a strain of *Rasomsonia byssochlamydoides.*

In a preferred embodiment the hemicellulase, in particular xylanase, especially GH10 xylanase has at least 60%, such as at least 70%, such as at least 75% identity, preferably at least 80%, more preferably at least 85%, more preferably at least 90%, more preferably at least 91%, more preferably at least 92%, even more preferably at least 93%, most preferably at least 94%, and even most preferably at least 95%, such as even at least 96%, at least 97%, at least 98%, at least 99%, such as 100% identity to the mature part of the polypeptide of SEQ ID NO: 29 herein, preferably derived from a strain of the genus *Talaromyces*, such as a strain of *Talaromyces leycettanus.*

In a preferred embodiment the hemicellulase, in particular xylanase, especially GH10 xylanase has at least 60%, such as at least 70%, such as at least 75% identity, preferably at least 80%, more preferably at least 85%, more preferably at least 90%, more preferably at least 91%, more preferably at least 92%, even more preferably at least 93%, most preferably at least 94%, and even most preferably at least 95%, such as even at least 96%, at least 97%, at least 98%, at least 99%, such as 100% identity to the mature part of the polypeptide of SEQ ID NO: 30 herein, preferably derived from a strain of the genus *Aspergillus*, such as a strain of *Aspergillus fumigatus.*

In a preferred embodiment the hemicellulase, in particular xylanase, especially GH10 xylanase has at least 60%, such as at least 70%, such as at least 75% identity, preferably at least 80%, more preferably at least 85%, more preferably at least 90%, more preferably at least 91%, more preferably at least 92%, even more preferably at least 93%, most preferably at least 94%, and even most preferably at least 95%, such as even at least 96%, at least 97%, at least 98%, at least 99%, such as 100% identity to the amino acids 20 to 407 of SEQ ID NO: 45 herein, preferably derived from a strain of the genus *Penicillium*, such as a strain of *Penicillium funiculosum.*

Thermostable Endoglucanase Present and/or Added During Liquefaction

According to the invention an optional endoglucanase ("E") having a Melting Point (DSC) above 70° C., such as between 70° C. and 95° C. may be present and/or added in liquefaction step i) in combination with an alpha-amylase, such as a thermostable bacterial alpha-amylase and an optional hemicellulase, preferably xylanase, having a Melting Point (DSC) above 80° C.

The thermostability of an endoglucanase may be determined as described in the "Materials & Methods"—section of WO 2017/112540 (incorporated herein by reference in its entirety) under the heading "Determination of $T_d$ by Differential Scanning calorimetry for Endoglucanases and Hemicellulases".

In an embodiment the endoglucanase has a Melting Point (DSC) above 72° C., such as above 74° C., such as above 76° C., such as above 78° C., such as above 80° C., such as above 82° C., such as above 84° C., such as above 86° C., such as above 88° C., such as between 70° C. and 95° C., such as between 76° C. and 94° C., such as between 78° C. and 93° C., such as between 80° C. and 92° C., such as between 82° C. and 91° C., such as between 84° C. and 90° C.

In a preferred embodiment the endoglucanase used in a process of the invention or comprised in a composition of the invention is a Glycoside Hydrolase Family 5 endoglucanase or GH5 endoglucanase (see the CAZy database on the "www.cazy.org" webpage.

In an embodiment the GH5 endoglucanase is from family EG II, such as the *Talaromyces leycettanus* endoglucanase shown in SEQ ID NO: 31 herein; *Penicillium capsulatum* endoglucanase shown in SEQ ID NO: 32 herein, and *Trichophaea saccata* endoglucanase shown in SEQ ID NO: 33 herein.

In an embodiment the endoglucanase is a family GH45 endoglucanase. In an embodiment the GH45 endoglucanase is from family EG V, such as the *Sordaria fimicola* shown in SEQ ID NO: 34 herein or the *Thielavia terrestris* endoglucanase shown in SEQ ID NO: 35 herein.

In an embodiment the endoglucanase has at least 60%, such as at least 70%, such as at least 75% identity, preferably at least 80%, more preferably at least 85%, more preferably at least 90%, more preferably at least 91%, more preferably at least 92%, even more preferably at least 93%, most preferably at least 94%, and even most preferably at least 95%, such as even at least 96%, at least 97%, at least 98%, at least 99%, such as 100% identity to the mature part of the polypeptide of SEQ ID NO: 31 herein. In an embodiment the endoglucanase is derived from a strain of the genus *Talaromyces*, such as a strain of *Talaromyces leycettanus.*

In an embodiment the endoglucanase has at least 60%, such as at least 70%, such as at least 75% identity, preferably at least 80%, more preferably at least 85%, more preferably at least 90%, more preferably at least 91%, more preferably at least 92%, even more preferably at least 93%, most preferably at least 94%, and even most preferably at least 95%, such as even at least 96%, at least 97%, at least 98%, at least 99%, such as 100% identity to the mature part of the polypeptide of SEQ ID NO: 32 herein, preferably derived from a strain of the genus *Penicillium*, such as a strain of *Penicillium capsulatum.*

In an embodiment the endoglucanase has at least 60%, such as at least 70%, such as at least 75% identity, preferably at least 80%, more preferably at least 85%, more preferably at least 90%, more preferably at least 91%, more preferably at least 92%, even more preferably at least 93%, most preferably at least 94%, and even most preferably at least 95%, such as even at least 96%, at least 97%, at least 98%, at least 99%, such as 100% identity to the mature part of the polypeptide of SEQ ID NO: 33 herein, preferably derived from a strain of the genus *Trichophaea*, such as a strain of *Trichophaea saccata.*

In an embodiment the endoglucanase has at least 60%, such as at least 70%, such as at least 75% identity, preferably at least 80%, more preferably at least 85%, more preferably at least 90%, more preferably at least 91%, more preferably at least 92%, even more preferably at least 93%, most preferably at least 94%, and even most preferably at least 95%, such as even at least 96%, at least 97%, at least 98%, at least 99%, such as 100% identity to the mature part of the polypeptide of SEQ ID NO: 34 herein, preferably derived from a strain of the genus Sordaria, such as a strain of *Sordaria fimicola.*

In an embodiment the endoglucanase has at least 60%, such as at least 70%, such as at least 75% identity, preferably at least 80%, more preferably at least 85%, more preferably at least 90%, more preferably at least 91%, more preferably at least 92%, even more preferably at least 93%, most preferably at least 94%, and even most preferably at least 95%, such as even at least 96%, at least 97%, at least 98%, at least 99%, such as 100% identity to the mature part of the polypeptide of SEQ ID NO: 35 herein, preferably derived from a strain of the genus *Thielavia*, such as a strain of *Thielavia terrestris.*

In an embodiment the endoglucanase is added in liquefaction step i) at a dose from 1-10,000 μg EP (Enzymes Protein)/g DS), such as 10-1,000 μg EP/g DS.

Carbohydrate-Source Generating Enzyme Present and/or Added During Liquefaction

According to the invention an optional carbohydrate-source generating enzyme, in particular a glucoamylase, preferably a thermostable glucoamylase, may be present and/or added in liquefaction together with an alpha-amylase and optional hemicellulase, preferably xylanase, having a Melting Point (DSC) above 80° C., and an optional endoglucanase having a Melting Point (DSC) above 70° C., and an optional a pullulanase and/or optional phytase.

The term "carbohydrate-source generating enzyme" includes any enzymes generating fermentable sugars. A carbohydrate-source generating enzyme is capable of producing a carbohydrate that can be used as an energy-source by the fermenting organism(s) in question, for instance, when used in a process of the invention for producing a fermentation product, such as ethanol. The generated carbohydrates may be converted directly or indirectly to the desired fermentation product, preferably ethanol. According to the invention a mixture of carbohydrate-source generating enzymes may be used. Specific examples include glucoamylase (being glucose generators), beta-amylase and maltogenic amylase (being maltose generators).

In a preferred embodiment the carbohydrate-source generating enzyme is thermostable. The carbohydrate-source generating enzyme, in particular thermostable glucoamylase, may be added together with or separately from the alpha-amylase and the thermostable protease.

In a specific and preferred embodiment the carbohydrate-source generating enzyme is a thermostable glucoamylase, preferably of fungal origin, preferably a filamentous fungi, such as from a strain of the genus *Penicillium*, especially a strain of *Penicillium oxalicum*, in particular the *Penicillium oxalicum* glucoamylase disclosed as SEQ ID NO: 2 in WO 2011/127802 (which is hereby incorporated by reference) and shown in SEQ ID NO: 36 herein.

In an embodiment the thermostable glucoamylase has at least 80%, more preferably at least 85%, more preferably at least 90%, more preferably at least 91%, more preferably at least 92%, even more preferably at least 93%, most preferably at least 94%, and even most preferably at least 95%, such as even at least 96%, at least 97%, at least 98%, at least 99% or 100% identity to the mature polypeptide shown in SEQ ID NO: 2 in WO 2011/127802 or SEQ ID NOs: 23 herein.

In an embodiment the carbohydrate-source generating enzyme, in particular thermostable glucoamylase, is the *Penicillium oxalicum* glucoamylase shown in SEQ ID NO: 36 herein.

In a preferred embodiment the carbohydrate-source generating enzyme is a variant of the *Penicillium oxalicum* glucoamylase disclosed as SEQ ID NO: 2 in WO 2011/127802 and shown in SEQ ID NO: 36 herein, having a K79V substitution (referred to as "PE001") (using the mature sequence shown in SEQ ID NO: 8 for numbering). The K79V glucoamylase variant has reduced sensitivity to protease degradation relative to the parent as disclosed in WO 2013/036526 (which is hereby incorporated by reference).

Contemplated *Penicillium oxalicum* glucoamylase variants are disclosed in WO 2013/053801 (which is hereby incorporated by reference).

In an embodiment these variants have reduced sensitivity to protease degradation.

In an embodiment these variant have improved thermostability compared to the parent.

More specifically, in an embodiment the glucoamylase has a K79V substitution (using SEQ ID NO: 36 herein for numbering), corresponding to the PE001 variant, and further comprises at least one of the following substitutions or combination of substitutions:

T65A; Q327F; E501V; Y504T; Y504*; T65A+Q327F; T65A+E501V; T65A+Y504T; T65A+Y504*; Q327F+E501V; Q327F+Y504T; Q327F+Y504*; E501V+Y504T; E501V+Y504*; T65A+Q327F+E501V;

T65A+Q327F+Y504T; T65A+E501V+Y504T; Q327F+E501V+Y504T; T65A+Q327F+Y504*; T65A+E501V+Y504*; Q327F+E501V+Y504*; T65A+Q327F+E501V+Y504T; T65A+Q327F+E501V+Y504*; E501V+Y504T; T65A+K161S; T65A+Q405T; T65A+Q327W; T65A+Q327F; T65A+Q327Y; P11F+T65A+Q327F; R1K+D3W+K5Q+G7V+N8S+T10K+P11S+T65A+Q327F; P2N+P4S+P11F+T65A+Q327F; P11F+D26C+K330+T65A+Q327F; P2N+P4S+P11F+T65A+Q327W+E501V+Y504T; R1E+D3N+P4G+G6R+G7A+N8A+T10D+P11D+T65A+Q327F; P11F+T65A+Q327W; P2N+P4S+P11F+T65A+Q327F+E501V+Y504T; P11F+T65A+Q327W+E501V+Y504T; T65A+Q327F+E501V+Y504T; T65A+S105P+Q327W; T65A+S105P+Q327F; T65A+Q327W+S364P; T65A+Q327F+S364P; T65A+S103N+Q327F; P2N+P4S+P11F+K34Y+T65A+Q327F; P2N+P4S+P11F+T65A+Q327F+D445N+V447S; P2N+P4S+P11F+T65A+I172V+Q327F; P2N+P4S+P11F+T65A+Q327F+N502*; P2N+P4S+P11F+T65A+Q327F+N502T+P563S+K571E; P2N+P4S+P11F+R31S+K33V+T65A+Q327F+N564D+K571S; P2N+P4S+P11F+T65A+Q327F+S377T; P2N+P4S+P11F+T65A+V325T+Q327W; P2N+P4S+P11F+T65A+Q327F+D445N+V447S+E501V+Y504T; P2N+P4S+P11F+T65A+I172V+Q327F+E501V+Y504T; P2N+P4S+P11F+T65A+Q327F+S377T+E501V+Y504T; P2N+P4S+P11F+D26N+K34Y+T65A+Q327F; P2N+P4S+P11F+T65A+Q327F+I375A+E501V+Y504T; P2N+P4S+P11F+T65A+K218A+K221D+Q327F+E501V+Y504T; P2N+P4S+P11F+T65A+S103N+Q327F+E501V+Y504T; P2N+P4S+T10D+T65A+Q327F+E501V+Y504T; P2N+P4S+F12Y+T65A+Q327F+E501V+Y504T; K5A+P11F+T65A+Q327F+E501V+Y504T; P2N+P4S+T10E+E18N+T65A+Q327F+E501V+Y504T; P2N+T10E+E18N+T65A+Q327F+E501V+Y504T; P2N+P4S+P11F+T65A+Q327F+E501V+Y504T+T568N; P2N+P4S+P11F+T65A+Q327F+E501V+Y504T+K524T+G526A; P2N+P4S+P11F+K34Y+T65A+Q327F+D445N+V447S+E501V+Y504T; P2N+P4S+P11F+R31S+K33V+T65A+Q327F+D445N+V447S+E501V+Y504T; P2N+P4S+P11F+D26N+K34Y+T65A+Q327F+E501V+Y504T; P2N+P4S+P11F+T65A+F80*+Q327F+E501V+Y504T; P2N+P4S+P11F+T65A+K112S+Q327F+E501V+Y504T; P2N+P4S+P11F+T65A+Q327F+E501V+Y504T+T516P+K524T+G526A; P2N+P4S+P11F+T65A+Q327F+E501V+N502T+Y504*; P2N+P4S+P11F+T65A+Q327F+E501V+Y504T; P2N+P4S+P11F+T65A+S103N+Q327F+E501V+Y504T; K5A+P11F+T65A+Q327F+E501V+Y504T; P2N+P4S+P11F+T65A+Q327F+E501V+Y504T+T516P+K524T+G526A; P2N+P4S+P11F+T65A+V79A+Q327F+E501V+Y504T; P2N+P4S+P11F+T65A+V79G+Q327F+E501V+Y504T; P2N+P4S+P11F+T65A+V791+Q327F+E501V+Y504T; P2N+P4S+P11F+T65A+V79L+Q327F+E501V+Y504T; P2N+P4S+P11F+T65A+V79S+Q327F+E501V+Y504T; P2N+P4S+P11F+T65A+L72V+Q327F+E501V+Y504T; S255N+Q327F+E501V+Y504T; P2N+P4S+P11F+T65A+E74N+Q327F+E501V+Y504T; P2N+P4S+P11F+T65A+G220N+Q327F+E501V+Y504T; P2N+P4S+P11F+T65A+Y245N+Q327F+E501V+Y504T; P2N+P4S+P11F+T65A+Q253N+Q327F+E501V+Y504T; P2N+P4S+P11F+T65A+D279N+Q327F+E501V+Y504T; P2N+P4S+P11F+T65A+Q327F+S359N+E501V+Y504T; P2N+P4S+P11F+T65A+Q327F+D370N+E501V+Y504T; P2N+P4S+P11F+T65A+Q327F+V460S+E501V+Y504T; P2N+P4S+P11F+T65A+Q327F+V460T+P468T+E501V+Y504T; P2N+P4S+P11F+T65A+Q327F+T463N+E501V+Y504T; P2N+P4S+P11F+T65A+Q327F+S465N+E501V+Y504T; or P2N+P4S+P11F+T65A+Q327F+T477N+E501V+Y504T.

In a preferred embodiment the *Penicillium oxalicum* glucoamylase variant has a K79V substitution using SEQ ID NO: 23 herein for numbering (PE001 variant), and further comprises one of the following mutations:

P11F+T65A+Q327F;

P2N+P4S+P11F+T65A+Q327F;

P11F+D26C+K330+T65A+Q327F;

P2N+P4S+P11F+T65A+Q327W+E501V+Y504T;

P2N+P4S+P11F+T65A+Q327F+E501V+Y504T; or

P11F+T65A+Q327W+E501V+Y504T.

In an embodiment the glucoamylase variant, such as *Penicillium oxalicum* glucoamylase variant has at least 60%, such as at least 70%, such as at least 75% identity, preferably at least 80%, more preferably at least 85%, more preferably at least 90%, more preferably at least 91%, more preferably at least 92%, even more preferably at least 93%, most preferably at least 94%, and even most preferably at least 95%, such as even at least 96%, at least 97%, at least 98%, at least 99%, but less than 100% identity to the mature polypeptide of SEQ ID NO: 36 herein.

The carbohydrate-source generating enzyme, in particular glycoamylase, may be added in amounts from 0.1-100 micrograms EP/g DS, such as 0.5-50 micrograms EP/g DS, such as 1-25 micrograms EP/g DS, such as 2-12 micrograms EP/g DS.

Pullulanase Present and/or Added During Liquefaction

Optionally a pullulanase may be present and/or added during liquefaction step i) together with an alpha-amylase and an optional hemicellulase, preferably xylanase, having a melting point (DSC) above 80° C. As mentioned above a protease, a carbohydrate-source generating enzyme, preferably a thermostable glucoamylase, may also optionally be present and/or added during liquefaction step i).

The pullulanase may be present and/or added during liquefaction step i) and/or saccharification step ii) or simultaneous saccharification and fermentation.

Pullulanases (E.C. 3.2.1.41, pullulan 6-glucano-hydrolase), are debranching enzymes characterized by their ability to hydrolyze the alpha-1,6-glycosidic bonds in, for example, amylopectin and pullulan.

Contemplated pullulanases according to the present invention include the pullulanases from *Bacillus amyloderamificans* disclosed in U.S. Pat. No. 4,560,651 (hereby incorporated by reference), the pullulanase disclosed as SEQ ID NO: 2 in WO 01/151620 (hereby incorporated by reference), the *Bacillus deramificans* disclosed as SEQ ID NO: 4 in WO 01/151620 (hereby incorporated by reference), and the pullulanase from *Bacillus acidopullulyticus* disclosed as SEQ ID NO: 25 in WO 01/151620 (hereby incorporated by reference) and also described in FEMS Mic. Let. (1994) 115, 97-106.

Additional pullulanases contemplated according to the present invention included the pullulanases from *Pyrococcus woesei*, specifically from *Pyrococcus woesei* DSM No. 3773 disclosed in WO 92/02614.

In an embodiment the pullulanase is a family GH57 pullulanase. In an embodiment the pullulanase includes an X47 domain as disclosed in WO 2011/087836 (which are hereby incorporated by reference). More specifically the pullulanase may be derived from a strain of the genus *Thermococcus*, including *Thermococcus litoralis* and *Thermococcus hydrothermalis*, such as the *Thermococcus hydrothermalis* pullulanase shown WO 2011/087836 truncated at the X4 site right after the X47 domain. The pullulanase may also be a hybrid of the *Thermococcus litoralis* and *Thermococcus hydrothermalis* pullulanases or a *T. hydrothermalis/T. litoralis* hybrid enzyme with truncation site X4 disclosed in WO 2011/087836 (which is hereby incorporated by reference).

In another embodiment the pullulanase is one comprising an X46 domain disclosed in WO 2011/076123 (Novozymes).

The pullulanase may according to the invention be added in an effective amount which include the preferred amount of about 0.0001-10 mg enzyme protein per gram DS, preferably 0.0001-0.10 mg enzyme protein per gram DS, more preferably 0.0001-0.010 mg enzyme protein per gram DS. Pullulanase activity may be determined as NPUN. An Assay for determination of NPUN is described in the "Materials & Methods"—section below.

Suitable commercially available pullulanase products include PROMOZYME 400L, PROMOZYME™ D2 (Novozymes A/S, Denmark), OPTIMAX L-300 (Genencor Int., USA), and AMANO 8 (Amano, Japan).

Phytase Present and/or Added During Liquefaction

Optionally a phytase may be present and/or added in liquefaction in combination with an alpha-amylase and optional hemicellulase, preferably xylanase, having a melting point (DSC) above 80° C.

A phytase used according to the invention may be any enzyme capable of effecting the liberation of inorganic phosphate from phytic acid (myo-inositol hexakisphosphate) or from any salt thereof (phytates). Phytases can be classified according to their specificity in the initial hydrolysis step, viz. according to which phosphate-ester group is hydrolyzed first. The phytase to be used in the invention may have any specificity, e.g., be a 3-phytase (EC 3.1.3.8), a 6-phytase (EC 3.1.3.26) or a 5-phytase (no EC number). In an embodiment the phytase has a temperature optimum above 50° C., such as in the range from 50-90° C.

The phytase may be derived from plants or microorganisms, such as bacteria or fungi, e.g., yeast or filamentous fungi.

A plant phytase may be from wheat-bran, maize, soy bean or lily pollen. Suitable plant phytases are described in Thomlinson et al, Biochemistry, 1 (1962), 166-171; Barrientos et al, Plant. Physiol., 106 (1994), 1489-1495; WO 98/05785; WO 98/20139.

A bacterial phytase may be from genus *Bacillus, Citrobacter, Hafnia, Pseudomonas, Buttiauxella* or *Escherichia*, specifically the species *Bacillus subtilis, Citrobacter braakii, Citrobacter freundii, Hafnia alvei, Buttiauxella gaviniae, Buttiauxella agrestis, Buttiauxella noackies* and *E. coli*. Suitable bacterial phytases are described in Paver and Jagannathan, 1982, Journal of Bacteriology 151:1102-1108; Cosgrove, 1970, Australian Journal of Biological Sciences 23:1207-1220; Greiner et al, Arch. Biochem. Biophys., 303, 107-113, 1993; WO 1997/33976; WO 1997/48812, WO 1998/06856, WO 1998/028408, WO 2004/085638, WO 2006/037327, WO 2006/038062, WO 2006/063588, WO 2008/092901, WO 2008/116878, and WO 2010/034835.

A yeast phytase may be derived from genus *Saccharomyces* or *Schwanniomyces*, specifically species *Saccharomyces cerevisiae* or *Schwanniomyces occidentalis*. The former enzyme has been described as a Suitable yeast phytases are described in Nayini et al, 1984, Lebensmittel Wissenschaft and Technologie 17:24-26; Wodzinski et al, Adv. Appl. Microbiol., 42, 263-303; AU-A-24840/95;

Phytases from filamentous fungi may be derived from the fungal phylum of Ascomycota (ascomycetes) or the phylum Basidiomycota, e.g., the genus *Aspergillus, Thermomyces* (also called *Humicola*), *Myceliophthora, Manascus, Penicillium, Peniophora, Agrocybe, Paxillus*, or *Trametes*, specifically the species *Aspergillus terreus, Aspergillus niger, Aspergillus niger* var. *awamori, Aspergillus ficuum, Aspergillus fumigatus, Aspergillus oryzae, T. lanuginosus* (also known as *H. lanuginosa*), *Myceliophthora thermophila, Peniophora lycii, Agrocybe pediades, Manascus anka, Paxillus involtus*, or *Trametes pubescens*. Suitable fungal phytases are described in Yamada et al., 1986, Agric. Biol. Chem. 322:1275-1282; Piddington et al., 1993, Gene 133:55-62; EP 684,313; EP 0 420 358; EP 0 684 313; WO 1998/28408; WO 1998/28409; JP 7-67635; WO 1998/44125; WO 1997/38096; WO 1998/13480.

In a preferred embodiment the phytase is derived from *Buttiauxella*, such as *Buttiauxella gaviniae, Buttiauxella agrestis*, or *Buttiauxella noackies*, such as the ones disclosed as SEQ ID NO: 2, SEQ ID NO: 4 and SEQ ID NO: 6, respectively, in WO 2008/092901 (hereby incorporated by reference).

In a preferred embodiment the phytase is derived from *Citrobacter*, such as *Citrobacter braakii*, such as one disclosed in WO 2006/037328 (hereby incorporated by reference).

Modified phytases or phytase variants are obtainable by methods known in the art, in particular by the methods disclosed in EP 897010; EP 897985; WO 99/49022; WO 99/48330, WO 2003/066847, WO 2007/112739, WO 2009/129489, and WO 2010/034835.

Commercially available phytase containing products include BIO-FEED PHYTASE™, PHYTASE NOVO™ CT or L (all from Novozymes), LIQMAX (DuPont) or RONOZYME™ NP, RONOZYME® HiPhos, RONOZYME® P5000 (CT), NATUPHOS™ NG 5000 (from DSM).

Carbohydrate-Source Generating Enzyme Present and/or Added During Saccharification and/or Fermentation According to the invention a carbohydrate-source generating enzyme, preferably a glucoamylase, is present and/or added during saccharification and/or fermentation.

In a preferred embodiment the carbohydrate-source generating enzyme is a glucoamylase, of fungal origin, preferably from a stain of *Aspergillus*, preferably *A. niger, A. awamori*, or *A. oryzae*; or a strain of *Trichoderma*, preferably *T. reesei*; or a strain of *Talaromyces*, preferably *T. emersonii*, Glucoamylase According to the invention the glucoamylase present and/or added during saccharification and/or fermentation may be derived from any suitable source, e.g., derived from a microorganism or a plant. Preferred glucoamylases are of fungal or bacterial origin, selected from the group consisting of *Aspergillus* glucoamylases, in particular *Aspergillus niger* G1 or G2 glucoamylase (Boel et al. (1984), EMBO J. 3 (5), p. 1097-1102), or variants thereof, such as those disclosed in WO 92/00381, WO 00/04136 and WO 01/04273 (from Novozymes, Denmark); the *A. awamori* glucoamylase disclosed in WO 84/02921, *Aspergillus oryzae* glucoamylase (Agric. Biol. Chem. (1991), 55 (4), p. 941-949), or variants or fragments thereof. Other *Aspergillus* glucoamylase variants include variants with enhanced thermal stability:

G137A and G139A (Chen et al. (1996), Prot. Eng. 9, 499-505); D257E and D293E/Q (Chen et al. (1995), Prot. Eng. 8, 575-582); N182 (Chen et al. (1994), Biochem. J. 301, 275-281); disulphide bonds, A246C (Fierobe et al. (1996), Biochemistry, 35, 8698-8704; and introduction of Pro residues in position A435 and S436 (Li et al. (1997), Protein Eng. 10, 1199-1204.

Other glucoamylases include *Athelia rolfsii* (previously denoted *Corticium rolfsii*) glucoamylase (see U.S. Pat. No. 4,727,026 and (Nagasaka et al. (1998) "Purification and properties of the raw-starch-degrading glucoamylases from Corticium *rolfsii*, Appl Microbiol Biotechnol 50:323-330), *Talaromyces* glucoamylases, in particular derived from *Talaromyces emersonii* (WO 99/28448), *Talaromyces leycettanus* (U.S. patent No. Re. 32,153), *Talaromyces duponti*, *Talaromyces thermophilus* (U.S. Pat. No. 4,587,215). In a preferred embodiment the glucoamylase used during saccharification and/or fermentation is the *Talaromyces emersonii* glucoamylase disclosed in WO 99/28448.

Contemplated fungal glucoamylases include particularly glucoamylases derived from *Talaromyces*, preferably *T. emersonii*, or or a strain of *Trametes*, preferably *Trametes cingulata*, or a strain of *Pycnoporus*, or a strain of *Gloeophyllum*, such as a strain of *Gloeophyllum sepiarium* or *Gloeophyllum trabeum* or a strain of the Nigrofomes.

In one embodiment the glucoamylase is derived from a strain of the genus *Trametes*, in particular a strain of *Trametes cingulata*, disclosed in WO 2006/069289 or in SEQ ID NO: 48 herein or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 48, which has glucoamylase activity.

In one embodiment the glucoamylase is derived from a strain of the genus *Talaromyces*, in particular a strain of *Talaromyces emersonii* disclosed in SEQ ID NO: 49 herein, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 49, which has glucoamylase activity.

In another embodiment the glucoamylase is derived from a strain of the genus *Pycnoporus*, in particular a strain of *Pycnoporus sanguineus* as described in WO 2011/066576 (SEQ ID NOs 2, 4 or 6) or SEQ ID NO: 50 herein, or from a strain of the genus *Gloeophyllum*, such as a strain of *Gloeophyllum sepiarium* or *Gloeophyllum trabeum*, in particular a strain of *Gloeophyllum* as described in WO 2011/068803 (SEQ ID NO: 2, 4, 6, 8, 10, 12, 14 or 16).

In an embodiment, the glucoamylase is the *Pycnoporus sanguineus* glucoamylase of SEQ ID NO: 50 herein, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 50, which has glucoamylase activity.

In an embodiment, the glucoamylase is the *Gloeophyllum sepiarium* glucoamylase of SEQ ID NO: 51 herein, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 51, which has glucoamylase activity.

In an embodiment, the glucoamylase is the *Gloeophyllum trabeum* glucoamylase of SEQ ID NO: 52 herein, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 52, which has glucoamylase activity.

In an embodiment the glucoamylase is derived from a strain of the genus *Nigrofomes*, in particular a strain of *Nigrofomes* sp. disclosed in WO 2012/064351 as SEQ ID NO: 2. Contemplated are also glucoamylases which exhibit a high identity to any of the above mentioned glucoamylases, i.e., at least 70%, at least 75%, at least 80%, at least 85%, at least 90%, at least 95%, at least 96%, at least 97%, at least 98%, at least 99% or even 100% identity to any one of the mature parts of the enzyme sequences mentioned above, such as any of SEQ ID NOs: 48, 49, 50, 51, or 52 herein.

Glucoamylases may in an embodiment be added to the saccharification and/or fermentation in an amount of 0.0001-20 AGU/g DS, preferably 0.001-10 AGU/g DS, especially between 0.01-5 AGU/g DS, such as 0.1-2 AGU/g DS.

In an embodiment the glucoamylase is added as a blend further comprising an alpha-amylase. In a preferred embodiment the alpha-amylase is a fungal alpha-amylase, especially an acid fungal alpha-amylase. The alpha-amylase is typically a side activity.

In an embodiment the glucoamylase is a blend comprising *Talaromyces emersonii* glucoamylase disclosed in WO 99/28448 as SEQ ID NO: 7 or SEQ ID NO: 49 herein and *Trametes cingulata* glucoamylase disclosed in WO 06/069289 and SEQ ID NO: 48 herein.

In an embodiment the glucoamylase is a blend comprising: (i) the *Talaromyces emersonii* glucoamylase of SEQ ID NO: 49 herein, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 49, which has glucoamylase activity; and (ii) the *Trametes cingulata* glucoamylase of SEQ ID NO: 48 herein, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 48, which has glucoamylase activity.

In an embodiment the glucoamylase is a blend comprising *Talaromyces emersonii* glucoamylase disclosed SEQ ID NO: 49, *Trametes cingulata* glucoamylase disclosed as SEQ ID NO: 48, and *Rhizomucor pusillus* alpha-amylase with *Aspergillus niger* glucoamylase linker and SBD disclosed as V039 in Table 5 in WO 2006/069290 and as SEQ ID NO: 39 herein, preferably with the following substitutions: G128D+D143N.

In an embodiment the glucoamylase is a blend comprising: (i) the *Talaromyces emersonii* glucoamylase of SEQ ID NO: 49 herein, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 49, which has glucoamylase activity; (ii) the *Trametes cingulata* glucoamylase of SEQ ID NO: 48 herein, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 48, which has glucoamylase activity; and (iii) the *Rhizomucor pusillus* alpha-amylase with *Aspergillus niger* glucoamylase linker and SBD of SEQ ID NO: 39 herein, preferably with the following substitutions: G128D+D143N, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 39, which has alpha-amylase activity.

In an embodiment the glucoamylase is a blend comprising *Gloeophyllum sepiarium* glucoamylase shown as SEQ ID NO: 2 in WO 2011/068803 (SEQ ID NO: 51 herein) and *Rhizomucor pusillus* with an *Aspergillus niger* glucoamylase linker and starch-binding domain (SBD), disclosed SEQ ID NO: 3 in WO 2013/006756 (SEQ ID NO: 39 herein) with the following substitutions: G128D+D143N.

In an embodiment, the glucoamylase is a blend comprising: (i) the *Gloeophyllum sepiarium* glucoamylase of SEQ ID NO: 51 herein, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 51, which has glucoamylase activity; and (ii) the *Rhizomucor pusillus* alpha-amylase with *Aspergillus niger* glucoamylase linker and SBD of SEQ ID NO: 39 herein, preferably with the following substitutions: G128D+D143N, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 39, which has alpha-amylase activity.

In an embodiment the *Rhizomucor pusillus* alpha-amylase or the *Rhizomucor pusillus* alpha-amylase with an *Aspergillus niger* glucoamylase linker and starch-binding domain (SBD) has at least one of the following substitutions or combinations of substitutions: D165M; Y141W; Y141R; K136F; K192R; P224A; P224R; S123H+Y141W; G20S+Y141W; A76G+Y141W; G128D+Y141W; G128D+D143N;

P219C+Y141W; N142D+D143N; Y141W+K192R; Y141W+D143N; Y141W+N383R; Y141W+P219C+A265C; Y141W+N142D+D143N; Y141W+K192R V410A; G128D+Y141W+D143N; Y141W+D143N+P219C; Y141W+D143N+K192R; G128D+D143N+K192R; Y141W+D143N+K192R+P219C; G128D+Y141W+D143N+K192R; or G128D+Y141W+D143N+K192R+P219C (using SEQ ID NO: 3 in WO 2013/006756 for numbering).

Commercially available compositions comprising glucoamylase include AMG 200L; AMG 300 L; SAN™ SUPER, SANT''' EXTRA L, SPIRIZYME™ PLUS, SPIRIZYME™ FUEL, SPIRIZYME™ B4U, SPIRIZYME™ ULTRA, SPIRIZYME™ EXCEL, SPIRIZYME ACHIEVE and AMG™ E (from Novozymes A/S); OPTIDEX™ 300, GC480, GC417 (from DuPont-Genencor); AMIGASE™ and AMIGASE™ PLUS (from DSM); G-ZYME™ G900, G-ZYME™ and G990 ZR (from DuPont-Genencor).

Maltogenic Amylase

The carbohydrate-source generating enzyme present and/or added during saccharification and/or fermentation may also be a maltogenic alpha-amylase. A "maltogenic alpha-amylase" (glucan 1,4-alpha-maltohydrolase, E.C. 3.2.1.133) is able to hydrolyze amylose and amylopectin to maltose in the alpha-configuration. A maltogenic amylase from *Bacillus stearothermophilus* strain NCIB 11837 is commercially available from Novozymes A/S. Maltogenic alpha-amylases are described in U.S. Pat. Nos. 4,598,048, 4,604,355 and 6,162,628, which are hereby incorporated by reference. The maltogenic amylase may in a preferred embodiment be added in an amount of 0.05-5 mg total protein/gram DS or 0.05-5 MANU/g DS.

Protease Present and/or Added During Liquefaction

In an embodiment of the invention an optional protease, such as a thermostable protease, may be present and/or added in liquefaction together with an alpha-amylase, such as a thermostable alpha-amylase, and a hemicellulase, preferably xylanase, having a melting point (DSC) above 80° C., and optionally an endoglucanase, a carbohydrate-source generating enzyme, in particular a glucoamylase, optionally a pullulanase and/or optionally a phytase.

Proteases are classified on the basis of their catalytic mechanism into the following groups: Serine proteases (S), Cysteine proteases (C), Aspartic proteases (A), Metallo proteases (M), and Unknown, or as yet unclassified, proteases (U), see Handbook of Proteolytic Enzymes, A. J. Barrett, N. D. Rawlings, J. F. Woessner (eds), Academic Press (1998), in particular the general introduction part.

In a preferred embodiment the thermostable protease used according to the invention is a "metallo protease" defined as a protease belonging to EC 3.4.24 (metalloendopeptidases); preferably EC 3.4.24.39 (acid metallo proteinases).

To determine whether a given protease is a metallo protease or not, reference is made to the above "Handbook of Proteolytic Enzymes" and the principles indicated therein. Such determination can be carried out for all types of proteases, be it naturally occurring or wild-type proteases; or genetically engineered or synthetic proteases.

Protease activity can be measured using any suitable assay, in which a substrate is employed, that includes peptide bonds relevant for the specificity of the protease in question. Assay-pH and assay-temperature are likewise to be adapted to the protease in question.

Examples of assay-pH-values are pH 6, 7, 8, 9, 10, or 11. Examples of assay-temperatures are 30, 35, 37, 40, 45, 50, 55, 60, 65, 70 or 80° C.

Examples of protease substrates are casein, such as Azurine-Crosslinked Casein (AZCL-casein). Two protease assays are described below in the "Materials & Methods"-section of WO 2017/112540 (incorporated herein by reference), of which the so-called "AZCL-Casein Assay" is the preferred assay.

In an embodiment the thermostable protease has at least 20%, such as at least 30%, such as at least 40%, such as at least 50%, such as at least 60%, such as at least 70%, such as at least 80%, such as at least 90%, such as at least 95%, such as at least 100% of the protease activity of the JTP196 variant (Example 2 from WO 2017/112540) or Protease Pfu (SEQ ID NO: 37 herein) determined by the AZCL-casein assay described in the "Materials & Methods"—section in WO 2017/112540.

There are no limitations on the origin of the thermostable protease used in a process or composition of the invention as long as it fulfills the thermostability properties defined below.

In one embodiment the protease is of fungal origin.

In a preferred embodiment the thermostable protease is a variant of a metallo protease as defined above. In an embodiment the thermostable protease used in a process or composition of the invention is of fungal origin, such as a fungal metallo protease, such as a fungal metallo protease derived from a strain of the genus *Thermoascus*, preferably a strain of *Thermoascus aurantiacus*, especially *Thermoascus aurantiacus* CGMCC No. 0670 (classified as EC 3.4.24.39).

In an embodiment the thermostable protease is a variant of the mature part of the metallo protease shown in SEQ ID NO: 2 disclosed in WO 2003/048353 or the mature part of SEQ ID NO: 1 in WO 2010/008841 and shown as SEQ ID NO: 38 herein further with mutations selected from below list:

S5*+D79L+S87P+A112P+D142L;
D79L+S87P+A112P+T124V+D142L;
S5*+N26R+D79L+S87P+A112P+D142L;
N26R+T46R+D79L+S87P+A112P+D142L;
T46R+D79L+S87P+T116V+D142L;
D79L+P81R+S87P+A112P+D142L;
A27K+D79L+S87P+A112P+T124V+D142L;
D79L+Y82F+S87P+A112P+T124V+D142L;
D79L+Y82F+S87P+A112P+T124V+D142L;
D79L+S87P+A112P+T124V+A126V+D142L;
D79L+S87P+A112P+D142L;
D79L+Y82F+S87P+A112P+D142L;
S38T+D79L+S87P+A112P+A126V+D142L;
D79L+Y82F+S87P+A112P+A126V+D142L;
A27K+D79L+S87P+A112P+A126V+D142L;
D79L+S87P+N98C+A112P+G135C+D142L;
D79L+S87P+A112P+D142L+T141C+M161C;
S36P+D79L+S87P+A112P+D142L;
A37P+D79L+S87P+A112P+D142L;
S49P+D79L+S87P+A112P+D142L;
S50P+D79L+S87P+A112P+D142L;
D79L+S87P+D104P+A112P+D142L;
D79L+Y82F+S87G+A112P+D142L;
S70V+D79 L+Y82F+S87G+Y97W+A112P+D142L;
D79L+Y82F+S87G+Y97W+D104P+A112P+D142L;
S70V+D79L+Y82F+S87G+A112P+D142L;
D79L+Y82F+S87G+D104P+A112P+D142L;
D79L+Y82F+S87G+A112P+A126V+D142L;
Y82F+S87G+S70V+D79L+D104P+A112P+D142L;
Y82F+S87G+D79L+D104P+A112P+A126V+D142L;
A27K+D79L+Y82F+S87G+D104P+A112P+A126V+D142L;
A27K+Y82F+S87G+D104P+A112P+A126V+D142L;

A27K+D79L+Y82F+D104P+A112P+A126V+D142L;
A27K+Y82F+D104P+A112P+A126V+D142L;
A27K+D79L+S87P+A112P+D142L;
D79L+S87P+D142L.

In a preferred embodiment the thermostable protease is a variant of the mature metallo protease disclosed as the mature part of SEQ ID NO: 2 disclosed in WO 2003/048353 or the mature part of SEQ ID NO: 1 in WO 2010/008841 or SEQ ID NO: 38 herein with the following mutations:
D79L+S87P+A112P+D142L;
D79L+S87P+D142L; or
A27K+D79L+Y82F+S87G+D104P+A112P+A126V+D142L.

In an embodiment the protease variant has at least 75% identity preferably at least 80%, more preferably at least 85%, more preferably at least 90%, more preferably at least 91%, more preferably at least 92%, even more preferably at least 93%, most preferably at least 94%, and even most preferably at least 95%, such as even at least 96%, at least 97%, at least 98%, at least 99%, but less than 100% identity to the mature part of the polypeptide of SEQ ID NO: 2 disclosed in WO 2003/048353 or the mature part of SEQ ID NO: 1 in WO 2010/008841 or SEQ ID NO: 38 herein.

The thermostable protease may also be derived from any bacterium as long as the protease has the thermostability properties defined according to the invention.

In an embodiment the thermostable protease is derived from a strain of the bacterium *Pyrococcus*, such as a strain of *Pyrococcus furiosus* (pfu protease).

In an embodiment the protease is one shown as SEQ ID NO: 1 in U.S. Pat. No. 6,358,726-B1 (Takara Shuzo Company) and SEQ ID NO: 37 herein.

In an embodiment the thermostable protease is one disclosed in SEQ ID NO: 37 herein or a protease having at least 80% identity, such as at least 85%, such as at least 90%, such as at least 95%, such as at least 96%, such as at least 97%, such as at least 98%, such as at least 99% identity to SEQ ID NO: 1 in U.S. Pat. No. 6,358,726-B1 or SEQ ID NO: 37 herein. The *Pyroccus furiosus* protease can be purchased from Takara Bio, Japan.

The *Pyrococcus furiosus* protease is a thermostable protease according to the invention. The commercial product *Pyrococcus furiosus* protease (Pfu S) was found (see Example 5 of) to have a thermostability of 110% (80° C./70° C.) and 103% (90° C./70° C.) at pH 4.5 determined as described in Example 2 of WO 2017/112540.

In one embodiment a thermostable protease has a thermostability value of more than 20% determined as Relative Activity at 80° C./70° C. determined as described in Example 2.

In an embodiment the protease has a thermostability of more than 30%, more than 40%, more than 50%, more than 60%, more than 70%, more than 80%, more than 90%, more than 100%, such as more than 105%, such as more than 110%, such as more than 115%, such as more than 120% determined as Relative Activity at 80° C./70° C.

In an embodiment protease has a thermostability of between 20 and 50%, such as between 20 and 40%, such as 20 and 30% determined as Relative Activity at 80° C./70° C.

In an embodiment the protease has a thermostability between 50 and 115%, such as between 50 and 70%, such as between 50 and 60%, such as between 100 and 120%, such as between 105 and 115% determined as Relative Activity at 80° C./70° C.

In an embodiment the protease has a thermostability value of more than 10% determined as Relative Activity at 85° C./70° C. determined as described in Example 2 of WO 2017/112540.

In an embodiment the protease has a thermostability of more than 10%, such as more than 12%, more than 14%, more than 16%, more than 18%, more than 20%, more than 30%, more than 40%, more that 50%, more than 60%, more than 70%, more than 80%, more than 90%, more than 100%, more than 110% determined as Relative Activity at 85° C./70° C.

In an embodiment the protease has a thermostability of between 10 and 50%, such as between 10 and 30%, such as between 10 and 25% determined as Relative Activity at 85° C./70° C.

In an embodiment the protease has more than 20%, more than 30%, more than 40%, more than 50%, more than 60%, more than 70%, more than 80%, more than 90% determined as Remaining Activity at 80° C.; and/or In an embodiment the protease has more than 20%, more than 30%, more than 40%, more than 50%, more than 60%, more than 70%, more than 80%, more than 90% determined as Remaining Activity at 84° C.

Determination of "Relative Activity" and "Remaining Activity" is done as described in Example 2 of WO 2017/112540.

In an embodiment the protease may have a thermostability for above 90, such as above 100 at 85° C. as determined using the Zein-BCA assay as disclosed in Example 3 of WO 2017/112540.

In an embodiment the protease has a thermostability above 60%, such as above 90%, such as above 100%, such as above 110% at 85° C. as determined using the Zein-BCA assay.

In an embodiment protease has a thermostability between 60-120, such as between 70-120%, such as between 80-120%, such as between 90-120%, such as between 100-120%, such as 110-120% at 85° C. as determined using the Zein-BCA assay.

In an embodiment the thermostable protease has at least 20%, such as at least 30%, such as at least 40%, such as at least 50%, such as at least 60%, such as at least 70%, such as at least 80%, such as at least 90%, such as at least 95%, such as at least 100% of the activity of the JTP196 protease variant or Protease Pfu determined by the AZCL-casein assay described in the "Materials & Methods"—section of WO 2017/112540.

In an embodiment, the protease is a *Thermobifida cellulosilytica* protease of SEQ ID NO: 40 herein (referred to as SEQ ID NO: 3 in WO2018/118815 A1, which is incorporated herein by reference in its entirety), or a variant thereof having at least 60%, 65%, 70%, or 75% identity, preferably at least 80%, more preferably at least 85%, more preferably at least 90%, more preferably at least 91%, more preferably at least 92%, even more preferably at least 93%, most preferably at least 94%, and even most preferably at least 95%, such as even at least 96%, at least 97%, at least 98%, or at least 99%, identity thereto.

In an embodiment, the protease is a *Thermobifida fusca* protease of SEQ ID NO: 41 herein (referred to as SEQ ID NO: 8 in WO2018/118815 A1, which is incorporated herein by reference in its entirety), or a variant thereof having at least 60%, 65%, 70%, or 75% identity preferably at least 80%, more preferably at least 85%, more preferably at least 90%, more preferably at least 91%, more preferably at least 92%, even more preferably at least 93%, most preferably at least 94%, and even most preferably at least 95%, such as even at least 96%, at least 97%, at least 98%, or at least 99%, identity thereto.

In an embodiment, the protease is a *Thermobifida halotolerans* protease of SEQ ID NO: 42 herein (referred to as SEQ ID NO: 10 in WO2018/118815 A1, which is incorporated herein by reference in its entirety), or a variant thereof having at least 60%, 65%, 70%, or 75% identity preferably at least 80%, more preferably at least 85%, more preferably at least 90%, more preferably at least 91%, more preferably at least 92%, even more preferably at least 93%, most preferably at least 94%, and even most preferably at least 95%, such as even at least 96%, at least 97%, at least 98%, or at least 99%, identity thereto.

In an embodiment, the protease is a *Thermococcus* nautili protease of SEQ ID NO: 43 (referred to as SEQ ID NO: 3 in WO2018/169780A1, which is incorporated herein by reference in its entirety), or a variant thereof having at least at least 60%, 65%, 70%, or 75% identity preferably at least 80%, more preferably at least 85%, more preferably at least 90%, more preferably at least 91%, more preferably at least 92%, even more preferably at least 93%, most preferably at least 94%, and even most preferably at least 95%, such as even at least 96%, at least 97%, at least 98%, or at least 99%, identity thereto.

V. Compositions

An aspect of the present invention relates to a composition comprising at least one hemicellulase and/or at least one beta-glucanase, and/or a cellulolytic composition, and a recombinant host cell or fermenting organism comprising at least one heterologous polynucleotide (e.g., a recombinant yeast host cell or fermenting organism engineered to optimize production of the fermentation product or a byproduct or co-product of the process for producing the fermentation product). As used in this section, "composition" encompasses process streams within processes for producing a fermentation product, such as ethanol, from a starch-containing material or cellulosic-containing material, such as a fermenting mash or fermented mash composition, or a whole stillage composition.

As used herein, "fermenting mash or fermented mash composition" refers to the composition formed by the constituent parts of the mash which are present during fermentation (fermenting mash composition) or after fermentation (fermented mash composition) fermentation, including any compounds (e.g., enzymes) or microorganisms (e.g., fermenting organism, such as a recombinant yeast host cell comprising at least one heterologous polynucleotide) that are exogenously added to a process stream for producing a fermentation product (e.g., enzymes added upstream from the fermentation step, e.g., during the liquefaction step of a conventional process for producing a fermentation product from a starch-containing material, during the pretreatment step of a process for producing a fermentation product from a cellulosic-containing material, or during the saccharification step of any process for producing a fermentation product, such as process for producing a fermentation product from a starch-containing material, a raw starch hydrolysis (RSH) process, and a process for producing a fermentation product from a cellulosic-containing material, chemical inputs (e.g., urea), etc.), and any compounds or microorganisms that are generated in situ in the process stream for producing a fermentation product (e.g., reaction products of enzymes and their substrates in the mash, enzymes secreted from the fermenting organism, etc.). Those skilled in the art will appreciate that the constituent parts of the fermenting mash or fermented mash composition, on a percent basis of the entire fermenting mash or fermented mash composition, may include: (i) total dried solids content in an amount ranging from 5% to 25%, from 8% to 22%, from 10% to 20%, or from 11% to 18%; (ii) total oil content in an amount ranging from 0%-8%, from 0.2% to 7%, from 0.4% to 6%, from 0.6% to 5%, from 0.8 to 4%, or from 1% to 2%; (iii) total protein content in an amount ranging from 1% to 8%, from 1.5% to 7%, from 2% to 6%, or from 2.5% to 5%; (iv) total fiber content in an amount ranging from 1% to 8%, from 1.5% to 7%, from 2% to 6%, or from 2.5% to 5%; and (v) total liquids content (e.g., ethanol) in an amount ranging from 79% to 92%, from 80% to 91%, from 81% to 90%, or from 82% to 89%.

As used herein, "whole stillage composition" refers to the composition formed by the constituent parts of the whole stillage byproduct that is produced after recovery of liquid products from the fermented mash, e.g., such as ethanol by distillation, including any compounds (e.g., enzymes) or microorganisms (e.g., fermenting organism, such as a recombinant yeast host. Those skilled in the art will appreciate that the constituent parts of the whole stillage composition, on a percent basis of the entire whole stillage composition, may include: (i) total dried solids content in an amount ranging from 5% to 25%, from 8% to 22%, from 10% to 20%, or from 11% to 18%; (ii) total oil content in an amount ranging from 0%-8%, from 0.2% to 7%, from 0.4% to 6%, from 0.6% to 5%, from 0.8 to 4%, or from 1% to 2%; (iii) total protein content in an amount ranging from 1% to 8%, from 1.5% to 7%, from 2% to 6%, or from 2.5% to 5%; (iv) total fiber content in an amount ranging from 1% to 8%, from 1.5% to 7%, from 2% to 6%, or from 2.5% to 5%; and (v) total liquids content (e.g., water) in an amount ranging from 79% to 92%, from 80% to 91%, from 81% to 90%, or from 82% to 89%. The at least one heterologous polynucleotide may encode polypeptides that are expressed intracellularly to enhance performance of the yeast or fermenting organism itself, polypeptides that are secreted into the fermenting or fermented mash composition to exert their effects on the mash or components of the mash to improve fermentation results, or both.

In some embodiments, the recombinant yeast host cell or fermenting organism comprises nucleotide sequences encoding the hemicellulases and/or beta-glucanases of the present invention, in addition to at least one other heterologous polynucleotide that optimizes production of the fermentation product or a byproduct or co-product of the process for producing the fermentation product. In other embodiments, the recombinant yeast host cell or fermenting organism comprises nucleotides sequences encoding such at least one heterologous polynucleotide other than the hemicellulases and/or beta-glucanases, such as a fermentation alpha-amylase (e.g., fungal alpha-amylase), carbohydrate-source generating organism (e.g., glucoamylase), and/or protease.

Accordingly, in one aspect, the present invention relates to a composition comprising:

(a) a recombinant yeast host cell or fermenting organism; and (b) at least one hemicellulase and/or at least one beta-glucanase of the present invention, wherein the yeast host cell or fermenting organism comprises a heterologous polynucleotide encoding a glucoamylase, an alpha-amylase, protease, and/or cellulase.

The present invention contemplates the use of any viable recombinant yeast host cell or fermenting organism in the compositions described herein. Examples of suitable recombinant yeast host cells or fermenting organisms can be found herein in the "Fermenting Organisms" section.

The present invention contemplates the use of any hemicellulase and/or beta-glucanase in the compositions described in this section. Those skilled in the art will appreciate that any of the hemicellulase, beta-glucanase, or enzyme blends described in Section I above, Section IV above, or otherwise described herein, can be used in a composition of the invention.

The present invention contemplates the use of any glucoamylase, alpha-amylase, protease, and/or cellulase. Examples of suitable such enzymes can be found under the heading "Enzymes".

In one embodiment, the composition is a fermenting or fermented mash composition comprising the recombinant yeast host cell or fermenting organism and the at least one hemicellulase and/or at least one beta-glucanase. In another embodiment, the composition is a whole stillage composition comprising the recombinant yeast host cell and the at least one hemicellulase and/or at least one beta-glucanase.

In an embodiment, the fermenting or fermented mash composition or the whole stillage composition comprises:

(a) a recombinant yeast host cell or fermenting organism; and (b) at least one hemicellulase and/or at least one beta-glucanase, wherein the yeast host cell comprises a heterologous polynucleotide encoding a glucoamylase, an alpha-amylase, protease, and/or cellulase;

wherein the at least one hemicellulase is selected from the group consisting of the mature polypeptide of SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 53, SEQ ID NO: 54, SEQ ID NO: 55, SEQ ID NO: 56, SEQ ID NO: 57, SEQ ID NO: 58, SEQ ID NO: 59, and polypeptides having at least 60%, at least 65%, at least 70%, at least 75%, at least 80%, at least 85%, at least 90%, at least 95%, at least 96%, at least 97%, at least 98%, or at least 99% amino acid sequence identity to SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 53, SEQ ID NO: 54, SEQ ID NO: 55, SEQ ID NO: 56, SEQ ID NO: 57, SEQ ID NO: 58, or SEQ ID NO: 59; and wherein the at least one beta-glucanase is selected from the group consisting of the mature polypeptide of SEQ ID NO: 14, SEQ ID NO: 15, SEQ ID NO: 16, SEQ ID NO: 17, SEQ ID NO: 18, SEQ ID NO: 19, SEQ ID NO: 20, and polypeptides having at least 60%, at least 65%, at least 70%, at least 75%, at least 80%, at least 85%, at least 90%, at least 95%, at least 96%, at least 97%, at least 98%, or at least 99% amino acid sequence identity to SEQ ID NO: 14, SEQ ID NO: 15, SEQ ID NO: 16, SEQ ID NO: 17, SEQ ID NO: 18, SEQ ID NO: 19, or SEQ ID NO: 20.

In an embodiment, the fermenting or fermented mash composition or the whole stillage composition comprises:

(a) a recombinant yeast host cell comprising a heterologous polynucleotide encoding a glucoamylase, an alpha-amylase, and/or protease;

(b) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity; and (c) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21, which has cellobiohydrolase activity;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23, and which has beta-glucosidase activity; and (iii) an endoglucanase I comprising amino acids 23 to 459 of SEQ ID NO: 44 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44, which has endoglucanase activity.

In an embodiment, the fermenting or fermented mash composition or the whole stillage composition comprises:

(a) a recombinant yeast host cell comprising a heterologous polynucleotide encoding a glucoamylase, an alpha-amylase, and/or protease;

(b) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity;

(c) a xylanase comprising amino acids 28 to 417 of SEQ ID NO: 3 or amino acids 28 to 417 of SEQ ID NO: 4 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4; and (d) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21, which has cellobiohydrolase activity;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23, and which has beta-glucosidase activity; and (iii) an endoglucanase I comprising amino acids 23 to 459 of SEQ ID NO: 44 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44, which has endoglucanase activity.

In an embodiment, the fermenting or fermented mash composition or the whole stillage composition comprises:

(a) a recombinant yeast host cell comprising a heterologous polynucleotide encoding a glucoamylase, an alpha-amylase, and/or protease;

(b) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lecanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (c) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21, which has cellobiohydrolase activity;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23, and which has beta-glucosidase activity; and (iii) an endoglucanase I comprising amino acids 23 to 459 of SEQ ID NO: 44 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44, which has endoglucanase activity.

In an embodiment, the fermenting or fermented mash composition or the whole stillage composition comprises:

(a) a recombinant yeast host cell comprising a heterologous polynucleotide encoding a glucoamylase, an alpha-amylase, and/or protease;

(b) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity;

(c) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lecanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (d) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21, which has cellobiohydrolase activity;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23, and which has beta-glucosidase activity; and (iii) an endoglucanase I comprising amino acids 23 to 459 of SEQ ID NO: 44 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44, which has endoglucanase activity.

In an embodiment, the fermenting or fermented mash composition or the whole stillage composition comprises:

(a) a recombinant yeast host cell comprising a heterologous polynucleotide encoding a glucoamylase, an alpha-amylase, and/or protease;

(b) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity;

(c) a xylanase comprising amino acids 28 to 417 of SEQ ID NO: 3 or amino acids 28 to 417 of SEQ ID NO: 4 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4; and (d) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lecanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (e) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21, which has cellobiohydrolase activity;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23, and which has beta-glucosidase activity; and (iii) an endoglucanase I comprising amino acids 23 to 459 of SEQ ID NO: 44 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44, which has endoglucanase activity.

In an embodiment, the fermenting or fermented mash composition or the whole stillage composition comprises:

(a) a recombinant yeast host cell comprising a heterologous polynucleotide encoding a glucoamylase, an alpha-amylase, and/or protease;

(b) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity; and (c) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

In an embodiment, the fermenting or fermented mash composition or the whole stillage composition comprises:

(a) a recombinant yeast host cell comprising a heterologous polynucleotide encoding a glucoamylase, an alpha-amylase, and/or protease;

(b) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity;

(c) a xylanase comprising amino acids 28 to 417 of SEQ ID NO: 3 or amino acids 28 to 417 of SEQ ID NO: 4 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4; and (d) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

In an embodiment, the fermenting or fermented mash composition or the whole stillage composition comprises:

(a) a recombinant yeast host cell comprising a heterologous polynucleotide encoding a glucoamylase, an alpha-amylase, and/or protease;

(b) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lecanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (c) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

In an embodiment, the fermenting or fermented mash composition or the whole stillage composition comprises:

(a) a recombinant yeast host cell comprising a heterologous polynucleotide encoding a glucoamylase, an alpha-amylase, and/or protease;

(b) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity;

(c) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lecanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (d) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

In an embodiment, the fermenting or fermented mash composition or the whole stillage composition comprises:

(a) a recombinant yeast host cell comprising a heterologous polynucleotide encoding a glucoamylase, an alpha-amylase, and/or protease;

(b) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity;

(c) a xylanase comprising amino acids 28 to 417 of SEQ ID NO: 3 or amino acids 28 to 417 of SEQ ID NO: 4 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4; and (d) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (e) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

VI. Further Aspects of the Invention

In a further aspect of the invention it relates to the use of a hemicellulase or enzyme blend comprising a hemicellulase for producing a high protein feed ingredient from a whole stillage byproduct produced in a starch-containing grain dry milling process for producing a fermentation product.

In still a further aspect of the invention it relates to the use of a hemicellulase or enzyme blend comprising a hemicellulase for increasing the amount of initial protein from the whole stillage byproduct that is partitioned to the high protein fraction.

In still a further aspect of the invention it relates to the use of a hemicellulase or enzyme blend comprising a hemicellulase for decreasing the amount of initial protein from the whole stillage byproduct that is retained in the wet cake fraction.

Any enzyme blend disclosed in Section I herein can be used in this manner. In various embodiments of this aspect, an additional enzyme, such as an enzyme or enzyme composition described under the "Enzymes" section can be used in combination together with an enzyme blend of the present invention.

In an embodiment, the hemicellulase or enzyme blend comprising hemicellulase increases the amount of initial protein from the whole stillage byproduct that is partitioned to the high protein fraction by at least 5%, at least 6%, at least 7%, at least 8%, at least 9%, at least 9%, at least 10%, at least 11%, at least 12%, at least 13%, at least 14%, at least 15%, at least 16%, at least 17%, at least 18%, at least 19%, at least 20%, at least 25%, at least 26%, at least 27%, at least 28%, at least 29%, at least 30%, at least 33%, at least 34%, at least 35%, at least 36% at least 37%, at least 38%, at least 39%, or at least 40% as compared to the amount of initial protein from the whole stillage byproduct that is partitioned to the high protein fraction when not using a presently disclosed hemicellulase or enzyme blend.

In an embodiment, the hemicellulase or enzyme blend comprising hemicellulase decreases the amount of initial protein from the whole stillage byproduct that is retained in the wet cake fraction by at least 5%, at least 6%, at least 7%, at least 8%, at least 9%, at least 9%, at least 10%, at least 11%, at least 12%, at least 13%, at least 14%, at least 15%, at least 16%, at least 17%, at least 18%, at least 19%, at least 20%, at least 25%, at least 26%, at least 27%, at least 28%, at least 29%, at least 30%, at least 33%, at least 34%, at least 35%, at least 36% at least 37%, at least 38%, at least 39%, or at least 40% as compared to the amount of initial protein from the whole stillage byproduct that is retained in the wet cake fraction not using a presently disclosed hemicellulase or enzyme blend.

The invention is further summarized in the following paragraphs:

1. A method for producing a high protein feed ingredient from a whole stillage byproduct produced in a starch-containing grain dry milling process for producing a fermentation product, the method comprising:

a) optionally performing a starch-containing grain dry milling process for producing a fermentation product to produce a fermentation product and a whole stillage byproduct;

b) separating a whole stillage byproduct into an insoluble solids portion and a thin stillage portion;

c) separating the thin stillage portion into at least a first separated water-soluble solids portion, and at least a first separated protein portion;

d) optionally separating at least the first separated protein portion into at least a second separated water-soluble solids portion, and at least a second separated protein portion;

e) drying at least the first separated protein portion, and/or optionally at least the second separated protein portion, to define a protein product, wherein the protein product is a high protein feed ingredient;

wherein a hemicellulase, a beta-glucanase, or an enzyme blend comprising a hemicellulase and/or beta-glucanase is added prior to or during production of the whole stillage byproduct and/or separating the whole stillage byproduct.

2. The method of paragraph 1, wherein separating step b) is performed by subjecting the whole stillage byproduct to a centrifuge or a screen.

3. The method of paragraphs 1 or 2, wherein separating step b) is performed by subjecting the whole stillage byproduct to a filtration centrifuge, a decanter centrifuge, a pressure screen, or a paddle screen.

4. The method of any one of paragraphs 1-3, wherein separating step c) is performed by subjecting the thin stillage portion to a centrifuge or a cyclone apparatus.

5. The method of any one of paragraphs 1-4, wherein optional separating step d) is performed by subjecting the first separated protein portion to a centrifuge or a cyclone apparatus.

6. The method of any one of paragraphs 1-5, wherein the high protein feed ingredient includes at least 40 wt percent protein on a dry basis.

7. The method of any one of paragraphs 1-6, wherein the starch-containing grain comprises maize, corn, wheat, rye, barley, triticale, sorghum, switchgrass, millet, pearl millet, foxtail millet.

8. The method of any one of paragraphs 1-7, wherein the high protein feed ingredient is a high protein corn-based animal feed.

9. The method of any one of paragraphs 1-8, further comprising, after separating the whole stillage byproduct into an insoluble solids portion and a thin stillage portion and before separating the thin stillage portion into a first separated protein portion and a first separated water-soluble solids portion, separating fine fiber from the thin stillage portion.

10. The method of any one of paragraphs 1-9, wherein separating fine fiber from the thin stillage portion comprises separating the fine fiber via a pressure screen, paddle screen, decanter, or filtration centrifuge.

11. The method of any one of paragraphs 1-10, further comprising separating soluble solids from the first separated water-soluble solids portion to provide a first soluble solids portion, and optionally separating soluble solids from the second separated water-soluble solids portion to provide a second soluble solids portion.

12. The method of any one of paragraphs 1-11, further comprising separating free oil from the first separated water-soluble solids portion to provide a first oil portion, and optionally separating free oil from the second separated water-soluble solids portion to provide a second oil portion.

13. The method of any one of paragraphs 1-12 wherein the hemicellulase, beta-glucanase, or the enzyme blend comprising the hemicellulase and/or beta-glucanase is added prior to separation of the whole stillage into insoluble solids and thin stillage.

14. The method of any one of paragraphs 1-13, wherein the hemicellulase, beta-glucanase or the enzyme blend comprising the hemicellulase and/or beta-glucanase is added during the separation of the whole stillage byproduct into the insoluble solids portion and the thin stillage portion.

15. The method of any one of paragraphs 1-14, wherein performing step a) comprises:

(i) saccharifying a starch-containing grain at a temperature below the initial gelatinization temperature with an alpha-amylase and a glucoamylase; and (ii) fermenting using a fermentation organism to produce the fermentation product.

16. The method of any one of paragraphs 1-14, wherein performing step a) comprises:

(i) liquefying a starch-containing grain with an alpha-amylase;

(ii) saccharifying the liquefied material obtained in step (a) with a glucoamylase; and (iii) fermenting using a fermenting organism.

17. The method of paragraphs 15 or 16, wherein the hemicellulase, beta-glucanase or enzyme blend comprising the hemicellulase and/or beta-glucanase is added during saccharifying step (i) and/or fermenting step (ii).

18. The method of any one of paragraphs 15-17, wherein saccharification and fermentation is performed simultaneously.

19. The method of any one of paragraphs 1-18, wherein the fermentation product is alcohol, particularly ethanol, more particularly fuel ethanol.

20. The method of any one of paragraphs 1-19, wherein the fermenting organism is yeast, particularly *Saccharomyces* sp., more particularly *Saccharomyces cerevisiae.*

21. The method of any one of paragraphs 1-20, wherein the hemicellulase is selected from the group consisting of an acetylxylan esterase, a α-glucuronidases, a α-L-arabinofuranosidases, a α-L-galactosidase, a beta-xylosidase, a feruloyl esterase, a α-D-galactosidase, a pectin-degrading enzyme, a xylanase, and any combination thereof.

22. The method of any one of paragraphs 1-21, wherein the xylanase is from a glycoside hydrolase family selected from the group consisting of a GH3 family xylanase, GH5 family xylanase, a GH8 family xylanase, a GH10 family xylanase, a GH11 family xylanase, a GH30 family xylanase. a GH43 family xylanase, and a GH98 family xylanase.

23. The method of any one of paragraphs 1-22, wherein the GH10 xylanase is the method of any one of paragraphs 1-22, wherein the xylanase is from the genus *Aspergillus*, for example *Aspergillus fumigatus*, such as the xylanase shown in amino acids 20 to 397 of SEQ ID NO: 1, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1.

24. The method of any one of paragraphs 1-23, wherein the GH10 family xylanase is from the genus *Talaromyces*, for example *Talaromyces leycettanus*, such as the xylanase shown in amino acids 21 to 404 of SEQ ID NO: 2, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2.

25. The method of any one of paragraphs 1-24, wherein the GH30 family xylanase is a GH30_8 family xylanase.

26. The method of any one of paragraphs 1-25, wherein the GH30_8 family xylanase is from the genus *Bacillus*, for example *Bacillus subtilis*, such as the xylanase shown in amino acids 28 to 417 of SEQ ID NO: 3 or amino acids 28 to 417 of SEQ ID NO: 4, or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4.

27. The method of any one of paragraphs 1-26, wherein the GH5 family xylanase is selected from the group consisting of GH5_21, GH5_34 and GH5_35.

28. The method of any one of paragraphs 1-27, wherein the GH5_21 xylanase is from the genus *Chryseobacterium*, for example *Chryseobacterium* sp-10696, such as the xylanase shown in amino acids 25 to 551 of SEQ ID NO: 5 or amino acids 25 to 551 of SEQ ID NO: 6, or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5 or amino acids 25 to 551 of SEQ ID NO: 6.

29. The method of any one of paragraphs 1-28, wherein the G5_34 xylanase is from the genus *Acetivibrio*, for example *Acetivibrio cellulyticus*, such as the xylanase shown in SEQ ID NO: 7, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 7.

30. The method of any one of paragraphs 1-29, wherein the G5_34 xylanase is from the genus *Clostridium*, for example *Clostridium thermocellum*, such as the xylanase shown in SEQ ID NO: 8, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 8, or is from the genus *Gonapodya*, for example *Gonapodya prolifera*, such as the xylanase shown in SEQ ID NO: 53 or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 53 or the mature polypeptide thereof.

31. The method of any one of paragraphs 1-30, wherein the GH5_35 xylanase is from the genus genus *Paenibacillus*, for example *Paenibacillus illinoisensis*, such as the xylanase shown in amino acids 37 to 573 of SEQ ID NO: 9, or for example *Paenibacillus* sp., such as the xylanase shown in amino acids 36 to 582 of SEQ ID NO: 10, or for example *Paenibacillus favisporus*, such as the xylanase shown in amino acids 1 to 536 of SEQ ID NO: 54, or one having at least 60%, at least 65%, at least 70%, at least 75%, at least 80%, at least 85%, at least 90%, at least 95%, at least 96%, at least 97%, at least 98%, or at least 99% sequence identity to amino acids 37 to 573 of SEQ ID NO: 9, amino acids 36 to 582 of SEQ ID NO: 10, or amino acids 1 to 536 of SEQ ID NO: 54.

32. The method of any one of paragraphs 1-31, wherein the α-L-arabinofuranosidase is from a glycoside hydrolase family selected from the group consisting of GH43, GH51 and GH62.

33. The method of any one of paragraphs 1-32, wherein the GH43 α-L-arabinofuranosidase is from a subfamily selected from the group consisting of 1, 10, 11, 12, 19 21, 26, 27, 29, 35 and 36.

34. The method of any one of paragraphs 1-33, wherein the GH62 family α-L-arabinofuranosidase is a GH62_1 α-L-arabinofuranosidase.

35. The method of any one of paragraphs 34, wherein the GH62_1 α-L-arabinofuranosidase is from the genus *Talaromyces*, for example *Talaromyces pinophilus*, such as the α-L-arabinofuranosidase shown in amino acids 17 to 325 of SEQ ID NO: 11, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 325 of SEQ ID NO: 11, or the one shown in amino acids 18 to 335 of SEQ ID NO: 55, or one having at least 60%, at least 65%, at least 70%, at least 75%, at least 80%, at least 85%, at least 90%, at least 95%, at least 96%, at least 97%, at least 98%, or at least 99% sequence identity to amino acids 18 to 335 of SEQ ID NO: 55.

36. The method of any one of paragraphs 1-35, wherein the beta-xylosidase is from the genus *Aspergillus*, for example *Aspergillus fumigatus*, such as the beta-xylosidase shown in amino acids 21 to 792 of SEQ ID NO: 12, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 792 of SEQ ID NO: 12, or wherein the beta-xylosidase is from the genus *Trichoderma*, for example *Trichoderma reesei*, such as the beta-xylosidase shown in amino acids 20 to 780 of SEQ ID NO: 13.

37. The method of any one of paragraphs 1-36, wherein the α-glucuronidase is selected from the group consisting of a GH115 α-glucuronidase having xylan α-1,2-glucuronidase activity, a GH4 α-glucuronidase having α-glucuronidase activity, and a GH67 α-glucuronidase having xylan α-1,2-glucuronidase activity.

38. The method of any one of paragraphs 1-37, wherein the acetylxylan esterase is from a family selected from the group consisting of CE1, CE2, CE3, CE4, CE5, CE6, CE7, CE12, CE15 and PF05448.

39. The method of any one of paragraphs 1-38, wherein the α-D-galactosidase and/or α-L-galactosidase are from a glycoside hydrolase family selected from the group consisting of GH27, GH36, GH4 and GH57_A.

40. The method of any one of paragraphs 1-39, wherein the pectin-degrading enzyme is selected from the group consisting of an arabinase (e.g., GH43 family), a galactanase (e.g., GH53 family), a pectin acetylesterase/rhamnogalacturonan acetylesterase (e.g., CE12 family), a pectate lyase (e.g., PL1 family), a pectin lyase (e.g., PL1 family), a pectin metylesterase (e.g., CE12 family), a polygalacturonase (e.g., GH28 family), a rhamnogalacturonan hydrolase (e.g., GH28 family), a rhamnogalacturonan lyase (e.g., PL4 family), a xylogalacturonan hydrolase (e.g., GH28 family), and any combination thereof thereof.

41. The method of any one of paragraphs 1-40, wherein the enzyme blend comprises at least two hemicellulases.

42. The method of any one of paragraphs 1-41, wherein the at least two hemicellulases comprises at least two xylanases.

43. The method any one of paragraphs 1-42, wherein the at least two xylanases comprises a GH30 family xylanase and a GH5 family xylanase.

44. The method of any one of paragraphs 1-43, wherein the at least two xylanases comprises a GH30_8 xylanase and a GH5_21 family xylanase.

45. The method of any one of paragraphs 1-44, wherein the at GH30_8 xylanase is selected from the group consisting of the one shown in amino acids 28 to 417 of SEQ ID NO: 3 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 and the one shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4, and wherein the GH5_21 xylanase is selected from the group consisting of the one shown in amino acids 25 to 551 of SEQ ID NO: 5 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5 and the one shown in amino acids 25 to 551 of SEQ ID NO: 6 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6.

46. The method of any one of paragraphs 1-45, wherein the at least two xylanases are present in the blend in a ratio of 1:1, 1.1:1, 1.2:1, 1.3:1, 1.4:1, 1.5:1, 1:1.5, 1:1.4, 1:1.3, 1:1.2, or 1:1.1 of GH30_8 xylanase to GH5_21 xylanase.

47. The method of any one of paragraphs 1-46, wherein the xylanase(s) increase the mass fraction of the high protein feed ingredient compared to the mass of the high protein feed ingredient in the absence of the xylanase(s).

48. The method of any one of paragraphs 1-47, wherein the at least two hemicellulases comprises at least one xylanase and at least one α-L-arabinofuranosidase.

49. The method of any one of paragraphs 1-48, wherein the at least two hemicellulases comprises at least one xylanase from a family selected from the group consisting of a GH3 family xylanase, GH5 family xylanase, a GH8 family xylanase, a GH10 family xylanase, a GH11 family xylanase, a GH30 family xylanase, a GH43 family xylanase, and a GH98 family xylanase, and at least one α-L-arabinofuranosidase from a GH family selected from the group consisting of GH43, GH51 and GH62.

50. The method of any one of paragraphs 1-49, wherein the least two hemicellulases comprises a GH5_21 xylanase and an α-L-arabinofuranosidase selected from a GH family selected the group consisting of GH43, GH51 and GH62.

51. The method of any one of paragraphs 1-50, wherein the at least two hemicellulases comprises a GH5_21 xylanase and a GH62 α-L-arabinofuranosidase.

52. The method of any one of paragraphs 1-51, wherein the GH5_21 xylanase is selected from the group consisting of the one shown in amino acids 25 to 551 of SEQ ID NO: 5 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5 and the one shown in amino acids 25 to 551 of SEQ ID NO: 6 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6, and wherein the GH62 α-L-arabinofuranosidase is the one shown in amino acids 17 to 325 of SEQ ID NO: 11, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 325 of SEQ ID NO: 11, or the one shown in amino acids 18 to 335 of SEQ ID NO: 55, or one having at least 60%, at least 65%, at least 70%, at least 75%, at least 80%, at least 85%, at least 90%, at least 95%, at least 96%, at least 97%, at least 98%, or at least 99% sequence identity to amino acids 18 to 335 of SEQ ID NO: 55.

52. The method of any one of paragraphs 1-51, wherein the at least two hemicellulases comprises a GH30_8 xylanase and an α-L-arabinofuranosidase selected from a GH family selected the group consisting of GH43, GH51 and GH62.

53. The method of any one of paragraphs 1-52, wherein:

(i) the at least two hemicellulases comprise a GH30_8 xylanase and a GH43 arabinofuranosidase;

(ii) the at least two hemicellulases comprise a GH30_8 xylanase and a GH51 arabinofuranosidase; or (iii) the at least two hemicellulases comprises a GH30_8 xylanase and a GH62 α-L-arabinofuranosidase.

54. The method of any one of paragraphs 1-53, wherein:

(i) the GH30_8 xylanase is selected from the group consisting of the one shown in amino acids 28 to 417 of SEQ ID NO: 3 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 and the one shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4, and wherein the GH43 arabinofuranosidase is from the genus *Humicola*, for example *Humicola insolens*, such as the arabinofuranosidase shown in amino acids 19 to 558 of SEQ ID NO: 56 or the arabinofuranosidase shown in amino acids 24 to 575 of SEQ ID NO: 57, or one having at least 60%, at least 65%, at least 70%, at least 75%, at least 80%, at least 85%, at least 90%, at least 95%, at least 96%, at least 97%, at least 98%, or at least 99% sequence identity to amino acids 19 to 558 of SEQ ID NO: 56 or amino acids 24 to 575 of SEQ ID NO: 57;

(ii) the GH30_8 xylanase is selected from the group consisting of the one shown in amino acids 28 to 417 of SEQ ID NO: 3 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 and the one shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4, and wherein the GH51 arabinofuranosidase is from the genus *Golletotrichum*, for example *Colletotrichum graminicola*, such as the arabinofuranosidase shown in amino acids 20 to 663 of SEQ ID NO: 58 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 663 of SEQ ID NO: 58, or the GH51 arainofuranosidase is from the genus *Trametes*, for example *Trametes hirsuta*, such as the arabinofuranosidase shown in amino acids 17 to 643 of SEQ ID NO: 59 or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 643 of SEQ ID NO: 59; or (iii) the GH30_8 xylanase is selected from the group consisting of the one shown in amino acids 28 to 417 of SEQ ID NO: 3 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 and the one shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4, and wherein the GH62 α-L-arabinofuranosidase is the one shown in amino acids 17 to 325 of SEQ ID NO: 11, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 325 of SEQ ID NO: 11, or the one shown in amino acids 18 to 335 of SEQ ID NO: 55, or one having at least 60%, at least 65%, at least 70%, at least 75%, at least 80%, at least 85%, at least 90%, at least 95%, at least 96%, at least 97%, at least 98%, or at least 99% sequence identity to amino acids 18 to 335 of SEQ ID NO: 55.

55. The method of any one of paragraphs 1-54, wherein the at least two hemicellulases comprises a GH10 xylanase and an α-L-arabinofuranosidase selected from a GH family selected the group consisting of GH43, GH51 and GH62.

56. The method of any one of paragraphs 1-55, wherein:

(i) the at least two hemicellulases comprise a GH10 xylanase and a GH43 arabinofuranosidase;

(ii) the at least two hemicellulases comprise a GH10 xylanase and a GH51 arabinofuranosidase; or (iii) the at least two hemicellulases comprises a GH10 xylanase and GH62 α-L-arabinofuranosidase.

57. The method of any one of paragraphs 1-56, wherein:

(i) the GH10 xylanase is selected from the group consisting of the one shown in amino acids 20 to 397 of SEQ ID NO: 1 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1 and amino acids 21 to 405 of SEQ ID NO: 2 or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2, wherein the GH43 arabinofuranosidase is from the genus *Humicola*, for example *Humicola insolens*, such as the arabinofuranosidase shown in amino acids 19 to 558 of SEQ ID NO: 56 or the arabinofuranosidase shown in amino acids 24 to 575 of SEQ ID NO: 57, or one having at least 60%, at least 65%, at least 70%, at least 75%, at least 80%, at least 85%, at least 90%, at least 95%, at least 96%, at least 97%, at least 98%, or at least 99% sequence identity to amino acids 19 to 558 of SEQ ID NO: 56 or amino acids 24 to 575 of SEQ ID NO: 57;

(ii) the GH10 xylanase is selected from the group consisting of the one shown in amino acids 20 to 397 of SEQ ID NO: 1 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1 and amino acids 21 to 405 of SEQ ID NO: 2 or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2, and wherein the GH51 arabinofuranosidase is from the genus *Golletotrichum*, for example *Colletotrichum graminicola*, such as the arabinofuranosidase shown in amino acids 20 to 663 of SEQ ID NO: 58 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 663 of SEQ ID NO: 58, or the GH51 arainofuranosidase is from the genus *Trametes*, for example *Trametes hirsuta*, such as the arabinofuranosidase shown in amino acids 17 to 643 of SEQ ID NO: 59 or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 643 of SEQ ID NO: 59; or (iii) the GH10 xylanase is selected from the group consisting of the one shown in amino acids 20 to 397 of SEQ ID NO: 1 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1 and amino acids 21 to 405 of SEQ ID NO: 2 or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2, and wherein the GH62 α-L-arabinofuranosidase is the one shown in amino acids 17 to 325 of SEQ ID NO: 11, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 325 of SEQ ID NO: 11, or the one shown in amino acids 18 to 335 of SEQ ID NO: 55, or one having at least 60%, at least 65%, at least 70%, at least 75%, at least 80%, at least 85%, at least 90%, at least 95%, at least 96%, at least 97%, at least 98%, or at least 99% sequence identity to amino acids 18 to 335 of SEQ ID NO: 55.

58. The method of any one of paragraphs 1-57, wherein the GH10 xylanase is the one shown in amino acids 21 to 405 of SEQ ID NO: 2 or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2, and wherein the GH62 α-L-arabinofuranosidase is the one shown in amino acids 17 to 325 of SEQ ID NO: 11, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 325 of SEQ ID NO: 11.

59. The method of any one of paragraphs 1-58, wherein the at least one xylanase and the at least one α-L-arabinofuranosidase increases the mass fraction of the high protein feed ingredient.

60. The method of any one of paragraphs 1-59, wherein the mixture of at least two hemicellulases comprises a xylanase and a beta-xylosidase.

61. The method of any one of paragraphs 1-60, wherein the mixture of at least two hemicellulases comprises:

(i) a xylanase from the genus *Aspergillus*, for example *Aspergillus fumigatus*, such as the xylanase shown in amino acids 20 to 397 of SEQ ID NO: 1, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1; and (ii) a beta-xylosidase from the genus *Aspergillus*, for example *Aspergillus fumigatus*, such as the beta-xylosidase shown in amino acids 21 to 792 of SEQ ID NO: 12, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 792 of SEQ ID NO: 12.

62. The method of any one of paragraphs 1-61, wherein the at least one xylanase and at least one beta-xylosidase increases the mass fraction of the high protein feed ingredient.

63. The method of any one of paragraphs 1-62, wherein the beta-glucanase is from a glycoside hydrolase family selected from the group consisting of a GH5_15 family beta-glucanase, a GH16 family beta-glucanase, and a GH64 family beta-glucanase.

64. The method of any one of paragraphs 1-63, wherein the GH5_15 family beta-glucanase is from the genus *Rasamsonia*, for example *Rasamsonia byssochlamydoides*, such as the beta-glucanase shown in amino acids 20 to 413 of SEQ ID NO: 13, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 13.

65. The method of any one of paragraphs 1-64, wherein the GH5_15 family beta-glucanase is from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17.

66. The method of any one of paragraphs 1-65, wherein the GH16 family beta-glucanase is from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19.

67. The method of any one of paragraphs 1-66, wherein the GH64 beta-glucanase is from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20.

68. The method of any one of paragraphs 1-67, wherein the beta-glucanase increases the percent protein on a dry basis of the high protein feed ingredient.

69. The method of any one of paragraphs 1-69, wherein the enzyme blend further comprises a cellulolytic composition.

70. The method of any one of paragraphs 1-69, wherein the cellulolytic composition is present in the blend in a ratio of hemicellulase and cellulolytic composition from about 5:95 to about 95:5, such as from 5:95, 10:90, 20:80, 25:75, 50:50, 80:20, 75:25, 90:10, and 95:5.

71. The method of any one of paragraphs 1-70, wherein the cellulolytic composition is present in the blend in a ratio of beta-glucanase and cellulolytic composition from about 5:95 to about 95:5, such as from 5:95, 10:90, 20:80, 25:75, 50:50, 80:20, 75:25, 90:10, and 95:5.

72. The method of any one of paragraphs 1-71, wherein the cellulolytic composition is present in the blend in a ratio of cellulolytic composition, beta-glucanase, and hemicellulase from about 80:10:10 to about 40:30:30, such as from 80:10:10, 75:20:5, 75:15:10, 75:13:12, 75:12:13, 75:10:15, 75:5:20, 70:25:5, 70:20:10, 70:15:15, 70:10:20, 70:5:25, 65:30:5, 65:25:10, 65:20:15, 65:18:17, 65:17:18, 65:15:20, 65:10:25, 65:5:35, 60:35:5, 60:30:10, 60:25:15, 60:20:20, 60:15:25, 60:10:30, 60:5:35, 55:40:5, 55:35:10, 55:30:15, 55:25:20, 55:23:22, 55:22:23, 55:20:25, 55:15:30, 55:10:35, 55:5:40; 50:45:5, 50:40:10, 50:35:15, 50:30:20, 50:25:25, 50:20:30, 50:15:35, 50:10:40, 50:5:45, 45:50:5, 45:45:10, 45:40:15, 45:35:20, 45:30:25, 45:28:27, 45:27:28, 45:25:30, 45:20:35, 45:15:40, 45:10:45, 45:5:40, 40:55:5, 40:50:10, 40:45:15, 40:40:20, 40:35:25, 40:30:30, 40:25:35, 40:20:40, 40:15:45, 40:10:50, and 40:5:55, preferably from about 50-70:15-25:15-25, or most preferably about 55-60:18-23:18-23.

73. The method of any one of paragraphs 1-72, wherein the cellulolytic composition is present in the blend in a ratio of cellulolytic composition, beta-glucanase, and xylanase from about 80:10:10 to about 40:30:30, such as from 80:10:10, 75:20:5, 75:15:10, 75:13:12, 75:12:13, 75:10:15, 75:5:20, 70:25:5, 70:20:10, 70:15:15, 70:10:20, 70:5:25, 65:30:5, 65:25:10, 65:20:15, 65:18:17, 65:17:18, 65:15:20, 65:10:25, 65:5:35, 60:35:5, 60:30:10, 60:25:15, 60:20:20, 60:15:25, 60:10:30, 60:5:35, 55:40:5, 55:35:10, 55:30:15, 55:25:20, 55:23:22, 55:22:23, 55:20:25, 55:15:30, 55:10:35, 55:5:40; 50:45:5, 50:40:10, 50:35:15, 50:30:20, 50:25:25, 50:20:30, 50:15:35, 50:10:40, 50:5:45, 45:50:5, 45:45:10, 45:40:15, 45:35:20, 45:30:25, 45:28:27, 45:27:28, 45:25:30, 45:20:35, 45:15:40, 45:10:45, 45:5:40, 40:55:5, 40:50:10, 40:45:15, 40:40:20, 40:35:25, 40:30:30, 40:25:35, 40:20:40, 40:15:45, 40:10:50, and 40:5:55, preferably from about 50-70:15-25:15-25, or most preferably about 55-60:18-23:18-23.

74. The method of any one of paragraphs 1-73, wherein the cellulolytic composition comprises at least one, at least two, at least three, or at least four enzymes selected from the group consisting of:

(i) a cellobiohydrolase I;

(ii) a cellobiohydrolase II;

(iii) a beta-glucosidase; and (iv) a GH61 polypeptide having cellulolytic enhancing activity.

75. The method of any one of paragraphs 1-74, wherein the cellulolytic composition comprises at least one, at least two, at least three, or at least four enzymes selected from the group consisting of:

(i) an *Aspergillus fumigatus* cellobiohydrolase I;

(ii) an *Aspergillus fumigatus* cellobiohydrolase II;

(iii) an *Aspergillus fumigatus* beta-glucosidase; and (iv) a *Penicillium emersonii* GH61A polypeptide having cellulolytic enhancing activity.

76. The method of any one of paragraphs 1-75, wherein the cellulolytic composition comprises:

(i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and/or (iv) a GH61A polypeptide having cellulolytic enhancing activity comprising amino acids 26 to 253 of SEQ ID NO: 24 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

77. The method of any one of paragraphs 1-76, wherein the cellulolytic composition further comprises an endoglucanase.

78. The method of any one of paragraphs 1-77, wherein the cellulolytic composition comprises a cellobiohydrolase, a beta-glucosidase, and an endoglucanase.

79. The method of any one of paragraphs 1-78, wherein the cellulolytic composition comprises:

(i) a cellobiohydrolase I;

(ii) a beta-glucosidase; and (iii) an endoglucanase I.

80. The method of any one of paragraphs 1-79, wherein the cellulolytic composition comprises:

(i) an *Aspergillus* cellobiohydrolase I;

(ii) an *Aspergillus* beta-glucosidase; and (iii) a *Trichoderma* endoglucanase I.

81. The method of any one of paragraphs 1-80, wherein the cellulolytic composition comprises:

(i) an *Aspergillus fumigatus* cellobiohydrolase I;

(ii) an *Aspergillus fumigatus* beta-glucosidase; and (iii) a *Trichoderma reesei* endoglucanase I.

82. The method of any one of paragraphs 1-81, wherein the cellulolytic composition comprises:

(i) a cellobiohydrolase I comprising amino acids 27 to 532 of SEQ ID NO: 21 or a variant thereof having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a beta-glucosidase comprising amino acids 20 to 863 of SEQ ID NO: 4 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 4; and/or (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids to 23 to 459 of SEQ ID NO: 44.

83. The method of any one of paragraphs 1-82, wherein the enzyme blend comprises at least one hemicellulase and a cellulolytic composition, wherein:

(i) the at least one hemicellulase is selected from the group consisting of an acetylxylan esterase, a α-glucuronidases, a α-L-arabinofuranosidases, a α-L-galactosidase, a beta-xylosidase, a feruloyl esterase, a α-D-galactosidase, a pectin-degrading enzyme, a xylanase, and any combination thereof; and (ii) the cellulolytic composition comprises at least three enzymes selected from the group consisting of a cellobiohydrolase I, a cellobiohydrolase II, a beta-glucosidase, a GH61 polypeptide having cellulolytic enhancing activity, and an endoglucanase I.

84. The method of any one of paragraphs 1-83, wherein the enzyme blend comprises at least one hemicellulase and a cellulolytic composition, wherein:

(i) the at least one hemicellulase is at least one xylanase selected from the group consisting of a GH3 xylanase, a GH5 xylanase, a GH8 xylanase, GH10 xylanase, a GH11 xylanase, a GH30 xylanase, a GH43 xylanase, and a GH 98 xylanase; and (ii) the cellulolytic composition comprises at least three enzymes selected from the group consisting of a cellobiohydrolase I, a cellobiohydrolase II, a beta-glucosidase, a GH61 polypeptide having cellulolytic enhancing activity, and an endoglucanase I.

85. The method of any one of paragraphs 1-83, wherein the enzyme blend comprises at least one xylanase and a cellulolytic composition, wherein:

(i) the at least one xylanase is selected from the group consisting of an *Aspergillus* GH10 xylanase, a *Talaromyces* GH10 xylanase, a *Bacillus* GH30_8 xylanase, a *Chryseobacterium* GH5_21 xylanase, an *Acetivibrio* GH5_34 xylanase, a *Clostridium* GH5_34 xylanase, a *Gonapodya prolifera* GH5_34 xylanase, a *Paenibacillus* GH5_35 xylanase, and any combination of at least two, at least three, at least four, at least five or at least six thereof; and (ii) the cellulolytic composition comprises at least three enzymes selected from the group consisting of an *Aspergillus* cellobiohydrolase I, an *Aspergillus* cellobiohydrolase II, an *Aspergillus* beta-glucosidase, a *Penicillium* GH61 polypeptide having cellulolytic enhancing activity, and a *Trichoderma* endoglucanase I.

85. The method of any one of paragraphs 1-83, wherein the enzyme blend comprises at least one xylanase and a cellulolytic composition, wherein:

(i) the at least one xylanase is selected from the group consisting of an *Aspergillus fumigatus* GH10 xylanase, a *Talaromyces leycettanus* GH10 xylanase, a *Bacillus subtilis* GH30_8 xylanase, a *Chryseobacterium* sp-10696 GH5_21 xylanase, an *Acetivibrio cellulyticus* GH5_34 xylanase, a *Clostridium thermocellum* GH5_34 xylanase, a *Gonapodya prolifera* GH5_34 xylanase, a *Paenibacillus illinoisensis, Paenibacillus favisporus*, or *Paenibacillus* sp. GH5_35 xylanase, and any combination of at least two, at least three, at least four, at least five or at least six thereof; and (ii) the cellulolytic composition comprises at least three enzymes selected from the group consisting of an *Aspergillus fumigatus* cellobiohydrolase I, an *Aspergillus fumigatus* cellobiohydrolase II, an *Aspergillus fumigatus* beta-glucosidase, a *Penicillium emersonii* GH61 polypeptide having cellulolytic enhancing activity, and a *Trichoderma reesei* endoglucanase I.

85. The method of any one of paragraphs 1-84, wherein the enzyme blend comprises at least one xylanase and a cellulolytic composition, wherein the at least one xylanase is selected from the group consisting of:

(i) the xylanase shown in amino acids 20 to 397 of SEQ ID NO: 1, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1;

(ii) the xylanase shown in amino acids 21 to 404 of SEQ ID NO: 2, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2;

(iii) the xylanase shown in amino acids 28 to 417 of SEQ ID NO: 3, or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4;

(iv) the xylanase shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4;

(v) the xylanase shown in amino acids 25 to 551 of SEQ ID NO: 5, or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5;

(vi) the xylanase shown in amino acids 25 to 551 of SEQ ID NO: 6, or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6;

(vii) the xylanase shown in SEQ ID NO: 7, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 7;

(viii) the xylanase shown in SEQ ID NO: 8, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 8;

(ix) the xylanase shown in amino acids 37 to 573 of SEQ ID NO: 9, or one having at least 60%, at least 65%, at least 70%, at least 75%, at least 80%, at least 85%, at least 90%, at least 95%, at least 96%, at least 97%, at least 98%, or at least 99% sequence identity to amino acids 37 to 573 of SEQ ID NO: 9;

(x) the xylanase shown in amino acids 36 to 582 of SEQ ID NO: 10 or one having at least 60%, at least 65%, at least 70%, at least 75%, at least 80%, at least 85%, at least 90%, at least 95%, at least 96%, at least 97%, at least 98%, or at least 99% sequence identity to amino acids 36 to 582 of SEQ ID NO: 10;

(xi) the xylanase shown in amino acids 24 to 337 of SEQ ID NO: 53 or one having at least 60%, at least 65%, at least 70%, at least 75%, at least 80%, at least 85%, at least 90%, at least 95%, at least 96%, at least 97%, at least 98%, or at least 99% sequence identity to amino acids 24 to 337 of SEQ ID NO: 53;

(xii) the xylanase shown in amino acids 1 to 536 of SEQ ID NO: 54, or one having at least 60%, at least 65%, at least 70%, at least 75%, at least 80%, at least 85%, at least 90%, at least 95%, at least 96%, at least 97%, at least 98%, or at least 99% sequence identity to amino acids 1 to 536 of SEQ ID NO: 54; and wherein the cellulolytic composition comprises at least three enzymes selected from the group consisting of:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and/or (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24; and (v) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 to of SEQ ID NO: 44.

86. The method of any one of paragraphs 1-85, wherein the enzyme blend comprises:

(a) a GH30_8 xylanase selected from the group consisting of the one shown in amino acids 28 to 417 of SEQ ID NO: 3 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 and the one shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4;

(b) a GH5_21 xylanase selected from the group consisting of comprising, consisting essentially of, or consisting of the one shown in amino acids 25 to 551 of SEQ ID NO: 5 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5 and the one shown in amino acids 25 to 551 of SEQ ID NO: 6 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6; and (c) a cellulolytic composition comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

87. The method of any one of paragraphs 1-86, wherein the enzyme blend comprises:

(a) a GH30_8 xylanase selected from the group consisting of the one shown in amino acids 28 to 417 of SEQ ID NO: 3 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 and the one shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4;

(b) a GH5_21 xylanase selected from the group consisting of comprising, consisting essentially of, or consisting of the one shown in amino acids 25 to 551 of SEQ ID NO: 5 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5 and the one shown in amino acids 25 to 551 of SEQ ID NO: 6 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6; and (c) a cellulolytic composition comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44.

88. The method of paragraphs 86 or 87, wherein the GH30_8 xylanase and the GH5_21 xylanase are present in the blend in a ratio of 1:1, 1.1:1, 1.2:1, 1.3:1, 1.4:1, 1.5:1, 1:1.5, 1:1.4, 1:1.3, 1:1.2, or 1:1.1 of GH30_8 xylanase to GH5_21 xylanase.

89. The method of any one of paragraphs 1-88, wherein the enzyme blend comprises:

(a) at least one xylanase from a family selected from the group consisting of a GH3 family xylanase, GH5 family xylanase, a GH8 family xylanase, a GH10 family xylanase, a GH11 family xylanase, a GH30 family xylanase, a GH43 family xylanase, and a GH98 family xylanase;

(b) at least one α-L-arabinofuranosidase from a GH family selected from the group consisting of GH43, GH51 and GH62; and;

(c) a cellulolytic composition comprising at least three enzymes selected from the group consisting of a cellobiohydrolase I, cellobiohydrolase II, a beta-glucosidase, a GH61A polypeptide having cellulolytic enhancing activity, and an endoglucanase I.

90. The method of any one of paragraphs 1-89, wherein the enzyme blend comprises:

(a) at least one GH10 xylanase selected from the group consisting of the one shown in amino acids 20 to 397 of SEQ ID NO: 1 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1 and amino acids 21 to 405 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 21;

(b) an arabinofuranosidase selected from the group consisting of:

(i) a GH43 arabinofuranosidase selected from the group consisting of the arabinofuranosidase shown in amino acids 19 to 558 of SEQ ID NO: 56, the arabinofuranosidase shown in amino acids 24 to 575 of SEQ ID NO: 57, and one having at least 60%, at least 65%, at least 70%, at least 75%, at least 80%, at least 85%, at least 90%, at least 95%, at least 96%, at least 97%, at least 98%, or at least 99% sequence identity to amino acids 19 to 558 of SEQ ID NO: 56 or amino acids 24 to 575 of SEQ ID NO: 57.

(ii) a GH51 arabinofuranosidase selected from the group consisting of the arabinofuranosidase shown in amino acids 20 to 663 of SEQ ID NO: 58 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 663 of SEQ ID NO: 58, and the arabinofuranosidase shown in amino acids 17 to 643 of SEQ ID NO: 59 or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 643 of SEQ ID NO: 59;

(iii) a GH62 α-L-arabinofuranosidase selected from the group consisting of the shown in amino acids 17 to 325 of SEQ ID NO: 11, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 325 of SEQ ID NO: 11 and the one shown in amino acids 18 to 335 of SEQ ID NO: 55, or one having at least 60%, at least 65%, at least 70%, at least 75%, at least 80%, at least 85%, at least 90%, at least 95%, at least 96%, at least 97%, at least 98%, or at least 99% sequence identity to amino acids 18 to 335 of SEQ ID NO: 55; and (c) a cellulolytic composition comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

91. The method of any one of paragraphs 1-90, wherein the enzyme blend comprises:

(a) at least one GH10 xylanase selected from the group consisting of the one shown in amino acids 20 to 397 of SEQ ID NO: 1 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1 and amino acids 21 to 405 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 21;

(b) an arabinofuranosidase selected from the group consisting of:

(i) a GH43 arabinofuranosidase selected from the group consisting of the arabinofuranosidase shown in amino acids 19 to 558 of SEQ ID NO: 56, the arabinofuranosidase shown in amino acids 24 to 575 of SEQ ID NO: 57, and one having at least 60%, at least 65%, at least 70%, at least 75%, at least 80%, at least 85%, at least 90%, at least 95%, at least 96%, at least 97%, at least 98%, or at least 99% sequence identity to amino acids 19 to 558 of SEQ ID NO: 56 or amino acids 24 to 575 of SEQ ID NO: 57.

(ii) a GH51 arabinofuranosidase selected from the group consisting of the arabinofuranosidase shown in amino acids 20 to 663 of SEQ ID NO: 58 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 663 of SEQ ID NO: 58, and the arabinofuranosidase shown in amino acids 17 to 643 of SEQ ID NO: 59 or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 643 of SEQ ID NO: 59;

(iii) a GH62 α-L-arabinofuranosidase selected from the group consisting of the shown in amino acids 17 to 325 of SEQ ID NO: 11, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 325 of SEQ ID NO: 11 and the one shown in amino acids 18 to 335 of SEQ ID NO: 55, or one having at least 60%, at least 65%, at least 70%, at least 75%, at least 80%, at least 85%, at least 90%, at least 95%, at least 96%, at least 97%, at least 98%, or at least 99% sequence identity to amino acids 18 to 335 of SEQ ID NO: 55; and (c) a cellulolytic composition comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44.

92. The method of any one of paragraphs 1-91, wherein the enzyme blend comprises:

(a) a xylanase selected from the group consisting of: (i) a xylanase from the genus *Aspergillus*, for example *Aspergillus fumigatus*, such as the xylanase shown in amino acids 20 to 397 of SEQ ID NO: 1, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1; and (ii) a xylanase from the genus *Talaromyces*, for example *Talaromyces leycettanus*, such as the xylanase shown in amino acids 21 to 404 of SEQ ID NO: 2, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2;

(b) a beta-xylosidase from the genus *Aspergillus*, for example *Aspergillus fumigatus*, such as the beta-xylosidase shown in amino acids 21 to 792 of SEQ ID NO: 12, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 792 of SEQ ID NO: 12; and (c) a cellulolytic composition comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

93. The method of any one of paragraphs 1-92, wherein the enzyme blend comprises:

(a) a xylanase selected from the group consisting of: (i) a xylanase from the genus *Aspergillus*, for example *Aspergillus fumigatus*, such as the xylanase shown in amino acids 20 to 397 of SEQ ID NO: 1, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1; and (ii) a xylanase from the genus *Talaromyces*, for example *Talaromyces leycettanus*, such as the xylanase shown in amino acids 21 to 404 of SEQ ID NO: 2, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2;

(b) a beta-xylosidase from the genus *Aspergillus*, for example *Aspergillus fumigatus*, such as the beta-xylosidase shown in amino acids 21 to 792 of SEQ ID NO: 12, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 792 of SEQ ID NO: 12; and (c) a cellulolytic composition comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44.

94. The method of any one of paragraphs 1-93, wherein the enzyme blend comprises at least one beta-glucanase and a cellulolytic composition, wherein:

(i) the at least one beta-glucanase is from a glycoside hydrolase family selected from the group consisting of a GH5_15 family beta-glucanase, a GH16 family beta-glucanase, and a GH64 family beta-glucanase.

(ii) the cellulolytic composition comprises at least three enzymes selected from the group consisting of a cellobiohydrolase I, a cellobiohydrolase II, a beta-glucosidase, a GH61 polypeptide having cellulolytic enhancing activity, and an endoglucanase I.

95. The method of any one of paragraphs 1-94, wherein the enzyme blend comprises:

(a) at least one beta-glucanase from the genus *Rasamsonia*, for example *Rasamsonia byssochlamydoides*, such as the beta-glucanase shown in amino acids 20 to 413 of SEQ ID NO: 13, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 13; and (b) a cellulolytic composition comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

96. The method of any one of paragraphs 1-95, wherein the enzyme blend comprises:

(a) at least one beta-glucanase from the genus *Rasamsonia*, for example *Rasamsonia byssochlamydoides*, such as the beta-glucanase shown in amino acids 20 to 413 of SEQ ID NO: 13, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 13; and (b) a cellulolytic composition comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44.

97. The method of any one of paragraphs 1-96, wherein the enzyme blend comprises:

(a) at least one beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17; and (b) a cellulolytic composition comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

98. The method of any one of paragraphs 1-97, wherein the enzyme blend comprises:

(a) at least one beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17; and (b) a cellulolytic composition comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44.

99. The method of any one of paragraphs 1-98, wherein the enzyme blend comprises:

(a) at least one beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (b) a cellulolytic composition comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

100. The method of any one of paragraphs 1-99, wherein the enzyme blend comprises:

(a) at least one beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (b) a cellulolytic composition comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44.

101. The method of any one of paragraphs 1-100, wherein the enzyme blend comprises:

(a) at least one beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (b) a cellulolytic composition comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

102. The method of any one of paragraphs 1-101, wherein the enzyme blend comprises:

(a) at least one beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (b) a cellulolytic composition comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44.

103. The method of any one of paragraphs 1-102, wherein the enzyme blend comprises at least one hemicellulase, at least one beta-glucanase, and a cellulolytic composition, wherein:

(i) the at least one hemicellulase is selected from the group consisting of an acetylxylan esterase, a α-glucuronidases, a α-L-arabinofuranosidases, a α-L-galactosidase, a beta-xylosidase, a feruloyl esterase, a α-D-galactosidase, a pectin-degrading enzyme, a xylanase, and any combination thereof;

(ii) the at least one beta-glucanase is from a glycoside hydrolase family selected from the group consisting of a GH5_15 family beta-glucanase, a GH16 family beta-glucanase, and a GH64 family beta-glucanase.

(iii) the cellulolytic composition comprises at least three enzymes selected from the group consisting of a cellobiohydrolase I, a cellobiohydrolase II, a beta-glucosidase, a GH61 polypeptide having cellulolytic enhancing activity, and an endoglucanase I.

104. The method of any one of paragraphs 1-103, wherein the enzyme blend comprises at least one hemicellulase, at least one beta-glucanase, and a cellulolytic composition, wherein:

(i) the at least one hemicellulase is at least one xylanase selected from the group consisting of a GH3 xylanase, a GH5 xylanase, a GH8 xylanase, GH10 xylanase, a GH11 xylanase, a GH30 xylanase, a GH43 xylanase, and a GH98 xylanase;

(ii) the at least one beta-glucanase is from a glycoside hydrolase family selected from the group consisting of a GH5_15 family beta-glucanase, a GH16 family beta-glucanase, and a GH64 family beta-glucanase; and (ii) the cellulolytic composition comprises at least three enzymes selected from the group consisting of a cellobiohydrolase I, a cellobiohydrolase II, a beta-glucosidase, a GH61 polypeptide having cellulolytic enhancing activity, and an endoglucanase I.

105. The method of any one of paragraphs 1-104, wherein the enzyme blend comprises at least one xylanase, at least one beta-glucanase, and a cellulolytic composition, wherein:

(i) the at least one xylanase is selected from the group consisting of an *Aspergillus* GH10 xylanase, a *Talaromyces* GH10 xylanase, a *Bacillus* GH30_8 xylanase, a *Chryseobacterium* GH5_21 xylanase, an *Acetivibrio* GH5_34 xylanase, a *Clostridium GH*5_34 xylanase, a *Gonapodya prolifera* GH5_34 xylanase, a *Paenibacillus* GH5_35 xylanase, and any combination of at least two, at least three, at least four, at least five or at least six thereof;

(ii) the at least one beta-glucanase is selected from the group consisting of a *Rasamsonia* GH5_15 beta-glucanase, a *Trichoderma* GH5_15 beta-glucanase, an *Albifimbria* GH16 beta-glucanase, a *Lecanicillium* GH16 beta-glucanase, and a *Trichoderma* GH64 family beta-glucanase; and (iii) the cellulolytic composition comprises at least three enzymes selected from the group consisting of an *Aspergillus* cellobiohydrolase I, an *Aspergillus* cellobiohydrolase II, an *Aspergillus* beta-glucosidase, a *Penicillium* GH61 polypeptide having cellulolytic enhancing activity, and a *Trichoderma* endoglucanase I.

106. The method of any one of paragraphs 1-105, wherein the enzyme blend comprises at least one xylanase, at least one beta-glucanase, and a cellulolytic composition, wherein:

(i) the at least one xylanase is selected from the group consisting of an *Aspergillus fumigatus* GH10 xylanase, a *Talaromyces leycettanus* GH10 xylanase, a *Bacillus subtilis GH*30_8 xylanase, a *Chryseobacterium* sp-10696 GH5_21 xylanase, an *Acetivibrio cellulyticus* GH5_34 xylanase, a *Clostridium thermocellum* GH5_34 xylanase, a *Gonapodya prolifera* GH5_34 xylanase, a *Paenibacillus* genus GH5_35 xylanase (e.g., *Paenibacillus favisporus, Paenibacillus illinoisensis* or *Paenibacillus* sp. GH5_35 xylanase), and any combination of at least two, at least three, at least four, at least five or at least six thereof; and (ii) the at least one beta-glucanase is selected from the group consisting of a *Rasamsonia byssochlamydoides* GH5_15 beta-glucanase, a *Trichoderma atroviride* GH5_15 beta-glucanase, a *Trichoderma harzianum* GH5_15 beta-glucanase, an *Albifimbria verrucaria* GH16 beta-glucanase, a *Lecanicillium* sp. WMM742 GH16 beta-glucanase, and a *Trichoderma harzianum* GH64 family beta-glucanase;

(iii) the cellulolytic composition comprises at least three enzymes selected from the group consisting of an *Aspergillus fumigatus* cellobiohydrolase I, an *Aspergillus fumigatus* cellobiohydrolase II, an *Aspergillus fumigatus* beta-glucosidase, a *Penicillium emersonii* GH61 polypeptide having cellulolytic enhancing activity, and a *Trichoderma reesei* endoglucanase I.

107. The method of any one of paragraphs 1-106, wherein the enzyme blend comprises:

(a) at least one xylanase selected from the group consisting of:

(i) the xylanase shown in amino acids 20 to 397 of SEQ ID NO: 1, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1;

(ii) the xylanase shown in amino acids 21 to 404 of SEQ ID NO: 2, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2;

(iii) the xylanase shown in amino acids 28 to 417 of SEQ ID NO: 3, or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4;

(iv) the xylanase shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4;

(v) the xylanase shown in amino acids 25 to 551 of SEQ ID NO: 5, or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5;

(vi) the xylanase shown in amino acids 25 to 551 of SEQ ID NO: 6, or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6;

(vii) the xylanase shown in SEQ ID NO: 7, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 7;

(viii) the xylanase shown in SEQ ID NO: 8, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 8;

(ix) the xylanase shown in amino acids 37 to 573 of SEQ ID NO: 9, or one having at least 60%, at least 65%, at least 70%, at least 75%, at least 80%, at least 85%, at least 90%, at least 95%, at least 96%, at least 97%, at least 98%, or at least 99% sequence identity to amino acids 37 to 573 of SEQ ID NO: 9;

(x) the xylanase shown in amino acids 36 to 582 of SEQ ID NO: 10 or one having at least 60%, at least 65%, at least 70%, at least 75%, at least 80%, at least 85%, at least 90%, at least 95%, at least 96%, at least 97%, at least 98%, or at least 99% sequence identity to amino acids 36 to 582 of SEQ ID NO: 10;

(xi) the xylanase shown in amino acids 24 to 337 of SEQ ID NO: 53 or one having at least 60%, at least 65%, at least 70%, at least 75%, at least 80%, at least 85%, at least 90%, at least 95%, at least 96%, at least 97%, at least 98%, or at least 99% sequence identity to amino acids 24 to 337 of SEQ ID NO: 53;

(xii) the xylanase shown in amino acids 1 to 536 of SEQ ID NO: 54, or one having at least 60%, at least 65%, at least 70%, at least 75%, at least 80%, at least 85%, at least 90%, at least 95%, at least 96%, at least 97%, at least 98%, or at least 99% sequence identity to amino acids 1 to 536 of SEQ ID NO: 54;

(b) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (c) and a cellulolytic composition comprising at least three enzymes selected from the group consisting of:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and/or (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24; and (v) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44.

108. The method of any one of paragraphs 1-107, wherein the enzyme blend comprises:

(a) at least one xylanase selected from the group consisting of:

(i) the xylanase shown in amino acids 20 to 397 of SEQ ID NO: 1, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1;

(ii) the xylanase shown in amino acids 21 to 404 of SEQ ID NO: 2, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2;

(iii) the xylanase shown in amino acids 28 to 417 of SEQ ID NO: 3, or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4;

(iv) the xylanase shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4;

(v) the xylanase shown in amino acids 25 to 551 of SEQ ID NO: 5, or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5;

(vi) the xylanase shown in amino acids 25 to 551 of SEQ ID NO: 6, or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6;

(vii) the xylanase shown in SEQ ID NO: 7, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 7;

(viii) the xylanase shown in SEQ ID NO: 8, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 8;

(ix) the xylanase shown in amino acids 37 to 573 of SEQ ID NO: 9, or one having at least 60%, at least 65%, at least 70%, at least 75%, at least 80%, at least 85%, at least 90%, at least 95%, at least 96%, at least 97%, at least 98%, or at least 99% sequence identity to amino acids 37 to 573 of SEQ ID NO: 9;

(x) the xylanase shown in amino acids 36 to 582 of SEQ ID NO: 10 or one having at least 60%, at least 65%, at least 70%, at least 75%, at least 80%, at least 85%, at least 90%, at least 95%, at least 96%, at least 97%, at least 98%, or at least 99% sequence identity to amino acids 36 to 582 of SEQ ID NO: 10;

(xi) the xylanase shown in amino acids 24 to 337 of SEQ ID NO: 53 or one having at least 60%, at least 65%, at least 70%, at least 75%, at least 80%, at least 85%, at least 90%, at least 95%, at least 96%, at least 97%, at least 98%, or at least 99% sequence identity to amino acids 24 to 337 of SEQ ID NO: 53;

(xii) the xylanase shown in amino acids 1 to 536 of SEQ ID NO: 54, or one having at least 60%, at least 65%, at least 70%, at least 75%, at least 80%, at least 85%, at least 90%, at least 95%, at least 96%, at least 97%, at least 98%, or at least 99% sequence identity to amino acids 1 to 536 of SEQ ID NO: 54;

(b) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (c) a cellulolytic composition comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

108. The method of any one of paragraphs 1-107, wherein the enzyme blend comprises:

(a) at least one xylanase selected from the group consisting of:

(i) the xylanase shown in amino acids 20 to 397 of SEQ ID NO: 1, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 397 of SEQ ID NO: 1;

(ii) the xylanase shown in amino acids 21 to 404 of SEQ ID NO: 2, or one having at least 60%, at least 65%, at least 70%, at least 75%, at least 80%, at least 85%, at least 90%, at least 95%, at least 96%, at least 97%, at least 98%, or at least 99% sequence identity to amino acids 21 to 405 of SEQ ID NO: 2;

(iii) the xylanase shown in amino acids 28 to 417 of SEQ ID NO: 3, or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4;

(iv) the xylanase shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4;

(v) the xylanase shown in amino acids 25 to 551 of SEQ ID NO: 5, or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5;

(vi) the xylanase shown in amino acids 25 to 551 of SEQ ID NO: 6, or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6;

(vii) the xylanase shown in SEQ ID NO: 7, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 7;

(viii) the xylanase shown in SEQ ID NO: 8, or one having at least 60%, at least 65%, at least 70%, at least 75%, at least 80%, at least 85%, at least 90%, at least 95%, at least 96%, at least 97%, at least 98%, or at least 99% sequence identity to SEQ ID NO: 8;

(ix) the xylanase shown in amino acids 37 to 573 of SEQ ID NO: 9, or one having at least 60%, at least 65%, at least 70%, at least 75%, at least 80%, at least 85%, at least 90%, at least 95%, at least 96%, at least 97%, at least 98%, or at least 99% sequence identity to amino acids 37 to 573 of SEQ ID NO: 9;

(x) the xylanase shown in amino acids 36 to 582 of SEQ ID NO: 10 or one having at least 60%, at least 65%, at least 70%, at least 75%, at least 80%, at least 85%, at least 90%, at least 95%, at least 96%, at least 97%, at least 98%, or at least 99% sequence identity to amino acids 36 to 582 of SEQ ID NO: 10;

(xi) the xylanase shown in amino acids 24 to 337 of SEQ ID NO: 53 or one having at least 60%, at least 65%, at least 70%, at least 75%, at least 80%, at least 85%, at least 90%, at least 95%, at least 96%, at least 97%, at least 98%, or at least 99% sequence identity to amino acids 24 to 337 of SEQ ID NO: 53;

(xii) the xylanase shown in amino acids 1 to 536 of SEQ ID NO: 54, or one having at least 60%, at least 65%, at least 70%, at least 75%, at least 80%, at least 85%, at least 90%, at least 95%, at least 96%, at least 97%, at least 98%, or at least 99% sequence identity to amino acids 1 to 536 of SEQ ID NO: 54;

(b) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (c) a cellulolytic composition comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44.

109. The method of any one of paragraphs 1-108, wherein the enzyme blend comprises:

(a) a GH30_8 xylanase selected from the group consisting of the one shown in amino acids 28 to 417 of SEQ ID NO: 3 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 and the one shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4; and/or (b) a GH5_21 xylanase selected from the group consisting of comprising, consisting essentially of, or consisting of the one shown in amino acids 25 to 551 of SEQ ID NO: 5 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5 and the one shown in amino acids 25 to 551 of SEQ ID NO: 6 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6; and (c) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (d) a cellulolytic composition comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

110. The method of any one of paragraphs 1-109, wherein the enzyme blend comprises:

(a) a GH30_8 xylanase selected from the group consisting of the one shown in amino acids 28 to 417 of SEQ ID NO: 3 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 and the one shown in amino acids 28 to 417 of SEQ ID NO: 4 or one having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 4; and/or (b) a GH5_21 xylanase selected from the group consisting of comprising, consisting essentially of, or consisting of the one shown in amino acids 25 to 551 of SEQ ID NO: 5 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 5 and the one shown in amino acids 25 to 551 of SEQ ID NO: 6 or one having at least 60%, at least 65%, at least 70%, at least 75%, at least 80%, at least 85%, at least 90%, at least 95%, at least 96%, at least 97%, at least 98%, or at least 99% sequence identity to amino acids 25 to 551 of SEQ ID NO: 6; and (c) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (d) a cellulolytic composition comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iii) an endoglucanase I comprising amino acids 23 to 459 of SEQ ID NO: 44 or one having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44.

111. The method of any one of paragraphs 1-110, wherein the cellulolytic composition is derived from a strain selected from the group consisting of *Aspergillus, Penicilium, Talaromyces*, and *Trichoderma*, optionally wherein: (i) the *Aspergillus* strain is selected from the group consisting of *Aspergillus aurantiacus, Aspergillus niger* and *Aspergillus oryzae*; (ii) the *Penicilium* strain is selected from the group consisting of *Penicilium emersonii* and *Penicilium oxalicum*; (iii) the *Talaromyces* strain is selected from the group consisting of *Talaromyces aurantiacus* and *Talaromyces emersonii*; and (iv) the *Trichoderma* strain is *Trichoderma reesei.*

112. The method of any one of paragraphs 1-111, wherein the cellulolytic composition comprises a *Trichoderma reesei* cellulolytic composition.

113. The method of any one of paragraphs 1-112, wherein the hemicellulase(s) and/or beta-glucanase(s) are exogenously added during saccharification, fermentation, or simultaneous saccharification and fermentation.

114. The method of any one of paragraphs 1-113, wherein the hemicellulases(s) and/or beta-glucanase(s) are expressed in situ by the fermenting organism during fermentation and/or simultaneous saccharification and fermentation.

115. The method of any one of paragraphs 1-114, wherein at least some the hemicellulase and/or beta-glucanase is exogenously added during saccharification, fermentation, or simultaneous saccharification and fermentation and at least some of the hemicellulase and/or beta-glucanase is expressed in situ by the fermenting organism during fermentation and/or simultaneous saccharification and fermentation.

116. The method of any one of paragraphs 1-115, wherein the fermenting organism is a recombinant host cell comprising a heterologous polynucleotide encoding the hemicellulase(s) and/or beta-glucanase(s).

117. The method of any one of paragraphs 1-116, wherein the recombinant host cell further comprises a heterologous polynucleotide encoding a glucoamylase.

118. The method of paragraph 117, wherein the heterologous polynucleotide encoding the glucoamylase is operably linked to a promoter that is foreign to the polynucleotide.

119. The method of any of paragraphs 1-118, wherein the recombinant host cell further comprises a heterologous polynucleotide encoding an alpha-amylase.

120. The method of paragraph 119, wherein the heterologous polynucleotide encoding the alpha-amylase is operably linked to a promoter that is foreign to the polynucleotide.

121. The method of any of paragraphs 74-86, wherein the cell further comprises a heterologous polynucleotide encoding a protease.

122. The method of paragraph 121, wherein the heterologous polynucleotide encoding the protease is operably linked to a promoter that is foreign to the polynucleotide.

123. The method of any of paragraphs 1-122, wherein the cell further comprises a disruption to an endogenous gene encoding a glycerol 3-phosphate dehydrogenase (GPD).

124. The method of any of paragraphs 1-123, wherein the cell further comprises a disruption to an endogenous gene encoding a glycerol 3-phosphatase (GPP).

125. The method of any of paragraphs 1-124, wherein the recombinant host cell is a yeast cell.

126. The method of any of paragraphs 1-125, wherein the recombinant host cell is a *Saccharomyces, Rhodotorula, Schizosaccharomyces, Kluyveromyces, Pichia, Hansenula, Rhodosporidium, Candida, Yarrowia, Lipomyces, Cryptococcus*, or *Dekkera* sp. cell.

127. The method of any of paragraphs 1-126, wherein the recombinant host cell is a *Saccharomyces cerevisiae* cell.

128. A composition comprising;

(a) a recombinant yeast host cell; and (b) at least one hemicellulase according to any of paragraphs 1-127 and/or at least one beta-glucanase according to any of paragraphs 1-127, wherein the yeast host cell comprises a heterologous polynucleotide encoding a glucoamylase, an alpha-amylase, protease, and/or cellulase.

129. The composition of paragraph 128, which is a fermenting or fermented mash composition comprising the recombinant yeast host cell and the at least one hemicellulase and/or at least one beta-glucanase.

129. The composition of paragraph 128, which is a whole stillage composition comprising the recombinant yeast host cell and the at least one hemicellulase and/or at least one beta-glucanase.

130. A composition comprising:

(a) a recombinant yeast host cell; and (b) at least one hemicellulase and/or at least one beta-glucanase, wherein the yeast host cell comprises a heterologous polynucleotide encoding a glucoamylase, an alpha-amylase, protease, and/or cellulase;

wherein the at least one hemicellulase is selected from the group consisting of the mature polypeptide of SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 53, SEQ ID NO: 54, SEQ ID NO: 55, SEQ ID NO: 56, SEQ ID NO: 57, SEQ ID NO: 58, SEQ ID NO: 59, and polypeptides having at least 60%, at least 65%, at least 70%, at least 75%, at least 80%, at least 85%, at least 90%, at least 95%, at least 96%, at least 97%, at least 98%, or at least 99% amino acid sequence identity to SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 53, SEQ ID NO: 54, SEQ ID NO: 55, SEQ ID NO: 56, SEQ ID NO: 57, SEQ ID NO: 58, or SEQ ID NO: 59; and wherein the at least one beta-glucanase is selected from the group consisting of the mature polypeptide of SEQ ID NO: 14, SEQ ID NO: 15, SEQ ID NO: 16, SEQ ID NO: 17, SEQ ID NO: 18, SEQ ID NO: 19, SEQ ID NO: 20, and polypeptides having at least 60%, at least 65%, at least 70%, at least 75%, at least 80%, at least 85%, at least 90%, at least 95%, at least 96%, at least 97%, at least 98%, or at least 99% amino acid sequence identity to SEQ ID NO: 14, SEQ ID NO: 15, SEQ ID NO: 16, SEQ ID NO: 17, SEQ ID NO: 18, SEQ ID NO: 19, or SEQ ID NO: 20.

131. A composition comprising:

(a) a recombinant yeast host cell comprising a heterologous polynucleotide encoding a glucoamylase, an alpha-amylase, and/or protease;

(b) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity; and (c) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21, which has cellobiohydrolase activity;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23, and which has beta-glucosidase activity; and (iii) an endoglucanase I comprising amino acids 23 to 459 of SEQ ID NO: 44 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44, which has endoglucanase activity.

132. A composition comprising:

(a) a recombinant yeast host cell comprising a heterologous polynucleotide encoding a glucoamylase, an alpha-amylase, and/or protease;

(b) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity;

(c) a xylanase comprising amino acids 28 to 417 of SEQ ID NO: 3 or amino acids 28 to 417 of SEQ ID NO: 4 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4; and (d) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21, which has cellobiohydrolase activity;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23, and which has beta-glucosidase activity; and (iii) an endoglucanase I comprising amino acids 23 to 459 of SEQ ID NO: 44 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44, which has endoglucanase activity.

133. A composition comprising:

(a) a recombinant yeast host cell comprising a heterologous polynucleotide encoding a glucoamylase, an alpha-amylase, and/or protease;

(b) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (c) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21, which has cellobiohydrolase activity;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23, and which has beta-glucosidase activity; and (iii) an endoglucanase I comprising amino acids 23 to 459 of SEQ ID NO: 44 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44, which has endoglucanase activity.

134. A composition comprising:

(a) a recombinant yeast host cell comprising a heterologous polynucleotide encoding a glucoamylase, an alpha-amylase, and/or protease;

(b) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity;

(c) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (d) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21, which has cellobiohydrolase activity;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23, and which has beta-glucosidase activity; and (iii) an endoglucanase I comprising amino acids 23 to 459 of SEQ ID NO: 44 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44, which has endoglucanase activity.

135. A composition comprising:

(a) a recombinant yeast host cell comprising a heterologous polynucleotide encoding a glucoamylase, an alpha-amylase, and/or protease;

(b) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity;

(c) a xylanase comprising amino acids 28 to 417 of SEQ ID NO: 3 or amino acids 28 to 417 of SEQ ID NO: 4 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4; and (d) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lecanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (e) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21, which has cellobiohydrolase activity;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23, and which has beta-glucosidase activity; and (iii) an endoglucanase I comprising amino acids 23 to 459 of SEQ ID NO: 44 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44, which has endoglucanase activity.

136. A composition comprising:

(a) a recombinant yeast host cell comprising a heterologous polynucleotide encoding a glucoamylase, an alpha-amylase, and/or protease;

(b) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity; and (c) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

137. A composition comprising:

(a) a recombinant yeast host cell comprising a heterologous polynucleotide encoding a glucoamylase, an alpha-amylase, and/or protease;

(b) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity;

(c) a xylanase comprising amino acids 28 to 417 of SEQ ID NO: 3 or amino acids 28 to 417 of SEQ ID NO: 4 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4; and (d) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

138. A composition comprising:

(a) a recombinant yeast host cell comprising a heterologous polynucleotide encoding a glucoamylase, an alpha-amylase, and/or protease;

(b) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lecanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (c) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

139. A composition comprising:

(a) a recombinant yeast host cell comprising a heterologous polynucleotide encoding a glucoamylase, an alpha-amylase, and/or protease;

(b) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity;

(c) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lecanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (d) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

140. A composition comprising:

(a) a recombinant yeast host cell comprising a heterologous polynucleotide encoding a glucoamylase, an alpha-amylase, and/or protease;

(b) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity;

(c) a xylanase comprising amino acids 28 to 417 of SEQ ID NO: 3 or amino acids 28 to 417 of SEQ ID NO: 4 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4; and (d) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lecanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (e) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

141. The composition of any one of paragraphs 128-140, further comprising a glucoamylase.

142. The composition of any one of paragraphs 128-141, further comprising a glucoamylase selected from the group consisting of:

(i) the glucoamylase of SEQ ID NO: 48 herein or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 48, which has glucoamylase activity;

(ii) the glucoamylase of SEQ ID NO: 49 herein or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 49, which has glucoamylase activity.

(iii) the glucoamylase of SEQ ID NO: 50 herein or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 50, which has glucoamylase activity;

(iv) the glucoamylase of SEQ ID NO: 51 herein or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 51, which has glucoamylase activity; and (v) the glucoamylase of SEQ ID NO: 52 herein or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 52, which has glucoamylase activity.

143. The composition of any one of paragraphs 128 to 142, further comprising a glucoamylase, wherein the glucoamylase is a blend comprising: (i) the *Talaromyces emersonii* glucoamylase of SEQ ID NO: 49 herein, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 49, which has glucoamylase activity; and (ii) the *Trametes cingulata* glucoamylase of SEQ ID NO: 48 herein, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 48, which has glucoamylase activity.

144. The composition of any one of paragraphs 128 to 142, further comprising a glucoamylase, wherein the glucoamylase is a blend comprising: (i) the *Talaromyces emersonii* glucoamylase of SEQ ID NO: 49 herein, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 49, which has glucoamylase activity; (ii) the *Trametes cingulata* glucoamylase of SEQ ID NO: 48 herein, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 48, which has glucoamylase activity; and (iii) the *Rhizomucor pusillus* alpha-amylase with *Aspergillus niger* glucoamylase linker and SBD of SEQ ID NO: 39 herein, preferably with the following substitutions: G128D+D143N, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 39, which has alpha-amylase activity.

145. The composition of any one of paragraphs 128 to 142, further comprising a glucoamylase, wherein the glucoamylase is a blend comprising:

(i) the *Gloeophyllum sepiarium* glucoamylase of SEQ ID NO: 51 herein, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 51, which has glucoamylase activity; and (ii) the *Rhizomucor pusillus* alpha-amylase with *Aspergillus niger* glucoamylase linker and SBD of SEQ ID NO: 39 herein, preferably with the following substitutions: G128D+D143N, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 39, which has alpha-amylase activity.

146. The composition of any one of paragraphs 128 to 145, further comprising a trehalase.

147. The composition of any one of paragraphs 128 to 147, further comprising a trehalase selected from the group consisting of:

(i) the *Myceliophthora sepedonium* trehalase disclosed herein as SEQ ID NO: 46 or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 46, which has trehalase activity; and (ii) the *Talaromyces funiculosus* trehalase disclosed herein as SEQ ID NO: 47, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 47, which has trehalase activity.

148. An enzyme blend according to any one of paragraphs 1 to 147.

149. An enzyme blend comprising at least one hemicellulase according to any one of paragraphs 1 to 148 and/or at least one beta-glucanase according to any one of paragraphs 1 to 148.

150. The enzyme blend of paragraphs 148 or 149, wherein the at least one hemicellulase is selected from the group consisting of the mature polypeptide of SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 53, SEQ ID NO: 54, SEQ ID NO: 55, SEQ ID NO: 56, SEQ ID NO: 57, SEQ ID NO: 58, SEQ ID NO: 59, and polypeptides having at least 60%, at least 65%, at least 70%, at least 75%, at least 80%, at least 85%, at least 90%, at least 95%, at least 96%, at least 97%, at least 98%, or at least 99% amino acid sequence identity to SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 53, SEQ ID NO: 54, SEQ ID NO: 55, SEQ ID NO: 56, SEQ ID NO: 57, SEQ ID NO: 58, or SEQ ID NO: 59; and wherein the at least one beta-glucanase is selected from the group consisting of the mature polypeptide of SEQ ID NO: 14, SEQ ID NO: 15, SEQ ID NO: 16, SEQ ID NO: 17, SEQ ID NO: 18, SEQ ID NO: 19, SEQ ID NO: 20, and polypeptides having at least 60%, at least 65%, at least 70%, at least 75%, at least 80%, at least 85%, at least 90%, at least 95%, at least 96%, at least 97%, at least 98%, or at least 99% amino acid sequence identity to SEQ ID NO: 14, SEQ ID NO: 15, SEQ ID NO: 16, SEQ ID NO: 17, SEQ ID NO: 18, SEQ ID NO: 19, or SEQ ID NO: 20.

151. The enzyme blend of any one of paragraphs 148 to 150, comprising:

(a) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity; and (b) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21, which has cellobiohydrolase activity;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23, and which has beta-glucosidase activity; and (iii) an endoglucanase I comprising amino acids 23 to 459 of SEQ ID NO: 44 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44, which has endoglucanase activity.

152. The enzyme blend of any one of paragraphs 148 to 151, comprising:

(a) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity;

(b) a xylanase comprising amino acids 28 to 417 of SEQ ID NO: 3 or amino acids 28 to 417 of SEQ ID NO: 4 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4; and (c) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21, which has cellobiohydrolase activity;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23, and which has beta-glucosidase activity; and (iii) an endoglucanase I comprising amino acids 23 to 459 of SEQ ID NO: 44 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44, which has endoglucanase activity.

153. The enzyme blend of any one of paragraphs 148 to 152, comprising:

(a) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lecanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (b) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21, which has cellobiohydrolase activity;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23, and which has beta-glucosidase activity; and (iii) an endoglucanase I comprising amino acids 23 to 459 of SEQ ID NO: 44 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44, which has endoglucanase activity.

154. The enzyme blend of any one of paragraphs 148 to 153, comprising:

(a) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity;

(b) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lecanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (c) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21, which has cellobiohydrolase activity;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23, and which has beta-glucosidase activity; and (iii) an endoglucanase I comprising amino acids 23 to 459 of SEQ ID NO: 44 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44, which has endoglucanase activity.

155. The enzyme blend of any one of paragraphs 148 to 154, comprising:

(a) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity;

(b) a xylanase comprising amino acids 28 to 417 of SEQ ID NO: 3 or amino acids 28 to 417 of SEQ ID NO: 4 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4;

(c) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lecanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (d) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21, which has cellobiohydrolase activity;

(ii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23, and which has beta-glucosidase activity; and (iii) an endoglucanase I comprising amino acids 23 to 459 of SEQ ID NO: 44 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 23 to 459 of SEQ ID NO: 44, which has endoglucanase activity.

156. The enzyme blend of any one of paragraphs 148 to 155, comprising:

(a) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity; and (b) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

157. The enzyme blend of any one of paragraphs 148 to 156, comprising:

(a) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity;

(b) a xylanase comprising amino acids 28 to 417 of SEQ ID NO: 3 or amino acids 28 to 417 of SEQ ID NO: 4 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4; and (c) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

158. The enzyme blend of any one of paragraphs 148 to 157, comprising:

(a) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lacanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (b) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

159. The enzyme blend of any one of paragraphs 148 to 158, comprising:

(a) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity;

(b) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lecanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (c) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

160. The enzyme blend of any one of paragraphs 148 to 159, comprising:

(a) a xylanase comprising amino acids 25 to 551 of SEQ ID NO: 5 or amino acids 25 to 551 of SEQ ID NO: 6, or a polypeptide having at least 60%, at least 65%, at least 70%, at least 75%, at least 80%, at least 85%, at least 90%, at least 95%, at least 96%, at least 97%, at least 98%, or at least 99% amino acid sequence identity to amino acids 25 to 551 of SEQ ID NO: 5 or amino acids 25 to 551 of SEQ ID NO: 6, which has xylanase activity;

(b) a xylanase comprising amino acids 28 to 417 of SEQ ID NO: 3 or amino acids 28 to 417 of SEQ ID NO: 4 or a polypeptide having at least 60%, at least 65%, at least 70%, at least 75%, at least 80%, at least 85%, at least 90%, at least 95%, at least 96%, at least 97%, at least 98%, or at least 99% sequence identity to amino acids 28 to 417 of SEQ ID NO: 3 or amino acids 28 to 417 of SEQ ID NO: 4;

(c) at least one beta-glucanase selected from the group consisting of:

(i) at least one GH5_15 beta-glucanase from the genus *Rasamsonia*, for example *Rasamsonia byssochlamydoides*, such as the beta-glucanase shown in amino acids 20 to 413 of SEQ ID NO: 14, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 413 of SEQ ID NO: 14;

(ii) at least one GH5_15 beta-glucanase from the genus *Trichoderma*, for example *Trichoderma atroviride*, such as the one shown in amino acids 17 to 408 of SEQ ID NO: 15 or amino acids 18 to 429 of SEQ ID NO: 16, or for example *Trichoderma harzianum*, such as the one shown in amino acids 18 to 429 of SEQ ID NO: 17, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 408 of SEQ ID NO: 15, amino acids 18 to 429 of SEQ ID NO: 16, or amino acids 18 to 429 of SEQ ID NO: 17;

(iii) at least one GH16 family beta-glucanase from the genus *Albifimbria*, for example *Albifimbria verrucaria*, such as the one shown in amino acids 20 to 286 of SEQ ID NO: 18, or from the genus *Lecanicillium*, for example *Lecanicillium* sp. WMM742, such as the one shown in amino acids 20 to 284 of SEQ ID NO: 19, or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 286 of SEQ ID NO: 18, or amino acids 20 to 284 of SEQ ID NO: 19; and (iv) at least one GH64 beta-glucanase from the genus *Trichoderma*, for example *Trichoderma harzianum*, such as the one shown in amino acids 17 to 447 or amino acids 64 to 447 of SEQ ID NO: 20, or one having at least 60%, at least 65%, at least 70%, at least 75%, at least 80%, at least 85%, at least 90%, at least 95%, at least 96%, at least 97%, at least 98%, or at least 99% sequence identity to amino acids 17 to 447 or 64 to 447 of SEQ ID NO: 20; and (d) a cellulolytic composition (e.g., derived from a strain of *Trichoderma*, such as *Trichoderma reesei*) comprising:

(i) a cellobiohydrolase I comprising amino acids 27 to 532 of SEQ ID NO: 21 or one having at least 60%, at least 65%, at least 70%, at least 75%, at least 80%, at least 85%, at least 90%, at least 95%, at least 96%, at least 97%, at least 98%, or at least 99% sequence identity to amino acids 27 to 532 of SEQ ID NO: 21;

(ii) a cellobiohydrolase II comprising amino acids 20 to 454 of SEQ ID NO: 22 or one having at least 60%, at least 65%, at least 70%, at least 75%, at least 80%, at least 85%, at least 90%, at least 95%, at least 96%, at least 97%, at least 98%, or at least 99% sequence identity to amino acids 20 to 454 of SEQ ID NO: 22;

(iii) a beta-glucosidase comprising amino acids 20 to 863 of SEQ ID NO: 23 or a variant thereof having at least one substitution selected from the group consisting of F100D, S283G, N456E, and F512Y and at least 60%, at least 65%, at least 70%, at least 75%, at least 80%, at least 85%, at least 90%, at least 95%, at least 96%, at least 97%, at least 98%, or at least 99% sequence identity to amino acids 20 to 863 of SEQ ID NO: 23; and (iv) a GH61A polypeptide having cellulolytic enhancing activity comprising amino acids 26 to 253 of SEQ ID NO: 24 or one having at least 60%, at least 65%, at least 70%, at least 75%, at least 80%, at least 85%, at least 90%, at least 95%, at least 96%, at least 97%, at least 98%, or at least 99% sequence identity to amino acids 26 to 253 of SEQ ID NO: 24.

161. The enzyme blend of any one of paragraphs 148 to 160, further comprising a glucoamylase.

162. The enzyme blend of any one of paragraphs 148 to 161, further comprising a glucoamylase selected from the group consisting of:

(i) the glucoamylase of SEQ ID NO: 48 herein or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 48, which has glucoamylase activity;

(ii) the glucoamylase of SEQ ID NO: 49 herein or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 49, which has glucoamylase activity.

(iii) the glucoamylase of SEQ ID NO: 50 herein or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 50, which has glucoamylase activity;

(iv) the glucoamylase of SEQ ID NO: 51 herein or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 51, which has glucoamylase activity; and (v) the glucoamylase of SEQ ID NO: 52 herein or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 52, which has glucoamylase activity.

163. The enzyme blend of any one of paragraphs 148 to 162, further comprising a glucoamylase, wherein the glucoamylase is a blend comprising: (i) the *Talaromyces emersonii* glucoamylase of SEQ ID NO: 49 herein, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 49, which has glucoamylase activity; and (ii) the *Trametes cingulata* glucoamylase of SEQ ID NO: 48 herein, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 48, which has glucoamylase activity.

164. The enzyme blend of any one of paragraphs 148 to 163, further comprising a glucoamylase, wherein the glucoamylase is a blend comprising: (i) the *Talaromyces emersonii* glucoamylase of SEQ ID NO: 49 herein, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 49, which has glucoamylase activity; (ii) the *Trametes cingulata* glucoamylase of SEQ ID NO: 48 herein, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 48, which has glucoamylase activity; and (iii) the *Rhizomucor pusillus* alpha-amylase with *Aspergillus niger* glucoamylase linker and SBD of SEQ ID NO: 39 herein, preferably with the following substitutions: G128D+D143N, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 39, which has alpha-amylase activity.

165. The enzyme blend of any one of paragraphs 148 to 164, further comprising a glucoamylase, wherein the glucoamylase is a blend comprising:

(i) the *Gloeophyllum sepiarium* glucoamylase of SEQ ID NO: 51 herein, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 51, which has glucoamylase activity; and (ii) the *Rhizomucor pusillus* alpha-amylase with *Aspergillus niger* glucoamylase linker and SBD of SEQ ID NO: 39 herein, preferably with the following substitutions: G128D+D143N, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 39, which has alpha-amylase activity.

166. The enzyme blend of any one of paragraphs 148 to 165, further comprising a trehalase.

167. The enzyme blend of any one of paragraphs 148 to 166, further comprising a trehalase selected from the group consisting of:

(i) the *Myceliophthora sepedonium* trehalase disclosed herein as SEQ ID NO: 46 or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 46, which has trehalase activity; and (ii) the *Talaromyces funiculosus* trehalase disclosed herein as SEQ ID NO: 47, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 47, which has trehalase activity.

168. The process, enzyme blend, or composition of any of the preceding paragraphs, further comprising an amylase blend.

169. The process, enzyme blend, or composition of any of the preceding paragraphs, further comprising an amylase blend, wherein the amylase blend comprises:

(i) the *Trametes* cingulate glucoamylase disclosed herein as SEQ ID NO: 48, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 48, which has glucoamylase activity; and (ii) a hybrid of the *Rhizomucor pusillus* alpha-amylase and *Aspergillus niger* glucoamylase linker and starch binding domain disclosed herein as SEQ ID NO: 39, or a polypeptide having at least 70% identity, at least 71% identity, at least 72% identity, at least 73% identity, at least 74% identity, at least 75% identity, at least 76% identity, at least 77% identity, at least 78% identity, at least 79% identity, at least 80% identity, at least 81% identity, at least 82% identity, at least 83% identity, at least 84% identity, at least 85% identity, at least 86% identity, at least 87% identity, at least 88% identity, at least 89% identity, at least 90% identity, at least 91% identity, at least 92% identity, at least 93% identity, at least 94% identity, at least 95% identity, at least 96% identity, at least 97% identity, at least 98% identity, or at least 99% identity to the mature polypeptide of SEQ ID NO: 39, which has alpha-amylase activity.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. In the case of conflict, the present disclosure including definitions will control. Various references are cited herein, the disclosures of which are incorporated herein by reference in their entireties. The present invention is further described by the following examples which should not be construed as limiting the scope of the invention.

Materials & Methods

GH62: GH62 family arabinofuranosidase from *Talaromyces pinophilus* disclosed in SEQ ID NO: 55.

GH43A: GH43 arabinofuranosidase from *Humicola insolens* disclosed in SEQ ID NO: 56.

GH43B: GH43 arabinofuranosidase from *Humicola insolens* disclosed in SEQ ID NO: 57.

GH51A: GH51 arabinofuranosidase from *Colletotrichum graminicola* disclosed in SEQ ID NO: 58.

GH51B: GH51 arabinofuranosidase from *Trametes hirsuta* disclosed in SEQ ID NO: 59.

Hemicellulase: Hemicellulase comprising the *Aspergillus fumigatus* xylanase of SEQ ID NO: 1 and the *Aspergillus fumigatus* beta-xylosidase of SEQ ID NO: 12.

Cellulase 1: Cellulolytic composition derived from *Trichoderma reesei* comprising: *Aspergillus fumigatus* Cel7A CBH1 disclosed as SEQ ID NO: 6 in WO2011/057140 and SEQ ID NO: 21 herein; *Aspergillus fumigatus* CBH II disclosed as SEQ ID NO: 18 in WO 2011/057140 and as SEQ ID NO: 22 herein; *Aspergillus fumigatus* beta-glucosidase (SEQ ID NO: 2 in WO 2005/047499 or SEQ ID NO: 23 herein) variant F100D, S283G, N456E, F512Y) disclosed in WO 2012/044915 or co-pending PCT application PCT/US11/054185; and GH61A polypeptide having cellulolytic enhancing activity derived from a strain of *Penicillium emersonii* (SEQ ID NO: 2 in WO 2011/041397 or SEQ ID NO: 24 herein).

Cellulase 2: Cellulolytic composition derived from *Trichoderma reesei* comprising: *Aspergillus fumigatus* Cel7A CBH1 disclosed as SEQ ID NO: 6 in WO2011/057140 and SEQ ID NO: 21 herein; *Aspergillus fumigatus* beta-glucosidase (SEQ ID NO: 2 in WO 2005/047499 or SEQ ID NO: 23 herein) variant F100D, S283G, N456E, F512Y) disclosed in WO 2012/044915 or co-pending PCT application PCT/US11/054185; and *Trichoderma reesei* endoglucanase I disclosed as SEQ ID NO: 44 herein).

Glucoamylase SA (GSA): Blend comprising *Talaromyces emersonii* glucoamylase disclosed as SEQ ID NO: 34 in WO99/28448 or SEQ ID NO: 49 herein, *Trametes* cingulate glucoamylase disclosed as SEQ ID NO: 2 in WO 06/69289 or SEQ ID NO: 48 herein, and *Rhizomucor pusillus* alpha-amylase with *Aspergillus niger* glucoamylase linker and starch binding domain (SBD) disclosed in SEQ ID NO: 39 herein having the following substitutions G128D+D143N (activity ratio in AGU:AGU:FAU-F is about 20:5:1).

Amylase Blend A (ABA): a blend of a glucoamylase from *Trametes* cingulate disclosed herein as SEQ ID NO: 48 and a hybrid of the *Rhizomucor pusillus* alpha-amylase and *Aspergillus niger* glucoamylase linker and starch binding domain, which is disclosed in WO 2006/069290 or as SEQ ID NO: 39 herein.

Xylanase (Xyl): GH5_21 xylanase from *Chryseobacterium* sp-10696 disclosed in SEQ ID NO: 5 (or 6) herein.

Xylanase (VT): GH10 xylanase from *Talaromyces leycettanus* disclosed in SEQ ID NO: 2.

GH5_21a: GH5_21 xylanase from *Chryseobacterium* sp-10696 disclosed in SEQ ID NO: 5 herein.

GH5_21b: GH5_21 xylanase from *Chryseobacterium* sp-10696 disclosed in SEQ ID NO: 6 herein.

GH5_34: GH5_34 xylanase from *Gonapodya prolifera* disclosed in SEQ ID NO: 53 herein.

GH5_35: Gh5_35 xylanase from *Paenibacillus favisporus* disclosed in SEQ ID NO: 54 herein.

GH30_8: GH30_8 xylanase from *Bacillus subtilis* disclosed in SEQ ID NO: 4 herein.

AvGH16*: Albifimbria verrucaria* GH16 family beta-glucanase disclosed in SEQ ID NO: 18 herein.

LsGH16*: Lecanicillium* sp. VMM742 GH16 family beta-glucanase disclosed in SEQ ID NO: 19 herein.

TaGH5_15a: *Trichoderma atroviride* GH5_15 family beta-glucanase disclosed in SEQ ID NO: 15 herein.

TaGH5_15c: *Trichoderma atroviride* GH5_15 family beta-glucanase disclosed in SEQ ID NO: 16 herein.

RbGH5_15*: Rasamsonia byssochlamydoides* GH5_15 family beta-glucanase disclosed in SEQ ID NO: 14 herein.

ThGH5_15: *Trichoderma harzianum* GH5_15 family beta-glucanase disclosed in SEQ ID NO: 17 herein.

ThGH64: *Trichoderma harzianum* GH64 family beta-glucanase disclosed in SEQ ID NO: 20 herein.

Beta-Glucanase Activity Assays

Beta-Glucanase Activity

Beta-glucanase activity is determined by measuring concentration of reducing sugars (RS) released by a beta-glucanase after hydrolysis of appropriate beta-glucan substrate. Activity of GH16 beta-1,3(4)-glucanases and GH64 beta-1,3-glucanases is determined using CM-Pachyman (beta-1,3-glucan, P-CM PAC, Megazyme). Activity of GH5_15 beta-1,6-glucanases and GH30_3 beta-1,6-glucanases is determined using Pustulan (beta-1,6-glucan, YP15423, Carbosynth). The RS concentration is measured using p-hydroxybenzoic acid hydrazide (PHBAH) assay adapted to a 96-well microplate format. In the assay, the reaction between reducing ends of C6 and C5 sugars and PHBAH results in a formation of hydrazones, which have intense yellow color and can be detected by absorbance measurement at 410 nm.

Enzymatic Hydrolysis of Beta-Glucan Substrate

Enzymatic hydrolysis is initiated by combining 80 ul of 2.5 g/L beta-glucan substrate, 10 ul of appropriately diluted enzyme sample, and 10 ul of 50 mM Glucono-Delta-Lactone (GDL) in a hard-shell 96-well PCR plate (HSP-9631, Bio-Rad). GDL is added to inhibit beta-glucosidase activity in an expression host background. Each incubation mixture (total volume 100 ul) includes 2 g/L substrate, enzyme, and 5 mM GDL in 50 mM Na-Acetate buffer, pH 5.0. The plate is sealed with an aluminum sealing tape (Costar #6570, Corning Inc.), and incubated in a thermocycler (Mastercycler Pro S, Eppendorf) at 50° C. for 10 min, followed by cooling down to 10° C.

Each enzyme sample is serially diluted 2-fold eight times in 50 mM sodium acetate buffer, pH 5.0 to generate protein dose profile, and each enzyme dose is typically assayed in triplicate. Each plate includes two sets of glucose standards, 0.0625-1 mM and 0.3125-5 mM. Glucose standards are prepared by diluting 10 mM stock glucose solution in 50 mM sodium acetate buffer, pH 5.0. Each glucose standard (100 ul) is treated similarly to the samples.

PHBAH Assay.

Upon completion of the enzymatic hydrolysis step, 50 ul of freshly prepared PHBAH reagent is added to each well of a microplate, bringing the total volume in each well to 150 ul. The PHBAH reagent is prepared just prior to use by dissolving 1.5% PHBAH in 2% NaOH/50 g/L Na, K Tartrate Tetrahydrate stock solution. The plate is sealed with an aluminum sealing tape (Costar #6570, Corning Inc.), and incubated in a thermocycler (Mastercycler pro S, Eppendorf) at 80° C. for 10 min, followed by cooling down to 4° C.

After the incubation, 100 ul of each well is transferred to a 96-well flat-bottom microplate (Costar #9017, Corning Inc.) using Liquidator 96 pipetting system (Rainin) or appropriate robot protocol. The absorption at 410 nm (A410) is measured using SpectraMax M5 plate reader (Molecular Devices). If any of the A410 values are greater than 2.5, the plate is additionally diluted with DDI water (typically by a factor of 5), and the A410 is read again.

RS concentration in each well (mM) is calculated using a standard glucose curve. Only A410 values that fall within the 0.05-2.5 range are included in the calculations. Specific activity of each beta-glucanase (umol RS/(min*mg protein)) is calculated from the initial slope of each protein dose response curve (mmol RS/mg protein). Only the data within a linear range of each dose response curve are included in the calculations.

Xylose Solubilization Assay

Xylanase activity, i.e., the activity of a xylanase towards defatted destarched Maize (DFDSM), can be measured by High-Performance Anion-Exchange Chromatography with Pulsed Amperometric Detection (HPAE-PAD). 2% (w/w) DFDSM suspension can be prepared in 100 mM sodium acetate, 5 mM $CaCl_2$, pH 5 and allowed to hydrate for 30 minutes at room temperature under gentle stirring. After hydration, 200 µl substrate suspension can be pipetted into a 96 well plate and mixed with 20 µl enzyme solution to obtain a final enzyme concentration of 20 PPM relative to substrate (20 µg enzyme/g substrate). The enzyme/substrate mixtures can then be left for hydrolysis in 2.5 hours at 40° C. under gentle agitation (500 RPM) in a plate incubator (Biosan PST-100 HL). After enzymatic hydrolysis, the enzyme/substrate plates can be centrifuged for 10 minutes at 3000 RPM and 50 µl supernatant (hydrolysate) is mixed with 100 µl 1.6 M HCl and transferred to 300 µl PCR tubes and left for acid hydrolysis for 40 minutes at 90° C. in a PCR machine. The purpose of the acid hydrolysis is to convert soluble polysaccharides, released by the xylanase, into mono-saccharides, which can be quantified using HPAE-PAD. Samples are neutralized with 125 µl 1.4 M NAOH after acid hydrolysis and mounted on the HPAE-PAD for mono-saccharide analysis (xylose, arabinose and glucose) (Dionex ICS-3000 using a CarboPac PA1 column). Appropriate calibration curves are made using mono-saccharides stock solutions which are subjected to the same procedure of acid hydrolysis as the samples. The percentage xylose solubilized is calculated according to the equation:

$$\%\ \text{Xylose solubilized} = \frac{\lfloor Xylose \rfloor * V * \text{MW}}{Xxyl * Msub}$$

where [xylose] denotes the concentration of xylose in the supernatant measured by HPAE-PAD, V the volume of the sample, MW, the molecular weight of internal xylose in arabino-xylan (132 g/mol), Xxyl, the fraction of xylose in DFDSM (0.102) and Msub, the mass of DFDSM in the sample.

Protease Assays

AZCL-Casein Assay

A solution of 0.2% of the blue substrate AZCL-casein is suspended in Borax/$NaH_2PO_4$ buffer pH9 while stirring. The solution is distributed while stirring to microtiter plate (100 microL to each well), 30 microL enzyme sample is added and the plates are incubated in an Eppendorf Thermomixer for 30 minutes at 45° C. and 600 rpm. Denatured enzyme sample (100° C. boiling for 20 min) is used as a blank. After incubation the reaction is stopped by transferring the microtiter plate onto ice and the coloured solution is separated from the solid by centrifugation at 3000 rpm for 5 minutes at 4° C. 60 microL of supernatant is transferred to a microtiter plate and the absorbance at 595 nm is measured using a BioRad Microplate Reader.

pNA-Assay 50 microL protease-containing sample is added to a microtiter plate and the assay is started by adding 100 microL 1 mM pNA substrate (5 mg dissolved in 100 microL DMSO and further diluted to 10 mL with Borax/$NaH_2PO_4$ buffer pH 9.0). The increase in $OD_{405}$ at room temperature is monitored as a measure of the protease activity.

Glucoamylase Activity (AGU)

Glucoamylase activity may be measured in Glucoamylase Units (AGU).

The Novo Glucoamylase Unit (AGU) is defined as the amount of enzyme, which hydrolyzes 1 micromole maltose per minute under the standard conditions 37° C., pH 4.3, substrate: maltose 23.2 mM, buffer: acetate 0.1 M, reaction time 5 minutes.

An autoanalyzer system may be used. Mutarotase is added to the glucose dehydrogenase reagent so that any alpha-D-glucose present is turned into beta-D-glucose. Glucose dehydrogenase reacts specifically with beta-D-glucose in the reaction mentioned above, forming NADH which is determined using a photometer at 340 nm as a measure of the original glucose concentration.

| AMG incubation: | |
|---|---|
| Substrate: | maltose 23.2 mM |
| Buffer: | acetate 0.1M |
| pH: | 4.30 ± 0.05 |
| Incubation temperature: | 37° C. ± 1 |
| Reaction time: | 5 minutes |
| Enzyme working range: | 0.5-4.0 AGU/mL |

| Color reaction: | |
|---|---|
| GlucDH: | 430 U/L |
| Mutarotase: | 9 U/L |
| NAD: | 0.21 mM |
| Buffer: | phosphate 0.12M; 0.15M NaCl |
| pH: | 7.60 ± 0.05 |
| Incubation temperature: | 37° C. ± 1 |
| Reaction time: | 5 minutes |
| Wavelength: | 340 nm |

A folder (EB-SM-0131.02/01) describing this analytical method in more detail is available on request from Novozymes A/S, Denmark, which folder is hereby included by reference.

Acid Alpha-Amylase Activity (AFAU)

Acid alpha-amylase activity may be measured in AFAU (Acid Fungal Alpha-amylase Units), which are determined relative to an enzyme standard. 1 AFAU is defined as the amount of enzyme which degrades 5.260 mg starch dry matter per hour under the below mentioned standard conditions.

Acid alpha-amylase, an endo-alpha-amylase (1,4-alpha-D-glucan-glucanohydrolase, E.C. 3.2.1.1) hydrolyzes alpha-1,4-glucosidic bonds in the inner regions of the starch molecule to form dextrins and oligosaccharides with different chain lengths. The intensity of color formed with iodine is directly proportional to the concentration of starch. Amylase activity is determined using reverse colorimetry as a reduction in the concentration of starch under the specified analytical conditions.

$$\underset{\substack{\lambda = 590\text{ nm}\\ \text{blue/violet}}}{\text{STARCH} + \text{IODINE}} \xrightarrow[\substack{40°,\ \text{pH } 2.5\\ t = 23\text{ sec.}}]{\text{ALPHA-AMYLASE}} \underset{\text{decoloration}}{\text{DEXTRINS} + \text{OLIGOSACCHARIDES}}$$

Standard Conditions/Reaction Conditions:

Substrate: Soluble starch, approx. 0.17 g/L
Buffer: Citrate, approx. 0.03 M
Iodine (I2): 0.03 g/L
CaCl2: 1.85 mM
pH: 2.50±0.05
Incubation temperature: 40° C.
Reaction time: 23 seconds
Wavelength: 590 nm
Enzyme concentration: 0.025 AFAU/mL
Enzyme working range: 0.01-0.04 AFAU/mL A folder EB-SM-0259.02/01 describing this analytical method in more detail is available upon request to Novozymes A/S, Denmark, which folder is hereby included by reference.

Alpha-Amylase Activity (KNU)

The alpha-amylase activity may be determined using potato starch as substrate. This method is based on the break-down of modified potato starch by the enzyme, and the reaction is followed by mixing samples of the starch/enzyme solution with an iodine solution. Initially, a blackish-blue color is formed, but during the break-down of the starch the blue color gets weaker and gradually turns into a reddish-brown, which is compared to a colored glass standard.

One Kilo Novo alpha amylase Unit (KNU) is defined as the amount of enzyme which, under standard conditions (i.e., at 37° C.+/−0.05; 0.0003 M $Ca^{2+}$; and pH 5.6) dextrinizes 5260 mg starch dry substance Merck Amylum soluble.

A folder EB-SM-0009.02/01 describing this analytical method in more detail is available upon request to Novozymes A/S, Denmark, which folder is hereby included by reference.

Determination of FAU(F)

FAU(F) Fungal Alpha-Amylase Units (Fungamyl) is measured relative to an enzyme standard of a declared strength.

| Reaction conditions | |
|---|---|
| Temperature | 37° C. |
| pH | 7.15 |
| Wavelength | 405 nm |
| Reaction time | 5 min |
| Measuring time | 2 min |

A folder (EB-SM-0216.02) describing this standard method in more detail is available on request from Novozymes A/S, Denmark, which folder is hereby included by reference.

Determination of Pullulanase Activity (NPUN)

Endo-pullulanase activity in NPUN is measured relative to a Novozymes pullulanase standard. One pullulanase unit (NPUN) is defined as the amount of enzyme that releases 1 micro mol glucose per minute under the standard conditions (0.7% red pullulan (Megazyme), pH 5, 40° C., 20 minutes). The activity is measured in NPUN/ml using red pullulan.

1 mL diluted sample or standard is incubated at 40° C. for 2 minutes. 0.5 mL 2% red pullulan, 0.5 M KCl, 50 mM citric acid, pH 5 are added and mixed. The tubes are incubated at 40° C. for 20 minutes and stopped by adding 2.5 ml 80% ethanol. The tubes are left standing at room temperature for 10-60 minutes followed by centrifugation 10 minutes at 4000 rpm. OD of the supernatants is then measured at 510 nm and the activity calculated using a standard curve.

The present invention is described in further detail in the following examples which are offered to illustrate the present invention, but not in any way intended to limit the scope of the invention as claimed. All references cited herein are specifically incorporated by reference for that which is described therein.

EXAMPLES

Example 1

Stability of Alpha-Amylase Variants

The stability of a reference alpha-amylase (*Bacillus stearothermophilus* alpha-amylase with the mutations I181*+G182*+N193F truncated to 491 amino acids (using SEQ ID NO: 126 for numbering)) and alpha-amylase variants thereof was determined by incubating the reference alpha-amylase and variants at pH 4.5 and 5.5 and temperatures of 75° C. and 85° C. with 0.12 mM $CaCl_2$ followed by residual activity determination using the EnzChek® substrate (EnzChek® Ultra Amylase assay kit, E33651, Molecular Probes).

Polypeptide enzyme samples were diluted to working concentrations of 0.5 and 1 or 5 and 10 ppm (micrograms/ml) in enzyme dilution buffer (10 mM acetate, 0.01% Triton X100, 0.12 mM $CaCl_2$, pH 5.0). Twenty microliters enzyme sample was transferred to 48-well PCR MTP and 180 microliters stability buffer (150 mM acetate, 150 mM MES, 0.01% Triton X100, 0.12 mM $CaCl_2$, pH 4.5 or 5.5) was added to each well and mixed. The assay was performed using two concentrations of enzyme in duplicates. Before incubation at 75° C. or 85° C., 20 microliters was withdrawn and stored on ice as control samples. Incubation was performed in a PCR machine at 75° C. and 85° C. After incubation samples were diluted to 15 ng/mL in residual activity buffer (100 mM Acetate, 0.01% Triton X100, 0.12 mM $CaCl_2$, pH 5.5) and 25 microliters diluted enzyme was transferred to black 384-MTP. Residual activity was determined using the EnzChek substrate by adding 25 microliters substrate solution (100 micrograms/ml) to each well. Fluorescence was determined every minute for 15 minutes using excitation filter at 485-P nm and emission filter at 555 nm (fluorescence reader is Polarstar, BMG). The residual activity was normalized to control samples for each setup.

Assuming logarithmic decay half life time (T½ (min)) was calculated using the equation: T½ (min)=T(min)*LN (0.5)/LN(% RA/100), where T is assay incubation time in minutes, and % RA is % residual activity determined in assay.

Using this assay setup the half life time was determined for the reference alpha-amylase and variant thereof as shown in Table 1.

TABLE 1

| Mutations | T½ (min) (pH 4.5, 75° C., 0.12 mM $CaCl_2$) | T½ (min) (pH 4.5, 85° C., 0.12 mM $CaCl_2$) | T½ (min) (pH 5.5, 85° C., 0.12 mM $CaCl_2$) |
|---|---|---|---|
| Reference Alpha-Amylase A | 21 | 4 | 111 |
| Reference Alpha-Amylase A with the substitution V59A | 32 | 6 | 301 |
| Reference Alpha-Amylase A with the substitution V59E | 28 | 5 | 230 |
| Reference Alpha-Amylase A with the substitution V59I | 28 | 5 | 210 |
| Reference Alpha-Amylase A with the substitution V59Q | 30 | 6 | 250 |
| Reference Alpha-Amylase A with the substitutions V59A + Q89R + G112D + E129V + K177L + R179E + K220P + N224L + Q254S | 149 | 22 | ND |
| Reference Alpha-Amylase A with the substitutions V59A + Q89R + E129V + K177L + R179E + H208Y + K220P + N224L + Q254S | >180 | 28 | ND |
| Reference Alpha-Amylase A with the substitutions V59A + Q89R + E129V +K177L + R179E + K220P + N224L + Q254S + D269E + D281N | 112 | 16 | ND |
| Reference Alpha-Amylase A with the substitutions V59A + Q89R + E129V + K177L + R179E + K220P + N224L + Q254S + I270L | 168 | 21 | ND |
| Reference Alpha-Amylase A with the substitutions V59A + Q89R + E129V + K177L + R179E + K220P + N224L + Q254S + H274K | >180 | 24 | ND |
| Reference Alpha-Amylase A with the substitutions V59A + Q89R + E129V + K177L + R179E + K220P + N224L + Q254S + Y276F | 91 | 15 | ND |
| Reference Alpha-Amylase A with the substitutions | 141 | 41 | ND |

TABLE 1-continued

| Mutations | T½ (min) (pH 4.5, 75° C., 0.12 mM $CaCl_2$) | T½ (min) (pH 4.5, 85° C., 0.12 mM $CaCl_2$) | T½ (min) (pH 5.5, 85° C., 0.12 mM $CaCl_2$) |
|---|---|---|---|
| V59A + E129V + R157Y + K177L + R179E + K220P + N224L + S242Q + Q254S | | | |
| Reference Alpha-Amylase A with the substitutions V59A + E129V + K177L + R179E + H208Y + K220P + N224L + S242Q + Q254S | >180 | 62 | ND |
| Reference Alpha-Amylase A with the substitutions V59A + E129V + K177L + R179E + K220P + N224L + S242Q + Q254S | >180 | 49 | >480 |
| Reference Alpha-Amylase A with the substitutions V59A + E129V + K177L + R179E + K220P + N224L + S242Q + Q254S + H274K | >180 | 53 | ND |
| Reference Alpha-Amylase A with the substitutions V59A + E129V + K177L + R179E + K220P + N224L + S242Q + Q254S + Y276F | >180 | 57 | ND |
| Reference Alpha-Amylase A with the substitutions V59A + E129V + K177L + R179E + K220P + N224L + S242Q + Q254S + D281N | >180 | 37 | ND |
| Reference Alpha-Amylase A with the substitutions V59A + E129V + K177L + R179E + K220P + N224L + S242Q + Q254S + M284T | >180 | 51 | ND |
| Reference Alpha-Amylase A with the substitutions V59A + E129V + K177L + R179E + K220P + N224L + S242Q + Q254S + G416V | >180 | 45 | ND |
| Reference Alpha-Amylase A with the substitutions V59A + E129V + K177L + R179E + K220P + N224L + Q254S | 143 | 21 | >480 |
| Reference Alpha-Amylase A with the substitutions V59A + E129V + K177L + R179E + K220P + N224L + Q254S + M284T | >180 | 22 | ND |
| Reference Alpha-Amylase A with the substitutions A91L + M96I + E129V + K177L + R179E + K220P + N224L + S242Q + Q254S | >180 | 38 | ND |
| Reference Alpha-Amylase A with the substitutions E129V + K177L + R179E | 57 | 11 | 402 |
| Reference Alpha-Amylase A with the substitutions E129V + K177L + R179E + K220P + N224L + S242Q + Q254S | 174 | 44 | >480 |
| Reference Alpha-Amylase A with the substitutions E129V + K177L + R179E + K220P + N224L + S242Q + Q254S + Y276F + L427M | >180 | 49 | >480 |
| Reference Alpha-Amylase A with the substitutions E129V + K177L + R179E + K220P + N224L + S242Q + Q254S + M284T | >180 | 49 | >480 |
| Reference Alpha-Amylase A with the substitutions E129V + K177L + R179E + K220P + N224L + S242Q + Q254S + N376* + I377* | 177 | 36 | >480 |
| Reference Alpha-Amylase A with the substitutions E129V + K177L + R179E + K220P + N224L + Q254S | 94 | 13 | >480 |
| Reference Alpha-Amylase A with the substitutions E129V + K177L + R179E + K220P + N224L + Q254S + M284T | 129 | 24 | >480 |
| Reference Alpha-Amylase A with the substitutions E129V + K177L + R179E + S242Q | 148 | 30 | >480 |
| Reference Alpha-Amylase A with the substitutions E129V + K177L + R179V | 78 | 9 | >480 |
| Reference Alpha-Amylase A with the substitutions E129V + K177L + R179V + K220P + N224L + S242Q + Q254S | 178 | 31 | >480 |
| Reference Alpha-Amylase A with the substitutions K220P + N224L + S242Q + Q254S | 66 | 17 | >480 |
| Reference Alpha-Amylase A with the substitutions K220P + N224L + Q254S | 30 | 6 | 159 |
| Reference Alpha-Amylase A with the substitution M284T | 35 | 7 | 278 |
| Reference Alpha-Amylase A with the substitutions M284V | 59 | 13 | ND |

ND not determined

The results demonstrate that the alpha-amylase variants have a significantly greater half-life and stability than the reference alpha-amylase.

Example 2

Preparation of Protease Variants and Test of Thermostability

Strains and Plasmids

*E. coli* DH12S (available from Gibco BRL) was used for yeast plasmid rescue. pJTP000 is a *S. cerevisiae* and *E. coli* shuttle vector under the control of TPI promoter, constructed from pJC039 described in WO 01/92502, in which the *Thermoascus aurantiacus* M35 protease gene (WO 03048353) has been inserted.

*Saccharomyces cerevisiae* YNG318 competent cells: MATa Dpep4[cir+] ura3-52, leu2-D2, his 4-539 was used for protease variants expression. It is described in J. Biol. Chem. 272 (15), pp 9720-9727, 1997.

Media and Substrates

10×Basal solution: Yeast nitrogen base w/o amino acids (DIFCO) 66.8 g/l, succinate 100 g/l, NaOH 60 g/l.

SC-glucose: 20% glucose (i.e., a final concentration of 2%=2 g/100 ml)) 100 ml/l, 5% threonine 1 ml/l, 1% tryptophan 10 ml/l, 20% casamino acids 25 ml/l, 10×basal solution 100 ml/l. The solution is sterilized using a filter of a pore size of 0.20 micrometer. Agar (2%) and $H_2O$ (approx. 761 ml) is autoclaved together, and the separately sterilized SC-glucose solution is added to the agar solution.

YPD: Bacto peptone 20 g/l, yeast extract 10 g/l, 20% glucose 100 ml/l.

YPD+Zn: YPD+0.25 mM $ZnSO_4$.

PEG/LiAc solution: 40% PEG4000 50 ml, 5 M Lithium Acetate 1 ml.

96 well Zein micro titre plate:

Each well contains 200 microL of 0.05-0.1% of zein (Sigma), 0.25 mM $ZnSO_4$ and 1% of agar in 20 mM sodium acetate buffer, pH 4.5.

DNA Manipulations

Unless otherwise stated, DNA manipulations and transformations were performed using standard methods of molecular biology as described in Sambrook et al. (1989) Molecular cloning: A laboratory manual, Cold Spring Harbor lab. Cold Spring Harbor, NY; Ausubel, F. M. et al. (eds.) "*Current protocols in Molecular Biology*", John Wiley and Sons, 1995; Harwood, C. R. and Cutting, S. M. (Eds.).

Yeast Transformation

Yeast transformation was performed using the lithium acetate method. 0.5 microL of vector (digested by restriction endonucleases) and 1 microL of PCR fragments is mixed. The DNA mixture, 100 microL of YNG318 competent cells, and 10 microL of YEAST MAKER carrier DNA (Clontech) is added to a 12 ml polypropylene tube (Falcon 2059). Add 0.6 ml PEG/LiAc solution and mix gently. Incubate for 30 min at 30° C., and 200 rpm followed by 30 min at 42° C. (heat shock). Transfer to an eppendorf tube and centrifuge for 5 sec. Remove the supernatant and resolve in 3 ml of YPD. Incubate the cell suspension for 45 min at 200 rpm at 30° C. Pour the suspension to SC-glucose plates and incubate 30° C. for 3 days to grow colonies. Yeast total DNA are extracted by Zymoprep Yeast Plasmid Miniprep Kit (ZYMO research).

DNA Sequencing

*E. coli* transformation for DNA sequencing was carried out by electroporation (BIO-RAD Gene Pulser). DNA Plasmids were prepared by alkaline method (Molecular Cloning, Cold Spring Harbor) or with the Qiagen® Plasmid Kit. DNA fragments were recovered from agarose gel by the Qiagen gel extraction Kit. PCR was performed using a PTC-200 DNA Engine. The ABI PRISM™ 310 Genetic Analyzer was used for determination of all DNA sequences.

Construction of Protease Expression Vector

The *Thermoascus* M35 protease gene was amplified with the primer pair Prot F and Prot R. The resulting PCR fragments were introduced into *S. cerevisiae* YNG318 together with the pJC039 vector (described in WO 2001/92502) digested with restriction enzymes to remove the *Humicola insolens* cutinase gene.

The Plasmid in yeast clones on SC-glucose plates was recovered to confirm the internal sequence and termed as pJTP001.

Construction of Yeast Library and Site-Directed Variants

Library in yeast and site-directed variants were constructed by SOE PCR method (Splicing by Overlap Extension, see "PCR: A practical approach", p. 207-209, Oxford University press, eds. McPherson, Quirke, Taylor), followed by yeast in vivo recombination.

General Primers for Amplification and Sequencing

The primers AM34 and AM35 were used to make DNA fragments containing any mutated fragments by the SOE method together with degenerated primers (AM34+Reverse primer and AM35+forward primer) or just to amplify a whole protease gene (AM34+AM35).

| PCR reaction system: | | Conditions: |
|---|---|---|
| 48.5 microL $H_2O$ | 1 | 94° C. 2 min |
| 2 beads puRe Taq Ready-To-Go PCR (Amersham Biosciences) | 2 | 94° C. 30 sec |
| 0.5 micro L × 2 100 pmole/microL of primers | 3 | 55° C. 30 sec |
| 0.5 microL template DNA | 4 | 72° C. 90 sec |
| | 2-4 | 25 cycles |
| | 5 | 72° C. 10 min |

DNA fragments were recovered from agarose gel by the Qiagen gel extraction Kit. The resulting polypeptide fragments were mixed with the vector digest. The mixed solution was introduced into *Saccharomyces cerevisiae* to construct libraries or site-directed variants by in vivo recombination.

Relative Activity Assay

Yeast clones on SC-glucose were inoculated to a well of a 96-well micro titre plate containing YPD+Zn medium and cultivated at 28° C. for 3 days. The culture supernatants were applied to a 96-well zein micro titer plate and incubated at at least 2 temperatures (ex. 60° C. and 65° C., 70° C. and 75° C., 70° C. and 80° C.) for more than 4 hours or overnight. The turbidity of zein in the plate was measured as A630 and the relative activity (higher/lower temperatures) was determined as an indicator of thermoactivity improvement. The clones with higher relative activity than the parental variant were selected and the sequence was determined.

Remaining Activity Assay

Yeast clones on SC-glucose were inoculated to a well of a 96-well micro titre plate and cultivated at 28° C. for 3 days. Protease activity was measured at 65° C. using azo-casein (Megazyme) after incubating the culture supernatant in 20 mM sodium acetate buffer, pH 4.5, for 10 min at a certain temperature (80° C. or 84° C. with 4° C. as a reference) to determine the remaining activity. The clones with higher remaining activity than the parental variant were selected and the sequence was determined.

Azo-Casein Assay 20 microL of samples were mixed with 150 microL of substrate solution (4 ml of 12.5% azo-casein in ethanol in 96 ml of 20 mM sodium acetate, pH 4.5, containing 0.01% triton-100 and 0.25 mM $ZnSO_4$) and incubated for 4 hours or longer.

After adding 20 microL/well of 100% trichloroacetic acid (TCA) solution, the plate was centrifuge and 100 microL of supernatants were pipette out to measure A440.

Expression of Protease Variants in *Aspergillus oryzae*

The constructs comprising the protease variant genes were used to construct expression vectors for *Aspergillus*. The *Aspergillus* expression vectors consist of an expression cassette based on the *Aspergillus niger* neutral amylase II promoter fused to the *Aspergillus nidulans* triose phosphate isomerase non translated leader sequence (Pna2/tpi) and the *Aspergillus niger* amyloglucosidase terminator (Tamg). Also present on the plasmid was the *Aspergillus* selective marker amdS from *Aspergillus nidulans* enabling growth on acetamide as sole nitrogen source. The expression plasmids for protease variants were transformed into *Aspergillus* as described in Lassen et al. (2001), Appl. Environ. Microbiol. 67, 4701-4707. For each of the constructs 10-20 strains were isolated, polypeptide and cultivated in shake flasks.

Purification of Expressed Variants

1. Adjust pH of the 0.22 μm filtered fermentation sample to 4.0.
2. Put the sample on an ice bath with magnetic stirring. Add (NH4)2SO4 in small aliquots (corresponding to approx. 2.0-2.2 M $(NH4)_2SO_4$ not taking the volume increase into account when adding the compound).

3. After the final addition of (NH4)2SO4, incubate the sample on the ice bath with gentle magnetic stirring for min. 45 min.
4. Centrifugation: Hitachi himac CR20G High-Speed Refrigerated Centrifuge equipped with R20A2 rotor head, 5° C., 20,000 rpm, 30 min.
5. Dissolve the formed precipitate in 200 ml 50 mM Na-acetate pH 4.0.
6. Filter the sample by vacuum suction using a 0.22 μm PES PLUS membrane (IWAKI).
7. Desalt/buffer-exchange the sample to 50 mM Na-acetate pH 4.0 using ultrafiltration (Vivacell 250 from Vivascience equipped with 5 kDa MWCO PES membrane) overnight in a cold room. Dilute the retentate sample to 200 ml using 50 mM Na-acetate pH 4.0. The conductivity of sample is preferably less than 5 mS/cm.
8. Load the sample onto a cation-exchange column equilibrated with 50 mM Na-acetate pH 4.0. Wash unbound sample out of the column using 3 column volumes of binding buffer (50 mM Na-acetate pH 4.0), and elute the sample using a linear gradient, 0-100% elution buffer (50 mM Na-acetate+1 M NaCl pH 4.0) in 10 column volumes.
9. The collected fractions are assayed by an endo-protease assay (cf. below) followed by standard SDS-PAGE (reducing conditions) on selected fractions. Fractions are pooled based on the endo-protease assay and SDS-PAGE.

Endo-Protease Assay

1. Protazyme OL tablet/5 ml 250 mM Na-acetate pH 5.0 is dissolved by magnetic stirring (substrate: endo-protease Protazyme AK tablet from Megazyme—cat. #PRAK 11/08).
2. With stirring, 250 microL of substrate solution is transferred to a 1.5 ml Eppendorf tube. 3. 25 microL of sample is added to each tube (blank is sample buffer).
4. The tubes are incubated on a Thermomixer with shaking (1000 rpm) at 50° C. for 15 minutes.
5. 250 microL of 1 M NaOH is added to each tube, followed by vortexing.
6. Centrifugation for 3 min. at 16,100×G and 25° C.
7. 200 microL of the supernatant is transferred to a MTP, and the absorbance at 590 nm is recorded.

Results

TABLE 2

Relative activity of protease variants. Numbering of substitution(s) starts from N-terminal of the mature peptide in amino acids 1 to 177 of SEQ ID NO: 127.

| Variant | Substitution(s) | Relative activity 65° C./60° C. |
|---|---|---|
| WT | none | 31% |
| JTP004 | S87P | 45% |
| JTP005 | A112P | 43% |
| JTP008 | R2P | 71% |
| JTP009 | D79K | 69% |
| JTP010 | D79L | 75% |
| JTP011 | D79M | 73% |
| JTP012 | D79L/S87P | 86% |
| JTP013 | D79L/S87P/A112P | 90% |
| JTP014 | D79L/S87P/A112P | 88% |
| JTP016 | A73C | 52% |

TABLE 2-continued

Relative activity of protease variants. Numbering of substitution(s) starts from N-terminal of the mature peptide in amino acids 1 to 177 of SEQ ID NO: 127.

| Variant | Substitution(s) | Relative activity 65° C./60° C. |
|---|---|---|
| JTP019 | A126V | 69% |
| JTP021 | M152R | 59% |

TABLE 3

Relative activity of protease variants. Numbering of substitution(s) starts from N-terminal of the mature peptide in amino acids 1 to 177 of SEQ ID NO: 127.

| | | Relative activity | | |
|---|---|---|---|---|
| Variant | Substitution(s) and/or deletion (S) | 70° C./65° C. | 75° C./65° C. | 75° C./70° C. |
| WT | none | 59% | 17% | |
| JTP036 | D79L/S87P/D142L | 73% | 73% | |
| JTP040 | T54R/D79L/S87P | | 71% | |
| JTP042 | Q53K/D79L/S87P/I173V | | 108% | |
| JTP043 | Q53R/D79L/S87P | | 80% | |
| JTP045 | S41R/D79L/S87P | | 82% | |
| JTP046 | D79L/S87P/Q158W | | 96% | |
| JTP047 | D79L/S87P/S157K | | 85% | |
| JTP048 | D79L/S87P/D104R | | 88% | |
| JTP050 | D79L/S87P/A112P/D142L | | 88% | |
| JTP051 | S41R/D79L/S87P/A112P/D142L | | | 102% |
| JTP052 | D79L/S87P/A112P/D142L/S157K | | | 111% |
| JTP053 | S41R/D79L/S87P/A112P/D142L/S157K | | | 113% |
| JTP054 | ΔS5/D79L/S87P | | | 92% |
| JTP055 | ΔG8/D79L/S87P | | | 95% |
| JTP059 | C6R/D79L/S87P | | | 92% |
| JTP061 | T46R/D79L/S87P | | | 111% |
| JTP063 | S49R/D79L/S87P | | | 94% |
| JTP064 | D79L/S87P/N88R | | | 92% |
| JTP068 | D79L/S87P/T114P | | | 99% |
| JTP069 | D79L/S87P/S115R | | | 103% |
| JTP071 | D79L/S87P/T116V | | | 105% |
| JTP072 | N26R/D79L/S87P | | 92% | |
| JTP077 | A27K/D79L/S87P/A112P/D142L | | 106% | |
| JTP078 | A27V/D79L/S87P/A112P/D142L | | 100% | |
| JTP079 | A27G/D79L/S87P/A112P/D142L | | 104% | |

TABLE 4

Relative activity of protease variants. Numbering of substitution(s) starts from N-terminal of the mature peptide in amino acids 1 to 177 of SEQ ID NO: 127.

| | | Relative activity 75° C./ | Remaining activity | |
|---|---|---|---|---|
| Variant | Substitution(s) and/or deletion(s) | 65° C. | 80° C. | 84° C. |
| JTP082 | ΔS5/D79L/S87P/A112P/D142L | 129% | | 53% |
| JTP083 | T46R/D79L/S87P/A112P/D142L | 126% | | |
| JTP088 | Y43F/D79L/S87P/A112P/D142L | 119% | | |
| JTP090 | D79L/S87P/A112P/T124L/D142L | 141% | | |
| JTP091 | D79L/S87P/A112P/T124V/D142L | 154% | 43% | |
| JTP092 | ΔS5/N26R/D79L/S87P/A112P/D142L | | | 60% |
| JTP095 | N26R/T46R/D79L/S87P/A112P/D142L | | | 62% |

TABLE 4-continued

Relative activity of protease variants. Numbering of substitution(s) starts from N-terminal of the mature peptide in amino acids 1 to 177 of SEQ ID NO: 127.

| Variant | Substitution(s) and/or deletion(s) | Relative activity 75° C./ 65° C. | Remaining activity 80° C. | 84° C. |
|---|---|---|---|---|
| JTP096 | T46R/D79L/S87P/T116V/D142L | | | 67% |
| JTP099 | D79L/P81R/S87P/A112P/D142L | | | 80% |
| JTP101 | A27K/D79L/S87P/A112P/ T124V/D142L | | 81% | |
| JTP116 | D79L/Y82F/S87P/A112P/ T124V/D142L | | 59% | |
| JTP117 | D79L/Y82F/S87P/A112P/ T124V/D142L | | 94% | |
| JTP127 | D79L/S87P/A112P/T124V/ A126V/D142L | | 53% | |

TABLE 5

Relative activity of protease variants. Numbering of substitution(s) starts from N-terminal of the mature peptide in amino acids 1 to 177 of SEQ ID NO: 127.

| Variant | Substitutions | Relative activity 75° C./ 70° C. | 80° C./ 70° C. | 85° C./ 70° C. |
|---|---|---|---|---|
| JTP050 | D79L S87P A112P D142L | 55% | 23% | 9% |
| JTP134 | D79L Y82F S87P A112P D142L | | 40% | |
| JTP135 | S38T D79L S87P A112P A126V D142L | | 62% | |
| JTP136 | D79L Y82F S87P A112P A126V D142L | | 59% | |
| JTP137 | A27K D79L S87P A112P A126V D142L | | 54% | |
| JTP140 | D79L S87P N98C A112P G135C D142L | 81% | | |
| JTP141 | D79L S87P A112P D142L T141C M161C | 68% | | |
| JTP143 | S36P D79L S87P A112P D142L | 69% | | |
| JTP144 | A37P D79L S87P A112P D142L | 57% | | |
| JTP145 | S49P D79L S87P A112P D142L | 82% | 59% | |
| JTP146 | S50P D79L S87P A112P D142L | 83% | 63% | |
| JTP148 | D79L S87P D104P A112P D142L | 76% | 64% | |
| JTP161 | D79L Y82F S87G A112P D142L | | 30% | 12% |
| JTP180 | S70V D79L Y82F S87G Y97W A112P D142L | | 52% | |
| JTP181 | D79L Y82F S87G Y97W D104P A112P D142L | | 45% | |
| JTP187 | S70V D79L Y82F S87G A112P D142L | | 45% | |
| JTP188 | D79L Y82F S87G D104P A112P D142L | | 43% | |
| JTP189 | D79L Y82F S87G A112P A126V D142L | | 46% | |
| JTP193 | Y82F S87G S70V D79L D104P A112P D142L | | | 15% |
| JTP194 | Y82F S87G D79L D104P A112P A126V D142L | | | 22% |
| JTP196 | A27K D79L Y82F S87G D104P A112P A126V D142L | | | 18% |

TABLE 6

Relative activity of protease variants. Numbering of substitution(s) starts from N-terminal of the mature peptide in amino acids 1 to 177 of SEQ ID NO: 127.

| Variant | Substitutions | Relative activity 75° C./70° C. | 80° C./70° C. |
|---|---|---|---|
| JTP196 | A27K D79L Y82F S87G D104P A112P A126V D142L | 102% | 55% |
| JTP210 | A27K Y82F S87G D104P A112P A126V D142L | 107% | 36% |
| JTP211 | A27K D79L Y82F D104P A112P A126V D142L | 94% | 44% |
| JTP213 | A27K Y82F D104P A112P A126V D142L | 103% | 37% |

Example 3

Temperature Profile of Selected Variants Using Polypeptide Enzymes

Selected variants showing good thermo-stability were polypeptide and the polypeptide enzymes were used in a zein-BCA assay as described below. The remaining protease activity was determined at 60° C. after incubation of the enzyme at elevated temperatures as indicated for 60 min.

Zein-BCA Assay:

Zein-BCA assay was performed to detect soluble protein quantification released from zein by variant proteases at various temperatures.

Protocol:

1) Mix 10 ul of 10 ug/ml enzyme solutions and 100 ul of 0.025% zein solution in a micro titer plate (MTP).
2) Incubate at various temperatures for 60 min.
3) Add 10 ul of 100% trichloroacetic acid (TCA) solution.
4) Centrifuge MTP at 3500 rpm for 5 min.
5) Take out 15 ul to a new MTP containing 100 ul of BCA assay solution (Pierce Cat #:23225, BCA Protein Assay Kit).
6) Incubate for 30 min. at 60° C.
7) Measure A562.

The results are shown in Table 7. All of the tested variants showed an improved thermo-stability as compared to the wt protease.

TABLE 7

Zein-BCA assay

| WT/ Variant | Sample incubated 60 min at indicated temperatures (° C.) (μg/ml Bovine serum albumin equivalent peptide released) 60° C. | 70° C. | 75° C. | 80° C. | 85° C. | 90° C. | 95° C. |
|---|---|---|---|---|---|---|---|
| WT | 94 | 103 | 107 | 93 | 58 | 38 | |
| JTP050 | 86 | 101 | 107 | 107 | 104 | 63 | 36 |
| JTP077 | 82 | 94 | 104 | 105 | 99 | 56 | 31 |
| JTP188 | 71 | 83 | 86 | 93 | 100 | 75 | 53 |
| JTP196 | 87 | 99 | 103 | 106 | 117 | 90 | 38 |

Example 4

Thermostability of Protease Pfu.

The thermostability of the *Pyrococcus furiosus* protease (Pfu S) purchased from Takara Bio Inc, (Japan) was tested using the same methods as in Example 2. It was found that the thermostability (Relative Activity) was 110% at (80° C./70° C.) and 103% (90° C./70° C.) at pH 4.5.

Example 5

This example illustrates that hemicellulases, for instance an enzyme blend comprising a hemicellulase, enhances a mechanical fractionation process designed to produce a high protein feed ingredient from whole stillage in an ethanol plant. The overall goal is to increase the protein content of the high protein fraction and ideally to also increase the quantity of the high protein fraction. The specific goal of this testing was to determine whether dose impacts the quality and quantity of the high protein fraction. The substrate used in this testing was whole stillage from an ethanol plant. The enzyme blend comprised Hemicellulase and Cellulase 1 (ratio of 40%:60%) dosed at three different levels. All treatments included amylase blend ABA to hydrolyze any residual starch in the whole stillage to maximize fiber-degrading enzyme accessibility. The control was treated only with the amylase blend ABA. The enzymatic hydrolysis conditions were 50° C. and a 48-hour treatment time at a total solids of 11.7%.

The test procedure, as diagrammed in FIG. 1, was as follows:

1. The whole stillage was analyzed for protein content so that a protein mass balance could be performed.
2. The whole stillage was then aliquoted into canisters for enzyme treatment and dosed with the fiber-degrading and glucoamylase enzymes in accordance with the experimental design.
3. The canisters were placed in a piece of equipment in which the time/temperature profile can be controlled.
4. The whole stillage was enzyme-treated at 50° C. for 48 hours.
5. The whole stillage was then separated on a 200-micron vibrating screen.
6. The retentate from this initial separation was dried and analyzed for protein content.
7. The filtrate from this initial separation was centrifuged at 3500 rpm for 10 minutes. The centrate was discarded.
8. The pellet resulting from centrifugation was resuspended in tap water and centrifuged at 3500 rpm for 10 minutes.
9. The pellet resulting from this second centrifugation, which represents the high protein fraction, was dried and analyzed for protein content.

Figure 2:
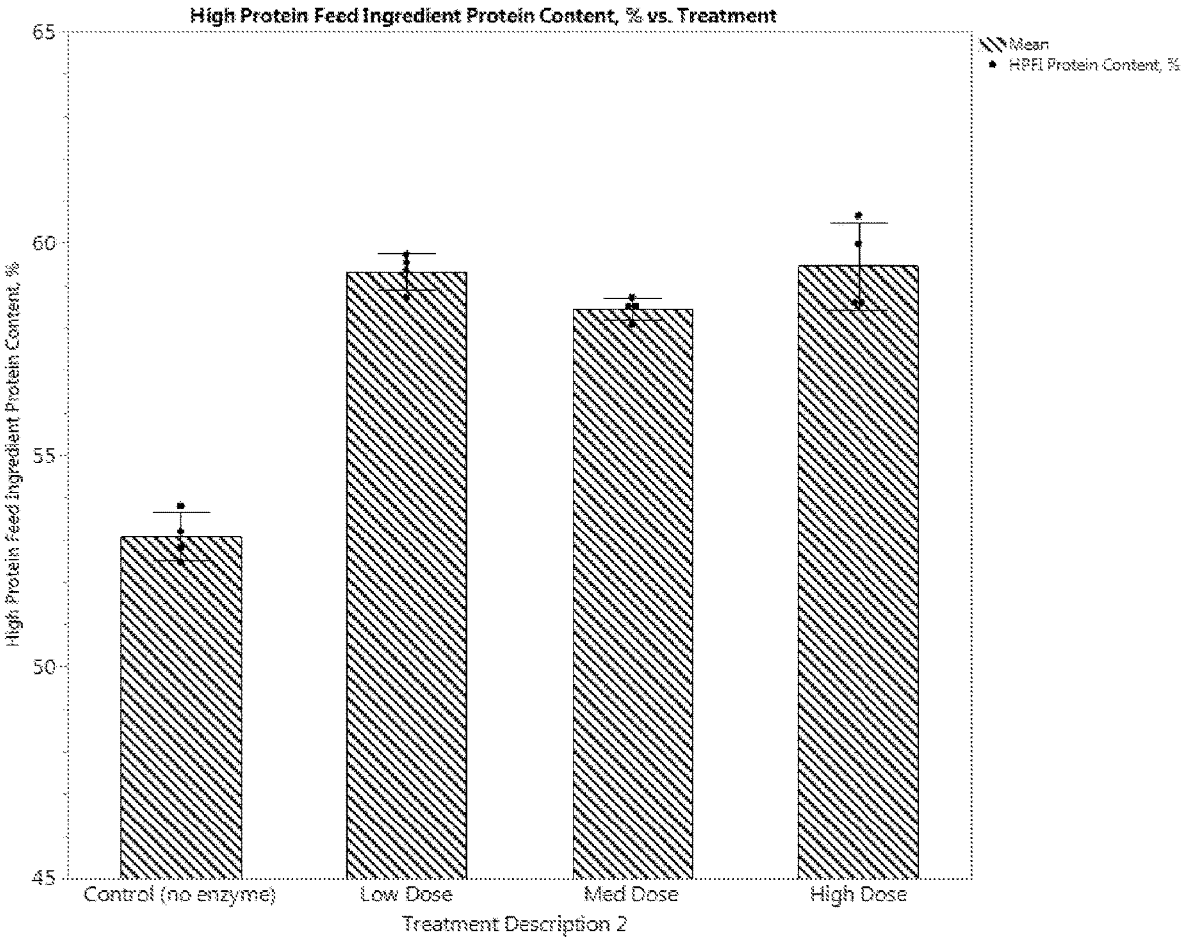
FIG. 2 is a graph showing the percentage protein content partitioned into a high protein feed ingredient upon treatment of whole stillage with low, medium, and high doses of an enzyme blend comprising a hemicellulase and cellulolytic composition, demonstrating that enzyme-treated whole stillage results in a higher protein content being partitioned into the high protein feed ingredient compared to a control whole stillage sample not treated with the enzyme blend.
Figure 3:
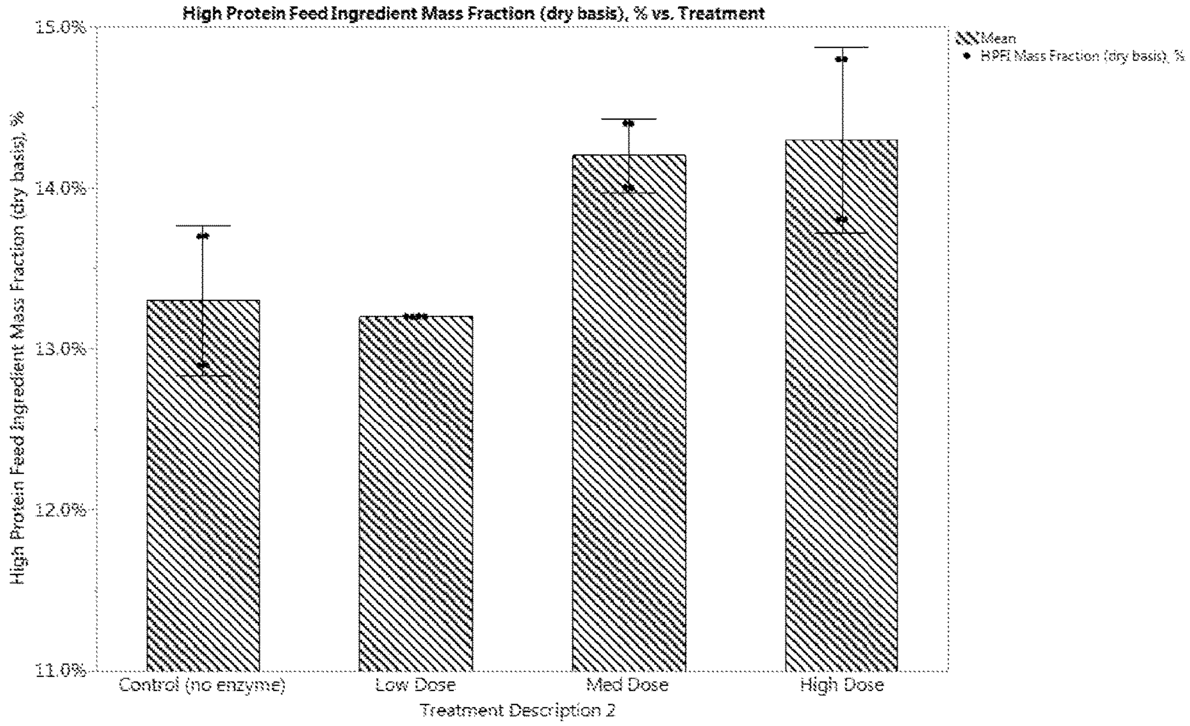
FIG. 3 is a graph showing the percentage mass fraction on a dry basis that is partitioned into a high protein feed ingredient upon treatment of whole stillage with low, medium, and high doses of an enzyme blend comprising a hemicellulase and cellulolytic composition, demonstrating that enzyme-treated whole stillage results in a higher fraction of the starting mass of the whole stillage being partitioned into the high protein feed ingredient compared to a control whole stillage sample not treated with the enzyme blend.
Figure 4:
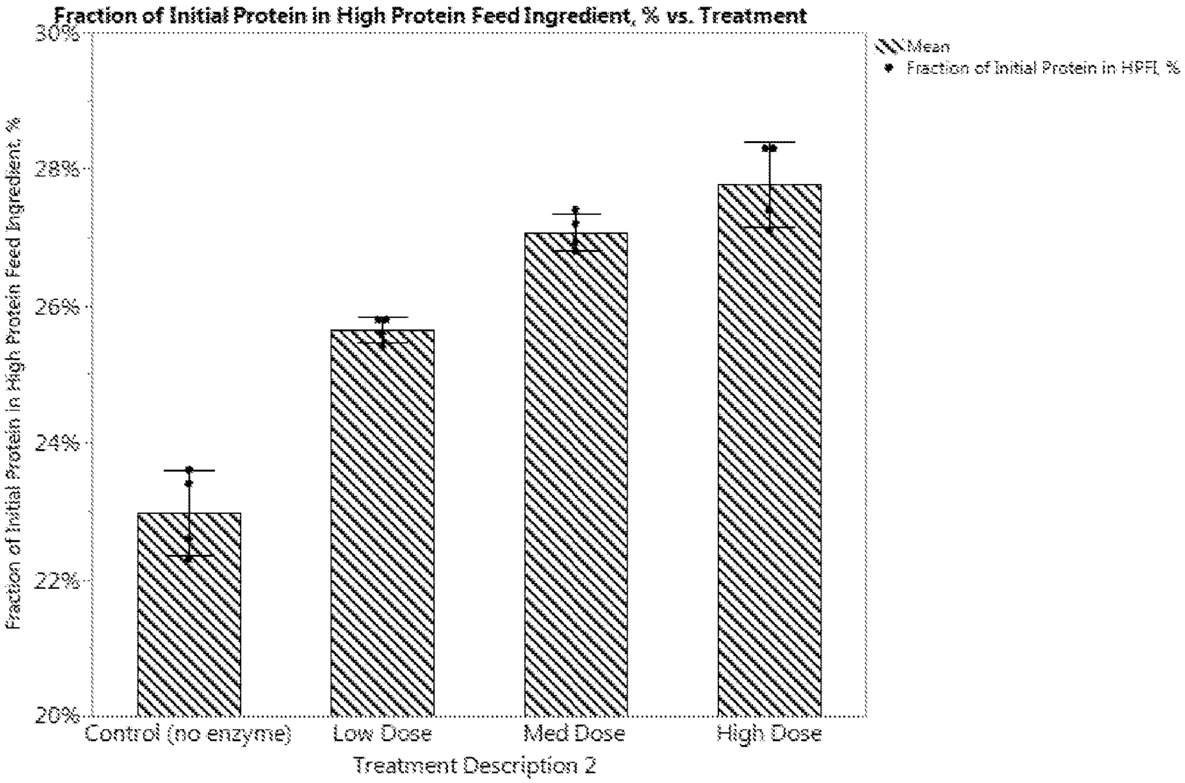
FIG. 4 is a graph showing the percentage of the fraction of the initial protein in the high protein feed ingredient after treatment of whole stillage with low, medium, and high doses of an enzyme blend comprising a hemicellulase and cellulolytic composition, demonstrating that the enzyme blend increases both the mass fraction and protein content of the high protein feed ingredient due to a greater partitioning of the initial protein in the whole stillage byproduct to the high protein feed ingredient.

The results of the testing are shown in FIG. 2, FIG. 3, and FIG. 4. As can be seen in FIG. 2, the protein content of the high protein feed ingredient increases significantly with the cellulase/hemicellulase treatment. The cellulase/hemicellulase dose does not impact protein content, the three doses cannot be distinguished statistically. As shown in FIG. 3, the amount of mass (on a dry basis) partitioned into the high protein feed ingredient also increases significantly with cellulase/hemicellulase treatment at the medium and high dose. The increased protein content and the increased mass fraction both contribute to a higher proportion of the initial protein in the thin stillage to be portioned in the high protein feed ingredient, as seen in FIG. 4.

Example 6

This example illustrates that hemicellulases, for instance an enzyme blend comprising a hemicellulase, can be used to enhance a mechanical fractionation process designed to produce a high protein co-product from whole stillage in an ethanol plant. The overall goal is to increase the protein content of the high protein fraction and ideally to also increase the quantity of the high protein fraction. The specific goal of this testing was to determine if the ratio of cellulase to hemicellulase affects the protein quality and quantity in the high protein fraction. The substrate used in this testing was whole stillage from an ethanol plant. Three different ratios of Cellulase 1 to Hemicellulase were used (100% cellulase, 75%:25% cellulase:hemicellulase, and 50%:50% cellulase:hemicellulase. All treatments included amylase blend ABA (referred to in FIG. 6, FIG. 7, FIG. 8 and FIG. 9 as AMG) to hydrolyze any residual starch in the whole stillage so as to maximize fiber-degrading enzyme accessibility. The control was treated only with amylase blend ABA. The enzymatic hydrolysis conditions were 32 C, and a 64-hour treatment time at a total solids of 11.8%.

Figure 5:
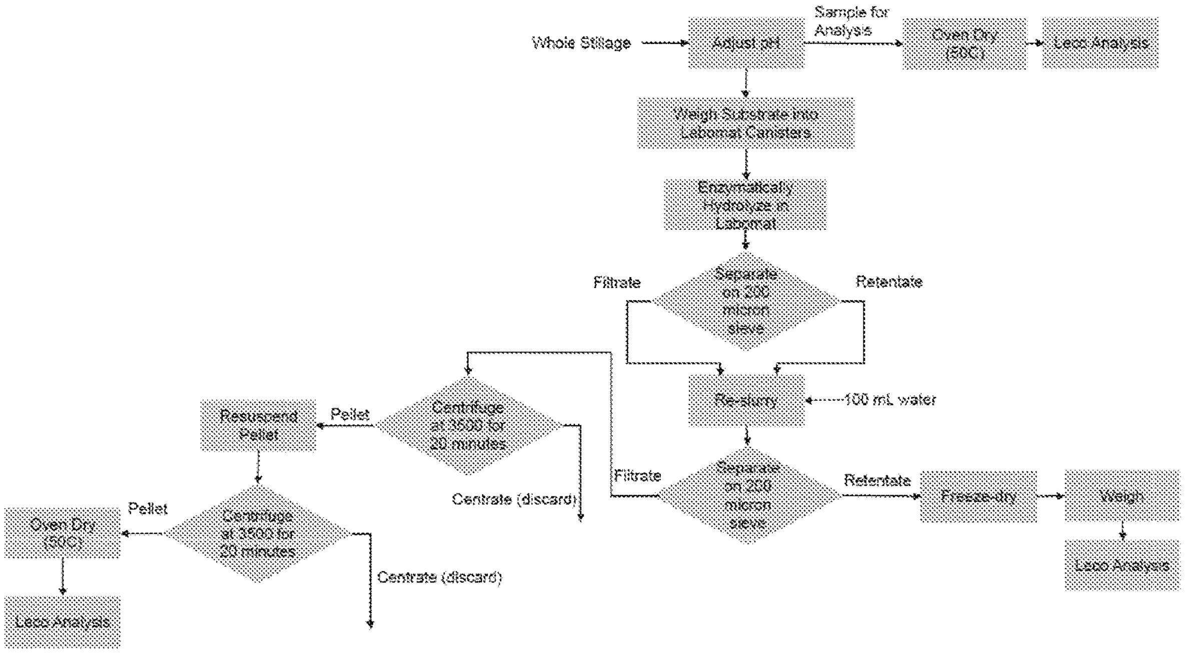
FIG. 5 is a flow diagram of an exemplary laboratory procedure used to obtain the results of the experiment described in Example 2, the results of which are shown in FIG. 6, FIG. 7, FIG. 8 and FIG. 9.

The test procedure, as diagrammed in FIG. 5, was as follows:

1. The whole stillage was analyzed for protein content so that a protein mass balance could be performed.
2. The whole stillage was then aliquoted into canisters for enzyme treatment and dosed with the enzymes in accordance with the experimental design.
3. The canisters were placed in a piece of equipment in which the time/temperature profile can be controlled. The whole stillage was enzyme-treated at 32 C for 64 hours.
4. The whole stillage was then separated on a 200-micron vibrating screen.
5. To simulate a washing step, the filtrate plus approximately an equal volume of water was used to re-slurry the retentate and the resulting slurry was separated again on a 200-micron vibrating screen.
6. The retentate was dried and analyzed for protein content.
7. The filtrate from was centrifuged at 3500 rpm for 10 minutes. The centrate was discarded.
8. The pellet resulting from centrifugation was resuspended in tap water and centrifuged at 3500 rpm for 10 minutes.
9. The pellet resulting from this second centrifugation, which represents the high protein fraction, was dried and analyzed for protein content.

Figure 6:
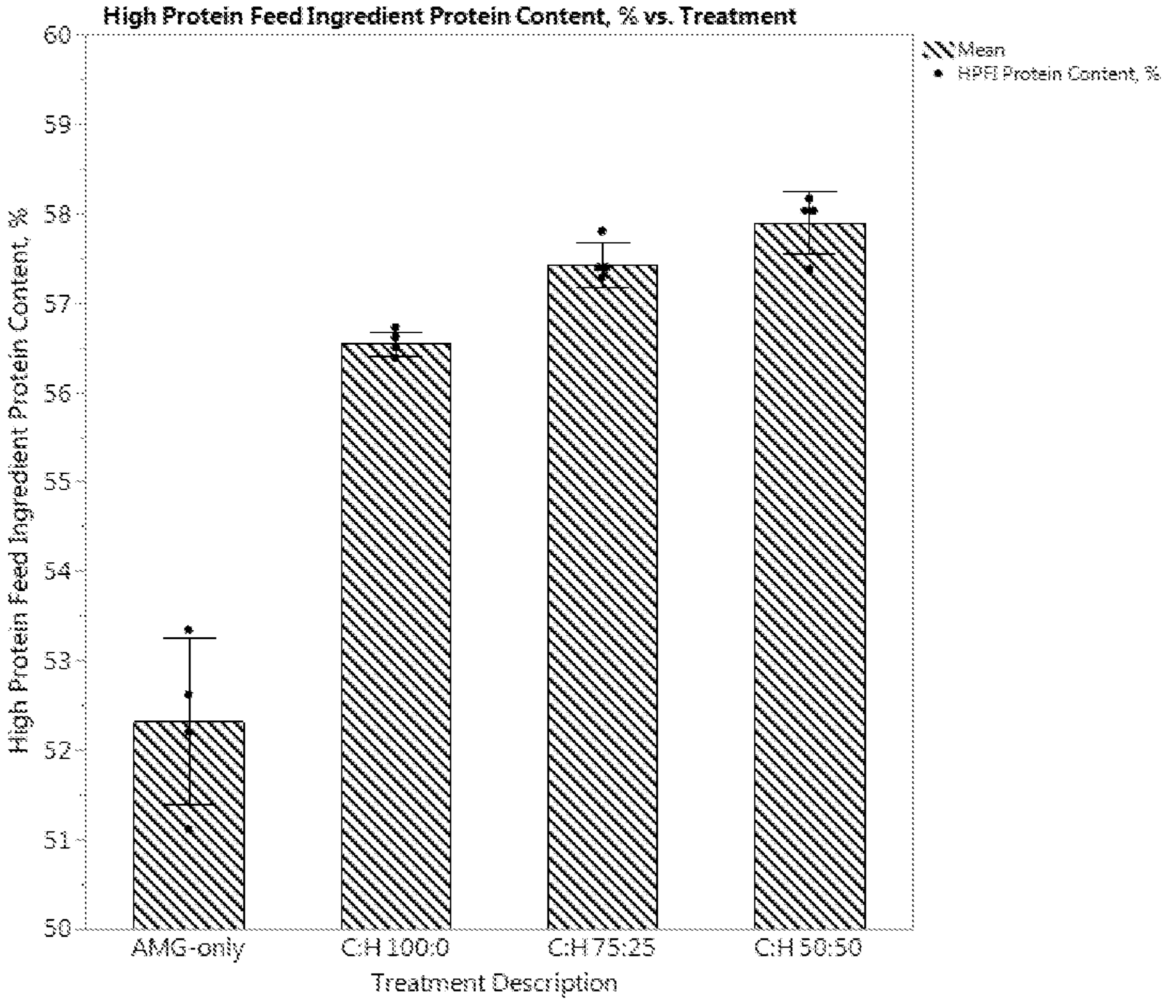
FIG. 6 is a graph demonstrating that a cellulolytic composition increases the amount of initial protein from the whole stillage byproduct that is partitioned to the high protein feed ingredient instead of being retained in the wet cake fraction, and that an enzyme blend comprising a hemicellulase and cellulolytic composition increases the amount of partitioned protein beyond that of the cellulolytic composition alone.
Figure 7:
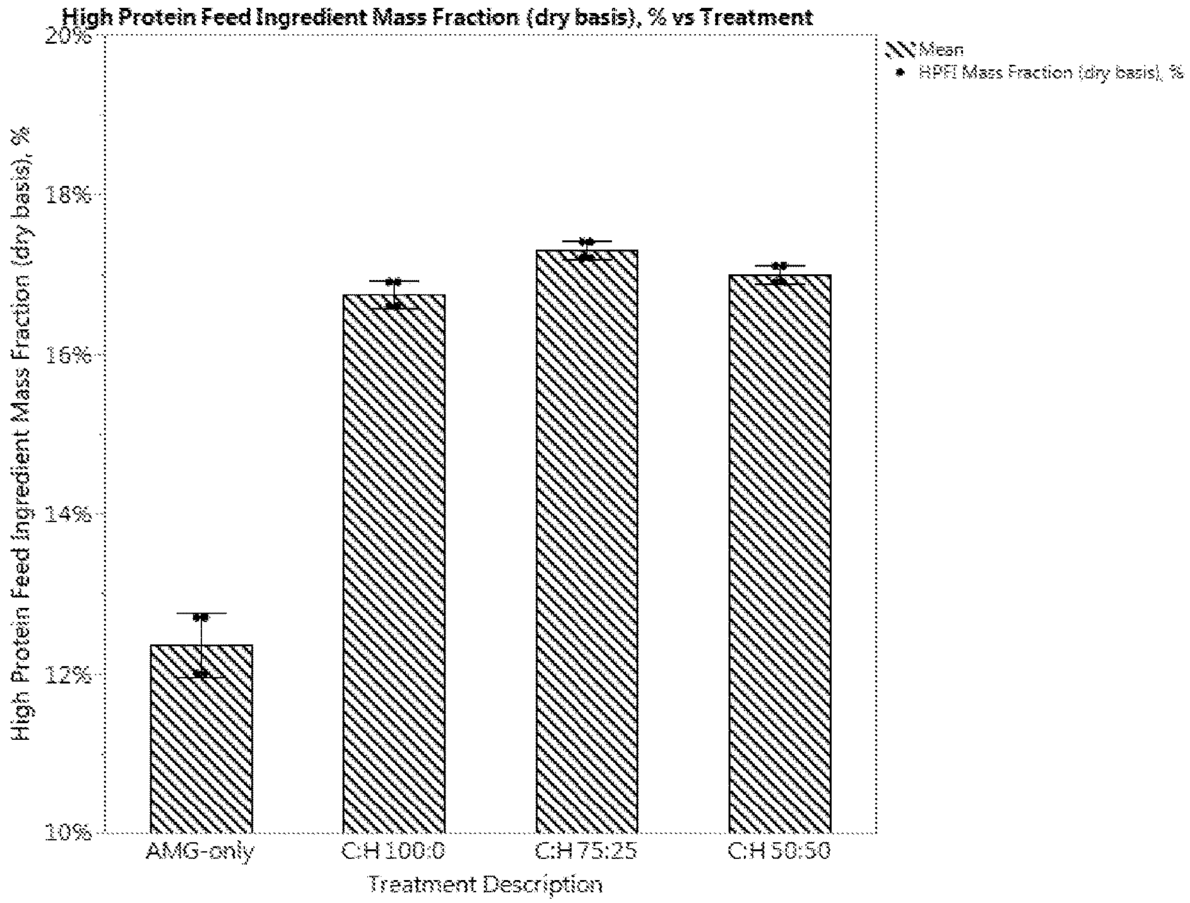
FIG. 7 is a graph demonstrating that a cellulolytic composition increases the mass fraction of the high protein feed ingredient, and that an enzyme blend comprising a hemicellulase and cellulolytic composition increases the mass fraction beyond that of the cellulolytic composition alone.
Figure 8:
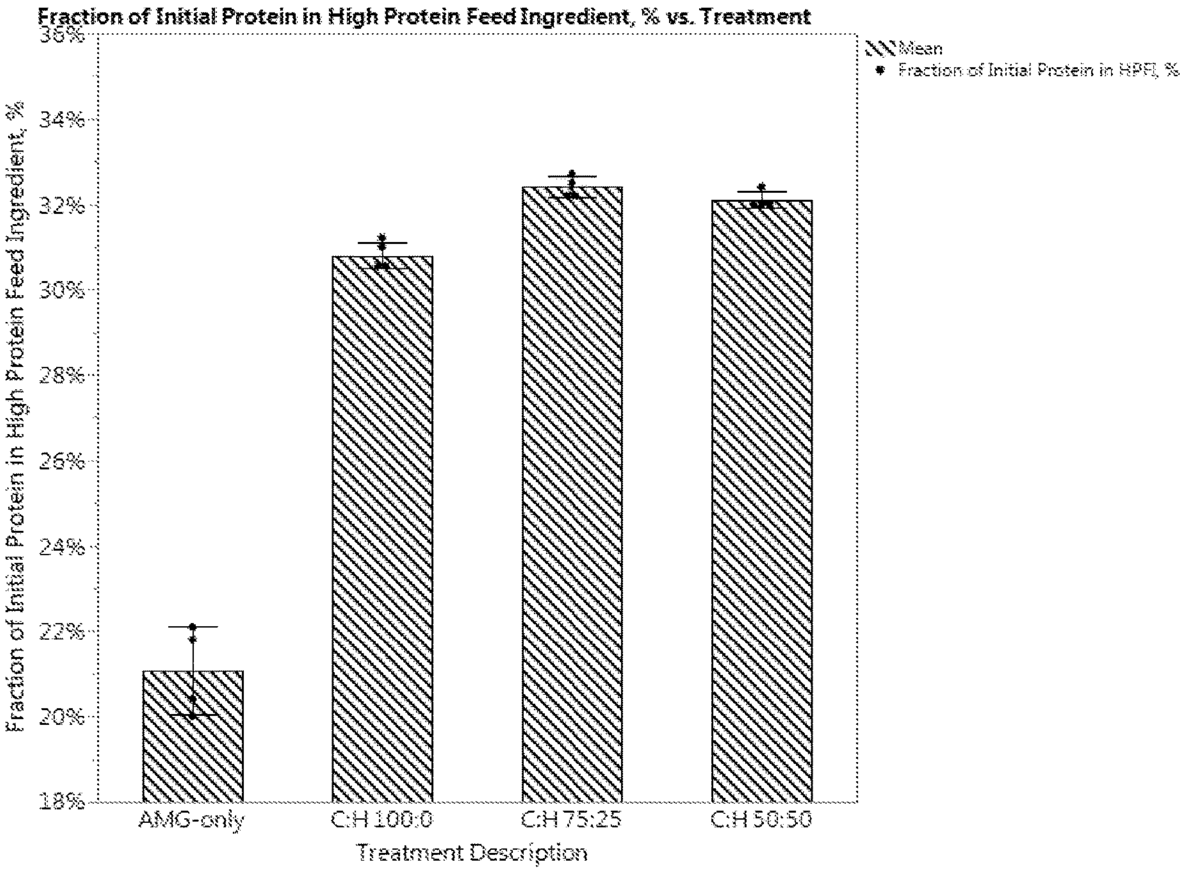
FIG. 8 is a graph demonstrating that a cellulolytic composition increases both the mass fraction and protein content of the high protein feed ingredient due to a greater partitioning of the initial protein in the whole stillage byproduct to the high protein feed ingredient, and that an enzyme blend comprising a hemicellulase and cellulolytic composition increases the mass fraction and the protein content beyond that of the cellulolytic composition alone.
Figure 9:
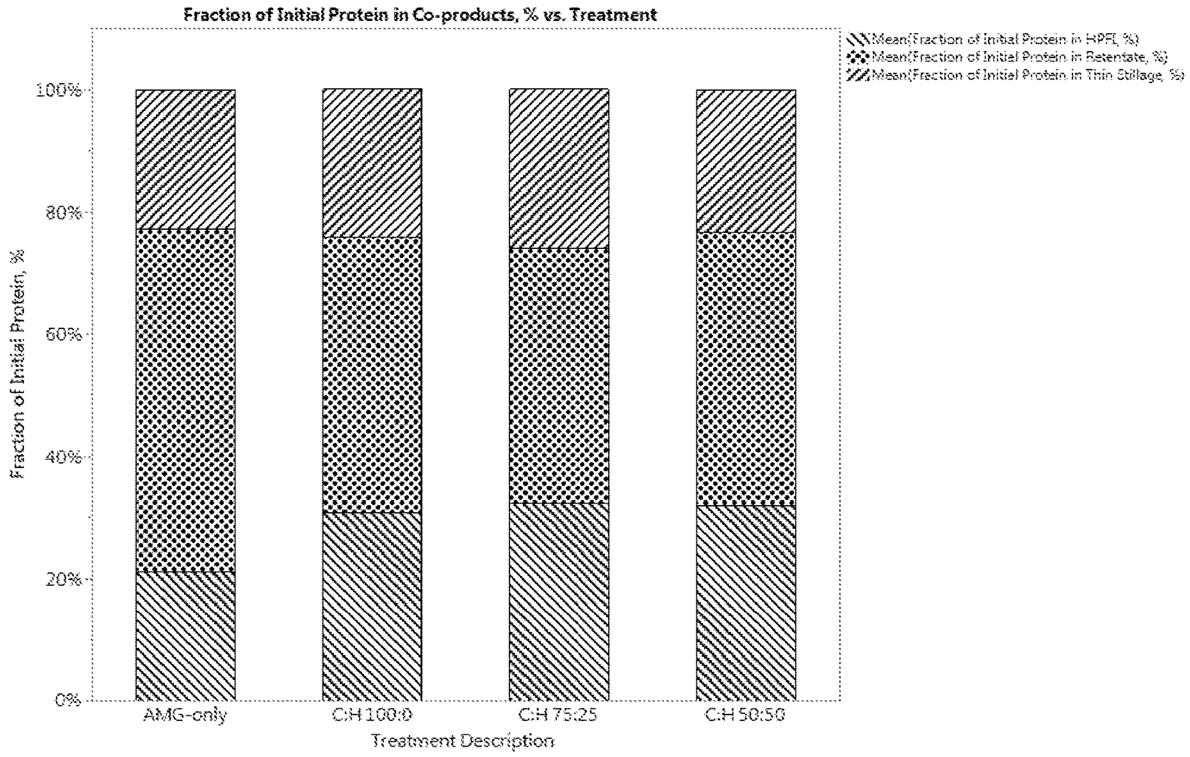
FIG. 9 is a graph demonstrating that the increase in protein in the high protein feed ingredient is primarily coming from a decrease in the protein that is retained in the wet cake fraction, whereas the fraction of protein in the thin stillage is relatively constant.

The results of the testing are shown in FIG. 6, FIG. 7, FIG. 8 and FIG. 9. As can be seen in FIG. 6, the protein content of the high protein feed ingredient increases significantly with the cellulase-only treatment. The protein content is further enhanced with increasing hemicellulase percentage in the enzyme blend. As shown in FIG. 7, the amount of mass (on a dry basis) partitioned into the high protein feed ingredient is greater for all three cellulase:hemicellulase ratios. By a small margin, the 75%:25% cellulase:hemicellulase ratio results in the highest high protein feed ingredient mass fraction. As can be seen in FIG. 8, both the 75%:25% cellulase:hemicellulase ratio and the 50%:50% cellulase:hemicellulase ratio result in a statistically greater amount of the initial protein portioned in the high protein feed ingredient than the cellulase-only treatment. FIG. 9 shows that the increased protein in the high protein feed ingredient is drawn primarily from the wet cake. In other words, the cellulase/hemicellulase treatments result in a diversion of protein from the wet cake to the high protein feed ingredient.

Example 7

This example illustrates that beta-glucanses, for instance an enzyme blend comprising a cellulase, xylanase, and beta-glucanase, enhance a mechanical fractionation process designed to produce a high protein feed ingredient from whole stillage in an ethanol plant. The overall goal is to increase the protein content of the high protein fraction, as well as to increase the quantity of the high protein fraction. Testing was done to determine whether beta-glucanases can increase the protein content of the high protein fraction. The substrate used in this testing was whole stillage from an ethanol plant. Testing was done with six enzyme blends each comprising the same cellulose and a xylanase blend comprising a GH5_21 xylanase and a GH30_8 xylanase and a GH5_21 xylanase, and a different beta-glucanase. Each enzyme blend comprised Cellulase 1, Xyl (GH30_8 and GH5_21a xylanases), and beta-glucanase (a different one of AvGH16, LsGH16, TaGH5_15a, RbGH5_15, ThGH5_15, and ThGH64) in a ratio of 6:2:1, respectively, on an enzyme protein basis. The control was treated only with a blend of cellulase and xylanase at the same ratio found in the experimental treatments and at a total enzyme protein dose equivalent to the experimental treatments. The enzymatic hydrolysis conditions were 32° C. and a 72-hour treatment time at a total solids of 12.7%.

The test procedure, was as follows:

1. The pH of the whole stillage was adjusted to pH 5
2. Approximately 14 g of the whole stillage substrate was added to Nalgene™ Oak Ridge High-Speed Centrifuge Tubes
3. Enzymes, water and penicillin were added to the tubes in accordance with the experimental design
4. The tubes were placed in an oven and incubated at 32° C. for 72 hours
5. After incubation, the tubes were heated to 85 C and the fiber-rich particles were separated out with a cell strainer with a mesh opening size of 200 microns
6. The fiber-rich retentate was rinsed with an additional 20 mL of water
7. The filtrate was centrifuged at 3500 rpm for 10 minutes to separate out a protein-rich pellet (the high protein feed ingredient)
8. The centrate was decanted and the pellet resuspend in 25 mL of water
9. The resuspended pellet was again centrifuged at 3500 rpm for 10 minutes
10. The centrate was decanted and the pellet placed in a freeze dryer
11. Once dry, the pellets were ground and homogenized
12. The protein content of the ground, homogenized pellets were measured with a Leco nitrogen/protein analyzer.

Figure 10:
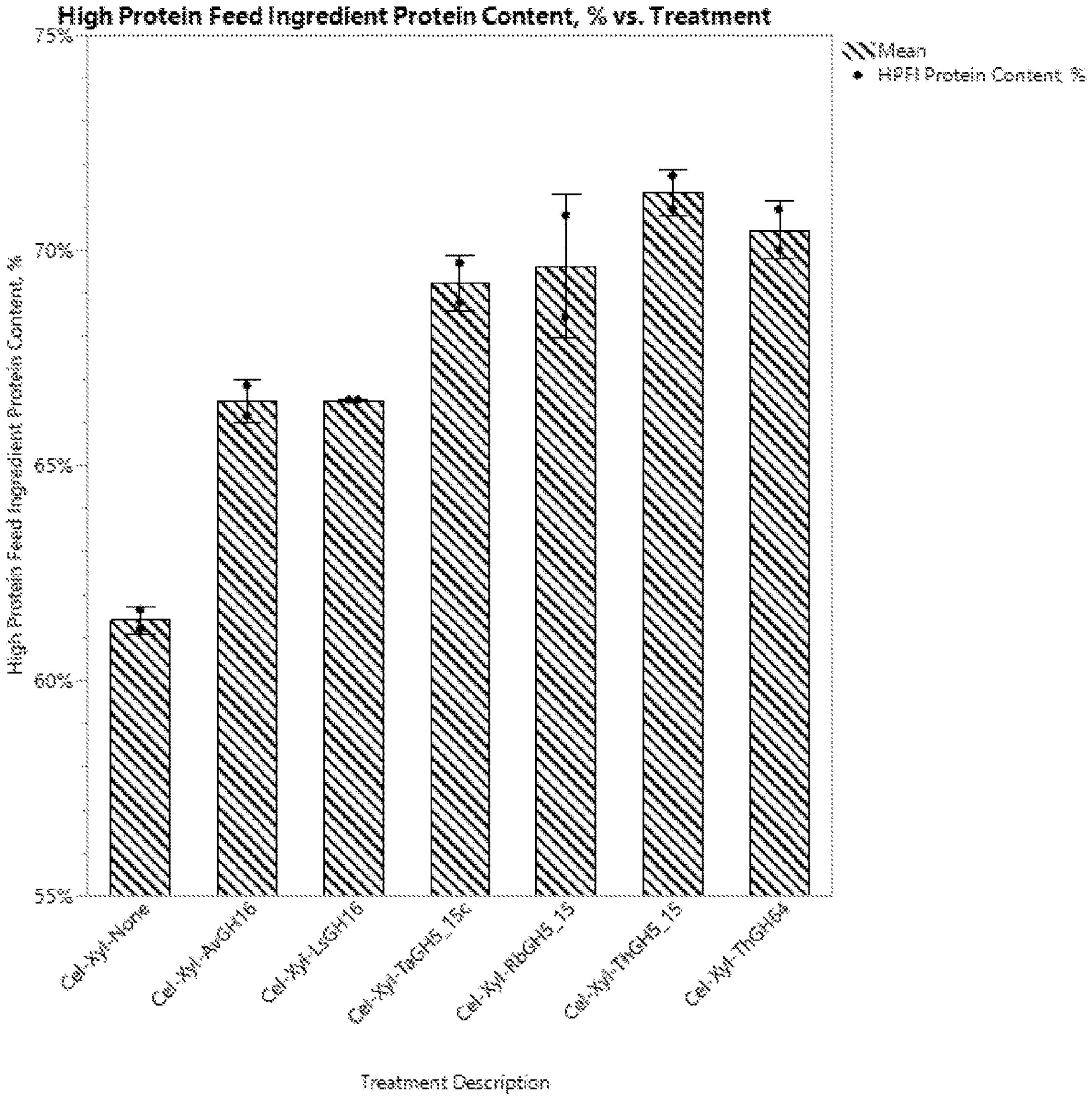
FIG. 10 is a graph showing the results of the experiments described in Example 7, which demonstrates that the addition of various beta-glucanases to the enzyme blend results in a significantly higher protein content in the high protein feed ingredient than the control (blend of only cellulase and xylanase). All the beta-glucanases tested in this experiment significantly improved the protein content of the high protein feed ingredient.

The results of the testing are shown in FIG. 10. As can be seen in FIG. 10, the addition of beta-glucanases to the enzyme blend results in a significantly higher protein content in the high protein feed ingredient than the control (blend of only cellulase and xylanase). All the beta-glucanases tested in this experiment significantly improved the protein content of the high protein feed ingredient.

Example 8

This example illustrates that xylanases, for instance an enzyme blend comprising a cellulase and xylanase, enhance a mechanical fractionation process designed to produce a high protein feed ingredient from whole stillage in an ethanol plant. The overall goal is to increase the protein content of the high protein fraction, as well as to increase the quantity of the high protein fraction. Testing was done to determine whether xylanases can increase the protein content of the high protein fraction. The substrate used in this test was mash from an ethanol plant. Unlike tests where the enzymes were applied to whole stillage, in this experiment, the cellulases and xylanases were added to the fermentation process. The enzyme blend comprised Cellulase 1 and Xyl (GH5_21 b) in a 3:1 ratio on an enzyme protein basis on top of glucoamylase blend GSA. Two controls were used in this experiment, a Cellulase 1-only control on top of glucoamylase blend GSA, and a control with neither cellulase nor xylanase, just glucoamylase blend GSA. The cellulase-only control was dosed at the same enzyme protein loading as that of the blend of cellulase and xylanase. The fermentation conditions were 32° C. and a 72-hour treatment time at a total solids of 33.4%.

The test procedure, was as follows:

1. Mash pH was adjusted to pH 5
2. Urea and penicillin were added to bulk mash in accordance with experimental design
3. 75 g of mash was added to each 250 mL fermentation bottle
4. Water, the enzymes, and yeast were added to fermentation bottles in accordance with experimental design
5. Fermentation bottles were capped using lids with holes
6. Fermentation bottles were placed in an environmental chamber with shaking at 32 C for 72 hours
7. Bottles were heated to 85° C.
8. Contents of bottles were poured into a 3" diameter, 212-micron opening sieve to separate out the fiber-rich particles and collect the filtrate
9. Fiber-rich particles were washed by re-slurrying twice with 20 mL of water and collecting the additional filtrate
10. Filtrate was centrifuged at 3500 rpm for 10 minutes
11. Pellets were resuspended in water and centrifuged again at 3500 rpm for 10 minutes
12. Pellets were place in freeze dryer
13. Once dry, the pellets were ground and homogenized
14. The protein content of the ground, homogenized pellets were measured with a Leco nitrogen/protein analyzer.

Figure 11:
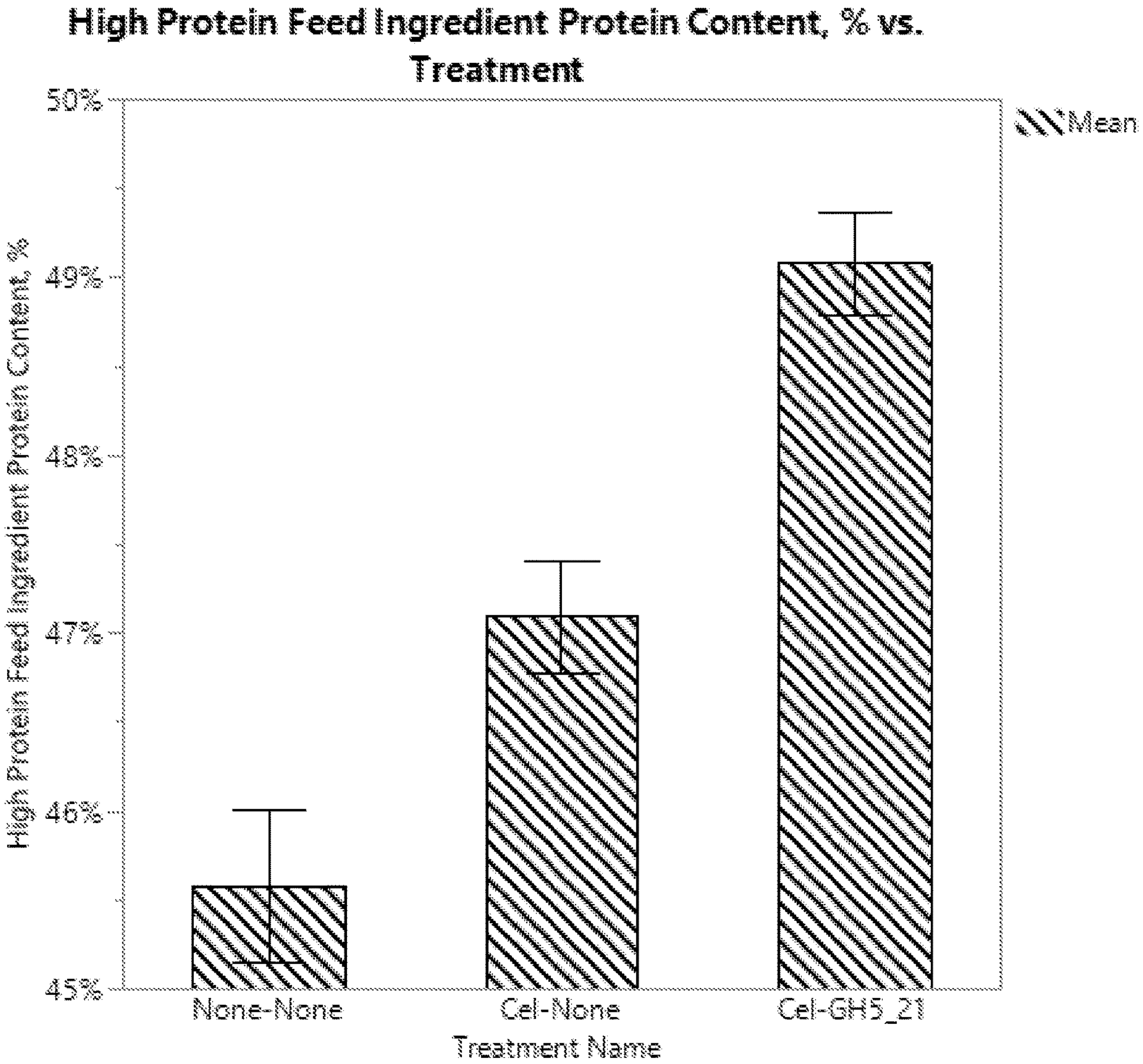
FIG. 11 is a graph showing the results of the experiments described in Example 8, which demonstrates that the addition of xylanase, for example a GH5_21 xylanase, to a background of cellulase results in a significantly higher protein content in the high protein feed ingredient than the cellulase-only control. The treatment with cellulase-only and the treatment with the blend of cellulase and xylanase both outperformed the second control, which was treated with neither cellulase nor xylanase.

The results of the testing are shown in FIG. 11. As can be seen in FIG. 11, the addition of xylanase, for example a GH5_21 xylanase, to a background of cellulase results in a significantly higher protein content in the high protein feed ingredient than the cellulase-only control. The treatment with cellulase-only and the treatment with the blend of cellulase and xylanase both outperformed the second control, which was treated with neither cellulase nor xylanase.

Example 9

This example illustrates that arabinofuranosidases, for instance an enzyme blend comprising a cellulase, xylanase, beta-glucanase, and arabinofuranosidase enhance a mechanical fractionation process designed to produce a high protein feed ingredient from whole stillage in an ethanol plant. The overall goal is to increase the protein content of the high protein fraction, as well as to increase the quantity of the high protein fraction. Testing was to determine whether arabinofuranosidases can increase the protein content of the high protein fraction. The substrate used in this testing was whole stillage from an ethanol plant. Each enzyme blend comprised the arabinofuranosidase (GH43A or GH51A) to be evaluated in a background of Cellulase 1, Xyl (GH5_21 b), and TaGH5_15a. The control was a blend of cellulase, xylanase, and beta-glucanase but without the arabinofuranosidase. The control was dosed at the same enzyme protein loading as that of the experimental treatment blend of cellulase, xylanase, beta-glucanase, and arabinofuranosidase. The enzymatic hydrolysis conditions were 32° C. and a 72-hour treatment time at a total solids of 12.7%.

The test procedure, was as follows:

1. The pH of the whole stillage was adjusted to pH 5
2. Approximately 14 g of the whole stillage substrate was added to Nalgene™ Oak Ridge High-Speed Centrifuge Tubes
3. Enzymes, water and penicillin were added to the tubes in accordance with the experimental design
4. The tubes were placed in an oven and incubated at 32° C. for 72 hours
5. After incubation, the tubes were heated to 85 C and the fiber-rich particles were separated out with a cell strainer with a mesh opening size of 200 microns
6. The fiber-rich retentate was rinsed with an additional 20 mL of water
7. The filtrate was centrifuged at 3500 rpm for 10 minutes to separate out a protein-rich pellet (the high protein feed ingredient)
8. The centrate was decanted and the pellet resuspend in 25 mL of water
9. The resuspended pellet was again centrifuged at 3500 rpm for 10 minutes
10. The centrate was decanted and the pellet placed in a freeze dryer
11. Once dry, the pellets were ground and homogenized
12. The protein content of the ground, homogenized pellets were measured with a Leco nitrogen/protein analyzer.

Figure 12:
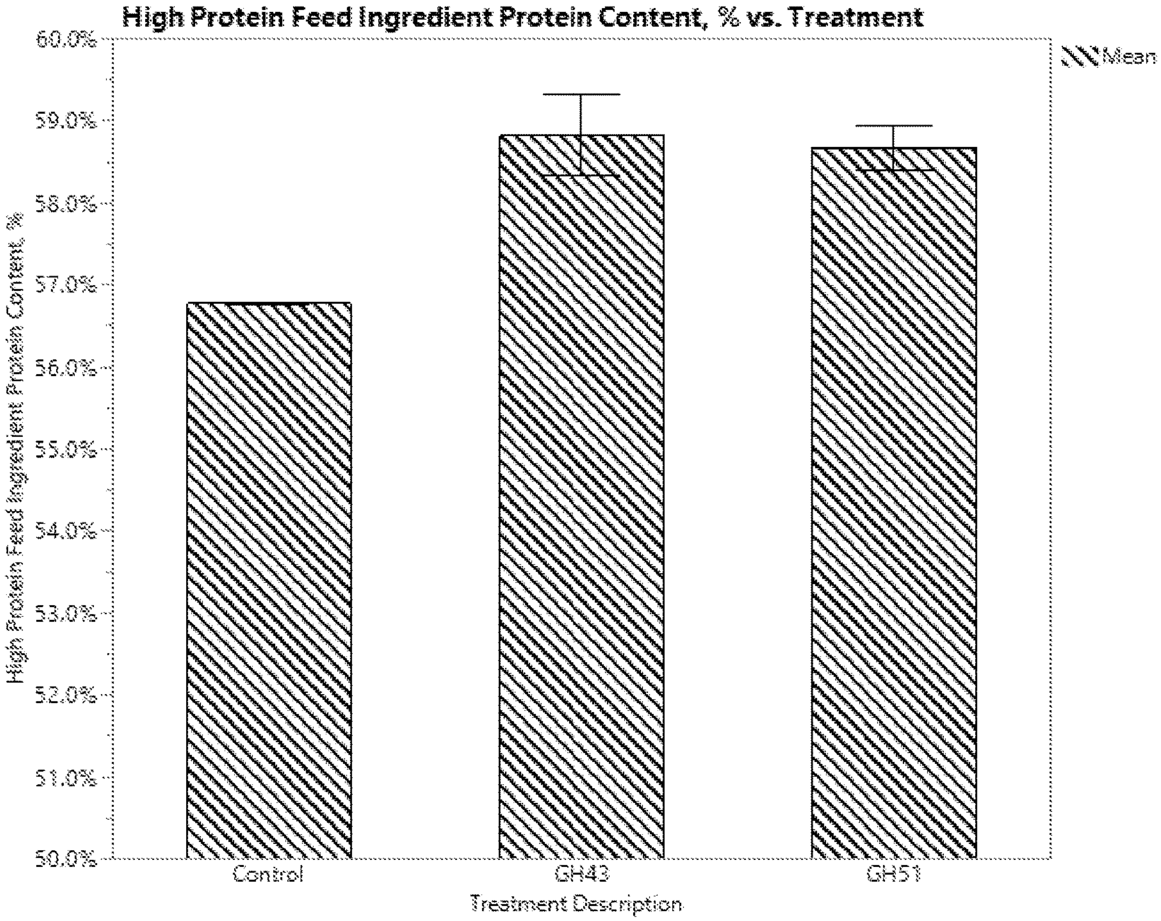
FIG. 12 is a graph showing the results of the experiments described in Example 9 which demonstrates that the addition of a GH43 or GH51 arabinofuranosidase to a background of cellulase, xylanase, and beta-glucanase results in a significantly higher protein content in the high protein feed ingredient than the control with only cellulase, xylanase, and beta-glucanase.

The results of the testing are shown in FIG. 12. As can be seen in FIG. 12, the addition of a GH43 or GH51 arabinofuranosidase to a background of cellulase, xylanase, and beta-glucanase results in a significantly higher protein content in the high protein feed ingredient than the control with only cellulase, xylanase, and beta-glucanase.

Example 10

This example illustrates that different cellulases can be used to enhance a mechanical fractionation process designed to produce a high protein feed ingredient from whole stillage in an ethanol plant. The overall goal is to increase the protein content of the high protein fraction, as well as to increase the quantity of the high protein fraction. Testing was to determine whether Cellulase 2 can increase the mass fraction and protein content of the high protein fraction. The substrate used in this testing was whole stillage from an ethanol plant. The control was not enzymatically treated. The enzymatic hydrolysis conditions were 32° C. and a 72-hour treatment time at a total solids of 12.7%.

The test procedure, was as follows:

1. The pH of the whole stillage was adjusted to pH 5
2. Approximately 14 g of the whole stillage substrate was added to Nalgene™ Oak Ridge High-Speed Centrifuge Tubes
3. Enzymes, water and penicillin were added to the tubes in accordance with the experimental design
4. The tubes were placed in an oven and incubated at 32° C. for 72 hours
5. After incubation, the tubes were heated to 85 C and the fiber-rich particles were separated out with a cell strainer with a mesh opening size of 200 microns
6. The fiber-rich retentate was rinsed with an additional 20 mL of water
7. The filtrate was centrifuged at 3500 rpm for 10 minutes to separate out a protein-rich pellet (the high protein feed ingredient)
8. The centrate was decanted and the pellet resuspend in 25 mL of water
9. The resuspended pellet was again centrifuged at 3500 rpm for 10 minutes
10. The centrate was decanted and the pellet placed in a freeze dryer
11. Once dry, the pellets were ground and homogenized
12. The protein content of the ground, homogenized pellets were measured with a Leco nitrogen/protein analyzer.

Figure 13:
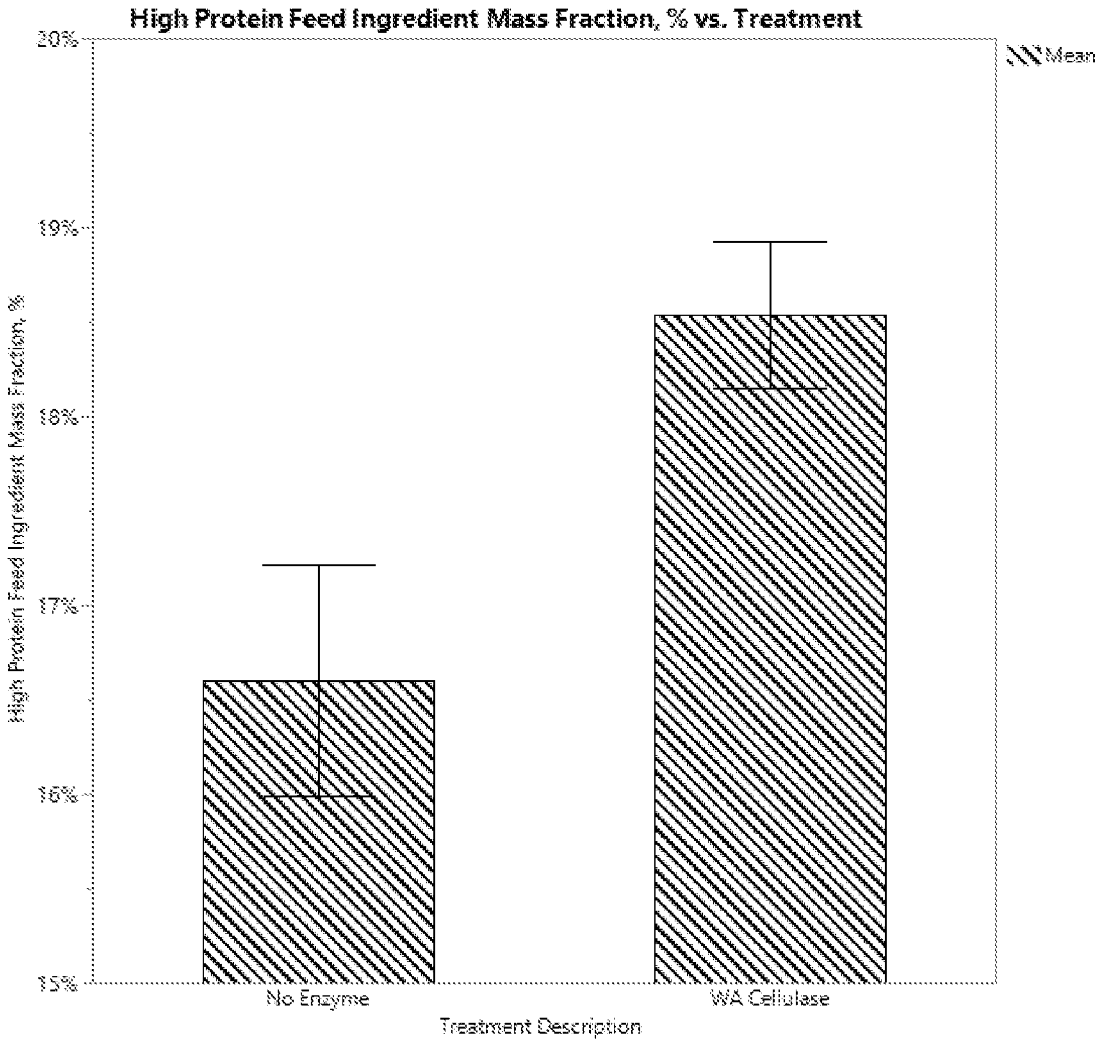
FIG. 13 and FIG. 14 are graphs showing the results of the experiments described in Example 10, which demonstrate that treatment with Cellulase 2 results in a significantly higher fraction of the mass diverted to the high protein feed ingredient as compared to the control (no enzyme treatment) (FIG. 13); and treatment with Cellulase 2 results in a significantly higher protein content in the high protein feed ingredient as compared to the control (no enzyme treatment) (FIG. 14).
Figure 14:
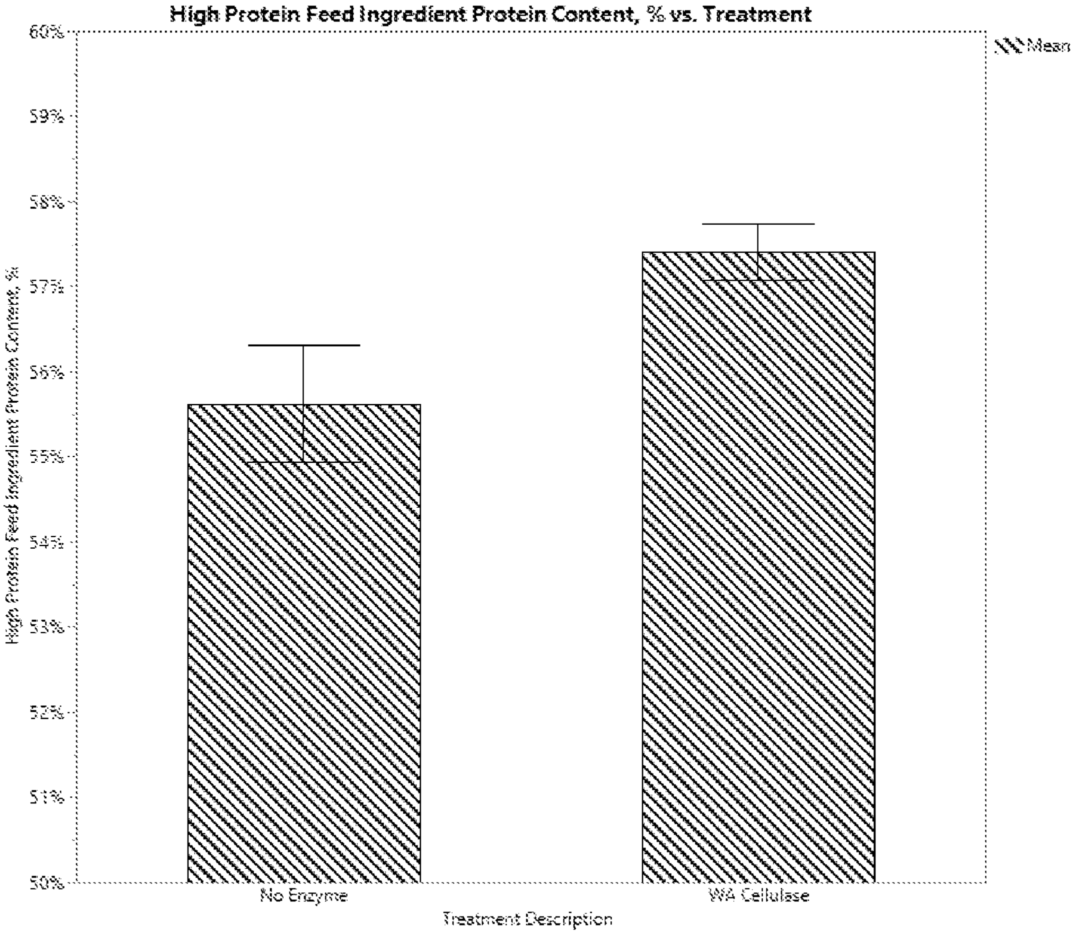

The results of the testing are shown in FIG. 13 and FIG. 14. As can be seen in FIG. 13, treatment with Cellulase 2 results in a significantly higher fraction of the mass diverted to the high protein feed ingredient as compared to the control (no enzyme treatment). As can be seen in FIG. 14, enzyme treatment with Cellulase 2 results in a significantly higher protein content in the high protein feed ingredient as compared to the control (no enzyme treatment).

Example 11

This example illustrates that a variety of GH5 family xylanases, for instance an enzyme blend comprising a cellulase and a GH5 family xylanase, enhance a mechanical fractionation process designed to produce a high protein feed ingredient from whole stillage in an ethanol plant. The overall goal is to increase the protein content of the high protein fraction, as well as to increase the quantity of the high protein fraction. Testing was to demonstrate that a variety of GH5 family xylanases, such as GH5_21, GH5_34 and GH5_35, can increase the mass fraction and protein content of the high protein feed ingredient. The substrate used in this test was mash from an ethanol plant. In this experiment, three different enzyme blends, each comprising Cellulase 2 and a different one of GH5_21b xylanase, GH5_34 xylanase, or GH5_35 xylanase, were added to the fermentation process along with glucoamylase blend GSA. The enzyme blend comprised the cellulase and xylanase in a 3:1 ratio on an enzyme protein basis. The control was a cellulase-only enzyme treatment along with glucoamylase blend GSA. The cellulase-only control was dosed at the same enzyme protein loading as that of the blend of cellulase and xylanase. The fermentation conditions were 32° C. and a 72-hour treatment time at a total solids of 32.9%.

The test procedure, was as follows:

1. Mash pH was adjusted to pH 5
2. Urea and penicillin were added to bulk mash in accordance with experimental design
3. 75 g of mash was added to each 250 mL fermentation bottle
4. Water, enzymes, and yeast were added to fermentation bottles in accordance with experimental design
5. Fermentation bottles were capped using lids with holes
6. Fermentation bottles were placed in an environmental chamber with shaking at 32° C. for 72 hours
7. Bottles were heated to 85° C.
8. Contents of bottles were poured into a 3" sieve pan to separate out the fiber-rich particles and collect the filtrate
9. Fiber-rich particles were washed by re-slurrying twice with 20 mL of water and collecting the additional filtrate
10. Filtrate was centrifuged at 3500 rpm for 10 minutes 11. Pellets were resuspended in water and centrifuged again at 3500 rpm for 10 minutes
12. Pellets were placed in a freeze dryer
13. Once dry, the pellets were ground and homogenized
14. The protein content of the ground, homogenized pellets were measured with a Leco nitrogen/protein analyzer.

Figure 15:
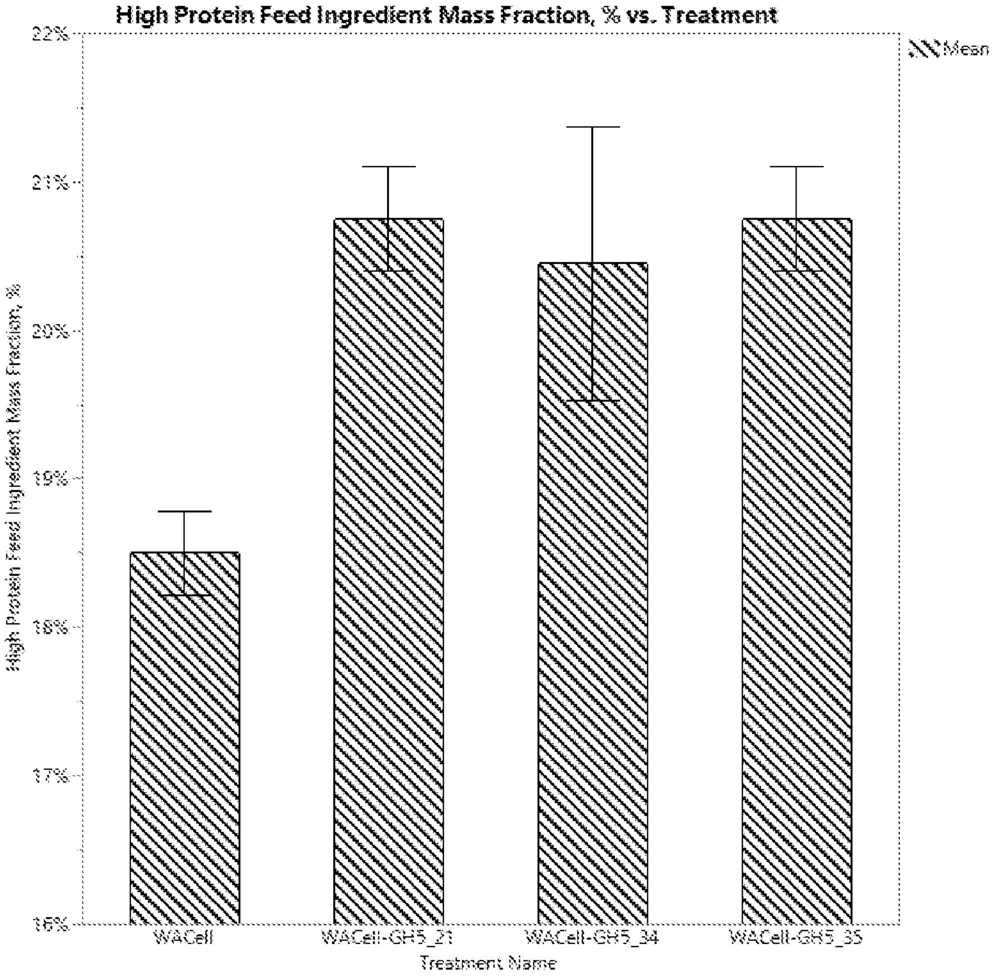
FIG. 15 and FIG. 16 are graphs showing the results of the experiments described in Example 11, which demonstrate that the addition of GH5 family xylanases to a background of cellulase results in a significantly higher diversion of mass (designated as the mass fraction in the figure) to the high protein feed ingredient than the cellulase-only control (FIG. 15); and the addition of GH5 family xylanases to a background of cellulase results in a significantly higher protein content in the high protein feed ingredient than the cellulase-only control (FIG. 16).
Figure 16:
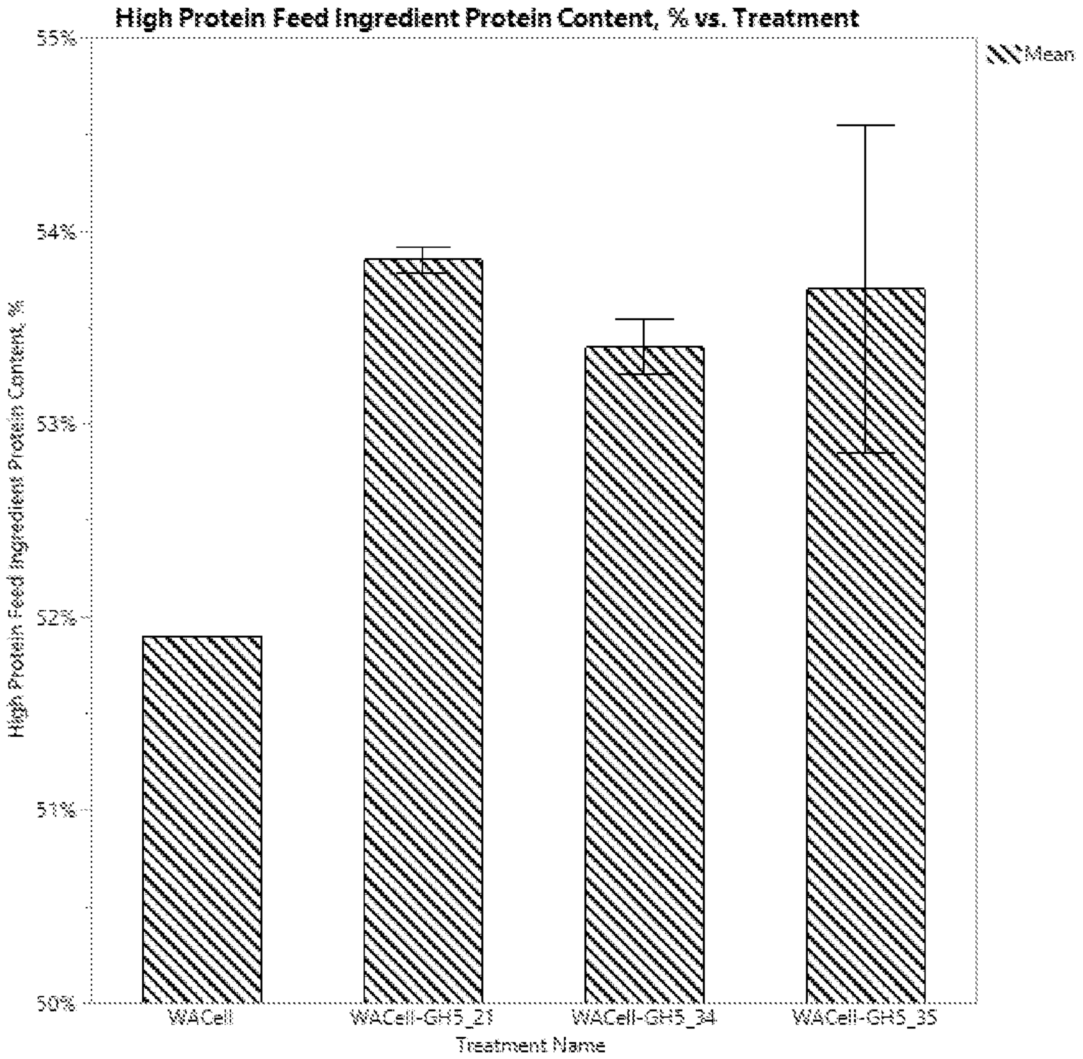

The results of the testing are shown in FIG. 15 and FIG. 16. As can be seen in FIG. 15, the addition of GH5 family xylanases to a background of cellulase results in a significantly higher diversion of mass (designated as the mass fraction in the figure) to the high protein feed ingredient than the cellulase-only control. As can be seen in FIG. 16, the addition of GH5 family xylanases to a background of cellulase results in a significantly higher protein content in the high protein feed ingredient than the cellulase-only control.

Example 12

This example illustrates that a variety of arabinofuranosidases, for instance an enzyme blend comprising a cellulase, a hemicellulase (e.g., GH10 xylanase), and an arabinofuranosidase, enhance a mechanical fractionation process designed to produce a high protein feed ingredient from whole stillage in an ethanol plant. The overall goal is to increase the protein content of the high protein fraction, as well as to increase the quantity of the high protein fraction. Testing was to determine whether arabinofuranosidases can increase the mass fraction and protein content of the high protein feed ingredient when the enzymes are dosed in fermentation. The substrate used in this test was mash from an ethanol plant. In this experiment, along with glucoamylase blend GSA, the enzyme blends were added to the fermentation process. Each enzyme blend comprised Cellulase 2, Xylanase VT, and a different arabinofuranosidase selected from GH43A, GH43B, GH51A, GH51B and GH62 in a 6:1:1 ratio on an enzyme protein basis. The control comprised a cellulase, Xylanase VT blend, along with glucoamyase blend GSA. The fermentation conditions were 32° C. and a 72-hour treatment time at a total solids of 32.9%.

The test procedure, was as follows:

1. Mash pH was adjusted to pH 5
2. Urea and penicillin were added to bulk mash in accordance with experimental design
3. 75 g of mash was added to each 250 mL fermentation bottle
4. Water, enzymes, and yeast were added to fermentation bottles in accordance with experimental design
5. Fermentation bottles were capped using lids with holes
6. Fermentation bottles were placed in an environmental chamber with shaking at 32 C for 72 hours
7. Bottles were heated to 85 C
8. Contents of bottles were poured into a 3" sieve pan to separate out the fiber-rich particles and collect the filtrate
9. Fiber-rich particles were washed by re-slurrying twice with 20 mL of water and collecting the additional filtrate
10. Filtrate was centrifuged at 3500 rpm for 10 minutes
11. Pellets were resuspended in water and centrifuged again at 3500 rpm for 10 minutes
12. Pellets were placed in a freeze dryer
13. Once dry, the pellets were ground and homogenized
14. The protein content of the ground, homogenized pellets were measured with a Leco nitrogen/protein analyzer.

Figure 17:
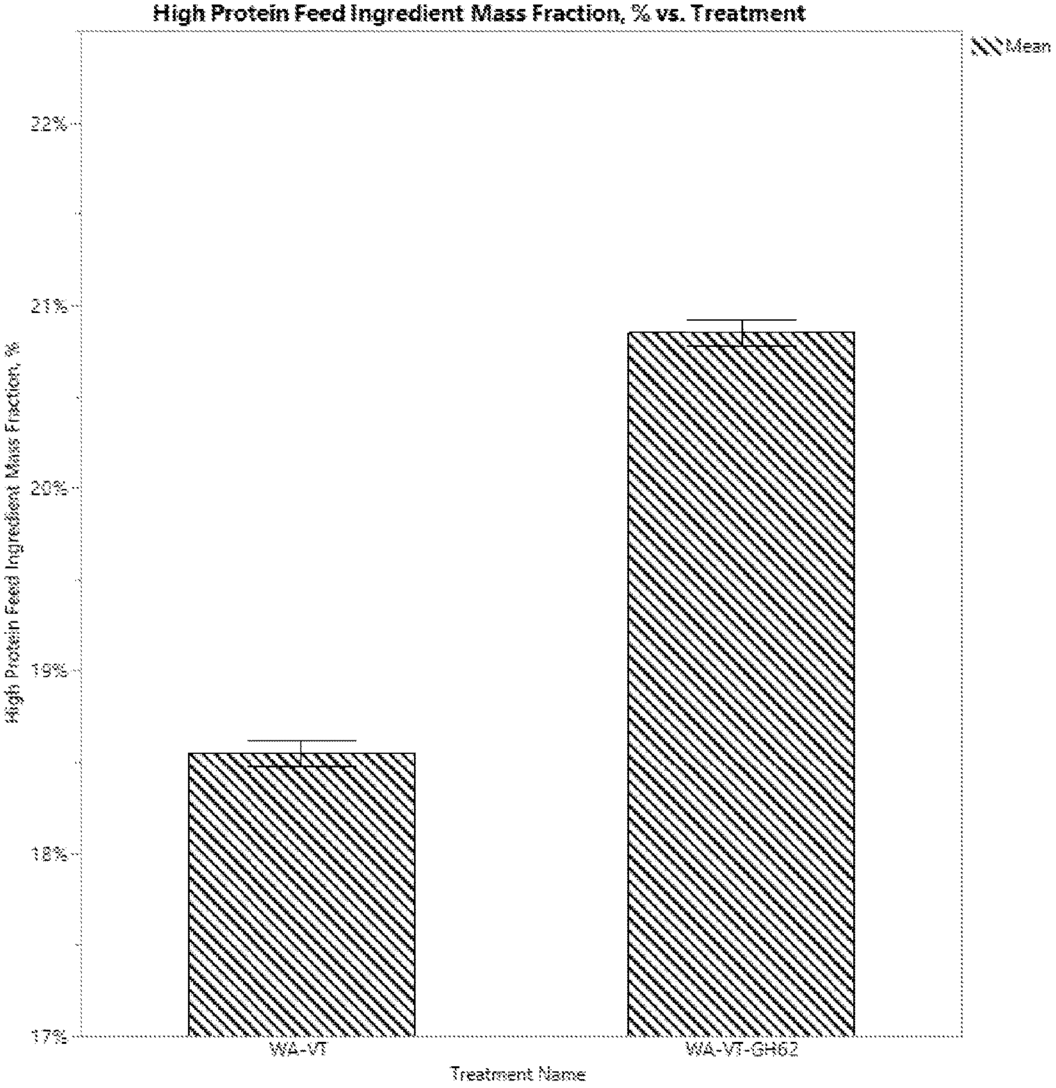
FIG. 17 and FIG. 18 are graphs showing the results of the experiments described in Example 12, which demonstrate that the addition of GH62 arabinofuranosidase to a background of cellulase and GH10 xylanase results in a significantly higher diversion of mass (designated as the mass fraction in the figure) to the high protein feed ingredient than the control (blend of cellulase and GH10 xylanase) (FIG. 17); and the addition of GH43, GH51, and GH62 arabinofuranosidases result in a significantly higher protein content in the high protein feed ingredient than the control (blend of cellulase and GH10 xylanase) (FIG. 18).
Figure 18:
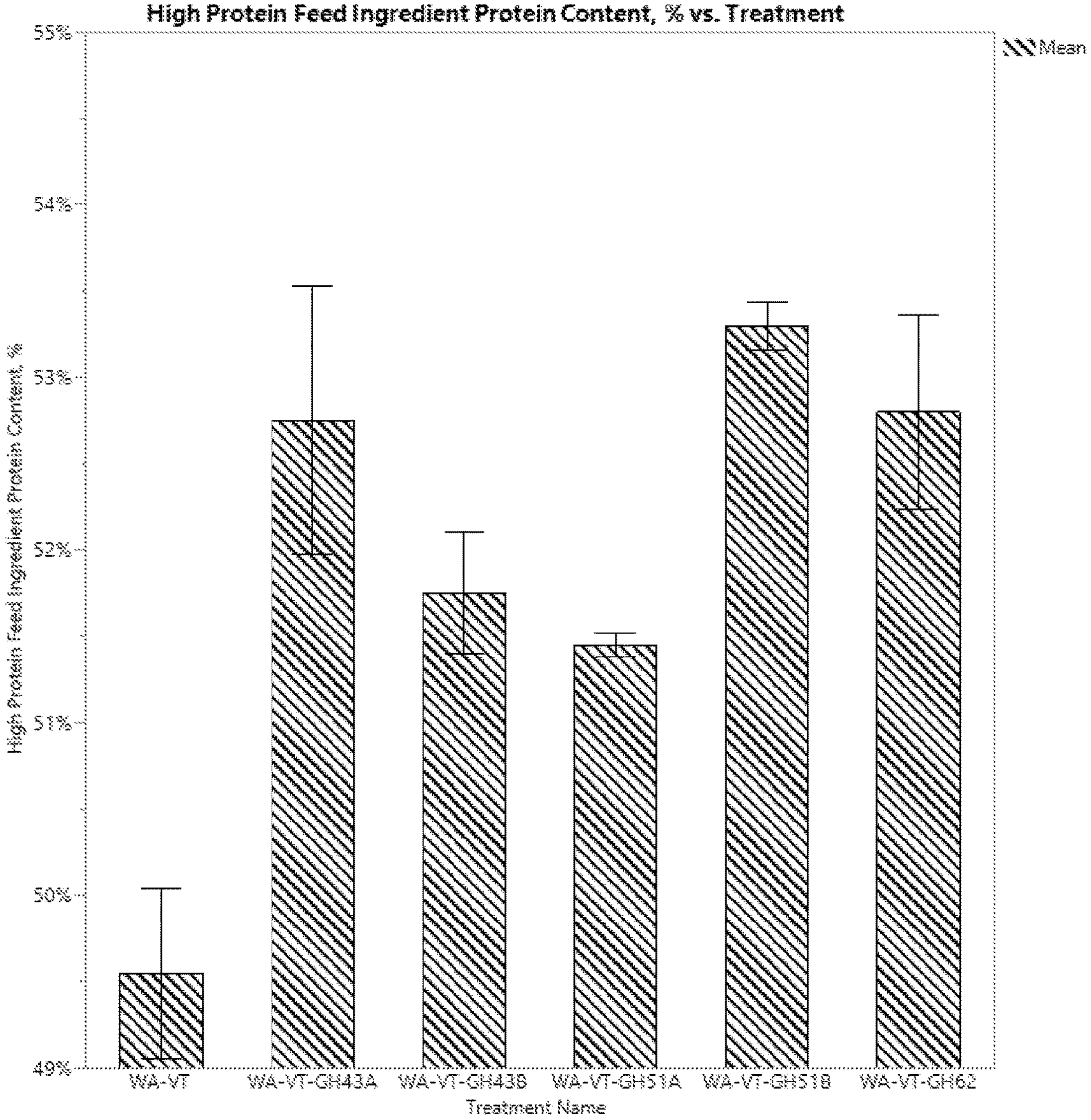

The results of the testing are shown in FIG. 17 and FIG. 18. As can be seen in FIG. 17, the addition of GH62 arabinofuranosidase to a background of cellulase and GH10 xylanase results in a significantly higher diversion of mass (designated as the mass fraction in the figure) to the high protein feed ingredient than the control (blend of cellulase and GH10 xylanase). As can be seen in FIG. 18, the addition of GH43, GH51, and GH62 arabinofuranosidases result in a significantly higher protein content in the high protein feed ingredient than the control (blend of cellulase and GH10 xylanase).

What is claimed is:

1. A method for producing a feed ingredient from whole stillage, the method comprising:

a) performing a starch-containing grain dry milling process for producing a fermentation product to produce a fermentation product and a whole stillage, wherein step a) comprises:

(i) saccharifying the starch-containing grain at a temperature below the initial gelatinization temperature with an alpha-amylase and a glucoamylase; and (ii) fermenting using a fermenting organism to produce the fermentation product, wherein an enzyme blend comprising at least two hemicellulases and at least two beta-glucanases and a cellulolytic composition is added to whole stillage, wherein the hemicellulases comprise a GH10 xylanase and a GH62 α-L-arabinofuranosidase, wherein the GH10 xylanase has an amino acid sequence comprising at least 85% sequence identity to amino acids 20 to 397 of SEQ ID NO: 2, wherein the GH62 α-L-arabinofuranosidase has an amino acid sequence comprising at least 85% sequence identity to amino acids 17 to 325 of SEQ ID NO: 11;

wherein the beta-glucanases are from a family selected from the group consisting of GH5_15 and GH64, wherein the GH5_15 family beta-glucanase has an amino acid sequence comprising at least 85% sequence identity to amino acids 17 to 408 of SEQ ID NO: 15, wherein the GH64 family beta-glucanase has an amino acid sequence comprising at least 85% sequence identity to amino acids 17 to 447 or 64 to 447 of SEQ ID NO: 20;

wherein the cellulolytic composition comprises:

(i) a cellobiohydrolase I having an amino acid sequence comprising at least 85% sequence identity to amino acids 27 to 532 of SEQ ID NO: 21;

(ii) a beta-glucosidase having an amino acid sequence comprising at least 85% sequence identity to amino acids 20 to 863 of SEQ ID NO: 23 with the substitutions F100D, S283G, N456E, and F512Y; and (iii) an endoglucanase I having an amino acid sequence comprising at least 85% sequence identity to amino acids 23 to 459 of SEQ ID NO: 44;

b) separating the whole stillage into an insoluble solids portion and a thin stillage portion;

c) separating the thin stillage portion into at least a first separated water-soluble solids portion, and at least a first separated protein portion;

d) optionally separating at least the first separated protein portion into at least a second separated water-soluble solids portion, and at least a second separated protein portion; and e) drying at least the first separated protein portion, and/or optionally at least the second separated protein portion, to define a protein product, wherein the protein product is a feed ingredient comprising at least 40 wt percent protein on a dry basis.

2. The method of claim 1, wherein saccharification and fermentation is performed simultaneously.

3. The method claim 1, wherein the fermentation product is ethanol.

4. The method claim 1, wherein the fermenting organism is yeast.

5. The method of claim 4, wherein the fermenting organism is *Saccharomyces cerevisiae.*

6. The method of claim 4, wherein the fermenting organism is a recombinant yeast host cell comprising a heterologous polynucleotide encoding the hemicellulase(s) and/or beta-glucanase(s).

7. The method of claim 6, wherein the recombinant host cell further comprises a heterologous polynucleotide encoding a glucoamylase, an alpha-amylase, and/or protease.

8. The method of claim 1, wherein the hemicellulases increase the mass fraction of the feed ingredient compared to the mass of the feed ingredient in the absence of the hemicellulases.

9. The method of claim 1, wherein the beta-glucanases increase the percent protein on a dry basis of the feed ingredient compared to the percent protein on a dry basis of the feed ingredient in the absence of the beta-glucanases.

10. The method of claim 1, wherein the hemicellulases increases the mass fraction of the feed ingredient compared to the mass of the feed ingredient in the absence of the hemicellulose, and the beta-glucanases increases the percent protein on a dry basis of the feed ingredient compared to the percent protein on a dry basis of the feed ingredient in the absence of the beta-glucanases.

11. The method of claim 1, wherein the feed ingredient comprises at least 41 percent, at least 42 percent, at least 43 percent, at least 44 percent, at least 45 percent, at least 46 percent, at least 47 percent, at least 48 percent, at least 49 percent, at least 50 percent, at least 51 percent, at least 52 percent, at least 53 percent, at least 54 percent, at least 55 percent, at least 56 percent, at least 57 percent, at least 58 percent, at least 59 percent, at least 60 percent, at least 61 percent, at least 62 percent, at least 63 percent, at least 64 percent, at least 65 percent, at least 66 percent, at least 67 percent, at least 68 percent, at least 69 percent, at least 70 percent, at least 71 percent, at least 72 percent, at least 73 percent, at least 74 percent, at least 75 percent, at least 76 percent, at least 77 percent, at least 78 percent, at least 79 percent, or at least 80 percent wt percent protein.

12. The method of claim 1, wherein the starch-containing grain comprises maize, corn, wheat, rye, barley, triticale, sorghum, switchgrass, millet, pearl millet, foxtail millet.

13. The method of claim 12, wherein the feed ingredient is an animal feed made from corn.

14. The method of claim 1, further comprising, after separating the whole stillage into an insoluble solids portion and a thin stillage portion and before separating the thin stillage portion into a first separated protein portion and a first separated water-soluble solids portion, separating fine fiber from the thin stillage portion.

15. The method of claim 1, further comprising separating soluble solids from the first separated water-soluble solids portion to provide a first soluble solids portion, and optionally separating soluble solids from the second separated water-soluble solids portion to provide a second soluble solids portion.

16. The method of claim 1, further comprising separating free oil from the first separated water-soluble solids portion to provide a first oil portion, and optionally separating free oil from the second separated water-soluble solids portion to provide a second oil portion.

17. A method for producing a feed ingredient from whole stillage, the method comprising:

a) performing a starch-containing grain dry milling process for producing a fermentation product to produce a fermentation product and a whole stillage, wherein step a) comprises:

(i) liquefying the starch-containing grain with an alpha-amylase;

(ii) saccharifying the liquefied material obtained in step (i) with a glucoamylase; and (iii) fermenting using a fermenting organism to produce the fermentation product, wherein an enzyme blend comprising at least two hemicellulases and at least two beta-glucanases and a cellulolytic composition is added to whole stillage, wherein the hemicellulases comprise a GH10 xylanase and a GH62 α-L-arabinofuranosidase, wherein the GH10 xylanase has an amino acid sequence comprising at least 85% sequence identity to amino acids 20 to 397 of SEQ ID NO: 2, wherein the GH62 α-L-arabinofuranosidase has an amino acid sequence comprising at least 99% sequence identity to amino acids 17 to 325 of SEQ ID NO: 11;

wherein the beta-glucanases are from a family selected from the group consisting of GH5_15 and GH64, wherein the GH5_15 family beta-glucanase has an amino acid sequence comprising at least 85% sequence identity to amino acids 17 to 408 of SEQ ID NO: 15, wherein the GH64 family beta-glucanase has an amino acid sequence comprising at least 85% sequence identity to amino acids 17 to 447 or 64 to 447 of SEQ ID NO: 20;

wherein the cellulolytic composition comprises:

(i) a cellobiohydrolase I having an amino acid sequence comprising at least 85% sequence identity to amino acids 27 to 532 of SEQ ID NO: 21;

(ii) a beta-glucosidase having an amino acid sequence comprising at least 85% sequence identity to amino acids 20 to 863 of SEQ ID NO: 23 with the substitutions F100D, S283G, N456E, and F512Y; and (iii) an endoglucanase I having an amino acid sequence comprising at least 85% sequence identity to amino acids 23 to 459 of SEQ ID NO: 44;

b) separating the whole stillage into an insoluble solids portion and a thin stillage portion;

c) separating the thin stillage portion into at least a first separated water-soluble solids portion, and at least a first separated protein portion;

d) optionally separating at least the first separated protein portion into at least a second separated water-soluble solids portion, and at least a second separated protein portion; and e) drying at least the first separated protein portion, and/or optionally at least the second separated protein portion, to define a protein product, wherein the protein product is a feed ingredient comprising at least 40 wt percent protein on a dry basis.

18. The method of claim 17, wherein saccharification and fermentation is performed simultaneously.

19. The method claim 17, wherein the fermentation product is ethanol.

20. The method claim 17, wherein the fermenting organism is yeast.

21. The method of claim 20, wherein the fermenting organism is *Saccharomyces cerevisiae*.

22. The method of claim 20, wherein the fermenting organism is a recombinant yeast host cell comprising a heterologous polynucleotide encoding the hemicellulase(s) and/or beta-glucanase(s).

23. The method of claim 22, wherein the recombinant host cell further comprises a heterologous polynucleotide encoding a glucoamylase, an alpha-amylase, and/or protease.

24. The method of claim 17, wherein the hemicellulases increases the mass fraction of the feed ingredient compared to the mass of the feed ingredient in the absence of the hemicellulases.

25. The method of claim 17, wherein the beta-glucanases increases the percent protein on a dry basis of the feed ingredient compared to the percent protein on a dry basis of the feed ingredient in the absence of the beta-glucanases.

26. The method of claim 17, wherein the hemicellulases increases the mass fraction of the feed ingredient compared to the mass of the feed ingredient in the absence of the hemicellulose, and the beta-glucanases increases the percent protein on a dry basis of the feed ingredient compared to the percent protein on a dry basis of the feed ingredient in the absence of the beta-glucanases.

27. The method of claim 17, wherein the feed ingredient comprises at least 41 percent, at least 42 percent, at least 43 percent, at least 44 percent, at least 45 percent, at least 46 percent, at least 47 percent, at least 48 percent, at least 49 percent, at least 50 percent, at least 51 percent, at least 52 percent, at least 53 percent, at least 54 percent, at least 55 percent, at least 56 percent, at least 57 percent, at least 58 percent, at least 59 percent, at least 60 percent, at least 61 percent, at least 62 percent, at least 63 percent, at least 64 percent, at least 65 percent, at least 66 percent, at least 67 percent, at least 68 percent, at least 69 percent, at least 70 percent, at least 71 percent, at least 72 percent, at least 73 percent, at least 74 percent, at least 75 percent, at least 76 percent, at least 77 percent, at least 78 percent, at least 79 percent, or at least 80 percent wt percent protein.

28. The method of claim 17, wherein the starch-containing grain comprises maize, corn, wheat, rye, barley, triticale, sorghum, switchgrass, millet, pearl millet, foxtail millet.

29. The method of claim 28, wherein the feed ingredient is an animal feed made from corn.

30. The method of claim 17, further comprising, after separating the whole stillage into an insoluble solids portion and a thin stillage portion and before separating the thin stillage portion into a first separated protein portion and a first separated water-soluble solids portion, separating fine fiber from the thin stillage portion.

31. The method of claim 17, further comprising separating soluble solids from the first separated water-soluble solids portion to provide a first soluble solids portion, and optionally separating soluble solids from the second separated water-soluble solids portion to provide a second soluble solids portion.

32. The method of claim 17, further comprising separating free oil from the first separated water-soluble solids portion to provide a first oil portion, and optionally separating free oil from the second separated water-soluble solids portion to provide a second oil portion.

33. The method of claim 1, wherein:

(i) the GH10 xylanase has an amino acid sequence comprising at least 90% sequence identity to amino acids 20 to 397 of SEQ ID NO: 2;

(ii) wherein the GH62 α-L-arabinofuranosidase has an amino acid sequence comprising at least 90% sequence identity to amino acids 17 to 325 of SEQ ID NO: 11;

(iii) wherein the GH5_15 family beta-glucanase has an amino acid sequence comprising at least 90% sequence identity to amino acids 17 to 408 of SEQ ID NO: 15;

(iv) wherein the GH64 family beta-glucanase has an amino acid sequence comprising at least 90% sequence identity to amino acids 17 to 447 or 64 to 447 of SEQ ID NO: 20;

(v) wherein the cellobiohydrolase I has an amino acid sequence comprising at least 90% sequence identity to amino acids 27 to 532 of SEQ ID NO: 21;

(vi) wherein the beta-glucosidase has an amino acid sequence comprising at least 90% sequence identity to amino acids 20 to 863 of SEQ ID NO: 23 with the substitutions F100D, S283G, N456E, and F512Y; and (vii) wherein the endoglucanase I has an amino acid sequence comprising at least 90% sequence identity to amino acids 23 to 459 of SEQ ID NO: 44.

34. The method of claim 1, wherein:

(i) the GH10 xylanase has an amino acid sequence comprising at least 95% sequence identity to amino acids 20 to 397 of SEQ ID NO: 2;

(ii) wherein the GH62 α-L-arabinofuranosidase has an amino acid sequence comprising at least 95% sequence identity to amino acids 17 to 325 of SEQ ID NO: 11;

(iii) wherein the GH5_15 family beta-glucanase has an amino acid sequence comprising at least 95% sequence identity to amino acids 17 to 408 of SEQ ID NO: 15;

(iv) wherein the GH64 family beta-glucanase has an amino acid sequence comprising at least 95% sequence identity to amino acids 17 to 447 or 64 to 447 of SEQ ID NO: 20;

(v) wherein the cellobiohydrolase I has an amino acid sequence comprising at least 95% sequence identity to amino acids 27 to 532 of SEQ ID NO: 21;

(vi) wherein the beta-glucosidase has an amino acid sequence comprising at least 95% sequence identity to amino acids 20 to 863 of SEQ ID NO: 23 with the substitutions F100D, S283G, N456E, and F512Y; and (vii) wherein the endoglucanase I has an amino acid sequence comprising at least 95% sequence identity to amino acids 23 to 459 of SEQ ID NO: 44.

35. The method of claim 1, wherein:

(i) the GH10 xylanase has an amino acid sequence comprising amino acids 20 to 397 of SEQ ID NO: 2;

(ii) wherein the GH62 α-L-arabinofuranosidase has an amino acid sequence comprising amino acids 17 to 325 of SEQ ID NO: 11;

(iii) wherein the GH5_15 family beta-glucanase has an amino acid sequence comprising amino acids 17 to 408 of SEQ ID NO: 15;

(iv) wherein the GH64 family beta-glucanase has an amino acid sequence comprising amino acids 17 to 447 or 64 to 447 of SEQ ID NO: 20;

(v) wherein the cellobiohydrolase I has an amino acid sequence comprising amino acids 27 to 532 of SEQ ID NO: 21;

(vi) wherein the beta-glucosidase has an amino acid sequence comprising amino acids 20 to 863 of SEQ ID NO: 23 with the substitutions F100D, S283G, N456E, and F512Y; and (vii) wherein the endoglucanase I has an amino acid sequence comprising amino acids 23 to 459 of SEQ ID NO: 44.

36. The method of claim 17, wherein:

(i) the GH10 xylanase has an amino acid sequence comprising at least 90% sequence identity to amino acids 20 to 397 of SEQ ID NO: 2;

(ii) wherein the GH62 α-L-arabinofuranosidase has an amino acid sequence comprising at least 90% sequence identity to amino acids 17 to 325 of SEQ ID NO: 11;

(iii) wherein the GH5_15 family beta-glucanase has an amino acid sequence comprising at least 90% sequence identity to amino acids 17 to 408 of SEQ ID NO: 15;

(iv) wherein the GH64 family beta-glucanase has an amino acid sequence comprising at least 90% sequence identity to amino acids 17 to 447 or 64 to 447 of SEQ ID NO: 20;

(v) wherein the cellobiohydrolase I has an amino acid sequence comprising at least 90% sequence identity to amino acids 27 to 532 of SEQ ID NO: 21;

(vi) wherein the beta-glucosidase has an amino acid sequence comprising at least 90% sequence identity to amino acids 20 to 863 of SEQ ID NO: 23 with the substitutions F100D, S283G, N456E, and F512Y; and (vii) wherein the endoglucanase I has an amino acid sequence comprising at least 90% sequence identity to amino acids 23 to 459 of SEQ ID NO: 44.

37. The method of claim 17, wherein:

(i) the GH10 xylanase has an amino acid sequence comprising at least 95% sequence identity to amino acids 20 to 397 of SEQ ID NO: 2;

(ii) wherein the GH62 α-L-arabinofuranosidase has an amino acid sequence comprising at least 95% sequence identity to amino acids 17 to 325 of SEQ ID NO: 11;

(iii) wherein the GH5_15 family beta-glucanase has an amino acid sequence comprising at least 95% sequence identity to amino acids 17 to 408 of SEQ ID NO: 15;

(iv) wherein the GH64 family beta-glucanase has an amino acid sequence comprising at least 95% sequence identity to amino acids 17 to 447 or 64 to 447 of SEQ ID NO: 20;

(v) wherein the cellobiohydrolase I has an amino acid sequence comprising at least 95% sequence identity to amino acids 27 to 532 of SEQ ID NO: 21;

(vi) wherein the beta-glucosidase has an amino acid sequence comprising at least 95% sequence identity to amino acids 20 to 863 of SEQ ID NO: 23 with the substitutions F100D, S283G, N456E, and F512Y; and (vii) wherein the endoglucanase I has an amino acid sequence comprising at least 95% sequence identity to amino acids 23 to 459 of SEQ ID NO: 44.

38. The method of claim 17, wherein:

(i) the GH10 xylanase has an amino acid sequence comprising amino acids 20 to 397 of SEQ ID NO: 2;

(ii) wherein the GH62 α-L-arabinofuranosidase has an amino acid sequence comprising amino acids 17 to 325 of SEQ ID NO: 11;

(iii) wherein the GH5_15 family beta-glucanase has an amino acid sequence comprising amino acids 17 to 408 of SEQ ID NO: 15;

(iv) wherein the GH64 family beta-glucanase has an amino acid sequence comprising amino acids 17 to 447 or 64 to 447 of SEQ ID NO: 20;

(v) wherein the cellobiohydrolase I has an amino acid sequence comprising amino acids 27 to 532 of SEQ ID NO: 21;

(vi) wherein the beta-glucosidase has an amino acid sequence comprising amino acids 20 to 863 of SEQ ID NO: 23 with the substitutions F100D, S283G, N456E, and F512Y; and (vii) wherein the endoglucanase I has an amino acid sequence comprising amino acids 23 to 459 of SEQ ID NO: 44.

* * * * *

SEQUENCE LISTING

```
<160> NUMBER OF SEQ ID NOS: 59

<210> SEQ ID NO 1
<211> LENGTH: 397
<212> TYPE: PRT
<213> ORGANISM: Aspergillus fumigatus

<400> SEQUENCE: 1

Met Val His Leu Ser Ser Leu Ala Ala Ala Leu Ala Ala Leu Pro Leu
1               5                   10                  15

Val Tyr Gly Ala Gly Leu Asn Thr Ala Ala Lys Ala Lys Gly Leu Lys
            20                  25                  30

Tyr Phe Gly Ser Ala Thr Asp Asn Pro Glu Leu Thr Asp Ser Ala Tyr
        35                  40                  45

Val Ala Gln Leu Ser Asn Thr Asp Asp Phe Gly Gln Ile Thr Pro Gly
    50                  55                  60

Asn Ser Met Lys Trp Asp Ala Thr Glu Pro Ser Gln Asn Ser Phe Ser
65                  70                  75                  80

Phe Ala Asn Gly Asp Ala Val Val Asn Leu Ala Asn Lys Asn Gly Gln
                85                  90                  95

Leu Met Arg Cys His Thr Leu Val Trp His Ser Gln Leu Pro Asn Trp
```

```
            100                 105                 110

Val Ser Ser Gly Ser Trp Thr Asn Ala Thr Leu Leu Ala Ala Met Lys
        115                 120                 125

Asn His Ile Thr Asn Val Val Thr His Tyr Lys Gly Lys Cys Tyr Ala
    130                 135                 140

Trp Asp Val Val Asn Glu Ala Leu Asn Glu Asp Gly Thr Phe Arg Asn
145                 150                 155                 160

Ser Val Phe Tyr Gln Ile Ile Gly Pro Ala Tyr Ile Pro Ile Ala Phe
                165                 170                 175

Ala Thr Ala Ala Ala Ala Asp Pro Asp Val Lys Leu Tyr Tyr Asn Asp
            180                 185                 190

Tyr Asn Ile Glu Tyr Ser Gly Ala Lys Ala Thr Ala Ala Gln Asn Ile
        195                 200                 205

Val Lys Met Ile Lys Ala Tyr Gly Ala Lys Ile Asp Gly Val Gly Leu
    210                 215                 220

Gln Ala His Phe Ile Val Gly Ser Thr Pro Ser Gln Ser Asp Leu Thr
225                 230                 235                 240

Thr Val Leu Lys Gly Tyr Thr Ala Leu Gly Val Glu Val Ala Tyr Thr
                245                 250                 255

Glu Leu Asp Ile Arg Met Gln Leu Pro Ser Thr Ala Ala Lys Leu Ala
            260                 265                 270

Gln Gln Ser Thr Asp Phe Gln Gly Val Ala Ala Ala Cys Val Ser Thr
        275                 280                 285

Thr Gly Cys Val Gly Val Thr Ile Trp Asp Trp Thr Asp Lys Tyr Ser
    290                 295                 300

Trp Val Pro Ser Val Phe Gln Gly Tyr Gly Ala Pro Leu Pro Trp Asp
305                 310                 315                 320

Glu Asn Tyr Val Lys Lys Pro Ala Tyr Asp Gly Leu Met Ala Gly Leu
                325                 330                 335

Gly Ala Ser Gly Ser Gly Thr Thr Thr Thr Thr Thr Thr Thr Ser Thr
            340                 345                 350

Thr Thr Gly Gly Thr Asp Pro Thr Gly Val Ala Gln Lys Trp Gly Gln
        355                 360                 365

Cys Gly Gly Ile Gly Trp Thr Gly Pro Thr Thr Cys Val Ser Gly Thr
    370                 375                 380

Thr Cys Gln Lys Leu Asn Asp Trp Tyr Ser Gln Cys Leu
385                 390                 395


<210> SEQ ID NO 2
<211> LENGTH: 405
<212> TYPE: PRT
<213> ORGANISM: Talaromyces leycettanus

<400> SEQUENCE: 2

Met Val His Leu Ser Ser Leu Ala Leu Ala Leu Ala Ala Gly Ser Gln
1               5                   10                  15

Leu Ala Gln Ala Ala Gly Leu Asn Thr Ala Ala Lys Ala Ile Gly Lys
            20                  25                  30

Leu Tyr Phe Gly Thr Ala Thr Asp Asn Pro Glu Leu Ser Asp Ser Thr
        35                  40                  45

Tyr Met Gln Glu Thr Asp Asn Thr Asp Asp Phe Gly Gln Leu Thr Pro
    50                  55                  60

Ala Asn Ser Met Lys Trp Asp Ala Thr Glu Pro Ser Gln Asn Thr Phe
65                  70                  75                  80
```

```
Thr Phe Thr Asn Gly Asp Gln Ile Ala Asn Leu Ala Lys Ser Asn Gly
                85                  90                  95

Gln Met Leu Arg Cys His Asn Leu Val Trp Tyr Asn Gln Leu Pro Ser
            100                 105                 110

Trp Val Thr Ser Gly Ser Trp Thr Asn Ala Thr Leu Leu Ala Ala Met
        115                 120                 125

Lys Asn His Ile Thr Asn Val Val Thr His Tyr Lys Gly Gln Cys Tyr
    130                 135                 140

Ala Trp Asp Val Val Asn Glu Ala Leu Asn Asp Asp Gly Thr Tyr Arg
145                 150                 155                 160

Ser Asn Val Phe Tyr Gln Tyr Ile Gly Glu Ala Tyr Ile Pro Ile Ala
                165                 170                 175

Phe Ala Thr Ala Ala Ala Ala Asp Pro Asn Ala Lys Leu Tyr Tyr Asn
            180                 185                 190

Asp Tyr Asn Ile Glu Tyr Pro Gly Ala Lys Ala Thr Ala Ala Gln Asn
        195                 200                 205

Ile Val Lys Met Val Lys Ala Tyr Gly Ala Lys Ile Asp Gly Val Gly
    210                 215                 220

Leu Gln Ser His Phe Ile Val Gly Ser Thr Pro Ser Gln Ser Ser Gln
225                 230                 235                 240

Gln Ser Asn Met Ala Ala Phe Thr Ala Leu Gly Val Glu Val Ala Ile
                245                 250                 255

Thr Glu Leu Asp Ile Arg Met Thr Leu Pro Ser Thr Ser Ala Leu Leu
            260                 265                 270

Ala Gln Gln Ser Thr Asp Tyr Gln Ser Thr Val Ser Ala Cys Val Asn
        275                 280                 285

Thr Pro Lys Cys Ile Gly Ile Thr Leu Trp Asp Trp Thr Asp Lys Tyr
    290                 295                 300

Ser Trp Val Pro Asn Thr Phe Ser Gly Gln Gly Asp Ala Cys Pro Trp
305                 310                 315                 320

Asp Ser Asn Tyr Gln Lys Lys Pro Ala Tyr Tyr Gly Ile Leu Thr Ala
                325                 330                 335

Leu Gly Gly Ser Ala Ser Thr Ser Thr Thr Thr Thr Leu Val Thr Ser
            340                 345                 350

Thr Arg Thr Ser Thr Thr Thr Ser Thr Ser Ala Thr Ser Thr Ser Thr
        355                 360                 365

Gly Val Ala Gln His Trp Gly Gln Cys Gly Gly Ile Gly Trp Thr Gly
    370                 375                 380

Pro Thr Thr Cys Ala Ser Pro Tyr Thr Cys Gln Glu Leu Asn Pro Tyr
385                 390                 395                 400

Tyr Tyr Gln Cys Leu
                405


<210> SEQ ID NO 3
<211> LENGTH: 417
<212> TYPE: PRT
<213> ORGANISM: Bacillus subtilis

<400> SEQUENCE: 3

Met Lys Lys Pro Leu Gly Lys Ile Val Ala Ser Thr Ala Leu Leu Ile
1               5                   10                  15

Ser Val Ala Phe Ser Ser Ser Ile Ala Ser Ala Ala Ser Asp Val Thr
            20                  25                  30

Val Asn Val Ser Ala Glu Lys Gln Val Ile Arg Gly Phe Gly Gly Met
        35                  40                  45
```

```
Asn His Pro Ala Trp Ala Gly Asp Leu Thr Ala Ala Gln Arg Glu Thr
    50                  55                  60

Ala Phe Gly Asn Gly Gln Asn Gln Leu Gly Phe Ser Ile Leu Arg Ile
65                  70                  75                  80

His Val Asp Glu Asn Arg Asn Asn Trp Tyr Lys Glu Val Glu Thr Ala
                85                  90                  95

Lys Ser Ala Val Lys His Gly Ala Ile Val Phe Ala Ser Pro Trp Asn
            100                 105                 110

Pro Pro Ser Asp Met Val Glu Thr Phe Asn Arg Asn Gly Asp Thr Ser
        115                 120                 125

Ala Lys Arg Leu Lys Tyr Asn Lys Tyr Ala Ala Tyr Ala Gln His Leu
    130                 135                 140

Asn Asp Phe Val Thr Phe Met Lys Asn Asn Gly Val Asn Leu Tyr Ala
145                 150                 155                 160

Ile Ser Val Gln Asn Glu Pro Asp Tyr Ala His Glu Trp Thr Trp Trp
                165                 170                 175

Thr Pro Gln Glu Ile Leu Arg Phe Met Arg Glu Asn Ala Gly Ser Ile
            180                 185                 190

Asn Ala Arg Val Ile Ala Pro Glu Ser Phe Gln Tyr Leu Lys Asn Leu
        195                 200                 205

Ser Asp Pro Ile Leu Asn Asp Pro Gln Ala Leu Ala Asn Met Asp Ile
    210                 215                 220

Leu Gly Thr His Leu Tyr Gly Thr Gln Val Ser Gln Phe Pro Tyr Pro
225                 230                 235                 240

Leu Phe Lys Gln Lys Gly Ala Gly Lys Asp Leu Trp Met Thr Glu Val
                245                 250                 255

Tyr Tyr Pro Asn Ser Asp Thr Asn Ser Ala Asp Arg Trp Pro Glu Ala
            260                 265                 270

Leu Asp Val Ser Gln His Ile His Asn Ala Met Val Glu Gly Asp Phe
        275                 280                 285

Gln Ala Tyr Val Trp Trp Tyr Ile Arg Arg Ser Tyr Gly Pro Met Lys
    290                 295                 300

Glu Asp Gly Thr Ile Ser Lys Arg Gly Tyr Asn Met Ala His Phe Ser
305                 310                 315                 320

Lys Phe Val Arg Pro Gly Tyr Val Arg Ile Asp Ala Thr Lys Asn Pro
                325                 330                 335

Asn Ala Asn Val Tyr Val Ser Ala Tyr Lys Gly Asp Asn Lys Val Val
            340                 345                 350

Ile Val Ala Ile Asn Lys Ser Asn Thr Gly Val Asn Gln Asn Phe Val
        355                 360                 365

Leu Gln Asn Gly Ser Ala Ser Asn Val Ser Arg Trp Ile Thr Ser Ser
    370                 375                 380

Ser Ser Asn Leu Gln Pro Gly Thr Asn Leu Thr Val Ser Gly Asn His
385                 390                 395                 400

Phe Trp Ala His Leu Pro Ala Gln Ser Val Thr Thr Phe Val Val Asn
                405                 410                 415

Arg
```

<210> SEQ ID NO 4
<211> LENGTH: 417
<212> TYPE: PRT
<213> ORGANISM: Bacillus subtilis

<400> SEQUENCE: 4

-continued

```
Met Lys Lys Pro Leu Gly Lys Ile Val Ala Ser Thr Ala Leu Leu Ile
1               5                   10                  15

Ser Val Ala Phe Ser Ser Ser Ile Ala Ser Ala Ala Ser Asp Val Thr
            20                  25                  30

Val Asn Val Ser Ala Glu Lys Gln Val Ile Arg Gly Phe Gly Gly Met
        35                  40                  45

Asn Trp Pro Ala Trp Ala Gly Asp Leu Thr Ala Ala Gln Arg Glu Thr
    50                  55                  60

Ala Phe Gly Asn Gly Gln Asn Gln Leu Gly Phe Ser Ile Leu Arg Ile
65                  70                  75                  80

His Val Asp Glu Asn Arg Asn Asn Trp Tyr Lys Glu Val Glu Thr Ala
                85                  90                  95

Lys Ser Ala Leu Lys Leu Gly Ala Ile Val Phe Ala Ser Pro Trp Asn
            100                 105                 110

Pro Pro Ser Asp Met Val Glu Thr Phe Asn Arg Asn Gly Asp Thr Ser
        115                 120                 125

Ala Lys Arg Leu Lys Tyr Asn Lys Tyr Ala Ala Tyr Ala Gln His Leu
    130                 135                 140

Asn Asp Phe Val Thr Phe Met Lys Asn Asn Gly Val Asn Leu Tyr Ala
145                 150                 155                 160

Ile Ser Val Gln Asn Glu Pro Asp Tyr Ala His Glu Trp Thr Trp Trp
                165                 170                 175

Thr Pro Gln Glu Met Leu Arg Phe Met Arg Glu Asn Ala Gly Ser Ile
            180                 185                 190

Asn Ala Arg Val Ile Ala Pro Glu Ser Phe Gln Tyr Leu Lys Asn Leu
        195                 200                 205

Ser Asp Pro Ile Leu Asn Asp Pro Gln Ala Leu Ala Asn Met Asp Ile
    210                 215                 220

Leu Gly Thr His Leu Tyr Gly Thr Gln Leu Ser Gln Phe Pro Tyr Pro
225                 230                 235                 240

Leu Phe Lys Gln Lys Gly Ala Gly Lys Asp Leu Trp Met Thr Glu Val
                245                 250                 255

Tyr Tyr Pro Asn Ser Asp Thr Asn Ser Ala Asp Arg Trp Pro Glu Ala
            260                 265                 270

Leu Asp Val Ser Gln His Ile His Asn Ala Met Val Glu Gly Asp Phe
        275                 280                 285

Gln Ala Tyr Val Trp Trp Tyr Ile Arg Arg Ser Tyr Gly Pro Met Lys
    290                 295                 300

Glu Asp Gly Thr Ile Ser Lys Arg Gly Tyr Asn Met Ala His Phe Ser
305                 310                 315                 320

Lys Phe Val Arg Pro Gly Tyr Val Arg Ile Asp Ala Thr Lys Asn Pro
                325                 330                 335

Asn Ala Asn Val Tyr Val Ser Ala Tyr Lys Gly Asp Asn Lys Val Val
            340                 345                 350

Ile Val Ala Ile Asn Lys Ser Asn Thr Gly Val Asn Gln Asn Phe Val
        355                 360                 365

Leu Gln Asn Gly Ser Ala Ser Asn Val Ser Arg Trp Ile Thr Ser Ser
    370                 375                 380

Ser Ser Asn Leu Gln Pro Gly Thr Asn Leu Thr Val Ser Gly Asn His
385                 390                 395                 400

Phe Trp Ala His Leu Pro Ala Gln Ser Val Thr Thr Phe Val Val Asn
                405                 410                 415
```

Arg

<210> SEQ ID NO 5
<211> LENGTH: 551
<212> TYPE: PRT
<213> ORGANISM: Chryseobacterium sp-10696

<400> SEQUENCE: 5

Met Asp Glu Lys Asn Leu Leu Glu Asp Pro Asp Ser Asn Leu Ser Ala
1               5                   10                  15

Gly Ala Ser Ala Arg Ala Leu Ala Ala Thr Pro Met Leu His Val Gly
            20                  25                  30

Gly Arg Tyr Leu Lys Asp Pro Cys Asp Asn Asn Val Val Leu His Gly
        35                  40                  45

Val Ala Ile Thr Pro Ser Pro Trp Phe Asn Gly Cys Gln Tyr Gly Ala
    50                  55                  60

Asn Ser Gly Tyr Cys Thr Trp Asp Asn Tyr Asn Val Gln Gly Ala Leu
65                  70                  75                  80

Asn Tyr Asn Lys Ala Val Met Asn Lys Leu Thr Ser Ala Ala Asp Gly
                85                  90                  95

Trp Tyr Leu Asn Tyr Ile Arg Leu His Ile Asp Pro Tyr Trp Thr Asn
            100                 105                 110

Asp Pro Gly Pro Ala Ile Pro Glu Asn Asp Ile Ser Arg Phe Asn Tyr
        115                 120                 125

Asn Arg Leu Val Thr Tyr Thr Asp Gln Val Ile Ile Pro Leu Ile Asn
    130                 135                 140

His Ala Arg Ser Leu Gly Met Tyr Val Ile Leu Arg Pro Pro Gly Val
145                 150                 155                 160

Cys Pro Asn Arg Ile Ala Val Asn Asp Ala Tyr His Ser Tyr Leu Lys
                165                 170                 175

Thr Val Trp Thr Phe Leu Ser Gln His Pro Gly Leu Lys Asn Ala Asp
            180                 185                 190

Asn Val Met Phe Glu Leu Ala Asn Glu Pro Val Glu Ile Leu Gly Thr
        195                 200                 205

Asn Gly Thr Trp Gly Ser Thr Gly Asn Glu His Phe Ala Ala Leu Lys
    210                 215                 220

Asn Phe Phe Gln Pro Leu Val Asn Ile Ile Arg Asn Asn Gly Ala Asn
225                 230                 235                 240

Asn Val Cys Trp Ile Pro Gly Thr Gly Trp Gln Ser His Tyr Gln Gly
                245                 250                 255

Tyr Val Asn Asn Gln Ile Thr Gly Gly Asn Ile Gly Tyr Ala Val His
            260                 265                 270

Ile Tyr Pro Ala Tyr Trp Gly Gly Leu Ser Asn Tyr Gln Ala Phe Gln
        275                 280                 285

Asn Ala Trp Asn Ile Asn Val Lys Pro Ile Ala Asp Ile Ala Pro Ile
    290                 295                 300

Ala Ile Thr Glu Thr Asp Trp Ala Pro Gln Gly Tyr Gly Thr Phe Gly
305                 310                 315                 320

Ile Gly Thr Thr Gly Thr Ala Gly Gly Ser Gly Phe Gly Ala Asn Leu
                325                 330                 335

Lys Tyr Ile Val Asp Gln Ser Gly Asn Val Ser Trp Asn Val Leu Ala
            340                 345                 350

Pro Asp Asn Leu Leu His Lys Gly Asp Pro Asn Ala Gly Thr Ala Tyr
        355                 360                 365

Asn Asn Asp Trp Glu Ala Cys Ala Ala Pro Val Lys Gln Trp Phe Gln
    370                 375                 380

Gln Tyr Ala Ser Ser Asn Tyr Pro Val Gly Asn Cys Asn Thr Thr Ser
385                 390                 395                 400

Ser Leu Val Asn Asn Gly Ile Tyr Glu Ile Glu Phe Gln Thr Asp Ala
                405                 410                 415

Asn Lys Val Val Asp Leu Lys Ser Gly Glu Asp Ala Asn Gly Ala Val
            420                 425                 430

Leu Arg Pro Trp Thr Arg Asn Gly Ala Ala Ala Gln Arg Trp Val Ala
        435                 440                 445

Ile Asp Ala Gly Asn Gly Tyr Trp Arg Phe Val Ser Lys Ala Ser Ala
    450                 455                 460

Thr Asn Arg Cys Ile Asp Leu Ala Ser Asn Ser Asn Thr Leu Gly Thr
465                 470                 475                 480

Ser Ile Arg Leu Trp Gln Asn Tyr Gly Asn Asp Ala Gln Ala Trp Gln
                485                 490                 495

Val Val Ala Val Ser Asn Gly Tyr Tyr Lys Ile Leu Ser Lys Val Asp
            500                 505                 510

Pro Thr Arg Gly Trp Asp Ile Pro Asn Cys Thr Met Asp Gly Asn Ser
        515                 520                 525

Asn Leu His Leu Trp Asp Tyr Tyr Gly Thr Ser Cys Gln Leu Phe Lys
    530                 535                 540

Phe Lys Tyr Ile Gly Met Asn
545                 550

<210> SEQ ID NO 6
<211> LENGTH: 551
<212> TYPE: PRT
<213> ORGANISM: Chryseobacterium sp-10696

<400> SEQUENCE: 6

Met Asp Glu Lys Asn Leu Leu Glu Asp Pro Asp Ser Asn Leu Ser Ala
1               5                   10                  15

Gly Ala Ser Ala Arg Ala Leu Ala Ala Thr Pro Met Leu His Val Gly
            20                  25                  30

Gly Arg Tyr Leu Lys Asp Pro Cys Asp Asn Asn Val Leu Leu His Gly
        35                  40                  45

Val Ala Ile Thr Pro Ser Pro Trp Phe Asn Gly Cys Gln Tyr Gly Ala
    50                  55                  60

Asn Ser Gly Tyr Cys Thr Trp Asp Asn Tyr Asn Val Gln Gly Cys Leu
65                  70                  75                  80

Asn Tyr Asn Lys Ala Val Met Asn Lys Leu Thr Ser Ala Ala Asp Gly
                85                  90                  95

Trp Tyr Leu Asn Tyr Ile Arg Leu His Ile Asp Pro Tyr Trp Thr Asn
            100                 105                 110

Asp Pro Gly Pro Ser Ile Pro Glu Asn Asp Ile Ser Arg Phe Asn Tyr
        115                 120                 125

Asn Arg Leu Val Thr Tyr Thr Asp Gln Val Ile Ile Pro Leu Ile Asn
    130                 135                 140

His Ala Arg Ser Arg Gly Met Tyr Val Ile Leu Arg Pro Pro Gly Val
145                 150                 155                 160

Cys Pro Asn Arg Ile Ala Val Asn Asp Ala Tyr His Ser Tyr Leu Lys
                165                 170                 175

Thr Val Trp Thr Phe Leu Ser Gln His Pro Gly Leu Lys Asn Ala Asp
            180                 185                 190

```
Asn Val Met Phe Glu Leu Ala Asn Glu Pro Val Glu Ile Leu Gly Thr
        195                 200                 205

Asn Gly Thr Trp Gly Gln Thr Gly Asn Glu His Phe Ala Ala Leu Lys
    210                 215                 220

Asn Phe Phe Gln Pro Leu Val Asn Ile Ile Arg Asn Asn Gly Ala Asn
225                 230                 235                 240

Asn Val Cys Trp Ile Pro Gly Thr Gly Trp Gln Ser His Tyr Gln Gly
                245                 250                 255

Tyr Pro Asn Asn Gln Ile Thr Gly Gly Asn Ile Gly Tyr Ala Val His
            260                 265                 270

Ile Tyr Pro Ser Tyr Trp Gly Gly Leu Ser Asn Tyr Gln Ala Phe Gln
        275                 280                 285

Asn Ala Trp Asn Ile Asn Val Lys Pro Ile Ala Asp Ile Ala Pro Ile
    290                 295                 300

Ala Ile Thr Glu Thr Asp Trp Ala Pro Gln Gly Tyr Gly Thr Phe Gly
305                 310                 315                 320

Ile Gly Thr Thr Gly Thr Ala Gly Gly Ser Gly Phe Gly Ala Asn Leu
                325                 330                 335

Lys Tyr Ile Val Asp Gln Ser Gly Asn Val Ser Trp Asn Val Leu Ala
            340                 345                 350

Pro Asp Asn Leu Leu His Lys Gly Asp Pro Asn Gly Gly Thr Ala Tyr
        355                 360                 365

Asn Asn Asp Trp Glu Ala Cys Ala Ala Pro Val Lys Gln Trp Phe Gln
    370                 375                 380

Gln Tyr Ala Lys Ser Asn Tyr Pro Val Gly Asn Cys Asn Thr Thr Ser
385                 390                 395                 400

Ser Leu Val Asn Asn Gly Ile Tyr Glu Ile Glu Phe Gln Thr Asp Ala
                405                 410                 415

Asn Lys Val Val Asp Leu Lys Ser Gly Glu Asp Ala Asn Gly Ala Val
            420                 425                 430

Leu Arg Pro Trp Thr Arg Asn Gly Ala Ala Ala Gln Arg Trp Val Ala
        435                 440                 445

Ile Asp Ala Gly Asn Gly Tyr Trp Arg Phe Val Ser Lys Ala Ser Ala
    450                 455                 460

Thr Asn Arg Cys Ile Thr Leu Ala Ser Asn Ser Asn Thr Leu Gly Thr
465                 470                 475                 480

Ser Ile Val Leu Trp Gln Asn Tyr Gly Asn Asp Ala Gln Ala Trp Gln
                485                 490                 495

Val Val Ala Val Ser Asn Gly Tyr Tyr Lys Ile Leu Ser Lys Val Asp
            500                 505                 510

Pro Thr Arg Gly Trp Asp Ile Pro Asn Cys Thr Met Asp Gly Asn Ser
        515                 520                 525

Asn Leu His Leu Trp Asp Tyr Tyr Gly Thr Ser Cys Gln Leu Phe Lys
    530                 535                 540

Phe Lys Tyr Ile Gly Met Asn
545                 550
```

<210> SEQ ID NO 7
<211> LENGTH: 620
<212> TYPE: PRT
<213> ORGANISM: Acetivibrio cellulyticus

<400> SEQUENCE: 7

```
Ala Asp Pro Gln Arg Gly Arg Pro Tyr Leu Asn Ser Ala Arg Thr Thr
```

-continued

```
1               5                   10                  15

Phe Val Gly Asp Asn Gly Gln Pro Leu Arg Gly Pro Tyr Ile Ser Thr
            20                  25                  30

Glu Trp Thr Ser Ala Ala Pro Tyr Asp Gln Ile Ala Arg Ile Lys Asn
        35                  40                  45

Leu Gly Phe Asn Ala Val His His Tyr Ala Glu Cys Phe Asp Ile Asn
    50                  55                  60

Tyr Pro Asn Ala Gly Ser Lys Ser Pro Gly Tyr Ala Ala Thr Glu Ile
65                  70                  75                  80

Asp Lys Val Val Glu Arg Thr Arg Glu Leu Gly Leu Tyr Leu Val Met
                85                  90                  95

Thr Ile Gly Asn Gly Ala Asn Asn Gly Asn His Asn Thr Arg Tyr Ala
            100                 105                 110

Lys Asp Phe Trp Ser Phe Tyr Ser Ser Arg Tyr Ala Asn Glu Thr His
        115                 120                 125

Val Leu Tyr Glu Ile His Asn Glu Pro Val Ala Trp Gly Pro Pro Tyr
    130                 135                 140

Ser Ser Thr Thr Ala Thr Pro Thr Gly Ala Val Glu Met Asn Val Asp
145                 150                 155                 160

Val Tyr Lys Thr Ile Arg Ala Asn Ala Pro Lys Thr Pro Val Leu Ile
                165                 170                 175

Phe Ser Tyr Ser Val Phe Gly Gly Thr Gly Gly Thr Thr Glu Ala Leu
            180                 185                 190

Lys Asp Ile Gln Ala Phe Asn Ser Ala Val Phe Gly Lys Gln Asp Ala
        195                 200                 205

Val Trp Thr Asn Glu Ala Val Ala Phe His Gly Tyr Ala Gly Trp Glu
    210                 215                 220

Ala Thr Ser Thr Ala Val Asp Gly Leu Leu Lys Ala Gly Tyr Pro Cys
225                 230                 235                 240

Phe Met Thr Glu Tyr Ala Gly Gly Ala Trp Gly Ser Gly Thr Gly Gly
                245                 250                 255

Phe Asp Ile Gln Leu Thr Ser Glu Leu Glu Arg Met Gly Val Ser Trp
            260                 265                 270

Leu Thr Phe Gln Tyr Ile Pro Pro Ser Gly Val Ser Asp Asp Val Thr
        275                 280                 285

Lys Pro Glu Tyr Phe Ser Ala Leu Val Glu Asn Ala Gly Leu Ser Trp
    290                 295                 300

Lys Pro Asp Tyr Gly Asn Trp Pro Ala Ala Arg Gly Val His Gly Asn
305                 310                 315                 320

Gly Gly Leu Pro Arg Lys Thr Ser Thr Trp Val Asn Asn Phe Leu Thr
                325                 330                 335

Gly Thr Thr Arg Ile Glu Ala Glu Asp Phe Asp Trp Gly Gly Asn Asp
            340                 345                 350

Val Ser Phe Tyr Asp Lys Asp Ser Glu Asn Lys Gly Ala Gln Tyr Arg
        355                 360                 365

Leu Asp Glu Ala Val Asp Ile Glu Thr Thr Lys Asp Ala Asp Gly Gly
    370                 375                 380

Tyr Asn Val Gly Trp Ile Glu Asp Gly Glu Trp Leu Glu Tyr Thr Ile
385                 390                 395                 400

Trp Val Gln His Pro Gly Tyr Tyr Asn Leu Ala Leu Arg Val Ala Asn
                405                 410                 415

Asn Ser Gly Gly Ser Val Gln Val Asn Phe Gly Asn Gln Asp Lys Thr
            420                 425                 430
```

Gly Thr Trp Val Leu Pro Val Thr Gly Gly Val Gln Thr Trp Lys Thr
435 440 445

Asp Thr Arg Gln Val Phe Leu Gly Ser Gly Arg Gln Lys Leu Arg Ile
450 455 460

Asn Ala Leu Ser Gly Gly Phe Asn Leu Asn Trp Ile Glu Leu Ser Pro
465 470 475 480

Val Ser Thr Gly Pro Ile Ala Asp Gly Thr Tyr Lys Phe Leu Asn Arg
485 490 495

Ala Asn Thr Met Thr Leu Gln Glu Val Thr Ser Asn Asn Ser Ile Val
500 505 510

Thr Ser Thr Tyr Lys Gly Thr Ala Asp Gln His Trp Lys Ile Gln His
515 520 525

Ile Gly Gly Gly Gln Tyr Arg Ile Ser Ser Ala Gly Arg Gly Trp Asn
530 535 540

Trp Asn Trp Trp Met Gly Phe Gly Thr Val Gly Trp Trp Gly Thr Gly
545 550 555 560

Ser Gly Thr Cys Phe Ile Ile Arg Pro Thr Gly Asp Gly Tyr Tyr Arg
565 570 575

Phe Val Leu Val Asn Asp Gly Thr Asn Leu Glu Ile Ser Asn Asn Asp
580 585 590

Ser Ser Lys Ile Glu Gly Lys Ala Tyr His Glu Gly Ala Asn Gln Gln
595 600 605

Trp Ala Ile Gln Leu Pro Ser Ala Pro Val Phe Pro
610 615 620

<210> SEQ ID NO 8
<211> LENGTH: 865
<212> TYPE: PRT
<213> ORGANISM: Clostridium thermocellum

<400> SEQUENCE: 8

Ala Ile Ala Leu Ser Ile Leu Ser Phe Ile Pro Asn Arg Ala Tyr Ala
1 5 10 15

Ser Pro Gln Arg Gly Arg Pro Arg Leu Asn Ala Ala Arg Thr Thr Phe
20 25 30

Val Gly Asp Asn Gly Gln Pro Leu Arg Gly Pro Tyr Thr Ser Thr Glu
35 40 45

Trp Thr Ala Ala Ala Pro Tyr Asp Gln Ile Ala Arg Val Lys Glu Leu
50 55 60

Gly Phe Asn Ala Val His Leu Tyr Ala Glu Cys Phe Asp Pro Arg Tyr
65 70 75 80

Pro Ala Pro Gly Ser Lys Ala Pro Gly Tyr Ala Val Asn Glu Ile Asp
85 90 95

Lys Ile Val Glu Arg Thr Arg Glu Leu Gly Leu Tyr Leu Val Ile Thr
100 105 110

Ile Gly Asn Gly Ala Asn Asn Gly Asn His Asn Ala Gln Trp Ala Arg
115 120 125

Asp Phe Trp Lys Phe Tyr Ala Pro Arg Tyr Ala Lys Glu Thr His Val
130 135 140

Leu Tyr Glu Ile His Asn Glu Pro Val Ala Trp Gly Pro Pro Tyr Ser
145 150 155 160

Ser Ser Thr Ala Asn Pro Pro Gly Ala Val Asp Met Glu Ile Asp Val
165 170 175

Tyr Arg Ile Ile Arg Thr Tyr Ala Pro Glu Thr Pro Val Leu Leu Phe

```
            180                 185                 190

Ser Tyr Ala Val Phe Gly Gly Lys Gly Gly Ala Ala Glu Ala Leu Lys
        195                 200                 205

Asp Ile Arg Ala Phe Asn Lys Ala Val Phe Gly Asn Glu Asn Ala Val
    210                 215                 220

Trp Thr Asn Glu Ala Val Ala Phe His Gly Tyr Ala Gly Trp Gln Glu
225                 230                 235                 240

Thr Thr Ile Ala Val Glu Glu Leu Leu Lys Ala Gly Tyr Pro Cys Phe
                245                 250                 255

Met Thr Glu Tyr Ala Gly Gly Ala Trp Gly Ser Gly Met Gly Gly Leu
            260                 265                 270

Asp Val Glu Leu Thr Tyr Glu Leu Glu Arg Leu Gly Val Ser Trp Leu
        275                 280                 285

Thr Phe Gln Tyr Ile Pro Pro Thr Gly Val Ser Asp Asp Val Thr Lys
    290                 295                 300

Pro Glu Tyr Phe Ser Ala Leu Val Glu Asn Ser Gly Leu Ser Trp Thr
305                 310                 315                 320

Pro Asp Tyr Gly Asn Trp Pro Ala Ala Arg Gly Val Tyr Gly Asn Gly
                325                 330                 335

Gly Leu Ala Arg Glu Thr Ala Thr Trp Ile Asn Asn Phe Leu Thr Gly
            340                 345                 350

Thr Thr Arg Ile Glu Ala Glu Asp Phe Asp Trp Gly Gly Asn Gly Val
        355                 360                 365

Ser Tyr Tyr Asp Thr Asp Ser Val Asn Val Gly Gly Gln Tyr Arg Pro
    370                 375                 380

Asp Glu Gly Val Asp Ile Glu Lys Thr Ser Asp Thr Gly Gly Gly Tyr
385                 390                 395                 400

Asn Val Gly Trp Ile Ser Glu Gly Glu Trp Leu Glu Tyr Thr Ile Arg
                405                 410                 415

Val Arg Asn Pro Gly Tyr Tyr Asn Leu Ser Leu Arg Val Ala Gly Ile
            420                 425                 430

Ser Gly Ser Arg Val Gln Val Ser Phe Gly Asn Gln Asp Lys Thr Gly
        435                 440                 445

Val Trp Glu Leu Pro Ala Thr Gly Gly Phe Gln Thr Trp Thr Thr Ala
    450                 455                 460

Thr Arg Gln Val Phe Leu Gly Ala Gly Leu Gln Lys Leu Arg Ile Asn
465                 470                 475                 480

Ala Leu Ser Gly Gly Phe Asn Leu Asn Trp Ile Glu Leu Ser Pro Ile
                485                 490                 495

Ser Thr Gly Thr Ile Pro Asp Gly Thr Tyr Lys Phe Leu Asn Arg Ala
            500                 505                 510

Asn Gly Lys Thr Leu Gln Glu Val Thr Gly Asn Asn Ser Ile Ile Thr
        515                 520                 525

Ala Asp Tyr Lys Gly Ile Thr Glu Gln His Trp Lys Ile Gln His Ile
    530                 535                 540

Gly Gly Gly Gln Tyr Arg Ile Ser Ser Ala Gly Arg Gly Trp Asn Trp
545                 550                 555                 560

Asn Trp Trp Met Gly Phe Gly Thr Val Gly Trp Trp Gly Thr Gly Ser
                565                 570                 575

Ser Thr Cys Phe Ile Ile Ser Pro Thr Gly Asp Gly Tyr Tyr Arg Ile
            580                 585                 590

Val Leu Val Gly Asp Gly Thr Asn Leu Gln Ile Ser Ser Gly Asp Pro
        595                 600                 605
```

Ser Lys Ile Glu Gly Lys Ala Phe His Gly Gly Ala Asn Gln Gln Trp
    610                 615                 620

Ala Ile Leu Pro Val Ser Ala Pro Ala Phe Pro Thr Gly Leu Ser Ala
625                 630                 635                 640

Val Leu Asp Ser Ser Gly Asn Thr Ala Asn Leu Thr Trp Asn Ala Ala
                645                 650                 655

Pro Gly Ala Asn Ser Tyr Asn Val Lys Arg Ser Thr Lys Ser Gly Gly
            660                 665                 670

Pro Tyr Thr Thr Ile Ala Thr Asn Ile Thr Ser Thr Asn Tyr Thr Asp
        675                 680                 685

Thr Gly Val Ala Thr Gly Thr Lys Tyr Tyr Tyr Val Val Ser Ala Val
    690                 695                 700

Ser Asn Gly Val Glu Thr Leu Asn Ser Ala Glu Ala Ile Leu Gln Tyr
705                 710                 715                 720

Pro Lys Leu Thr Gly Thr Val Ile Gly Thr Gln Gly Ser Trp Asn Asn
                725                 730                 735

Ile Gly Asn Thr Ile His Lys Ala Phe Asp Gly Asp Leu Asn Thr Phe
            740                 745                 750

Phe Asp Gly Pro Thr Ala Asn Gly Cys Trp Leu Gly Leu Asp Phe Gly
        755                 760                 765

Glu Gly Val Arg Asn Val Ile Thr Gln Ile Lys Phe Cys Pro Arg Ser
    770                 775                 780

Gly Tyr Glu Gln Arg Met Ile Gly Gly Ile Phe Gln Gly Ala Asn Lys
785                 790                 795                 800

Glu Asp Phe Ser Asp Ala Val Thr Leu Phe Thr Ile Thr Ser Leu Pro
                805                 810                 815

Gly Ser Gly Thr Leu Thr Ser Val Asp Val Asp Asn Pro Thr Gly Phe
            820                 825                 830

Arg Tyr Val Arg Tyr Leu Ser Pro Asp Gly Ser Asn Gly Asn Ile Ala
        835                 840                 845

Glu Leu Gln Phe Phe Gly Thr Pro Ala Gly Glu Glu Asn Asp Asp Val
    850                 855                 860

His
865

<210> SEQ ID NO 9
<211> LENGTH: 573
<212> TYPE: PRT
<213> ORGANISM: Paenibacillus illinoisensis

<400> SEQUENCE: 9

Met Lys Lys Pro Leu Gly Lys Ile Val Ala Ser Thr Ala Leu Leu Ile
1               5                   10                  15

Ser Val Ala Phe Ser Ser Ser Ile Ala Ser Ala His Gln His Gln His
            20                  25                  30

Gln His Pro Arg Trp Val Gly Met Pro Met Gly Lys Leu His Val Ser
        35                  40                  45

Gly Lys Asn Leu Val Asn Ser Asn Asn Gln Pro Val Leu Leu Asn Gly
    50                  55                  60

Trp His Gln Pro Ser Gly Ala Tyr Trp Thr Tyr Gln Ser Ser Asn Tyr
65                  70                  75                  80

Tyr Leu Asn Leu His Gly Asn Asn Arg His Ala Ala Thr Leu Ala Tyr
                85                  90                  95

Leu Lys Asp Ile Thr Asp Thr Phe Ala Asp Thr Ser Pro Lys Tyr Gly

-continued

```
            100                 105                 110

Ser Asn His Gly Trp Asn Met Asn Gln Val Arg Leu Phe Ile Asp Arg
        115                 120                 125

Glu Asp Met Gly Asp Val Ala Ala Gly Thr Tyr Asn Phe Ala Gly Val
    130                 135                 140

Gln Thr Val Thr Gln Asn Val Ile Ile Pro Tyr Ile Gln Tyr Ala Lys
145                 150                 155                 160

Thr Lys Gly Val Tyr Val Val Leu Gly Leu Asp Phe Thr Leu Lys Asp
                165                 170                 175

Asp Gln Ala Thr Thr Ala Ser Asn Leu Gln Lys Phe Asn Gln Ile Trp
            180                 185                 190

Gly Tyr Leu Ala Ser Arg Pro Glu Ile Lys Ser Ala Asp Asn Val His
        195                 200                 205

Phe Glu Leu Ile Asn Glu Pro Val Lys Ser Tyr Ala Asn Gly His Trp
    210                 215                 220

Gly Gly Tyr Asn Gly Glu Asn Asp Phe Val Asp His Trp Asn Asp Leu
225                 230                 235                 240

Arg Asn Phe Gln Asn Ser Ile Ile Ser Thr Ile Arg Ser Gln Gly Ala
                245                 250                 255

Asp Asn Val Ile Trp Ala Ala Gly Leu Gly Tyr Asn Gln Phe Tyr Ser
            260                 265                 270

Leu Thr Ala Ser His Pro Leu Thr Asp Pro Leu Asn Asn Tyr Gly Tyr
        275                 280                 285

Ala Val His Trp Tyr Pro Gly Tyr Gly Ala Tyr Asp Asn Phe Ser Ile
    290                 295                 300

Leu Gln Asp Gln Trp Asn Thr Asn Val Lys Ala Ala Ala Asp Lys Tyr
305                 310                 315                 320

Pro Ile Asn Ile Thr Glu Val Thr Trp Phe Lys Asn Lys Pro Gly Asp
                325                 330                 335

Ser Ala Tyr Trp Asn Leu Phe Asn Gly Ser Asn Glu Gly Phe Gly Thr
            340                 345                 350

Asn Thr Lys Thr Ile Phe Asn Ala Ala Gly Asn Val Ser Ile Ala Ala
        355                 360                 365

His Met Asn Gly Phe Ile Leu Glu Pro Gly Gln Arg Ser Ser Phe Ala
    370                 375                 380

Asp Pro Thr Ala Gly Leu Lys Trp Asp Gly Asp Ala Ser Arg Ser Ala
385                 390                 395                 400

Met Gly Arg Phe Leu Phe Asn Trp Tyr His Glu Arg Ala Gln Ser Tyr
                405                 410                 415

Pro Gly Gly Asn Gly Gly Gly Pro Thr Thr Gly Leu Val Ser Gly Ala
            420                 425                 430

Thr Tyr Lys Ile Val Ala Arg His Ser Asn Lys Val Ile Asp Val Pro
        435                 440                 445

Gly Gly Gln Asn Gln Asn Asn Leu Gln Leu Gln Gln Trp Ser Asp Leu
    450                 455                 460

Gly Gly Asn Pro Gln Lys Trp Val Leu Thr Ser Ile Gly Gly Gly Ser
465                 470                 475                 480

Tyr Thr Leu Thr Ser Val Asn Ser Pro Asp Lys Val Ile Asp Ile Arg
                485                 490                 495

Asn Gly Thr Leu Thr Asn Gly Glu Ala Val Gln Leu Met Ser Asn Leu
            500                 505                 510

Asn Thr Thr Ala Gln His Phe Lys Val Asn Asp Leu Gly Asn Gly Tyr
        515                 520                 525
```

Trp Ser Ile Ile Asn Val Asn Ser Asn Lys Ala Ile Glu Val Glu Asn
    530                 535                 540

Ala Ser Thr Ser Asp Gly Ala Lys Leu Gln Gln Asn Thr Tyr Thr Gly
545                 550                 555                 560

Ala Thr Asn Gln Gln Trp Lys Phe Ile Ala Val Ser Asn
                565                 570

<210> SEQ ID NO 10
<211> LENGTH: 582
<212> TYPE: PRT
<213> ORGANISM: Paenibacillus sp.

<400> SEQUENCE: 10

Met Lys Lys Pro Leu Gly Lys Ile Val Ala Ser Thr Ala Leu Leu Ile
1               5                   10                  15

Ser Val Ala Phe Ser Ser Ser Ile Ala Ser Ala His His His His His
            20                  25                  30

His Pro Arg Leu Thr Val Pro Pro Gly Ala Pro Ala Glu Ala Trp Ser
        35                  40                  45

Gly Met Pro Thr Pro Lys Leu His Val Ser Gly Asn Gln Leu Val Asn
    50                  55                  60

Ala Asn Gly Gln Pro Val Leu Leu Ser Gly Trp His Gln Pro Ser Gly
65                  70                  75                  80

Ser Tyr Trp Thr Tyr Gln Ser Ser Ser Tyr Tyr Leu Asp Arg Asn Gly
                85                  90                  95

Gly Asn Arg His Ala Ala Asn Leu Ala Tyr Leu Lys Asp Ile Thr Asp
            100                 105                 110

Thr Phe Thr Asp Thr Ser Pro Lys Tyr Gly Asn Asn His Gly Trp Tyr
        115                 120                 125

Met Asn Gln Val Arg Leu Phe Ile Asp Arg Glu Asp Met Gly Asp Val
    130                 135                 140

Ala Glu Gly Thr Tyr Asn Phe Ala Gly Leu Gln Ala Val Thr Gln Asn
145                 150                 155                 160

Val Ile Ile Pro Tyr Ile Asn Tyr Ala Arg Thr Lys Gly Leu Tyr Val
                165                 170                 175

Thr Leu Gly Leu Asp Phe Thr Leu Lys Asp Asn Gln Ala Thr Thr Gln
            180                 185                 190

Ala Asn Leu Asp Lys Phe Asn Gln Ile Trp Ser Tyr Leu Ala Ser Arg
        195                 200                 205

Pro Glu Ile Arg Ser Ala Asp Asn Val Met Phe Glu Ile Ile Asn Glu
    210                 215                 220

Pro Val Leu Ser Tyr Ala Asp Gly Arg Trp Gly Gly His Pro Ser Asp
225                 230                 235                 240

Pro His Phe Ile Ala Phe Trp Asn Asp Leu Arg Ser Phe Gln Asn Ser
                245                 250                 255

Ile Ile Ser Ser Ile Arg Ala Gln Gly Ala Asp Asn Val Ile Trp Ala
            260                 265                 270

Ala Gly Leu Gly Trp Asp Gln Tyr Tyr Gln Leu Cys Ala Ser His Pro
        275                 280                 285

Leu Thr Asp Pro Leu Asn Asn Val Gly Tyr Ala Val His Trp Tyr Pro
    290                 295                 300

Gly Tyr Gly Ala Gly Asp Asn Tyr Ser Val Leu Gln Gln Gln Trp Asp
305                 310                 315                 320

Thr Asn Ile Lys Pro Cys Ala Asp Asn Tyr Pro Ile Asn Ile Thr Glu

```
                325                 330                 335

Thr Thr Trp Phe Lys Arg Leu Pro Gly Asp Ser Asp Tyr Trp Asn Leu
            340                 345                 350

Phe Asn Gly Ser Ser Glu Gly Phe Gly Lys Asn Thr Lys Ala Ile Phe
        355                 360                 365

Thr Ala Ala Gly Asn Ala Ser Ile Ala Val His Met Asn Gly Phe Leu
    370                 375                 380

Leu Ala Pro Gly Ala Arg Ser Ser Phe Ala Asp Pro Thr Ala Gly Leu
385                 390                 395                 400

Leu Tyr Asp Gly Asn Thr Ala Arg Asp Gly Met Ala Arg Phe Ile Phe
                405                 410                 415

Glu Trp Tyr Tyr Glu Arg Ala Gln Phe Leu Pro Trp Asn Gly Ile Trp
            420                 425                 430

Asn Gly Leu Phe Thr Gly Ser Thr Tyr Lys Phe Val Asn Arg Ala Thr
        435                 440                 445

Gly Lys Asn Met Asp Val Pro Gly Gly Gln Asn Asn Asn Asn Leu Gln
    450                 455                 460

Leu Asn Gln Trp Thr Asp Asn Gly Ala Thr Ala Gln Arg Trp Val Val
465                 470                 475                 480

Asp Asp Met Gly Thr Phe Asn Asn Ile Tyr Arg Met Lys Ser Val Ser
                485                 490                 495

Ser Ser Asp Gly Lys Val Met Asp Val Arg Asn Gly Thr Lys Asn Asn
            500                 505                 510

Gly Glu Ala Ile Gln Leu Met Gln Asp Phe Ser Asn Thr Ala Gln Arg
        515                 520                 525

Phe Arg Ile Ile Arg Leu Ser Asn Gly Tyr Trp Ser Ile Ile Asn Val
    530                 535                 540

Asn Ser Asn Lys Ala Val Glu Val Ala Gly Gly Ala Ser His Asp Gly
545                 550                 555                 560

Ala Leu Leu Gln Gln Asn Met Tyr Arg Gly Asp His His Gln Gln Trp
                565                 570                 575

Gln Leu Val Gln Ile Gln
            580


<210> SEQ ID NO 11
<211> LENGTH: 325
<212> TYPE: PRT
<213> ORGANISM: Talaromyces pinophilus

<400> SEQUENCE: 11

Met His Phe Leu Ala Ala Leu Leu Ala Val Leu Pro Leu Val Ser Gly
1               5                   10                  15

Ser Pro Val Pro Glu Lys Arg Ser Gly Cys Ala Leu Pro Ser Thr Tyr
            20                  25                  30

Lys Trp Thr Ser Thr Gly Pro Leu Ala Ser Pro Lys Ser Gly Leu Val
        35                  40                  45

Ala Leu Arg Asp Tyr Ser His Val Ile Tyr Asn Gly Gln His Leu Val
    50                  55                  60

Tyr Gly Ser Thr Ala Asn Thr Ala Gly Ser Tyr Gly Ser Met Asn Phe
65                  70                  75                  80

Gly Leu Phe Ser Asp Trp Ser Glu Met Ser Ser Ala Ser Gln Asn Thr
                85                  90                  95

Met Ser Thr Gly Ala Val Ala Pro Thr Ile Phe Tyr Phe Ala Pro Lys
            100                 105                 110
```

```
Ser Val Trp Ile Leu Ala Tyr Gln Trp Gly Pro Tyr Ala Phe Ser Tyr
        115                 120                 125

Arg Thr Ser Thr Asp Pro Ser Asn Ala Asn Gly Trp Ser Ser Pro Gln
    130                 135                 140

Pro Leu Phe Thr Gly Thr Ile Ser Gly Ser Ser Thr Gly Val Ile Asp
145                 150                 155                 160

Gln Thr Val Ile Gly Asp Ser Glu Asn Met Tyr Leu Phe Phe Ala Gly
                165                 170                 175

Asp Asn Gly His Ile Tyr Arg Ala Ser Met Pro Ile Gly Asp Phe Pro
            180                 185                 190

Gly Ser Phe Gly Ser Ala Ser Thr Ile Val Leu Ser Asp Ser Thr Asn
        195                 200                 205

Asn Leu Phe Glu Ala Val Glu Val Tyr Thr Val Glu Gly Gln Asn Gln
    210                 215                 220

Tyr Leu Met Ile Val Glu Ala Ile Gly Ala Asn Gly Arg Tyr Phe Arg
225                 230                 235                 240

Ser Phe Thr Ala Ser Ser Leu Gly Gly Thr Trp Thr Ala Gln Ala Ser
                245                 250                 255

Thr Glu Ser Asn Pro Phe Ala Gly Lys Ala Asn Ser Gly Ala Thr Trp
            260                 265                 270

Thr Asn Asp Ile Ser Ser Gly Asp Leu Val Arg Thr Asn Pro Asp Gln
        275                 280                 285

Thr Gln Thr Ile Asp Ala Cys Asn Leu Gln Phe Leu Tyr Gln Gly Arg
    290                 295                 300

Ser Thr Ser Ser Gly Gly Asp Tyr Asn Leu Leu Pro Tyr Gln Pro Gly
305                 310                 315                 320

Leu Leu Thr Leu Ala
                325


<210> SEQ ID NO 12
<211> LENGTH: 792
<212> TYPE: PRT
<213> ORGANISM: Aspergillus fumigatus

<400> SEQUENCE: 12

Met Ala Val Ala Lys Ser Ile Ala Ala Val Leu Val Ala Leu Leu Pro
1               5                   10                  15

Gly Ala Leu Ala Gln Ala Asn Thr Ser Tyr Val Asp Tyr Asn Val Glu
            20                  25                  30

Ala Asn Pro Asp Leu Thr Pro Gln Ser Val Ala Thr Ile Asp Leu Ser
        35                  40                  45

Phe Pro Asp Cys Glu Asn Gly Pro Leu Ser Lys Thr Leu Val Cys Asp
    50                  55                  60

Thr Ser Ala Arg Pro His Asp Arg Ala Ala Ala Leu Val Ser Met Phe
65                  70                  75                  80

Thr Phe Glu Glu Leu Val Asn Asn Thr Gly Asn Thr Ser Pro Gly Val
                85                  90                  95

Pro Arg Leu Gly Leu Pro Pro Tyr Gln Val Trp Ser Glu Ala Leu His
            100                 105                 110

Gly Leu Asp Arg Ala Asn Phe Thr Asn Glu Gly Glu Tyr Ser Trp Ala
        115                 120                 125

Thr Ser Phe Pro Met Pro Ile Leu Thr Met Ser Ala Leu Asn Arg Thr
    130                 135                 140

Leu Ile Asn Gln Ile Ala Thr Ile Ile Ala Thr Gln Gly Arg Ala Phe
145                 150                 155                 160
```

Asn Asn Val Gly Arg Tyr Gly Leu Asp Val Tyr Ala Pro Asn Ile Asn
165 170 175

Ala Phe Arg Ser Ala Met Trp Gly Arg Gly Gln Glu Thr Pro Gly Glu
180 185 190

Asp Ala Tyr Cys Leu Ala Ser Ala Tyr Ala Tyr Glu Tyr Ile Thr Gly
195 200 205

Ile Gln Gly Gly Val Asp Pro Glu His Leu Lys Leu Val Ala Thr Ala
210 215 220

Lys His Tyr Ala Gly Tyr Asp Leu Glu Asn Trp Asp Gly His Ser Arg
225 230 235 240

Leu Gly Asn Asp Met Asn Ile Thr Gln Gln Glu Leu Ser Glu Tyr Tyr
245 250 255

Thr Pro Gln Phe Leu Val Ala Ala Arg Asp Ala Lys Val His Ser Val
260 265 270

Met Cys Ser Tyr Asn Ala Val Asn Gly Val Pro Ser Cys Ala Asn Ser
275 280 285

Phe Phe Leu Gln Thr Leu Leu Arg Asp Thr Phe Gly Phe Val Glu Asp
290 295 300

Gly Tyr Val Ser Ser Asp Cys Asp Ser Ala Tyr Asn Val Trp Asn Pro
305 310 315 320

His Glu Phe Ala Ala Asn Ile Thr Gly Ala Ala Ala Asp Ser Ile Arg
325 330 335

Ala Gly Thr Asp Ile Asp Cys Gly Thr Thr Tyr Gln Tyr Tyr Phe Gly
340 345 350

Glu Ala Phe Asp Glu Gln Glu Val Thr Arg Ala Glu Ile Glu Arg Gly
355 360 365

Val Ile Arg Leu Tyr Ser Asn Leu Val Arg Leu Gly Tyr Phe Asp Gly
370 375 380

Asn Gly Ser Val Tyr Arg Asp Leu Thr Trp Asn Asp Val Val Thr Thr
385 390 395 400

Asp Ala Trp Asn Ile Ser Tyr Glu Ala Ala Val Glu Gly Ile Val Leu
405 410 415

Leu Lys Asn Asp Gly Thr Leu Pro Leu Ala Lys Ser Val Arg Ser Val
420 425 430

Ala Leu Ile Gly Pro Trp Met Asn Val Thr Thr Gln Leu Gln Gly Asn
435 440 445

Tyr Phe Gly Pro Ala Pro Tyr Leu Ile Ser Pro Leu Asn Ala Phe Gln
450 455 460

Asn Ser Asp Phe Asp Val Asn Tyr Ala Phe Gly Thr Asn Ile Ser Ser
465 470 475 480

His Ser Thr Asp Gly Phe Ser Glu Ala Leu Ser Ala Ala Lys Lys Ser
485 490 495

Asp Val Ile Ile Phe Ala Gly Gly Ile Asp Asn Thr Leu Glu Ala Glu
500 505 510

Ala Met Asp Arg Met Asn Ile Thr Trp Pro Gly Asn Gln Leu Gln Leu
515 520 525

Ile Asp Gln Leu Ser Gln Leu Gly Lys Pro Leu Ile Val Leu Gln Met
530 535 540

Gly Gly Gly Gln Val Asp Ser Ser Ser Leu Lys Ser Asn Lys Asn Val
545 550 555 560

Asn Ser Leu Ile Trp Gly Gly Tyr Pro Gly Gln Ser Gly Gly Gln Ala
565 570 575

Leu Leu Asp Ile Ile Thr Gly Lys Arg Ala Pro Ala Gly Arg Leu Val
580 585 590

Val Thr Gln Tyr Pro Ala Glu Tyr Ala Thr Gln Phe Pro Ala Thr Asp
595 600 605

Met Ser Leu Arg Pro His Gly Asn Asn Pro Gly Gln Thr Tyr Met Trp
610 615 620

Tyr Thr Gly Thr Pro Val Tyr Glu Phe Gly His Gly Leu Phe Tyr Thr
625 630 635 640

Thr Phe His Ala Ser Leu Pro Gly Thr Gly Lys Asp Lys Thr Ser Phe
645 650 655

Asn Ile Gln Asp Leu Leu Thr Gln Pro His Pro Gly Phe Ala Asn Val
660 665 670

Glu Gln Met Pro Leu Leu Asn Phe Thr Val Thr Ile Thr Asn Thr Gly
675 680 685

Lys Val Ala Ser Asp Tyr Thr Ala Met Leu Phe Ala Asn Thr Thr Ala
690 695 700

Gly Pro Ala Pro Tyr Pro Asn Lys Trp Leu Val Gly Phe Asp Arg Leu
705 710 715 720

Ala Ser Leu Glu Pro His Arg Ser Gln Thr Met Thr Ile Pro Val Thr
725 730 735

Ile Asp Ser Val Ala Arg Thr Asp Glu Ala Gly Asn Arg Val Leu Tyr
740 745 750

Pro Gly Lys Tyr Glu Leu Ala Leu Asn Asn Glu Arg Ser Val Val Leu
755 760 765

Gln Phe Val Leu Thr Gly Arg Glu Ala Val Ile Phe Lys Trp Pro Val
770 775 780

Glu Gln Gln Gln Ile Ser Ser Ala
785 790

<210> SEQ ID NO 13
<211> LENGTH: 780
<212> TYPE: PRT
<213> ORGANISM: Trichoderma reesei

<400> SEQUENCE: 13

Met Val Asn Asn Ala Ala Leu Leu Ala Ala Leu Ser Ala Leu Leu Pro
1 5 10 15

Thr Ala Leu Ala Gln Asn Asn Gln Thr Tyr Ala Asn Tyr Ser Ala Gln
20 25 30

Gly Gln Pro Asp Leu Tyr Pro Glu Thr Leu Ala Thr Leu Thr Leu Ser
35 40 45

Phe Pro Asp Cys Glu His Gly Pro Leu Lys Asn Asn Leu Val Cys Asp
50 55 60

Ser Ser Ala Gly Tyr Val Glu Arg Ala Gln Ala Leu Ile Ser Leu Phe
65 70 75 80

Thr Leu Glu Glu Leu Ile Leu Asn Thr Gln Asn Ser Gly Pro Gly Val
85 90 95

Pro Arg Leu Gly Leu Pro Asn Tyr Gln Val Trp Asn Glu Ala Leu His
100 105 110

Gly Leu Asp Arg Ala Asn Phe Ala Thr Lys Gly Gly Gln Phe Glu Trp
115 120 125

Ala Thr Ser Phe Pro Met Pro Ile Leu Thr Thr Ala Ala Leu Asn Arg
130 135 140

Thr Leu Ile His Gln Ile Ala Asp Ile Ile Ser Thr Gln Ala Arg Ala
145 150 155 160

```
Phe Ser Asn Ser Gly Arg Tyr Gly Leu Asp Val Tyr Ala Pro Asn Val
                165                 170                 175

Asn Gly Phe Arg Ser Pro Leu Trp Gly Arg Gly Gln Glu Thr Pro Gly
            180                 185                 190

Glu Asp Ala Phe Phe Leu Ser Ser Ala Tyr Thr Tyr Glu Tyr Ile Thr
        195                 200                 205

Gly Ile Gln Gly Gly Val Asp Pro Glu His Leu Lys Val Ala Ala Thr
    210                 215                 220

Val Lys His Phe Ala Gly Tyr Asp Leu Glu Asn Trp Asn Asn Gln Ser
225                 230                 235                 240

Arg Leu Gly Phe Asp Ala Ile Ile Thr Gln Gln Asp Leu Ser Glu Tyr
                245                 250                 255

Tyr Thr Pro Gln Phe Leu Ala Ala Ala Arg Tyr Ala Lys Ser Arg Ser
            260                 265                 270

Leu Met Cys Ala Tyr Asn Ser Val Asn Gly Val Pro Ser Cys Ala Asn
        275                 280                 285

Ser Phe Phe Leu Gln Thr Leu Leu Arg Glu Ser Trp Gly Phe Pro Glu
    290                 295                 300

Trp Gly Tyr Val Ser Ser Asp Cys Asp Ala Val Tyr Asn Val Phe Asn
305                 310                 315                 320

Pro His Asp Tyr Ala Ser Asn Gln Ser Ser Ala Ala Ala Ser Ser Leu
                325                 330                 335

Arg Ala Gly Thr Asp Ile Asp Cys Gly Gln Thr Tyr Pro Trp His Leu
            340                 345                 350

Asn Glu Ser Phe Val Ala Gly Glu Val Ser Arg Gly Glu Ile Glu Arg
        355                 360                 365

Ser Val Thr Arg Leu Tyr Ala Asn Leu Val Arg Leu Gly Tyr Phe Asp
    370                 375                 380

Lys Lys Asn Gln Tyr Arg Ser Leu Gly Trp Lys Asp Val Val Lys Thr
385                 390                 395                 400

Asp Ala Trp Asn Ile Ser Tyr Glu Ala Ala Val Glu Gly Ile Val Leu
                405                 410                 415

Leu Lys Asn Asp Gly Thr Leu Pro Leu Ser Lys Lys Val Arg Ser Ile
            420                 425                 430

Ala Leu Ile Gly Pro Trp Ala Asn Ala Thr Thr Gln Met Gln Gly Asn
        435                 440                 445

Tyr Tyr Gly Pro Ala Pro Tyr Leu Ile Ser Pro Leu Glu Ala Ala Lys
    450                 455                 460

Lys Ala Gly Tyr His Val Asn Phe Glu Leu Gly Thr Glu Ile Ala Gly
465                 470                 475                 480

Asn Ser Thr Thr Gly Phe Ala Lys Ala Ile Ala Ala Ala Lys Lys Ser
                485                 490                 495

Asp Ala Ile Ile Tyr Leu Gly Gly Ile Asp Asn Thr Ile Glu Gln Glu
            500                 505                 510

Gly Ala Asp Arg Thr Asp Ile Ala Trp Pro Gly Asn Gln Leu Asp Leu
        515                 520                 525

Ile Lys Gln Leu Ser Glu Val Gly Lys Pro Leu Val Val Leu Gln Met
    530                 535                 540

Gly Gly Gly Gln Val Asp Ser Ser Ser Leu Lys Ser Asn Lys Lys Val
545                 550                 555                 560

Asn Ser Leu Val Trp Gly Gly Tyr Pro Gly Gln Ser Gly Gly Val Ala
                565                 570                 575
```

-continued

Leu Phe Asp Ile Leu Ser Gly Lys Arg Ala Pro Ala Gly Arg Leu Val
580 585 590

Thr Thr Gln Tyr Pro Ala Glu Tyr Val His Gln Phe Pro Gln Asn Asp
595 600 605

Met Asn Leu Arg Pro Asp Gly Lys Ser Asn Pro Gly Gln Thr Tyr Ile
610 615 620

Trp Tyr Thr Gly Lys Pro Val Tyr Glu Phe Gly Ser Gly Leu Phe Tyr
625 630 635 640

Thr Thr Phe Lys Glu Thr Leu Ala Ser His Pro Lys Ser Leu Lys Phe
645 650 655

Asn Thr Ser Ser Ile Leu Ser Ala Pro His Pro Gly Tyr Thr Tyr Ser
660 665 670

Glu Gln Ile Pro Val Phe Thr Phe Glu Ala Asn Ile Lys Asn Ser Gly
675 680 685

Lys Thr Glu Ser Pro Tyr Thr Ala Met Leu Phe Val Arg Thr Ser Asn
690 695 700

Ala Gly Pro Ala Pro Tyr Pro Asn Lys Trp Leu Val Gly Phe Asp Arg
705 710 715 720

Leu Ala Asp Ile Lys Pro Gly His Ser Ser Lys Leu Ser Ile Pro Ile
725 730 735

Pro Val Ser Ala Leu Ala Arg Val Asp Ser His Gly Asn Arg Ile Val
740 745 750

Tyr Pro Gly Lys Tyr Glu Leu Ala Leu Asn Thr Asp Glu Ser Val Lys
755 760 765

Leu Glu Phe Glu Leu Val Gly Glu Glu Val Thr Ile
770 775 780

<210> SEQ ID NO 14
<211> LENGTH: 413
<212> TYPE: PRT
<213> ORGANISM: Rasamsonia byssochlamydoides

<400> SEQUENCE: 14

Met Lys Thr Val Thr Thr Leu Ser Thr Leu Ser Ala Leu Cys Gly Leu
1 5 10 15

Ala Thr Ala Trp Leu Pro Gly Val His Lys Asp Ile Tyr Ser Val Asp
20 25 30

Gly Gln Asn His Phe Asn Lys Thr Ala Gly Ser Ala Asp Lys Arg Trp
35 40 45

Leu Pro Ala Ser Gly Lys Ile Arg Gly Val Asp Leu Gly Ser Leu Phe
50 55 60

Val Phe Glu Pro Trp Ile Ala Glu Asn Ala Trp Ser Gln Met Gly Cys
65 70 75 80

Gly Gly Lys Gln Ser Glu Phe Asp Cys Val Ser Ala Leu Gly Gln Ser
85 90 95

Ala Ala Asn Ser Ala Phe Ala Ser His Trp Gly Ser Trp Ile Thr Lys
100 105 110

Asp Asp Ile Thr Gln Met Gln Ser Tyr Gly Leu Asn Thr Val Arg Ile
115 120 125

Pro Val Gly Tyr Trp Leu Lys Glu Asp Ile Val Tyr Ser Asp Ser Glu
130 135 140

His Phe Pro Gln Gly Gly Leu Ser Tyr Leu Glu Gln Val Cys Gly Trp
145 150 155 160

Ala Ser Asp Ala Gly Phe Tyr Ile Ile Ile Asp Leu His Gly Ala Pro
165 170 175

Gly Ala Gln Val Pro Gln Asn Pro Asp Thr Gly Gln Tyr Ala Pro Thr
180 185 190

Ala Gly Phe Tyr Val Asp Tyr Gln Tyr Glu Arg Ala Leu Glu Phe Leu
195 200 205

Glu Trp Met Thr Thr Asn Ile His Thr Asn Asn Asn Phe Arg Asn Val
210 215 220

Gly Met Leu Glu Ile Val Asn Glu Pro Leu Gln Asn Pro Asp Gln Val
225 230 235 240

Ala Thr Met Arg Thr Ser Tyr Tyr Pro Asn Ala Phe Ser Arg Ile Arg
245 250 255

Ala Ala Glu Gln Lys Leu Gly Ile Thr Ala Asn Asn Tyr Leu His Ile
260 265 270

Gln Met Met Asn Ala Lys Trp Gly Ser Gly Asp Pro Thr Gln Ala Leu
275 280 285

Thr Asp Thr Tyr Phe Ala Ala Tyr Asp Asp His Arg Tyr Leu Lys Trp
290 295 300

Asp Ser Ser Val Pro Val Ser Pro Gln Ser Tyr Leu Ser Thr Ser Cys
305 310 315 320

Asn Asp Asp Arg Gly Gly Asn Trp Pro Thr Ile Val Gly Glu Phe Ser
325 330 335

Leu Ser Pro Pro Asp Asp Val Gln Trp Thr Ala Glu Trp Asp Pro Gly
340 345 350

Thr Asn Gln Asp Phe Tyr Lys Lys Trp Phe Ala Ala Gln Val Met Ala
355 360 365

Tyr Glu Lys Gln Gln Gly Trp Ile Phe Trp Thr Trp Lys Ser Gln Leu
370 375 380

Gly Asp Tyr Arg Trp Ser Tyr Gln Asp Ala Val Ala Ala Gly Val Ile
385 390 395 400

Pro Thr Asp Leu Asp Ser Val Tyr Asn Met Gly Ala Cys
405 410

<210> SEQ ID NO 15
<211> LENGTH: 408
<212> TYPE: PRT
<213> ORGANISM: Trichoderma atroviride

<400> SEQUENCE: 15

Met Leu Ser Ala Tyr Ala Phe Ser Leu Leu Val Ala Ser Ala Ser Ala
1 5 10 15

Trp Thr Pro Gln Ser Asn Ala Lys Val Phe Ser Arg Asp Thr Glu Gly
20 25 30

Val Met Arg Trp Leu Pro Gly Asn Asp Lys Phe Arg Gly Val Asn Leu
35 40 45

Gly Ser Gln Phe Ile Ile Glu Pro Trp Met Ala Ser Asp Glu Phe Ser
50 55 60

Gly Met Gly Cys Gly Gly Leu Asn Asp Glu Trp Ser Cys Val Gln Ser
65 70 75 80

Leu Gly Gln Asp Ala Ala Asp Ala Ala Phe Gln Lys His Trp Asp Ser
85 90 95

Trp Ile Thr Gln Asp Asp Ile Thr Gln Ile Lys Asn Leu Gly Leu Asn
100 105 110

Thr Val Arg Ile Pro Val Gly Phe Trp Ile Arg Glu Asp Leu Val Gln
115 120 125

Gln Gly Glu Phe Phe Pro Arg Gly Gly Ile Gln Tyr Leu Asp Arg Leu

```
    130                 135                 140

Val Gly Trp Cys Asn Asp Ala Gly Ile Tyr Val Ile Met Asp Leu His
145                 150                 155                 160

Gly Gly Pro Gly Ala Gln Phe Pro Asn Gln Gln Tyr Thr Gly His Gly
                165                 170                 175

Val Ser Gln Pro Gly Phe Tyr Thr Glu Ala Asn Tyr Glu Arg Ala Ala
            180                 185                 190

Asn Phe Leu Glu Trp Met Thr Glu Arg Ile His Thr Asn Ala Thr Tyr
        195                 200                 205

Ala Ser Val Gly Met Leu Glu Val Ile Asn Glu Pro Val His Ser Gly
    210                 215                 220

Asp Phe Pro Ser Gln Ala Ala Asp Met Val Asn Thr Tyr Tyr Pro Leu
225                 230                 235                 240

Ala Trp Asn Arg Ile Arg Asp Thr Glu Ser Lys Leu Gly Val Ser Asp
                245                 250                 255

Asp Lys Arg Leu His Ile Gln Phe Met Ala Ser Ala Trp Gly Ser Gly
            260                 265                 270

Asp Pro Thr Ser Ala Leu Pro Ser Thr Asp Phe Ala Ala Phe Asp Asp
        275                 280                 285

His Arg Tyr Leu Lys Trp Asp Thr Ser Val Thr Ala Thr Lys Asp Gly
    290                 295                 300

Tyr Leu Asn Ala Ala Cys Ser Asp Lys Arg Asp Asp Asn Val Ile Val
305                 310                 315                 320

Gly Glu Trp Ser Ile Ser Val Ala Asp Asn Val Gln Asp Asn Asp Glu
                325                 330                 335

Leu Gly Ile Lys Asn Arg Ser Asp Gln Ala Asp Trp Tyr Gln Lys Phe
            340                 345                 350

Trp Ala Ala Gln Val Leu Ala Phe Glu Lys Ser Ala Gly Trp Val Phe
        355                 360                 365

Trp Thr Trp Lys Cys Asn Trp Ile Thr Gly Tyr Asp Asp Trp Arg Trp
    370                 375                 380

Cys Tyr Gln Ser Ala Val Ala Ala Gly Ala Ile Pro Lys Asp Ala Gly
385                 390                 395                 400

Ser Ala Ala Ser Ile Asn Pro Cys
                405


<210> SEQ ID NO 16
<211> LENGTH: 429
<212> TYPE: PRT
<213> ORGANISM: Trichoderma atroviride

<400> SEQUENCE: 16

Met Arg Tyr Ser Phe Val Ala Pro Ala Leu Leu Ala Gly Thr Ala Tyr
1               5                   10                  15

Ala Trp Leu Pro Gln Glu Arg Asp Leu Ala Ala Phe Asn Gln Thr Ala
            20                  25                  30

Arg Phe Glu Gln Leu Gly Lys Arg Phe Glu Pro Thr Leu Ala Ser Gly
        35                  40                  45

Val Thr Lys Ile Arg Gly Val Asn Phe Gly Gly Trp Leu Ile Cys Glu
    50                  55                  60

Pro Trp Met Met Pro Thr Glu Trp Asn Ser Val Met Gly Cys Asn Asn
65                  70                  75                  80

Ala Ala Ser Glu Phe Asp Cys Met Leu Asn Asn Tyr Met Gly Asn Asn
                85                  90                  95
```

-continued

```
Arg Ala Ala Gly Asn Ala Lys Phe Lys Thr His Trp Ser Ser Trp Ile
            100                 105                 110

Thr Pro Ala Thr Val Gln Ser Val His Asp Val Gly Leu Asn Thr Ile
        115                 120                 125

Arg Ile Pro Ile Gly Tyr Trp Ser Tyr Thr Ala Ile Val Asp Thr Ala
    130                 135                 140

Ser Glu Pro Phe Ala Asp Gly Asp Ala Met Leu Pro Tyr Leu Asp Ala
145                 150                 155                 160

Val Val Gln Lys Ala Ala Asp Leu Gly Ile Tyr Val Ile Ile Asp Leu
                165                 170                 175

His Gly Ala Pro Gly Gly Gln Gln Gln Asp Ala Phe Thr Gly Gln Asn
            180                 185                 190

Pro Asn Pro Ala Gly Phe Phe Asn Ser Tyr Asp Phe Gly Arg Ala Glu
        195                 200                 205

Lys Trp Leu Thr Trp Met Thr Asn Arg Ile His Thr Asn Pro Ala Tyr
    210                 215                 220

Ser Thr Val Gly Met Ile Glu Val Leu Asn Glu Pro Val Ser Asn His
225                 230                 235                 240

Asp Ala Asn Gly Arg Tyr Pro Ala Pro Gly Glu Asn Pro Gly Leu Thr
                245                 250                 255

Gln Thr Tyr Tyr Pro Ala Ala Leu Lys Ala Val Arg Asp Ala Glu Ser
            260                 265                 270

Ala Leu Asn Val Ala Ser Asn Lys Lys Leu His Val Gln Phe Met Ser
        275                 280                 285

Ser Lys Trp Gly Ser Gly Asp Pro Arg Ser Asn Ser Ala Val Ala Asn
    290                 295                 300

Asp Pro Met Thr Gly Phe Asp Asp His Asn Tyr Ile Gly Phe Ala Val
305                 310                 315                 320

Ser Asn Asn Gly Asp Gln Tyr Ser Leu Met His Ser Ala Cys Thr Asp
                325                 330                 335

Thr Arg Val Val Ser Gly Gln Asn Phe Glu Ile Thr Gly Glu Trp Ser
            340                 345                 350

Met Thr Ser Gly Val Asp Trp His Asp Gln Ala Phe Phe Thr Lys Phe
        355                 360                 365

Trp Thr Ala Gln Gln Gln Leu Tyr Glu Ser Pro Gly Met Asp Gly Trp
    370                 375                 380

Ile Tyr Trp Thr Trp Lys Thr Glu Leu Asn Asp Pro Arg Trp Thr Tyr
385                 390                 395                 400

Ser Tyr Ala Thr Tyr Leu Asn Tyr Ile Pro Thr Asn Ala Ala Ala Leu
                405                 410                 415

Glu Gln Asn Val Tyr Gln Asp Val Cys Asn Gly Phe Arg
            420                 425


<210> SEQ ID NO 17
<211> LENGTH: 429
<212> TYPE: PRT
<213> ORGANISM: Trichoderma harzianum

<400> SEQUENCE: 17

Met Lys Tyr Ser Ile Val Ala Pro Ala Ile Leu Ala Gly Thr Gly Phe
1               5                   10                  15

Ala Trp Leu Pro Gln Asp Arg Asp Leu Lys Ala Phe Asn Gln Thr Pro
            20                  25                  30

Arg Phe Glu Glu Leu Gly Lys Arg Phe Glu Pro Ala Leu Ala Ser Gly
        35                  40                  45
```

Ile Thr Lys Ile Arg Gly Val Asn Phe Gly Gly Trp Leu Ile Ser Glu
    50                  55                  60

Pro Trp Met Met Ser Asn Glu Trp Asn Asn Asn Met Gly Cys Asn Gly
65                  70                  75                  80

Ala Ala Ser Glu Phe Asp Cys Met Arg Asn Asn Tyr Met Gly Ser Lys
                85                  90                  95

Arg Ala Thr Gly Asn Thr Lys Phe Gln Asn His Tyr Arg Asp Trp Ile
            100                 105                 110

Asn Pro Ala Thr Val Gln Ser Val His Asp Val Gly Leu Asn Thr Ile
        115                 120                 125

Arg Ile Pro Ile Gly Tyr Trp Ser Tyr Asn Ala Ile Val Asp Thr Ala
    130                 135                 140

Ser Glu Pro Phe Ala Asp Gly Asn Leu Gln Leu Pro Tyr Leu Asp Ala
145                 150                 155                 160

Val Val Gln Lys Ala Ala Asp Leu Gly Ile Tyr Val Ile Ile Asp Leu
                165                 170                 175

His Gly Ala Pro Gly Gly Gln Gln Gln Asp Ala Phe Thr Gly Gln Asn
            180                 185                 190

Pro Asn Pro Ala Gly Phe Tyr Asn Thr Tyr Asp Tyr Gly Arg Ala Glu
        195                 200                 205

Lys Trp Leu Ser Trp Met Thr Asn Arg Ile His Thr Asn Pro Ala Tyr
    210                 215                 220

Ser Thr Val Gly Met Ile Glu Val Leu Asn Glu Pro Val Ser Arg His
225                 230                 235                 240

Asp Gly Gly Gly Arg Tyr Pro Ala Pro Gly Gln Asp Pro Ser Met Val
                245                 250                 255

Gln Thr Tyr Tyr Pro Gly Ala Leu Lys Ala Val Arg Asp Ala Glu Ala
            260                 265                 270

Ala Leu Asn Val Pro Ser Asn Lys Lys Leu His Val Gln Phe Met Ser
        275                 280                 285

Ser Lys Trp Asp Ser Gly Asp Pro Arg Ser Asn Ala Ala Val Lys Asn
    290                 295                 300

Asp Pro Met Val Gly Phe Asp Asp His Asn Tyr Ile Gly Phe Ala Leu
305                 310                 315                 320

Gln Asn Thr Gly Asp Gln Tyr Ser Leu Met His Ser Ala Cys Thr Asp
                325                 330                 335

Ser Arg Val Val Ser Gly Gln Asp Phe Ala Ile Thr Gly Glu Trp Ser
            340                 345                 350

Met Thr Ser Gly Ala Asp Trp His Asp Gly Asn Phe Phe Thr Lys Phe
        355                 360                 365

Phe Thr Ala Gln Gln Gln Leu Tyr Glu Ser Pro Gly Met Asp Gly Trp
    370                 375                 380

Ile Tyr Trp Thr Trp Lys Thr Glu Leu Asn Asp Pro Arg Trp Thr Tyr
385                 390                 395                 400

Ser Tyr Ala Thr Tyr Leu Asn Tyr Ile Pro Thr Asn Ala Ala Ala Leu
                405                 410                 415

Gln Gln Asn Val Tyr Gln Asp Val Cys Ala Gly Phe Arg
            420                 425

<210> SEQ ID NO 18
<211> LENGTH: 286
<212> TYPE: PRT
<213> ORGANISM: Albifimbria verrucaria

<400> SEQUENCE: 18

Met Ile Pro Lys Gln Ile Leu Ala Ala Ile Ala Ala Leu Ser Ser Val
1 5 10 15

Ser Gln Ala Trp Glu Ala Pro Gln Tyr Ser Gly Phe Asn Arg Val Trp
20 25 30

Gln Asp Thr Phe Ala Gly Ala Gly Gly Ser Leu Pro Asp Gln Gly Asn
35 40 45

Trp Asn Ile Ile Asn Gly Asp Leu Gly Val Asn Asn Glu Leu Gln Ile
50 55 60

Tyr Thr Thr Ser Thr Arg Asn Val Gln Arg Ser Gly Gly Glu Thr Val
65 70 75 80

Gln Leu Val Pro Phe Arg Asp Gly Ser Ala Leu Arg Gly Trp Thr Ser
85 90 95

Gly Arg Leu Glu Ser Lys Tyr Thr Trp Thr Pro Gln Ala Gly Arg Leu
100 105 110

Thr Arg Ala Glu Ala Leu Ile Arg Phe Gly Thr Asn Ser Ile Gly Asn
115 120 125

Lys Gln Gly Ile Trp Pro Ala Phe Trp Ala Leu Gly Asp Ile Leu Arg
130 135 140

Arg Gly Gly Ser Trp Pro Ser Cys Gly Glu Leu Asp Ile Leu Glu Thr
145 150 155 160

Val Asn Gly Gln Leu Thr Gly Tyr Gly Thr Ile His Cys Asp Val Tyr
165 170 175

Pro Gly Gly Ile Cys Asn Glu Gly Asn Gly Ile Gly Ala Ser Ile Gly
180 185 190

Ile Pro Asp Gln Gly Trp His Thr Trp Arg Leu Glu Val Asp Arg Arg
195 200 205

Pro Gly Asn Trp Leu Asp Glu Ser Ile Thr Trp Tyr Arg Asp Gly Gln
210 215 220

Gln Phe His Arg Val Thr Gly Ala Arg Ile Asn Asn Tyr Asn Val Trp
225 230 235 240

Asn Ala Leu Ala His Ser Pro Met Phe Phe Ile Leu Asn Val Ala Val
245 250 255

Gly Gly Asn Trp Pro Gly Tyr Pro Asn Gly Ala Thr Gln Asp Gly Tyr
260 265 270

Gly Ser Met Met Glu Val Ala Tyr Val Ala His Tyr Ser Thr
275 280 285

<210> SEQ ID NO 19
<211> LENGTH: 284
<212> TYPE: PRT
<213> ORGANISM: Lecanicillium sp. WMM742

<400> SEQUENCE: 19

Met Val Lys Ala Gly Phe Ile Ser Ser Leu Leu Ser Leu Ala Ala Phe
1 5 10 15

Thr Ser Ala Trp Asp Ala Pro Asn Tyr Gly Gly Phe Asn Arg Val Trp
20 25 30

Gln Asp Asn Phe Gly Gly Asn Gly Gly Gln Leu Pro Asn Glu Gly Asn
35 40 45

Trp Asn Ile Ile Thr Gly Asn Leu Gly Val Asn Asn Glu Leu Glu Val
50 55 60

Tyr Gln Arg Asp Thr Arg Asn Leu Gln Leu Ser Gly Gly Asn Thr Leu
65 70 75 80

Gln Ile Val Pro Trp Arg Asn Gly Asn Gly Trp Thr Ser Gly Arg Ile
85 90 95

Glu Ser Lys Tyr Thr Phe Thr Pro Gln Gly Gly Lys Leu Thr Arg Val
100 105 110

Glu Ala Ala Ile Arg Phe Gly Gly Asn Ser Ile Asn Asn Lys Gln Gly
115 120 125

Ile Trp Pro Ala Trp Trp Met Leu Gly Asp Gly Ile Arg His Asn Val
130 135 140

Gln Trp Pro Gly Cys Gly Glu Leu Asp Ile Leu Glu Thr Val Asn Gly
145 150 155 160

Gln Leu Thr Gly His Gly Thr Met His Cys Asp Thr Phe Pro Gly Gly
165 170 175

Ile Cys Asn Glu Gly Asn Gly Ile Gly Ser Ser Val Asn Phe Pro Asn
180 185 190

Gln Asp Trp His Thr Trp Arg Leu Glu Val Asp Leu Arg Asn Gly Asn
195 200 205

Trp Val Asp Gln Ser Ile Val Trp Tyr Leu Asp Gly Arg Glu Phe His
210 215 220

Arg Ile Thr Gly Ser Arg Ile Asn Asn Tyr Asn Val Trp Arg Ser Val
225 230 235 240

Ala Gln Ser Pro Leu Phe Phe Ile Leu Asn Val Ala Val Gly Gly Asn
245 250 255

Trp Pro Gly Tyr Pro Asn Gly Asn Thr Gln Asp Gly Tyr Gly Ser Met
260 265 270

Met Glu Val Gly Tyr Thr Ala His Tyr Val Thr Gln
275 280

<210> SEQ ID NO 20
<211> LENGTH: 447
<212> TYPE: PRT
<213> ORGANISM: Trichoderma harzianum

<400> SEQUENCE: 20

Met Arg Thr Leu Thr Ile Leu Thr Thr Leu Ile Gly Ala Val Ala Ala
1 5 10 15

Ala Pro Ser Leu Ile Pro Arg Val Ser Pro Phe Ser Ile Ala Lys Pro
20 25 30

Gly Gly Val Asp Asp Ile Val Ile Thr Ala Asn Asn Thr Leu Asn Gly
35 40 45

Thr Tyr His Ser Ser Thr Thr Val Ser Lys Asn Val Ile Gln Thr Arg
50 55 60

Ala Gln Ala Gly His Leu Pro Ile Gln Leu Val Asn Asn Phe Ser Gly
65 70 75 80

Ser Gln Val Asn Ala Tyr Ile Ser Gly Leu Asp Thr Asp Asn Arg Val
85 90 95

Val Phe Val Arg Gly Asp Gly Ser Leu Val Tyr Pro Ser Ser Gly Gly
100 105 110

Ser Ser Val Pro Val Ala Ile Ser Thr Pro Ile Asn Ile Ala Leu Pro
115 120 125

Ala Gln Gly Gln Ser Ile Thr Val Asn Val Pro Ile Val Ile Ser Ser
130 135 140

Ala Arg Ile Tyr Phe Ser Val Gly Asp Leu Gln Phe Phe Met Val Lys
145 150 155 160

Ile Pro Asn Gly Asp Gly Leu Val Gln Pro Ser Gln Phe Asn Leu Gln
165 170 175

```
Asp Pro Ser Ala Gly Leu Leu Trp Gly Phe Val Glu Leu Thr Tyr Thr
            180                 185                 190

Thr Asp Leu Ala Val Tyr Ala Asn Ile Ser Tyr Val Asp Phe Val Gly
        195                 200                 205

Met Ile Leu Ser Met Ser Leu Ser Ala Thr Asp Gly Ser Ala Thr Gln
    210                 215                 220

Thr Thr Lys Gly Leu Gly Ser Ser Ala Leu Thr Gln Ile Cys Gln Gly
225                 230                 235                 240

Leu Val Gln Gln Ala Ser Val Asp Gly Phe Pro Trp Ser Ser Met Cys
                245                 250                 255

Ile Ala Asn Ser Ala Gly Thr Leu Val Arg Ala Leu Ser Pro Gly Asp
            260                 265                 270

Tyr Ser Val Ile Asn Ala Ala Ala Phe Gln Asn Tyr Trp Ser Ala Tyr
        275                 280                 285

Val Asp Gln Val Trp Ser Gln Tyr Thr Asn Thr Pro Leu Thr Ile Asn
    290                 295                 300

Thr Gln Thr Ser Ala Gly Ser Val Asn Cys Gln Val Ser Gly Asp Thr
305                 310                 315                 320

Leu Asn Cys Asn Gly Asp Asn Arg Gly Tyr Ala Lys Pro Ala Ala Gly
                325                 330                 335

Asp Ile Trp Gly Cys Asn Ser Gly Pro Phe Ala Ile Gln Ser Gly Asp
            340                 345                 350

Asn Ala Val His Ser Ala Val Val Pro Arg Leu Cys Ala Ala Phe Val
        355                 360                 365

Arg Ser Thr Leu Leu Leu Ala Gly Gly Asn Val Gln Pro Gly Leu Gly
    370                 375                 380

Gln Ser Ser Tyr Tyr Thr Val Ser Pro Thr Asn His Tyr Ser Arg Leu
385                 390                 395                 400

Val His Gln Phe Glu Ile Asp Gly Arg Gly Tyr Ala Phe Pro Tyr Asp
                405                 410                 415

Asp Val Asn Pro Asp Gly Asn Glu Asn Ala Ser Gly Thr Leu Ala Ser
            420                 425                 430

Gly Ala Pro Asn Val Leu Thr Val Tyr Val Gly Ala Pro Pro Ser
        435                 440                 445
```

<210> SEQ ID NO 21
<211> LENGTH: 532
<212> TYPE: PRT
<213> ORGANISM: Aspergillus fumigatus

<400> SEQUENCE: 21

```
Met Leu Ala Ser Thr Phe Ser Tyr Arg Met Tyr Lys Thr Ala Leu Ile
1               5                   10                  15

Leu Ala Ala Leu Leu Gly Ser Gly Gln Ala Gln Gln Val Gly Thr Ser
            20                  25                  30

Gln Ala Glu Val His Pro Ser Met Thr Trp Gln Ser Cys Thr Ala Gly
        35                  40                  45

Gly Ser Cys Thr Thr Asn Asn Gly Lys Val Val Ile Asp Ala Asn Trp
    50                  55                  60

Arg Trp Val His Lys Val Gly Asp Tyr Thr Asn Cys Tyr Thr Gly Asn
65                  70                  75                  80

Thr Trp Asp Thr Thr Ile Cys Pro Asp Asp Ala Thr Cys Ala Ser Asn
                85                  90                  95

Cys Ala Leu Glu Gly Ala Asn Tyr Glu Ser Thr Tyr Gly Val Thr Ala
```

-continued

```
            100                 105                 110

Ser Gly Asn Ser Leu Arg Leu Asn Phe Val Thr Thr Ser Gln Gln Lys
        115                 120                 125

Asn Ile Gly Ser Arg Leu Tyr Met Met Lys Asp Asp Ser Thr Tyr Glu
    130                 135                 140

Met Phe Lys Leu Leu Asn Gln Glu Phe Thr Phe Asp Val Asp Val Ser
145                 150                 155                 160

Asn Leu Pro Cys Gly Leu Asn Gly Ala Leu Tyr Phe Val Ala Met Asp
                165                 170                 175

Ala Asp Gly Gly Met Ser Lys Tyr Pro Thr Asn Lys Ala Gly Ala Lys
            180                 185                 190

Tyr Gly Thr Gly Tyr Cys Asp Ser Gln Cys Pro Arg Asp Leu Lys Phe
        195                 200                 205

Ile Asn Gly Gln Ala Asn Val Glu Gly Trp Gln Pro Ser Ser Asn Asp
    210                 215                 220

Ala Asn Ala Gly Thr Gly Asn His Gly Ser Cys Cys Ala Glu Met Asp
225                 230                 235                 240

Ile Trp Glu Ala Asn Ser Ile Ser Thr Ala Phe Thr Pro His Pro Cys
                245                 250                 255

Asp Thr Pro Gly Gln Val Met Cys Thr Gly Asp Ala Cys Gly Gly Thr
            260                 265                 270

Tyr Ser Ser Asp Arg Tyr Gly Gly Thr Cys Asp Pro Asp Gly Cys Asp
        275                 280                 285

Phe Asn Ser Phe Arg Gln Gly Asn Lys Thr Phe Tyr Gly Pro Gly Met
    290                 295                 300

Thr Val Asp Thr Lys Ser Lys Phe Thr Val Val Thr Gln Phe Ile Thr
305                 310                 315                 320

Asp Asp Gly Thr Ser Ser Gly Thr Leu Lys Glu Ile Lys Arg Phe Tyr
                325                 330                 335

Val Gln Asn Gly Lys Val Ile Pro Asn Ser Glu Ser Thr Trp Thr Gly
            340                 345                 350

Val Ser Gly Asn Ser Ile Thr Thr Glu Tyr Cys Thr Ala Gln Lys Ser
        355                 360                 365

Leu Phe Gln Asp Gln Asn Val Phe Glu Lys His Gly Gly Leu Glu Gly
    370                 375                 380

Met Gly Ala Ala Leu Ala Gln Gly Met Val Leu Val Met Ser Leu Trp
385                 390                 395                 400

Asp Asp His Ser Ala Asn Met Leu Trp Leu Asp Ser Asn Tyr Pro Thr
                405                 410                 415

Thr Ala Ser Ser Thr Thr Pro Gly Val Ala Arg Gly Thr Cys Asp Ile
            420                 425                 430

Ser Ser Gly Val Pro Ala Asp Val Glu Ala Asn His Pro Asp Ala Tyr
        435                 440                 445

Val Val Tyr Ser Asn Ile Lys Val Gly Pro Ile Gly Ser Thr Phe Asn
    450                 455                 460

Ser Gly Gly Ser Asn Pro Gly Gly Gly Thr Thr Thr Thr Thr Thr Thr
465                 470                 475                 480

Gln Pro Thr Thr Thr Thr Thr Thr Ala Gly Asn Pro Gly Gly Thr Gly
                485                 490                 495

Val Ala Gln His Tyr Gly Gln Cys Gly Gly Ile Gly Trp Thr Gly Pro
            500                 505                 510

Thr Thr Cys Ala Ser Pro Tyr Thr Cys Gln Lys Leu Asn Asp Tyr Tyr
        515                 520                 525
```

Ser Gln Cys Leu
    530

<210> SEQ ID NO 22
<211> LENGTH: 454
<212> TYPE: PRT
<213> ORGANISM: Aspergillus fumigatus

<400> SEQUENCE: 22

```
Met Lys His Leu Ala Ser Ser Ile Ala Leu Thr Leu Leu Leu Pro Ala
1               5                   10                  15

Val Gln Ala Gln Gln Thr Val Trp Gly Gln Cys Gly Gly Gln Gly Trp
            20                  25                  30

Ser Gly Pro Thr Ser Cys Val Ala Gly Ala Ala Cys Ser Thr Leu Asn
        35                  40                  45

Pro Tyr Tyr Ala Gln Cys Ile Pro Gly Ala Thr Ala Thr Ser Thr Thr
    50                  55                  60

Leu Thr Thr Thr Thr Ala Ala Thr Thr Thr Ser Gln Thr Thr Thr Lys
65                  70                  75                  80

Pro Thr Thr Thr Gly Pro Thr Thr Ser Ala Pro Thr Val Thr Ala Ser
                85                  90                  95

Gly Asn Pro Phe Ser Gly Tyr Gln Leu Tyr Ala Asn Pro Tyr Tyr Ser
            100                 105                 110

Ser Glu Val His Thr Leu Ala Met Pro Ser Leu Pro Ser Ser Leu Gln
        115                 120                 125

Pro Lys Ala Ser Ala Val Ala Glu Val Pro Ser Phe Val Trp Leu Asp
    130                 135                 140

Val Ala Ala Lys Val Pro Thr Met Gly Thr Tyr Leu Ala Asp Ile Gln
145                 150                 155                 160

Ala Lys Asn Lys Ala Gly Ala Asn Pro Pro Ile Ala Gly Ile Phe Val
                165                 170                 175

Val Tyr Asp Leu Pro Asp Arg Asp Cys Ala Ala Leu Ala Ser Asn Gly
            180                 185                 190

Glu Tyr Ser Ile Ala Asn Asn Gly Val Ala Asn Tyr Lys Ala Tyr Ile
        195                 200                 205

Asp Ala Ile Arg Ala Gln Leu Val Lys Tyr Ser Asp Val His Thr Ile
    210                 215                 220

Leu Val Ile Glu Pro Asp Ser Leu Ala Asn Leu Val Thr Asn Leu Asn
225                 230                 235                 240

Val Ala Lys Cys Ala Asn Ala Gln Ser Ala Tyr Leu Glu Cys Val Asp
                245                 250                 255

Tyr Ala Leu Lys Gln Leu Asn Leu Pro Asn Val Ala Met Tyr Leu Asp
            260                 265                 270

Ala Gly His Ala Gly Trp Leu Gly Trp Pro Ala Asn Leu Gly Pro Ala
        275                 280                 285

Ala Thr Leu Phe Ala Lys Val Tyr Thr Asp Ala Gly Ser Pro Ala Ala
    290                 295                 300

Val Arg Gly Leu Ala Thr Asn Val Ala Asn Tyr Asn Ala Trp Ser Leu
305                 310                 315                 320

Ser Thr Cys Pro Ser Tyr Thr Gln Gly Asp Pro Asn Cys Asp Glu Lys
                325                 330                 335

Lys Tyr Ile Asn Ala Met Ala Pro Leu Leu Lys Glu Ala Gly Phe Asp
            340                 345                 350

Ala His Phe Ile Met Asp Thr Ser Arg Asn Gly Val Gln Pro Thr Lys
```

```
        355                 360                 365

Gln Asn Ala Trp Gly Asp Trp Cys Asn Val Ile Gly Thr Gly Phe Gly
    370                 375                 380

Val Arg Pro Ser Thr Asn Thr Gly Asp Pro Leu Gln Asp Ala Phe Val
385                 390                 395                 400

Trp Ile Lys Pro Gly Gly Glu Ser Asp Gly Thr Ser Asn Ser Thr Ser
                405                 410                 415

Pro Arg Tyr Asp Ala His Cys Gly Tyr Ser Asp Ala Leu Gln Pro Ala
            420                 425                 430

Pro Glu Ala Gly Thr Trp Phe Gln Ala Tyr Phe Glu Gln Leu Leu Thr
        435                 440                 445

Asn Ala Asn Pro Ser Phe
    450


<210> SEQ ID NO 23
<211> LENGTH: 863
<212> TYPE: PRT
<213> ORGANISM: Aspergillus fumigatus

<400> SEQUENCE: 23

Met Arg Phe Gly Trp Leu Glu Val Ala Ala Leu Thr Ala Ala Ser Val
1               5                   10                  15

Ala Asn Ala Gln Glu Leu Ala Phe Ser Pro Pro Phe Tyr Pro Ser Pro
            20                  25                  30

Trp Ala Asp Gly Gln Gly Glu Trp Ala Asp Ala His Arg Arg Ala Val
        35                  40                  45

Glu Ile Val Ser Gln Met Thr Leu Ala Glu Lys Val Asn Leu Thr Thr
    50                  55                  60

Gly Thr Gly Trp Glu Met Asp Arg Cys Val Gly Gln Thr Gly Ser Val
65                  70                  75                  80

Pro Arg Leu Gly Ile Asn Trp Gly Leu Cys Gly Gln Asp Ser Pro Leu
                85                  90                  95

Gly Ile Arg Phe Ser Asp Leu Asn Ser Ala Phe Pro Ala Gly Thr Asn
            100                 105                 110

Val Ala Ala Thr Trp Asp Lys Thr Leu Ala Tyr Leu Arg Gly Lys Ala
        115                 120                 125

Met Gly Glu Glu Phe Asn Asp Lys Gly Val Asp Ile Leu Leu Gly Pro
    130                 135                 140

Ala Ala Gly Pro Leu Gly Lys Tyr Pro Asp Gly Gly Arg Ile Trp Glu
145                 150                 155                 160

Gly Phe Ser Pro Asp Pro Val Leu Thr Gly Val Leu Phe Ala Glu Thr
                165                 170                 175

Ile Lys Gly Ile Gln Asp Ala Gly Val Ile Ala Thr Ala Lys His Tyr
            180                 185                 190

Ile Leu Asn Glu Gln Glu His Phe Arg Gln Val Gly Glu Ala Gln Gly
        195                 200                 205

Tyr Gly Tyr Asn Ile Thr Glu Thr Ile Ser Ser Asn Val Asp Asp Lys
    210                 215                 220

Thr Met His Glu Leu Tyr Leu Trp Pro Phe Ala Asp Ala Val Arg Ala
225                 230                 235                 240

Gly Val Gly Ala Val Met Cys Ser Tyr Asn Gln Ile Asn Asn Ser Tyr
                245                 250                 255

Gly Cys Gln Asn Ser Gln Thr Leu Asn Lys Leu Leu Lys Ala Glu Leu
            260                 265                 270
```

-continued

```
Gly Phe Gln Gly Phe Val Met Ser Asp Trp Ser Ala His His Ser Gly
        275                 280                 285

Val Gly Ala Ala Leu Ala Gly Leu Asp Met Ser Met Pro Gly Asp Ile
    290                 295                 300

Ser Phe Asp Asp Gly Leu Ser Phe Trp Gly Thr Asn Leu Thr Val Ser
305                 310                 315                 320

Val Leu Asn Gly Thr Val Pro Ala Trp Arg Val Asp Asp Met Ala Val
                325                 330                 335

Arg Ile Met Thr Ala Tyr Tyr Lys Val Gly Arg Asp Arg Leu Arg Ile
            340                 345                 350

Pro Pro Asn Phe Ser Ser Trp Thr Arg Asp Glu Tyr Gly Trp Glu His
        355                 360                 365

Ser Ala Val Ser Glu Gly Ala Trp Thr Lys Val Asn Asp Phe Val Asn
    370                 375                 380

Val Gln Arg Ser His Ser Gln Ile Ile Arg Glu Ile Gly Ala Ala Ser
385                 390                 395                 400

Thr Val Leu Leu Lys Asn Thr Gly Ala Leu Pro Leu Thr Gly Lys Glu
                405                 410                 415

Val Lys Val Gly Val Leu Gly Glu Asp Ala Gly Ser Asn Pro Trp Gly
            420                 425                 430

Ala Asn Gly Cys Pro Asp Arg Gly Cys Asp Asn Gly Thr Leu Ala Met
        435                 440                 445

Ala Trp Gly Ser Gly Thr Ala Asn Phe Pro Tyr Leu Val Thr Pro Glu
    450                 455                 460

Gln Ala Ile Gln Arg Glu Val Ile Ser Asn Gly Gly Asn Val Phe Ala
465                 470                 475                 480

Val Thr Asp Asn Gly Ala Leu Ser Gln Met Ala Asp Val Ala Ser Gln
                485                 490                 495

Ser Ser Val Ser Leu Val Phe Val Asn Ala Asp Ser Gly Glu Gly Phe
            500                 505                 510

Ile Ser Val Asp Gly Asn Glu Gly Asp Arg Lys Asn Leu Thr Leu Trp
        515                 520                 525

Lys Asn Gly Glu Ala Val Ile Asp Thr Val Val Ser His Cys Asn Asn
    530                 535                 540

Thr Ile Val Val Ile His Ser Val Gly Pro Val Leu Ile Asp Arg Trp
545                 550                 555                 560

Tyr Asp Asn Pro Asn Val Thr Ala Ile Ile Trp Ala Gly Leu Pro Gly
                565                 570                 575

Gln Glu Ser Gly Asn Ser Leu Val Asp Val Leu Tyr Gly Arg Val Asn
            580                 585                 590

Pro Ser Ala Lys Thr Pro Phe Thr Trp Gly Lys Thr Arg Glu Ser Tyr
        595                 600                 605

Gly Ala Pro Leu Leu Thr Glu Pro Asn Asn Gly Asn Gly Ala Pro Gln
    610                 615                 620

Asp Asp Phe Asn Glu Gly Val Phe Ile Asp Tyr Arg His Phe Asp Lys
625                 630                 635                 640

Arg Asn Glu Thr Pro Ile Tyr Glu Phe Gly His Gly Leu Ser Tyr Thr
                645                 650                 655

Thr Phe Gly Tyr Ser His Leu Arg Val Gln Ala Leu Asn Ser Ser Ser
            660                 665                 670

Ser Ala Tyr Val Pro Thr Ser Gly Glu Thr Lys Pro Ala Pro Thr Tyr
        675                 680                 685

Gly Glu Ile Gly Ser Ala Ala Asp Tyr Leu Tyr Pro Glu Gly Leu Lys
```

```
    690                 695                 700

Arg Ile Thr Lys Phe Ile Tyr Pro Trp Leu Asn Ser Thr Asp Leu Glu
705                 710                 715                 720

Asp Ser Ser Asp Asp Pro Asn Tyr Gly Trp Glu Asp Ser Glu Tyr Ile
                725                 730                 735

Pro Glu Gly Ala Arg Asp Gly Ser Pro Gln Pro Leu Leu Lys Ala Gly
            740                 745                 750

Gly Ala Pro Gly Gly Asn Pro Thr Leu Tyr Gln Asp Leu Val Arg Val
        755                 760                 765

Ser Ala Thr Ile Thr Asn Thr Gly Asn Val Ala Gly Tyr Glu Val Pro
    770                 775                 780

Gln Leu Tyr Val Ser Leu Gly Gly Pro Asn Glu Pro Arg Val Val Leu
785                 790                 795                 800

Arg Lys Phe Asp Arg Ile Phe Leu Ala Pro Gly Glu Gln Lys Val Trp
                805                 810                 815

Thr Thr Thr Leu Asn Arg Arg Asp Leu Ala Asn Trp Asp Val Glu Ala
            820                 825                 830

Gln Asp Trp Val Ile Thr Lys Tyr Pro Lys Lys Val His Val Gly Ser
        835                 840                 845

Ser Ser Arg Lys Leu Pro Leu Arg Ala Pro Leu Pro Arg Val Tyr
    850                 855                 860


<210> SEQ ID NO 24
<211> LENGTH: 253
<212> TYPE: PRT
<213> ORGANISM: Penicillium emersonii

<400> SEQUENCE: 24

Met Leu Ser Ser Thr Thr Arg Thr Leu Ala Phe Thr Gly Leu Ala Gly
1               5                   10                  15

Leu Leu Ser Ala Pro Leu Val Lys Ala His Gly Phe Val Gln Gly Ile
            20                  25                  30

Val Ile Gly Asp Gln Phe Tyr Ser Gly Tyr Ile Val Asn Ser Phe Pro
        35                  40                  45

Tyr Glu Ser Asn Pro Pro Pro Val Ile Gly Trp Ala Thr Thr Ala Thr
    50                  55                  60

Asp Leu Gly Phe Val Asp Gly Thr Gly Tyr Gln Gly Pro Asp Ile Ile
65                  70                  75                  80

Cys His Arg Asn Ala Thr Pro Ala Pro Leu Thr Ala Pro Val Ala Ala
                85                  90                  95

Gly Gly Thr Val Glu Leu Gln Trp Thr Pro Trp Pro Asp Ser His His
            100                 105                 110

Gly Pro Val Ile Thr Tyr Leu Ala Pro Cys Asn Gly Asn Cys Ser Thr
        115                 120                 125

Val Asp Lys Thr Thr Leu Glu Phe Phe Lys Ile Asp Gln Gln Gly Leu
    130                 135                 140

Ile Asp Asp Thr Ser Pro Pro Gly Thr Trp Ala Ser Asp Asn Leu Ile
145                 150                 155                 160

Ala Asn Asn Asn Ser Trp Thr Val Thr Ile Pro Asn Ser Val Ala Pro
                165                 170                 175

Gly Asn Tyr Val Leu Arg His Glu Ile Ile Ala Leu His Ser Ala Asn
            180                 185                 190

Asn Lys Asp Gly Ala Gln Asn Tyr Pro Gln Cys Ile Asn Ile Glu Val
        195                 200                 205
```

Thr Gly Gly Gly Ser Asp Ala Pro Glu Gly Thr Leu Gly Glu Asp Leu
210 215 220

Tyr His Asp Thr Asp Pro Gly Ile Leu Val Asp Ile Tyr Glu Pro Ile
225 230 235 240

Ala Thr Tyr Thr Ile Pro Gly Pro Pro Glu Pro Thr Phe
245 250

<210> SEQ ID NO 25
<211> LENGTH: 515
<212> TYPE: PRT
<213> ORGANISM: Bacillus stearothermophilus

<400> SEQUENCE: 25

Ala Ala Pro Phe Asn Gly Thr Met Met Gln Tyr Phe Glu Trp Tyr Leu
1 5 10 15

Pro Asp Asp Gly Thr Leu Trp Thr Lys Val Ala Asn Glu Ala Asn Asn
20 25 30

Leu Ser Ser Leu Gly Ile Thr Ala Leu Trp Leu Pro Pro Ala Tyr Lys
35 40 45

Gly Thr Ser Arg Ser Asp Val Gly Tyr Gly Val Tyr Asp Leu Tyr Asp
50 55 60

Leu Gly Glu Phe Asn Gln Lys Gly Thr Val Arg Thr Lys Tyr Gly Thr
65 70 75 80

Lys Ala Gln Tyr Leu Gln Ala Ile Gln Ala Ala His Ala Ala Gly Met
85 90 95

Gln Val Tyr Ala Asp Val Val Phe Asp His Lys Gly Gly Ala Asp Gly
100 105 110

Thr Glu Trp Val Asp Ala Val Glu Val Asn Pro Ser Asp Arg Asn Gln
115 120 125

Glu Ile Ser Gly Thr Tyr Gln Ile Gln Ala Trp Thr Lys Phe Asp Phe
130 135 140

Pro Gly Arg Gly Asn Thr Tyr Ser Ser Phe Lys Trp Arg Trp Tyr His
145 150 155 160

Phe Asp Gly Val Asp Trp Asp Glu Ser Arg Lys Leu Ser Arg Ile Tyr
165 170 175

Lys Phe Arg Gly Ile Gly Lys Ala Trp Asp Trp Glu Val Asp Thr Glu
180 185 190

Asn Gly Asn Tyr Asp Tyr Leu Met Tyr Ala Asp Leu Asp Met Asp His
195 200 205

Pro Glu Val Val Thr Glu Leu Lys Asn Trp Gly Lys Trp Tyr Val Asn
210 215 220

Thr Thr Asn Ile Asp Gly Phe Arg Leu Asp Ala Val Lys His Ile Lys
225 230 235 240

Phe Ser Phe Phe Pro Asp Trp Leu Ser Tyr Val Arg Ser Gln Thr Gly
245 250 255

Lys Pro Leu Phe Thr Val Gly Glu Tyr Trp Ser Tyr Asp Ile Asn Lys
260 265 270

Leu His Asn Tyr Ile Thr Lys Thr Asn Gly Thr Met Ser Leu Phe Asp
275 280 285

Ala Pro Leu His Asn Lys Phe Tyr Thr Ala Ser Lys Ser Gly Gly Ala
290 295 300

Phe Asp Met Arg Thr Leu Met Thr Asn Thr Leu Met Lys Asp Gln Pro
305 310 315 320

Thr Leu Ala Val Thr Phe Val Asp Asn His Asp Thr Glu Pro Gly Gln
325 330 335

Ala Leu Gln Ser Trp Val Asp Pro Trp Phe Lys Pro Leu Ala Tyr Ala
340 345 350

Phe Ile Leu Thr Arg Gln Glu Gly Tyr Pro Cys Val Phe Tyr Gly Asp
355 360 365

Tyr Tyr Gly Ile Pro Gln Tyr Asn Ile Pro Ser Leu Lys Ser Lys Ile
370 375 380

Asp Pro Leu Leu Ile Ala Arg Arg Asp Tyr Ala Tyr Gly Thr Gln His
385 390 395 400

Asp Tyr Leu Asp His Ser Asp Ile Ile Gly Trp Thr Arg Glu Gly Val
405 410 415

Thr Glu Lys Pro Gly Ser Gly Leu Ala Ala Leu Ile Thr Asp Gly Pro
420 425 430

Gly Gly Ser Lys Trp Met Tyr Val Gly Lys Gln His Ala Gly Lys Val
435 440 445

Phe Tyr Asp Leu Thr Gly Asn Arg Ser Asp Thr Val Thr Ile Asn Ser
450 455 460

Asp Gly Trp Gly Glu Phe Lys Val Asn Gly Gly Ser Val Ser Val Trp
465 470 475 480

Val Pro Arg Lys Thr Thr Val Ser Thr Ile Ala Arg Pro Ile Thr Thr
485 490 495

Arg Pro Trp Thr Gly Glu Phe Val Arg Trp Thr Glu Pro Arg Leu Val
500 505 510

Ala Trp Pro
515

<210> SEQ ID NO 26
<211> LENGTH: 356
<212> TYPE: PRT
<213> ORGANISM: Dictyogllomus thermophilum

<400> SEQUENCE: 26

Met Lys Lys Pro Leu Gly Lys Ile Val Ala Ser Thr Ala Leu Leu Ile
1 5 10 15

Ser Val Ala Phe Ser Ser Ser Ile Ala Ser Ala Lys Glu Glu Ala Lys
20 25 30

Gly Met Glu Ile Pro Ser Leu Lys Glu Val Tyr Lys Asp Tyr Phe Thr
35 40 45

Ile Gly Ala Ala Val Ser His Leu Asn Ile Tyr His Tyr Glu Asn Leu
50 55 60

Leu Lys Lys His Phe Asn Ser Leu Thr Pro Glu Asn Gln Met Lys Trp
65 70 75 80

Glu Val Ile His Pro Lys Pro Tyr Val Tyr Asp Phe Gly Pro Ala Asp
85 90 95

Glu Ile Val Asp Phe Ala Met Lys Asn Gly Met Lys Val Arg Gly His
100 105 110

Thr Leu Val Trp His Asn Gln Thr Pro Gly Trp Val Tyr Ala Gly Thr
115 120 125

Lys Asp Glu Ile Leu Ala Arg Leu Lys Glu His Ile Lys Glu Val Val
130 135 140

Gly His Tyr Lys Gly Lys Val Tyr Ala Trp Asp Val Val Asn Glu Ala
145 150 155 160

Leu Ser Asp Asn Pro Asn Glu Phe Leu Arg Arg Ala Pro Trp Tyr Asp
165 170 175

Ile Cys Gly Glu Glu Val Ile Glu Lys Ala Phe Ile Trp Ala His Glu

-continued

```
            180                 185                 190

Val Asp Pro Asp Ala Lys Leu Phe Tyr Asn Asp Tyr Asn Leu Glu Asp
        195                 200                 205

Pro Ile Lys Arg Glu Lys Ala Tyr Lys Leu Val Lys Lys Leu Lys Asp
    210                 215                 220

Lys Gly Val Pro Ile His Gly Ile Gly Ile Gln Gly His Trp Thr Leu
225                 230                 235                 240

Ala Trp Pro Thr Pro Lys Met Leu Glu Asp Ser Ile Lys Arg Phe Ala
                245                 250                 255

Glu Leu Gly Val Glu Val Gln Val Thr Glu Phe Asp Ile Ser Ile Tyr
            260                 265                 270

Tyr Asp Arg Asn Glu Asn Asn Asn Phe Lys Val Pro Pro Glu Asp Arg
        275                 280                 285

Leu Glu Arg Gln Ala Gln Leu Tyr Lys Glu Ala Phe Glu Ile Leu Arg
    290                 295                 300

Lys Tyr Lys Gly Ile Val Thr Gly Val Thr Phe Trp Gly Val Ala Asp
305                 310                 315                 320

Asp Tyr Thr Trp Leu Tyr Phe Trp Pro Val Arg Gly Arg Glu Asp Tyr
                325                 330                 335

Pro Leu Leu Phe Asp Lys Asn His Asn Pro Lys Lys Ala Phe Trp Glu
            340                 345                 350

Ile Val Lys Phe
        355


<210> SEQ ID NO 27
<211> LENGTH: 203
<212> TYPE: PRT
<213> ORGANISM: Dictyogllomus thermophilum

<400> SEQUENCE: 27

Gln Thr Ser Ile Thr Leu Thr Ser Asn Ala Ser Gly Thr Phe Asp Gly
1               5                   10                  15

Tyr Tyr Tyr Glu Leu Trp Lys Asp Thr Gly Asn Thr Thr Met Thr Val
            20                  25                  30

Tyr Thr Gln Gly Arg Phe Ser Cys Gln Trp Ser Asn Ile Asn Asn Ala
        35                  40                  45

Leu Phe Arg Thr Gly Lys Lys Tyr Asn Gln Asn Trp Gln Ser Leu Gly
    50                  55                  60

Thr Ile Arg Ile Thr Tyr Ser Ala Thr Tyr Asn Pro Asn Gly Asn Ser
65                  70                  75                  80

Tyr Leu Cys Ile Tyr Gly Trp Ser Thr Asn Pro Leu Val Glu Phe Tyr
                85                  90                  95

Ile Val Glu Ser Trp Gly Asn Trp Arg Pro Pro Gly Ala Thr Ser Leu
            100                 105                 110

Gly Gln Val Thr Ile Asp Gly Gly Thr Tyr Asp Ile Tyr Arg Thr Thr
        115                 120                 125

Arg Val Asn Gln Pro Ser Ile Val Gly Thr Ala Thr Phe Asp Gln Tyr
    130                 135                 140

Trp Ser Val Arg Thr Ser Lys Arg Thr Ser Gly Thr Val Thr Val Thr
145                 150                 155                 160

Asp His Phe Arg Ala Trp Ala Asn Arg Gly Leu Asn Leu Gly Thr Ile
                165                 170                 175

Asp Gln Ile Thr Leu Cys Val Glu Gly Tyr Gln Ser Ser Gly Ser Ala
            180                 185                 190
```

-continued

```
Asn Ile Thr Gln Asn Thr Phe Ser Gln Gly Ser
        195                 200


<210> SEQ ID NO 28
<211> LENGTH: 383
<212> TYPE: PRT
<213> ORGANISM: Rasomsonia byssochlamydoides

<400> SEQUENCE: 28

Asp Gly Leu Asn Thr Ala Ala Lys Ala Ile Gly Lys Leu Tyr Phe Gly
1               5                   10                  15

Thr Ala Thr Asp Asn Pro Glu Leu Ser Asp Val Ala Tyr Glu Thr Gln
            20                  25                  30

Leu Asn Asn Thr Gln Asp Phe Gly Gln Ile Thr Pro Ala Asn Ser Met
        35                  40                  45

Lys Trp Asp Ala Thr Glu Pro Glu Gln Asn Thr Phe Thr Phe Ala Ala
    50                  55                  60

Gly Asp Gln Ile Ala Asp Leu Ala Glu Ala Asn Gly Gln Ile Leu Arg
65                  70                  75                  80

Cys His Asn Leu Val Trp Tyr Asn Gln Leu Pro Ser Trp Val Thr Ser
                85                  90                  95

Gly Ser Trp Thr Asn Glu Thr Leu Leu Ala Ala Met Lys Asn His Ile
            100                 105                 110

Thr Asn Val Val Thr His Tyr Lys Gly Arg Cys Tyr Ala Trp Asp Val
        115                 120                 125

Val Asn Glu Ala Leu Asn Asp Asp Gly Thr Tyr Arg Asp Asn Val Phe
    130                 135                 140

Tyr Gln Tyr Ile Gly Glu Ala Tyr Ile Pro Ile Ala Phe Glu Thr Ala
145                 150                 155                 160

Ala Ala Ala Asp Pro Asn Val Lys Leu Tyr Tyr Asn Asp Tyr Asn Ile
                165                 170                 175

Glu Tyr Ala Gly Val Lys Ala Thr Ala Ala Gln Asn Ile Val Lys Leu
            180                 185                 190

Val Gln Ser Tyr Gly Ala Arg Ile Asp Gly Val Gly Leu Gln Ser His
        195                 200                 205

Phe Ile Val Gly Glu Thr Pro Ser Thr Ser Thr Gln Ala Ser Asn Met
    210                 215                 220

Ala Ser Phe Thr Ala Leu Gly Val Glu Val Ala Ile Thr Glu Leu Asp
225                 230                 235                 240

Ile Arg Met Gln Leu Pro Glu Thr Thr Ala Leu Leu Thr Gln Gln Ser
                245                 250                 255

Thr Asp Tyr Gln Ser Thr Val Gln Ala Cys Val Asn Thr Pro Gly Cys
            260                 265                 270

Val Gly Ile Thr Leu Trp Asp Trp Thr Asp Lys Tyr Ser Trp Val Pro
        275                 280                 285

Ser Thr Phe Ser Gly Tyr Gly Asp Ala Cys Pro Trp Asp Asp Asn Tyr
    290                 295                 300

Gln Lys Lys Pro Ala Tyr Tyr Gly Ile Leu Thr Ala Leu Gly Gly Ser
305                 310                 315                 320

Ala Ser Thr Thr Thr Val Gly Thr Gly Thr Thr Thr Thr Ser Thr Ala
                325                 330                 335

Thr Thr Ser Ser Thr Gly Ser Ser Gly Thr Gly Val Ala Gln His Trp
            340                 345                 350

Gly Gln Cys Gly Gly Ile Gly Trp Thr Gly Pro Thr Val Cys Ala Ser
        355                 360                 365
```

Gly Tyr Thr Cys Thr Val Val Asn Pro Tyr Tyr Ser Gln Cys Leu
370 375 380

<210> SEQ ID NO 29
<211> LENGTH: 385
<212> TYPE: PRT
<213> ORGANISM: Talaromyces leycettanus

<400> SEQUENCE: 29

Ala Gly Leu Asn Thr Ala Ala Lys Ala Ile Gly Lys Leu Tyr Phe Gly
1 5 10 15

Thr Ala Thr Asp Asn Pro Glu Leu Ser Asp Ser Thr Tyr Met Gln Glu
20 25 30

Thr Asp Asn Thr Asp Asp Phe Gly Gln Leu Thr Pro Ala Asn Ser Met
35 40 45

Lys Trp Asp Ala Thr Glu Pro Ser Gln Asn Thr Phe Thr Phe Thr Asn
50 55 60

Gly Asp Gln Ile Ala Asn Leu Ala Lys Ser Asn Gly Gln Met Leu Arg
65 70 75 80

Cys His Asn Leu Val Trp Tyr Asn Gln Leu Pro Ser Trp Val Thr Ser
85 90 95

Gly Ser Trp Thr Asn Ala Thr Leu Leu Ala Ala Met Lys Asn His Ile
100 105 110

Thr Asn Val Val Thr His Tyr Lys Gly Gln Cys Tyr Ala Trp Asp Val
115 120 125

Val Asn Glu Ala Leu Asn Asp Asp Gly Thr Tyr Arg Ser Asn Val Phe
130 135 140

Tyr Gln Tyr Ile Gly Glu Ala Tyr Ile Pro Ile Ala Phe Ala Thr Ala
145 150 155 160

Ala Ala Ala Asp Pro Asn Ala Lys Leu Tyr Tyr Asn Asp Tyr Asn Ile
165 170 175

Glu Tyr Pro Gly Ala Lys Ala Thr Ala Ala Gln Asn Ile Val Lys Met
180 185 190

Val Lys Ala Tyr Gly Ala Lys Ile Asp Gly Val Gly Leu Gln Ser His
195 200 205

Phe Ile Val Gly Ser Thr Pro Ser Gln Ser Ser Gln Gln Ser Asn Met
210 215 220

Ala Ala Phe Thr Ala Leu Gly Val Glu Val Ala Ile Thr Glu Leu Asp
225 230 235 240

Ile Arg Met Thr Leu Pro Ser Thr Ser Ala Leu Leu Ala Gln Gln Ser
245 250 255

Thr Asp Tyr Gln Ser Thr Val Ser Ala Cys Val Asn Thr Pro Lys Cys
260 265 270

Ile Gly Ile Thr Leu Trp Asp Trp Thr Asp Lys Tyr Ser Trp Val Pro
275 280 285

Asn Thr Phe Ser Gly Gln Gly Asp Ala Cys Pro Trp Asp Ser Asn Tyr
290 295 300

Gln Lys Lys Pro Ala Tyr Tyr Gly Ile Leu Thr Ala Leu Gly Gly Ser
305 310 315 320

Ala Ser Thr Ser Thr Thr Thr Thr Leu Val Thr Ser Thr Arg Thr Ser
325 330 335

Thr Thr Thr Ser Thr Ser Ala Thr Ser Thr Ser Thr Gly Val Ala Gln
340 345 350

His Trp Gly Gln Cys Gly Gly Ile Gly Trp Thr Gly Pro Thr Thr Cys

-continued 355 360 365

Ala Ser Pro Tyr Thr Cys Gln Glu Leu Asn Pro Tyr Tyr Tyr Gln Cys
370 375 380

Leu
385

<210> SEQ ID NO 30
<211> LENGTH: 378
<212> TYPE: PRT
<213> ORGANISM: Aspergillus fumigatus

<400> SEQUENCE: 30

Ala Gly Leu Asn Thr Ala Ala Lys Ala Lys Gly Leu Lys Tyr Phe Gly
1 5 10 15

Ser Ala Thr Asp Asn Pro Glu Leu Thr Asp Ser Ala Tyr Val Ala Gln
20 25 30

Leu Ser Asn Thr Asp Asp Phe Gly Gln Ile Thr Pro Gly Asn Ser Met
35 40 45

Lys Trp Asp Ala Thr Glu Pro Ser Gln Asn Ser Phe Ser Phe Ala Asn
50 55 60

Gly Asp Ala Val Val Asn Leu Ala Asn Lys Asn Gly Gln Leu Met Arg
65 70 75 80

Cys His Thr Leu Val Trp His Ser Gln Leu Pro Asn Trp Val Ser Ser
85 90 95

Gly Ser Trp Thr Asn Ala Thr Leu Leu Ala Ala Met Lys Asn His Ile
100 105 110

Thr Asn Val Val Thr His Tyr Lys Gly Lys Cys Tyr Ala Trp Asp Val
115 120 125

Val Asn Glu Ala Leu Asn Glu Asp Gly Thr Phe Arg Asn Ser Val Phe
130 135 140

Tyr Gln Ile Ile Gly Pro Ala Tyr Ile Pro Ile Ala Phe Ala Thr Ala
145 150 155 160

Ala Ala Ala Asp Pro Asp Val Lys Leu Tyr Tyr Asn Asp Tyr Asn Ile
165 170 175

Glu Tyr Ser Gly Ala Lys Ala Thr Ala Ala Gln Asn Ile Val Lys Met
180 185 190

Ile Lys Ala Tyr Gly Ala Lys Ile Asp Gly Val Gly Leu Gln Ala His
195 200 205

Phe Ile Val Gly Ser Thr Pro Ser Gln Ser Asp Leu Thr Thr Val Leu
210 215 220

Lys Gly Tyr Thr Ala Leu Gly Val Glu Val Ala Tyr Thr Glu Leu Asp
225 230 235 240

Ile Arg Met Gln Leu Pro Ser Thr Ala Ala Lys Leu Ala Gln Gln Ser
245 250 255

Thr Asp Phe Gln Gly Val Ala Ala Ala Cys Val Ser Thr Thr Gly Cys
260 265 270

Val Gly Val Thr Ile Trp Asp Trp Thr Asp Lys Tyr Ser Trp Val Pro
275 280 285

Ser Val Phe Gln Gly Tyr Gly Ala Pro Leu Pro Trp Asp Glu Asn Tyr
290 295 300

Val Lys Lys Pro Ala Tyr Asp Gly Leu Met Ala Gly Leu Gly Ala Ser
305 310 315 320

Gly Ser Gly Thr Thr Thr Thr Thr Thr Thr Thr Ser Thr Thr Thr Gly
325 330 335

```
Gly Thr Asp Pro Thr Gly Val Ala Gln Lys Trp Gly Gln Cys Gly Gly
            340                 345                 350

Ile Gly Trp Thr Gly Pro Thr Thr Cys Val Ser Gly Thr Thr Cys Gln
        355                 360                 365

Lys Leu Asn Asp Trp Tyr Ser Gln Cys Leu
    370                 375


<210> SEQ ID NO 31
<211> LENGTH: 409
<212> TYPE: PRT
<213> ORGANISM: Talaromyces leycettanus

<400> SEQUENCE: 31

Met Lys Phe Ser Asn Val Ile Leu Ala Ala Ser Ala Ser Ser Leu Val
1               5                   10                  15

Leu Ala Ala Pro Lys Ser Lys Thr Lys Arg Thr Ser Ala Phe Gln Trp
            20                  25                  30

Phe Gly Ala Asn Glu Ser Gly Ala Glu Phe Gly Asn Gln Asn Ile Pro
        35                  40                  45

Gly Thr Leu Gly Thr Asp Tyr Thr Trp Pro Asp Thr Ser Thr Ile Gln
    50                  55                  60

Thr Leu Arg Asn Ala Gly Met Asn Ile Phe Arg Val Pro Phe Leu Met
65                  70                  75                  80

Glu Arg Leu Val Pro Asn Gln Met Thr Gly Ser Pro Asp Pro Thr Tyr
                85                  90                  95

Leu Ala Asp Leu Lys Ser Thr Val Asn Phe Ile Thr Gly Thr Gly Ala
            100                 105                 110

Tyr Ala Val Val Asp Pro His Asn Tyr Gly Arg Tyr Tyr Asn Asn Ile
        115                 120                 125

Ile Thr Ser Thr Ser Asp Phe Ala Ala Phe Trp Thr Thr Val Ala Ser
    130                 135                 140

Gln Phe Ala Ser Asn Pro Arg Val Ile Phe Asp Thr Asn Asn Glu Tyr
145                 150                 155                 160

Asn Asn Met Asp Gln Thr Leu Val Leu Asn Leu Asn Gln Ala Ala Ile
                165                 170                 175

Asn Ala Ile Arg Ala Ala Gly Ala Thr Ser Gln Tyr Ile Phe Ala Glu
            180                 185                 190

Gly Asn Ser Trp Thr Gly Ala Trp Thr Trp Thr Ser Val Asn Asp Asn
        195                 200                 205

Met Lys Gln Leu Thr Asp Pro Ser Asn Lys Leu Val Tyr Glu Met His
    210                 215                 220

Gln Tyr Leu Asp Ser Asp Gly Ser Gly Thr Ser Asp Gln Cys Val Asn
225                 230                 235                 240

Ser Thr Ile Gly Tyr Asp Arg Ile Val Ser Ala Thr Gln Trp Leu Gln
                245                 250                 255

Ala Asn Gly Lys Val Ala Phe Leu Gly Glu Phe Ala Gly Gly Ser Asn
            260                 265                 270

Ser Val Cys Glu Ala Ala Val Thr Gly Met Leu Asp Tyr Met Glu Gln
        275                 280                 285

Asn Ser Asp Val Trp Leu Gly Ala Glu Trp Trp Ala Ala Gly Pro Trp
    290                 295                 300

Trp Gly Asn Tyr Ile Tyr Ser Met Glu Pro Pro Ser Gly Ile Ala Tyr
305                 310                 315                 320

Gln Asn Tyr Leu Ser Ile Leu Glu Pro Tyr Phe Pro Gly Gly Ser Tyr
                325                 330                 335
```

Ser Gly Gly Thr Gly Ser Gly Ser Gly Ser Thr Thr Thr Thr Ala Thr
340 345 350

Thr Thr Thr Thr Lys Val Pro Pro Thr Ser Thr Thr Ser Ser Ala Ser
355 360 365

Ser Thr Gly Thr Gly Val Ala Gln His Trp Gly Gln Cys Gly Gly Gln
370 375 380

Gly Trp Thr Gly Pro Thr Thr Cys Val Ser Pro Tyr Thr Cys Gln Glu
385 390 395 400

Leu Asn Pro Tyr Tyr Tyr Gln Cys Leu
405

<210> SEQ ID NO 32
<211> LENGTH: 334
<212> TYPE: PRT
<213> ORGANISM: Penicillium capsulatum

<400> SEQUENCE: 32

Met Lys Phe Ser Asn Leu Val Ala Leu Ala Ala Ala Ala Ser Ser Ala
1 5 10 15

Met Ala Leu Pro Leu Thr Lys Lys His Ala Lys Arg Ala Ser Ser Phe
20 25 30

Glu Trp Phe Gly Ser Asn Glu Ser Gly Ala Glu Phe Gly Ser Gly Asn
35 40 45

Ile Pro Gly Val Tyr Gly Thr Asp Tyr Ile Phe Pro Ser Thr Ser Ala
50 55 60

Ile Gln Thr Leu Ile Asn Asn Gly Met Asn Ile Phe Arg Val Thr Phe
65 70 75 80

Met Met Glu Arg Leu Val Pro Asn Thr Met Thr Gly Ser Phe Asp Ala
85 90 95

Glu Tyr Leu Ser Asn Leu Thr Ser Val Val Asn Tyr Ile Thr Glu Ala
100 105 110

Gly Ala His Ala Val Ile Asp Pro His Asn Tyr Gly Arg Tyr Tyr Gly
115 120 125

Ser Ile Ile Ser Ser Thr Ser Asp Phe Gln Thr Phe Trp Lys Asn Val
130 135 140

Ala Gly Gln Phe Lys Ser Asn Ser Leu Val Ile Phe Asp Thr Asn Asn
145 150 155 160

Glu Tyr His Asp Met Asp Gln Thr Leu Val Leu Asn Leu Asn Gln Ala
165 170 175

Ala Ile Asn Gly Ile Arg Ala Ala Gly Ala Thr Ser Gln Tyr Ile Phe
180 185 190

Val Glu Gly Asn Ser Tyr Thr Gly Ala Trp Thr Trp Ala Asp Val Asn
195 200 205

Asp Asn Leu Lys Asn Leu Thr Asp Pro Gln Asn Lys Ile Val Tyr Glu
210 215 220

Met His Gln Tyr Leu Asp Ser Asp Gly Ser Gly Thr Ser Ala Thr Cys
225 230 235 240

Val Ser Thr Thr Ile Gly Lys Glu Arg Val Thr Ser Ala Thr Gln Trp
245 250 255

Leu Gln Lys Asn Gly Lys Val Gly Ile Leu Gly Glu Phe Ala Gly Gly
260 265 270

Val Asn Asp Gln Cys Lys Thr Ala Ile Thr Gly Met Leu Ser Tyr Leu
275 280 285

Glu Asp Asn Ser Asp Val Trp Arg Gly Ala Met Trp Trp Ala Ala Gly

```
    290                 295                 300

Pro Trp Trp Gly Asp Tyr Ile Phe Ser Leu Glu Pro Pro Ser Gly Thr
305                 310                 315                 320

Ala Tyr Thr Gly Met Trp Ser Thr Leu Lys Ser Tyr Leu Ala
                325                 330


<210> SEQ ID NO 33
<211> LENGTH: 394
<212> TYPE: PRT
<213> ORGANISM: Trichophaea saccata

<400> SEQUENCE: 33

Met His Ser Phe Phe Ser Leu Ala Leu Ala Val Ala Gly Leu Pro Ala
1               5                   10                  15

Leu Ile Asn Ala Gln Gln Ser Ala Trp Gly Gln Cys Gly Gly Val Gly
            20                  25                  30

Trp Thr Gly Ala Thr Thr Cys Val Ser Gly Tyr Tyr Cys Ser Lys Leu
        35                  40                  45

Asn Asp Tyr Tyr Ser Gln Cys Ile Pro Gly Thr Ala Ser Thr Thr Thr
    50                  55                  60

Ser Ala Val Ser Thr Thr Thr Thr Ala Thr Ser Pro Thr Gly Ser Val
65                  70                  75                  80

Cys Ser Gly Asn Arg Thr Lys Phe Lys Tyr Phe Gly Val Asn Glu Ser
                85                  90                  95

Gly Ala Glu Phe Gly Asn Asn Val Val Pro Gly Thr Leu Gly Lys Asp
            100                 105                 110

Tyr Thr Trp Pro Thr Thr Asp Ser Val Asp Phe Phe Leu Gly Lys Gly
        115                 120                 125

Met Asn Thr Phe Arg Ile Ala Phe Leu Met Glu Arg Leu Ser Pro Pro
    130                 135                 140

Ala Gly Gly Leu Thr Gly Thr Phe Asp Pro Thr Tyr Leu Ala Ser Leu
145                 150                 155                 160

Lys Asn Ile Ala Ser Tyr Ile Thr Gly Lys Gly Gly Tyr Ala Ile Ile
                165                 170                 175

Asp Pro His Asn Tyr Gly Arg Tyr Asn Gly Asn Ile Ile Thr Asp Tyr
            180                 185                 190

Thr Ser Phe Gly Thr Trp Cys Lys Asn Leu Ala Ser Gln Phe Lys Ser
        195                 200                 205

Asp Ser His Ile Ile Phe Asp Thr Asn Asn Glu Tyr His Asp Met Asp
    210                 215                 220

Glu Thr Leu Val Phe Asn Leu Asn Gln Ala Cys Ile Asn Gly Ile Arg
225                 230                 235                 240

Ala Ala Gly Ala Thr Ser Gln Leu Ile Leu Ile Glu Gly Asn Ser Trp
                245                 250                 255

Thr Gly Ala Trp Thr Trp Ile Ser Ser Gly Asn Ala Ala Ser Leu Ile
            260                 265                 270

Asn Leu Thr Asp Pro Asn Asn Asn Ile Ala Tyr Glu Met His Gln Tyr
        275                 280                 285

Leu Asp Ser Asp Gly Ser Gly Thr Ser Pro Thr Cys Val Ser Ser Thr
    290                 295                 300

Ile Gly Ala Glu Arg Leu Ala Ala Ala Thr Ala Trp Leu Gln Ala Asn
305                 310                 315                 320

Asn Lys Lys Gly Phe Leu Gly Glu Ile Gly Ala Gly Ser Asn Asp Asp
                325                 330                 335
```

-continued

Cys Ile Ala Ala Val Lys Gly Ala Leu Cys Ser Met Gln Glu Ala Gly
340 345 350

Gly Val Trp Leu Gly Ala Leu Trp Trp Ala Ala Gly Pro Trp Trp Gly
355 360 365

Asp Tyr Tyr Gln Ser Ile Glu Pro Pro Asp Gly Ala Ala Ile Ala Arg
370 375 380

Ile Leu Pro Glu Ala Leu Leu Pro Phe Leu
385 390

<210> SEQ ID NO 34
<211> LENGTH: 294
<212> TYPE: PRT
<213> ORGANISM: Sordaria fimicola

<400> SEQUENCE: 34

Met Arg Ser Ser Thr Ile Leu Gln Thr Gly Leu Val Ala Val Leu Pro
1 5 10 15

Phe Ala Val Gln Ala Ala Ser Gly Ser Gly Lys Ser Thr Arg Tyr Trp
20 25 30

Asp Cys Cys Lys Pro Ser Cys Ala Trp Ser Gly Lys Ala Ser Val Asn
35 40 45

Arg Pro Val Leu Ala Cys Asp Ala Asn Asn Asn Pro Leu Asn Asp Ala
50 55 60

Asn Val Lys Ser Gly Cys Asp Gly Gly Ser Ala Tyr Thr Cys Ala Asn
65 70 75 80

Asn Ser Pro Trp Ala Val Asn Asp Asn Leu Ala Tyr Gly Phe Ala Ala
85 90 95

Thr Lys Leu Ser Gly Gly Thr Glu Ser Ser Trp Cys Cys Ala Cys Tyr
100 105 110

Ala Leu Thr Phe Thr Ser Gly Pro Val Ser Gly Lys Thr Leu Val Val
115 120 125

Gln Ser Thr Ser Thr Gly Gly Asp Leu Gly Ser Asn His Phe Asp Leu
130 135 140

Asn Met Pro Gly Gly Gly Val Gly Leu Phe Asp Gly Cys Lys Arg Glu
145 150 155 160

Phe Gly Gly Leu Pro Gly Ala Gln Tyr Gly Gly Ile Ser Ser Arg Ser
165 170 175

Glu Cys Asp Ser Phe Pro Ala Ala Leu Lys Pro Gly Cys Gln Trp Arg
180 185 190

Phe Asp Trp Phe Lys Asn Ala Asp Asn Pro Glu Phe Thr Phe Lys Gln
195 200 205

Val Gln Cys Pro Ser Glu Leu Thr Ser Arg Thr Gly Cys Lys Arg Asn
210 215 220

Asp Asp Ser Gln Phe Pro Ala Phe Thr Pro Pro Ser Gly Gly Gly Ser
225 230 235 240

Asn Pro Ser Thr Pro Thr Thr Pro Pro Ser Ser Gly Gly Gly Gly Ser
245 250 255

Gly Cys Ala Ala Ala Met Tyr Ala Gln Cys Gly Gly Ser Gly Phe Ser
260 265 270

Gly Cys Thr Asn Cys Pro Ser Gly Ser Thr Cys Lys Ala Ile Asn Asp
275 280 285

Tyr Tyr His Gln Cys Ala
290

<210> SEQ ID NO 35

-continued

<211> LENGTH: 278
<212> TYPE: PRT
<213> ORGANISM: Thielavia terrestris

<400> SEQUENCE: 35

Ala Ser Gly Ser Gly Gln Ser Thr Arg Tyr Trp Asp Cys Cys Lys Pro
1 5 10 15

Ser Cys Ala Trp Pro Gly Lys Ala Ala Val Ser Gln Pro Val Tyr Ala
20 25 30

Cys Asp Ala Asn Phe Gln Arg Leu Ser Asp Phe Asn Val Gln Ser Gly
35 40 45

Cys Asn Gly Gly Ser Ala Tyr Ser Cys Ala Asp Gln Thr Pro Trp Ala
50 55 60

Val Asn Asp Asn Leu Ala Tyr Gly Phe Ala Ala Thr Ser Ile Ala Gly
65 70 75 80

Gly Ser Glu Ser Ser Trp Cys Cys Ala Cys Tyr Ala Leu Thr Phe Thr
85 90 95

Ser Gly Pro Val Ala Gly Lys Thr Met Val Val Gln Ser Thr Ser Thr
100 105 110

Gly Gly Asp Leu Gly Ser Asn His Phe Asp Ile Ala Met Pro Gly Gly
115 120 125

Gly Val Gly Ile Phe Asn Gly Cys Ser Ser Gln Phe Gly Gly Leu Pro
130 135 140

Gly Ala Gln Tyr Gly Gly Ile Ser Ser Arg Asp Gln Cys Asp Ser Phe
145 150 155 160

Pro Ala Pro Leu Lys Pro Gly Cys Gln Trp Arg Phe Asp Trp Phe Gln
165 170 175

Asn Ala Asp Asn Pro Thr Phe Thr Phe Gln Gln Val Gln Cys Pro Ala
180 185 190

Glu Ile Val Ala Arg Ser Gly Cys Lys Arg Asn Asp Asp Ser Ser Phe
195 200 205

Pro Val Phe Thr Pro Pro Ser Gly Gly Asn Gly Gly Thr Gly Thr Pro
210 215 220

Thr Ser Thr Ala Pro Gly Ser Gly Gln Thr Ser Pro Gly Gly Gly Ser
225 230 235 240

Gly Cys Thr Ser Gln Lys Trp Ala Gln Cys Gly Gly Ile Gly Phe Ser
245 250 255

Gly Cys Thr Thr Cys Val Ser Gly Thr Thr Cys Gln Lys Leu Asn Asp
260 265 270

Tyr Tyr Ser Gln Cys Leu
275

<210> SEQ ID NO 36
<211> LENGTH: 595
<212> TYPE: PRT
<213> ORGANISM: Penicillium oxalicum

<400> SEQUENCE: 36

Arg Pro Asp Pro Lys Gly Gly Asn Leu Thr Pro Phe Ile His Lys Glu
1 5 10 15

Gly Glu Arg Ser Leu Gln Gly Ile Leu Asp Asn Leu Gly Gly Arg Gly
20 25 30

Lys Lys Thr Pro Gly Thr Ala Ala Gly Leu Phe Ile Ala Ser Pro Asn
35 40 45

Thr Glu Asn Pro Asn Tyr Tyr Tyr Thr Trp Thr Arg Asp Ser Ala Leu
50 55 60

-continued

```
Thr Ala Lys Cys Leu Ile Asp Leu Phe Glu Asp Ser Arg Ala Lys Phe
65                  70                  75                  80

Pro Ile Asp Arg Lys Tyr Leu Glu Thr Gly Ile Arg Asp Tyr Lys Ser
                85                  90                  95

Ser Gln Ala Ile Leu Gln Ser Val Ser Asn Pro Ser Gly Thr Leu Lys
            100                 105                 110

Asp Gly Ser Gly Leu Gly Glu Pro Lys Phe Glu Ile Asp Leu Asn Pro
        115                 120                 125

Phe Ser Gly Ala Trp Gly Arg Pro Gln Arg Asp Gly Pro Ala Leu Arg
    130                 135                 140

Ala Thr Ala Met Ile Thr Tyr Ala Asn Tyr Leu Ile Ser His Gly Gln
145                 150                 155                 160

Lys Ser Asp Val Ser Gln Val Met Trp Pro Ile Ile Ala Asn Asp Leu
                165                 170                 175

Ala Tyr Val Gly Gln Tyr Trp Asn Asn Thr Gly Phe Asp Leu Trp Glu
            180                 185                 190

Glu Val Asp Gly Ser Ser Phe Phe Thr Ile Ala Val Gln His Arg Ala
        195                 200                 205

Leu Val Glu Gly Ser Gln Leu Ala Lys Lys Leu Gly Lys Ser Cys Asp
    210                 215                 220

Ala Cys Asp Ser Gln Pro Pro Gln Ile Leu Cys Phe Leu Gln Ser Phe
225                 230                 235                 240

Trp Asn Gly Lys Tyr Ile Thr Ser Asn Ile Asn Thr Gln Ala Ser Arg
                245                 250                 255

Ser Gly Ile Asp Leu Asp Ser Val Leu Gly Ser Ile His Thr Phe Asp
            260                 265                 270

Pro Glu Ala Ala Cys Asp Asp Ala Thr Phe Gln Pro Cys Ser Ala Arg
        275                 280                 285

Ala Leu Ala Asn His Lys Val Tyr Val Asp Ser Phe Arg Ser Ile Tyr
    290                 295                 300

Lys Ile Asn Ala Gly Leu Ala Glu Gly Ser Ala Ala Asn Val Gly Arg
305                 310                 315                 320

Tyr Pro Glu Asp Val Tyr Gln Gly Gly Asn Pro Trp Tyr Leu Ala Thr
                325                 330                 335

Leu Gly Ala Ser Glu Leu Leu Tyr Asp Ala Leu Tyr Gln Trp Asp Arg
            340                 345                 350

Leu Gly Lys Leu Glu Val Ser Glu Thr Ser Leu Ser Phe Phe Lys Asp
        355                 360                 365

Phe Asp Ala Thr Val Lys Ile Gly Ser Tyr Ser Arg Asn Ser Lys Thr
    370                 375                 380

Tyr Lys Lys Leu Thr Gln Ser Ile Lys Ser Tyr Ala Asp Gly Phe Ile
385                 390                 395                 400

Gln Leu Val Gln Gln Tyr Thr Pro Ser Asn Gly Ser Leu Ala Glu Gln
                405                 410                 415

Tyr Asp Arg Asn Thr Ala Ala Pro Leu Ser Ala Asn Asp Leu Thr Trp
            420                 425                 430

Ser Phe Ala Ser Phe Leu Thr Ala Thr Gln Arg Arg Asp Ala Val Val
        435                 440                 445

Pro Pro Ser Trp Gly Ala Lys Ser Ala Asn Lys Val Pro Thr Thr Cys
    450                 455                 460

Ser Ala Ser Pro Val Val Gly Thr Tyr Lys Ala Pro Thr Ala Thr Phe
465                 470                 475                 480
```

```
Ser Ser Lys Thr Lys Cys Val Pro Ala Lys Asp Ile Val Pro Ile Thr
                485                 490                 495

Phe Tyr Leu Ile Glu Asn Thr Tyr Tyr Gly Glu Asn Val Phe Met Ser
            500                 505                 510

Gly Asn Ile Thr Ala Leu Gly Asn Trp Asp Ala Lys Lys Gly Phe Pro
        515                 520                 525

Leu Thr Ala Asn Leu Tyr Thr Gln Asp Gln Asn Leu Trp Phe Ala Ser
    530                 535                 540

Val Glu Phe Ile Pro Ala Gly Thr Pro Phe Glu Tyr Lys Tyr Tyr Lys
545                 550                 555                 560

Val Glu Pro Asn Gly Asp Ile Thr Trp Glu Lys Gly Pro Asn Arg Val
                565                 570                 575

Phe Val Ala Pro Thr Gly Cys Pro Val Gln Pro His Ser Asn Asp Val
            580                 585                 590

Trp Gln Phe
        595


<210> SEQ ID NO 37
<211> LENGTH: 412
<212> TYPE: PRT
<213> ORGANISM: Pyrococcus furiosus

<400> SEQUENCE: 37

Ala Glu Leu Glu Gly Leu Asp Glu Ser Ala Ala Gln Val Met Ala Thr
1               5                   10                  15

Tyr Val Trp Asn Leu Gly Tyr Asp Gly Ser Gly Ile Thr Ile Gly Ile
            20                  25                  30

Ile Asp Thr Gly Ile Asp Ala Ser His Pro Asp Leu Gln Gly Lys Val
        35                  40                  45

Ile Gly Trp Val Asp Phe Val Asn Gly Arg Ser Tyr Pro Tyr Asp Asp
    50                  55                  60

His Gly His Gly Thr His Val Ala Ser Ile Ala Ala Gly Thr Gly Ala
65                  70                  75                  80

Ala Ser Asn Gly Lys Tyr Lys Gly Met Ala Pro Gly Ala Lys Leu Ala
                85                  90                  95

Gly Ile Lys Val Leu Gly Ala Asp Gly Ser Gly Ser Ile Ser Thr Ile
            100                 105                 110

Ile Lys Gly Val Glu Trp Ala Val Asp Asn Lys Asp Lys Tyr Gly Ile
        115                 120                 125

Lys Val Ile Asn Leu Ser Leu Gly Ser Ser Gln Ser Ser Asp Gly Thr
    130                 135                 140

Asp Ala Leu Ser Gln Ala Val Asn Ala Ala Trp Asp Ala Gly Leu Val
145                 150                 155                 160

Val Val Val Ala Ala Gly Asn Ser Gly Pro Asn Lys Tyr Thr Ile Gly
                165                 170                 175

Ser Pro Ala Ala Ala Ser Lys Val Ile Thr Val Gly Ala Val Asp Lys
            180                 185                 190

Tyr Asp Val Ile Thr Ser Phe Ser Ser Arg Gly Pro Thr Ala Asp Gly
        195                 200                 205

Arg Leu Lys Pro Glu Val Val Ala Pro Gly Asn Trp Ile Ile Ala Ala
    210                 215                 220

Arg Ala Ser Gly Thr Ser Met Gly Gln Pro Ile Asn Asp Tyr Tyr Thr
225                 230                 235                 240

Ala Ala Pro Gly Thr Ser Met Ala Thr Pro His Val Ala Gly Ile Ala
                245                 250                 255
```

```
Ala Leu Leu Leu Gln Ala His Pro Ser Trp Thr Pro Asp Lys Val Lys
            260                 265                 270

Thr Ala Leu Ile Glu Thr Ala Asp Ile Val Lys Pro Asp Glu Ile Ala
        275                 280                 285

Asp Ile Ala Tyr Gly Ala Gly Arg Val Asn Ala Tyr Lys Ala Ile Asn
    290                 295                 300

Tyr Asp Asn Tyr Ala Lys Leu Val Phe Thr Gly Tyr Val Ala Asn Lys
305                 310                 315                 320

Gly Ser Gln Thr His Gln Phe Val Ile Ser Gly Ala Ser Phe Val Thr
                325                 330                 335

Ala Thr Leu Tyr Trp Asp Asn Ala Asn Ser Asp Leu Asp Leu Tyr Leu
            340                 345                 350

Tyr Asp Pro Asn Gly Asn Gln Val Asp Tyr Ser Tyr Thr Ala Tyr Tyr
        355                 360                 365

Gly Phe Glu Lys Val Gly Tyr Tyr Asn Pro Thr Asp Gly Thr Trp Thr
    370                 375                 380

Ile Lys Val Val Ser Tyr Ser Gly Ser Ala Asn Tyr Gln Val Asp Val
385                 390                 395                 400

Val Ser Asp Gly Ser Leu Ser Gln Pro Gly Ser Ser
                405                 410


<210> SEQ ID NO 38
<211> LENGTH: 177
<212> TYPE: PRT
<213> ORGANISM: Thermoascus aurantiacus

<400> SEQUENCE: 38

Thr Arg Ile Ser Ser Cys Ser Gly Ser Arg Gln Ser Ala Leu Thr Thr
1               5                   10                  15

Ala Leu Arg Asn Ala Ala Ser Leu Ala Asn Ala Ala Ala Asp Ala Ala
            20                  25                  30

Gln Ser Gly Ser Ala Ser Lys Phe Ser Glu Tyr Phe Lys Thr Thr Ser
        35                  40                  45

Ser Ser Thr Arg Gln Thr Val Ala Ala Arg Leu Arg Ala Val Ala Arg
    50                  55                  60

Glu Ala Ser Ser Ser Ser Ser Gly Ala Thr Thr Tyr Tyr Cys Asp Asp
65                  70                  75                  80

Pro Tyr Gly Tyr Cys Ser Ser Asn Val Leu Ala Tyr Thr Leu Pro Ser
                85                  90                  95

Tyr Asn Ile Ile Ala Asn Cys Asp Ile Phe Tyr Thr Tyr Leu Pro Ala
            100                 105                 110

Leu Thr Ser Thr Cys His Ala Gln Asp Gln Ala Thr Thr Ala Leu His
        115                 120                 125

Glu Phe Thr His Ala Pro Gly Val Tyr Ser Pro Gly Thr Asp Asp Leu
    130                 135                 140

Ala Tyr Gly Tyr Gln Ala Ala Met Gly Leu Ser Ser Ser Gln Ala Val
145                 150                 155                 160

Met Asn Ala Asp Thr Tyr Ala Leu Tyr Ala Asn Ala Ile Tyr Leu Gly
                165                 170                 175

Cys


<210> SEQ ID NO 39
<211> LENGTH: 583
<212> TYPE: PRT
<213> ORGANISM: Synthetic construct
```

<400> SEQUENCE: 39

```
Ala Thr Ser Asp Asp Trp Lys Gly Lys Ala Ile Tyr Gln Leu Leu Thr
1               5                   10                  15

Asp Arg Phe Gly Arg Ala Asp Asp Ser Thr Ser Asn Cys Ser Asn Leu
            20                  25                  30

Ser Asn Tyr Cys Gly Gly Thr Tyr Glu Gly Ile Thr Lys His Leu Asp
        35                  40                  45

Tyr Ile Ser Gly Met Gly Phe Asp Ala Ile Trp Ile Ser Pro Ile Pro
    50                  55                  60

Lys Asn Ser Asp Gly Gly Tyr His Gly Tyr Trp Ala Thr Asp Phe Tyr
65                  70                  75                  80

Gln Leu Asn Ser Asn Phe Gly Asp Glu Ser Gln Leu Lys Ala Leu Ile
                85                  90                  95

Gln Ala Ala His Glu Arg Asp Met Tyr Val Met Leu Asp Val Val Ala
            100                 105                 110

Asn His Ala Gly Pro Thr Ser Asn Gly Tyr Ser Gly Tyr Thr Phe Gly
        115                 120                 125

Asp Ala Ser Leu Tyr His Pro Lys Cys Thr Ile Asp Tyr Asn Asp Gln
    130                 135                 140

Thr Ser Ile Glu Gln Cys Trp Val Ala Asp Glu Leu Pro Asp Ile Asp
145                 150                 155                 160

Thr Glu Asn Ser Asp Asn Val Ala Ile Leu Asn Asp Ile Val Ser Gly
                165                 170                 175

Trp Val Gly Asn Tyr Ser Phe Asp Gly Ile Arg Ile Asp Thr Val Lys
            180                 185                 190

His Ile Arg Lys Asp Phe Trp Thr Gly Tyr Ala Glu Ala Ala Gly Val
        195                 200                 205

Phe Ala Thr Gly Glu Val Phe Asn Gly Asp Pro Ala Tyr Val Gly Pro
    210                 215                 220

Tyr Gln Lys Tyr Leu Pro Ser Leu Ile Asn Tyr Pro Met Tyr Tyr Ala
225                 230                 235                 240

Leu Asn Asp Val Phe Val Ser Lys Ser Lys Gly Phe Ser Arg Ile Ser
                245                 250                 255

Glu Met Leu Gly Ser Asn Arg Asn Ala Phe Glu Asp Thr Ser Val Leu
            260                 265                 270

Thr Thr Phe Val Asp Asn His Asp Asn Pro Arg Phe Leu Asn Ser Gln
        275                 280                 285

Ser Asp Lys Ala Leu Phe Lys Asn Ala Leu Thr Tyr Val Leu Leu Gly
    290                 295                 300

Glu Gly Ile Pro Ile Val Tyr Tyr Gly Ser Glu Gln Gly Phe Ser Gly
305                 310                 315                 320

Gly Ala Asp Pro Ala Asn Arg Glu Val Leu Trp Thr Thr Asn Tyr Asp
                325                 330                 335

Thr Ser Ser Asp Leu Tyr Gln Phe Ile Lys Thr Val Asn Ser Val Arg
            340                 345                 350

Met Lys Ser Asn Lys Ala Val Tyr Met Asp Ile Tyr Val Gly Asp Asn
        355                 360                 365

Ala Tyr Ala Phe Lys His Gly Asp Ala Leu Val Val Leu Asn Asn Tyr
    370                 375                 380

Gly Ser Gly Ser Thr Asn Gln Val Ser Phe Ser Val Ser Gly Lys Phe
385                 390                 395                 400

Asp Ser Gly Ala Ser Leu Met Asp Ile Val Ser Asn Ile Thr Thr Thr
```

405                 410                 415

Val Ser Ser Asp Gly Thr Val Thr Phe Asn Leu Lys Asp Gly Leu Pro
            420                 425                 430

Ala Ile Phe Thr Ser Ala Thr Gly Gly Thr Thr Thr Thr Ala Thr Pro
        435                 440                 445

Thr Gly Ser Gly Ser Val Thr Ser Thr Ser Lys Thr Thr Ala Thr Ala
    450                 455                 460

Ser Lys Thr Ser Thr Ser Thr Ser Ser Thr Ser Cys Thr Thr Pro Thr
465                 470                 475                 480

Ala Val Ala Val Thr Phe Asp Leu Thr Ala Thr Thr Thr Tyr Gly Glu
                485                 490                 495

Asn Ile Tyr Leu Val Gly Ser Ile Ser Gln Leu Gly Asp Trp Glu Thr
            500                 505                 510

Ser Asp Gly Ile Ala Leu Ser Ala Asp Lys Tyr Thr Ser Ser Asp Pro
        515                 520                 525

Leu Trp Tyr Val Thr Val Thr Leu Pro Ala Gly Glu Ser Phe Glu Tyr
    530                 535                 540

Lys Phe Ile Arg Ile Glu Ser Asp Asp Ser Val Glu Trp Glu Ser Asp
545                 550                 555                 560

Pro Asn Arg Glu Tyr Thr Val Pro Gln Ala Cys Gly Thr Ser Thr Ala
                565                 570                 575

Thr Val Thr Asp Thr Trp Arg
            580

<210> SEQ ID NO 40
<211> LENGTH: 186
<212> TYPE: PRT
<213> ORGANISM: Thermobifida cellulosilytica

<400> SEQUENCE: 40

Ala Asp Val Ile Gly Gly Asn Pro Tyr Tyr Phe Gly Gly Tyr Arg Cys
1               5                   10                  15

Ser Ile Gly Phe Ser Val Arg Lys Gly Ser Asp Thr Gly Phe Ala Thr
            20                  25                  30

Ala Gly His Cys Gly Glu Thr Gly Thr Leu Thr Arg Ser Pro Glu Gly
        35                  40                  45

Val Val Ala Gly Ser Tyr Phe Pro Gly Arg Asp Met Gly Trp Val Arg
    50                  55                  60

Leu Thr Gly Ala Asp Thr Val Thr Pro Leu Val Asn Arg Tyr Asp Gly
65                  70                  75                  80

Gly Thr Val Thr Val Thr Gly Ser Gln Glu Ala Val Thr Gly Ser Ser
                85                  90                  95

Val Cys Arg Ser Gly Ser Thr Thr Gly Trp Arg Cys Gly Ile Ile Gln
            100                 105                 110

Ser Lys Asn Gln Thr Val Arg Tyr Ala Glu Gly Thr Val Thr Gly Leu
        115                 120                 125

Thr Arg Thr Thr Ala Cys Ala Glu Ala Gly Asp Ser Gly Gly Pro Trp
    130                 135                 140

Leu Thr Gly Ser Gln Ala Gln Gly Val Thr Ser Gly Gly Ser Gly Asn
145                 150                 155                 160

Cys Arg Thr Gly Gly Ile Thr Tyr Phe Gln Pro Ile Asn Pro Leu Leu
                165                 170                 175

Ser Tyr Phe Gly Leu Glu Leu Val Thr Gly
            180                 185

<210> SEQ ID NO 41
<211> LENGTH: 186
<212> TYPE: PRT
<213> ORGANISM: Thermobifida fusca

<400> SEQUENCE: 41

```
Ala Ala Ile Ile Gly Gly Asn Pro Tyr Tyr Phe Gly Asn Tyr Arg Cys
1               5                   10                  15

Ser Ile Gly Phe Ser Val Arg Gln Gly Ser Gln Thr Gly Phe Ala Thr
            20                  25                  30

Ala Gly His Cys Gly Ser Thr Gly Thr Arg Val Ser Ser Pro Ser Gly
        35                  40                  45

Thr Val Ala Gly Ser Tyr Phe Pro Gly Arg Asp Met Gly Trp Val Arg
    50                  55                  60

Ile Thr Ser Ala Asp Thr Val Thr Pro Leu Val Asn Arg Tyr Asn Gly
65                  70                  75                  80

Gly Thr Val Thr Val Thr Gly Ser Gln Glu Ala Ala Thr Gly Ser Ser
                85                  90                  95

Val Cys Arg Ser Gly Ala Thr Thr Gly Trp Arg Cys Gly Thr Ile Gln
            100                 105                 110

Ser Lys Asn Gln Thr Val Arg Tyr Ala Glu Gly Thr Val Thr Gly Leu
        115                 120                 125

Thr Arg Thr Thr Ala Cys Ala Glu Gly Gly Asp Ser Gly Gly Pro Trp
    130                 135                 140

Leu Thr Gly Ser Gln Ala Gln Gly Val Thr Ser Gly Gly Thr Gly Asp
145                 150                 155                 160

Cys Arg Ser Gly Gly Ile Thr Phe Phe Gln Pro Ile Asn Pro Leu Leu
                165                 170                 175

Ser Tyr Phe Gly Leu Gln Leu Val Thr Gly
            180                 185
```

<210> SEQ ID NO 42
<211> LENGTH: 186
<212> TYPE: PRT
<213> ORGANISM: Thermobifida halotolerans

<400> SEQUENCE: 42

```
Thr Asp Ile Ile Gly Gly Asn Pro Tyr Tyr Phe Asp Gly Tyr Arg Cys
1               5                   10                  15

Ser Ile Gly Phe Ser Val Arg Arg Gly Ser Glu Ser Gly Phe Ala Thr
            20                  25                  30

Ala Gly His Cys Gly Glu Glu Gly Thr Glu Thr Ser Asp Pro Glu Gly
        35                  40                  45

Thr Val Ala Gly Ala Tyr Phe Pro Gly Arg Asp Met Gly Trp Val Arg
    50                  55                  60

Ile Thr Asp Ala Asp Thr Val Thr Pro Leu Val Asn Arg Tyr Asn Gly
65                  70                  75                  80

Glu Asn Val Thr Val Ala Gly Ser Arg Glu Ala Ala Thr Gly Ser Ser
                85                  90                  95

Val Cys Arg Ser Gly Ser Thr Thr Gly Trp Arg Cys Gly Thr Ile Arg
            100                 105                 110

Ser Lys Asn Gln Thr Val Arg Tyr Ile Glu Gly Thr Val Thr Gly Leu
        115                 120                 125

Thr Arg Thr Thr Ala Cys Ala Glu Gly Gly Asp Ser Gly Gly Pro Trp
    130                 135                 140
```

Leu Thr Gly Ser Gln Gly Gln Gly Val Thr Ser Gly Gly Ser Gly Asn
145 150 155 160

Cys Thr Leu Gly Gly Val Thr Tyr Phe Gln Pro Leu Asn Pro Leu Leu
165 170 175

Ser His Phe Asp Leu Asp Leu Val Thr Gly
180 185

<210> SEQ ID NO 43
<211> LENGTH: 325
<212> TYPE: PRT
<213> ORGANISM: Thermococcus nautili

<400> SEQUENCE: 43

Leu Val Pro Glu Pro Thr Gln Pro Ala Gln Glu Ile Pro Trp Gly Ile
1 5 10 15

Glu Arg Val Lys Ala Pro Asp Thr Trp Ser Ile Thr Thr Gly Ala Ser
20 25 30

Asn Gly Val Ile Glu Val Ala Ile Leu Asp Thr Gly Ile Asp Trp Asp
35 40 45

His Pro Asp Leu Lys Asp Asn Ile Ala Trp Gly Val Ser Thr Ile Gly
50 55 60

Gly Glu Val Ser Thr Asp Pro Ala Asp Trp Tyr Asp Gly Asn Gly His
65 70 75 80

Gly Thr His Val Ala Gly Thr Ile Ala Ala Leu Asn Asn Asp Ile Gly
85 90 95

Val Val Gly Val Ala Pro Asn Val Glu Ile Tyr Ala Ile Lys Val Leu
100 105 110

Asp Asp Arg Gly Ser Gly Ala Tyr Thr Asp Ile Ala Ile Gly Ile Glu
115 120 125

Gln Ala Leu Leu Gly Pro Asp Gly Ile Leu Asp Lys Asp Gly Asp Gly
130 135 140

Ile Ile Val Gly Asp Pro Asp Asp Asp Ala Ala Glu Val Ile Ser Met
145 150 155 160

Ser Leu Gly Gly Pro Ser Asp Asp Glu Tyr Leu His Asp Met Ile Ile
165 170 175

Lys Ala Tyr Asn Tyr Gly Val Val Ile Val Ala Ala Ser Gly Asn Glu
180 185 190

Ala Ala Asp Gln Pro Ser Tyr Pro Ala Ile Tyr Pro Glu Val Ile Ala
195 200 205

Val Gly Ala Thr Asp Ser Ser Asp Ala Val Ala Tyr Phe Ser Asn Leu
210 215 220

Gln Pro Glu Val Ser Ala Pro Gly Val Asp Val Leu Ser Thr Tyr Pro
225 230 235 240

Asp Asp Thr Tyr Glu Ser Leu Ser Gly Thr Ser Met Ala Thr Pro His
245 250 255

Val Ser Gly Val Val Ala Leu Ile Gln Ala Ala Tyr Tyr Asn Lys Tyr
260 265 270

Gly Lys Val Leu Pro Val Gly Thr Phe Asp Asp Met Asn Thr Asn Thr
275 280 285

Val Arg Gly Ile Leu His Val Thr Ala Asp Asp Leu Gly Asp Pro Gly
290 295 300

Trp Asp Ile Tyr Tyr Gly Tyr Gly Ile Val Arg Ala Asp Leu Ala Val
305 310 315 320

Gln Ala Ala Leu Gly
325

<210> SEQ ID NO 44
<211> LENGTH: 459
<212> TYPE: PRT
<213> ORGANISM: Trichoderma reesei

<400> SEQUENCE: 44

```
Met Ala Pro Ser Val Thr Leu Pro Leu Thr Thr Ala Ile Leu Ala Ile
1               5                   10                  15

Ala Arg Leu Val Ala Ala Gln Gln Pro Gly Thr Ser Thr Pro Glu Val
            20                  25                  30

His Pro Lys Leu Thr Thr Tyr Lys Cys Thr Lys Ser Gly Gly Cys Val
        35                  40                  45

Ala Gln Asp Thr Ser Val Val Leu Asp Trp Asn Tyr Arg Trp Met His
    50                  55                  60

Asp Ala Asn Tyr Asn Ser Cys Thr Val Asn Gly Gly Val Asn Thr Thr
65                  70                  75                  80

Leu Cys Pro Asp Glu Ala Thr Cys Gly Lys Asn Cys Phe Ile Glu Gly
                85                  90                  95

Val Asp Tyr Ala Ala Ser Gly Val Thr Thr Ser Gly Ser Ser Leu Thr
            100                 105                 110

Met Asn Gln Tyr Met Pro Ser Ser Ser Gly Gly Tyr Ser Ser Val Ser
        115                 120                 125

Pro Arg Leu Tyr Leu Leu Asp Ser Asp Gly Glu Tyr Val Met Leu Lys
    130                 135                 140

Leu Asn Gly Gln Glu Leu Ser Phe Asp Val Asp Leu Ser Ala Leu Pro
145                 150                 155                 160

Cys Gly Glu Asn Gly Ser Leu Tyr Leu Ser Gln Met Asp Glu Asn Gly
                165                 170                 175

Gly Ala Asn Gln Tyr Asn Thr Ala Gly Ala Asn Tyr Gly Ser Gly Tyr
            180                 185                 190

Cys Asp Ala Gln Cys Pro Val Gln Thr Trp Arg Asn Gly Thr Leu Asn
        195                 200                 205

Thr Ser His Gln Gly Phe Cys Cys Asn Glu Met Asp Ile Leu Glu Gly
    210                 215                 220

Asn Ser Arg Ala Asn Ala Leu Thr Pro His Ser Cys Thr Ala Thr Ala
225                 230                 235                 240

Cys Asp Ser Ala Gly Cys Gly Phe Asn Pro Tyr Gly Ser Gly Tyr Lys
                245                 250                 255

Ser Tyr Tyr Gly Pro Gly Asp Thr Val Asp Thr Ser Lys Thr Phe Thr
            260                 265                 270

Ile Ile Thr Gln Phe Asn Thr Asp Asn Gly Ser Pro Ser Gly Asn Leu
        275                 280                 285

Val Ser Ile Thr Arg Lys Tyr Gln Gln Asn Gly Val Asp Ile Pro Ser
    290                 295                 300

Ala Gln Pro Gly Gly Asp Thr Ile Ser Ser Cys Pro Ser Ala Ser Ala
305                 310                 315                 320

Tyr Gly Gly Leu Ala Thr Met Gly Lys Ala Leu Ser Ser Gly Met Val
                325                 330                 335

Leu Val Phe Ser Ile Trp Asn Asp Asn Ser Gln Tyr Met Asn Trp Leu
            340                 345                 350

Asp Ser Gly Asn Ala Gly Pro Cys Ser Ser Thr Glu Gly Asn Pro Ser
        355                 360                 365

Asn Ile Leu Ala Asn Asn Pro Asn Thr His Val Val Phe Ser Asn Ile
```

370 375 380

Arg Trp Gly Asp Ile Gly Ser Thr Thr Asn Ser Thr Ala Pro Pro Pro
385 390 395 400

Pro Pro Ala Ser Ser Thr Thr Phe Ser Thr Thr Arg Arg Ser Ser Thr
405 410 415

Thr Ser Ser Ser Pro Ser Cys Thr Gln Thr His Trp Gly Gln Cys Gly
420 425 430

Gly Ile Gly Tyr Ser Gly Cys Lys Thr Cys Thr Ser Gly Thr Thr Cys
435 440 445

Gln Tyr Ser Asn Asp Tyr Tyr Ser Gln Cys Leu
450 455

<210> SEQ ID NO 45
<211> LENGTH: 390
<212> TYPE: PRT
<213> ORGANISM: Penicillium funiculosus

<400> SEQUENCE: 45

Gln Ala Gln Leu Asn Thr Ala Ala Lys Ala Ala Gly Leu Leu Tyr Phe
1 5 10 15

Gly Thr Ala Val Asp Asn Pro Asp Leu Ser Asp Ser Lys Tyr Leu Val
20 25 30

Asn Leu Glu Thr Ala Asp Phe Gly Gln Ile Thr Pro Ala Asn Ala Met
35 40 45

Lys Trp Gln Pro Thr Glu Pro Ser Gln Gly Ser Tyr Thr Phe Thr Gln
50 55 60

Gly Asp Gln Ile Ala Ser Leu Ala Lys Ser Asn Asn Asp Tyr Leu Arg
65 70 75 80

Cys His Asn Leu Val Trp Tyr Asn Gln Leu Pro Ser Tyr Ile Thr Ser
85 90 95

Gly Ser Trp Thr Asn Ala Thr Leu Ile Ala Ala Leu Lys Glu His Ile
100 105 110

Asn Gly Val Val Thr His Tyr Lys Gly Gln Cys Tyr Ala Trp Asp Val
115 120 125

Val Asn Glu Ala Leu Asn Glu Asp Gly Thr Tyr Arg Gln Asn Val Phe
130 135 140

Tyr Gln His Ile Gly Glu Ala Tyr Ile Pro Ile Ala Phe Ala Ala Ala
145 150 155 160

Ala Ala Ala Asp Pro Asn Ala Lys Leu Tyr Tyr Asn Asp Tyr Asn Ile
165 170 175

Glu Tyr Ala Gly Ala Lys Ala Thr Gly Ala Gln Gly Ile Val Lys Leu
180 185 190

Ile Gln Ala Ala Gly Gly Arg Ile Asp Gly Val Gly Leu Gln Ser His
195 200 205

Phe Ile Val Gly Gln Thr Pro Ser Leu Ala Thr Gln Lys Ala Asn Met
210 215 220

Ala Ala Phe Thr Ala Leu Gly Val Asp Val Ala Ile Thr Glu Leu Asp
225 230 235 240

Ile Arg Met Thr Leu Pro Asp Thr Ser Ala Leu Gln Thr Gln Gln Ser
245 250 255

Thr Asp Tyr Gln Thr Thr Thr Thr Ala Cys Val Gln Thr Lys Gly Cys
260 265 270

Val Gly Ile Thr Leu Trp Asp Tyr Thr Asp Lys Tyr Ser Trp Val Pro
275 280 285

-continued

Gly Thr Phe Ser Gly Gln Gly Asp Ala Cys Pro Trp Asp Ser Asn Tyr
    290                 295                 300

Asn Lys Lys Pro Ala Tyr Tyr Gly Ile Leu Ala Gly Leu Gln Ser Gly
305                 310                 315                 320

Ser Gly Ser Ser Ser Ser Thr Ser Ser Thr Thr Leu Ile Thr Thr Thr
                325                 330                 335

Thr Pro Thr Ala Ser Ser Ser Thr Thr Ser Ala Thr Thr Thr Ser Ala
            340                 345                 350

Thr Ser Gly Ala Ala His Trp Gly Gln Cys Gly Gly Ile Gly Trp Ser
        355                 360                 365

Gly Pro Thr Ile Cys Val Ser Pro Tyr Thr Cys Gln Val Leu Asn Pro
    370                 375                 380

Tyr Tyr Ser Gln Cys Leu
385                 390

<210> SEQ ID NO 46
<211> LENGTH: 694
<212> TYPE: PRT
<213> ORGANISM: Myceliophthora sepedonium

<400> SEQUENCE: 46

Met Ala Leu Arg His Ile Ala Ala Ala Ala Ile Ala Gly Leu Ala Ser
1               5                   10                  15

Arg Thr Ala Ala Leu Tyr Ile Asn Gly Ser Val Thr Ala Pro Cys Asp
            20                  25                  30

Ser Pro Ile Tyr Cys Gln Gly Glu Leu Leu Lys Ala Val Glu Leu Ala
        35                  40                  45

Arg Pro Phe Val Asp Ser Lys Thr Phe Val Asp Met Pro Thr Ile Lys
    50                  55                  60

Pro Val Asp Glu Val Leu Ala Ala Phe Ser Lys Leu Ser Leu Pro Leu
65                  70                  75                  80

Ser Asn Asn Ser Glu Leu Asn Ala Phe Leu Tyr Glu Asn Phe Ala Gln
                85                  90                  95

Ala Gly His Glu Leu Glu Glu Val Pro Asp Ser Glu Leu Glu Thr Asp
            100                 105                 110

Ala Lys Phe Leu Asp Lys Leu Glu Asp Arg Thr Ile Lys Glu Phe Val
        115                 120                 125

Gly Lys Val Ile Asp Ile Trp Pro Asp Leu Thr Arg Arg Tyr Ala Gly
    130                 135                 140

Pro Ser Asn Cys Thr Glu Cys Ala Asn Ser Phe Ile Pro Val Asn Arg
145                 150                 155                 160

Thr Phe Val Val Ala Gly Gly Arg Phe Arg Glu Pro Tyr Tyr Trp Asp
                165                 170                 175

Ser Tyr Trp Ile Val Glu Gly Leu Leu Arg Thr Gly Gly Ala Phe Thr
            180                 185                 190

His Ile Ser Lys Asn Ile Ile Glu Asn Phe Leu Asp Phe Val Asp Thr
        195                 200                 205

Ile Gly Phe Ile Pro Asn Gly Ala Arg Ile Tyr Tyr Leu Asn Arg Ser
    210                 215                 220

Gln Pro Pro Leu Leu Thr Leu Met Val Lys Ser Tyr Val Asp Tyr Thr
225                 230                 235                 240

Asn Asp Thr Ser Ile Leu Asp Arg Ala Leu Pro Leu Leu Ile Lys Glu
                245                 250                 255

His Glu Phe Phe Met Asn Asn Arg Thr Val Ser Ile Thr Gly Ser Asn
            260                 265                 270

-continued

```
Gly Lys Glu Tyr Thr Leu Asn Arg Tyr His Val Glu Asn Asn Gln Pro
        275                 280                 285

Arg Pro Glu Ser Phe Arg Glu Asp Tyr Ile Thr Ala Asn Asn Gly Ser
    290                 295                 300

Tyr Tyr Ala Ser Ser Gly Ile Ile Tyr Pro Val Lys Thr Pro Leu Asn
305                 310                 315                 320

Glu Thr Glu Lys Ala Ala Leu Tyr Ser Asn Leu Ala Thr Gly Ala Glu
                325                 330                 335

Ser Gly Trp Asp Tyr Thr Ser Arg Trp Leu Gly Val Pro Ser Asp Ala
            340                 345                 350

Ala Arg Asp Val Tyr Phe Pro Leu Arg Ser Leu Asn Val Arg Asp Ile
        355                 360                 365

Val Pro Val Asp Leu Asn Ser Ile Leu Tyr Gln Asn Glu Val Ile Ile
    370                 375                 380

Ala Glu Tyr Leu Glu Lys Ala Gly Asn Ser Ser Ala Ala Lys Arg Phe
385                 390                 395                 400

Ala Thr Ala Ala Glu Gln Arg Ser Glu Ala Met Tyr Ser Leu Met Trp
                405                 410                 415

Asn Ala Thr His Trp Ser Tyr Phe Asp Tyr Asn Leu Thr Asp Asn Thr
            420                 425                 430

Gln His Ile Phe Val Pro Ala Asp Glu Asp Thr Ala Pro Gln Asp Arg
        435                 440                 445

Ile Glu Ala Pro Pro Gly Gln Gln Val Phe Phe His Ile Ala Gln Leu
    450                 455                 460

Tyr Pro Phe Trp Thr Gly Ala Ala Pro Ala Ser Leu Lys Ala Asn Pro
465                 470                 475                 480

Leu Ala Val Gln Gln Ala Tyr Ala Arg Val Ala Arg Met Leu Asp Ile
                485                 490                 495

Lys Lys Gly Ala Ile Pro Ala Thr Asn Tyr Arg Thr Gly Gln Gln Trp
            500                 505                 510

Asp Gln Pro Asn Val Trp Pro Pro Leu Gln His Ile Leu Met Lys Gly
        515                 520                 525

Leu Leu Asn Thr Pro Ala Thr Phe Gly Lys Ser Asp Pro Ala Tyr Gln
    530                 535                 540

Ser Val Gln Asn Leu Ala Leu Arg Leu Ala Gln Arg Tyr Leu Asp Ser
545                 550                 555                 560

Thr Phe Cys Thr Trp Tyr Ala Thr Gly Gly Ser Thr Ser Asp Phe Pro
                565                 570                 575

Gln Leu Glu Gly Val Thr Pro Gly Ala Thr Gly Val Met Phe Glu Lys
            580                 585                 590

Tyr Ala Asp Asn Ala Thr Asn Val Ala Gly Gly Gly Gly Glu Tyr Glu
        595                 600                 605

Val Val Glu Gly Phe Gly Trp Thr Asn Gly Val Leu Ile Trp Ala Ala
    610                 615                 620

Asp Val Phe Gly Asn Lys Leu Lys Arg Pro Asp Cys Gly Asn Ile Thr
625                 630                 635                 640

Ala Ala His Thr His Ser Ser Ala Lys Arg Gly Leu Glu Glu Asn Lys
                645                 650                 655

Leu Pro Arg Arg Ala Val Glu Leu Asp Pro Trp Asp Ala Ala Trp Thr
            660                 665                 670

Lys Met Phe Gly Arg Ser Lys Leu Arg Arg Arg Glu Ala Glu Asp Val
        675                 680                 685
```

-continued

Arg Lys Arg Trp Met Ser
690

<210> SEQ ID NO 47
<211> LENGTH: 1020
<212> TYPE: PRT
<213> ORGANISM: Talaromyces funiculosus

<400> SEQUENCE: 47

Leu Pro Phe Asn Glu Arg Val Asp Gln Val Leu Arg Ser Tyr Glu Val
1 5 10 15

Thr Ser Lys Leu Asp Ser Arg Ser Thr Lys Pro Ser Lys His Gly His
20 25 30

Thr Tyr Gln Thr Gln Phe Leu Gly Val Thr Trp Asp Gln Arg Asn Trp
35 40 45

Arg Leu Gln Ser Thr Val Leu Asp Gln Gly His Tyr Glu Ser Arg Gly
50 55 60

Ser Ile Ala Asn Gly Tyr Ile Gly Leu Asn Val Ala Gly Ala Gly Pro
65 70 75 80

Leu Phe Glu Leu Asp Ser Pro Val Asp Gly Asp Val Ile Asn Gly Trp
85 90 95

Pro Leu Phe Ser Arg Arg Gln Thr Phe Ala Gly Leu Ala Gly Phe Tyr
100 105 110

Asp Leu Gln Pro Arg Thr Asn Gly Thr Asn Phe Pro Trp Leu Ser Gln
115 120 125

Tyr Gly Asp Asp Ser Ala Ile Ser Gly Val Pro His Trp Gly Gly Met
130 135 140

Val Leu Asp Leu Gly Asp Gly Glu Tyr Leu Asp Ala Thr Val Asp Asn
145 150 155 160

Ser Thr Ile Ser Asp Tyr Thr Thr Thr Tyr Asp Tyr Lys Ala Gly Val
165 170 175

Leu Ser Trp Asp Tyr Lys Trp Thr Pro Lys Asn Ala Asn Gly Ser Phe
180 185 190

Gly Ile Ser Tyr Lys Ile Phe Ala Asn Lys Leu Asp Val Asn Gln Ala
195 200 205

Val Val Gln Leu Ser Ile Thr Pro Ser Thr Asn Gly Ser Ala Ser Val
210 215 220

Val Asn Val Ile Asp Gly Tyr Ala Ala Val Arg Thr Asp Phe Val Ser
225 230 235 240

Ser Gly Asn Glu Ser Asp Val Val Tyr Thr Ala Val Lys Pro Asn Gly
245 250 255

Val Thr Asn Val Thr Ala Trp Ile Tyr Thr Ala Leu Asp Gly Asp Asp
260 265 270

Ala Phe Asp Ile Ser Ser Ala Ala Leu Val Asn Asp Lys Pro Tyr Val
275 280 285

His Gln Asn Asp Ser Ser Ile Ala Gln Ser Val Asn Val Thr Phe Thr
290 295 300

Ala Gly Thr Thr Ile Thr Ile Asn Lys Phe Val Gly Ala Ala Ser Thr
305 310 315 320

Asp Ala Phe Pro Asp Pro Gln Ser Thr Ala Arg Glu Ala Ala Leu Ser
325 330 335

Ala Arg Arg Arg Gly Phe Asp Asp Leu Phe Arg Ser His Ile Ser Glu
340 345 350

Trp Ala Gln Val Met Pro Asp Asp Ser Val Asp Asp Phe Thr Leu Ala
355 360 365

-continued

Asn Gly Thr Leu Pro Asn Asp Thr Phe Ile Ile Glu Ser Ala Val Met
370 375 380

Ala Val Val Asn Pro Tyr Tyr Leu Leu Gln Asn Thr Val Gly Pro Asn
385 390 395 400

Ala Leu Arg Arg Val Asn Asn Ala Pro Val Asn Asp Trp Ser Ile Pro
405 410 415

Val Gly Gly Leu Thr Ser Asp Ser Tyr Ala Gly Gln Ile Phe Trp Asp
420 425 430

Ala Asp Val Trp Met Gln Pro Gly Leu Val Ala Ala Phe Pro Glu Ser
435 440 445

Ala Lys Arg Ile Thr Asn Tyr Arg Ala Ala Lys Tyr Ser Gln Ala Leu
450 455 460

Glu Asn Ala Lys Thr Ala Tyr Thr Ser Ser Gln Asn Gln Thr Trp Phe
465 470 475 480

Ser Pro Asp Ala Ala Ile Tyr Ser Trp Thr Ser Gly Arg Val Gly Asn
485 490 495

Cys Thr Ala Thr Gly Pro Cys Trp Asp Tyr Glu Tyr His Leu Asn Gly
500 505 510

Asp Ile Gly Ile Ser Leu Val Asn Glu Trp Val Val Ser Gly Asp Asn
515 520 525

Glu Thr Phe Lys Asn Lys His Phe Pro Ile Tyr Asn Ser Ile Ala Thr
530 535 540

Leu Tyr Gly Asp Leu Leu Lys Lys Asn Gly Ser Tyr Tyr Thr Leu Thr
545 550 555 560

Asn Met Thr Asp Pro Asp Glu Tyr Ala Asn Asn Val Asp Ala Gly Gly
565 570 575

Tyr Thr Met Thr Leu Ile Ser Gln Thr Leu Ser Asn Ala Asn Ala Phe
580 585 590

Arg Lys Gln Phe Gly Met Asn Glu Asn Thr Thr Trp Thr Glu Met Ala
595 600 605

Asp Asn Ile Leu Leu Ile Arg Glu Asn Asp Val Thr Leu Glu Tyr Thr
610 615 620

Thr Met Asn Asn Ser Val Ala Val Lys Gln Ala Asp Val Ile Leu Ser
625 630 635 640

Thr Phe Pro Leu Asp Tyr Thr Lys Asn Tyr Thr Thr Ser Ala Ala Leu
645 650 655

Asn Asp Leu Asp Tyr Tyr Ala Leu Lys Gln Ser Pro Asp Gly Pro Gly
660 665 670

Met Thr Tyr Ala Ile Phe Ser Ile Val Ala Asn Asp Val Ser Pro Ser
675 680 685

Gly Cys Ser Ala Tyr Thr Tyr Ala Gln Tyr Ser Tyr Asp Pro Tyr Ile
690 695 700

Arg Gly Pro Phe Phe Gln Phe Ser Glu Gln Leu Leu Asp Asp Tyr Thr
705 710 715 720

Ile Asn Gly Gly Thr His Pro Ala Phe Pro Phe Leu Thr Gly His Gly
725 730 735

Gly Ala Asn Gln Val Val Leu Tyr Gly Tyr Leu Gly Leu Arg Leu Leu
740 745 750

Pro Asp Asp Met Leu His Ile Asp Pro Asn Leu Pro Pro Gln Ile Pro
755 760 765

Ser Ile Lys Tyr Arg Thr Phe Tyr Trp Arg Gly Trp Pro Ile Gln Ala
770 775 780

Ala Ser Asn Tyr Thr His Thr Thr Ile Gln Arg Ala Thr Thr Val Ala
785 790 795 800

Pro Leu Ser Thr Ala Asp Pro Thr Tyr Ala Asn Lys Ser Ile His Val
805 810 815

Ser Val Gly His Asn Thr Val Asn Ser Thr Thr Tyr Ser Leu Ser Ala
820 825 830

Asn Gly Ser Ala Leu Val Val Pro Asn Arg Gln Ile Gly Ser Ile Asn
835 840 845

Thr Val Ala Gly Asn Val Val Gln Cys Lys Ser Val Leu Ser Thr Asp
850 855 860

Ala Tyr Gln Lys Gly Gln Tyr Pro Ile Ser Ala Val Asp Gly Ala Ala
865 870 875 880

Ser Thr Lys Trp Gln Pro Glu Phe Ala Ala Asn Ile Ser Ser Leu Thr
885 890 895

Val Asp Leu Thr Gly Ser Asn Val Ser Ser Val Ser Gly Phe Tyr Phe
900 905 910

Asp Trp Ala Gln Ala Pro Pro Thr Asn Ile Thr Val Leu Leu His Asn
915 920 925

Ser Ser Ser Ala Ala Leu Ala Ser Ser Gly Asp Lys Pro Gly Ser Ser
930 935 940

Ala Val Thr Leu Asn Ile Thr Ile Ser Asn Pro Tyr Asn Ala Ser Thr
945 950 955 960

Tyr Asn Ala Asn Ile Ile Ala Leu Pro Ser Ser Asn Ser Thr Asn Tyr
965 970 975

Thr Phe Pro Ala Pro Val Pro Lys Pro Arg Tyr Ala Thr Leu Phe Val
980 985 990

Gln Gly Asn Gln Ala Leu Asp Glu Thr Asp Thr Lys Ser Gly Asn Gly
995 1000 1005

Thr Gly Ala Thr Val Ala Glu Trp Ala Ile Leu Ser
1010 1015 1020

<210> SEQ ID NO 48
<211> LENGTH: 556
<212> TYPE: PRT
<213> ORGANISM: Trametes cingulate

<400> SEQUENCE: 48

Gln Ser Ser Ala Ala Asp Ala Tyr Val Ala Ser Glu Ser Pro Ile Ala
1 5 10 15

Lys Ala Gly Val Leu Ala Asn Ile Gly Pro Ser Gly Ser Lys Ser Asn
20 25 30

Gly Ala Lys Ala Gly Ile Val Ile Ala Ser Pro Ser Thr Ser Asn Pro
35 40 45

Asn Tyr Leu Tyr Thr Trp Thr Arg Asp Ser Ser Leu Val Phe Lys Ala
50 55 60

Leu Ile Asp Gln Phe Thr Thr Gly Glu Asp Thr Ser Leu Arg Thr Leu
65 70 75 80

Ile Asp Glu Phe Thr Ser Ala Glu Ala Ile Leu Gln Gln Val Pro Asn
85 90 95

Pro Ser Gly Thr Val Ser Thr Gly Gly Leu Gly Glu Pro Lys Phe Asn
100 105 110

Ile Asp Glu Thr Ala Phe Thr Asp Ala Trp Gly Arg Pro Gln Arg Asp
115 120 125

Gly Pro Ala Leu Arg Ala Thr Ala Ile Ile Thr Tyr Ala Asn Trp Leu
130 135 140

-continued

```
Leu Asp Asn Lys Asn Thr Thr Tyr Val Thr Asn Thr Leu Trp Pro Ile
145                 150                 155                 160

Ile Lys Leu Asp Leu Asp Tyr Val Ala Ser Asn Trp Asn Gln Ser Thr
                165                 170                 175

Phe Asp Leu Trp Glu Glu Ile Asn Ser Ser Ser Phe Phe Thr Thr Ala
            180                 185                 190

Val Gln His Arg Ala Leu Arg Glu Gly Ala Thr Phe Ala Asn Arg Ile
        195                 200                 205

Gly Gln Thr Ser Val Val Ser Gly Tyr Thr Thr Gln Ala Asn Asn Leu
    210                 215                 220

Leu Cys Phe Leu Gln Ser Tyr Trp Asn Pro Thr Gly Gly Tyr Ile Thr
225                 230                 235                 240

Ala Asn Thr Gly Gly Gly Arg Ser Gly Lys Asp Ala Asn Thr Val Leu
                245                 250                 255

Thr Ser Ile His Thr Phe Asp Pro Ala Ala Gly Cys Asp Ala Val Thr
            260                 265                 270

Phe Gln Pro Cys Ser Asp Lys Ala Leu Ser Asn Leu Lys Val Tyr Val
        275                 280                 285

Asp Ala Phe Arg Ser Ile Tyr Ser Ile Asn Ser Gly Ile Ala Ser Asn
    290                 295                 300

Ala Ala Val Ala Thr Gly Arg Tyr Pro Glu Asp Ser Tyr Met Gly Gly
305                 310                 315                 320

Asn Pro Trp Tyr Leu Thr Thr Ser Ala Val Ala Glu Gln Leu Tyr Asp
                325                 330                 335

Ala Leu Ile Val Trp Asn Lys Leu Gly Ala Leu Asn Val Thr Ser Thr
            340                 345                 350

Ser Leu Pro Phe Phe Gln Gln Phe Ser Ser Gly Val Thr Val Gly Thr
        355                 360                 365

Tyr Ala Ser Ser Ser Ser Thr Phe Lys Thr Leu Thr Ser Ala Ile Lys
    370                 375                 380

Thr Phe Ala Asp Gly Phe Leu Ala Val Asn Ala Lys Tyr Thr Pro Ser
385                 390                 395                 400

Asn Gly Gly Leu Ala Glu Gln Tyr Ser Arg Ser Asn Gly Ser Pro Val
                405                 410                 415

Ser Ala Val Asp Leu Thr Trp Ser Tyr Ala Ala Ala Leu Thr Ser Phe
            420                 425                 430

Ala Ala Arg Ser Gly Lys Thr Tyr Ala Ser Trp Gly Ala Ala Gly Leu
        435                 440                 445

Thr Val Pro Thr Thr Cys Ser Gly Ser Gly Gly Ala Gly Thr Val Ala
    450                 455                 460

Val Thr Phe Asn Val Gln Ala Thr Thr Val Phe Gly Glu Asn Ile Tyr
465                 470                 475                 480

Ile Thr Gly Ser Val Pro Ala Leu Gln Asn Trp Ser Pro Asp Asn Ala
                485                 490                 495

Leu Ile Leu Ser Ala Ala Asn Tyr Pro Thr Trp Ser Ile Thr Val Asn
            500                 505                 510

Leu Pro Ala Ser Thr Thr Ile Glu Tyr Lys Tyr Ile Arg Lys Phe Asn
        515                 520                 525

Gly Ala Val Thr Trp Glu Ser Asp Pro Asn Asn Ser Ile Thr Thr Pro
    530                 535                 540

Ala Ser Gly Thr Phe Thr Gln Asn Asp Thr Trp Arg
545                 550                 555
```

<210> SEQ ID NO 49
<211> LENGTH: 591
<212> TYPE: PRT
<213> ORGANISM: Talaromyces emersonii

<400> SEQUENCE: 49

```
Ala Thr Gly Ser Leu Asp Ser Phe Leu Ala Thr Glu Thr Pro Ile Ala
1               5                   10                  15

Leu Gln Gly Val Leu Asn Asn Ile Gly Pro Asn Gly Ala Asp Val Ala
            20                  25                  30

Gly Ala Ser Ala Gly Ile Val Val Ala Ser Pro Ser Arg Ser Asp Pro
        35                  40                  45

Asn Tyr Phe Tyr Ser Trp Thr Arg Asp Ala Ala Leu Thr Ala Lys Tyr
    50                  55                  60

Leu Val Asp Ala Phe Ile Ala Gly Asn Lys Asp Leu Glu Gln Thr Ile
65                  70                  75                  80

Gln Gln Tyr Ile Ser Ala Gln Ala Lys Val Gln Thr Ile Ser Asn Pro
                85                  90                  95

Ser Gly Asp Leu Ser Thr Gly Gly Leu Gly Glu Pro Lys Phe Asn Val
            100                 105                 110

Asn Glu Thr Ala Phe Thr Gly Pro Trp Gly Arg Pro Gln Arg Asp Gly
        115                 120                 125

Pro Ala Leu Arg Ala Thr Ala Leu Ile Ala Tyr Ala Asn Tyr Leu Ile
    130                 135                 140

Asp Asn Gly Glu Ala Ser Thr Ala Asp Glu Ile Ile Trp Pro Ile Val
145                 150                 155                 160

Gln Asn Asp Leu Ser Tyr Ile Thr Gln Tyr Trp Asn Ser Ser Thr Phe
                165                 170                 175

Asp Leu Trp Glu Glu Val Glu Gly Ser Ser Phe Phe Thr Thr Ala Val
            180                 185                 190

Gln His Arg Ala Leu Val Glu Gly Asn Ala Leu Ala Thr Arg Leu Asn
        195                 200                 205

His Thr Cys Ser Asn Cys Val Ser Gln Ala Pro Gln Val Leu Cys Phe
    210                 215                 220

Leu Gln Ser Tyr Trp Thr Gly Ser Tyr Val Leu Ala Asn Phe Gly Gly
225                 230                 235                 240

Ser Gly Arg Ser Gly Lys Asp Val Asn Ser Ile Leu Gly Ser Ile His
                245                 250                 255

Thr Phe Asp Pro Ala Gly Gly Cys Asp Asp Ser Thr Phe Gln Pro Cys
            260                 265                 270

Ser Ala Arg Ala Leu Ala Asn His Lys Val Val Thr Asp Ser Phe Arg
        275                 280                 285

Ser Ile Tyr Ala Ile Asn Ser Gly Ile Ala Glu Gly Ser Ala Val Ala
    290                 295                 300

Val Gly Arg Tyr Pro Glu Asp Val Tyr Gln Gly Gly Asn Pro Trp Tyr
305                 310                 315                 320

Leu Ala Thr Ala Ala Ala Ala Glu Gln Leu Tyr Asp Ala Ile Tyr Gln
                325                 330                 335

Trp Lys Lys Ile Gly Ser Ile Ser Ile Thr Asp Val Ser Leu Pro Phe
            340                 345                 350

Phe Gln Asp Ile Tyr Pro Ser Ala Ala Val Gly Thr Tyr Asn Ser Gly
        355                 360                 365

Ser Thr Thr Phe Asn Asp Ile Ile Ser Ala Val Gln Thr Tyr Gly Asp
    370                 375                 380
```

-continued

Gly Tyr Leu Ser Ile Val Glu Lys Tyr Thr Pro Ser Asp Gly Ser Leu
385 390 395 400

Thr Glu Gln Phe Ser Arg Thr Asp Gly Thr Pro Leu Ser Ala Ser Ala
405 410 415

Leu Thr Trp Ser Tyr Ala Ser Leu Leu Thr Ala Ser Ala Arg Arg Gln
420 425 430

Ser Val Val Pro Ala Ser Trp Gly Glu Ser Ser Ala Ser Ser Val Pro
435 440 445

Ala Val Cys Ser Ala Thr Ser Ala Thr Gly Pro Tyr Ser Thr Ala Thr
450 455 460

Asn Thr Val Trp Pro Ser Ser Gly Ser Gly Ser Ser Thr Thr Thr Ser
465 470 475 480

Ser Ala Pro Cys Thr Thr Pro Thr Ser Val Ala Val Thr Phe Asp Glu
485 490 495

Ile Val Ser Thr Ser Tyr Gly Glu Thr Ile Tyr Leu Ala Gly Ser Ile
500 505 510

Pro Glu Leu Gly Asn Trp Ser Thr Ala Ser Ala Ile Pro Leu Arg Ala
515 520 525

Asp Ala Tyr Thr Asn Ser Asn Pro Leu Trp Tyr Val Thr Val Asn Leu
530 535 540

Pro Pro Gly Thr Ser Phe Glu Tyr Lys Phe Phe Lys Asn Gln Thr Asp
545 550 555 560

Gly Thr Ile Val Trp Glu Asp Asp Pro Asn Arg Ser Tyr Thr Val Pro
565 570 575

Ala Tyr Cys Gly Gln Thr Thr Ala Ile Leu Asp Asp Ser Trp Gln
580 585 590

<210> SEQ ID NO 50
<211> LENGTH: 555
<212> TYPE: PRT
<213> ORGANISM: Pycnoporus sanguineus

<400> SEQUENCE: 50

Gln Ser Ser Ala Val Asp Ala Tyr Val Ala Ser Glu Ser Pro Ile Ala
1 5 10 15

Lys Gln Gly Val Leu Asn Asn Ile Gly Pro Asn Gly Ser Lys Ala His
20 25 30

Gly Ala Lys Ala Gly Ile Val Val Ala Ser Pro Ser Thr Glu Asn Pro
35 40 45

Asp Tyr Leu Tyr Thr Trp Thr Arg Asp Ser Ser Leu Val Phe Lys Leu
50 55 60

Leu Ile Asp Gln Phe Thr Ser Gly Asp Asp Thr Ser Leu Arg Gly Leu
65 70 75 80

Ile Asp Asp Phe Thr Ser Ala Glu Ala Ile Leu Gln Gln Val Ser Asn
85 90 95

Pro Ser Gly Thr Val Ser Thr Gly Gly Leu Gly Glu Pro Lys Phe Asn
100 105 110

Ile Asp Glu Thr Ala Phe Thr Gly Ala Trp Gly Arg Pro Gln Arg Asp
115 120 125

Gly Pro Ala Leu Arg Ala Thr Ser Ile Ile Arg Tyr Ala Asn Trp Leu
130 135 140

Leu Asp Asn Gly Asn Thr Thr Tyr Val Ser Asn Thr Leu Trp Pro Val
145 150 155 160

Ile Gln Leu Asp Leu Asp Tyr Val Ala Asp Asn Trp Asn Gln Ser Thr

-continued

```
                165                 170                 175

Phe Asp Leu Trp Glu Glu Val Asp Ser Ser Ser Phe Phe Thr Thr Ala
            180                 185                 190

Val Gln His Arg Ala Leu Arg Glu Gly Ala Thr Phe Ala Ser Arg Ile
        195                 200                 205

Gly Gln Ser Ser Val Val Ser Gly Tyr Thr Thr Gln Ala Asp Asn Leu
    210                 215                 220

Leu Cys Phe Leu Gln Ser Tyr Trp Asn Pro Ser Gly Gly Tyr Val Thr
225                 230                 235                 240

Ala Asn Thr Gly Gly Gly Arg Ser Gly Lys Asp Ser Asn Thr Val Leu
                245                 250                 255

Thr Ser Ile His Thr Phe Asp Pro Ala Ala Gly Cys Asp Ala Ala Thr
            260                 265                 270

Phe Gln Pro Cys Ser Asp Lys Ala Leu Ser Asn Leu Lys Val Tyr Val
        275                 280                 285

Asp Ala Phe Arg Ser Ile Tyr Thr Ile Asn Asn Gly Ile Ala Ser Asn
    290                 295                 300

Ala Ala Val Ala Thr Gly Arg Tyr Pro Glu Asp Ser Tyr Met Gly Gly
305                 310                 315                 320

Asn Pro Trp Tyr Leu Thr Thr Ser Ala Val Ala Glu Gln Leu Tyr Asp
                325                 330                 335

Ala Leu Tyr Val Trp Asp Gln Leu Gly Gly Leu Asn Val Thr Ser Thr
            340                 345                 350

Ser Leu Ala Phe Phe Gln Gln Phe Ala Ser Gly Leu Ser Thr Gly Thr
        355                 360                 365

Tyr Ser Ala Ser Ser Ser Thr Tyr Ala Thr Leu Thr Ser Ala Ile Arg
    370                 375                 380

Ser Phe Ala Asp Gly Phe Leu Ala Ile Asn Ala Lys Tyr Thr Pro Ala
385                 390                 395                 400

Asp Gly Gly Leu Ala Glu Gln Tyr Ser Arg Asn Asp Gly Thr Pro Leu
                405                 410                 415

Ser Ala Val Asp Leu Thr Trp Ser Tyr Ala Ala Ala Leu Thr Ala Phe
            420                 425                 430

Ala Ala Arg Glu Gly Lys Thr Tyr Gly Ser Trp Gly Ala Ala Gly Leu
        435                 440                 445

Thr Val Pro Ala Ser Cys Ser Gly Gly Gly Gly Ala Thr Val Ala Val
    450                 455                 460

Thr Phe Asn Val Gln Ala Thr Thr Val Phe Gly Glu Asn Ile Tyr Ile
465                 470                 475                 480

Thr Gly Ser Val Ala Ala Leu Gln Asn Trp Ser Pro Asp Asn Ala Leu
                485                 490                 495

Ile Leu Ser Ala Ala Asn Tyr Pro Thr Trp Ser Ile Thr Val Asn Leu
            500                 505                 510

Pro Ala Asn Thr Val Val Gln Tyr Lys Tyr Ile Arg Lys Phe Asn Gly
        515                 520                 525

Gln Val Thr Trp Glu Ser Asp Pro Asn Asn Gln Ile Thr Thr Pro Ser
    530                 535                 540

Gly Gly Ser Phe Thr Gln Asn Asp Val Trp Arg
545                 550                 555
```

<210> SEQ ID NO 51
<211> LENGTH: 556
<212> TYPE: PRT
<213> ORGANISM: Gloeophyllum sepiarium

<400> SEQUENCE: 51

Gln Ser Val Asp Ser Tyr Val Ser Ser Glu Gly Pro Ile Ala Lys Ala
1 5 10 15

Gly Val Leu Ala Asn Ile Gly Pro Asn Gly Ser Lys Ala Ser Gly Ala
20 25 30

Ser Ala Gly Val Val Val Ala Ser Pro Ser Thr Ser Asp Pro Asp Tyr
35 40 45

Trp Tyr Thr Trp Thr Arg Asp Ser Ser Leu Val Phe Lys Ser Leu Ile
50 55 60

Asp Gln Tyr Thr Thr Gly Ile Asp Ser Thr Ser Ser Leu Arg Thr Leu
65 70 75 80

Ile Asp Asp Phe Val Thr Ala Glu Ala Asn Leu Gln Gln Val Ser Asn
85 90 95

Pro Ser Gly Thr Leu Thr Thr Gly Gly Leu Gly Glu Pro Lys Phe Asn
100 105 110

Val Asp Glu Thr Ala Phe Thr Gly Ala Trp Gly Arg Pro Gln Arg Asp
115 120 125

Gly Pro Ala Leu Arg Ser Thr Ala Leu Ile Thr Tyr Gly Asn Trp Leu
130 135 140

Leu Ser Asn Gly Asn Thr Ser Tyr Val Thr Ser Asn Leu Trp Pro Ile
145 150 155 160

Ile Gln Asn Asp Leu Gly Tyr Val Val Ser Tyr Trp Asn Gln Ser Thr
165 170 175

Tyr Asp Leu Trp Glu Glu Val Asp Ser Ser Ser Phe Phe Thr Thr Ala
180 185 190

Val Gln His Arg Ala Leu Arg Glu Gly Ala Ala Phe Ala Thr Ala Ile
195 200 205

Gly Gln Thr Ser Gln Val Ser Ser Tyr Thr Thr Gln Ala Asp Asn Leu
210 215 220

Leu Cys Phe Leu Gln Ser Tyr Trp Asn Pro Ser Gly Gly Tyr Ile Thr
225 230 235 240

Ala Asn Thr Gly Gly Gly Arg Ser Gly Lys Asp Ala Asn Thr Leu Leu
245 250 255

Ala Ser Ile His Thr Tyr Asp Pro Ser Ala Gly Cys Asp Ala Ala Thr
260 265 270

Phe Gln Pro Cys Ser Asp Lys Ala Leu Ser Asn Leu Lys Val Tyr Val
275 280 285

Asp Ser Phe Arg Ser Val Tyr Ser Ile Asn Ser Gly Val Ala Ser Asn
290 295 300

Ala Ala Val Ala Thr Gly Arg Tyr Pro Glu Asp Ser Tyr Gln Gly Gly
305 310 315 320

Asn Pro Trp Tyr Leu Thr Thr Phe Ala Val Ala Glu Gln Leu Tyr Asp
325 330 335

Ala Leu Asn Val Trp Glu Ser Gln Gly Ser Leu Glu Val Thr Ser Thr
340 345 350

Ser Leu Ala Phe Phe Gln Gln Phe Ser Ser Gly Val Thr Ala Gly Thr
355 360 365

Tyr Ser Ser Ser Ser Ser Thr Tyr Ser Thr Leu Thr Ser Ala Ile Lys
370 375 380

Asn Phe Ala Asp Gly Phe Val Ala Ile Asn Ala Lys Tyr Thr Pro Ser
385 390 395 400

Asn Gly Gly Leu Ala Glu Gln Tyr Ser Lys Ser Asp Gly Ser Pro Leu

```
                405                 410                 415

Ser Ala Val Asp Leu Thr Trp Ser Tyr Ala Ser Ala Leu Thr Ala Phe
            420                 425                 430

Glu Ala Arg Asn Asn Thr Gln Phe Ala Gly Trp Gly Ala Ala Gly Leu
        435                 440                 445

Thr Val Pro Ser Ser Cys Ser Gly Asn Ser Gly Gly Pro Thr Val Ala
    450                 455                 460

Val Thr Phe Asn Val Asn Ala Glu Thr Val Trp Gly Glu Asn Ile Tyr
465                 470                 475                 480

Leu Thr Gly Ser Val Asp Ala Leu Glu Asn Trp Ser Ala Asp Asn Ala
                485                 490                 495

Leu Leu Leu Ser Ser Ala Asn Tyr Pro Thr Trp Ser Ile Thr Val Asn
            500                 505                 510

Leu Pro Ala Ser Thr Ala Ile Glu Tyr Lys Tyr Ile Arg Lys Asn Asn
        515                 520                 525

Gly Ala Val Thr Trp Glu Ser Asp Pro Asn Asn Ser Ile Thr Thr Pro
    530                 535                 540

Ala Ser Gly Ser Thr Thr Glu Asn Asp Thr Trp Arg
545                 550                 555


<210> SEQ ID NO 52
<211> LENGTH: 559
<212> TYPE: PRT
<213> ORGANISM: Gloeophyllum trabeum

<400> SEQUENCE: 52

Gln Ser Val Asp Ser Tyr Val Gly Ser Glu Gly Pro Ile Ala Lys Ala
1               5                   10                  15

Gly Val Leu Ala Asn Ile Gly Pro Asn Gly Ser Lys Ala Ser Gly Ala
            20                  25                  30

Ala Ala Gly Val Val Val Ala Ser Pro Ser Lys Ser Asp Pro Asp Tyr
        35                  40                  45

Trp Tyr Thr Trp Thr Arg Asp Ser Ser Leu Val Phe Lys Ser Leu Ile
    50                  55                  60

Asp Gln Tyr Thr Thr Gly Ile Asp Ser Thr Ser Ser Leu Arg Ser Leu
65                  70                  75                  80

Ile Asp Ser Phe Val Ile Ala Glu Ala Asn Ile Gln Gln Val Ser Asn
                85                  90                  95

Pro Ser Gly Thr Leu Thr Thr Gly Gly Leu Gly Glu Pro Lys Phe Asn
            100                 105                 110

Val Asp Glu Thr Ala Phe Thr Gly Ala Trp Gly Arg Pro Gln Arg Asp
        115                 120                 125

Gly Pro Ala Leu Arg Ala Thr Ala Leu Ile Thr Tyr Gly Asn Trp Leu
    130                 135                 140

Leu Ser Asn Gly Asn Thr Thr Trp Val Thr Ser Thr Leu Trp Pro Ile
145                 150                 155                 160

Ile Gln Asn Asp Leu Asn Tyr Val Val Gln Tyr Trp Asn Gln Thr Thr
                165                 170                 175

Phe Asp Leu Trp Glu Glu Val Asn Ser Ser Ser Phe Phe Thr Thr Ala
            180                 185                 190

Val Gln His Arg Ala Leu Arg Glu Gly Ala Ala Phe Ala Thr Lys Ile
        195                 200                 205

Gly Gln Thr Ser Ser Val Ser Ser Tyr Thr Thr Gln Ala Ala Asn Leu
    210                 215                 220
```

-continued

Leu Cys Phe Leu Gln Ser Tyr Trp Asn Pro Thr Ser Gly Tyr Ile Thr
225 230 235 240

Ala Asn Thr Gly Gly Gly Arg Ser Gly Lys Asp Ala Asn Thr Leu Leu
245 250 255

Ala Ser Ile His Thr Tyr Asp Pro Ser Ala Gly Cys Asp Ala Thr Thr
260 265 270

Phe Gln Pro Cys Ser Asp Lys Ala Leu Ser Asn Leu Lys Val Tyr Val
275 280 285

Asp Ser Phe Arg Ser Val Tyr Ser Ile Asn Ser Gly Ile Ala Ser Asn
290 295 300

Ala Ala Val Ala Thr Gly Arg Tyr Pro Glu Asp Ser Tyr Gln Gly Gly
305 310 315 320

Asn Pro Trp Tyr Leu Thr Thr Phe Ala Val Ala Glu Gln Leu Tyr Asp
325 330 335

Ala Leu Asn Val Trp Ala Ala Gln Gly Ser Leu Asn Val Thr Ser Ile
340 345 350

Ser Leu Pro Phe Phe Gln Gln Phe Ser Ser Ser Val Thr Ala Gly Thr
355 360 365

Tyr Ala Ser Ser Ser Thr Thr Tyr Thr Thr Leu Thr Ser Ala Ile Lys
370 375 380

Ser Phe Ala Asp Gly Phe Val Ala Ile Asn Ala Gln Tyr Thr Pro Ser
385 390 395 400

Asn Gly Gly Leu Ala Glu Gln Phe Ser Arg Ser Asn Gly Ala Pro Val
405 410 415

Ser Ala Val Asp Leu Thr Trp Ser Tyr Ala Ser Ala Leu Thr Ala Phe
420 425 430

Glu Ala Arg Asn Asn Thr Gln Phe Ala Gly Trp Gly Ala Val Gly Leu
435 440 445

Thr Val Pro Thr Ser Cys Ser Ser Asn Ser Gly Gly Gly Gly Gly Ser
450 455 460

Thr Val Ala Val Thr Phe Asn Val Asn Ala Gln Thr Val Trp Gly Glu
465 470 475 480

Asn Ile Tyr Ile Thr Gly Ser Val Asp Ala Leu Ser Asn Trp Ser Pro
485 490 495

Asp Asn Ala Leu Leu Leu Ser Ser Ala Asn Tyr Pro Thr Trp Ser Ile
500 505 510

Thr Val Asn Leu Pro Ala Ser Thr Ala Ile Gln Tyr Lys Tyr Ile Arg
515 520 525

Lys Asn Asn Gly Ala Val Thr Trp Glu Ser Asp Pro Asn Asn Ser Ile
530 535 540

Thr Thr Pro Ala Ser Gly Ser Val Thr Glu Asn Asp Thr Trp Arg
545 550 555

<210> SEQ ID NO 53
<211> LENGTH: 337
<212> TYPE: PRT
<213> ORGANISM: Gonapodya prolifera

<400> SEQUENCE: 53

Met Ala Arg Leu Ser Ser Leu Ile Ala Leu Val Leu Ala Phe Val Ala
1 5 10 15

Val Ser Ala Pro Ala Leu Ala Ala Arg Gly Arg Pro Arg Leu Asn Gly
20 25 30

Lys Thr Phe Val Ala Asp Ser Gly Val Pro Leu Arg Gly Pro Phe Thr
35 40 45

Ser Thr Glu Trp Thr Pro Ala Val Pro Ala Ala Asn Ile Ala Asn Met
    50                  55                  60

Arg Asn Tyr Asn Phe Asn Ala Ile His Leu Tyr Ala Glu Thr Phe Asp
65                  70                  75                  80

Pro Asn Tyr Pro Ala Ala Gly Ser Gln Lys Pro Gly Tyr Ala Ala Thr
                85                  90                  95

Arg Val Asp Gln Ile Val Ala Ala Thr Lys Ala Ala Asn Met Tyr Val
            100                 105                 110

Val Ile Val Leu Ala Asn Gly Ala Asn Asn Gly Lys Phe Asn Leu Asn
        115                 120                 125

Tyr Ala Lys Asp Phe Trp Ser Phe Tyr Ala Ala Arg Tyr Lys Asn Glu
    130                 135                 140

Thr His Val Ile Tyr Glu Ile His Asn Glu Pro Val Gln Trp Gly Pro
145                 150                 155                 160

Pro Tyr Ile Ser Ser Thr Gln Ser Pro Gly Ala Val Ser Met Asn Ala
                165                 170                 175

Asp Cys Tyr Lys Ile Ile Arg Ala Val Ala Pro Asp Thr Pro Val Leu
            180                 185                 190

Leu Phe Thr Tyr Ala Ser Ile Gly Gly Gly Ser Ser Ala Ala Gly Ala
        195                 200                 205

Val Lys Asp Ala Gln Ser Phe Asn Thr Ala Val Phe Gly Asn Ala Asn
    210                 215                 220

Ala Gln Trp Thr Asn Glu Ala Ile Ala Ile His Gly Tyr Trp Gly Ala
225                 230                 235                 240

Gln Gly Ala Ser Asp Ala Ala Lys Ala Leu Asn Ala Ala Gly Phe Ser
                245                 250                 255

Val Val Leu Thr Glu Phe Ala Ala Ala Thr Ser Pro Thr Ser Pro Asn
            260                 265                 270

Gly Gly Gln Asp Thr Val Leu Thr Gly Phe Met Glu Gln Gln Gly Val
        275                 280                 285

Ser Trp Leu Thr Phe Leu His Val Pro Pro Thr Gly Val Ser Gly Asp
    290                 295                 300

Val Thr Asp Pro Asn Gln Tyr Thr Asn Arg Met Thr Ala Ala Gly Ile
305                 310                 315                 320

Gly Phe Asp Arg Asp Pro Gly Leu Asn Ala Val Gly Gly Gly Gln Ala
                325                 330                 335

Ala

<210> SEQ ID NO 54
<211> LENGTH: 536
<212> TYPE: PRT
<213> ORGANISM: Paenibacillus favisporus

<400> SEQUENCE: 54

Trp Asn Gly Met Pro Met Ser Lys Leu His Val Ser Gly Asn Gln Leu
1               5                   10                  15

Val Asn Ser Ser Gly Gln Pro Val Leu Leu Ser Gly Trp His Gln Pro
            20                  25                  30

Ser Gly Ser Tyr Trp Thr Tyr Gln Ser Ser Ser Tyr Tyr Leu Asp Arg
        35                  40                  45

Asn Gly Gly Asn Arg His Ala Ala Ile Leu Asp Tyr Leu Lys Val Ile
    50                  55                  60

Thr Asp Thr Phe Thr Gly Thr Ser Ala Lys Tyr Gly Ser Ser His Gly
65                  70                  75                  80

-continued

```
Trp Tyr Met Asn Gln Val Arg Leu Phe Ile Asp Arg Glu Asp Met Gly
                85                  90                  95

Asp Val Ala Ala Gly Thr Tyr Asn Phe Ala Gly Leu Gln Ser Val Thr
            100                 105                 110

Gln Asp Val Ile Ile Pro Tyr Ile Ala Tyr Ala Lys Thr Lys Gly Leu
        115                 120                 125

Tyr Val Thr Leu Gly Leu Asp Phe Thr Leu Ser Asn Asn Gln Ala Thr
    130                 135                 140

Thr Pro Ser Asn Leu Asn Lys Phe Asn Glu Ile Trp Gly Tyr Leu Ala
145                 150                 155                 160

Ser Gln Pro Ala Ile Lys Ser Ala Asp Asn Val Met Phe Glu Leu Ile
                165                 170                 175

Asn Glu Pro Val Leu Ser Asp Val Asn Gly Gln Trp Gly Gly Asn Pro
            180                 185                 190

Ser Gln Pro Asn Phe Ala Asp Tyr Trp Asn Ser Leu Lys Lys Phe Gln
        195                 200                 205

Asn Ser Ile Ile Ser Thr Ile Arg Ser Lys Gly Ala Asp Asn Val Ile
    210                 215                 220

Trp Ala Ala Gly Leu Gly Trp Asp Gln Tyr Tyr Gln Leu Cys Ala Ser
225                 230                 235                 240

Ser Pro Leu Thr Asp Pro Leu Asn Asn Ile Gly Tyr Ser Val His Trp
                245                 250                 255

Tyr Pro Gly Tyr Gly Ala His Asp Asp Tyr Ala Thr Leu Gln Gln Gln
            260                 265                 270

Trp Asp Thr Asn Ile Lys Pro Cys Ala Asp His Tyr Pro Ile Asn Ile
        275                 280                 285

Thr Glu Thr Thr Trp Phe Lys Thr Gln Pro Gly Asp Ser Ser Tyr Trp
    290                 295                 300

Glu Leu Phe Asn Gly Ser Asn Glu Gly Phe Gly Lys Asn Thr Lys Ala
305                 310                 315                 320

Ile Phe Thr Ala Ala Gly Asn Val Ser Met Thr Ala His Met Asn Gly
                325                 330                 335

Phe Leu Leu Glu Pro Gly Thr Arg Ser Ser Phe Ala Asp Pro Thr Ala
            340                 345                 350

Gly Leu Lys Tyr Asp Gly Asn Thr Ala Arg Asp Gly Met Ala Arg Phe
        355                 360                 365

Leu Phe Glu Trp Tyr Tyr Glu Arg Ala Gln Leu Asn Pro Trp Asn Gly
    370                 375                 380

Ile Trp Asn Gly Val Leu Ser Gly Ser Thr Tyr Lys Ile Val Asn Arg
385                 390                 395                 400

Ala Ser Gly Lys Ala Ile Asp Val Pro Gly Gly Gln Asn Thr Asn Gly
                405                 410                 415

Leu Gln Leu Gln Gln Trp Ser Asp Asn Asn Ala Thr Ala Gln Gln Trp
            420                 425                 430

Val Ala Asp Asp Leu Gly Thr Tyr Asn Asn Val Tyr Arg Leu Arg Ser
        435                 440                 445

Val Ser Ser Ala Asp Gln Lys Val Met Asp Ile Arg Asn Gly Thr Lys
    450                 455                 460

Asn Asn Gly Glu Ala Val Gln Leu Met Gln Asp Leu Gly Asn Thr Ala
465                 470                 475                 480

Gln Gln Phe Arg Leu Ile Lys Leu Ser Asn Gly Tyr Trp Ser Ile Leu
                485                 490                 495
```

-continued

```
Asn Val Asn Ser Asn Lys Ala Val Glu Val Ala Gly Ala Ser Ser Ala
            500                 505                 510

Asp Gly Ala Lys Leu Gln Gln Asn Leu Tyr Arg Gly Asp Leu Asn Gln
        515                 520                 525

Gln Trp Gln Leu Val Lys Ile Asn
    530                 535


<210> SEQ ID NO 55
<211> LENGTH: 335
<212> TYPE: PRT
<213> ORGANISM: Talaromyces pinophilus

<400> SEQUENCE: 55

Met Ile Ser Leu Ala Pro Ala Leu Leu Leu Leu Leu Pro Ala Val Ser
1               5                   10                  15

Gly Leu Ala Leu Pro Thr Asp Glu Ala Thr Gln Asn Thr Thr Val Ala
            20                  25                  30

Arg Ser Gly Cys Pro Leu Pro Ser Ser Tyr Ser Trp Thr Ser Thr Gly
        35                  40                  45

Pro Leu Ala Asn Pro Ala Ser Gly Phe Leu Ala Leu Lys Asp Phe Thr
    50                  55                  60

His Val Pro Tyr Asn Gly Gln His Leu Val Tyr Ala Ser Asp Val Asn
65                  70                  75                  80

Asn Ala Gly Ser Tyr Gly Ser Leu Asn Phe Gly Leu Phe Ser Asp Trp
                85                  90                  95

Asn Ser Met Gly Ser Val Ala Gln His Thr Met Ser Ala Gly Thr Val
            100                 105                 110

Ala Pro Gln Leu Phe Tyr Phe Thr Pro Lys Asn Ile Trp Val Leu Ala
        115                 120                 125

Tyr Glu Trp Gly Ala Ser Pro Phe Ser Tyr Arg Thr Ser Ser Asp Pro
    130                 135                 140

Thr Asn Ala Asn Gly Trp Ser Ser Pro Gln Pro Leu Tyr Thr Gly Ser
145                 150                 155                 160

Thr Gly Ser Ser Thr Gly Pro Ile Asp Pro Ser Leu Ile Gly Asp Ser
                165                 170                 175

Gln Asn Met Tyr Leu Phe Phe Ala Gly Asp Asn Gly Lys Ile Tyr Arg
            180                 185                 190

Ala Ser Met Pro Ile Gly Asn Phe Pro Gly Asn Phe Gly Ser Ser Ala
        195                 200                 205

Gln Val Val Leu Ser Asp Ser Thr Val Asn Leu Phe Glu Ala Val Gln
    210                 215                 220

Val Tyr Ser Val Gln Gly Gln Asn Gln Tyr Leu Met Ile Val Glu Ala
225                 230                 235                 240

Arg Asp Pro Ser Glu Asn Arg Tyr Phe Arg Ser Phe Thr Ala Ser Ser
                245                 250                 255

Leu Ser Gly Ser Trp Ala Pro Gln Ala Thr Ser Val Ser Ala Pro Phe
            260                 265                 270

Ala Gly Lys Ala Asn Ser Gly Ala Ser Trp Thr Asn Asp Ile Ser Ser
        275                 280                 285

Gly Asp Leu Ile Arg Ala Ser Ala Asp Gln Thr Met Pro Val Asp Ala
    290                 295                 300

Cys Asn Leu Gln Leu Leu Tyr Gln Gly Arg Ala Thr Asn Ser Gly Gly
305                 310                 315                 320

Ser Tyr Asn Asp Leu Pro Tyr Arg Pro Gly Leu Leu Thr His Lys
                325                 330                 335
```

<210> SEQ ID NO 56
<211> LENGTH: 558
<212> TYPE: PRT
<213> ORGANISM: Humicola insolens

<400> SEQUENCE: 56

```
Met Leu Gly Leu Lys Val Leu Cys Leu Ser Ala Val Val Gly Thr Ala
1               5                   10                  15

Val Ser Val Pro His Ala Gly Asn Leu Pro Arg Gln Ala Ser Thr Phe
            20                  25                  30

Thr Asn Pro Val Leu Trp Glu Asp His Pro Asp Leu Glu Val Phe Arg
        35                  40                  45

Val Gly Ser Val Phe Tyr Tyr Ser Ser Ser Thr Phe Ala Tyr Ser Pro
    50                  55                  60

Gly Ala Pro Val Leu Lys Ser Tyr Asp Leu Val His Trp Thr Pro Val
65                  70                  75                  80

Thr His Ser Val Pro Arg Leu Asn Phe Gly Ser Asn Tyr Asp Leu Pro
                85                  90                  95

Ser Gly Thr Pro Gly Ala Tyr Val Lys Gly Ile Trp Ala Ser Thr Leu
            100                 105                 110

Arg Tyr Arg Arg Ser Asn Asp Arg Phe Tyr Trp Tyr Gly Cys Val Glu
        115                 120                 125

Gly Arg Thr Tyr Leu Trp Thr Ser Pro Gly Gly Asn Ala Leu Ala Asn
    130                 135                 140

Asn Gly Glu Val Pro Pro Ser Ala Trp Asn Trp Gln His Thr Ala Thr
145                 150                 155                 160

Ile Asp Asn Cys Tyr Tyr Asp Ala Gly Leu Leu Ile Asp Asp Asp Asp
                165                 170                 175

Thr Met Tyr Ile Ala Tyr Gly Asn Pro Thr Ile Asn Val Ala Gln Leu
            180                 185                 190

Ser Pro Asp Gly Thr Arg Gln Val Arg Val Gln Gln Arg Val Tyr Ala
        195                 200                 205

His Pro Gln Gly Gln Thr Val Glu Gly Ala Arg Met Tyr Lys Ile Arg
    210                 215                 220

Gly Asn Tyr Tyr Ile Leu Val Thr Arg Pro Ala Asp Ala Glu Tyr Val
225                 230                 235                 240

Leu Arg Ser Thr Thr Gly Ser Pro Phe Gly Pro Tyr Glu Ala Arg Thr
                245                 250                 255

Leu Val Ser Arg Ile Gln Gly Pro Leu Ala Asn Ala Gly Phe Ala His
            260                 265                 270

Gln Gly Gly Ile Val Asp Ala Pro Asp Gly Thr Trp His Tyr Val Ala
        275                 280                 285

Phe Met Asp Ala Tyr Pro Gly Gly Arg Ile Pro Val Val Ala Pro Leu
    290                 295                 300

Arg Trp Thr Ala Asp Gly Trp Pro Glu Val Val Thr Asp Ser Gln Gly
305                 310                 315                 320

Arg Trp Gly Thr Ser Tyr Pro Ile Pro Val Arg Gly Ala Lys Asn Ala
                325                 330                 335

Thr Glu Gly Leu Ala Ser Thr Asp Leu Asp Glu Phe Arg Gly Thr Arg
            340                 345                 350

Phe Ser Glu His Trp Glu Trp Asn His Asn Pro Asp Thr Ser Lys Phe
        355                 360                 365

Thr Leu Leu Gly Gly Asn Glu Gly Gly Leu Ile Leu Arg Thr Ala Thr
```

370 375 380

Val Thr Gly Asp Leu Phe Ala Ala Arg Asn Thr Leu Thr Arg Arg Ile
385 390 395 400

Ala Gly Pro Lys Ala Ser Gly Ile Phe Arg Leu Asp Val Arg Gly Met
405 410 415

Arg Asp Gly Asp Arg Ala Gly Ala Val Leu Phe Arg Asp Arg Ala Ala
420 425 430

Tyr Ile Gly Val Trp Lys Gln Gly Asn Glu Ala Arg Ile Val Met Val
435 440 445

Asp Asp Leu Arg Leu Asn Glu Asp Gly Trp Arg Thr Ala Ser Thr Gly
450 455 460

Arg Val Ala Ala Asn Gly Pro Val Ile Asp Thr Asn Ala Gln Gln Asp
465 470 475 480

Ile Trp Leu Arg Ile Asp Ala Asp Ile Thr Pro Ala Phe Gly Thr Asn
485 490 495

Thr Glu Arg Thr Thr Thr Phe Tyr Tyr Ser Ile Asp Gly Gly Arg Thr
500 505 510

Tyr Thr Arg Leu Gly Pro Ala Phe Ala Met Thr Asn Ser Trp Arg Tyr
515 520 525

Phe Thr Gly Tyr Arg Phe Gly Val Phe Asn Phe Ser Thr Lys Ser Leu
530 535 540

Gly Gly Glu Val Lys Val Lys Gly Phe Lys Met Asn Met Ile
545 550 555

<210> SEQ ID NO 57
<211> LENGTH: 575
<212> TYPE: PRT
<213> ORGANISM: Humicola insolens

<400> SEQUENCE: 57

Met Lys Pro Leu Ala Gln Leu Ile Ser Ser Gly Leu Ala Leu Leu Gln
1 5 10 15

Gly Ile Thr Met Ala Ala Ala Ala Pro Pro Val Pro Pro Thr Pro Arg
20 25 30

Asn Ser Thr Phe Tyr Asn Pro Val Leu Pro Gly Trp His Ser Asp Pro
35 40 45

Ser Cys Val Tyr Val Ser Gly Leu Phe Tyr Cys Val Thr Ser Thr Phe
50 55 60

Ile Ser Phe Pro Gly Leu Pro Val Tyr Ala Ser Arg Asp Leu Ile Asn
65 70 75 80

Trp Arg Leu Ala Ser His Val Trp Asn Arg Glu Ser Gln Leu Pro Gly
85 90 95

Tyr Ser Trp Ala Thr Thr Glu Gln Gln Leu Gly Met Phe Ala Ala Thr
100 105 110

Leu Arg His Arg Asp Gly Val Phe Tyr Val Ile Cys Glu Tyr Leu Gly
115 120 125

Val Glu Gly Lys Glu Ala Gly Val Leu Phe Lys Thr Thr Asp Pro Phe
130 135 140

Ser Glu Glu Ala Trp Ser Asp Pro Val Phe Phe His Ala Glu Lys Ile
145 150 155 160

Asp Pro Asp Leu Phe Trp Asp Asp Asp Gly Lys Val Tyr Val Ala Thr
165 170 175

Gln Gly Ile Ile Leu Gln Glu Met Asp Ile Glu Thr Gly Ala Leu Thr
180 185 190

-continued

```
Pro Ala Val Glu Leu Trp Asn Gly Thr Gly Gly Val Trp Pro Glu Gly
        195                 200                 205

Pro His Ile Tyr Lys Arg Asp Gly Trp Tyr Tyr Leu Met Ile Ala Glu
    210                 215                 220

Gly Gly Thr Ala Glu Asp His Ala Ile Thr Ile Ala Arg Ala Arg Asn
225                 230                 235                 240

Ile Tyr Gly Pro Tyr Glu Ala Tyr Glu Lys Asn Pro Ile Leu Thr Asn
                245                 250                 255

Arg Gly Thr Asn Glu Tyr Phe Gln Thr Val Gly His Gly Asp Leu Phe
            260                 265                 270

Gln Asp Ala Asn Gly Asn Trp Trp Gly Met Cys Leu Ala Thr Arg Ser
        275                 280                 285

Gly Pro Ala Tyr Lys Ser Tyr Pro Met Gly Arg Glu Thr Val Leu Phe
    290                 295                 300

Pro Val Thr Trp Arg Glu Gly Glu Trp Pro Ile Leu Gln Pro Val Lys
305                 310                 315                 320

Gly Val Met Glu Gly Trp Pro Leu Pro Pro Arg Ser Arg Asp Val Pro
                325                 330                 335

Gly Asp Gly Pro Phe Asn Glu Asp Pro Asp Asp Tyr Asp Phe Lys Asp
            340                 345                 350

Gly Lys Leu Pro Lys His Leu Val Tyr Trp Arg Val Pro Arg Pro Gly
        355                 360                 365

His Ile Glu Ala Val Arg Gly Lys Gly Leu Arg Val Arg Leu Asn Arg
    370                 375                 380

Asn Asn Leu Ala Gly Thr Pro Gly Gly Pro Glu Pro Ala Ala Arg Ala
385                 390                 395                 400

Ile Ser Phe Ile Ala Arg Arg Gln Thr His Ser Val Phe Arg Phe Gly
                405                 410                 415

Val Asp Leu Ser Phe Ser Pro Arg Glu Asp Gly Gln Glu Ala Gly Val
            420                 425                 430

Val Ala Phe Leu Thr Gln Leu Ala Asn Ile His Leu Gly Leu Val Arg
        435                 440                 445

Leu Glu Gly Glu Leu Lys Leu Arg Phe Asn Ala Ser Gly Ala Val Thr
    450                 455                 460

Thr Arg Ala Val Pro Lys Ser Trp Gly Arg Ala Glu Ser Val Arg Leu
465                 470                 475                 480

Glu Ile Thr Met Glu Lys Pro Ser Glu Tyr Ile Phe Ser Ala Leu Arg
                485                 490                 495

Pro Gly Asp Arg Ala Ser Arg Ile Glu Leu Gly Arg Ala Ser Ala Glu
            500                 505                 510

Leu Leu Ser Gly Gly Ser Gly Ser Phe Val Gly Thr Leu Leu Gly Val
        515                 520                 525

Tyr Ala Thr Cys Asn Gly Ser Gly Ser Gly Leu Asp Cys Pro Lys Gly
    530                 535                 540

Thr Pro Asp Ala Tyr Phe Thr Arg Trp Asn Tyr Val Gly Asp Gly Gln
545                 550                 555                 560

Tyr Val Thr Glu Thr Gln Val Val Arg Thr Gly Lys Gly Gly Lys
                565                 570                 575
```

<210> SEQ ID NO 58
<211> LENGTH: 663
<212> TYPE: PRT
<213> ORGANISM: Colletotrichum graminicola

<400> SEQUENCE: 58

```
Met Val Ser Leu Lys Ser Ala Phe Leu Ala Ala Thr Tyr Ala Val Ser
1               5                   10                  15

Ala Ala Ala Val Asp Ile Thr Val Lys Ser Ser Gly Gly Asn Ala Thr
            20                  25                  30

Ser Gly His Gln Tyr Gly Phe Leu His Glu Asp Ile Asn Asn Ser Gly
        35                  40                  45

Asp Gly Gly Ile Tyr Ala Glu Leu Ile Arg Asn Arg Ala Phe Gln Tyr
    50                  55                  60

Ser Asp Glu Phe Pro Val Ser Leu Ala Ala Trp His Pro Val Asn Gly
65                  70                  75                  80

Ala Lys Leu Ala Leu Lys Asn Leu Ala Gln Pro Leu Ser Ser Ala Leu
                85                  90                  95

Pro Val Ser Val Gln Val Ser Gly Gly Asn Ser Ser Gly Ala Ile Gly
            100                 105                 110

Leu Lys Asn Asp Gly Tyr Trp Gly Met Asp Val Lys Val Gln Lys Tyr
        115                 120                 125

Thr Gly Ser Phe Trp Val Lys Gly Ala Tyr Asp Gly Val Phe Thr Ala
    130                 135                 140

Ser Leu Gln Ser Ala Leu Thr Asp Asp Val Phe Gly Ser Val Glu Ile
145                 150                 155                 160

Gln Ser Lys Ala Lys Ala Asp Glu Trp Val Glu His Glu Val Glu Leu
                165                 170                 175

Val Pro Glu Lys Asn Ala Pro Asn Ser Asn Asn Thr Phe Ala Ile Thr
            180                 185                 190

Phe Asp Pro Ala Gly Thr Ala Asn Gly Ser Leu Asn Phe Asn Leu Ile
        195                 200                 205

Ser Leu Phe Pro Pro Thr Tyr Lys Gly Arg Lys Asn Gly Leu Arg Ile
    210                 215                 220

Asp Ile Ala Glu Ala Leu Ala Gly Leu His Pro Ser Leu Leu Arg Phe
225                 230                 235                 240

Pro Gly Gly Asn Met Leu Glu Gly Leu Asn Asn Lys Thr Tyr Trp Asp
                245                 250                 255

Trp Lys Asp Thr Leu Gly Pro Leu Lys Asp Arg Pro Gly Phe Gln Gly
            260                 265                 270

Val Trp Gly Tyr Gln Gln Thr His Gly Leu Gly Leu Val Glu Tyr Leu
        275                 280                 285

Glu Trp Ala Gln Asp Met Asn Leu Asp Val Val Ile Gly Val Trp Ala
    290                 295                 300

Gly Leu Ala Leu Asn Gly Asp Val Thr Ala Lys Glu Asp Leu Gln Pro
305                 310                 315                 320

Phe Ile Asp Asp Ala Leu Asp Gln Ile Glu Phe Ile Arg Gly Pro Ala
                325                 330                 335

Asp Ser Lys Trp Gly Ala Arg Arg Ala Glu Leu Gly His Pro Glu Pro
            340                 345                 350

Phe Thr Leu Glu Tyr Val Glu Val Gly Asn Glu Asp Trp Leu Ala Gly
        355                 360                 365

Tyr Pro Gly Gly Trp Glu Ser Tyr Lys Glu Tyr Arg Phe Pro Met Phe
    370                 375                 380

Met Glu Ala Ile Leu Ala Lys Tyr Pro Asp Ile Thr Val Ile Ser Ser
385                 390                 395                 400

Gly Ala Thr Ser Asp Ala Asp Gly Tyr Asp Ile Pro Pro Pro Ala Ile
                405                 410                 415
```

-continued

Gly Asp Tyr His Pro Tyr Arg Thr Pro Asp Ala Leu Val Asp Glu Phe
420 425 430

Asp Arg Phe Asp Asn Asp Ile Gly His Ile Val Gly Glu Val Ala Ala
435 440 445

Thr His Pro Asn Gly Gly Ile Gly Trp Glu Gly Asn Leu Met Pro Phe
450 455 460

Pro Trp Trp Ile Gly Thr Val Gly Glu Ala Val Ser Leu Ile Gly Tyr
465 470 475 480

Glu Arg Asn Ala Asp Arg Ile Pro Gly Thr Phe Tyr Ala Pro Val Leu
485 490 495

Arg Asn Met Asn Arg Trp Gln Trp Ala Val Thr Ile Val Gln Phe Ala
500 505 510

Ala Asp Pro Ala Ile Thr Thr Arg Ser Thr Ser Trp Phe Val Trp Glu
515 520 525

Leu Phe Ala Ala His Pro Met Ser Glu Thr Leu Pro Thr Val Gly Glu
530 535 540

Phe Gly Pro Ala Tyr Trp Val Ala Gly Lys Asn Glu Ala Lys Gly Ser
545 550 555 560

Leu Ile Trp Lys Gly Ala Val Tyr Asn Thr Thr Asp Ser Ala Asp Val
565 570 575

Pro Ile Asn Val Arg Phe Glu Gly Val Ala Ala Gly Thr Thr Ala Ser
580 585 590

Leu Thr Val Leu Thr Asn Pro Gly Gly Asp Pro Tyr Ala Tyr Asn Asp
595 600 605

Pro Leu Ala Gly Thr Asn Val Val Ala Ser Asn Thr Thr Thr Val Thr
610 615 620

Ala Asn Glu Asp Gly Val Phe Ala Phe Ser Leu Pro Glu Leu Ser Val
625 630 635 640

Ala Leu Leu Asp Thr Glu Gly Ser Ala Gly Ala Lys Gln Ala Ala Arg
645 650 655

Ala Val Lys Ser Phe Arg Ala
660

<210> SEQ ID NO 59
<211> LENGTH: 643
<212> TYPE: PRT
<213> ORGANISM: Trametes hirsuta

<400> SEQUENCE: 59

Met Lys Leu Leu Phe Leu Leu Gly Ala Phe Val Ala Gln Cys Leu Ala
1 5 10 15

Val Thr Val Thr Val Asn Lys Asn Pro Ser His Thr Val Pro Ser Thr
20 25 30

Leu Tyr Gly Leu Met Phe Glu Asp Ile Asn His Ser Gly Asp Gly Gly
35 40 45

Leu Tyr Ala Glu Leu Leu Gln Asn Arg Ala Phe Gln Gln Val Thr Pro
50 55 60

Asn Thr Ala Ala Ala Leu Ala Ala Trp His Pro Ile Ser Asn Ala Lys
65 70 75 80

Leu Ala Val Ile Gln Asp Pro Ser Pro Val Ser Asn Ala Leu Pro Asn
85 90 95

Ser Leu Gln Phe Ser Val Pro Ser Gly Ser Ser Gly Arg Val Gly Phe
100 105 110

Thr Asn Glu Gly Phe Trp Gly Ile Lys Val Asp Ser Thr Trp Thr Tyr
115 120 125

-continued

```
Lys Ala Ser Leu Phe Phe Arg Phe Pro Thr Ser Ser Ser Phe Ser Gly
    130                 135                 140

Ala Leu Thr Val Gly Leu Gln Thr Asn Ala Gly Arg Val Leu Ala Gln
145                 150                 155                 160

Asn Ser Thr Gln Ile Arg Gly Thr Thr Thr Lys Trp Thr Gln Ile Asn
                165                 170                 175

Leu Glu Leu His Pro Thr Ala Ser Ala Pro Asp Val Ser Asn Ser Phe
            180                 185                 190

Phe Val Thr Ile Asp Gly Ala Ala Gly Ala Gly Gln Thr Ile Asn Phe
        195                 200                 205

Ala Met Phe Ser Leu Phe Pro Pro Thr Phe Lys Asn Arg Pro Asn Gly
    210                 215                 220

Leu Arg Ala Asp Ile Ala Glu Thr Leu Ala Glu Met Gly Pro Ser Phe
225                 230                 235                 240

Phe Arg Phe Pro Gly Gly Asn Asn Leu Glu Gly Gln Thr Thr Ala Thr
                245                 250                 255

Arg Trp Gln Trp Asn Ala Thr Val Gly Ser Leu Leu Asp Arg Pro Gly
            260                 265                 270

Arg Val Gly Asp Trp Gly Tyr Val Asn Thr Asp Gly Leu Gly Leu Leu
        275                 280                 285

Glu Tyr Leu Gln Phe Phe Glu Asp Thr Gly Met Glu Pro Ile Met Ala
    290                 295                 300

Val Trp Ala Gly Tyr Ser Leu Gly Gly Thr Ser Leu Ala Glu Asn Gln
305                 310                 315                 320

Leu Ala Pro Tyr Ile Gln Gln Ala Ile Asp Gln Ile Asn Phe Val Ile
                325                 330                 335

Gly Asp Pro Ala Lys Ser Ala Pro Ala Ala Leu Arg Ala Ser Leu Gly
            340                 345                 350

His Pro Glu Pro Phe Thr Leu Arg Phe Val Glu Val Gly Asn Glu Asp
        355                 360                 365

Phe Phe Ala Ala Gly Ser Tyr Pro Tyr Arg Trp His Asp Phe Val Thr
    370                 375                 380

Ala Leu Gln Ala Gln Phe Pro Gln Ile Arg Phe Ile Ala Thr Thr Asn
385                 390                 395                 400

Ala Trp Asn Pro Val Leu Ser Pro Val Pro Gln Ser Tyr Asp Val His
                405                 410                 415

Val Tyr Gln Thr Pro Thr Trp Phe Tyr Gln Asn Ala Phe Tyr Tyr Asp
            420                 425                 430

Gly Phe Gln Arg Asn Gly Thr Thr Tyr Phe Glu Gly Glu Tyr Ala Ala
        435                 440                 445

Ile Ser Thr Asn Ala Asn Asp Leu Phe Gly Thr Val Ala Asp Gly Arg
    450                 455                 460

Leu Ala Phe Pro Thr Val Gln Ser Ala Thr Gly Glu Ala Ala Phe Met
465                 470                 475                 480

Thr Gly Leu Glu Arg Asn Ser Asp Ile Val Phe Ala Ala Ser Tyr Ala
                485                 490                 495

Pro Leu Leu Gln His Val Asn Ser Thr Gln Trp Thr Pro Asp Leu Val
            500                 505                 510

Ser Tyr Asp Ala Gly Ser Val Ile Lys Ser Thr Ser Phe Phe Ala Gln
        515                 520                 525

Lys Leu Phe Ala Leu Asn Lys Gly Asp Gln Tyr Leu Pro Ser Thr Leu
    530                 535                 540
```

-continued

```
Pro Thr Asn Gly Gly Thr Leu His Trp Ser Ile Thr Arg Ala Ser Ser
545                 550                 555                 560

Ser Gly Lys Thr Phe Ile Lys Ile Ala Asn Ala Gly Ser Ser Ala Gln
                565                 570                 575

Ser Leu Thr Phe Gln Leu Thr Gln Phe Asn Ser Val Ser Ser Thr Gly
            580                 585                 590

Thr Leu Gln Val Leu Thr Gly Pro Glu Thr Ala Ser Asn Thr Pro Glu
        595                 600                 605

Ala Pro Gln Ala Ile Val Pro Lys Thr Ser Thr Ile Gly Thr Gly Lys
    610                 615                 620

Thr Phe Thr Tyr Asn Ala Pro Ala Phe Ser Val Ser Val Ile Thr Val
625                 630                 635                 640

Thr Thr Asn
```